US009088848B2

(12) United States Patent
Abreu

(10) Patent No.: US 9,088,848 B2
(45) Date of Patent: Jul. 21, 2015

(54) BIOLOGICALLY FIT WEARABLE ELECTRONICS APPARATUS AND METHODS

(75) Inventor: Marcio Marc Abreu, North Haven, CT (US)

(73) Assignee: GeeLux Holdings, Ltd., Tortola (VG)

( * ) Notice: Subject to any disclaimer, the term of this patent is extended or adjusted under 35 U.S.C. 154(b) by 333 days.

(21) Appl. No.: 13/425,955

(22) Filed: Mar. 21, 2012

(65) Prior Publication Data

US 2012/0220234 A1     Aug. 30, 2012

Related U.S. Application Data

(63) Continuation of application No. 11/637,952, filed on Dec. 13, 2006, now abandoned.

(60) Provisional application No. 60/749,579, filed on Dec. 13, 2005, provisional application No. 60/756,549, filed on Jan. 6, 2006, provisional application No. 60/762,861, filed on Jan. 30, 2006.

(51) Int. Cl.
| H04R 1/02 | (2006.01) |
| H04R 1/10 | (2006.01) |
| G02C 3/00 | (2006.01) |
| G02C 11/06 | (2006.01) |
| G02C 11/00 | (2006.01) |
| H04R 5/033 | (2006.01) |

(52) U.S. Cl.
CPC ............ *H04R 1/1066* (2013.01); *G02C 3/003* (2013.01); *G02C 11/06* (2013.01); *G02C 11/10* (2013.01); *H04R 1/1016* (2013.01); *H04R 5/0335* (2013.01); *H04R 2420/07* (2013.01)

(58) Field of Classification Search
CPC ........................................................ H04R 1/02
USPC .................. 381/87, 333–334, 364, 388, 301; 2/209.13
See application file for complete search history.

(56) References Cited

U.S. PATENT DOCUMENTS

| 2,249,572 A | 7/1941 | Lieber |
| 3,528,734 A | 9/1970 | Bruel et al. ..................... 353/15 |
| 4,456,797 A * | 6/1984 | Olsen ............................ 381/311 |
| 4,902,120 A | 2/1990 | Weyer ........................... 351/158 |

(Continued)

FOREIGN PATENT DOCUMENTS

| EP | 1049310 | 11/2000 |
| GB | 2 320 990 A | 7/1998 |

(Continued)

OTHER PUBLICATIONS

An Office Action; "Notification of Reasons for Rejection," issued by the Japanese Patent Office on May 12, 2014, which corresponds to Japanese Patent Application 2008-549558 and is related to U.S. Appl. No. 13/425,955; with English language translation.

(Continued)

*Primary Examiner* — Disler Paul
(74) *Attorney, Agent, or Firm* — Studebaker & Brackett PC

(57) ABSTRACT

Detachable wearable electronic eyeglasses and head mounted gear with a plurality of electronic functions and interchangeable electronic function, and a wearable computer with optimal weight distribution and stretchable arms.

12 Claims, 237 Drawing Sheets

(56) References Cited

U.S. PATENT DOCUMENTS

| | | | |
|---|---|---|---|
| 4,942,617 A | 7/1990 | Boylan | |
| 5,034,995 A | 7/1991 | Ciccone | 455/344 |
| 5,164,987 A | 11/1992 | Raven | 381/25 |
| 5,422,957 A * | 6/1995 | Cummins | 381/384 |
| 5,608,808 A | 3/1997 | da Silva | 381/183 |
| 5,715,323 A | 2/1998 | Walker | 381/187 |
| 5,737,436 A | 4/1998 | Boyden | |
| 5,881,160 A * | 3/1999 | Sheppard | 381/376 |
| 6,095,820 A | 8/2000 | Luxon et al. | |
| 6,097,822 A * | 8/2000 | Min | 381/301 |
| 6,176,576 B1 | 1/2001 | Green et al. | 351/123 |
| 6,633,770 B1 | 10/2003 | Gitzinger et al. | 455/575.1 |
| 6,643,528 B1 | 11/2003 | Shim et al. | 455/575.2 |
| 6,690,808 B2 | 2/2004 | Urwyler | 381/381 |
| 6,920,228 B2 | 7/2005 | Redmer et al. | 381/370 |
| D533,539 S | 12/2006 | Mah | D14/205 |
| 7,519,192 B1 * | 4/2009 | Laycock et al. | 381/301 |
| 2001/0035242 A1 | 11/2001 | Hughs et al. | |
| 2002/0072387 A1 | 6/2002 | Kao | |
| 2002/0193151 A1 | 12/2002 | Edreich | |
| 2003/0036414 A1 | 2/2003 | Huang | |
| 2003/0040285 A1 | 2/2003 | Whitley | 455/90 |
| 2003/0042348 A1 | 3/2003 | Salentine et al. | |
| 2003/0108217 A1 * | 6/2003 | Tilbury et al. | 381/388 |
| 2003/0182003 A1 * | 9/2003 | Takashima | 700/94 |
| 2004/0077382 A1 | 4/2004 | Verity | 455/569.1 |
| 2004/0204165 A1 | 10/2004 | Huang | 455/569.1 |
| 2005/0078274 A1 | 4/2005 | Howell et al. | 351/158 |
| 2005/0128431 A1 | 6/2005 | Jannard et al. | 351/158 |
| 2005/0201585 A1 | 9/2005 | Jannard et al. | 381/381 |
| 2005/0248717 A1 | 11/2005 | Howell et al. | 351/41 |
| 2005/0255883 A1 | 11/2005 | Hood | 455/556.1 |
| 2005/0255898 A1 | 11/2005 | Huang | |
| 2006/0013410 A1 * | 1/2006 | Wurtz | 381/74 |
| 2006/0023158 A1 | 2/2006 | Howell et al. | 351/41 |
| 2006/0093178 A1 | 5/2006 | Chen | 381/381 |
| 2006/0153409 A1 | 7/2006 | Yeh | 381/333 |
| 2006/0177086 A1 * | 8/2006 | Rye et al. | 381/370 |
| 2006/0251283 A1 * | 11/2006 | Yeh | 381/388 |
| 2007/0064969 A1 | 3/2007 | Chou | 381/381 |
| 2009/0175482 A1 * | 7/2009 | Crutcher | 381/376 |

FOREIGN PATENT DOCUMENTS

| | | |
|---|---|---|
| JP | S52-107638 U | 8/1977 |
| JP | S61-125081 U | 8/1986 |
| JP | H63-120585 A | 5/1988 |
| JP | H01-129988 U | 9/1989 |
| JP | H06-081194 U | 11/1994 |
| JP | H06-81194 U | 11/1994 |
| JP | H07-312791 A | 11/1995 |
| JP | H08-237349 A | 9/1996 |
| JP | 3043585 U | 9/1997 |
| JP | 2002-515197 A | 5/2002 |
| JP | 2002-238092 A | 8/2002 |
| JP | 2003-505718 A | 2/2003 |
| JP | 2009-527134 A | 7/2009 |
| WO | 01/06298 A1 | 1/2001 |
| WO | 01/11917 A1 | 2/2001 |
| WO | 02086599 | 10/2002 |
| WO | 2005-115048 A1 | 12/2005 |
| WO | 2007/081745 A2 | 7/2007 |

OTHER PUBLICATIONS

A Patent Examination Report No. 2; issued by the Australian Government, IP Australia on Jun. 28, 2012, which corresponds to Australian Patent Application No. 2007205168 and is related to U.S. Appl. No. 13/425,955.

A Patent Examination Report No. 2; issued by the Australian Government, IP Australia on Aug. 7, 2014, which corresponds to Australian Patent Application No. 2013201164 and is related to U.S. Appl. No. 13/425,955.

An Office Action issued by the Canadian Intellectual Property Office on Jun. 7, 2010, which corresponds to Canadian Patent Application No. 2,636,159 and is related to U.S. Appl. No. 13/425,955.

A Second Office Action issued by the Canadian Intellectual Property Office on May 16, 2012, which corresponds to Canadian Patent Application No. 2,636,159 and is related to U.S. Appl. No. 13/425,955.

A Third Office Action issued by the Canadian Intellectual Property Office on Apr. 10, 2013, which corresponds to Canadian Patent Application No. 2,636,159 and is related to U.S. Appl. No. 13/425,955.

A "Communication pursuant to Article 94(3) EPC," issued by the European Patent Office on Nov. 19, 2012, which corresponds to European Patent Application No. 07 717 926.5-2217 and is related to U.S. Appl. No. 13/425,955.

English translation of a Notification of Reasons for Rejection; issued by the Japanese Patent Office on Feb. 13, 2012, which corresponds to Japanese Patent Application No. 2008-549558 and is related to U.S. Appl. No. 13/425,955.

An English translation of an Office Action; "Notification of Reasons for Rejection," issued by the Japanese Patent Office; which corresponds to Japanese Patent Application 2013-016822 and is related to U.S. Appl. No. 13/425,955.

International Search Report and Written Opinion; PCT/US2007/000177; Feb. 20, 2008.

* cited by examiner

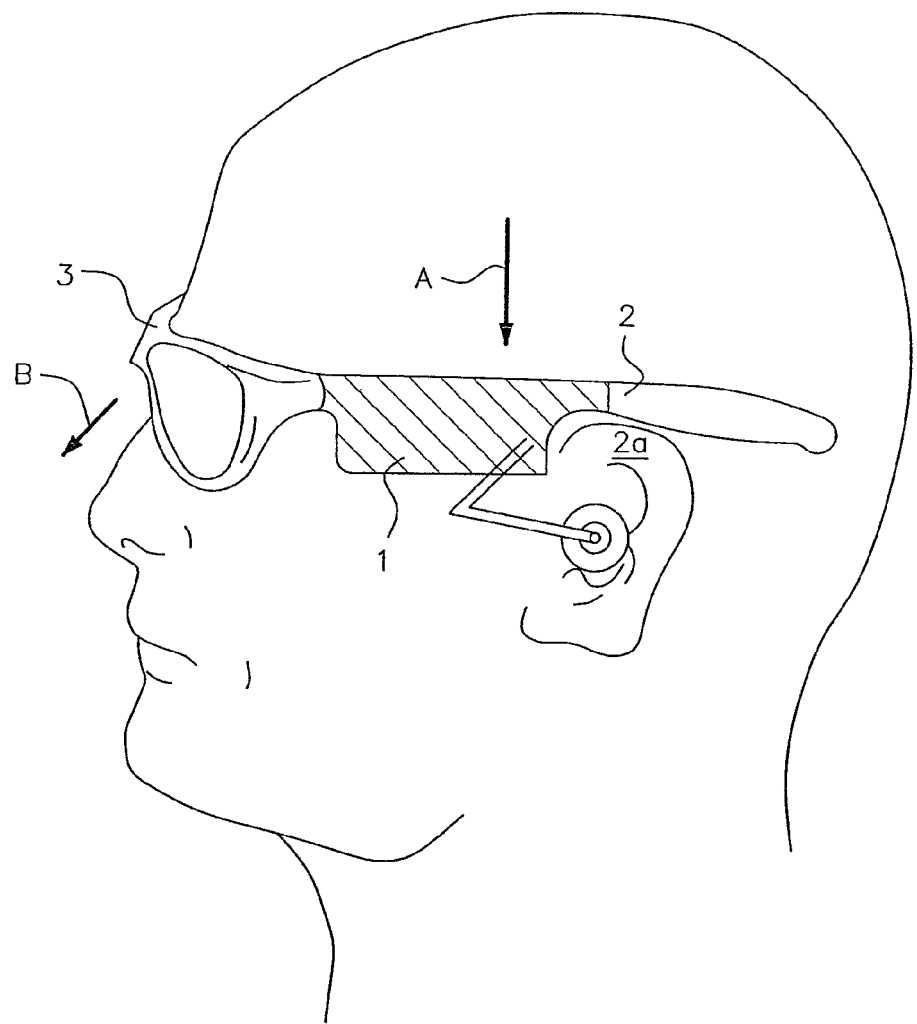

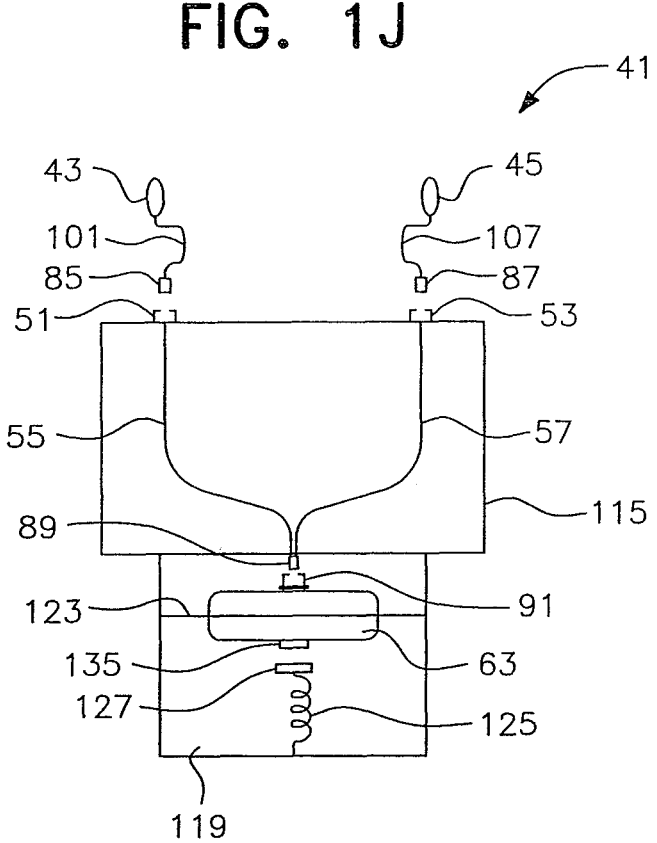

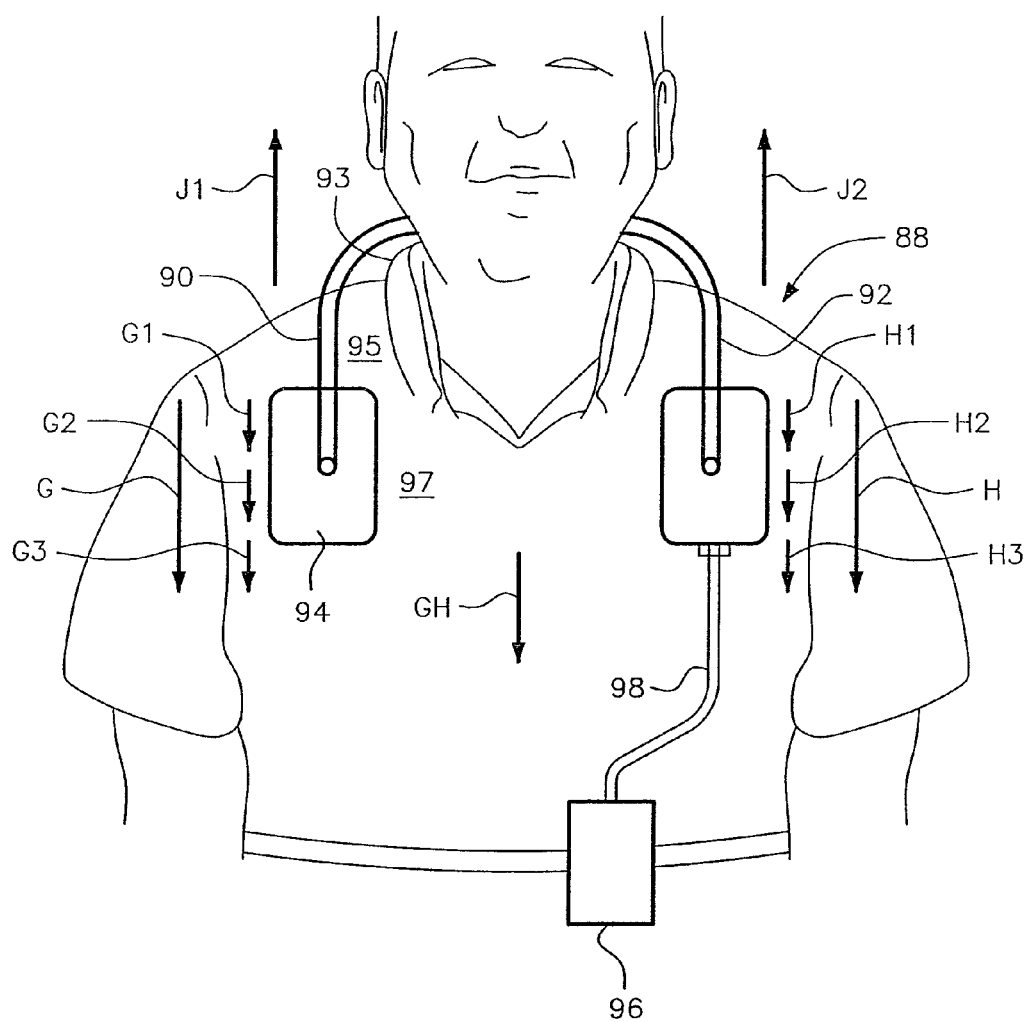

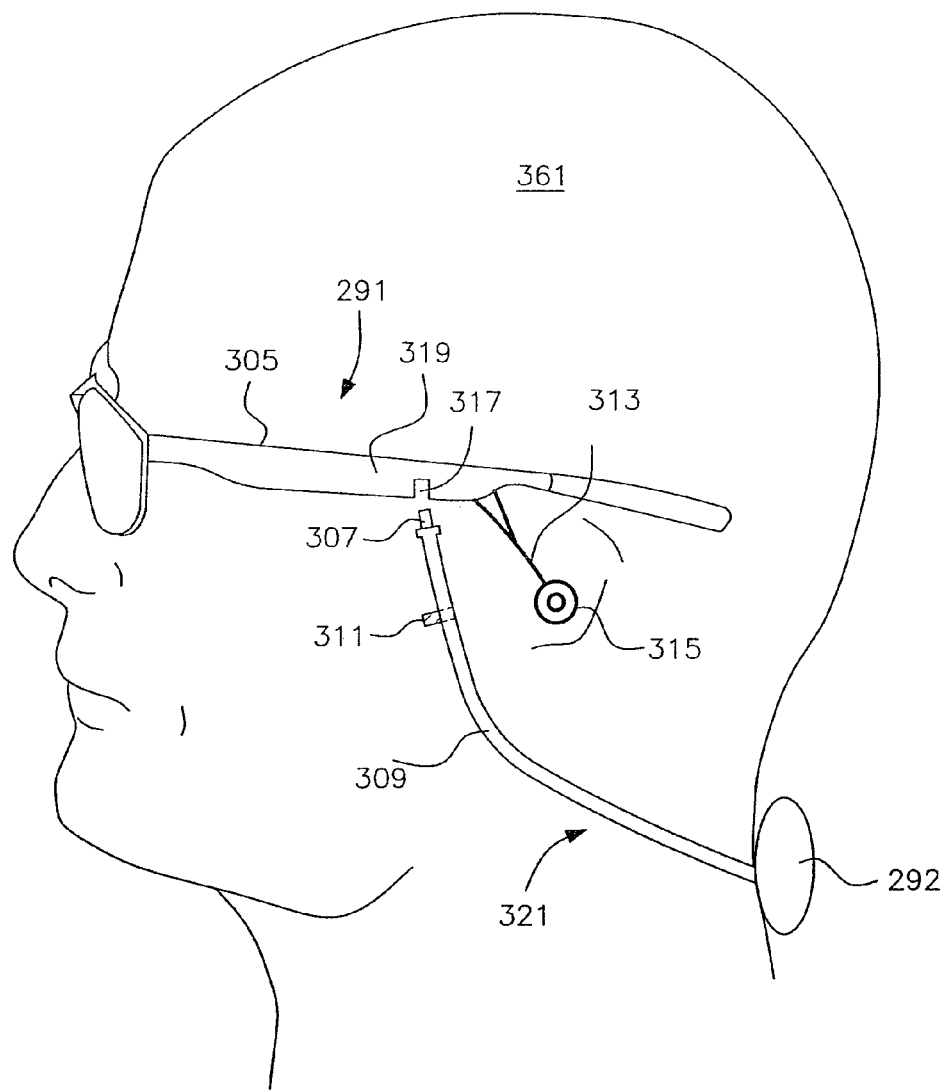

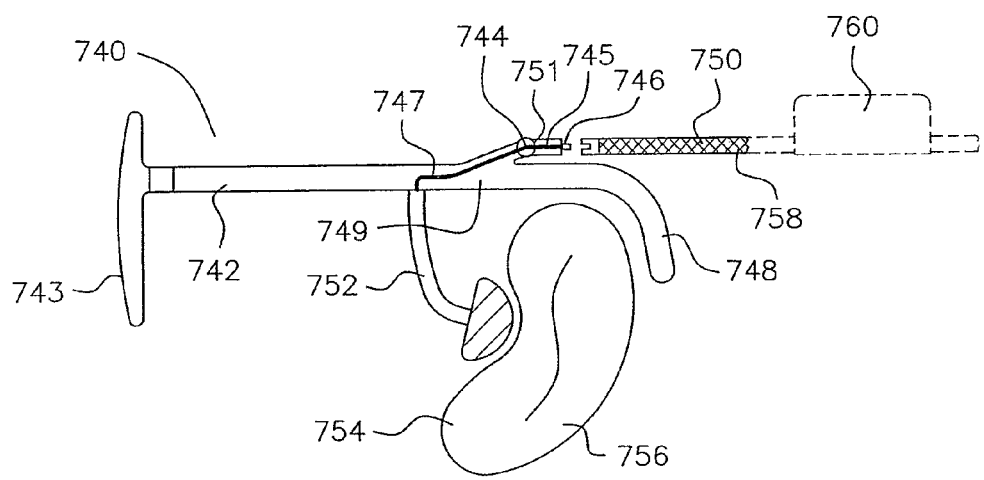
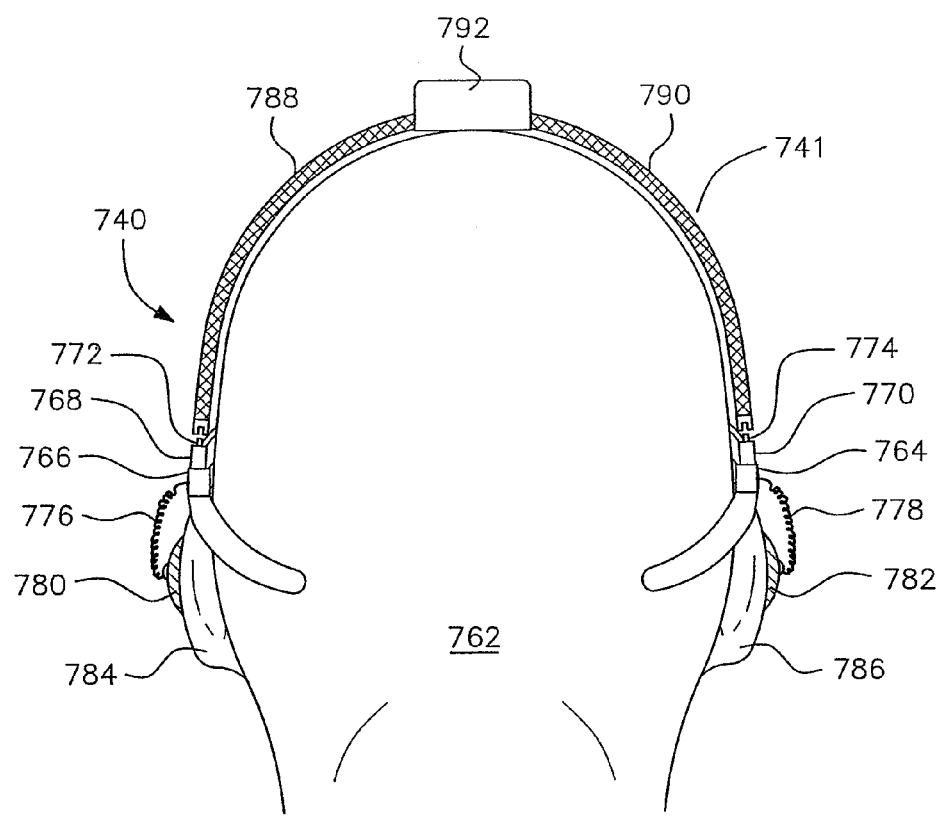

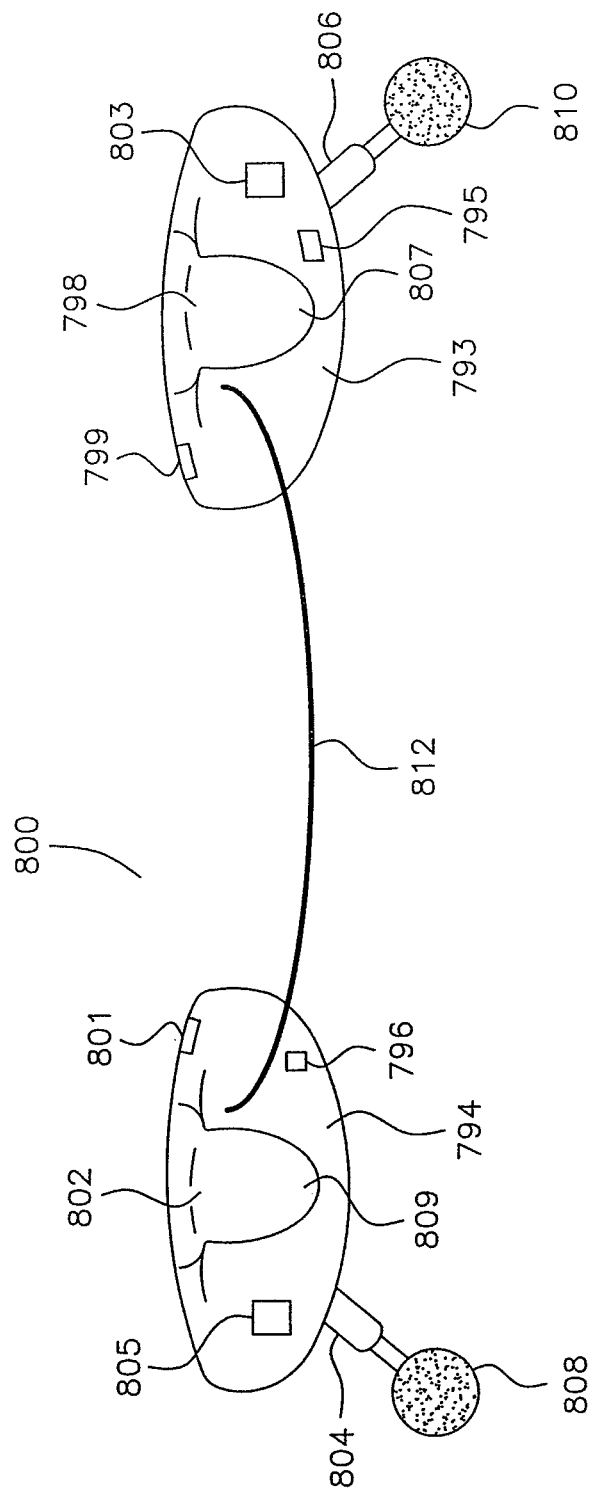

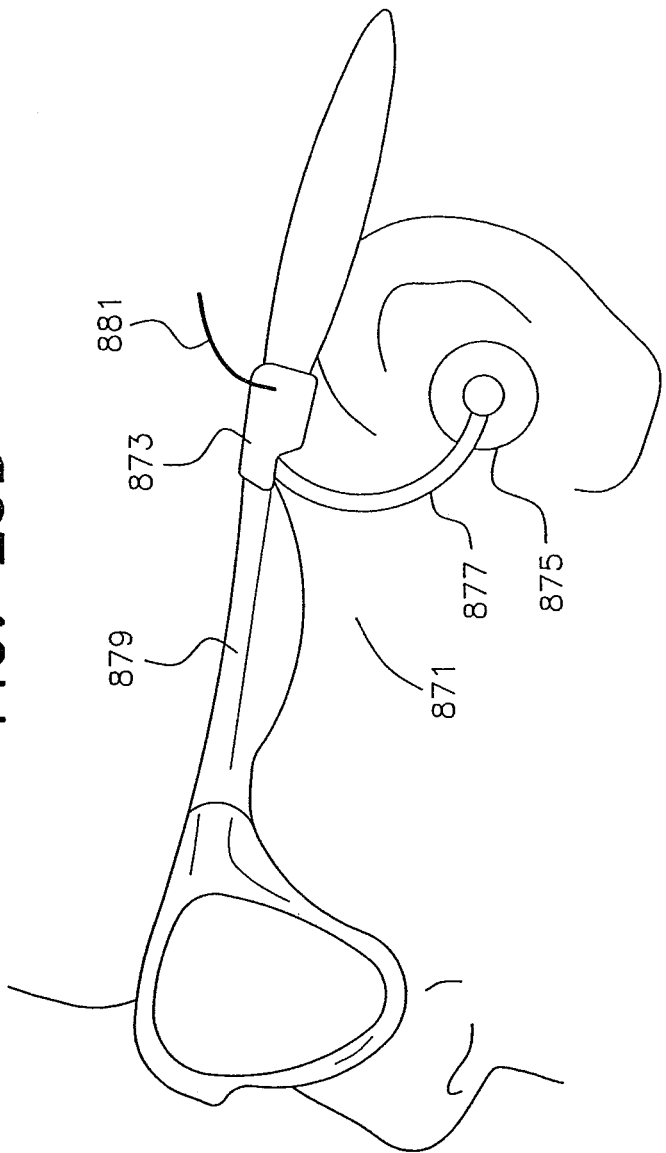

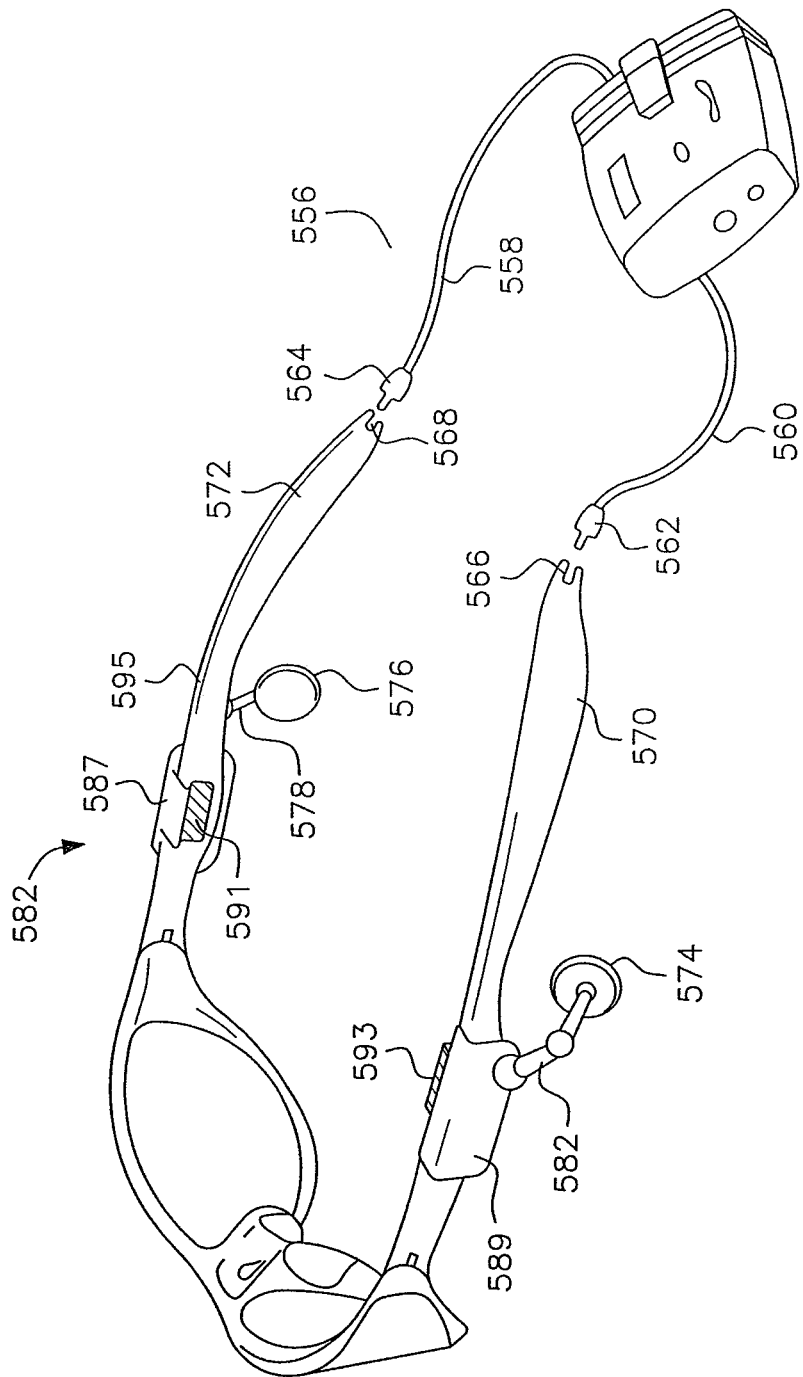

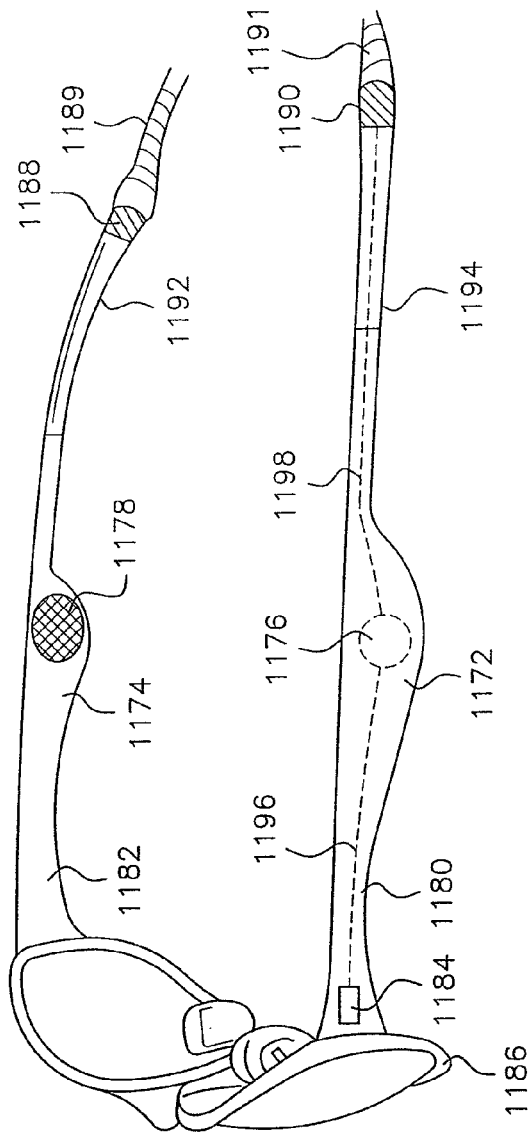
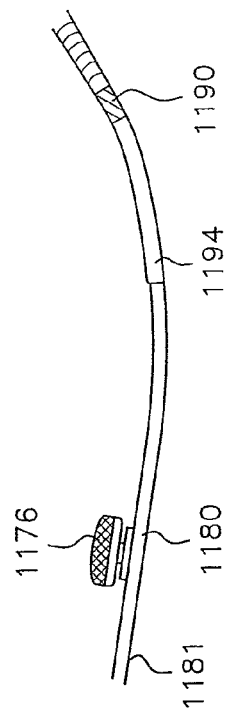
FIG. 32
FIG. 32A

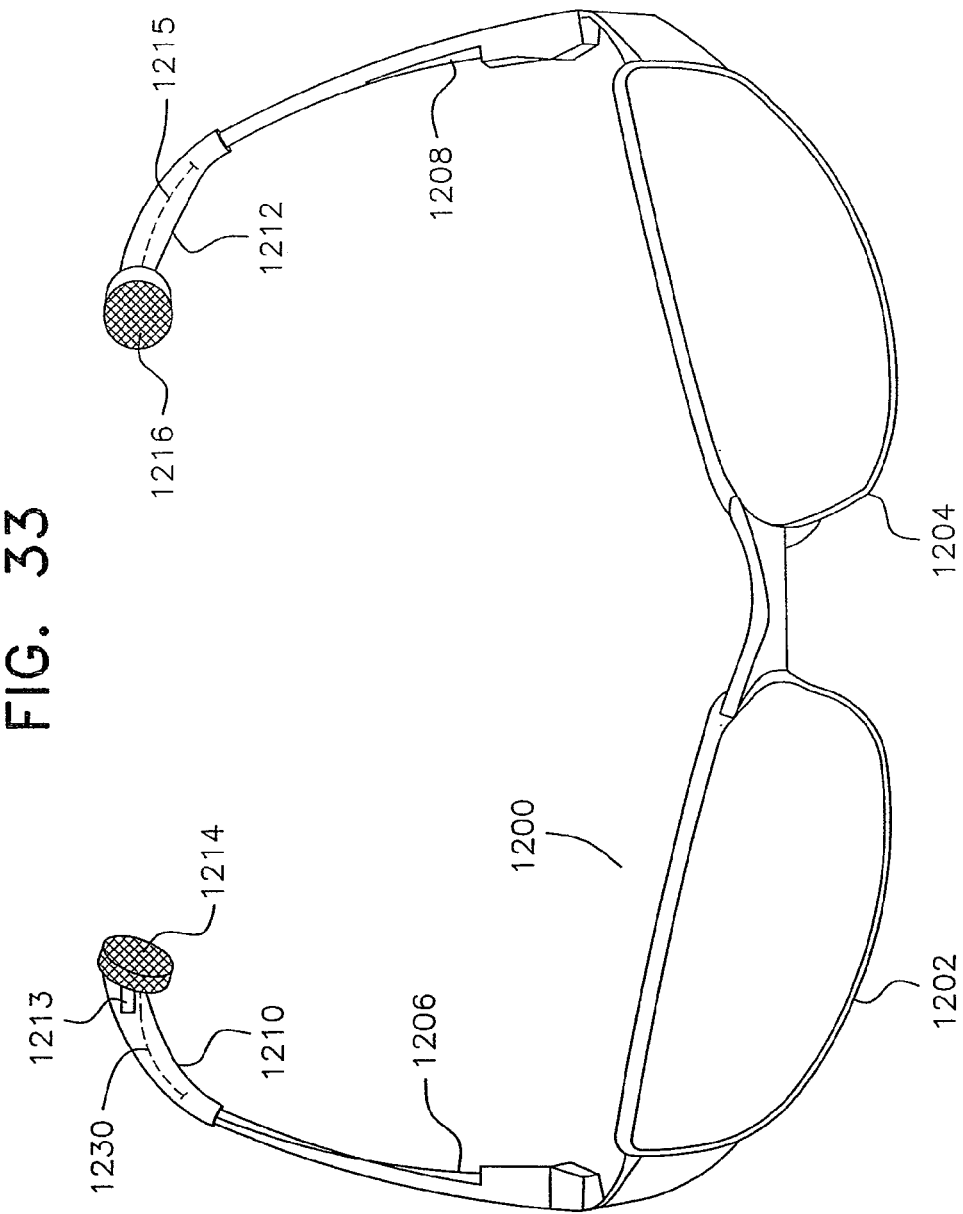

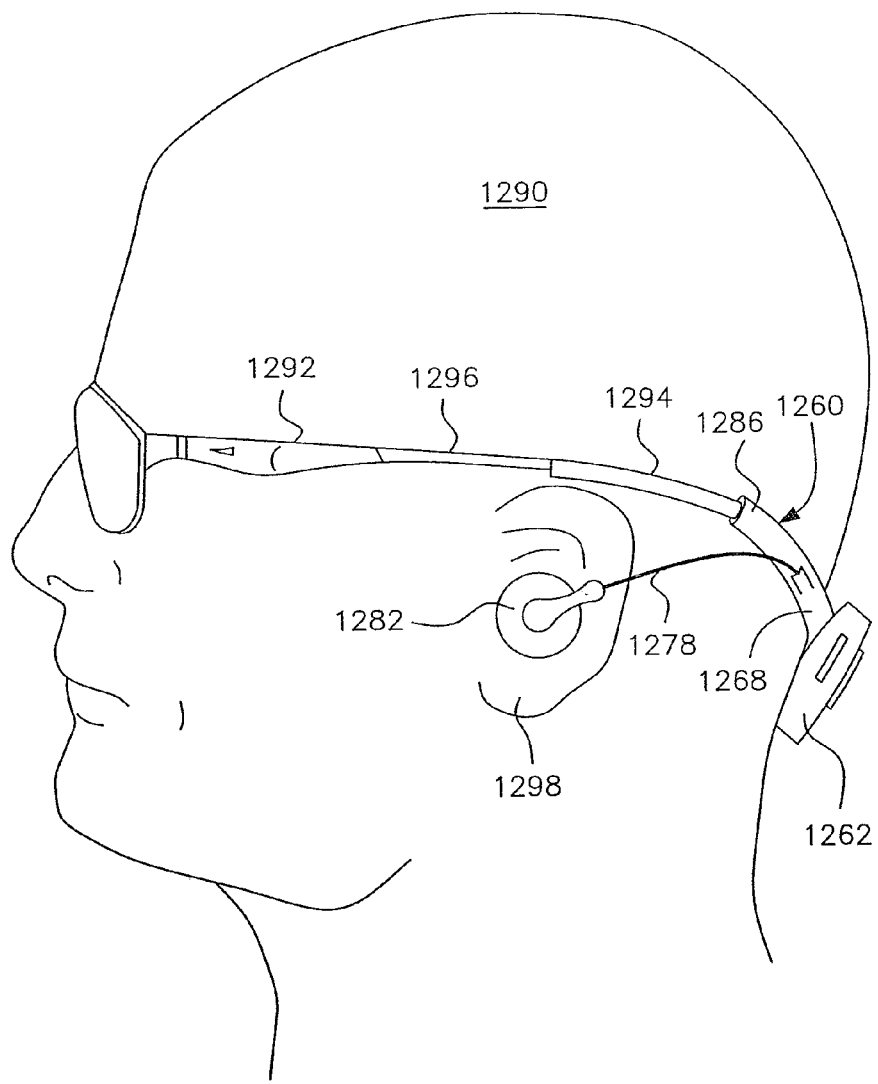

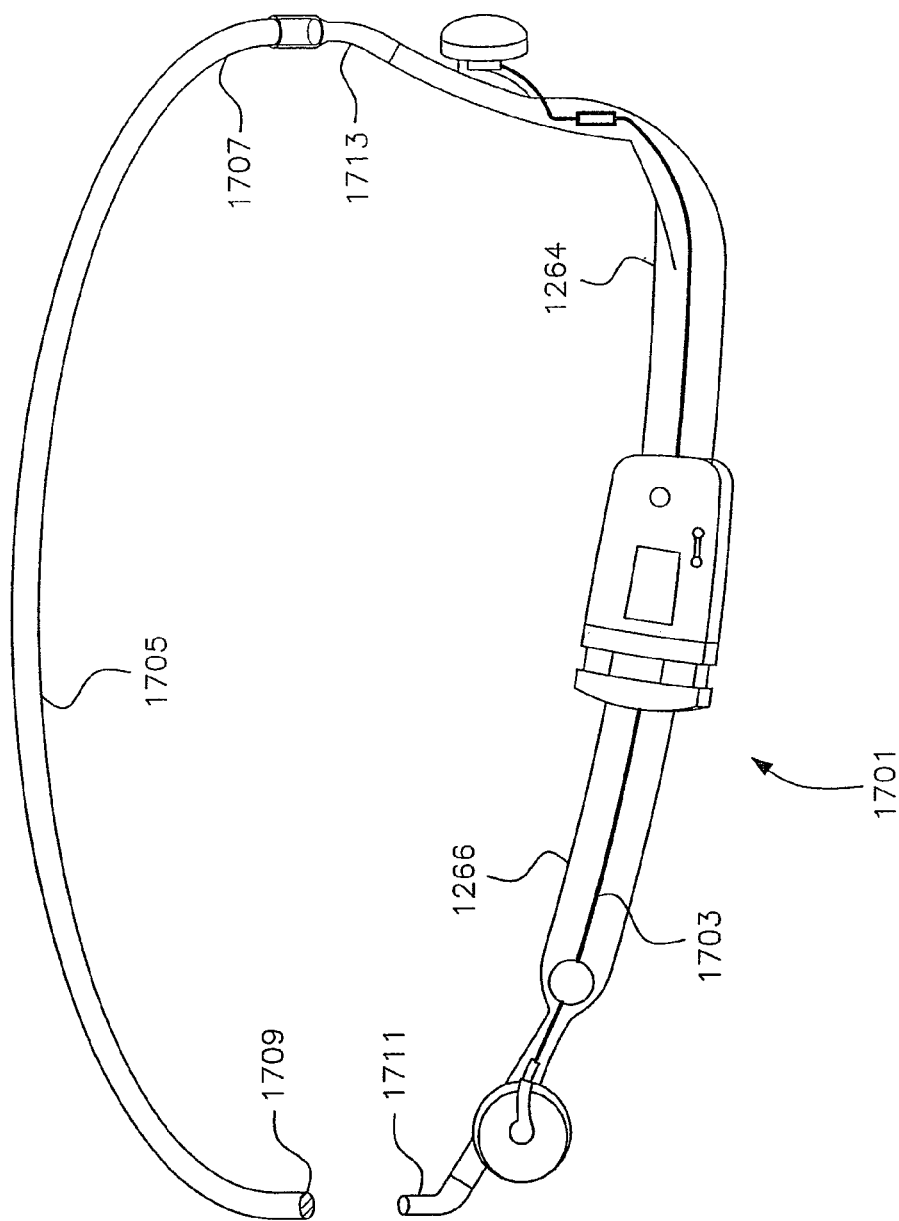

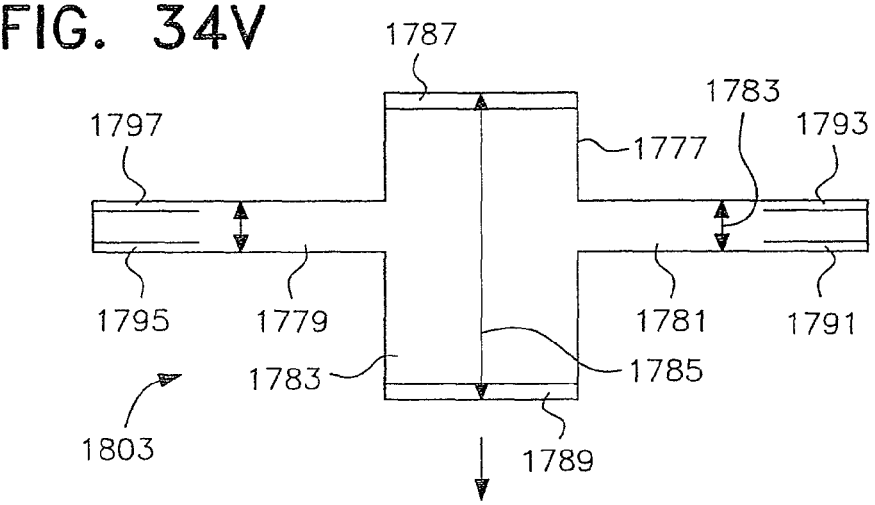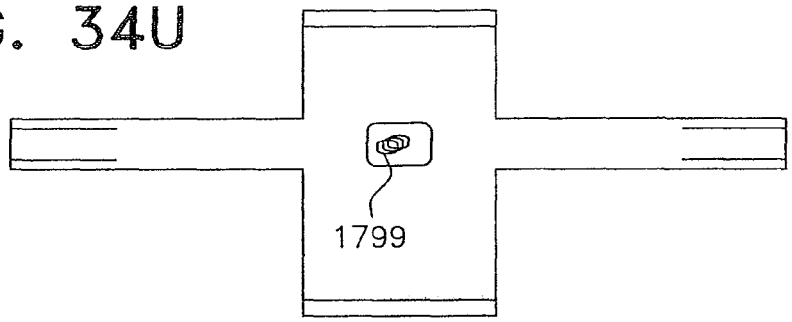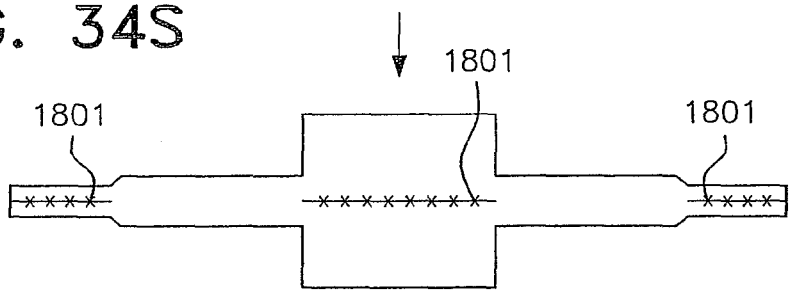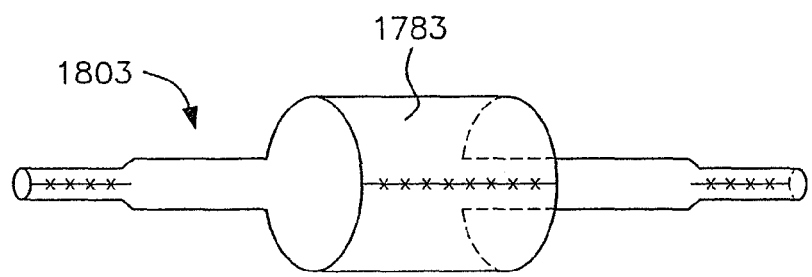

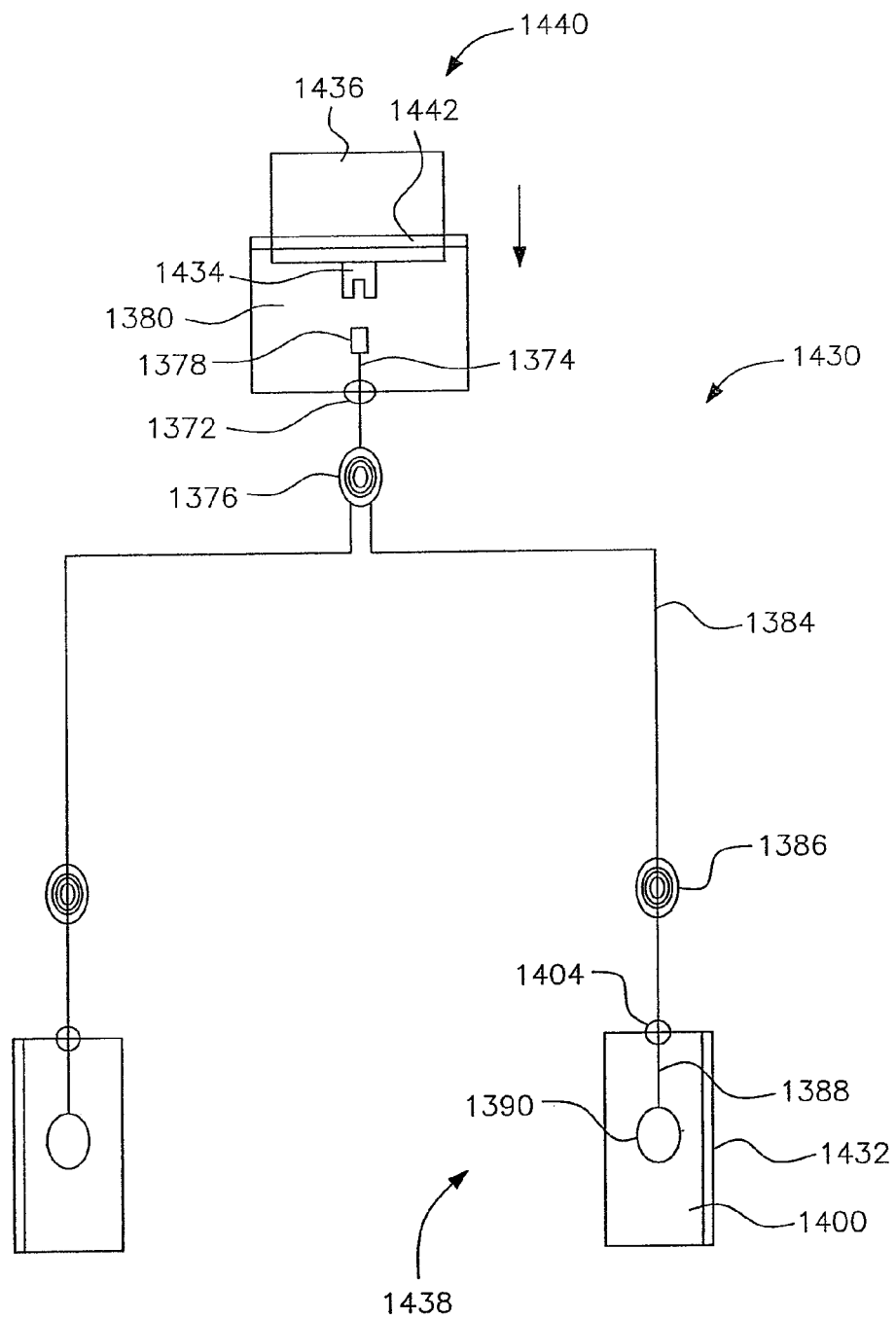

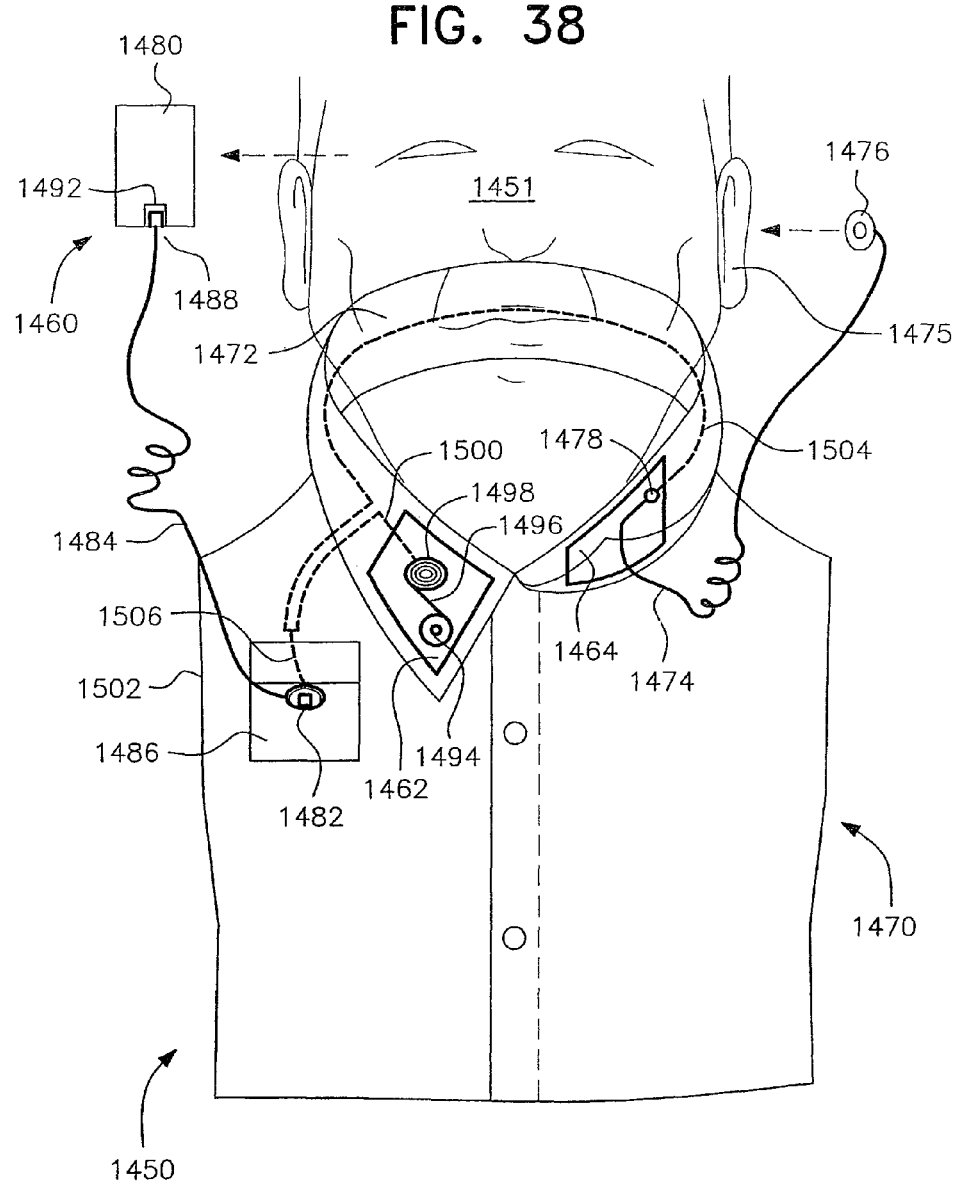

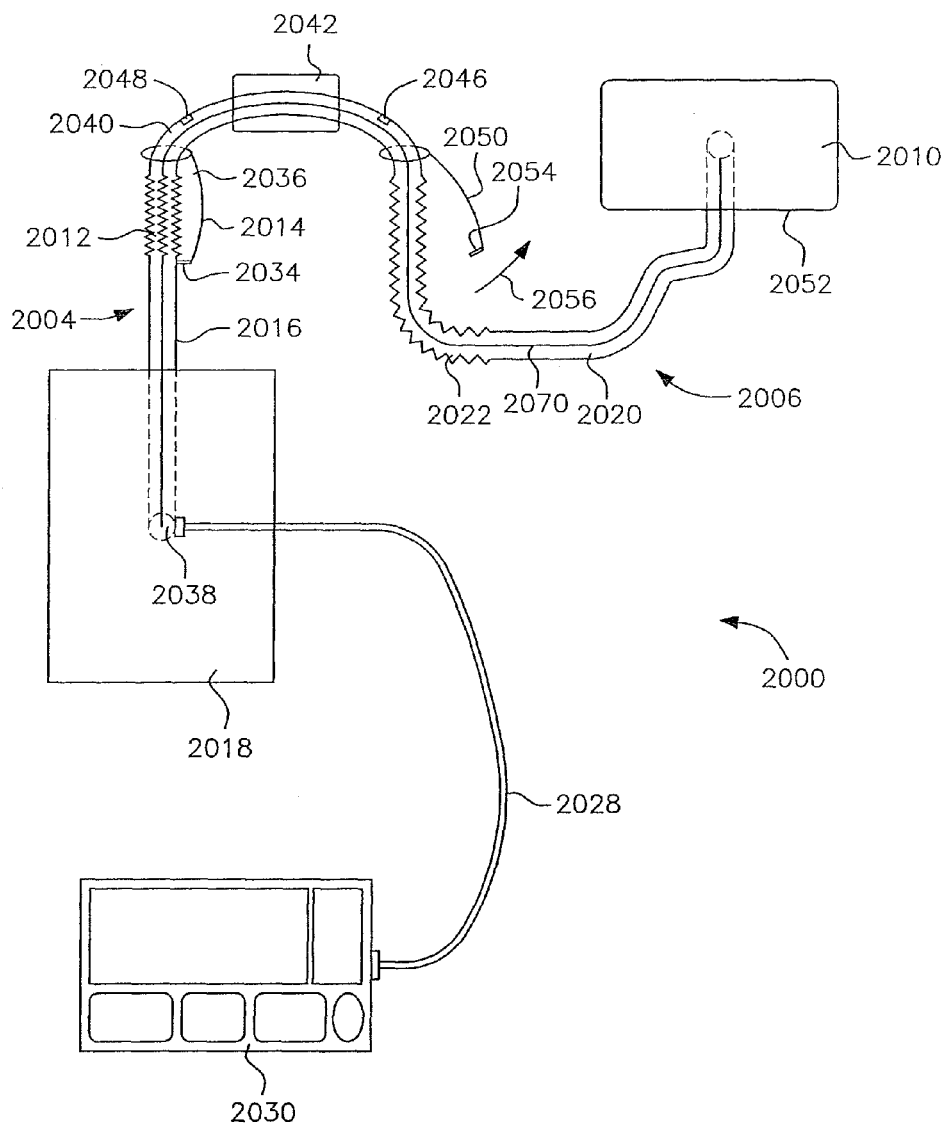

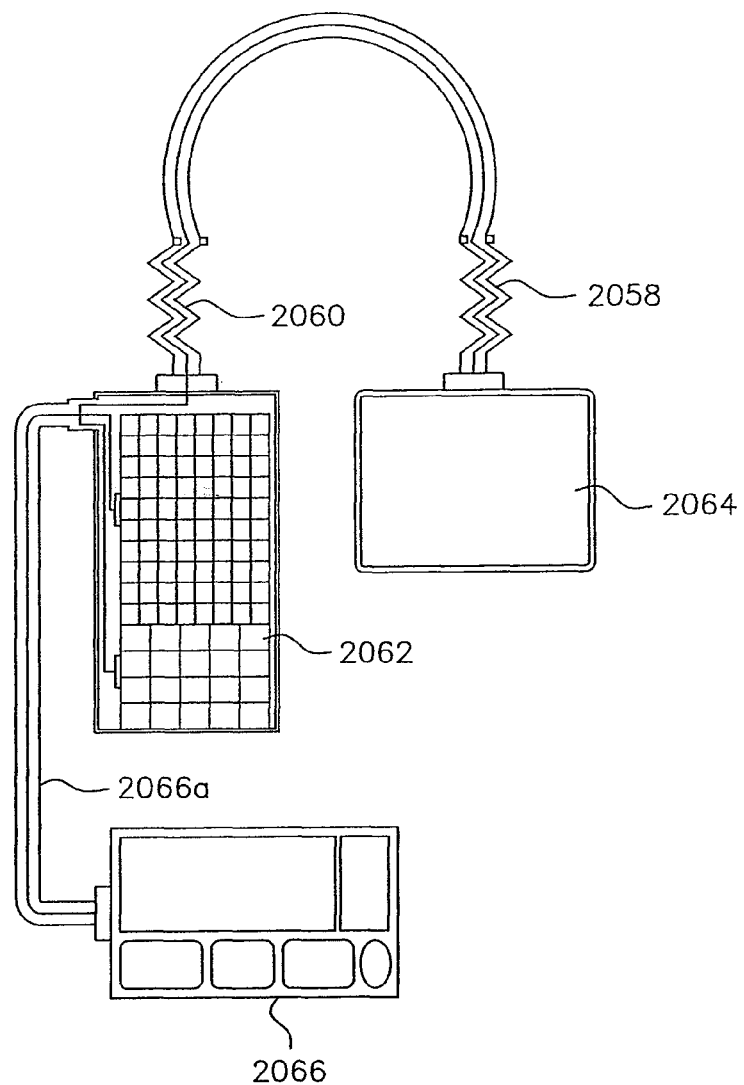

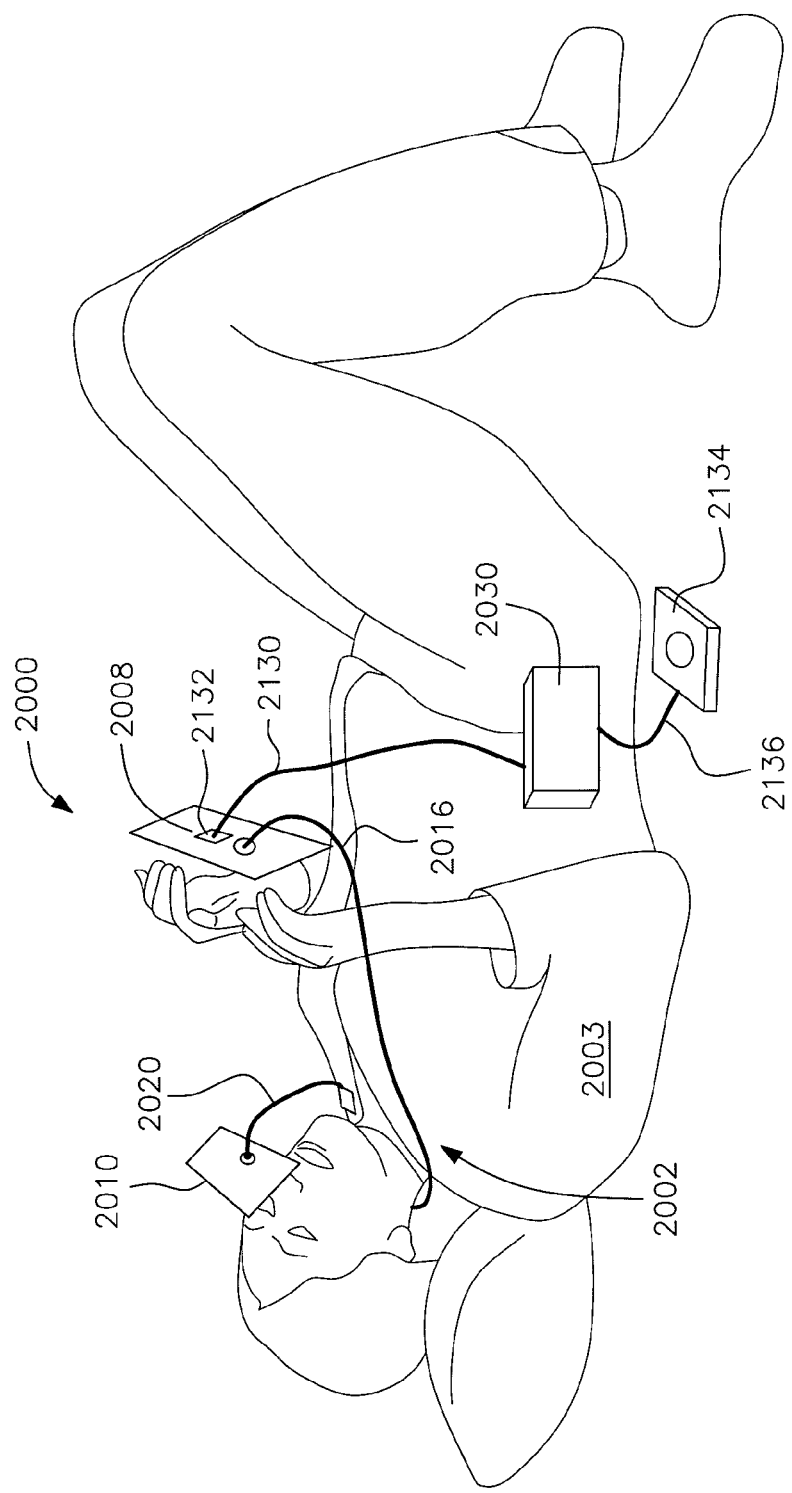

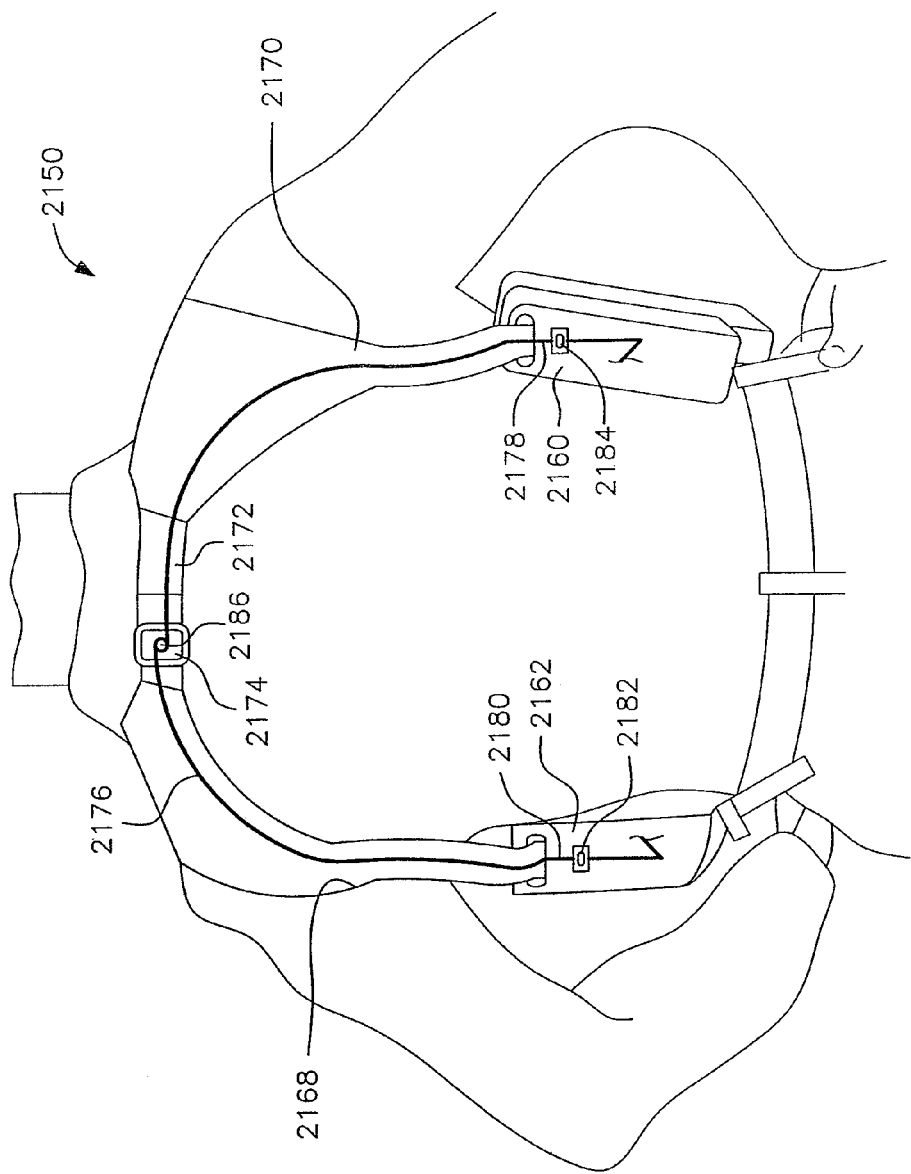

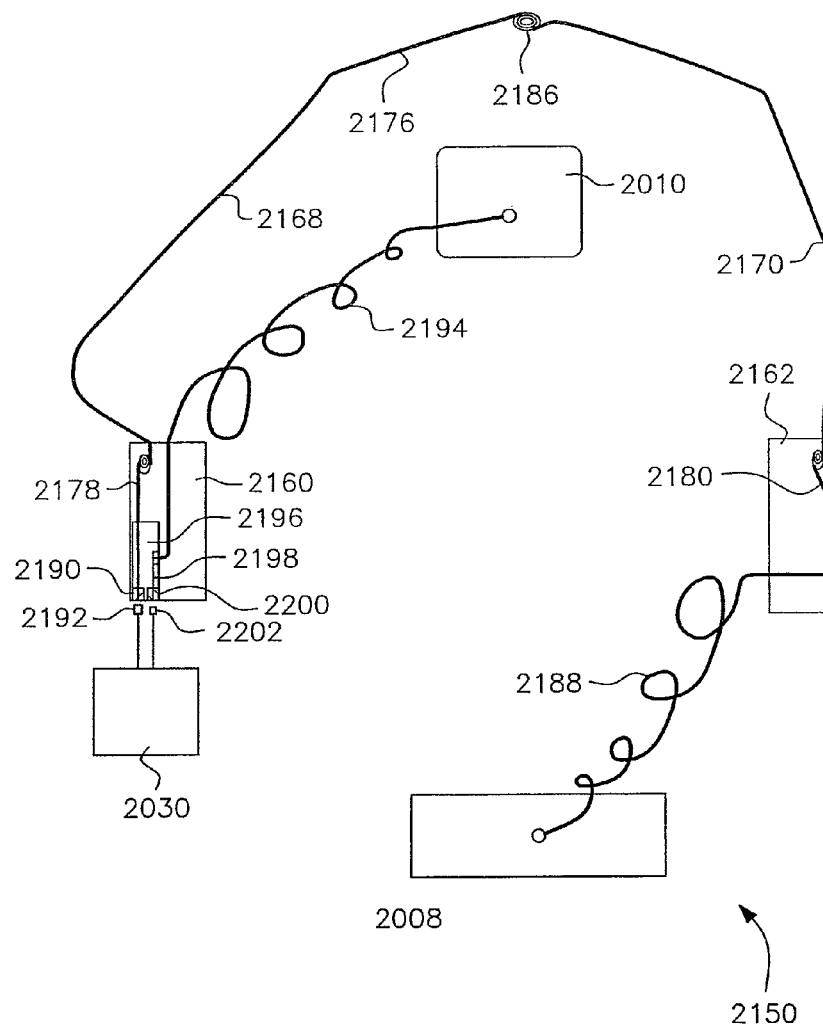

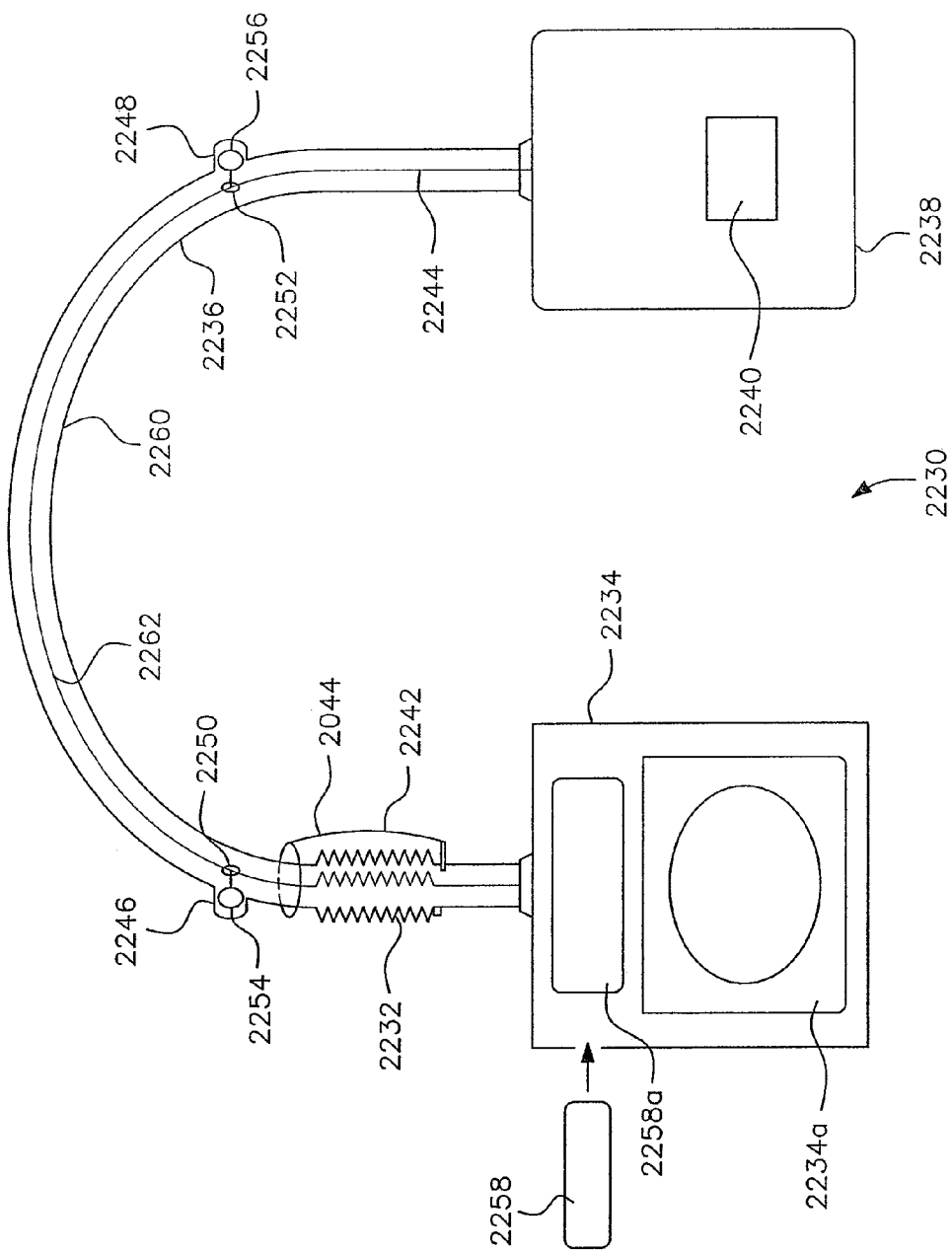

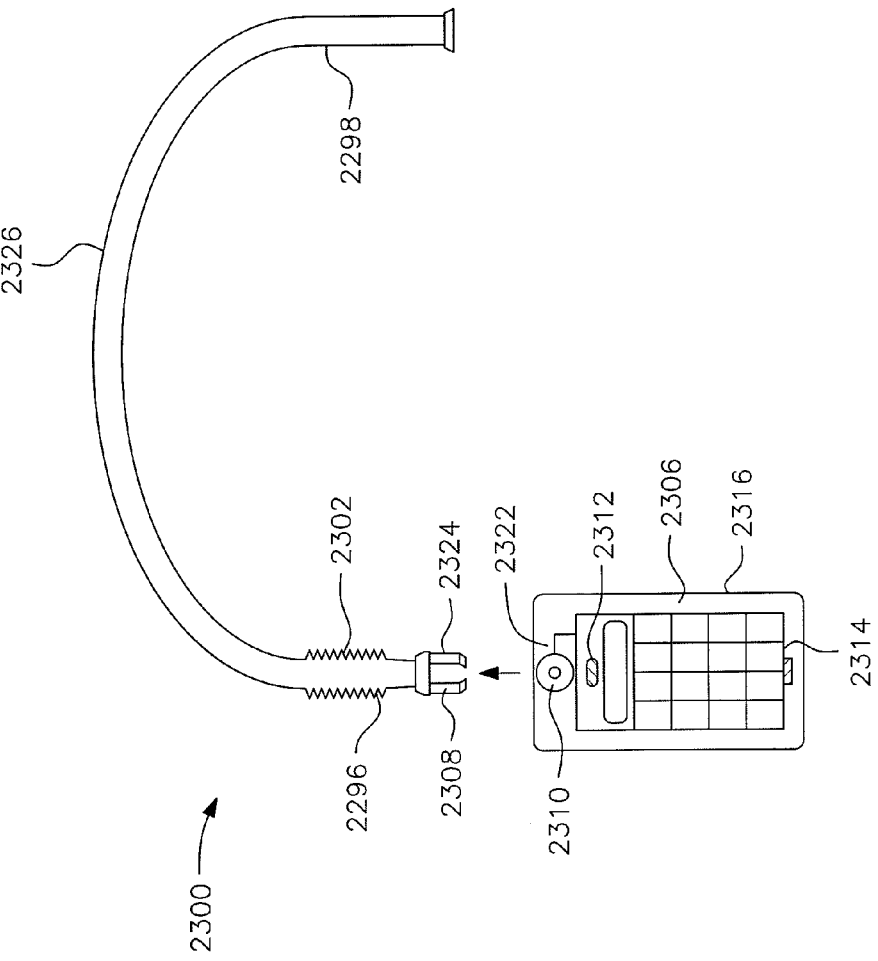

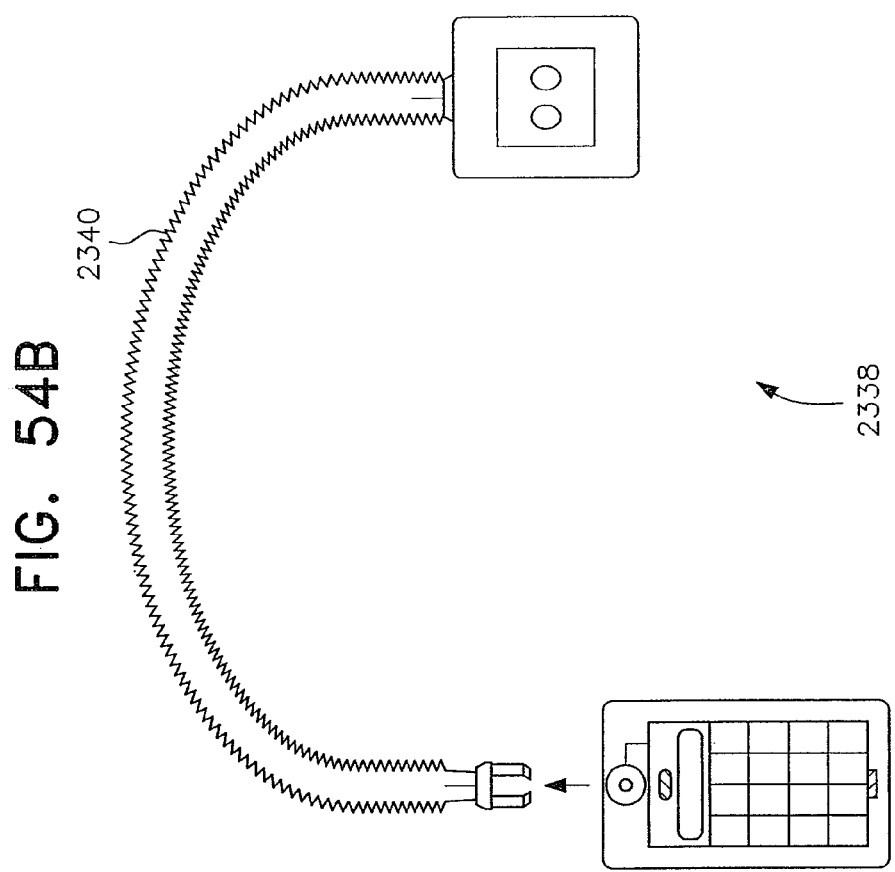

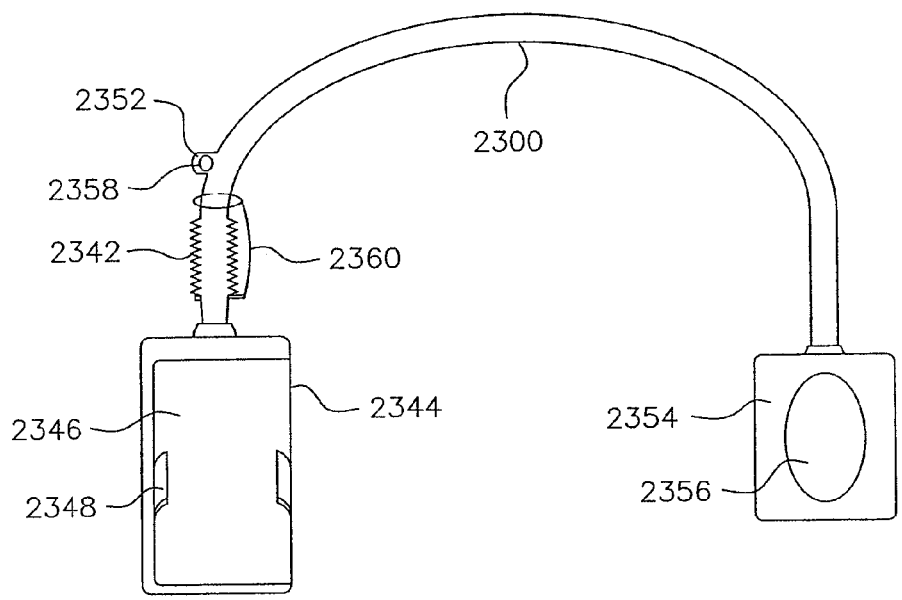
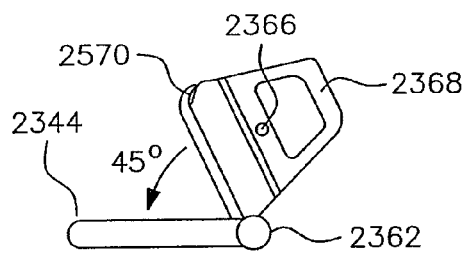
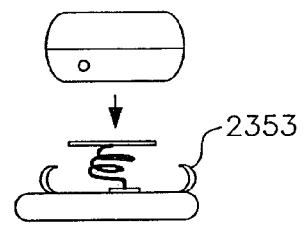

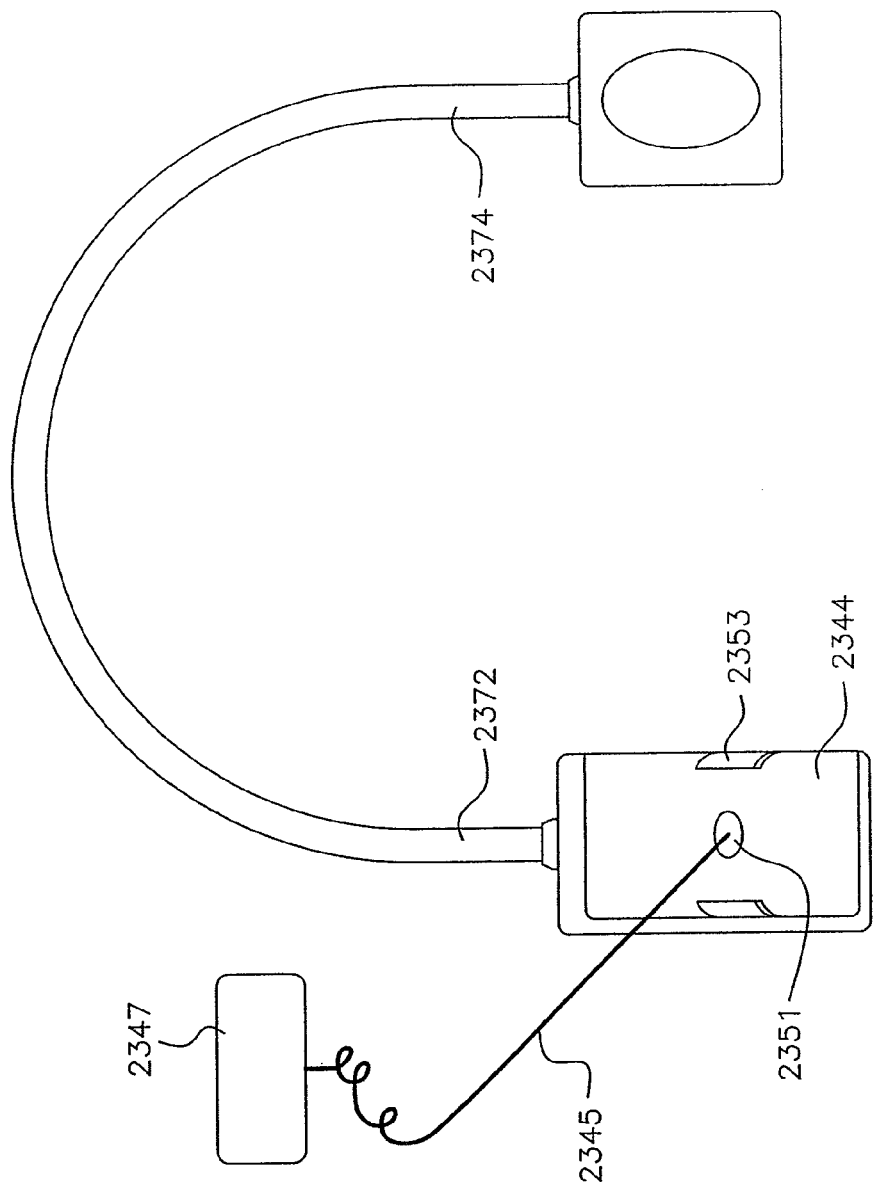

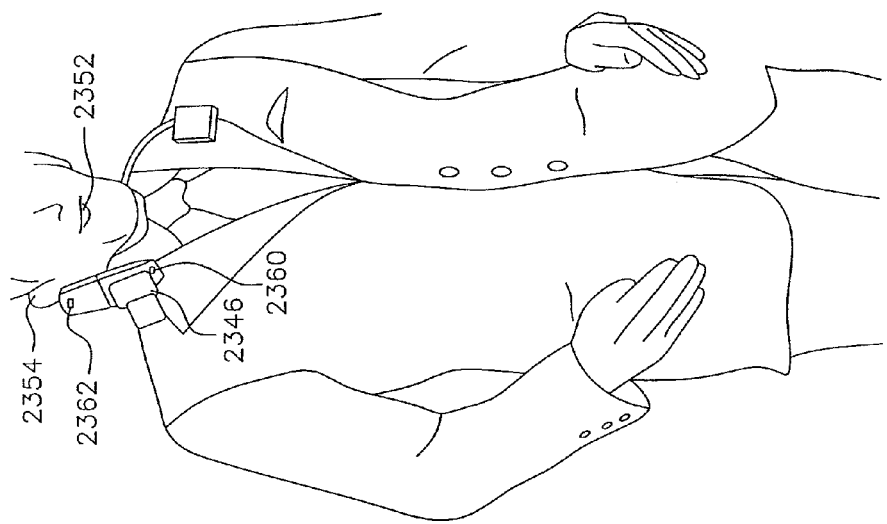
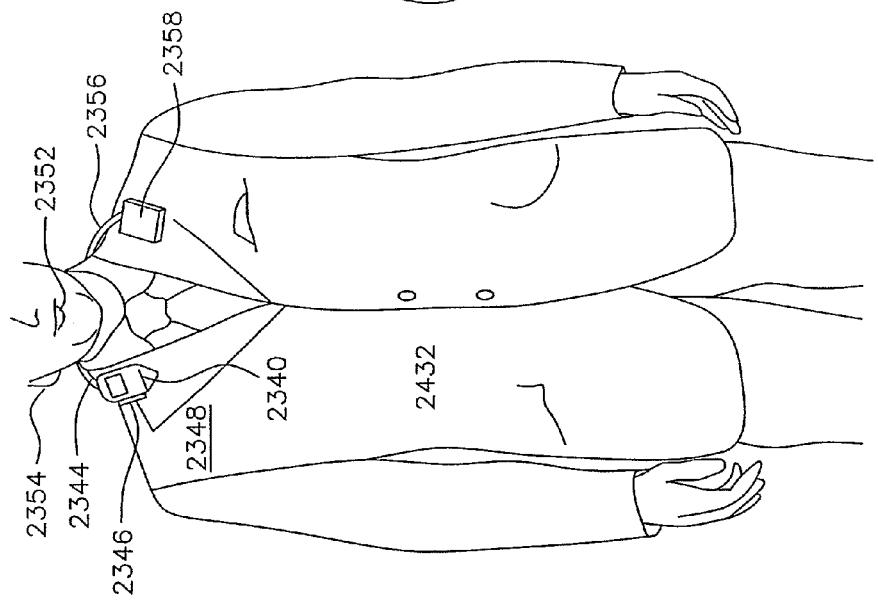
FIG. 57A
FIG. 57B

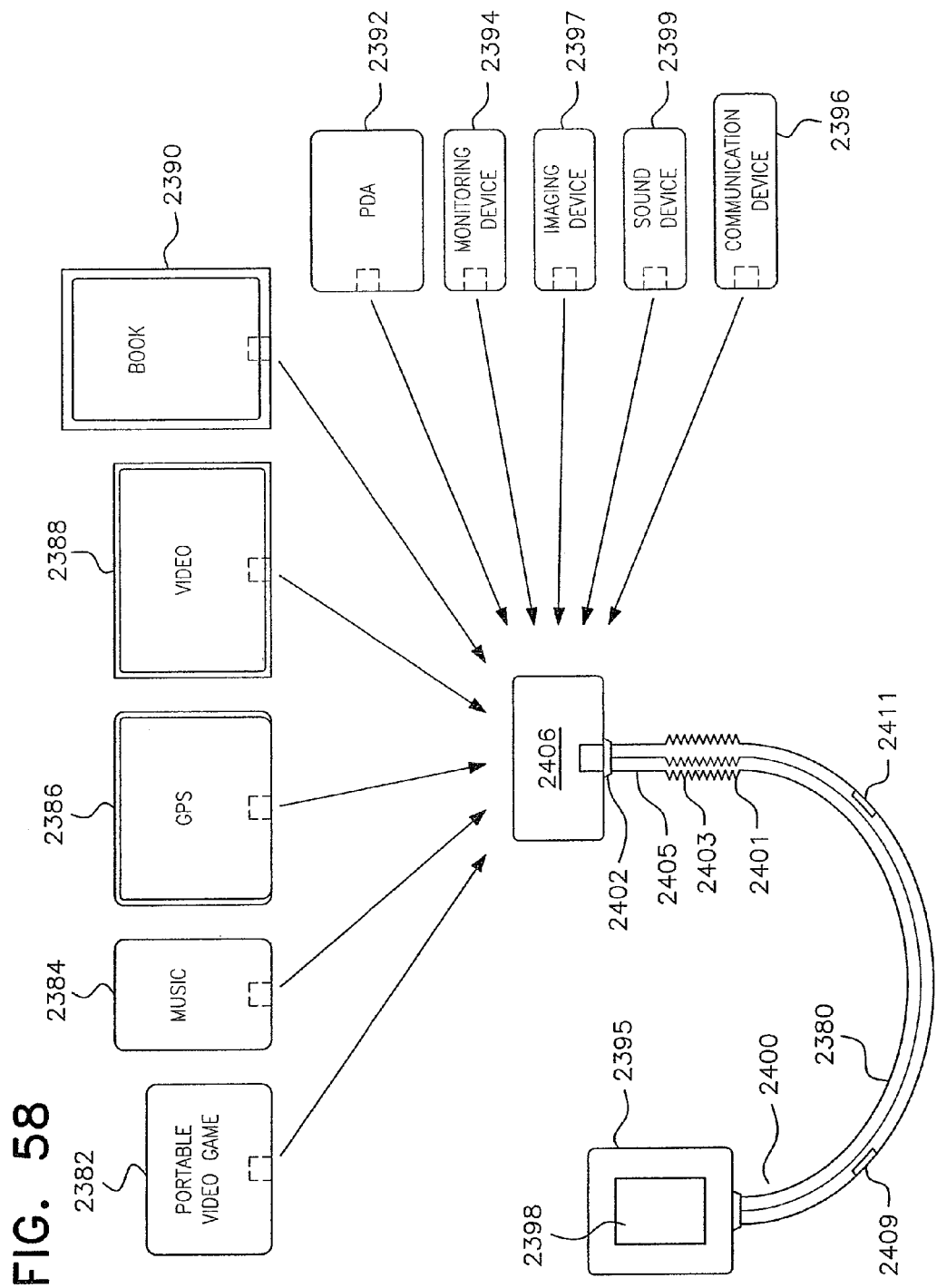

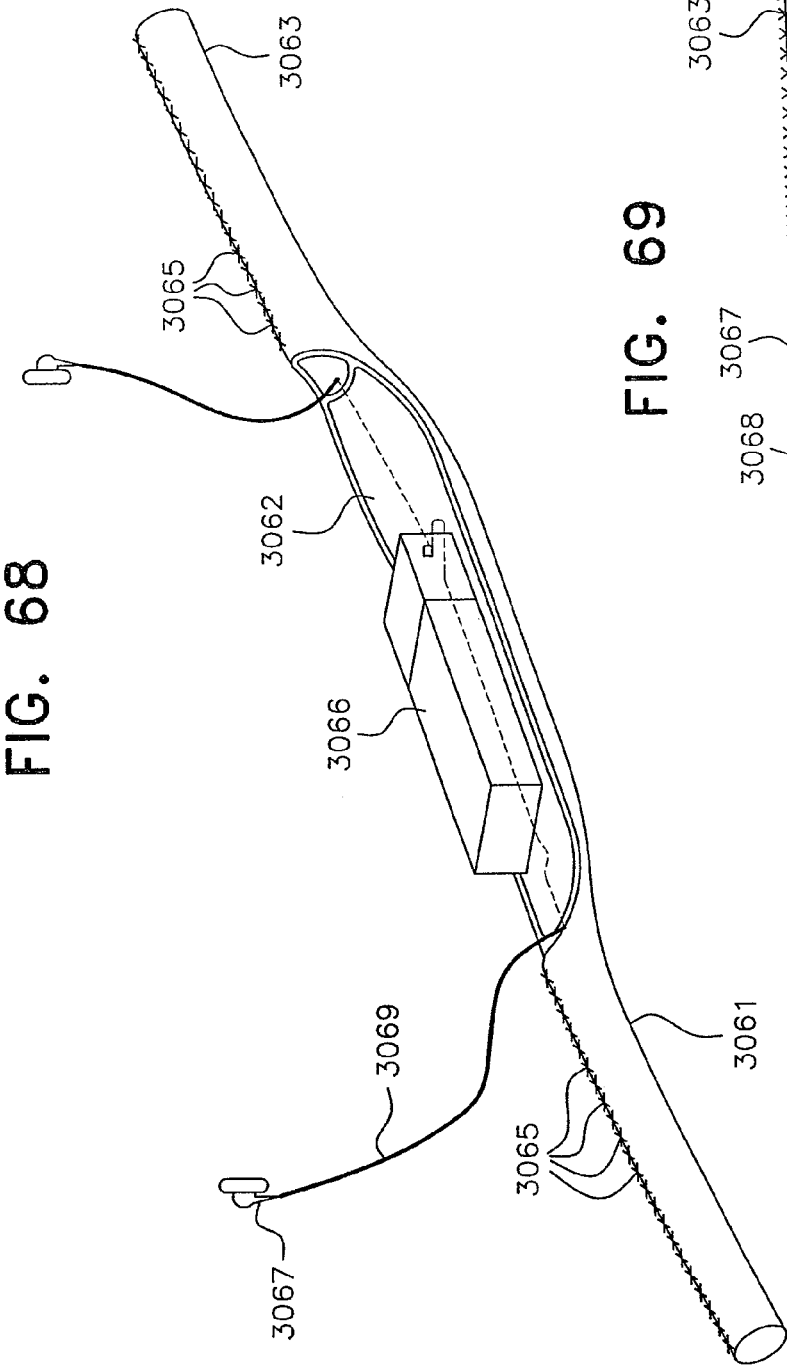
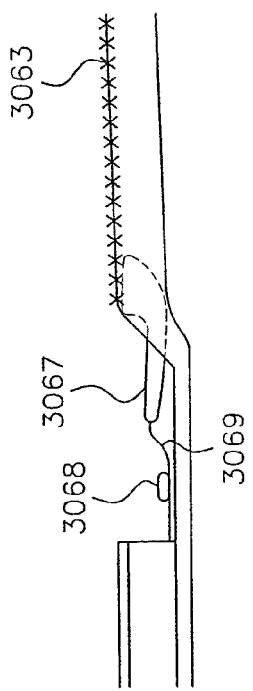

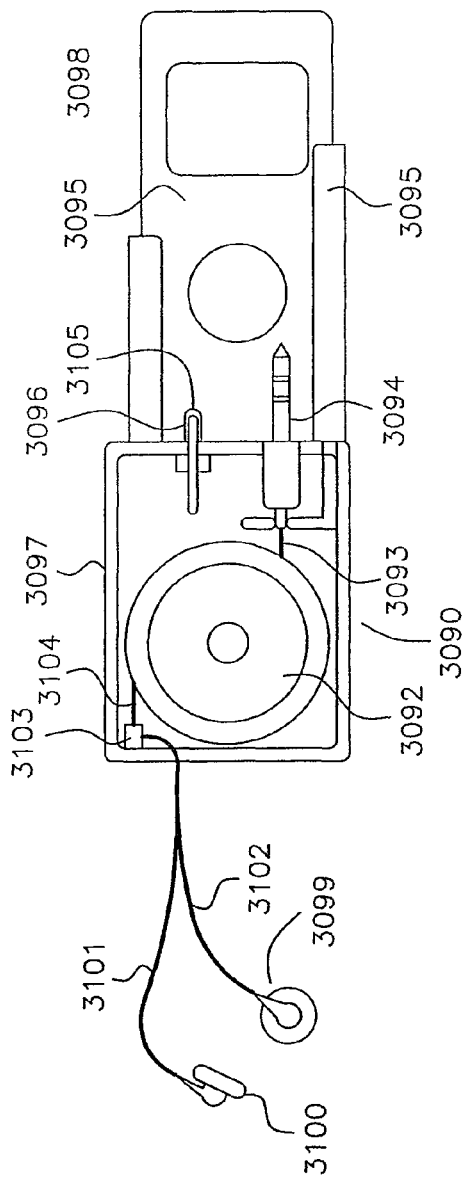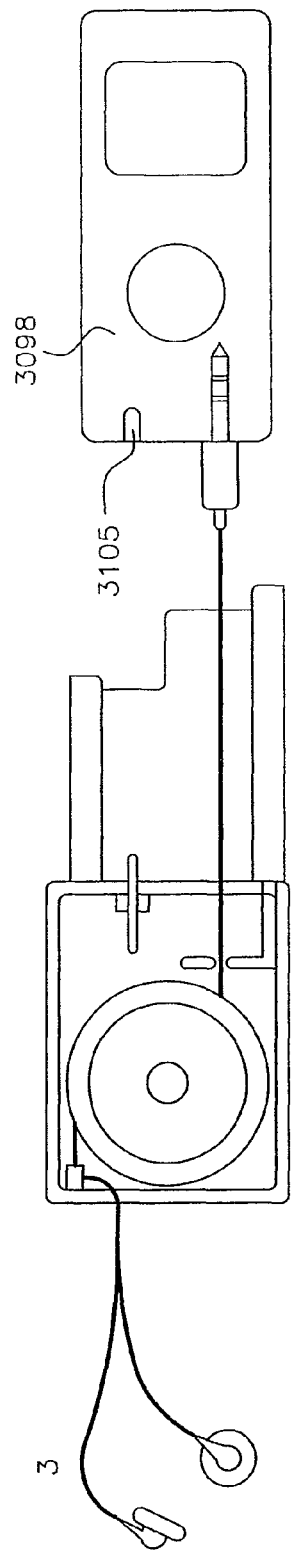
FIG. 73A
FIG. 73B

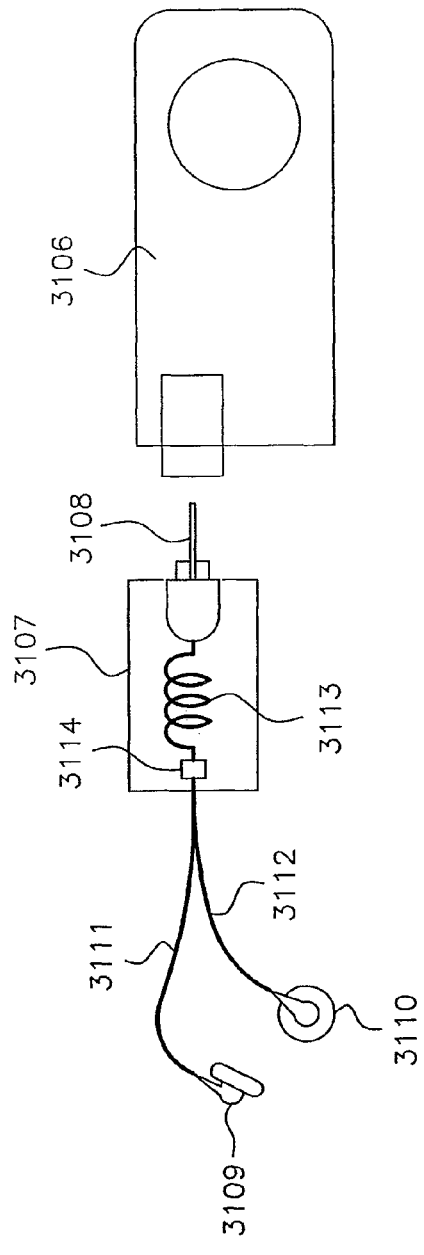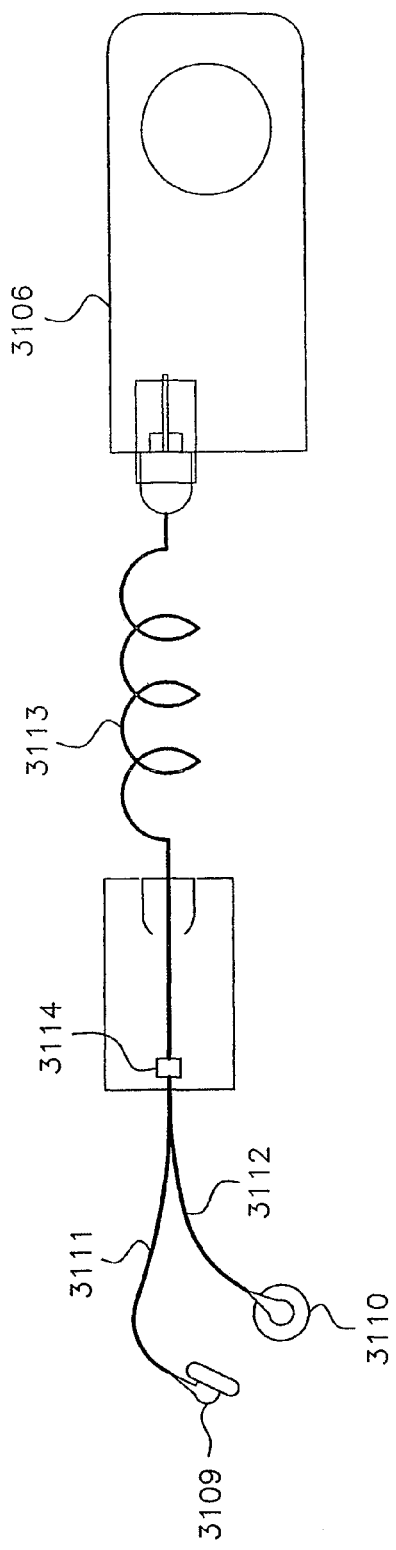

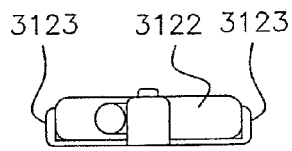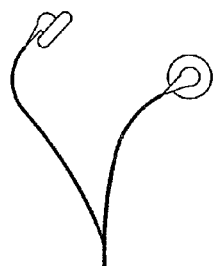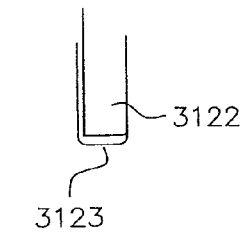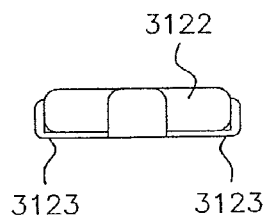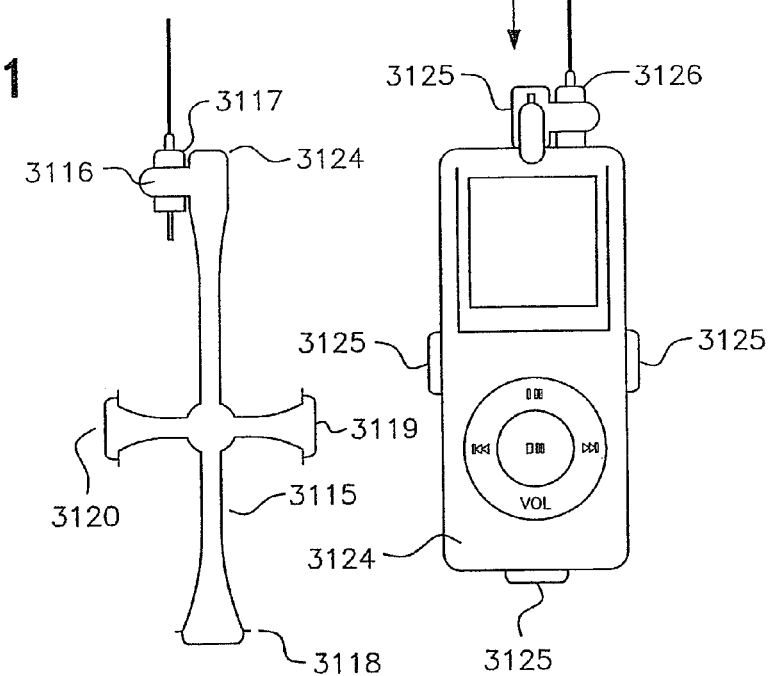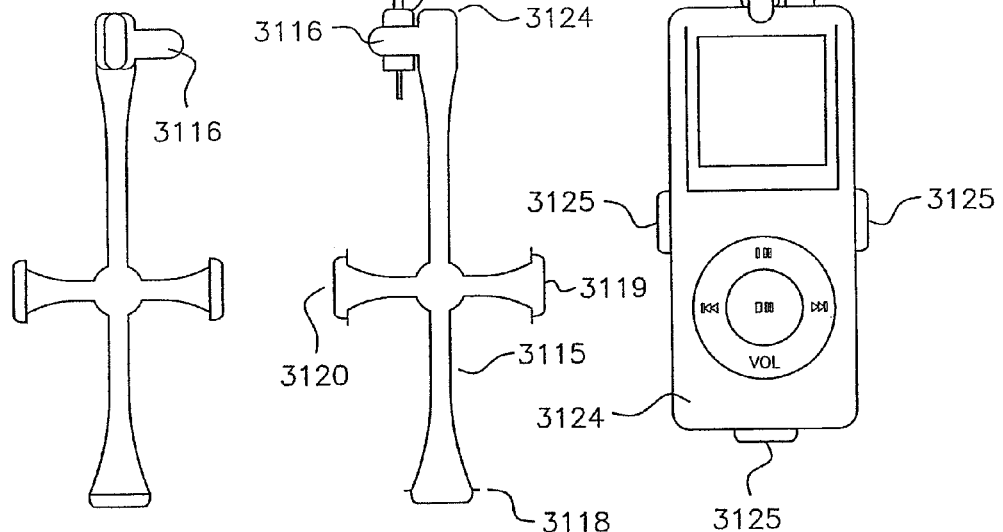

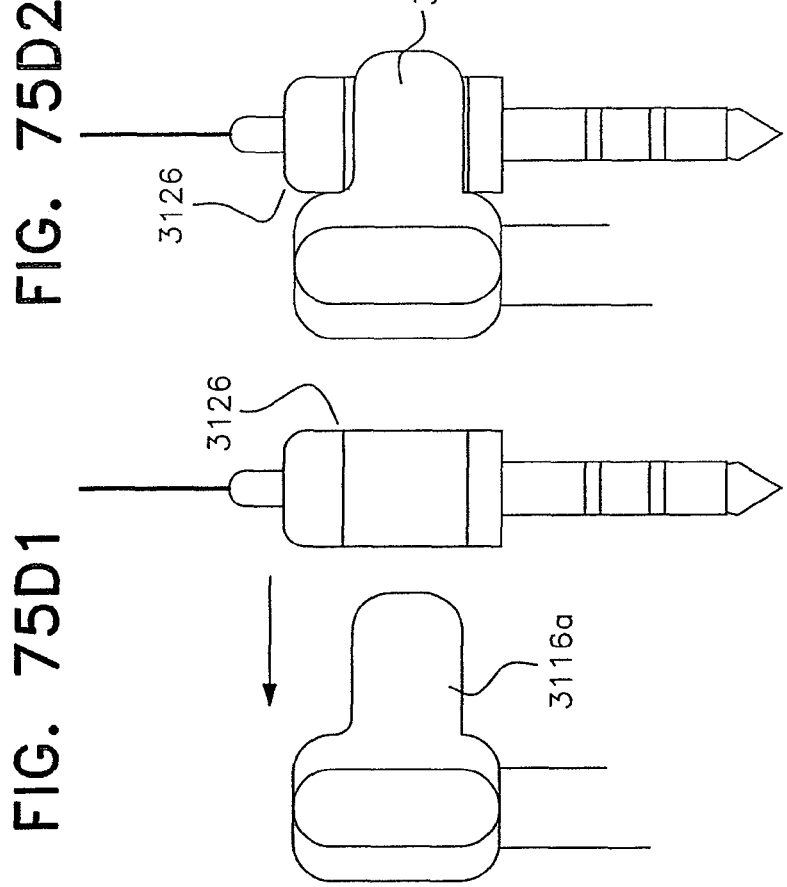

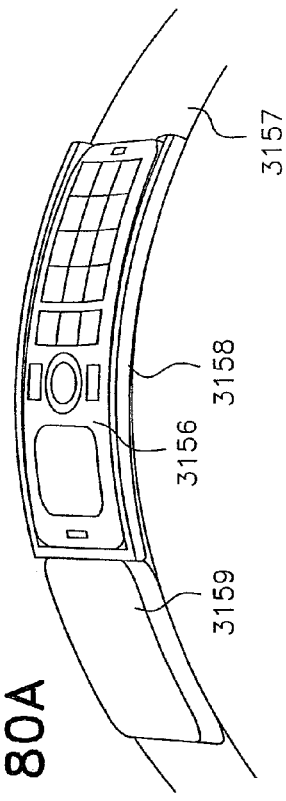
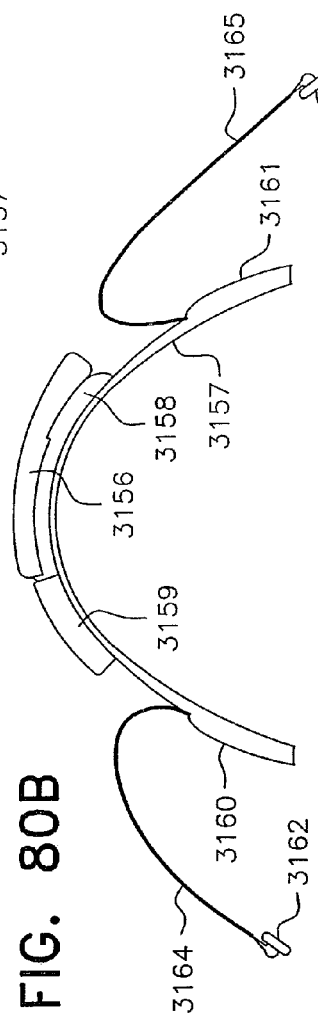
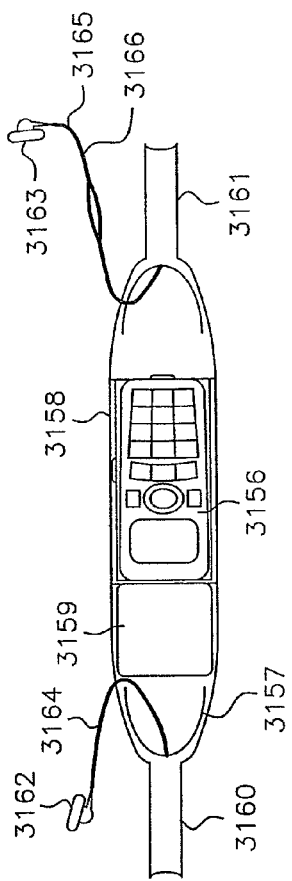
FIG. 80A
FIG. 80B
FIG. 80C

FIG. 81E
FIG. 81F
FIG. 81D
FIG. 81C
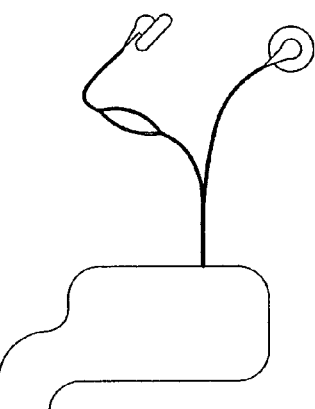
FIG. 81A
FIG. 81B
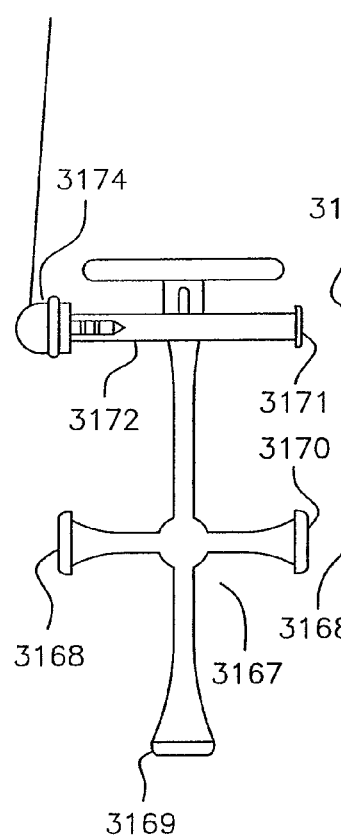
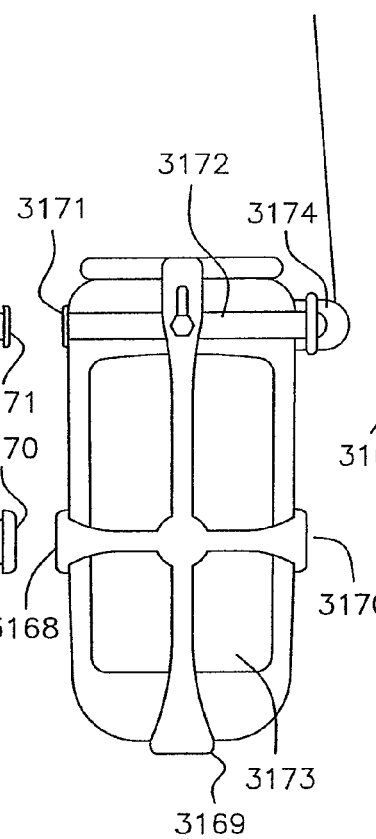
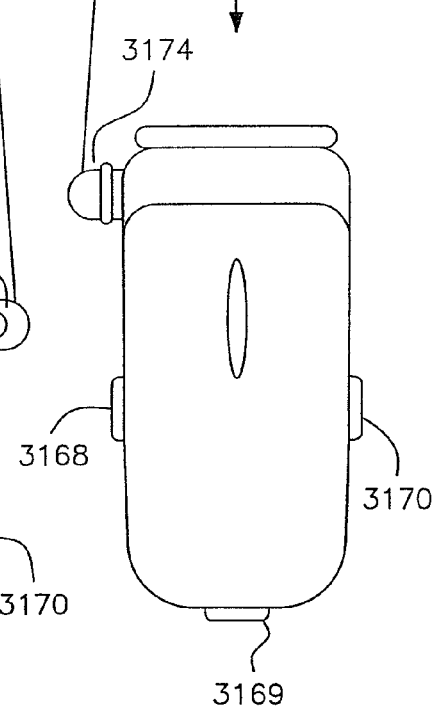

FIG. 85A
FIG. 85C
FIG. 85B
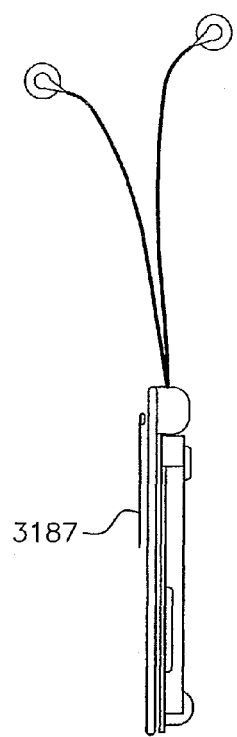
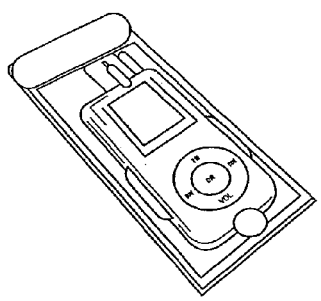
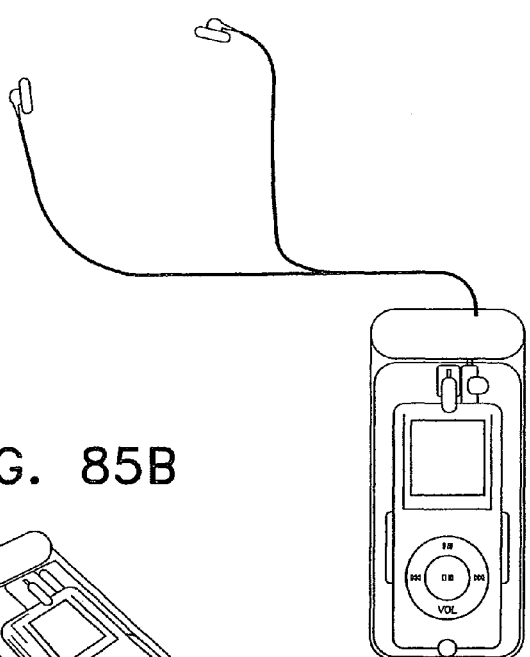
3187

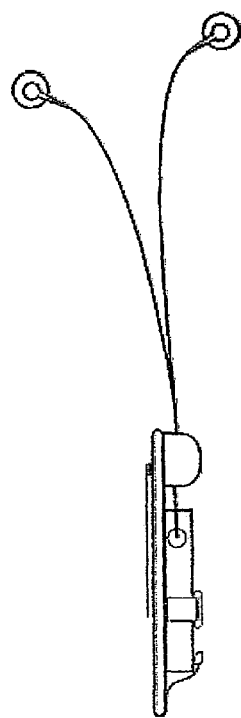
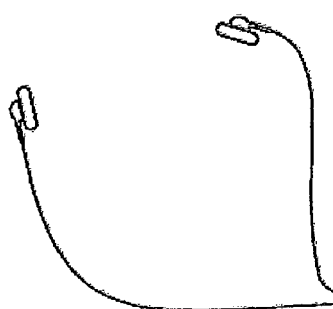
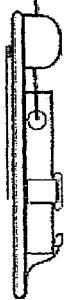
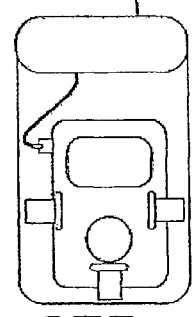
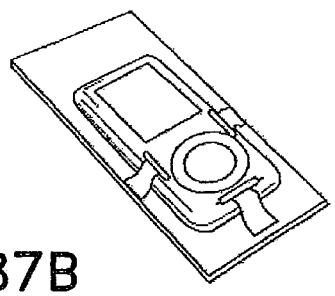
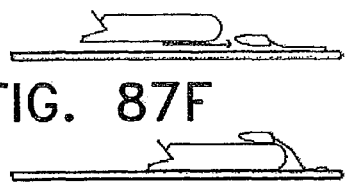
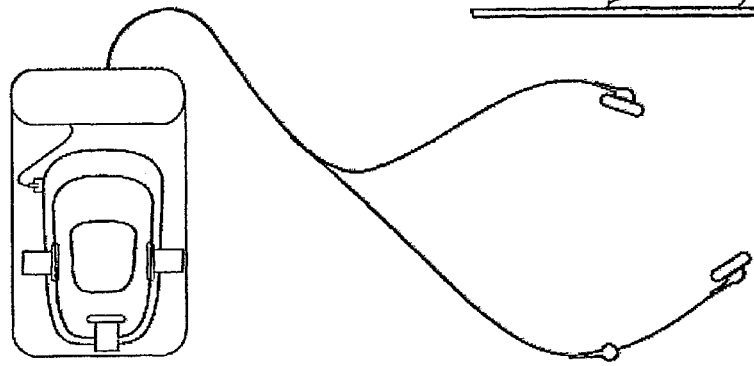
FIG. 87D
FIG. 87C
FIG. 87A
FIG. 87E
FIG. 87B
FIG. 87F

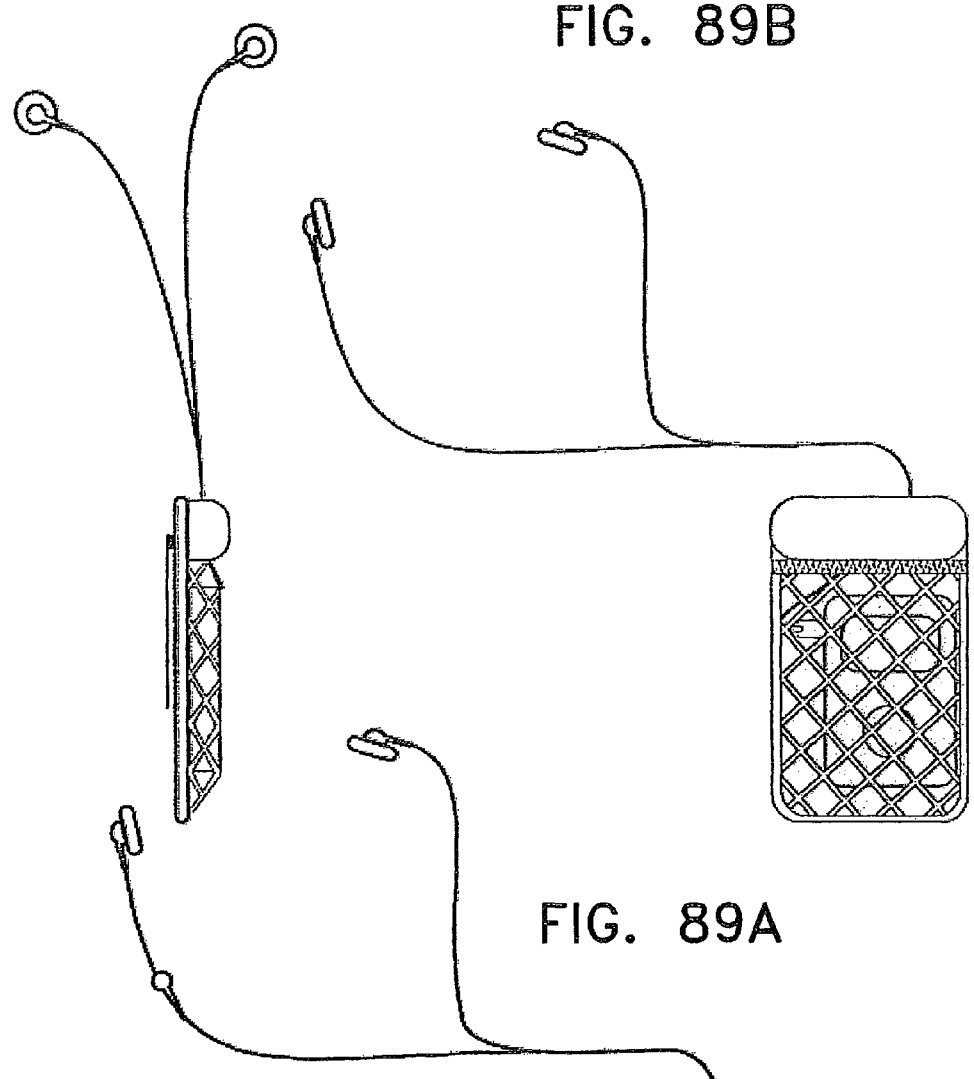

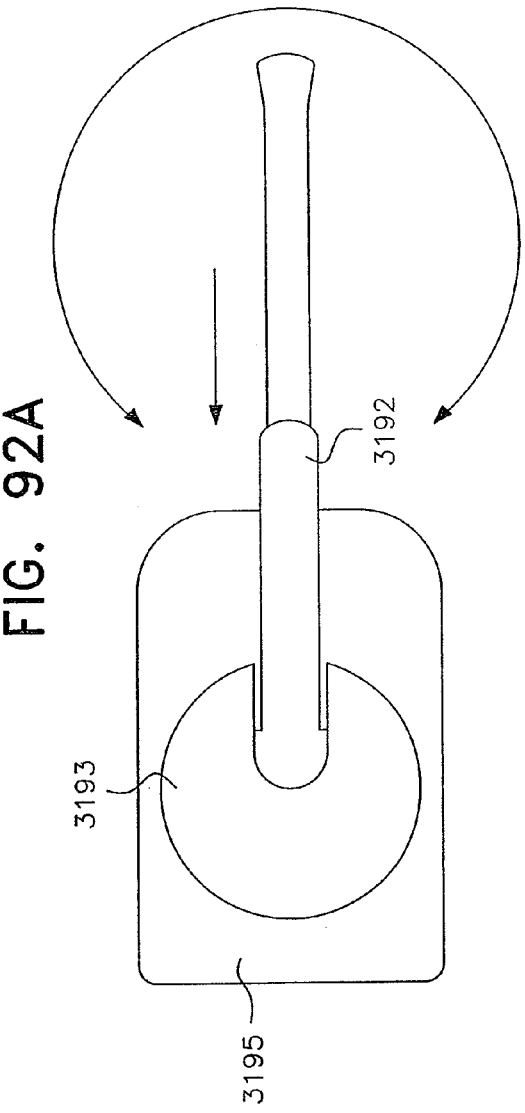
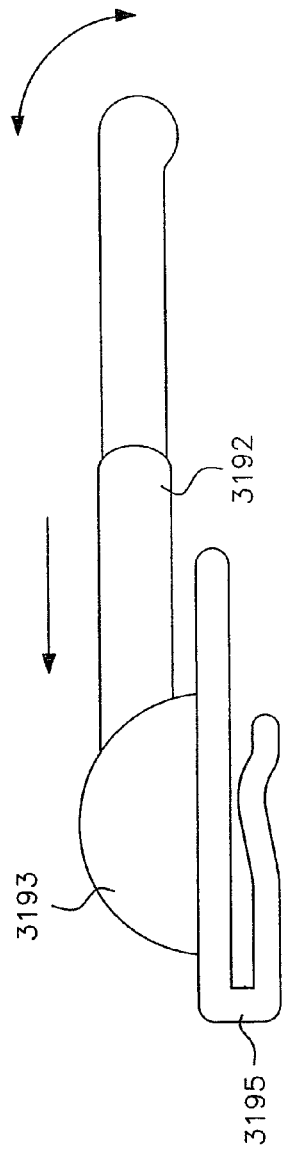

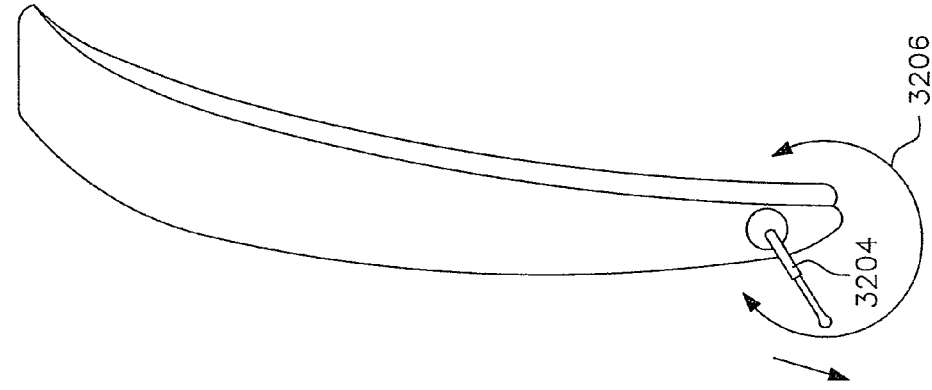
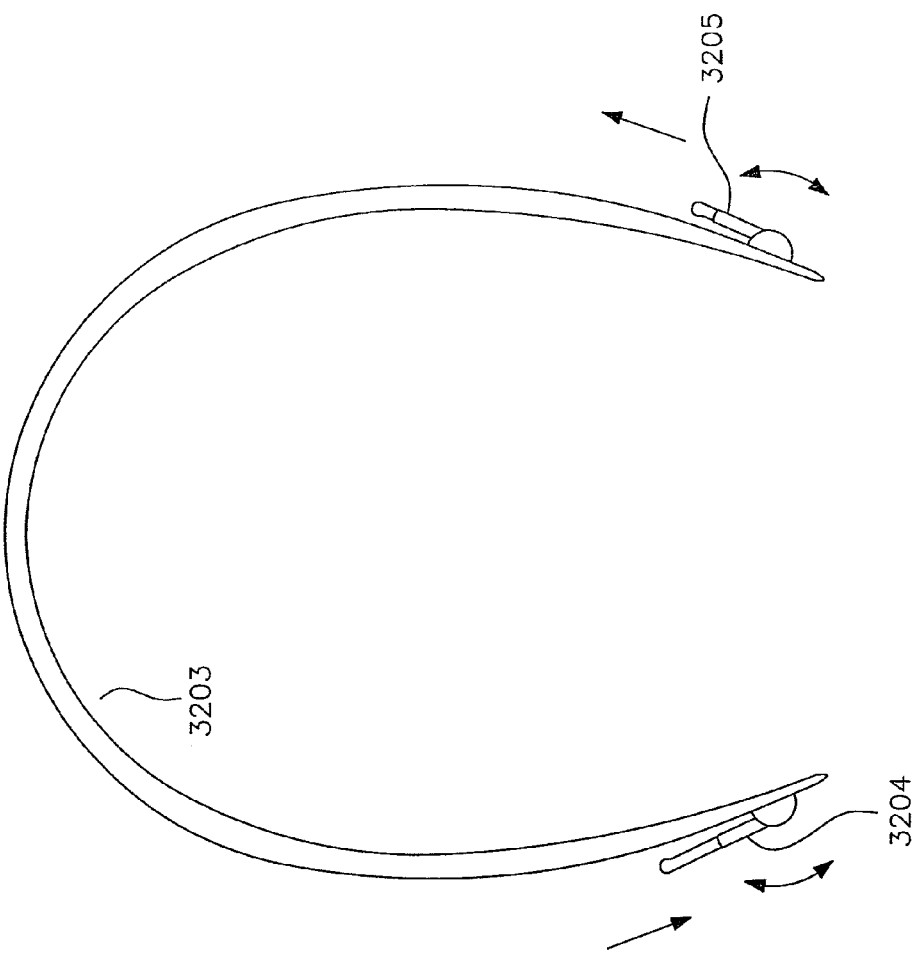

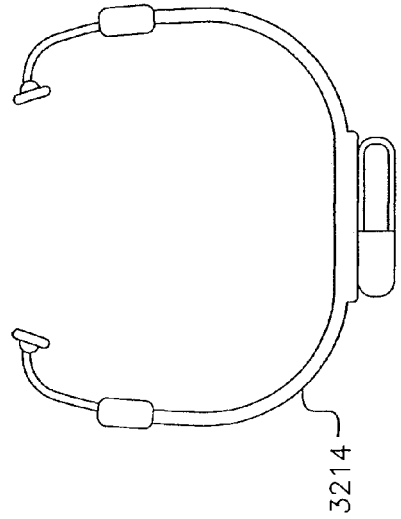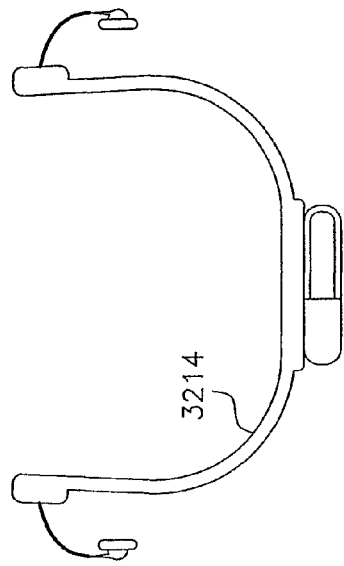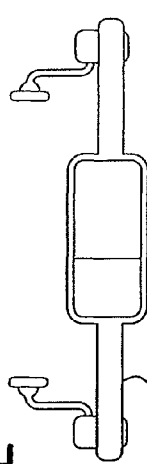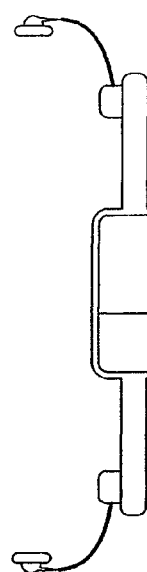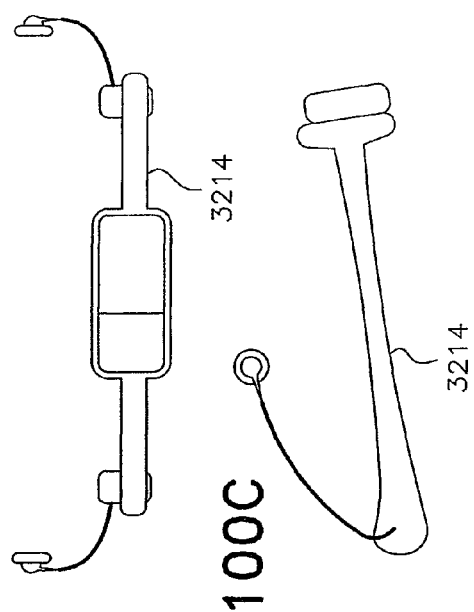

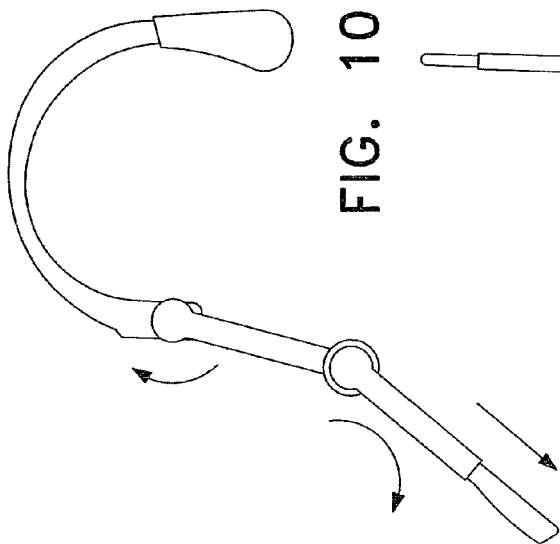
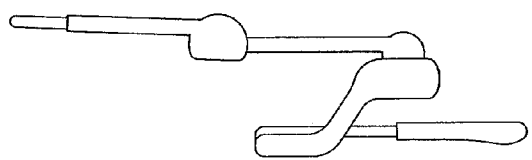
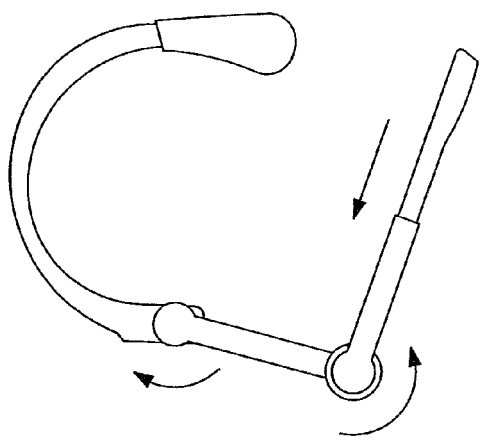
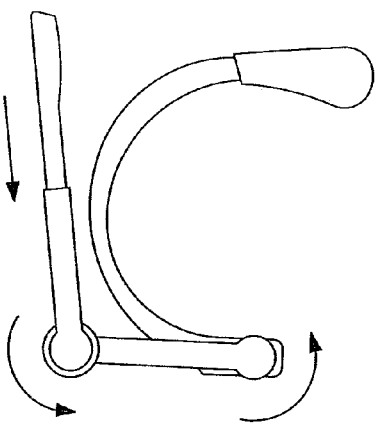

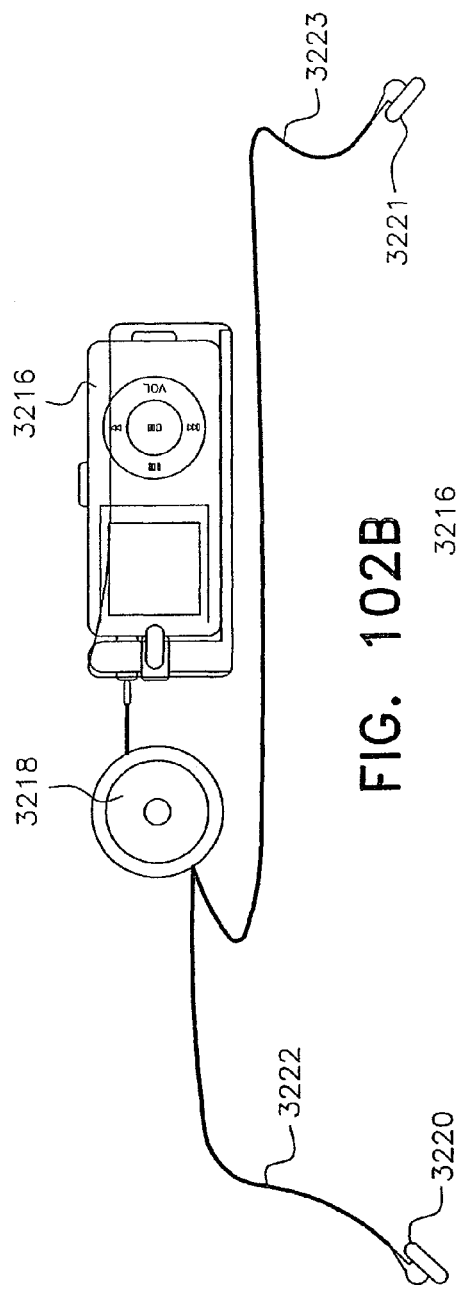
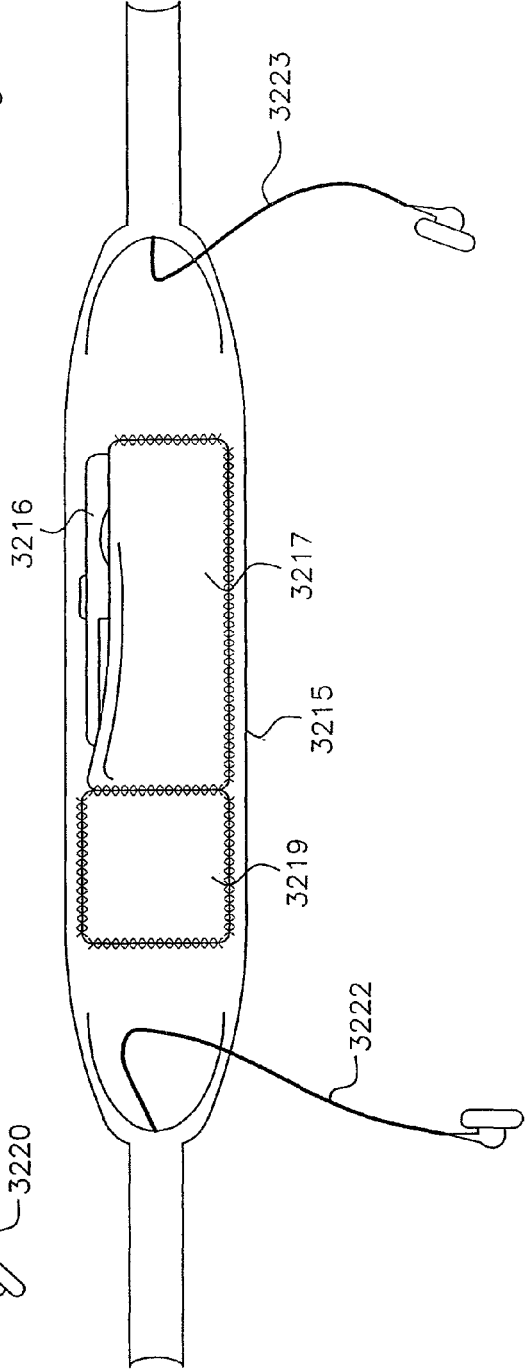
FIG. 102A
FIG. 102B

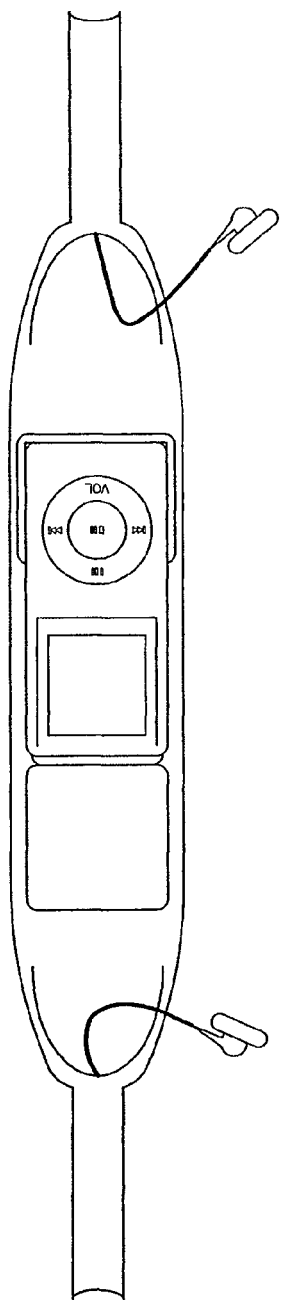
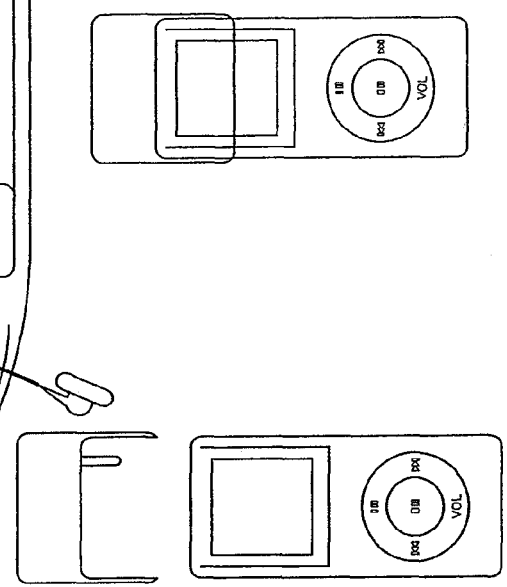
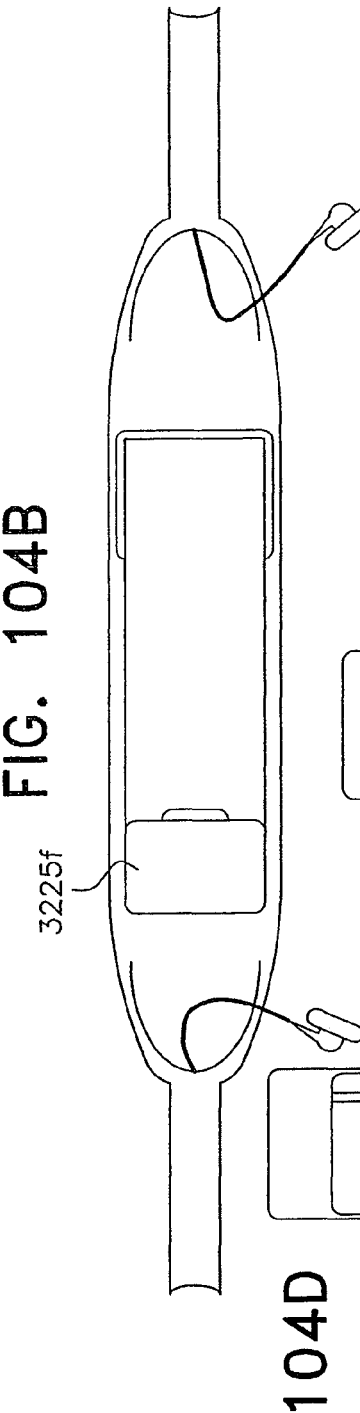
FIG. 104A
FIG. 104C
FIG. 104B
FIG. 104D

FIG. 122D
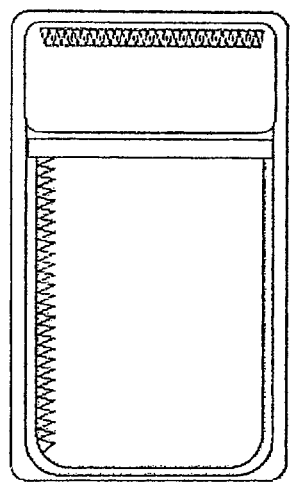
FIG. 122C
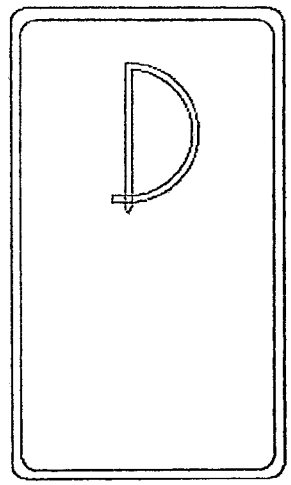
FIG. 123
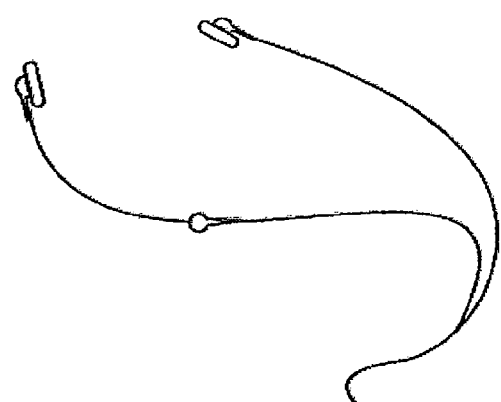
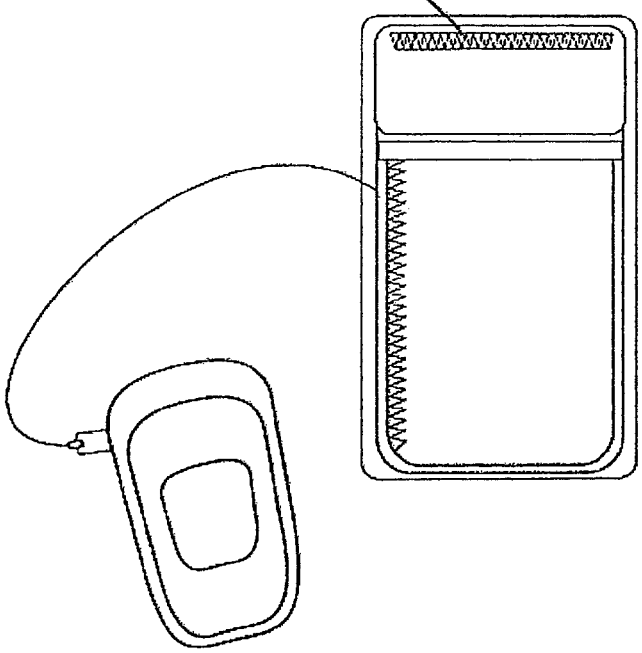

FIG. 124D
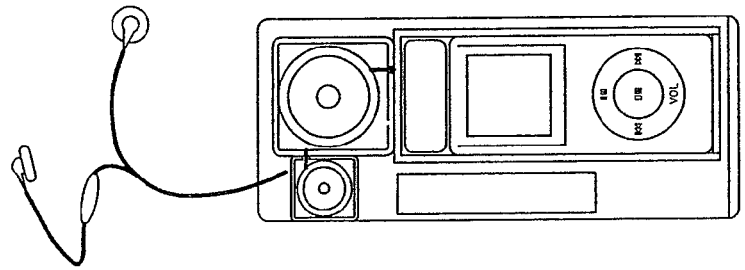
FIG. 124C
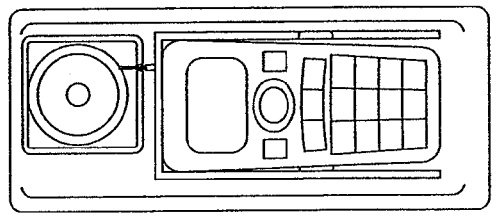
FIG. 124A
FIG. 124B
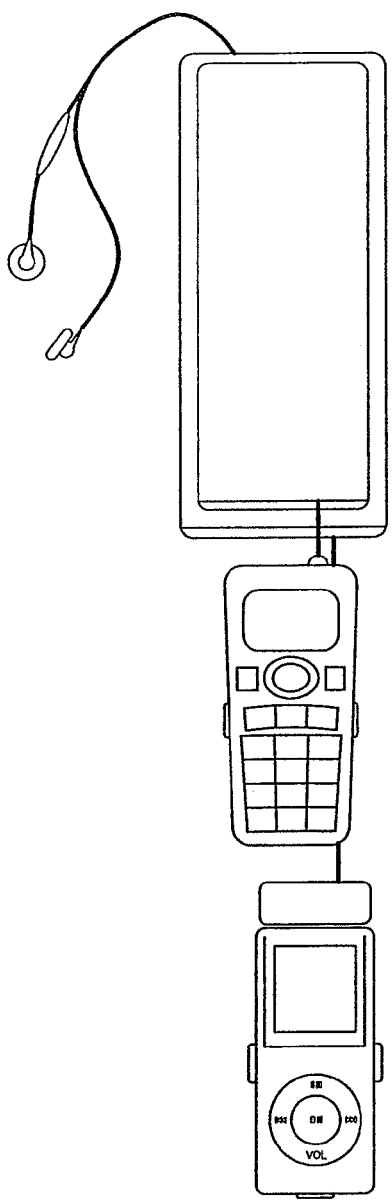
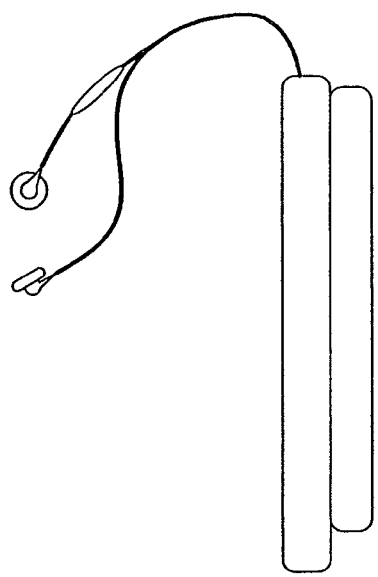

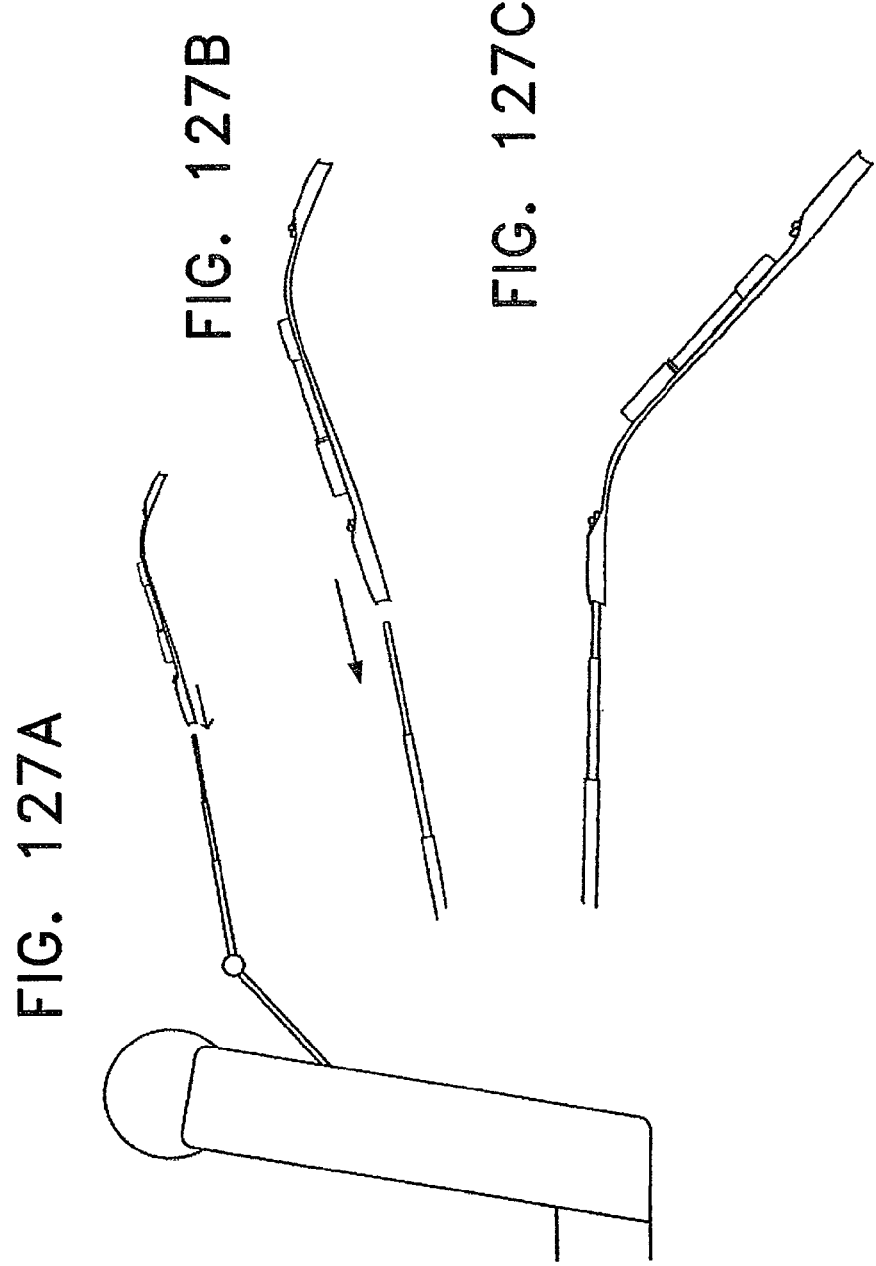

FIG. 129A
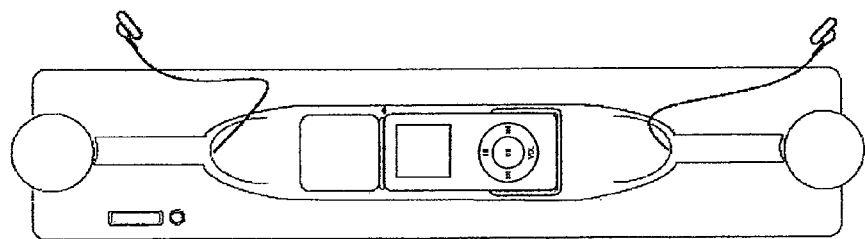
FIG. 129B
FIG. 129C
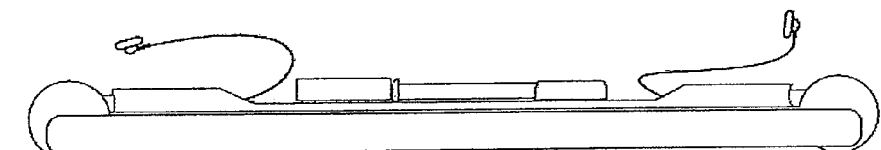
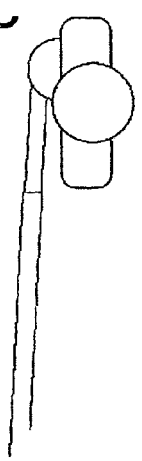
FIG. 129D

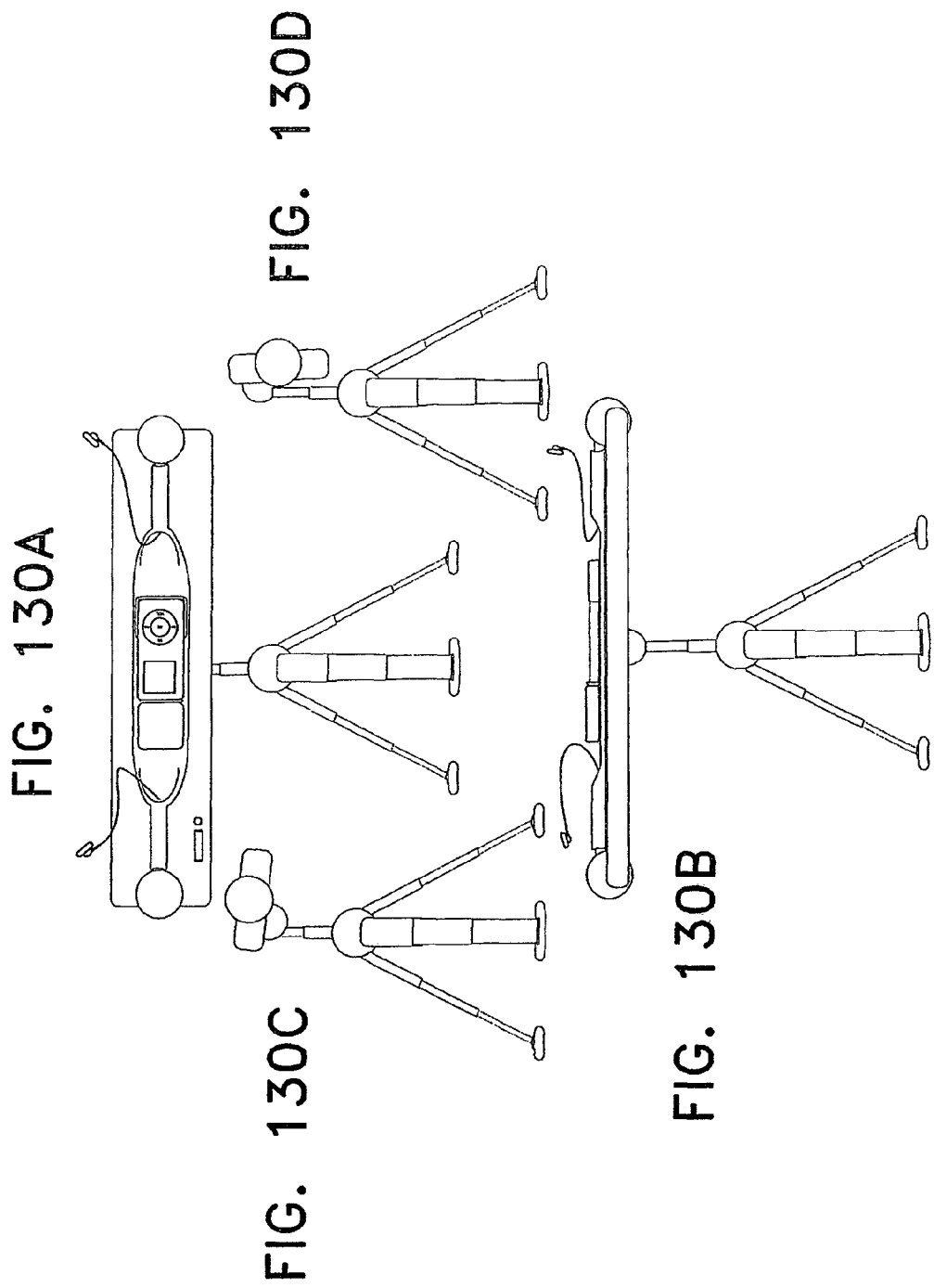

FIG. 131A
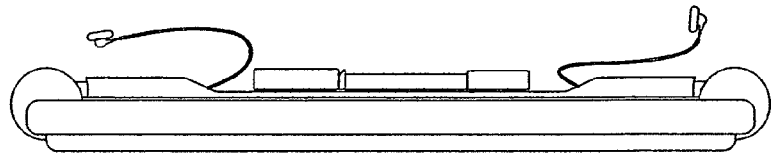
FIG. 131B
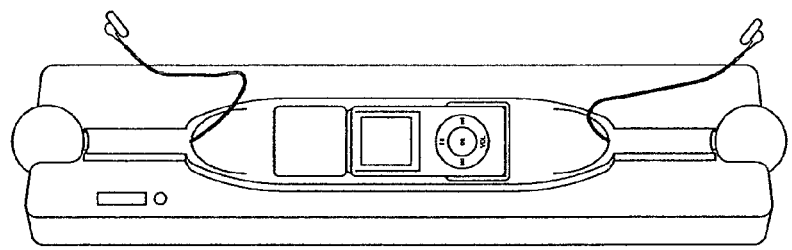
FIG. 131C
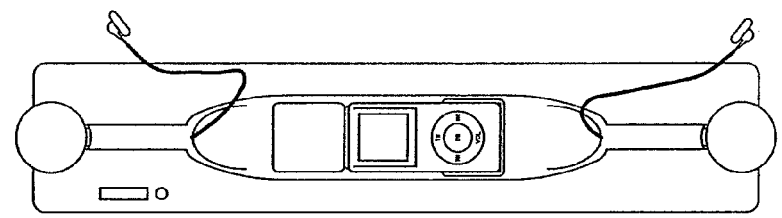
FIG. 131D
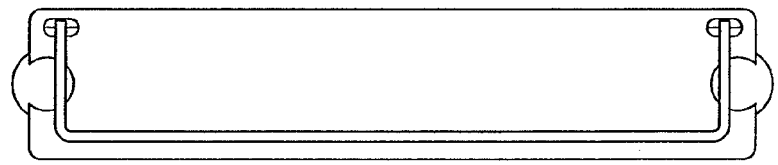
FIG. 131E  FIG. 131F  FIG. 131G
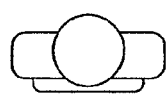 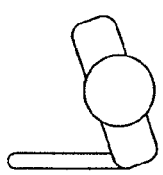 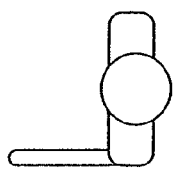

FIG. 133A
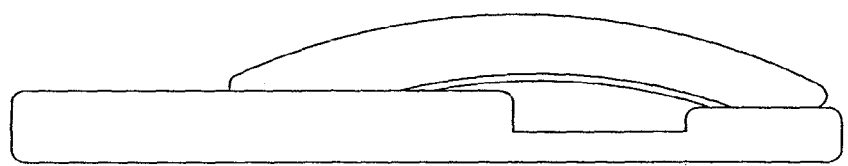
FIG. 133B  FIG. 133C
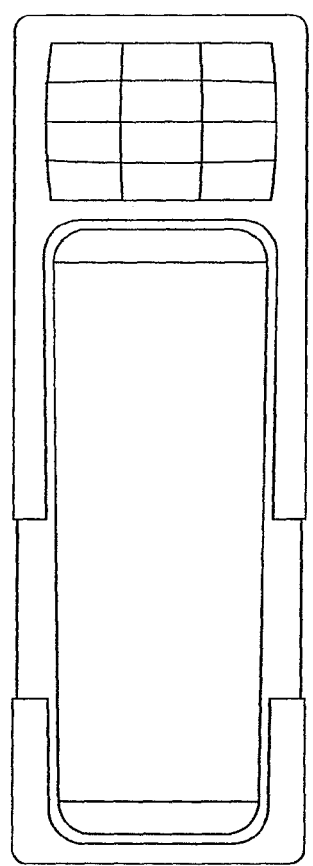
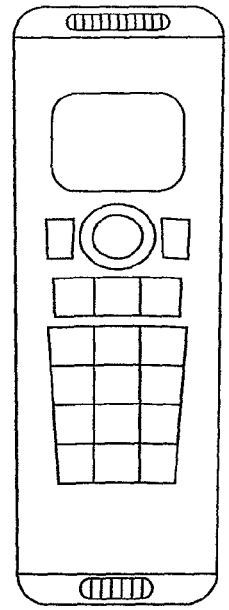

FIG. 136A
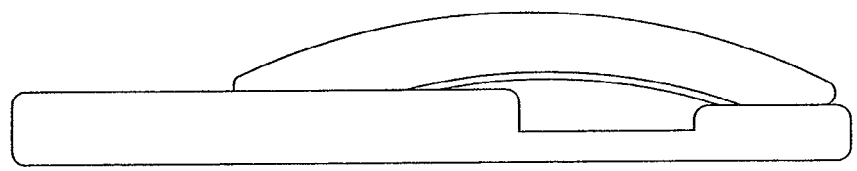
FIG. 136B
FIG. 136C
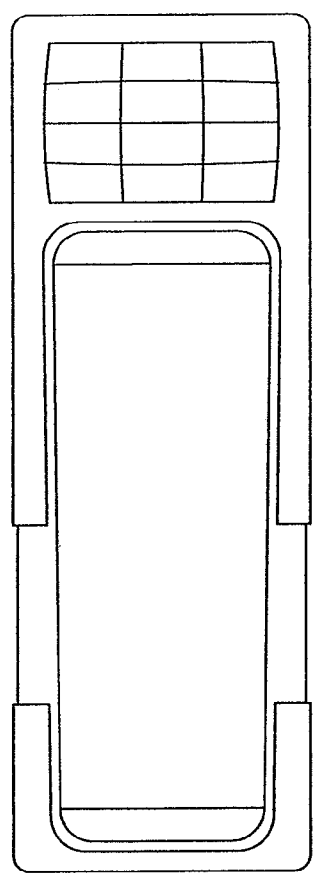
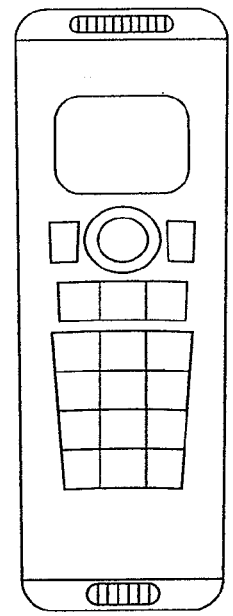

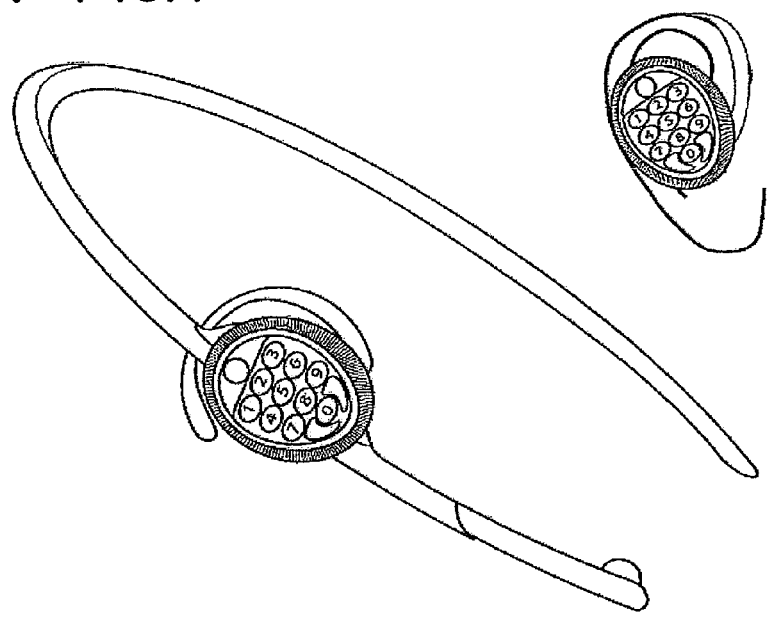
FIG. 143A
FIG. 143C
FIG. 143B
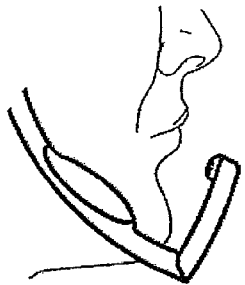

BIOLOGICALLY FIT WEARABLE ELECTRONICS APPARATUS AND METHODS

This application is a Continuation application of U.S. patent application Ser. No. 11/637,950, filed Dec. 13, 2006, herein incorporated in its entirety by reference, which is a complete application of provisional Appln. Nos. 60/749,579, 60/756,549 and 60/762,861, filed Dec. 13, 2005, Jan. 6, 2006 and Jan. 30, 2006, respectively.

BACKGROUND OF THE INVENTION

In recent years, the use of cellular phones, music players, video players, video games, computers, and a variety of hand-held electronic products has greatly increased. Because they are hand-held, some of those electronic devices as computers are often carried by the user in a separate case. There have been attempts to create wearable electronics such as music players integrated into the frames of eyewear, as well as wearable computers. However, due to a disconnection between electronic products and the biological aspects of the human body, prior art devices have failed to provide a useful wearable electronic apparatus that adequately interact with the human body and which fits anatomically and physiologically with the body.

Accordingly, it would be desirable to provide electronic devices and electronic functions which are hand-free and can be worn on the surface of the body in a biologically fit manner. The present invention provides a convergence between electronic products and the biological and anatomical aspects of the human body and biomechanics of the body while providing a series of hands-free wearable electronic apparatus that can interact with human senses and physiology of the body in a practical manner.

Housing electronics and/or power source in the frames of eyeglasses, as provided by prior art devices, creates bulky, heavy, cumbersome, and uncomfortable gear, which consistently places a heavy weight against the users' ears which can generate discomfort. Moreover, such heavy and awkward eyeglasses are cosmetically undesirable with buttons, ear buds, and other unattractive parts being visible at all times, taking away the elegance that can be the key feature of eyeglasses frames, and making them unsuited for use on a daily basis including at work, at school, or attending formal events.

A further problem for the prior art devices is that they rely on wires passing through the hinges at the front portion of the temples. This makes the manufacturing process difficult and more expensive. In addition, because the wires running through the hinges are repeatedly folded and unfolded with the temples of the glasses, the wires have a tendency to become damaged, substantially reducing the useful lifespan of the products.
The large size and heavy weight of eyeglass frames housing electronics can prevent a comfortable fit and use. U.S. Patent Application Nos. 20040059212 and 20040242976 describe eyeglasses to measure biological parameters wirelessly. However, because the electronics and wireless transmitter are housed in the eyeglass frames, the frames are heavy and can cause discomfort over time.

Bulky, prior art eyeglass frames or head mounted gear that house electronics and/or power sources and/or and unsightly ear buds in a non-removable fashion require the user to wear the device at all times, even when the electronic functionality of the device is not being used.

The prior art also discloses "wearable" computers. Typically, however, these devices are complicated and not practical to use. Moreover, because they are not adapted to fit well onto a human body, their weight is not well distributed, and will normally cause discomfort to the wearer, discouraging long term use of the devices.

Wearable articles of clothing (including hats) with permanent electronics embedded on them are financially unattractive, because discarding the wearable article would also require throwing away the embedded electronics device. Similarly, a desire to replace or upgrade the electronics device requires disposal of the wearable article.

Many people use different types of portable electronic devices, such as cell phones, MP3 players, PDA's, etc. Another deficiency of the prior art is a failure to disclose eyeglasses or wearable articles in which the user has the option to choose from a plurality of electronic functionalities using the same eyeglasses frame or wearable article.

Another problem with electronic devices such as computers, DVD players, cellular telephone, digital music player, and electronic organizers, is that in order to be operated they require the user to hold the device or place the device on an object (such as a piece of furniture or the floor) for support. It would be very useful to have an electronic device which does not require being held or placed on an object for support.

In addition, "hand-held" devices require that they be held. While some cellular phones and digital music/video players have accessories that permit the user to use the device without having to hold it, using such apparatus and accessories is cumbersome, and it is necessary to carry and store the accessories until they are actually used. Furthermore, it is easy to forget to bring the accessory, such as the ear bud or a strap to secure a digital player to the body, when is needed.

Moreover, hand-held devices are easily lost or misplaced, and unattended hand-held devices can be easily stolen. It is common for people to forget their hand-held devices in restaurants, airplanes, taxi cabs, etc. It would be very useful to have a non-hand held and hands-free device that can be worn in a comfortable, non-obtrusive, and biologically-fit manner without requiring the user to carry extra devices or accessories in addition to the equipment already being worn on the body.

The Problem of Pain and Discomfort

The human body has a limited ability to support weight before pain is elicited. Furthermore, each part of the human body, such as the neck, shoulder and ear has different thresholds for activation of pain fibers. If the weight pattern is not biologically fit, the stimulus of the device on the skin will become annoying, and pain receptor endings within the skin will be stimulated. By adequately spreading the weight of the electronic wearable article resting on the body only pressure receptors of the peripheral nerves are activated, and not the painful "nociceptors" (described further below). By providing a wearable electronic device with a biologically fit weight distribution pattern, the pain and discomfort associated with the weight of the device is not elicited.

There are basically three sensory responses from contacts with the human skin: (1) mechanical sensations, (2) thermal sensations, and (3) nociceptive or pain sensations. Nerve fibers course into the skin through the dermis, and many of them end at the dermal-epidermal border where many of the sensory receptor structures are located. The largest class of receptors consists of the ones with no specialized structure at all, which are the free nerve endings for pain whereas encapsulated nerve endings are usually associated with light touch and pressure sensations.

Axons of peripheral nerves are divided up, according to their conduction velocity, into A, B and C fibers, and the A fibers are subdivided into Aα, Aβ, Aγ, and Aδ classes, in descending order of conduction velocity. Ordinary sensory information such as touch information is conducted by Aβ fibers, and pain sensation is carried by Aδ and C fibers. For any wearable electronic article to be worn comfortably for long periods of time, the design and weight distribution as well as the weight pattern of the apparatus should not activate Aδ and C fibers of the anatomic region supporting the electronic device.

The pain receptors and C fibers in the skin of the ear are activated at much earlier stage than the pain receptors and C fibers of the nose. Therefore, to prevent activation of the user's pain receptors, a biologically fit weight pattern for eyeglasses distributes as much weight as possible onto the nose and as little as possible directly against the ear. Likewise, the C fibers, pain receptors and pressure receptors in the neck are activated earlier than the C-fibers, pain receptors, and pressure receptors of the shoulder and chest. Therefore, to increase the time prior to activation of pain receptors, a biologically fit weight pattern, for a wearable computer for example, includes distributing the weight in the shoulder and chest area and avoiding the weight being supported solely or mainly by the neck. Other biologically fit embodiments that distribute the weight in the back and shoulder area will be shown in the accompanying drawings and description.

Good weight distribution, as taught by the present invention, needs to be coupled to a proper amount of weight, to avoid activating mechanically sensitive nociceptors, which lead to discomfort and painful sensation. To prevent stimulation of pain, it is necessary that the weight of the apparatus applied to the anatomic area only activates pressure receptors but not C fibers and pain receptors. In the case of wearable electronics, C fibers can be activated by excessive pressure itself and chemicals released by damaged cells, such as crush injury, caused the weight of the device. This is important from a clinical stand point and future ability to wear the wearable electronic article, since after activation of C fiber, the next time that the user tries to wear an even lighter weight device in the same area, pain may result, a phenomenon called hyperalgia, preventing thus future use of the device for a potentially long period of time.

Receptors are discrete structures connected to nerve fibers and embedded in the skin. Although in some regions the density of receptors is very high, there are areas in which there are few receptors. The receptors in the skin of neck and ear, represented by anatomic areas supporting devices of the prior art, are very sensitive to mechanical stimuli, requiring displacements of only a few to tens of micrometers to excite them. When the stimuli is strong enough it can produce damage and become painful. By having proper weight and proper weight distribution, as per the present invention, the pain fibers of the anatomic areas supporting the weight are not activated and over time the pressure fibers, such as Aβ fibers, adapt to the weight, which allows absolute comfort during use.

As a way of illustration, but not of limitation, two anatomic areas of the body and their representative preferred embodiments, wearable electronic eyeglasses and wearable computer, will be described. People who wear eyeglasses usually see indentation on the skin of the nose, but feel no significant discomfort. On the other hand, significant discomfort is felt when only minor mispositioning of temples occur around the ear. This occurs because the skin in the nose area has few pain receptors and C fibers, while the skin around the ear is more densely populated with pain receptors and C fibers.

It is possible to quantify the sensitivity of an anatomic area. The number of receptor locations for pain in the ear per square centimeter is in the range of 120 to 160 in comparison to the nose which is in the range of 35 to 55. The number of receptor locations for touch per square centimeter in the ear is in the range of 40 to 70 in comparison to the nose which is in the range of 90 to 110.

Even regular eyeglasses with conventional weight can cause discomfort around the skin of the ear if there is not a good fit because of the larger density of pain receptors in this area. Naturally, placing weight against the ear by temples housing electronics and/or power sources will likely elicit discomfort and pain over time. Therefore by mechanically displacing the weight to other areas that have less pain receptors and fibers, such as the nose, there is a reduction in the amount of pain receptors that will be activated, and an increase in the comfort level of the wearer.

The number of receptor locations for pain in the neck per square centimeter is in the range of 170 to 200 in comparison to the shoulder and chest which is in the range of 120 to 150. Therefore by mechanically displacing the weight from the neck to other areas that have less pain fibers, such as the shoulder and chest, there is a reduction in the amount of pain fibers and receptors activated.

The problem of wearable devices is further compounded by the fact that a wearable device to be truly useful has to be compact and interact with senses and biological functions of the body in a practical manner.

SUMMARY OF THE INVENTION

The present invention teaches a convergence between electronic products and the biological and anatomical aspects of the human body and biomechanics of the body while providing a series of hands-free wearable electronic apparatus that can interact with human senses and are biologically fit and provide a weight distribution that does not activate pain fibers (and cause pain).

A variety of wearable electronic devices are provided in the present invention including computing devices, video players, music players, and the like. One of the wearable articles of the present invention housing electronics includes eyeglasses.

The invention provides eyeglasses with an optimal distribution of weight in which the nose area supports more of the weight due to a counter-weight, represented by an electronic package, preferably positioned diametrically opposed to the nose in the back of the head with said electronic package being secured to the end of the temples of pair of eyeglasses. By displacing the weight to the back of the head and to the nose and housing only light weight parts in the temples, there is better weight distribution and comfort, with elimination or retardation of activation of pain fibers and reduction of pressure applied by temples directly against the anatomic area of the ear, which is more sensitive to pain caused by pressure than the nose area.

The invention further provides a better distribution of weight in which the shoulder and chest area supports the structure in combination with the neck, represented by an Inverted U-shaped or an inverted V-shaped structure which has two arms resting against the shoulder and chest area in addition to the neck. By having two arms spaced apart there is spread of the weight with better balance and weight distribution across the neck and the shoulder and chest area.

The invention further teaches a weight distributed and biologically fit wearable computer. A variety of electronic parts and wireless parts can be integrated into the system. Accordingly, a cellular phone can be incorporated into the wearable computer with the dial pad being integrated into the keyboard, and hearing and voice function provided by the Inverted U-shape structure while allowing hands free communication. Likewise, a wireless communication system for receiving communications over the internet can be integrated into the wearable computer of the invention.

The present invention provides a fully compact system when not in use, and which allows full interaction of the device with vision, hearing, speech, and tactile function while being used. The V-shape structure preferably is made of a flexible material which has memory including memory shape alloys. Therefore, when not in use (for instance when being carried or being place on a table), the two ends of the structure can be folded upon each other and twisted in a helical shape placing the keyboard in one end of the arm on top of the display at the end of the opposite arm, creating a fully compact system. The present invention can also be used as a table-top, by having the helical shape being used with the vertical portion of the helical shape supporting the display in one end and the horizontal portion connected to the keyboard.

It is an object of the invention to provide a detachable wearable electronic eyeglasses and head mounted gear with a plurality of electronic functions and interchangeable electronic function. It is also an object of the invention to provide a wearable computer with optimal weight distribution and stretchable arms. It is a further object of the invention to provide a plurality of hands-free wearable electronic devices including a video player, a music player, a video game, an electronic book, a global positioning system, a photo camera, a video camera, a television, a cordless phone, a cellular phone, and the like. It is yet another object of the invention to provide hands-free support structure for housing electronics.

Eyeglasses are one of the most common wearable articles, and the majority of the adult population wears at least one of sunglasses or prescription eyeglasses for distance or for reading. It would be thus useful and desirable, as in accordance to this invention, to enable people wearing eyeglasses in general to have those eyeglasses perform an electronic function in a not noticeable manner and not seen by an external observer while keeping the frames light weight, elegant, compact, attractive, low cost and comfortable as well as biomechanically fit and practical for daily use in any situation of life. The eyewear of the invention doubles as an inconspicuous electronic device (besides having visual function as any eyeglasses), and since the eyeglasses of invention appear as regular eyeglasses, the eyeglasses can be used by the general population and for any occasion, such as at work, school, home, or during play.

BRIEF DESCRIPTION OF THE DRAWINGS

FIG. 1A is a perspective side view of a user wearing eyeglasses with a diagrammatic representation of the weight distribution using temples to house electronics according to the Prior Art.

FIGS. 1H and 1J are diagrammatic views of preferred embodiments of an ear bud assembly of the present invention.

FIG. 2B is a perspective front view of a user wearing an inverted U-shape wearable electronic computer with a diagrammatic representation of the weight distribution of the present invention.

FIG. 6F is a perspective side view of an exemplary temple assembly attachment of the detachable electronic eyeglasses of the invention when worn by a user.

FIG. 17A is a diagrammatic side view of another temple assembly of the detachable electronic eyeglasses.

FIG. 17B is a diagrammatic back view of a temple assembly of the detachable electronic eyeglasses worn by a user.

FIG. 18A is a perspective back view of a slip-on assembly of the invention.

FIG. 23B is a perspective side view of another clip-on assembly when worn by a user.

FIG. 23C is a perspective side top view of another clip-on assembly connected to a DEP.

FIG. 32 is a perspective top view of another embodiment of the detachable electronic eyeglasses of the invention.

FIG. 32A is a perspective top view of a temple assembly of the detachable electronic eyeglasses of FIG. 32.

FIG. 33 is a perspective front top view of another embodiment of the detachable electronic eyeglasses of the invention.

FIG. 34A is a perspective side view of the detachable electronic eyeglasses cord of the invention when worn by a user.

FIGS. 34J to 34V illustrate various specialized storage cords.

FIG. 37A is a diagrammatic top view of the wire, spools, and connector assemblies of FIG. 37.

FIG. 38 is a perspective side view of a detachable electronic clothing system of the invention.

FIG. 41 illustrates a wearable computer and extendable portion.

FIGS. 42A and 42B illustrate adjustable extendable portions of the wearable computer system.

FIGS. 46 and 47 illustrate use of a wearable computer by a user.

FIGS. 50A through 50C illustrate a shoulder holster wearable computer.

FIG. 52 illustrates a wearable CD player.

FIGS. 54, 54A and 54B illustrate a detachable wearable telephone.

FIGS. 55A through 55D illustrate a U-shape support structure.

FIGS. 56 through 60 illustrate a C-shape tubular support structure.

FIGS. 62 through 71 illustrate various embodiments of the storage cord according to the present invention.

FIGS. 72 through 76A illustrate various alternate embodiments of a storage frame for an electrical component.

FIGS. 79A through 80C illustrate alternate embodiments of storage cords.

FIGS. 81A through 81F illustrate a connection stabilizer for an electronics device.

FIGS. 85A through 87F illustrate alternate embodiments of a storage cord according to the present invention.

FIGS. 88A through 89C illustrate alternate embodiments using elastic to contain an electronics device and a storage cord.

FIGS. 91A through 98 illustrate a connection clip and its use for supporting various styles of storage cords.

FIGS. 100A through 100F illustrate a storage cord made of a rigid material.

FIGS. 101A through 101D illustrate a rigid attachment appendage.

FIGS. 102A and 102B illustrate the mounting of an electronics device on a storage cord.

FIGS. 104A through 106 illustrate the mounting of an electronics device on a storage cord for receiving signals to control the electronic device.

FIGS. 122A through 122D illustrate a storage cord assembly.

FIGS. 123 illustrates a cell phone having connecting arms.

FIGS. 124A through 125 illustrate connecting arms located on the rear of a chair.

FIGS. 126A and 126B illustrate a support platform for a storage cord assembly.

FIG. 127A through 128C illustrate alternate embodiments of a platform for a storage cord assembly.

FIGS. 129A through 131G illustrate a curved telephone and demonstrate how it would be worn by a user.

FIGS. 132A and 132B illustrate a telephone with pivotally mounted arms.

FIG. 133A through 137 illustrate a neck mounted telephone.

FIG. 138A through 138C illustrate a curved telephone handset.

FIG. 139A and 139B illustrate an alternate embodiment of a storage cord assembly.

FIG. 140 illustrates a rigid C-shaped neck support.

FIGS. 141 through 145 illustrate various arrangements for mounting a storage cord assembly adjacent to the face of a wearer.

FIGS. 146 through 167 illustrate the mounting of a cold/hot pack on a wearer using various storage cord assemblies.

Figure 168:
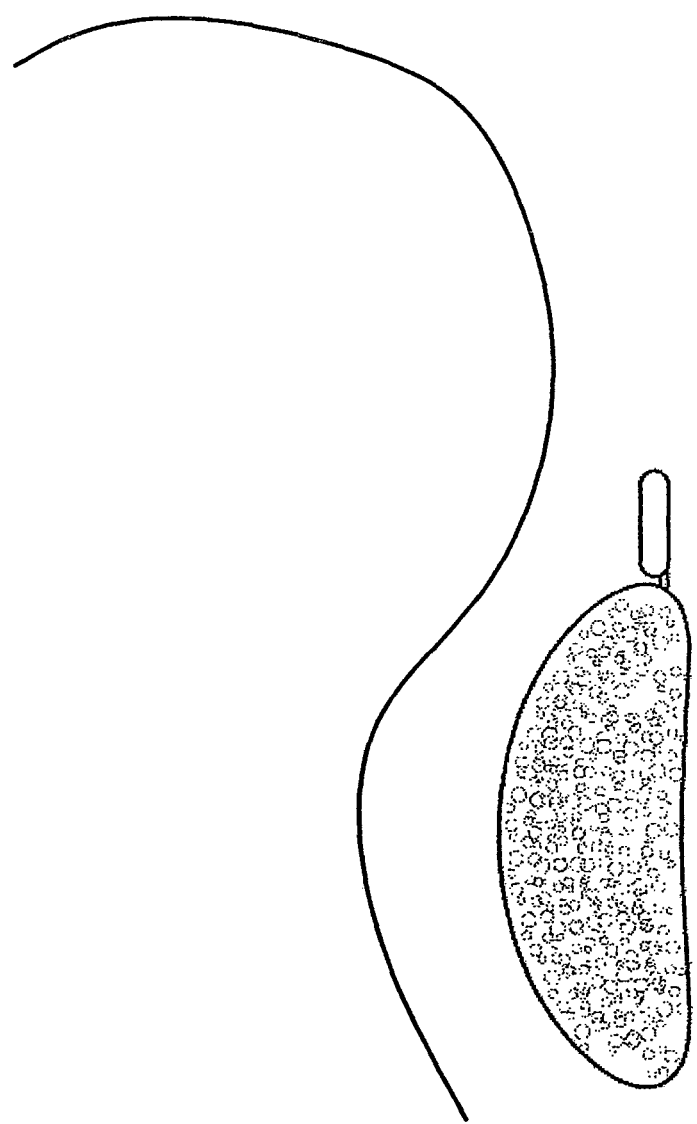
Figure 169:
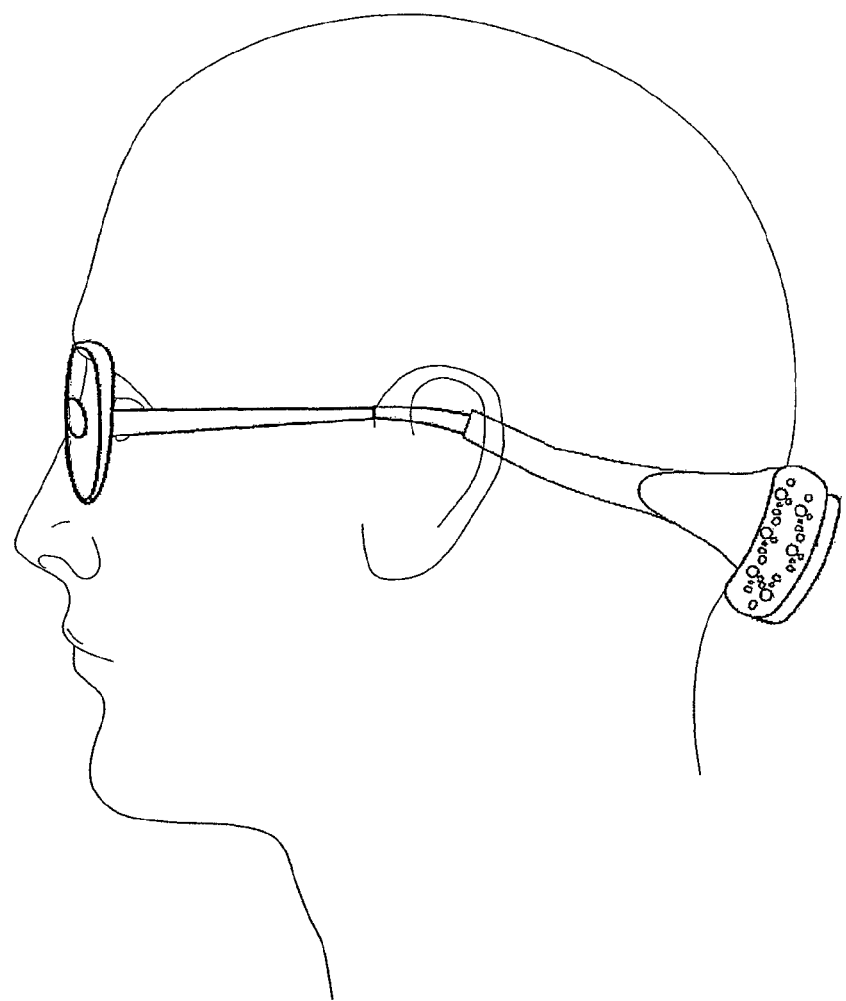

FIGS. 168 through 169 illustrate a retractable cord assembly.

Figure 170:
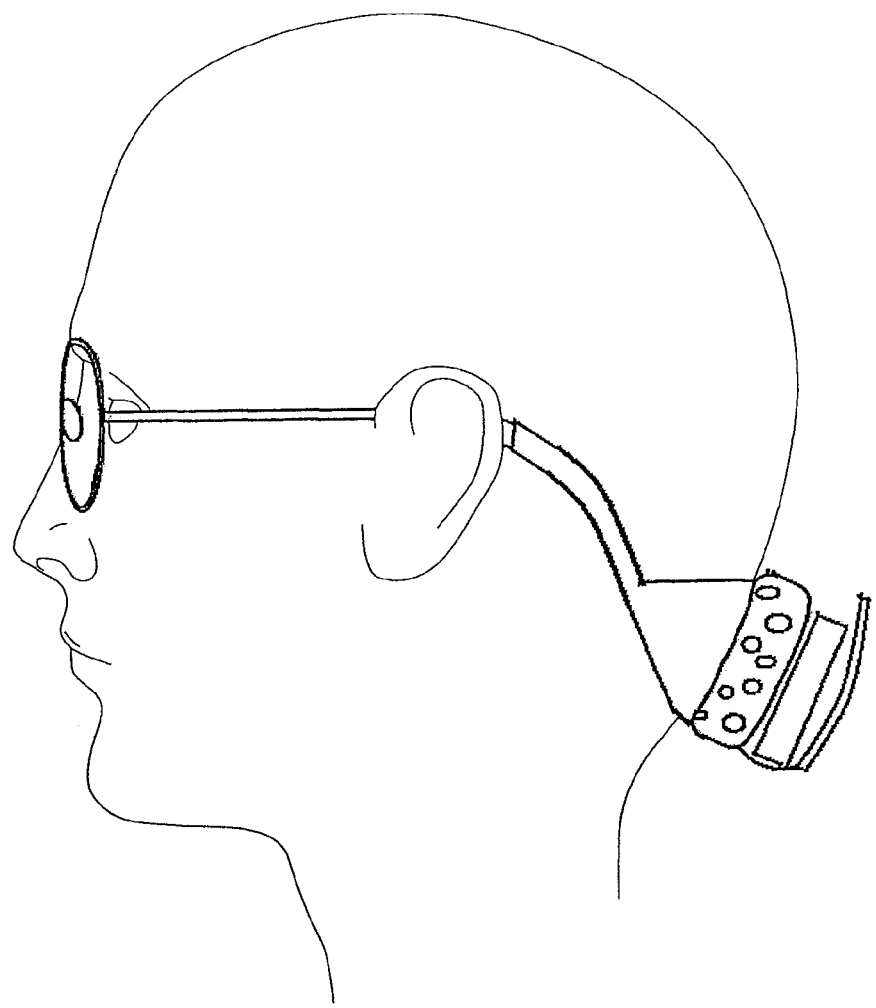

FIG. 170 illustrates an alternate embodiment of a storage cord assembly.

FIGS. 171 through 183 illustrate alternate embodiments for mounting of a storage cord assembly on an article of clothing.

FIGS. 184 through 187C illustrate alternate embodiments for mounting a storage cord assembly on the temples of eyeglasses or other article of clothing.

DETAILED DESCRIPTION OF THE PREFERRED EMBODIMENTS

Besides eyeglasses, a variety of other wearable articles such as head mounted gear, hats, eye masks, helmets, visors, and the like are commonly worn on the body but are not electronically enabled and not biomechanically fit for wearable electronics. It would be desirable, as in accordance to the present invention, to provide electronic capabilities to such wearable articles and fit an electronic system into such wearable articles with proper weight distribution while keeping such articles low-cost, comfortable, elegant, and easy-to-manufacture, with the electronics and electronic package being confined to the dimensions of the wearable article and being not visible to an external observer while providing vision, voice, and hearing interaction between the wearer and the device.

The present invention includes a miniaturized electronic system which fits into a wearable article (such as eyeglasses or hats) without significantly altering the wearable article. This is accomplished by reducing the number of parts of the electronic system that are permanently housed in the wearable article. The rest of the electronic system is included in a detachable electronic package (DEP) that can be attached to the wearable article in a way not to be visible to an external observer. The invention also eliminates the need for accessories such as ear buds, and reduces the number of the most expensive and heavier parts that are permanently affixed to the wearable article.

The present invention provides a wearable electronic article which comprises a DEP and a wearable article (WA) detachably connected to the DEP. Preferably, the connection between the DEP and the wearable article includes an extendable cord, most preferably a spool with retractable wires or a coiled wire capable of elongation and with spring capabilities. The DEP is releasably connected to an electrical connection in the wearable article (also referred as WA). The WA will also typically have electrical connections for ear buds, which are preferably permanently affixed to the WA. Preferably, the ear buds are connected to a spool with retractable wires or to a coiled wire capable of elongation and with spring capabilities. The DEP can include a variety of electronic devices such as digital music player, wireless communication devices, video player, video recording, Global Positioning Systems (GPS), and the like.

By way of illustration, and not by way of limitation, a preferred embodiment of the invention comprising eyeglasses will be described in detail. The detachable electronic eyeglasses system comprises a DEP having two wires preferably disposed on opposite ends of the DEP. These wires have electrical connections at their free ends which are releasably connected to electrical connections contained in the frame of a pair of eyeglasses.

The eyeglasses which are part of the claimed system comprise a front portion housing lenses and two temple portions disposed on opposite ends of the front portion. Each temple portion preferably houses a wire, an ear bud, and an electrical connection. The earbud is preferably hidden away within the frame structure or, most preferably, at the end of the frame. The dimensions of the ear buds are preferably confined to the dimensions of the frame. The electrical connection in each temple is releasably connected with the wires on the DEP. The connections within the temples are standardized so that different DEP's can be used in connection with the glasses, and the user has the option to choose a plurality of electronic packages using the same eyeglasses frame.

The electrical connections of the temples of the eyeglasses connect with the electrical connections of the DEP, forming a circuit through the DEP. No wires need be run through the hinges connecting the temple portions to the front portions of the frames.

The temple portions are adapted to secure or house electrical connections, wires, and an ear bud. Although the preferred embodiment preferably includes temples housing a wire, ear bud, and an electrical connection, it is understood that other parts including light weight and small microchips, or a small power source can be secured to or housed in said temples. It is also understood that the temples can include other parts such as micro optics for a camera such as for video or pictures, a light source, or a microphone while the main and heavy electronics are housed outside the frames, preferably in the DEP. For example, an eyeglass frame of the current invention for video recording could include the micro optics of a camera housed within the frame of the eyeglasses and the main electronics housed in the DEP. The lens, aperture, and a small image sensor, such as a Charge Coupled Device could be housed in the frame while the controls, processor, power source, circuits, and LCD screen are housed in the DEP.

In a preferred embodiment, the temples house the wires within the structure of the temples, with one end of said wire connected to an ear bud or to an electrical connection for an ear bud, and the opposite end of the wire having an electrical connector. Preferably, the electrical connector is located in the end portion of each temple, and most preferably at the free end of each the temple. Alternatively, the wire can be secured to the temple on top of the surface of the temple and not within the structure of the temple. This allows for an easier manufacturing process, particularly in the case of thin frames. Although the electrical connectors are preferably housed at the end of the temples, it is understood that the electrical connectors can be placed in any part of the frame, including the mid part of the temples.

The electrical connection at the end of the temple has means to be connected to another electrical connection, preferably one from the DEP. The electrical connectors at the free end of the temples are preferably connected to the free end of the wires which are connected to the DEP. To ensure a secure electrical connection between the DEP and the eyeglass frame, there is preferably a latching mechanism between the DEP and the eyeglass frames.

The electrical connectors in the frames of the eyeglasses are adapted to connect with a plurality of electronic devices housed in the DEP including a MP3 player, Bluetooth device, radio, video player, voice recorder, game device, television, computerized electronic organizer, a radio reflective system, a Global Positioning system, a light source, and a cellular phone. The DEP can also include digital storage for a digital binocular for example with the binocular optics mounted in the frame of the eyeglasses and electronics and memory stored in the DEP. The invention creates eyeglasses enabled for an electronic function in which the same eyeglasses frame can receive a plurality of electronic capabilities depending on the attached DEP.

Thus, the invention provides electronically enabled eyeglasses for multiple functions without having to change the eyeglasses frame. The same discrete, light weight, elegant, and not noticeable electronic eyeglasses can play music and video or alternatively receive a phone call simply by replacing the type of DEP. In addition to replacing one DEP with one electronic function by another DEP with another electronic function, the present invention is also versatile and two or more electronic devices can be housed in the same electronic package.

The DEP is used for a specific period of time for that function, and then either stored or replaced by another DEP after the function is completed. For example a larger DEP can include a MP3 player and a digital video player when the user wants to see and hear, or the DEP can be real light weight when the user wants only Bluetooth capabilities, with such a DEP including a microphone. It is understood that a DEP with multiple electronic functions can be used and thus only one DEP may be necessary.

The present invention allows any eyeglasses and head mounted gear (such as a hat or headband) to be electronically enabled including for delivering sound and video, without an added expense related to electronics and without creating a bulky and heavy head mounted gear. The manufacturing process is simple and cost effective, and in the case of eyeglasses includes only changing the temples, which houses a minimum amount of light weight and thin parts and with no buttons in the frame, thereby allowing use of eyeglasses which looks like conventional eyeglasses. Whenever the user wants to listen to music, watch a video, play a game, or answer a cell phone, all functions are at the finger tips by simply electrically connecting the DEP to the frame of the eyeglasses or other head mounted gear. The DEP can also include a wireless transmitter for transmitting a biological measurement by eyeglasses and head mounted gear, as described by in U.S. Patent Application Nos. 20040059212 and 20040242976.

The present invention also provides an electronic clip-on and a slip-on system which comprises a specialized clip-on of special dimensions with electronic capabilities and wiring for connecting one end of the clip-on in one temple with the opposite temple without going through a hinge mechanism or having the wire bent. The specialized clip-on and slip-on for frames of eyewear includes specialized retractable ear buds and electrical connections of special dimensions. It is also understood that the clip-on and slip-on embodiment can include a dual side clip-on or slip-on which houses ear buds in both sides (right and left), and one side houses electronics and power source, with said both sides (right and left) of the clip-on being electrically connected by a cable that extend along the back of the head or neck of the wearer.

It will be appreciated that the features of the invention optimize the use of head mounted gear and the frame of eyeglasses to be used as means to deliver sound and video to a user, without changing the comfort, style, and weight of the eyeglass frames, since the heavy, bulky, and cumbersome electronics are not housed in the frames. The present invention optimizes all areas by allowing the user to wear regular eyeglasses and other head mounted gear while allowing enjoyment of sound and video with specialized temples housing special ear buds with retractable cords.

The invention provides an entirely new approach for electronic apparatus and wearable electronics and provides numerous advantages including:
1. Extending the life of the electronics package because the electronics package is detachable from a short-lived WA that has a short life;
2. Extending the life of the WA because a broken or obsolete electronics component can be replaced with a new one, allowing for continued use of the WA;
3. Preserving and enhancing the comfort and usability of the WA, because the electronics need only be secured to the WA when the electronic function is being used;
4. Enhancing usability and preserving elegance and comfort of the wearable electronics since the electronics are small and confined to the dimensions of the WA;
5. Preserving elegance and function of the WA because the electronics and other parts are not visible to an external observer and the electronics, wires, and ear buds do not alter or distort the WA;
6. Expanding the utility of the DEP because the same DEP can be coupled with a variety of WA's such as eyeglasses, hats, helmets, visors, eye masks, and the like;
7. Increasing the durability of the DEP by keeping it away from the WA during situations that put the electronic package at risk of damage such as during cleaning of the WA;
8. Enhancing usage by providing a system that permits a user to experience each of vision, speech, and hearing in conjunction with a wearable electronic device;
9. Expanding the utility of a WA, which now can perform an electronic function;
10. Increasing the value of a WA, which while still very low cost is able to perform an electronic function;
11. Enhancing convenience of use of the system by eliminating the need to carry and store key accessories such as ear buds;
12. Limiting the possibility of the DEP being easily stolen or forgotten by the electronic device being felt at all times and worn on the surface of the body;
13. Increasing the adaptability of the DEP for by people of any size and weight, because the DEP can universally fit any size of wearable articles; and
14. Natural usage of the electronics by the electronics being held in position due to gravity and support of a body part and without the need of fastening the electronic device to the body.

A further example of a possible user of an embodiment of the present invention is a doctor. Ordinarily, it would not be acceptable for a doctor to wear heavy and bulky eyeglasses with visible electronics, buttons, or ear buds, as found in the prior art, because such features would be noticeable to a patient who is being examined. Such eyeglasses—which could be perceived as weird or frightening—could take away the seriousness of the doctor-patient relationship, and would not be helpful—or even, in some cases, permitted—at hospital or during delivery of health care. (This is also likely the case in any serious working environment or at school.) Furthermore, such weird and bulky eyeglasses could create unnecessary distraction to others. Since the eyeglasses (and other head mounted gear) of the present invention serve as an inconspicuous electronic device, such as a music player, the doctor could, for example, carry a DEP for playing music. During lunch, the doctor may wish to listen to some music, and connects the music playing DEP to the frames. He or she can then pull out the retractable ear buds from the temples of the eyeglasses and place them on the ears. The doctor may then, in a unremarkable manner, enjoy music since the only apparent parts are small ear buds. The DEP is camouflaged in the back of the head almost as regular cords for holding eyeglasses on the head. In order to better hide the DEP, the wires and system can be preferably encased in neoprene, leather, fabric, or similar material not easily visible. After the doctor finishes lunch, he allows the ear buds to retract back into the temples, disconnects the DEP from the temples, and puts the DEP away in a pocket. Immediately, the electronically capable eyeglasses look like regular eyeglasses without any cord hanging from the temples.

The doctor could also, for example. keep the DEP connected to the frames. Because the DEP is hidden behind the head and is unobtrusive, it would not hinder the doctor in his or her work or get in the way of examining patients. By keeping the DEP connected to the frames (or a different DEP), the doctor could take advantage of a small camera system housed in the frames while bulky electronics, circuit, and digital storage are housed in the DEP. This could allow the doctor to photograph portions of a patient's body, for example, a cancer lesion, simply by using eyeglasses already worn by the doctor. The photograph is stored in the DEP, and can be uploaded to a computer or television for analysis or storage. The eyeglasses can also be enabled with silicon microdisplay capabilities on the lens to permit the doctor to see the image to make sure the stored image includes all aspects required.

The doctor can use the DEP MP3 during lunch, the DEP camera for work, and a Bluetooth enabled telephone when going home. The eyeglasses can, therefore, provide multiple electronic functions. After getting home, the doctor may still need the eyeglasses for vision correction, but not for any further electronic functionality. Thus, the doctor puts the ear buds back in the temples and disconnect the DEP. With the ear buds hidden in the temples and no DEP connected, the eyeglasses turn into conventional eyeglasses.

Having eyeglasses with hanging and noticeable ear buds and electronics housed in the frame the whole time as provided by the prior art sends a message that the primary interest of that wearer is to listen to music or other things, not human voice. With the eyeglasses system of the invention, the user when comes back home can disconnect the DEP and hide the ear buds, and by wearing regular looking eyeglasses indicate interest in listening to people. After dinner, the doctor plugs the DEP Digital Video Player and using the retractable cord attached to the DEP places the display in front of the eyes and watches a video. Before going to bed, the user plugs in DEP digital audio player into the eyeglasses and listen to a speech recorded while wearing the eyeglasses with built-in microphone (since the digital storage and electronics are housed in the DEP, only a 1 mm in diameter microphone and a thin wire are housed in the structure of the eyeglasses frame).

The same DEP can be used with a variety of different WA's. For example, when the user goes to bed, the user who wants to sleep at the sound of music, grab the same DEP MP3 used during lunch time at work, but the same DEP MP3 is now plug into the eye mask instead of the eyeglasses. The user then places the ear buds from the eye mask on to the ears, cover the eyes with the eye mask, turn on the system, and goes to sleep at the sound of a soothing music. After waking up in the morning, the user can exercise while listening to music from a DEP attached to an electronically enabled cap.

Similarly, the user can wear an Inverted U-shape wearable PC to the airport. While listening to music with the electronic eyeglasses, the user works on a PowerPoint presentation using the Inverted U-shape wearable computer while waiting on security lines and waiting for the flight. During the flight, the user uses the Inverted U-shape wearable PC to do work and watch a movie. The keyboard and display of the Inverted U-shape PC can virtually "float" in the air at any height due to the self-adjusting extendable arms. Therefore, if a meal is served the user does not need to close the computer and stop viewing the movie or doing work. The keyboard is moved up and positioned over the tray table while the meal is placed on the tray table, allowing continue viewing a movie or doing work without interruption during the meal. This closes a 24 hour cycle wearing different wearable electronic devices for different activities and electronic functions.

Because the electronics are detachably connected to the WA's such as the eyeglasses and eye mask, the WA's can be cleaned and washed without jeopardizing the sensitive electronics, and when discarding the WA, the user can keep expensive electronics and reuse in another WA adapted to receive the electronic package.

The present invention also includes a method of using wearable electronics, comprising the steps of (1) affixing electrical connectors and wires to a wearable article, (2) electrically connecting in a releasable manner the electrical connector of the wearable article to a detachable electronic package resting against the structure of the WA, (3) activating an energy source to power the detachable electronic package, and (4) delivering at least one of sound or visual signal to the user through the wearable article.

A further aspect of the invention is a method of using a wearable computer, the wearable computer being a Inverted U-shape PC with two arms combining an extendable portion and accordion portion, said method comprising the steps of:
  a) connecting a keyboard to one arm,
  b) connecting a display to the opposite arm,
  c) creating a wired or wireless connection between the display and the keyboard,
  d) activating a power supply, and
  e) generating a processing function housed in either the display or keyboard.

Alternatively, the steps could include:
  a) connecting a keyboard to one arm,
  b) connecting a display to the opposite arm,
  c) connecting a processor to the keyboard and/or display,
  d) creating a wired or wireless connection for connecting the display, the keyboard, and processor
  e) activating a power supply, and
  f) generating a processing function in the processor part.

The invention further comprises a method of playing a DVD on a wearable device comprising the steps of:
  a) connecting a disc player to one arm,
  b) connecting a display to the opposite arm,
  c) connecting a power supply to the display and/or disc player,
  d) creating a wired or wireless connection for connecting the display, the disc player, and power supply
  e) activating the power supply, and
  f) generating an electronic function in the disc player.

The invention further comprises a method of playing video games on a wearable computer, comprising the steps of:
  a) connecting a video game control to one arm,
  b) connecting a display to the opposite arm,
  c) connecting a processor to the display and/or video game control,
  d) connecting a power supply to the processor
  e) creating a wired or wireless connection for connecting the display, the video game control, the processor, and the power supply
  f) activating the power supply,
  g) generating an electronic function in the processor, and
  h) generating at least a visual signal in the display.

A further embodiment of the invention is a method of watching images using a wearable system comprising the steps of:
  a) securing an imaging device to the end of the gooseneck arm of a support structure combining an extendable accordion portion and a flexible gooseneck portion
  b) positioning the support structure around a portion of the body
  c) elongating the stretchable arm secured to the imaging device,
  d) positioning the imaging device within the visual axis of the eye
  e) activating a power supply,
  f) generating an electronic function in the imaging device, and
  g) generating a visual signal in the imaging device.

The invention also comprises a method for using a hands-free wearable electronic device comprising the steps of:
  a) securing an electronic package to the end of an arm of a support structure combining an extendable accordion portion and a flexible gooseneck portion b) positioning the support structure around a portion of the body
  c) elongating the extendable portion of the support structure,
  d) adjusting the arm to position the electronic package in line with the eyes
  e) activating the power supply, and
  f) generating an electronic function in the electronic package Other features, benefits, and advantages of the invention will appear from the following description in conjunction with the accompanying drawings.

FIG. 1A shows an electronically-enabled pair of eyeglasses from the prior art. Electronics 1 are housed in temples 2 of the eyeglasses, or in the area adjacent to nose bridge 3. Arrow A represents the large amount of weight that is placed directly against the skin of ear region 2a, thereby promoting activation of pain fibers along the ear and provoking user discomfort. Also, with electronics 1 in temples 2, nose bridge 3 is weighed down, as represented by arrow B. This creates further discomfort, by encouraging the eyeglasses to slide down the wearer's nose.

Figure 1B:
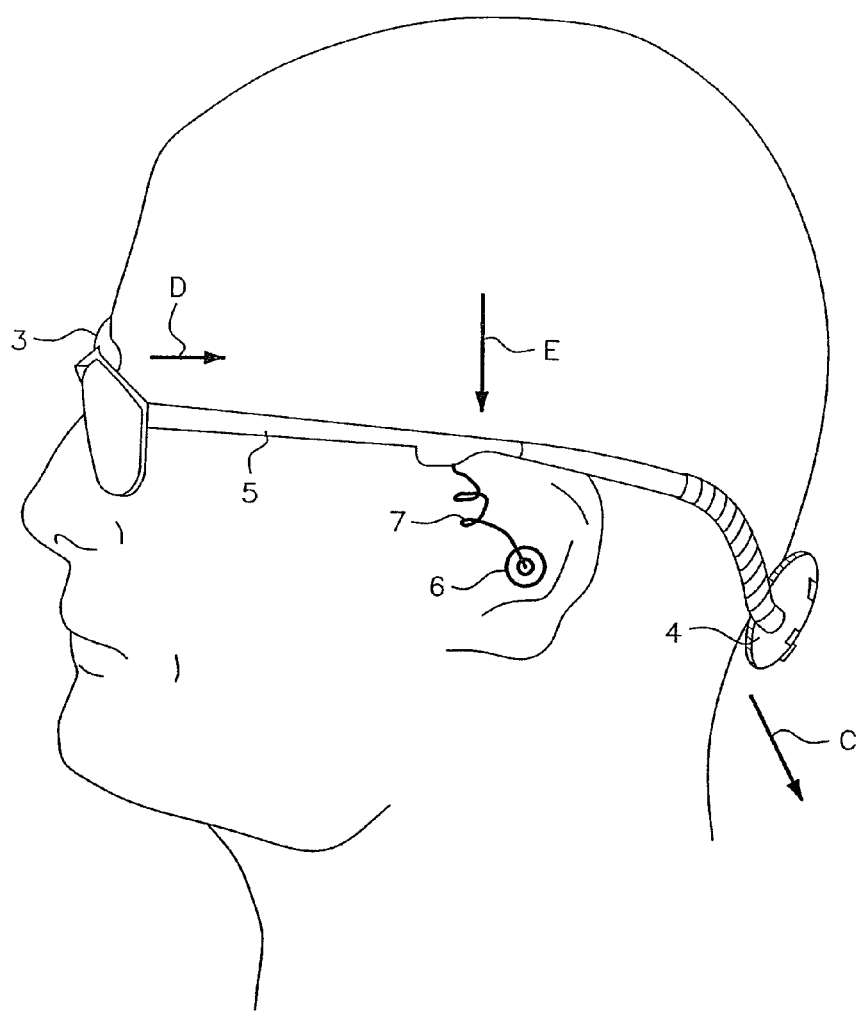
FIG. 1B is a perspective side view of a user wearing eyeglasses with a diagrammatic representation of the weight distribution using a DEP (detachable electronic package) of the present invention.

FIG. 1B shows an illustration of a preferred embodiment of the present invention. DEP 4 is positioned at the back of the head, preferably opposite to nose bridge 3. Temple 5 is thin, light weight and has no internal electronics. A second temple on the other side of the head is not shown. Ear bud 6 is connected to temple 5 by light weight coiled wire 7. The vector force, represented by arrow C, pulls the frame downward and applies a force to displace nose bridge 3 perpendicular to the plane of the face, represented by vector D. This transfers support of the eyeglasses to the nose, which is a less sensitive area than the ear, by reducing the weight applied to the ears (represented by smaller arrow E). This limits the activation of pain fibers in the more sensitive anatomic region of the ear.

Figure 1C:
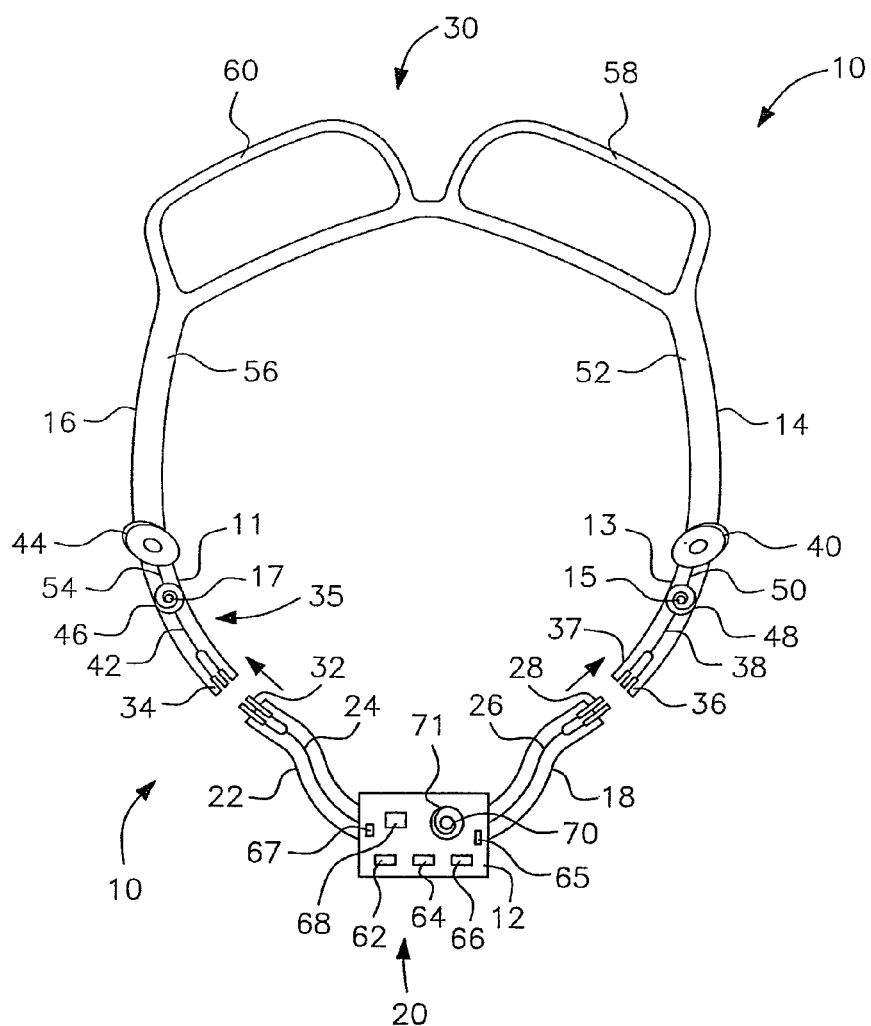
FIG. 1C is a top perspective view of the detachable electronic eyewear system of one embodiment of the present invention.

FIG. 1C shows a top perspective view of a detachable electronic eyewear system of the invention. Detachable wearable electronic system 10 of the invention comprises electronic eyeglasses frame 30 and detachable electronic package (DEP) 20. Detachable electronic eyeglasses frame 30 has two lens rims 58 and 60 and two temples, right temple 14 and left temple 16. Lens rims 58 and 60 can hold any type of lens (e.g. prescription, tinted, bifocal, clear, etc.). Right and left temples 14 and 16 each comprise two portions, right and left front portions 52 and 56, and right and left end portions 13 and 11. Front portions 52 and 56 define portions which are intended to extend along the side of user's head to the user's ear. Right and left end portions 13 and 11 include right and left free ends 37 and 35. Right end portion 13 preferably houses right ear bud 40, right coiled wire 48, and right connecting wire 50. Right connecting wire 50 connects ear bud 40 with coiled wired 48. Left end portion 11 preferably houses left ear bud 44, left coiled wire 46, and left connecting wire 54. Coiled wires 48 and 46 can elongate and retract and have spring capabilities. Alternatively coiled wires 48 and 46 can be secured to small spring loaded wheels or spools 15 and 17 with retracting capabilities. Either option allows ear buds 40 and 44 to be easily retracted for use and put back and hidden in temples 14 and 16 after use. Free ends 35 and 37 define ear portions which are shaped for placement around the wearer's ears. Free end portion 37 includes right electrical connector 36 and right wire 38 that connects right electrical connector 36 to ear bud 40 through wire 50. Free end portion 35 includes left electrical connector 34 and left wire 42 that connects left electrical connector 34 to ear bud 44 through wire 54.

Detachable electronic package (DEP) 20 is intended to extend across the neck or the back of the wearer's head and includes an electronics package 12, right cord 18 and left cord 22. Preferably right cord 18 and left cord 22 are disposed on opposite ends of electronic package 12. Right cord 18 houses right wire 26 which has electrical connection 28 on its end which can be releasably connected to electrical connection 36 of right temple 14. Left cord 22 houses left wire 24 which has an electrical connection 32 on its end which is releasably connected with electrical connection 34 of left temple 16. Electronics package 12 includes display 68, memory 62, power source 67, standard control buttons 66 such as play, stop, forward, and rewind and volume control, and conventional entry ports 65 for USB or computer connection for downloading/uploading as well as circuit board and microchips (not shown) well known in the art for controlling operations. Memory 62 may comprise known systems such as a flash memory or a hard drive. Electronics package 12 further includes retractable cord 71, which is preferably secured to a spring loaded wheel or spool 70 with retracting capabilities. This allows the electronics package to be easily retracted for use and put back and hidden in the back of the head after use. Display 68 can, for example, show the name of music being played or it could show a movie, by being brought from the back to the head into the visual axis of the eyes by extending retractable cord 71. Alternatively, instead of having wire 71 secured to spool 70, the DEP can have a coiled wire with retracting capabilities that can elongate for viewing the DEP and retract to its original position after use.

Electronics package 12 is preferably kept hidden behind the head, out of sight of the wearer as well as an external observer. Accordingly, control buttons 66 preferably have raised features or special positioning to allow the user to easily identify and use buttons 66 when electronics package 12 cannot been seen by the user. For instance, on the top part of electronics package 12 the first button (e.g., press button) is stop, the second button is pause, and the third bottom is play. On the bottom part of electronics package 12 the first press button is rewind and the second is forward while a dial type button functions to change volume. Alternatively, a dial looking button such as is found in digital music players (eg. iPod of Apple Inc.) can be used.

In addition to ear buds secured to coiled cords capable of elongation and with spring capabilities, the invention can also use a spring loaded spool cord of special dimensions and length, and with retractable extension. The preferred diameter for ear bud cord is less than 2.5 mm, and preferably less than 1.5 mm and most preferably less than 1 mm in diameter. The preferred length for ear bud cord is equal to or less than 20 cm, and preferably equal to or less than 16 cm and most preferably equal to or less than 10 cm in length. The preferred combined length of right wire 26 and left wire 24 connected to electronics package 12 is equal to or less than 45 cm in length, and most preferably equal to or less than 35 cm in length, and even most preferably equal to or less than 30 cm in length. It is also understood that in order to make the DEP smaller and lighter, passive means for powering the DEP can be used, in which the DEP receives energy from a remote source by electromagnetic induction, radio waves, and the like.

Figure 1D:
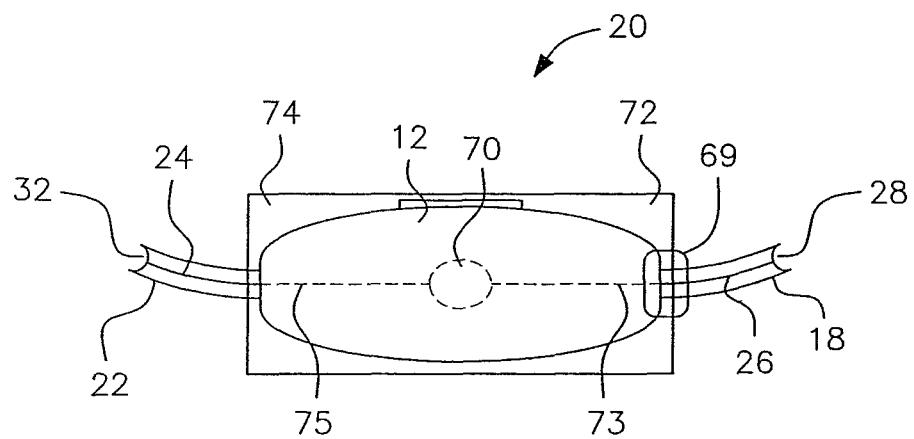
FIG. 1D is a diagrammatic planar view of a preferred embodiment of the DEP.

FIG. 1D shows a top view of a preferred embodiment of DEP 20 that includes a cradle-like housing 72 that defines a cavity 74 sized to accept and retain in a releasable manner electronics package 12, such as a digital music player, radio, cellular phone, a Global Positioning System, a personal digital assistant (e.g., Palm electronic organizer from Palm, Inc.), and the like. Release button 69 on the right side of housing 72 facilitates attaching and releasing electronics package 12 from the housing 72. Preferably, release button 69 is a spring-loaded mechanism that engages and retains a portion of electronics package 12 when in cradle cavity 74, and permits releasing the electronic package when needed. Right cord 18 and wire 26 have an electrical connector 28 at the free end, enter housing 72 in the right side, and connect with right wire 73 housed inside cavity 74. Wire 73 is connected to spool 70. Left cord 22 and wire 24 have an electrical connector 32 and enter housing 72 on the left side and connect with left wire 75 housed inside cavity 74. Wire 75 is connected to spool 70. Wires 73, 75 and spool 70 inside housing 72 are shown as broken down lines.

Figure 1E:
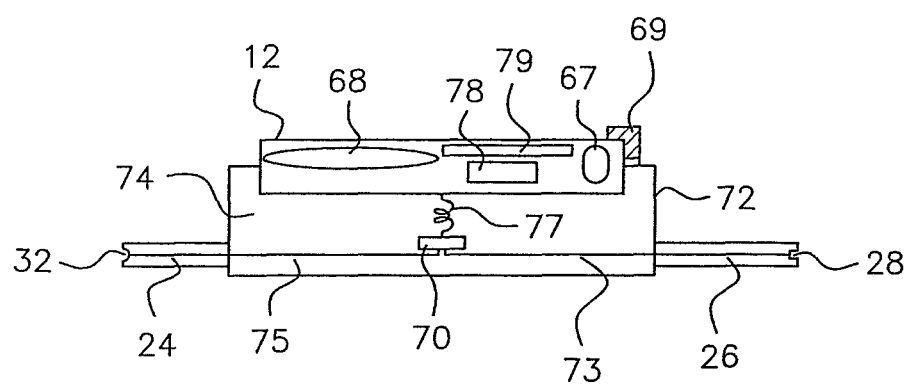
FIG. 1E is a diagrammatic side view of a preferred embodiment of the DEP.

FIG. 1E shows a side view of DEP 20 that includes cradle-like housing 72 that defines recess 74 sized to accept and retain in a releasable manner electronics package 12. Release button 69 holds electronics package 12 in recess 74. Spool 70 at the base of the cavity 74 has coiled wire 77, which is in electrical contact with right wire 73 and left wire 75. Coiled wire 77 is connected to electronic package 12 and works as a retractable/extendable wire via spool 70 to allow the user to bring the electronics package 12 from the back of the head to the visual axis of the eyes of the user by extending retractable wire 77. After looking at electronics package 12, the user may actuate spool 70—for example with a gentle pull—retracting retractable wire 77 and bringing electronic package 12 back to cavity 74. Electronics package 12 includes display 68, key pad 79, microchip circuit 78 and battery 67. It is understood that in order to make electronics package 12 smaller and thinner, power source 67 and microchip circuit 78 and other hardware may be housed in housing 72. Wire 73 is in electrical connection with wire 26 and electrical connector 28. Wire 75 is in electrical connection with wire 24 and electrical connector 32. This embodiment illustrates the use of a retractable wire system. However, it should be understood that a non-coiled wire wrapped around a spring-loaded mechanism would provide the same functionality, as could other arrangements. Although a release button is a preferred embodiment, it will be understood that a release button is not necessary, and that the force of the spring can be used to anchor the electronics package in the cavity.

Electronics package 12, which can be, for example, a digital music player or cell phone, is connected to housing 72 of DEP 20 with retractable wire 77 secured to a spool 70. This allows the user to interact visually with electronics package 12, and provides interaction with the key biological function of vision, notwithstanding the fact that electronics package 12 is housed completely away from the eyes of the user. Therefore, for example, the invention allows a user wearing a DEP digital music player to extend retractable cord 77 until electronics package 12, illustrated as a MP3 player, can been seen by the user. The user can then view display 68 and make the selection of music of interest using buttons 79. After making a selection, the user can release wire 77, which retracts MP3 player 12 back into cavity 74 in the back of the head and bidden away. Likewise, if electronics package 12 is a cellular phone, the wearer can extend retractable cord 77, dial using key pad 79, and then return the DEP (cell phone) to the back of the head and away from sight from an external observer.

Figure 1F:
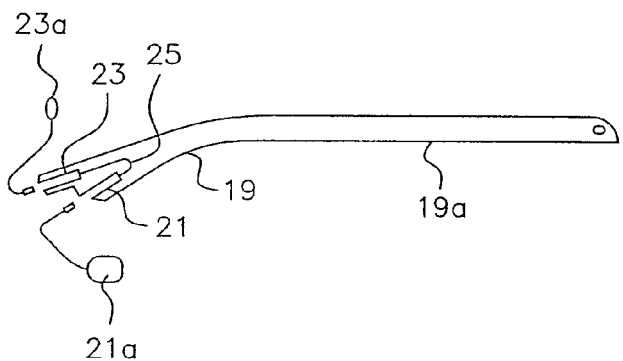
FIG. 1F is a diagrammatic side view of a preferred embodiment of a temple of eyeglasses of the invention.

It will be understood that an electrical connection for an ear bud disposed in the temples of the eyeglasses can be used. Therefore, as shown in FIG. 1F, temple 19a includes a first electrical connector 21 disposed in end portion 19 for connecting to an electronic device. Temple 19a also has a second electrical connector 23 adjacent to first electrical connector 21 for an ear bud. Electrical connector 21 is, in this embodiment, a female connection used to connect DEP 21a. Second electrical connector 23 for connecting with ear bud assembly 23a, is also, in this embodiment, female. Wire 25 connects first electrical connector 21 with electrical connector 23. The same structure can be used for the opposite temple.

Figure 1G:
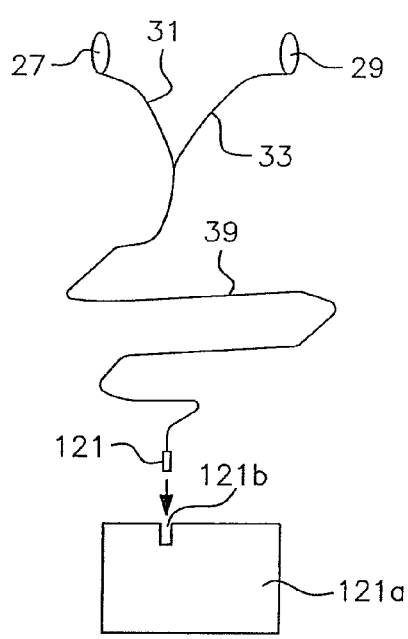
FIG. 1G is a diagrammatic view of an ear bud assembly of the Prior Art.

FIG. 1G shows a prior art system, which provides ear buds for stereo sound comprising ear buds 27 and 29 connected by wires 31 and 33, which combine to form wire portion 39, which terminates at electrical plug 121. Electrical plug 121 is removably connected to prior art electronic device 121a, which has a single jack 121b to connect with electrical plug 121. Because the prior art did not converge the ear bud system with the anatomy of the user's body, only one jack 121b is provided in the electronic device 121a and excessively long wires are needed with a usual length from ear buds 27 and 29 to plug 121 being more than 90 cm.

Figure 1H:
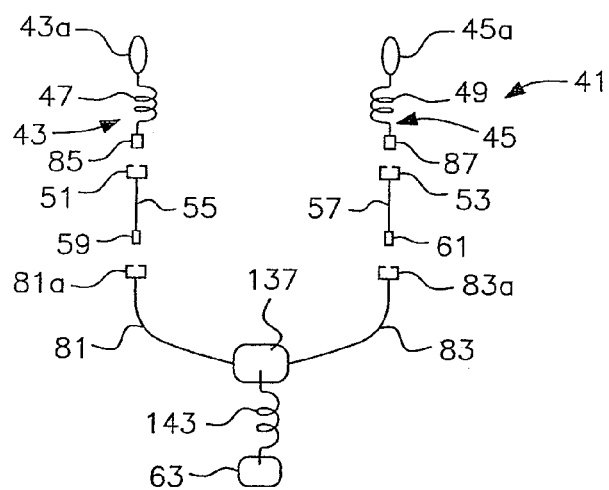

By contrast, one aspect of the present invention is a specialized ear bud system for stereo sound. By adapting the electronics to human anatomy, ear buds with very short wires can be used. As shown in FIG. 1H, ear bud system 41 for stereo sound comprises two separate ear bud assemblies 43 and 45. Each ear bud assembly 43 and 45 includes ear buds 43a and 45a, electrical plugs 85 and 87 and a coiled wires 47 and 49, which can elongate for placement on the ears. The preferred length of wires 47 and 49 is less than 15 cm, more preferably less than 12 cm in length, and most preferably less than 10 cm in length. This compares with the 90 cm length of the prior art wires.

Each ear bud 43a and 45a has a plug 85 and 87 which is releasably connected to electrical connector 51 and 53. Connectors 51 and 53 in turn are connected to wires 55 and 57, which terminate at electrical connections 59 and 61, Electrical connections 59 and 61 are releasably connected through connectors 81a and 83a to wires 81 and 83 disposed in each side of DEP 63. DEP 63 is housed in cavity 137 and secured to cavity 137 by coiled wire 143, which is in electrical connection with wires 81 and 83. Coiled wire 143 is able to elongate and retract, allowing DEP 63 to be removed from cavity 137. It is contemplated that the ear bud system 41 of the invention—comprised of two separate ear buds—could be used with a plurality of electronic devices of the invention. Ear bud assemblies 43 and 45 are not electrically connected to signal source and therefore cannot provide stereo sound without being connected to another electrical part. This is typically provided by the wearable electronic articles of present invention. Electronic devices of the prior art include only one jack for connecting one electrical plug for one ear bud assembly. Contrary to the prior art, and in order to create biologically fit wearable devices, the present invention teaches a method and device that uses two separate ear bud assemblies, and the wearable electronic articles of the invention preferably have two plugs for ear buds instead of one as provided by the prior art. It is also understood that a kit for stereo sound comprising a box housing two ear bud assemblies is within the scope of the invention.

Figure 37:
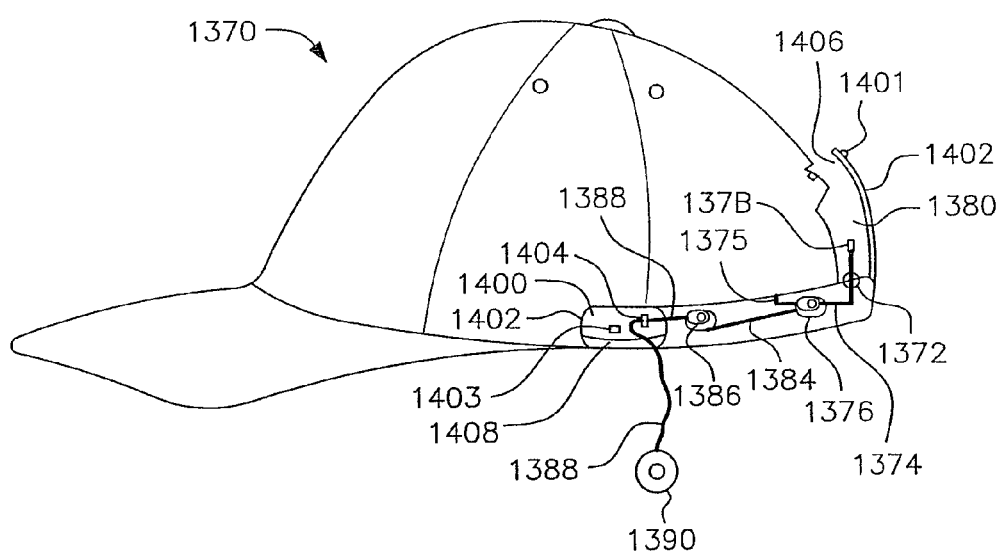
FIG. 37 is a perspective side view of a detachable electronic head mounted gear system of the invention.

FIG. 1J shows another specialized ear bud system 41 for stereo sound coupled to detachable electronic package 63. Ear bud system 41 includes separate ear buds 43 and 45, which are attached to wires 101 and 107. Preferably, wires 101 and 107 are very short. Ear buds 43 and 45 have plugs 85 and 87 which are releasably connected to electrical connectors 51 and 53 of wearable article 115. Connectors 51 and 53 have wires 55 and 57, which terminate into a single electrical plug 89. Electrical plug 89 is releasably connected to electrical connection 91 of DEP 63. Wearable article 115 (which could be, for example, a headband or a hat) includes pocket 119 for retaining DEP 63. Pocket 119 has slot 123 and coiled wire 125 secured to one of the walls of pocket 119. Wire 125 terminates at plate 127, which is housed inside the pocket 119. Plate 127 is releasably connected, preferably with a hook and loop fastener system, to fastener 135 (which is also preferably a hook and loop fastener) of DEP 63. The preferred length of wires 101 and 105 is equal to or less than 15 cm, more preferably equal to or less than 12 cm in length, and most preferably equal to or less than 9 cm in length. Such system can be used in an electronic wearable cap in a similar manner as illustrated in FIG. 37, which shows another preferred embodiment. It is understood that a spring loaded spool with retractable wire can be replaced by a coiled wire with retracting capabilities without spring loaded mechanism. It is further understood that when a storage area is used, such as pocket, the wire can be straight and without retracting capabilities, with the wire remaining in a rolled up or folded position when stored and straight when use for placement on the ears. Alternatively, connector 91 may be connected with wire 125, and then the Velcro strip may use electrical pads for electrically connecting to electronic device, or plug 89 may use a coiled wire, so when coiled wire 125, which is used for support, extends, then coiled wire of plug 89 extends as well, maintaining thus electrical connection with ear buds during extension. One coiled wire is for electrical connection, and the other coiled wire is for support.

Figure 2A:
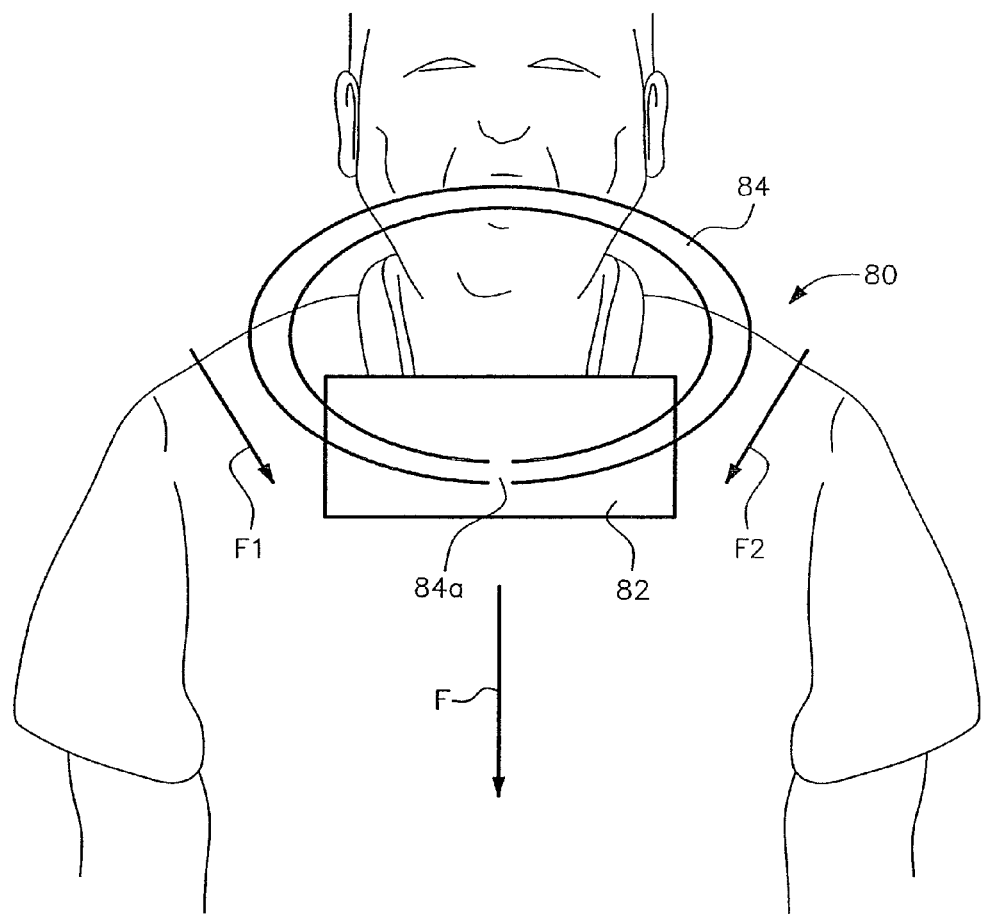
FIG. 2A is a perspective front view of a user wearing a wearable electronic device around the neck with a diagrammatic representation of the weight distribution by the Prior Art

FIG. 2A shows wearable electronics provided by the Prior Art when worn by a user. The weight distribution of the prior art will activate pain fibers in the neck, causing discomfort and limiting the utility of the devices. A relatively heavy electronic device such as computer or other electronic device 80 will elicit discomfort and prevent comfortable wear when the electronics, display, and other parts collectively gathered in box 82 are supported by collar 84 that encircles the neck. Even if there is an opening 84a in collar 84, the prior art systems need to close that opening circle in order to be operational and was designed to be supported by the user's neck. This is because any time the two ends of a wrap-around system connect, for example forming a circle such as in collars around the neck, belts around the waist, or straps across the chest, and the like described in the prior art, there is a change in the vector force and more pressure is applied to a localized anatomic area, which can more readily activate pain fibers and elicit discomfort. The prior art, in order to keep the whole electronic system in one location, imposed significant pressure in one localized anatomic area. Therefore, pain receptors are activated based on the amount of pressure within this localized anatomic area, leading to discomfort when those devices of the prior art are used. While there is an apparent advantage, as provided by the prior art, in keeping the weight of the device in a localized anatomic area and covering a smaller surface area of contact with the body, this apparent advantage works against the biology of the body and inhibits comfortable use. Thus, the present invention further contemplates a wearable electronic device which distributes weight to different anatomic regions, increasing user comfort as compared to the prior art. Vector F in FIG. 2A represents the large amount of weight that is placed against the neck, and is the to total of the weight of the right and left side of the collar, represented by vectors F1 and F2. The resulting weight represented by vector F creates pressure in the sensitive neck area. Furthermore, by not creating proper weight distribution of the device on the user, which is very difficult when it is supported by a collar around the neck, there will be acceleration and motion of the device, which can create friction on the user and increases the user's discomfort in the neck area.

In order to provide a useful, practical, and comfortable wearable electronic device, a series of key criteria should be met, as is accomplished by present invention. First, it is important that the weight of the device be shifted to areas that are less sensitive to pain and discomfort. In accordance to one embodiment of the invention, weight is shifted for instance to the nose and to the shoulder.

Second, in order to be more easily used, the system needs to function like a conventional computer and include all parts of a conventional computer. In one embodiment of the present invention, the wearable electronic device includes all the components of a conventional computer including heavier and large items such as a keyboard. It also provides a keyboard that can be typed on with two hands and a display (or monitor) that provides large visual angles.

Third, to achieve proper weight distribution, the electronic parts should be disposed using two arms, spaced apart from each other. Fourth, the arms need to have a combination of flexible and extendable portions for conforming to the anatomy of the body and to position of the parts when in use, and to allow a compact spatial conformation when not in use. This makes wearing and use of the wearable electronic device more practical.

Fifth, to achieve stability and good weight distribution, the supporting structure may comprise a cord, which runs continuously from one end of the device to the other, and which holds the electronic components at the end of each arm. Sixth, the masses of each side of the device should be similar. In accordance with one embodiment of the invention, this is achieved by disposing a keyboard one side and a display unit at the opposite side, the display unit and keyboard being of similar dimension and weight. Seventh, the wearable electronic needs to be stable while in use, for example while the user is typing. This may be accomplished by having a counter weight effect arising from a connection between the display unit and a power source.

Eighth, the weight of the wearable electronic device should not be placed in only one anatomic area in order to avoid localized pressure, which can more easily activate pain fibers. Thus, the weight of the wearable electronic device should be spread to different anatomic areas. For example, one embodiment of the present invention provides a wearable electronic device in which the weight is spread to four different anatomic areas: neck, shoulder, chest, and waist.

Ninth, the greatest part of the mass of the wearable electronic device (ordinarily represented by the electronics) should be disposed at the ends of an independent tube-like structure that rests directly against the body. This achieves a better balance between the two sides and conformability to the body. Tenth, in order to increase the utility of the unit, the wearable electronic should have the capability to be used when not worn on the body. Eleventh, the wearable electronic article will preferably not encircle, rest against, or put pressure on the neck area, ear area, and other sensitive areas of the body.

These principals are incorporated into the embodiment shown in FIG. 2B, which shows a diagrammatic representation of a preferred embodiment of the wearable electronic computer of the invention. FIG. 2B shows the weight distribution of a preferred embodiment of the present invention including inverted U-shape support structure 88 with arms 90 and 92. In another embodiment, the support structure can have an inverted V-shape. Arm 90 has keyboard 94 disposed at its end. Arm 92 has a display 96 disposed at its end. Therefore, support structure 88 covers three distinct anatomic areas: neck 93, shoulders 95, and chest 97. The weight is further distributed to a fourth anatomic area, by securing box 96—housing a power source and electronics—to the user's waist. Box 96 is connected to support structure 88 by cable 98. By having arms 90 and 92 spaced apart, there is less pressure on any one particular anatomic area, inhibiting the activation of pain receptors.

The inverted U-shaped support structure distributes the devices weight to multiple anatomic areas. It does this, from the physical stand point, as a cord connecting two masses (m1 and m2) exemplified in the invention by display 97 (m1) and a keyboard 94 (m2), with cord 93 running over a "pulley," represented by the user's neck and shoulder. The forces in play are the downward force of gravity and the upward force due to the tension in the cord. Masses m1 and m2 should be similar to avoid acceleration, because acceleration would cause friction in the user's skin and activation of pain fibers. Therefore, the parts of the electronic device are disposed in a manner that the mass in one side of the cord is similar to the mass in the opposite side of cord 93. This creates equal or roughly equal tension in each side of cord 93. Vector G represents the distributed force in the right arm, which is divided into three components: vector G1 for the neck, vector G2 for the shoulder, and vector G3 for the chest. The same applies to vector H on the opposite side, represented by vectors H1 (neck), H2 (shoulder), and H3 (chest). Vector GH represents the pressure in the user's neck, and is much smaller than vector F of the prior art as shown in FIG. 2A. Vectors J1 and J2 represent the tension in cord 93 and vectors G and H are preferably approximately or precisely equal. Therefore no acceleration or friction is generated, allowing for comfortable use. Other benefits and features will become apparent from the description and figures pertaining to the related embodiments described in other portions of this specification. Although two arms are described, it is understood that three or more arms can also be used and provide good weight distribution and proper design, as in accordance to the teachings of the invention.

The pain threshold in the neck is generally in the range of 40 to 70 $g/mm^2$; in the shoulder and adjacent areas, the pain threshold is generally in the range of 60 to 100 $g/mm^2$. Pain receptors are typically not activated until the pressure reaches those limits, and therefore the weight of the wearable electronics of the invention takes this into account to provide comfortable wear. In addition to its weight distribution, the absolute maximum weight supported by the anatomic area is important to prevent activation of pain fibers. Based on the pressure and pain threshold in the neck, shoulder, and chest, the present invention provides proper weight, weight distribution, and design of the structure of the wearable device to allow comfort and long term use of the wearable electronic device.

By way of illustration, but not of limitation, an illustrative preferred embodiment will is described: This embodiment of the wearable electronic system of the invention comprises an inverted U-shaped support structure measuring preferably 60 cm in length in its non-extended configuration. It combines an extendable portion, preferably using a spinal configuration, and a flexible gooseneck portion. The support structure has a surface area in contact with the user of approximately 1 cm$^2$ per centimeter of length. This provides for approximately 600 cm$^2$ of the support structure in contact with the user, equally divided among neck, shoulder and chest. The device provides for a preferred maximum weight of 700 grams on each arm of the support structure (1400 g total), which can be supported in the neck and shoulder/chest area in a comfortable manner without activating pain fibers. Although each arm can support 850 grams, preferably, the maximum weight for comfortable wear on each arm of the support structure is equal to or less than 650 grams, and most preferably equal to or less than 500 grams, minimizing activation of pain fibers in the user.

Although the invention can function solely with all of the components supported on the inverted-U support structure, in order to optimize weight distribution, the invention can also spread the weight to areas in the body that are biomechanically fit to hold a larger amount of weight, such as the waist area. Accordingly, the support structure can be connected by a connecting cord to a housing supported on the user's waist. Heavier parts such as a power source, mother board, hard drive, DVD player/writer, and other computer parts are preferably displaced to the waist area, and held in place preferably by a belt clip or other fastening means to the waist area of the body.

Figure 3:
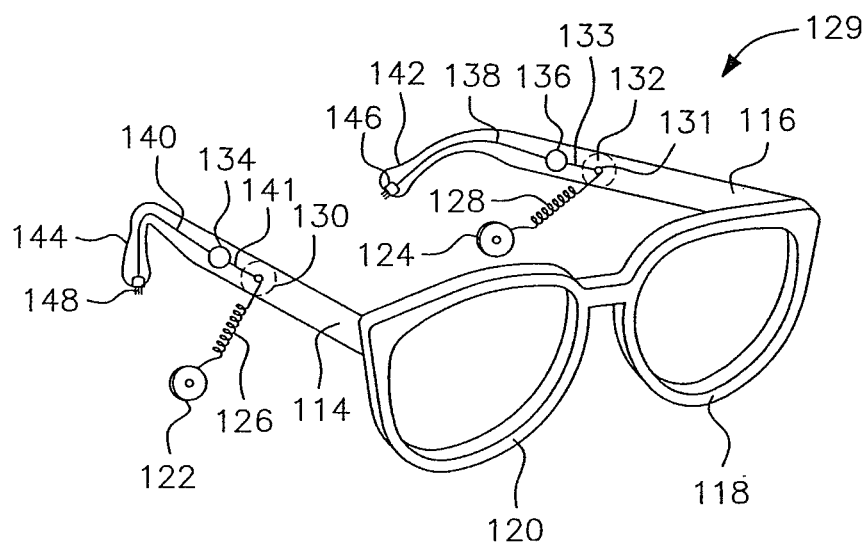
FIG. 3 is a perspective front view of the electronic eyewear of the invention with extended ear bud cords.

FIG. 3 illustrates another biologically fit and optimally distributed weight wearable electronic article of the invention, represented by eyeglasses. Accordingly, FIG. 3 shows detachable electronic eyeglasses 129 including right lens rim 120 and right temple 114 and left lens rim 118 and left temple 116 with extended right ear bud cord 126 and left ear bud cord 128. Right temple 114 includes portion 134 which houses cord 126, portion 130 which houses right ear bud 122, portion. 141 which is connection between portion 134 and 130, wire 140 and electrical plug 148 at the end portion 144. Left temple 116 includes portion 136 which houses cord 128, portion 132 which houses left ear bud 124, portion 133 which is connection between portion 136 and 132, wire 138 and electrical plug 146 at the end portion 146. Cord 128 inside portion 132 is preferably secured to a rotating cylinder 131 for frictionless winding of cord 128. FIG. 3 shows cord 128 and 126 in a tension-free manner and extended for use and placement on the ear of the wearer. Cords 128 and 126 extend and retract upon actuation working as a retractable ear bud cord spool. The invention allows easy and repeated pulling and retracting of the ear buds 122, 124. A release button (not shown) to allow cords 126 and 128 to retract automatically back into house 134 and 136 can also be used.

Figure 4:
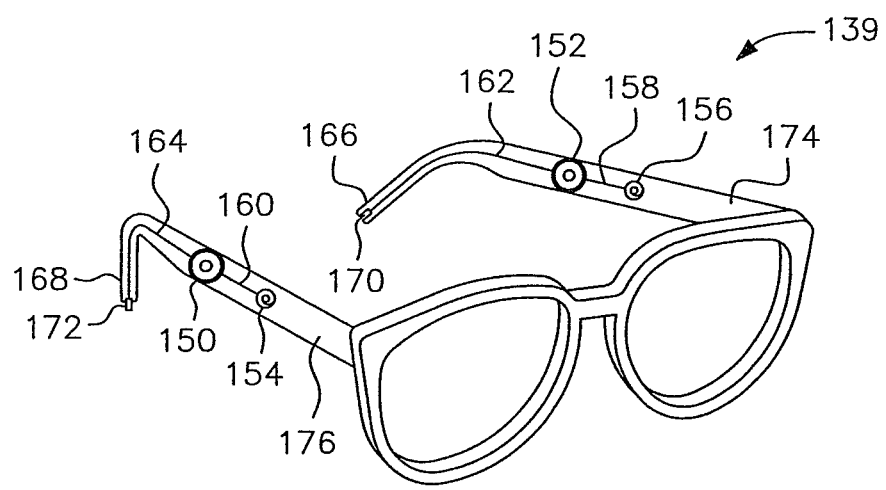
FIG. 4 is a perspective front view similar to FIG. 3 showing retracted ear bud cords and ear buds inside the temple of the eyeglasses.

FIG. 4 shows detachable electronic eyeglasses 139 including right temple 176 and left temple 174 with right ear bud cord 154 and right ear bud 150 retracted inside temple 176 and left ear bud 152 and left ear bud cord 156 retracted inside temple 174. Right ear bud 150 is connected to coiled up cord 154 through wire portion 160 and to electrical connector 172 through wire 164 housed in the end portion 168 of temple 176. Left ear bud 152 is connected to coiled up cord 156 through wire portion 158 and to electrical connector 170 through wire 162 housed in the end portion 166 of temple 174.

Figure 5A:
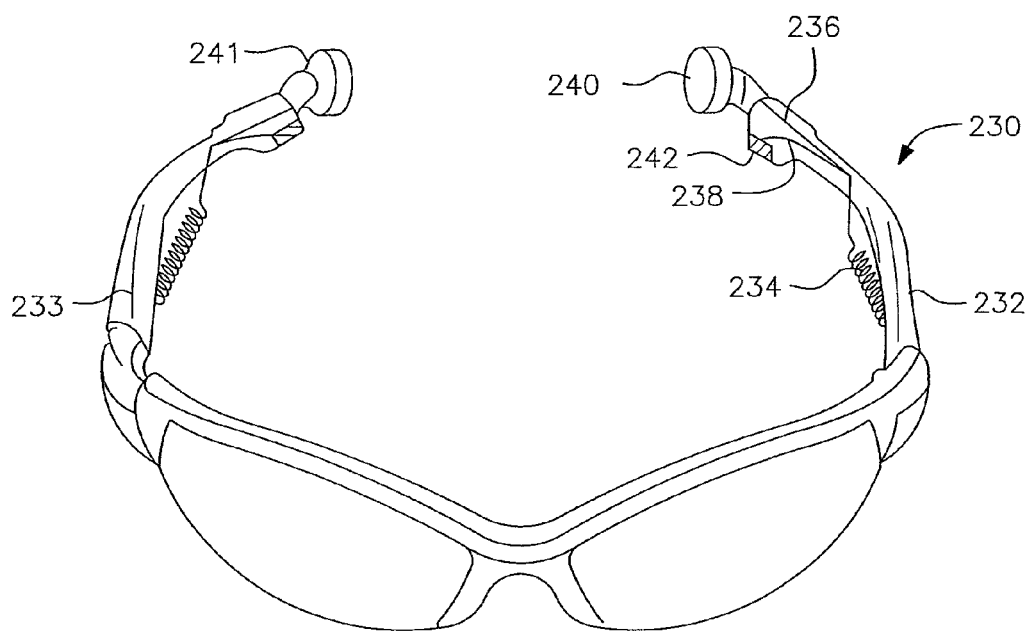
FIG. 5A is a perspective front view of another embodiment of the detachable electronic eyeglasses of the invention.

FIG. 5A to 5D shows different embodiments of the temple of the eyeglasses in accordance to the invention. It is noted that temples 233, 234 in FIG. 5A are substantially identical to each other such that description of features of one temple herein applies to the other temple as well. FIG. 5A shows the detachable electronic eyeglasses 230 including specialized right ear bud 241 and left ear bud 240 wherein such ear buds 240, 241 are an extension of temple 233 and 234. This embodiment allows the right ear bud 241 and left ear bud 240 to be completely hidden behind the ear of the wearer.

Figure 5B:
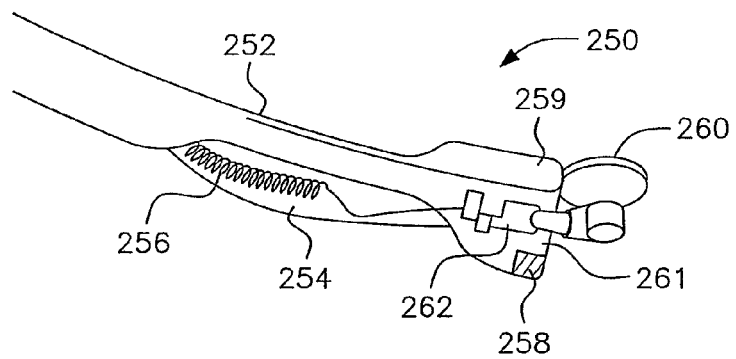
FIG. 5B is a perspective side view of temple of the detachable electronic eyeglasses of the invention of FIG. 5A.

FIG. 5A shows detachable electronic eyeglasses 230 having a right temple 233 and a left temple 232. Left temple 232 comprises coiled wire 234 which extends along the side of temple 232. Coiled wire 234 includes two wires 236 and 238, with wire 238 connected to electrical connector 242 and wire 236 connected to ear bud 240, thus creating an electrical circuit from ear bud 240 to electrical connector 242, with said electrical connector 242 releasably connected with electrical connector of DEP (not shown). FIG. 5B shows the end portion 252 of right temple 250 and includes portion 254 at the end of temple 250, with said portion 254 housing coiled wire 256 which is connected to ear bud assembly 260, and portion 261 at the free end 259, which houses electrical connector 258. By way of illustration, it is shown a clip 262 at the free end 259, which secures ear bud assembly 260 to said free end 259 of end portion 252 of temple 250. It is understood that although a clip is provided as means to secure the ear bud 260 to the free end 259 of the frame, any fastening or adhesive means can be used to secure and/hold ear bud assembly 260 to free end 259.

Figure 5C:
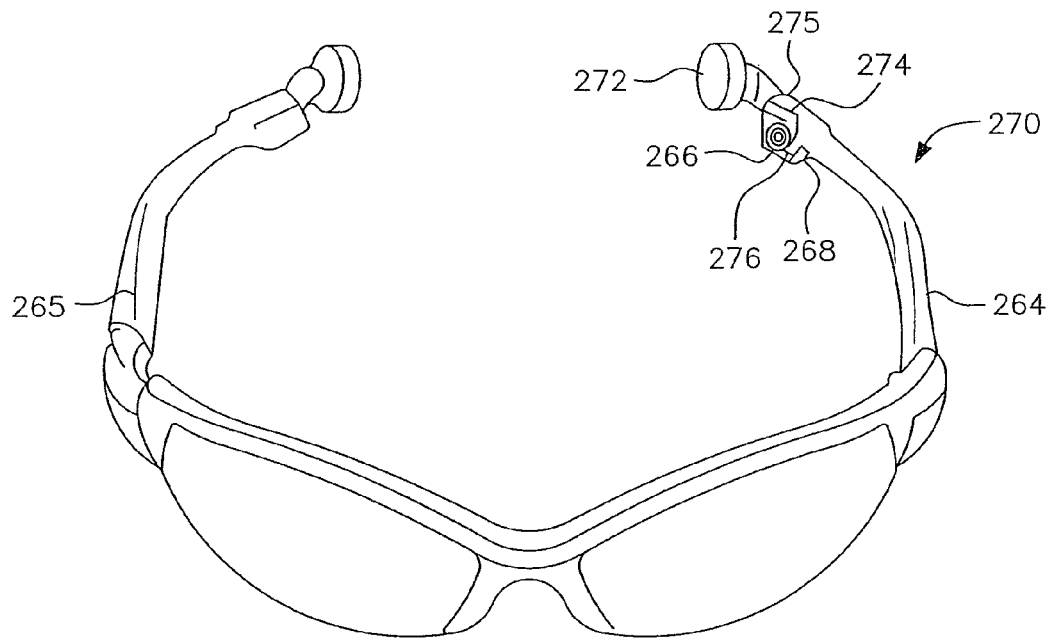
FIG. 5C is a perspective front view of yet another embodiment of the detachable electronic eyeglasses of the invention.
Figure 5D:
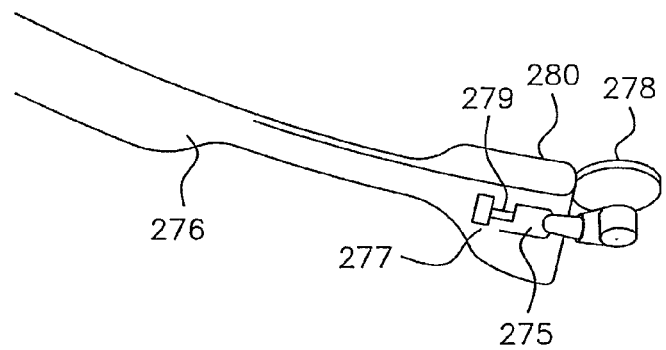
FIG. 5D is a perspective side view of temple of the detachable electronic eyeglasses of the invention of FIG. 5C.

It is noted that temples 264, 265 in FIG. 5C are substantially identical to each other such that description of features of one temple herein applies to the other temple as well. Accordingly, in FIG. 5C there is seen detachable electronic eyeglasses 270 having a right temple 265 and a left temple 264. In this embodiment, all the retractable wiring 266, wire 274, wire 276 and electrical connector 268 are housed at the free end 275 of the temple 264. End portion 275 houses spool-based retractable wire 266 with said wire 266 having two ends 274, 276, wherein wire end 274 is connected to ear bud 272 and wire end 276 is connected to electrical connector 268. Electrical connector 268 can function as an electrical pad and adapted to make electrical contact with electrical connectors of a DEP (not shown). FIG. 5D shows a magnified view of end portion 276 with its free end 280 having a portion 277 for housing wires and electrical connectors (not shown), and clip 275 which holds wire 279 in place, with said wire 279 connected to ear bud 278. In these embodiments the thickness of temples 264 and 265 are no longer limited by the size of the ear bud. Accordingly, temples 264 and 265 can be made very thin.

Figure 5E:
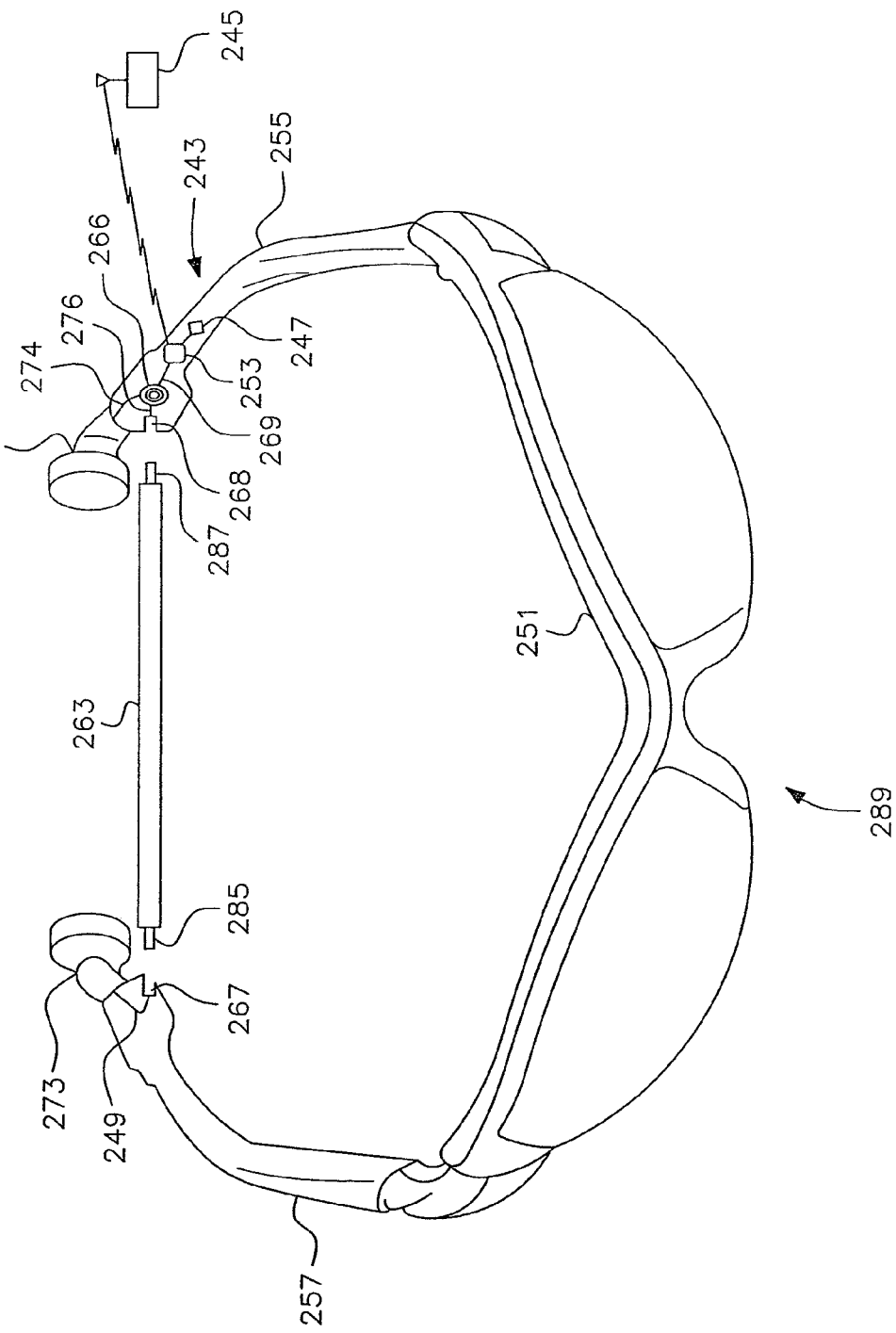
FIG. 5E is a perspective view of a detail of the ends of the temples.

In FIG. 5E there is seen another embodiment of the specialized eyeglasses of the invention with wireless transmission of signals comprised of wireless detachable electronic eyeglasses system 289 including connecting cable 263 and wireless electronic eyeglasses 251 having right temple 257 and left temple 255 and right ear bud 273 and left ear bud 272. Wireless eyeglasses 251 is in wireless communication with electronic package 245 such as a digital music player, cellular, phone, and the like. Connecting cable 263 has right electrical connector 285 and left electrical connector 287 with said right connector 285 and left connector 287 being releasably connected with right female electrical connector 267 and left female electrical connector 268 of wireless electronic eyeglasses 251. Within temple 255 is disposed a wireless transceiver 253 for transmitting and receiving wireless signals, power source 247, retractable wiring 266, wire 269, wire 274, wire 276, and electrical connector 268. End portion 243 of temple 255 houses spool-based retractable wire 266 with said wire 266 having two ends 274, 276, wherein wire end 274 is connected to ear bud 272 and wire end 276 is connected to electrical connector 268. Right temple 257 includes ear bud 273 which is electrically connected to electrical connector 267 in temple 257 through wire 249. Transceiver 253 is disposed within temple 255, preferably at the end portion, however it is understood that transceiver 253 can be disposed on or within any portion of temple 255. Transceiver 253 is electrically connected with spool-based retractable wire 266 through wire 269, for delivering a wireless signal received by transceiver 253 to ear buds 272 through wire 274 and to ear bud 273 through connecting cable 263, whereupon the present invention can deliver sound to both ear buds 272, 273 and allow therefore experiencing stereo sound. It is also understood that a power source cab be disposed within temple 257 to increase battery time. Connecting cable 263 can be replaced by a wire going from left temple to right temple, but such embodiment has drawbacks and limitations since the wire has to go through the hinge mechanism of the eyeglasses.

Figure 6:
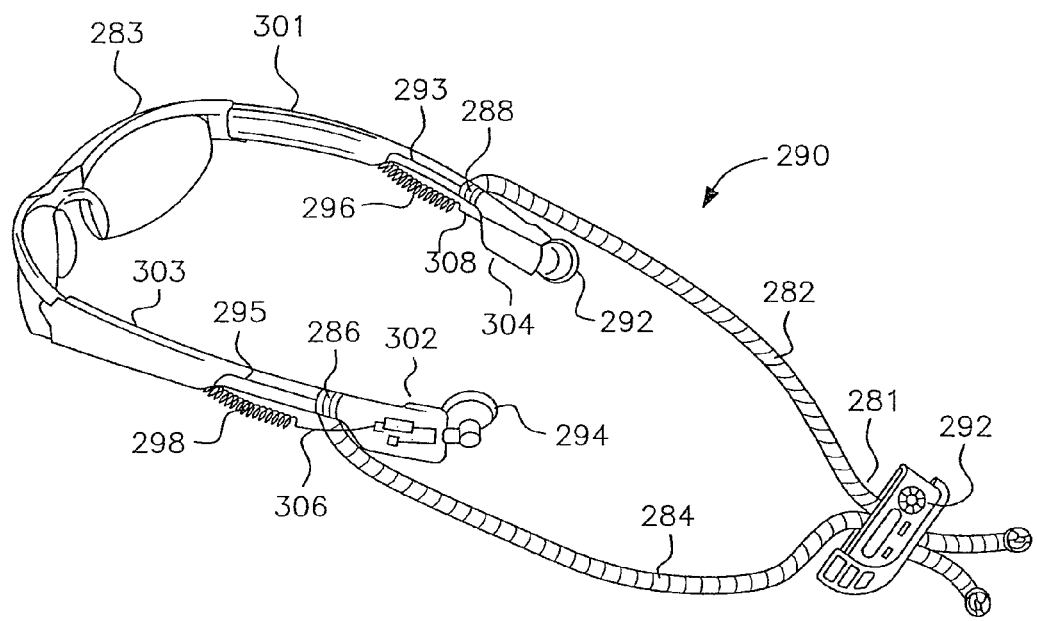
FIG. 6 is a perspective top side view of another embodiment of the detachable electronic eyeglasses system of the invention.

FIG. 6 shows the detachable electronic eyeglasses system 290 of the invention comprising DEP 281 and detachable electronic eyeglasses 283, which are connected to each other through electrical connections 286 and 288. DEP comprises right and left cords 282, 284 and electronic package 292. Detachable electronic eyeglasses 283 comprises temples 301 and 303, with said temples 303, 303 housing coiled retractable wires 296 and 298 with right and left ends 308 and 306 connected to right and left ear buds 292 and 294 at right and left free end 302 and 304 while right and left wire end 295 and 293 are connected to right and left electrical connection 286 and 288.

Figure 6A:
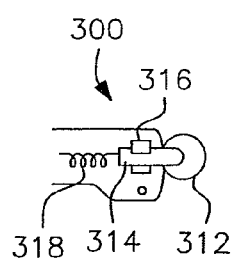
FIGS. 6A to 6D are perspective side views of a temple assembly attachment of the detachable electronic eyeglasses of the invention.
Figure 6B:
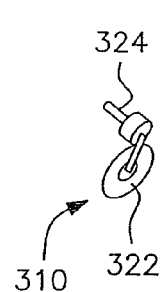
Figure 6C:
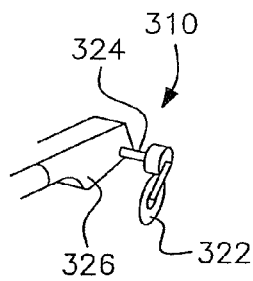
Figure 6D:
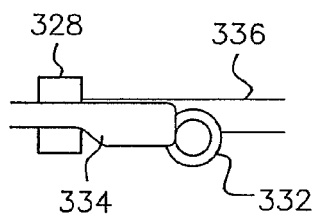
Figure 6E:
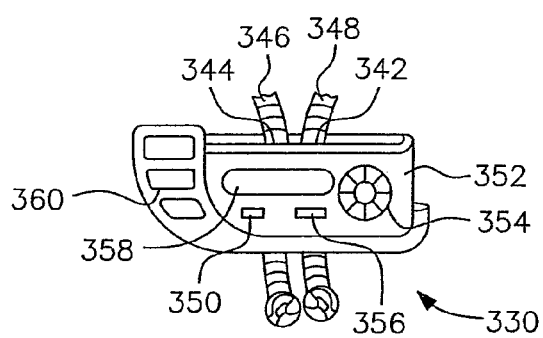
FIG. 6E is a perspective rear view of an exemplary DEP of the detachable electronic eyeglasses system of the invention.

FIG. 6A to 6D shows exemplary embodiments for securing ear buds to the free end of the temples. Accordingly, FIG. 6A shows free end 300 having a hook 316 holding ear bud rod 314 and its associated ear piece 312 and wire 318. FIG. 6B shows pin/ear bud assembly 310 comprising pin 324 and ear bud 322. FIG. 6C shows pin assembly 310 comprised of ear bud 322 and pin 324 releasably connected to free end 326. FIG. 6D shows an exemplary free end assembly 320 comprising ear bud 332 attached directly to free end 334, with wire 336 of DEP running adjacent to ear bud 332 and connected to free end 334 through a metallic plate 328 working as electrical connector. FIG. 6E shows an exemplary DEP 330, which comprises two wire portions 346, 348 with electrical connectors 344, 342, and electronic package 352, with said package 352 including standard play/pause/stop buttons 360, ports 358, 356, search button 354, and speaker 350.

FIG. 6F shows a side view of the detachable electronic eyeglasses 291 when worn by user 361 and that includes wire 313 connected to ear bud 315 and female electrical connector 317 disposed in the mid portion 319 of temple 305 with said female electrical connector 317 being releasably and electrically connected with male electrical connector 307 of cord 309 of DEP 321.

DEP 321 includes a microphone 311 that may be disposed in the upper third portion of cord 309 with said cord 309 electrically connected to electronic package 292, such as a cellular phone. Alternatively a microphone may be installed directly into electronic package 292. Cord 309 has electrical connector 307 in its free end while the opposite end is connected to electronic package 292 that is positioned in the back of the neck of user 361. It is understood that a male electrical connector or plug can be used in the temple 305 while male electrical plug 307 of cord 309 is replaced by a female electrical connector.

During cellular telephone use, the microphone disposed in the DEP captures sound and a wireless transmitter in the electronic package transmits sound to a remote location while a receiver in the electronic package receives an audio signal and transmits the sound to ear buds. Electronic package can also include a recorder that records the sound being received and transmitted. The invention allows therefore a user wearing a DEP cellular phone to interact with the electronic package using speech, a key biological function, and without increasing the weight or changing the appearance of the eyeglasses frame.

Figure 7:
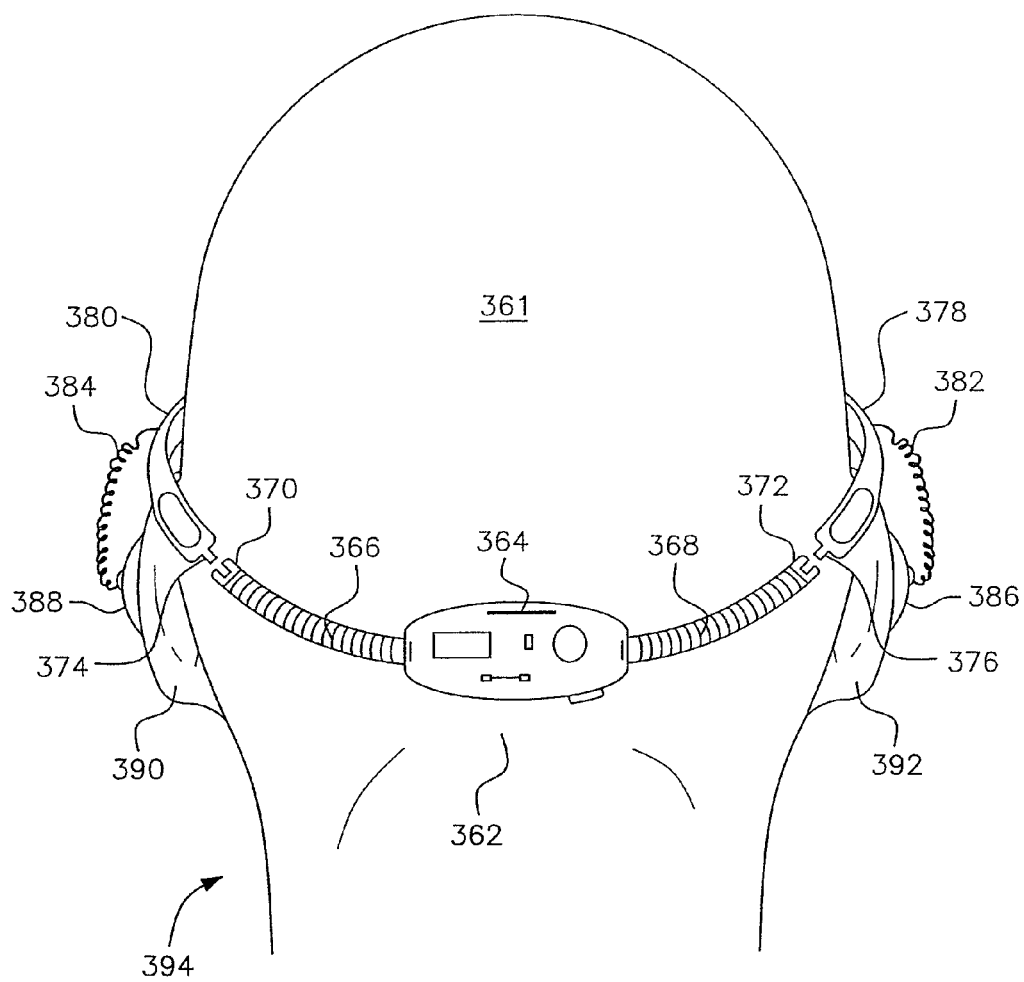
FIG. 7 is a perspective back view of the detachable electronic eyeglasses system of the invention when worn by a user.

FIG. 7 shows the detachable electronic eyeglasses 394 when worn by user 361, and having ear buds 386, 388 and associated coiled wires 384, 382 placed on the ears 390, 392 of user 361. FIG. 7 also shows DEP 362 comprised of electronic package 364, wires 366, 368, and electrical connectors 370, 372 releasably connected to electrical connectors 374, 386 of temples 380, 378 of detachable electronic eyeglasses 394 worn by user 361.

The electronic package 364, such as a digital music player or a cell phone, of the DEP 362 is electrically connected to right temple 378 and left temple 380 and with right ear buds 386 and left ear bud 388, allowing the hearing of the wearer to interact with and receive sound from the electronic package 364, and providing thus interaction with a key biological function, which is hearing despite the electronic package 364 not having capabilities to emit an audible signal and without changing the appearance of frame of the eyeglasses.

Figure 8:
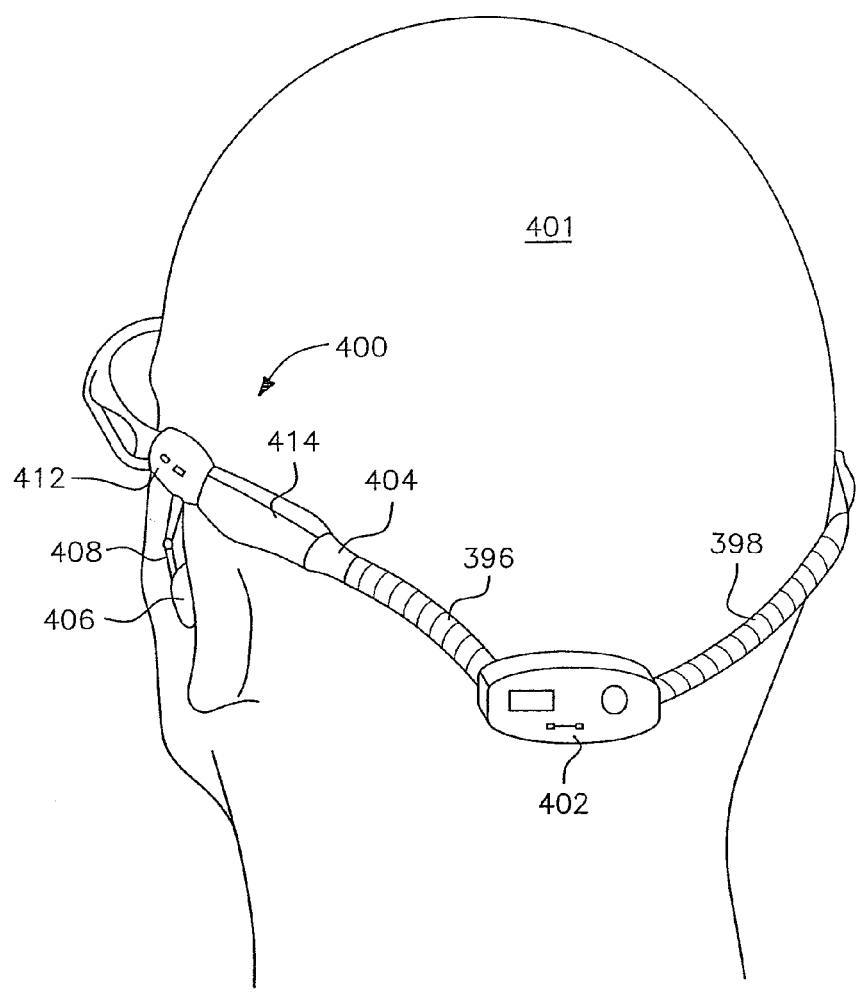
FIG. 8 is a perspective back view of another detachable electronic eyeglasses system of the invention when worn by a user.

Referring to FIG. 8, the detachable electronic eyeglasses system 400 with robotic arms 408 is worn by user 401, and there is seen the DEP 402 with wires 396, 398 which create an electrical circuit with eyeglasses 412 through electrical connection 404, for connecting DEP 402 to temple 414 and transmitting sound from DEP 402 to ear bud 406 through wire housed in robotic arm 408.

Figure 9:
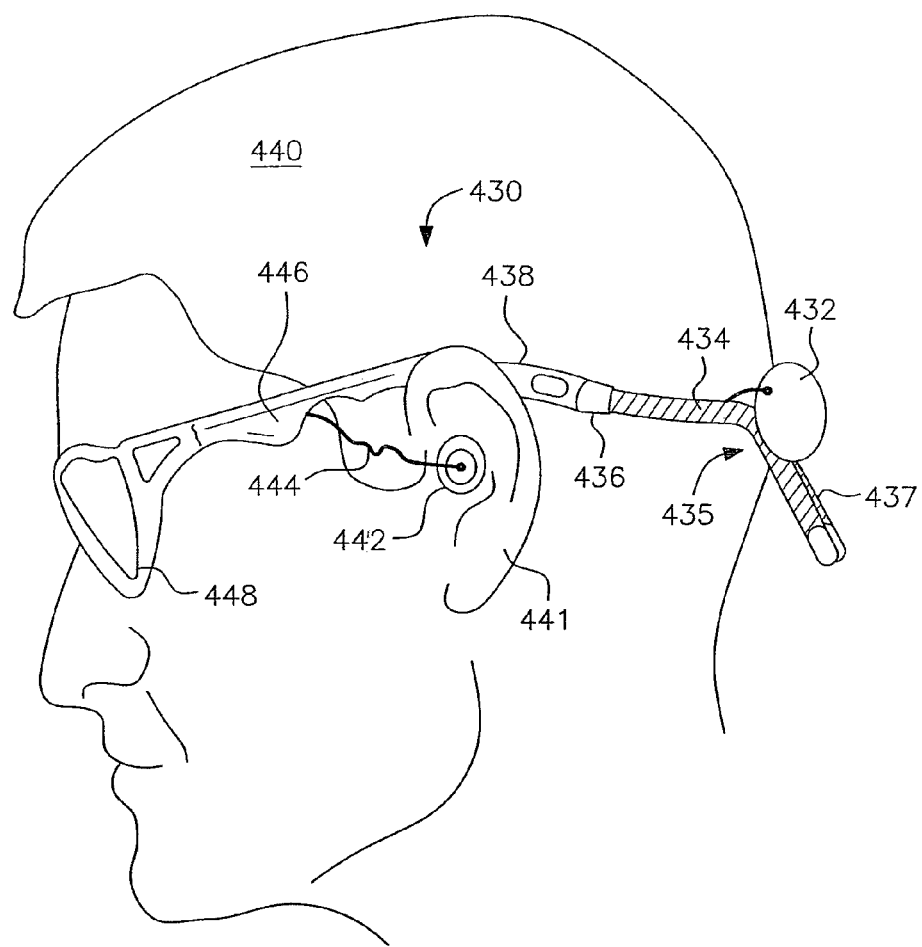
FIG. 9 is a perspective side view of the detachable electronic eyeglasses system of the invention when worn by a user.

FIG. 9 is a side view of the detachable electronic eyeglasses system 430 worn by user 440 that includes an electronic package 432 that has a portion 437 that allows self adjusting the length of cord 434 to achieve a snug fit. Cord 434 has an extra portion 435 that allows adjusting to different sizes of head and comfort level. FIG. 9 also shows left lens rim 448 and left temple 446 including wire 444 and ear bud 442 extended and positioned on ear 441, with end portion 438 of temple 446 electrically connected to cord 434 of DEP 435 through electrical connection 436 for connecting with electronic package 432. Although a flexible and coiled wire is shown as wire 444, it is understood that a variety of stiff wires and visible wires comprised of an arm that connects the ear bud to the frames of the eyeglasses can be used.

Figure 10:
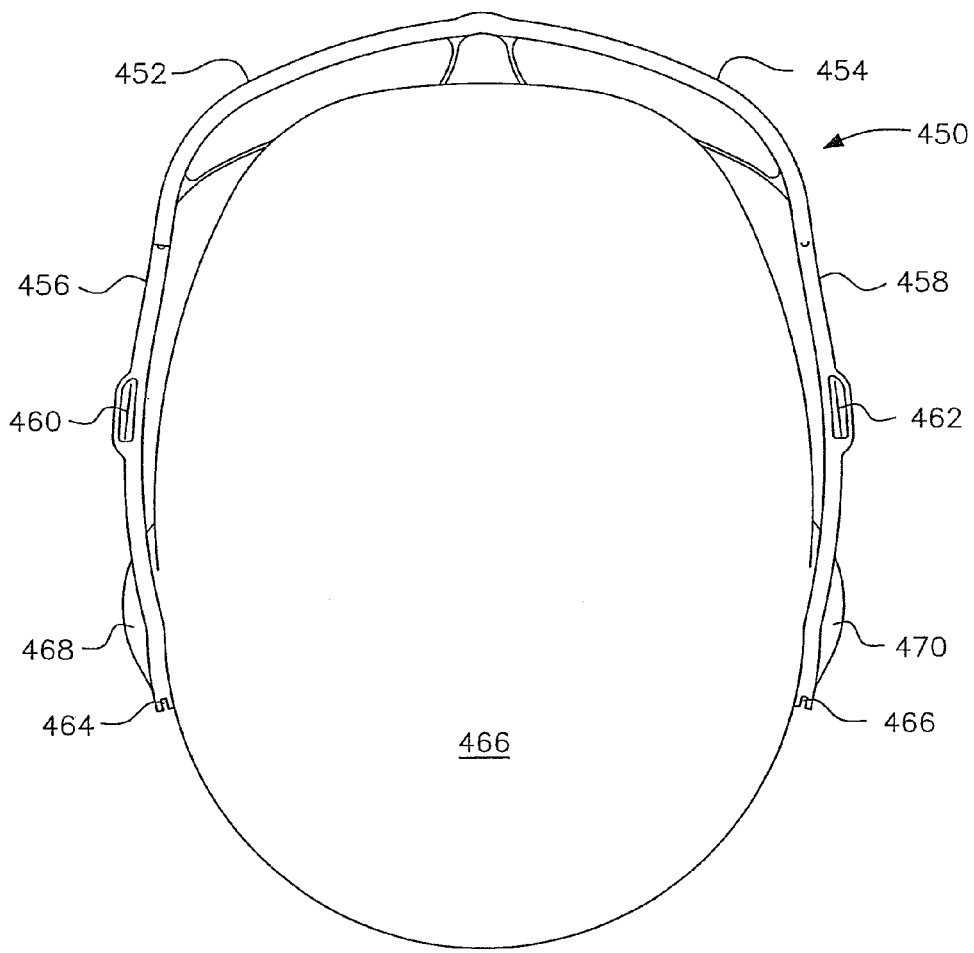
FIG. 10 is a perspective top view of the detachable electronic eyeglasses of the invention when worn by a user.
Figure 10A:
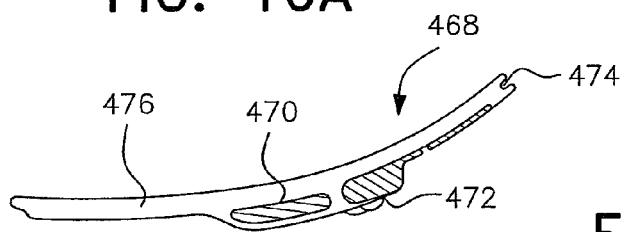
FIG. 10A is a perspective top view of the temple of the detachable electronic eyeglasses of the invention.
Figure 10B:
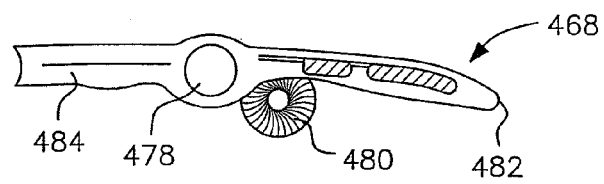
FIG. 10B is a perspective side view of the temple of the detachable electronic eyeglasses of the invention.

FIG. 10 shows an alternative embodiment in which the ear buds and spool with retractable wire are housed in the same plane of the temple as one unit. Accordingly, FIG. 10 shows the detachable electronic eyeglasses 450 worn by user 466, in which the right temple 458 and left temple 456 have only one area for housing both the ear bud and the retractable cord and spool, which correspond to right area 462 and left area 460. Right and left area 462, 460 houses an ear bud assembly (not shown), in which the retractable cord rests against the ear bud. Right and left temple 462, 460 are connected to right and left lens rim 454, 452 and have right and left electrical connections 466, 464. End portions 464, 466 are supported by right and left ear 470, 468. FIG. 10A shows another embodiment in which end portion 476 of temple 468 has electrical connector 474 and houses the retractable cord in area 470 and the ear bud 472 rests adjacent to area 470. FIG. 10B shows a side view of FIG. 10A showing end portion 484 of temple 468 having electrical connector 482, spool with retractable cord 478 and ear bud 480, which is partially covered by temple 484.

Figure 11:
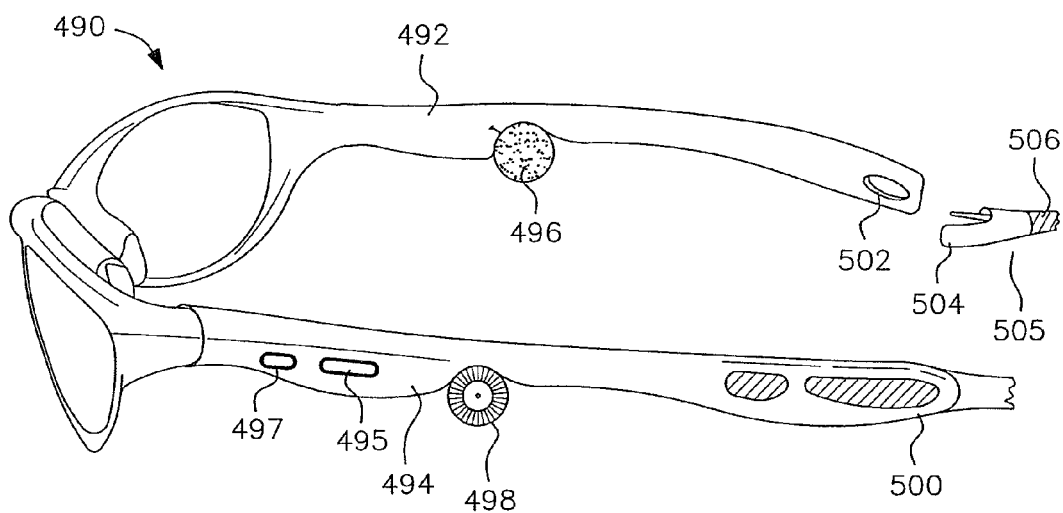
FIG. 11 is a perspective top side view of another embodiment of the detachable electronic eyeglasses of the invention.
Figure 11A:
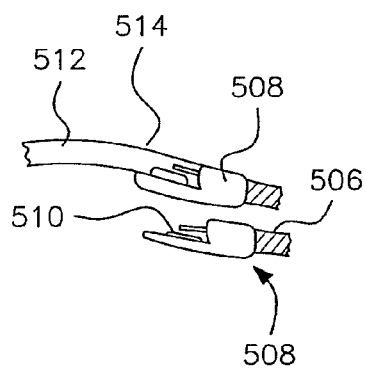
FIG. 11A is a perspective side view of an exemplary electrical connection of another detachable electronic eyeglasses of the invention.

FIG. 11 is yet another embodiment showing detachable electronic eyeglasses 490 and an exemplary electrical connection 505. Eyeglasses 490 includes right and left temple 492, 494, right and left ear bud 496, 498 and right and left electrical connector 502, 500. Left temple 494 houses a small battery 495 and light source 497 for illumination, and in this embodiment the illuminating function can be performed independent of attachment to a DEP. Electrical connector 502 of right temple 492 is releasably electrically connected with electrical connector 505 which includes electrical prongs 504 and wire 506. In this embodiment ear buds 496 and 498 are not hidden within the frame, but the dimensions of said ear buds 496, 498 are preferably confined to the dimensions of the temples 492, 494. FIG. 11A shows in more detail an exemplarily electrical connection between temple 512 and electrical connector 508, with said electrical connector 508 comprised of prong 510 and wire 506.

Figure 12:
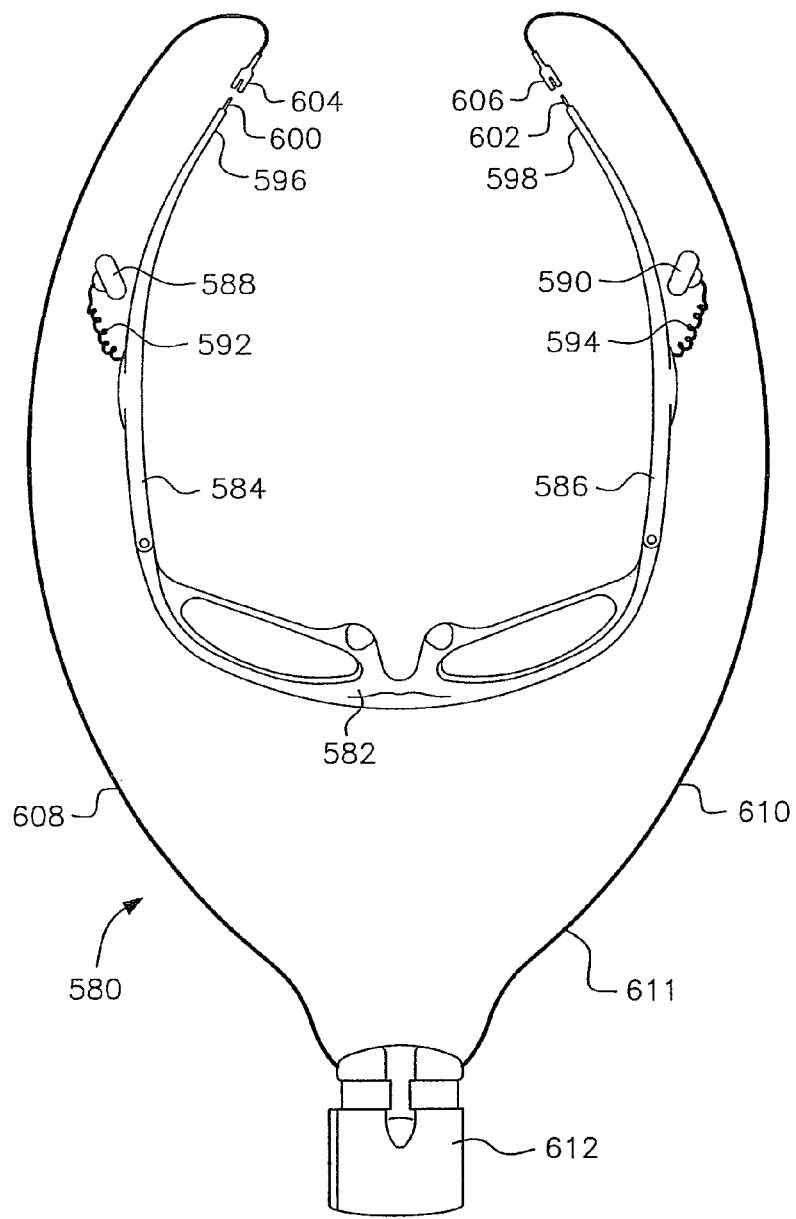
FIG. 12 is a perspective top view of another embodiment of the detachable electronic eyeglasses system of the invention.
Figure 12A:
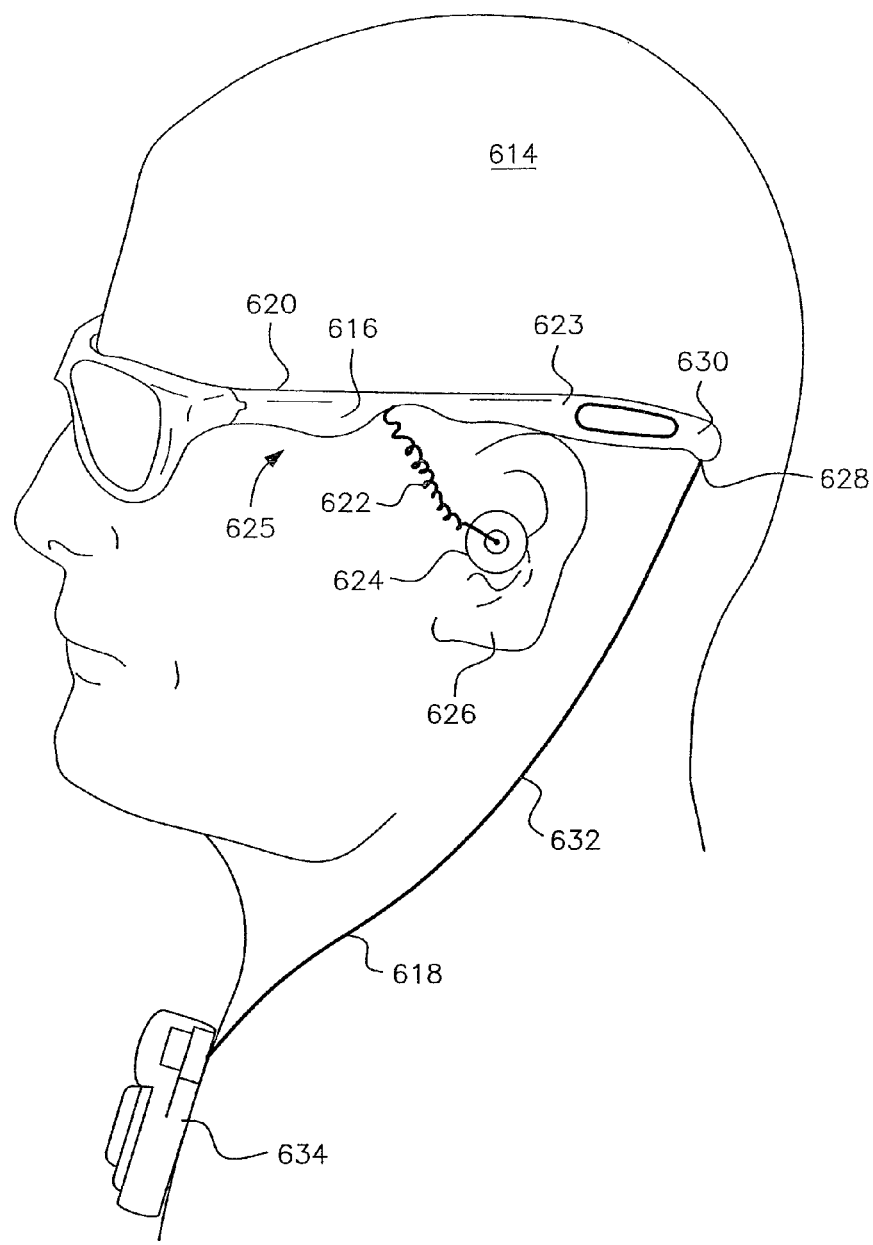
FIG. 12A is a perspective side view of another embodiment of the detachable electronic eyeglasses system of FIG. 12 when worn by a user.

FIGS. 12 and 12A shows another preferred embodiment that includes longer wires of the DEP for connecting the detachable electronic eyeglasses of the invention with commercially available devices, such as digital music players as an iPod of Apple Computer. Accordingly, in FIG. 12 there is seen, a detachable electronic eyeglasses system 580 comprised of DEP 611 and detachable electronic eyeglasses 582. DEP 611 includes right wire 608 and left wire 610 connected to digital music player 612 and including right and left electrical connectors 604, 606 releasably connected to electrical connectors 600, 602 of temples 584, 586. In this embodiment the individual length of right wire 608 is preferably more than 15 cm, and most preferably more than 25 cm in length and less than 65 cm in length. Same preferred length applies to left wire 610. Detachable electronic eyeglasses 582 includes right and left temples 584, 586 housing right and left ear buds 588, 590 and right and left cords 592, 594, with right and left end portions 596, 598 housing right and left electrical connectors 600, 602.

FIG. 12A shows detachable electronic eyeglasses system 625 comprised of detachable electronic eyeglasses 620 and DEP 618 worn by user 614, with said DEP 618 including electronic package 634 such as an iPod, with said electronic package 634 electrically connected by wire 632 with end portion 623 of temple 616 through electrical connector 628 at free end 630 with said electrical connection allowing transmission of sound to ear bud 624 by coiled wired 622 with said ear bud resting on ear 626 of user 614. In this embodiment, as seen in FIG. 12A, electrical connector 628 faces downward for better positioning of cord 632 across the neck and shoulder for holding an electronic package such as an iPod.

Figure 12B:
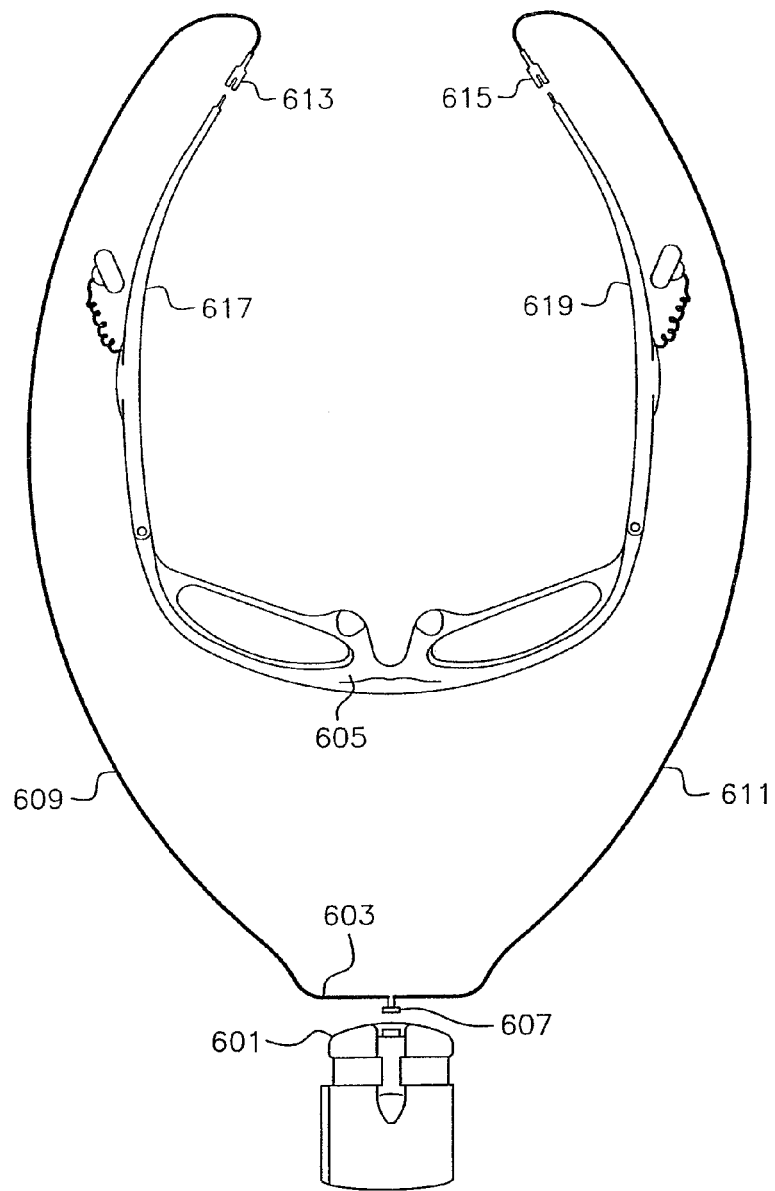
FIG. 12B is a perspective top view of a three piece embodiment of the detachable electronic eyeglasses system of the invention.

It is understood that instead of a two part system comprised of detachable electronic eyeglasses and DEP 611, the invention also includes a three part system. Accordingly FIG. 12B shows a three part system comprised of electronic package 601, cord 603, and detachable electronic eyeglasses 605, with said cord 603 having one electrical connection 607 for connecting with electronic package 601, and the opposite end is subdivided in right and left cords 609, 611, and right and left electrical connections 613, 615 for releasably connecting with right and left temples 617, 619. In this embodiment, right and left cords 609, 611 have electrical connections in both of their free ends, with said electrical connections 613, 615 in one end releasably connected with right and left temples 613, 615 of eyeglasses 605 and the opposite end having an electrical connector 607 for releasably connecting to an electronic package 601 such as a digital music player.

Figure 13:
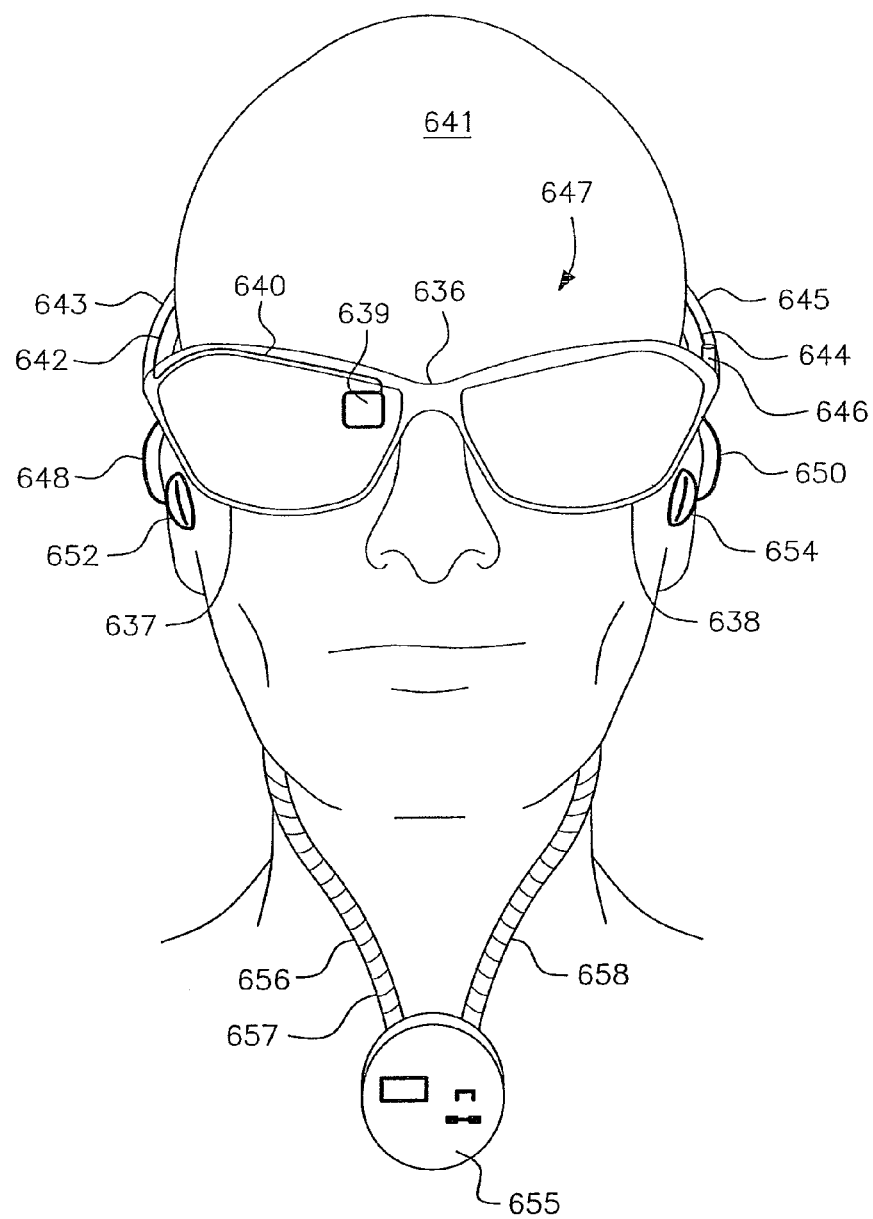
FIG. 13 is a perspective front view of another embodiment of the detachable electronic eyeglasses system of the invention when worn by a user.

FIG. 13 shows a front view of user 641 wearing detachable electronic eyeglasses system 647 comprising DEP 657 and detachable electronic eyeglasses 636. Eyeglasses 636 have display 639 and antenna 646 for wireless communications with other electronic devices. Eyeglasses 636 is connected to DEP 657 through right and left wires 642 and 644 which are releasably and electrically connected with right and left cords 656 and 658 of DEP 657. Detachable electronic eyeglasses 636 further includes right and left temple 643 and 645, and right and left lens rim 637 and 638. Right lens rim 637 has display 639 for projecting still images, video images, a computer screen, and the like. Display 639 is connected by wire 640 (located within lens rim 637) to wire 642 in temple 643. Wire 642 is electrically connected with electronic package 655 of DEP 657 and can receive images and audio signal from DEP 657. Audio signals are transmitted to right and left ear buds 652 and 654 by right and left coiled wires 648 and 650. Imaging signals are transmitted to display 639 through wire 642 and wire 640. Left temple 645 includes antenna 646 for receiving wireless signals and wire 644. Wire 644 is electrically connected with DEP 657 through cord 658. A flexible display that can roll up in front of the lens can also be used. For instance, when a wireless signal is received by the DEP or by the frames, a signal can be sent to unroll the screen to see the message.

DEP 655 can also include a wireless receiver for receiving audio and imaging signals. In this embodiment, the user can, for example, receive a wireless television signal or video signal and watch it using the eyeglasses or other head mounted gear of the invention. For example, DEP 655 can receive a signal from an airplane video system, allowing the passenger to watch video and hear sound using the eyeglasses 636 without the need for a separate screen. Likewise, DEP 655 can be wirelessly or wired connected with a computer, with display 639 of the eyeglasses replacing the screen of a computer, allowing thus privacy when working with a computer in a crowded environment, as may found on an airplane.

Figure 14A:
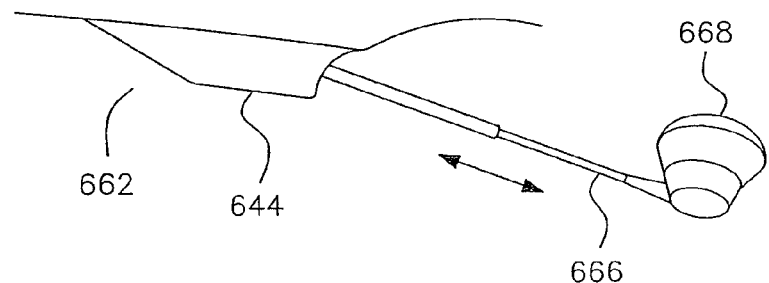
FIGS. 14A to 14C are perspective side top views of an exemplary temple assembly of the detachable electronic eyeglasses.
Figure 14B:
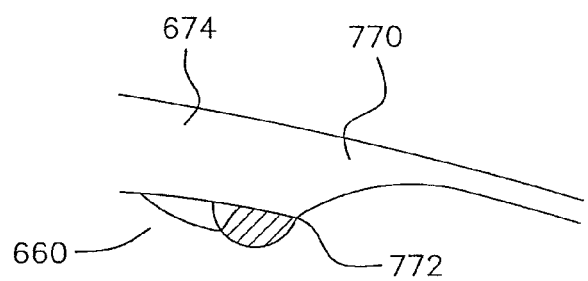
Figure 14C:
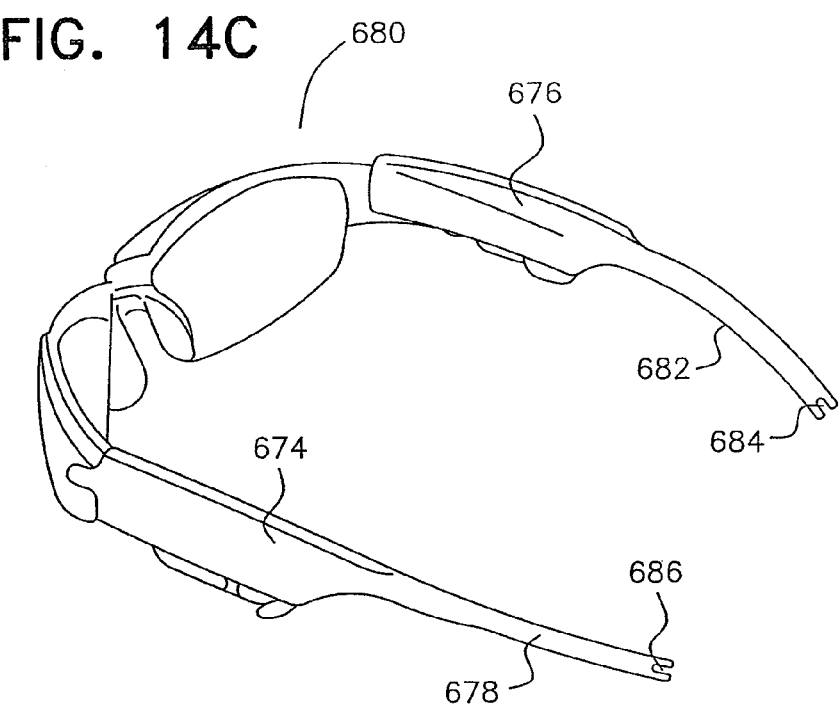

FIG. 14C shows electronic eyeglasses with ear buds hidden away within the temples. FIG. 14C shows eyeglasses 680 having temples 674 and 676, with end portions 678 and 682 with electrical connectors 686 and 684. Ear buds (not shown) are housed in temples 674 and 676. FIG. 14B shows temple 674 in more detail, in particular area 770 for housing ear bud 772. FIG. 14A shows ear bud 668 that is housed in area 664 of temple 662, with retractable wire 666 extended for exposing ear bud 668.

Figure 14D:
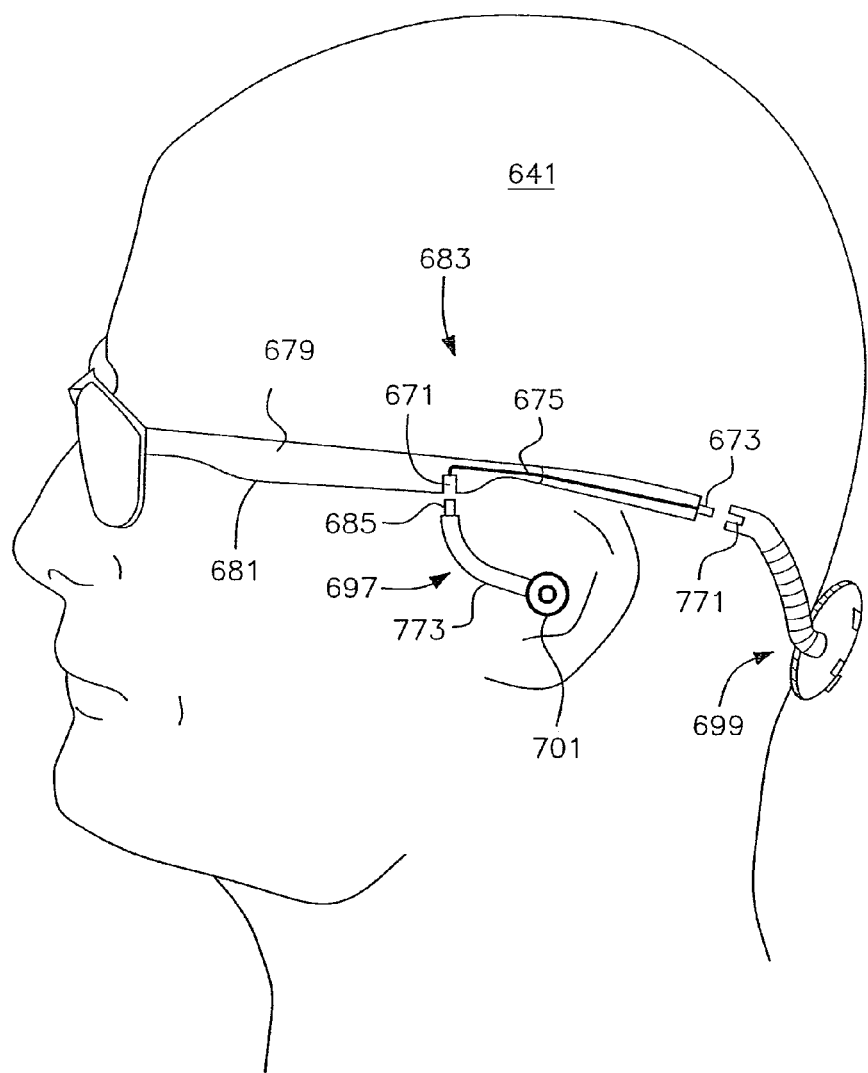
FIG. 14D is a perspective side view of an exemplary three piece embodiment of the detachable electronic eyeglasses system when worn by a user.

FIG. 14D shows an alternative embodiment for the electronic eyeglasses system of the invention. Eyeglass system 683 is worn by user 641, and comprises detachable electronic eyeglasses 681, ear bud assembly 697, and DEP 699. Detachable electronic eyeglasses 681 include electrical connectors 671 and 673. Preferably, electrical connector 671 is disposed in the mid portion of temple 679, and connector 673 is disposed at the end portion of temple 679. Electrical connector 671 is connected to electrical connector 673 through wire 675, which is disposed within or on temple 679. Electrical connector 673 is releasably connected to electrical connector 685 of ear bud assembly 697. Ear bud assembly 697 comprises electrical connector 685, arm 773, and ear bud 701. Electrical connector 673 is releasably connected to electrical connector 771 of DEP 669, to permit delivery of sound from DEP 699 to ear bud 701. In this embodiment, the ear bud assembly is releasably connected to the temples of the eyeglasses. Although only one side is shown, it is understood that both temples have the electrical connections and wires for delivering sound from a DEP to an ear bud. Arm 773 preferably includes mechanisms such as retractable wires, telescopic arms, flexible and foldable arms for adjusting length for positioning ear buds on ears of user of different size and height.

Figure 15A:
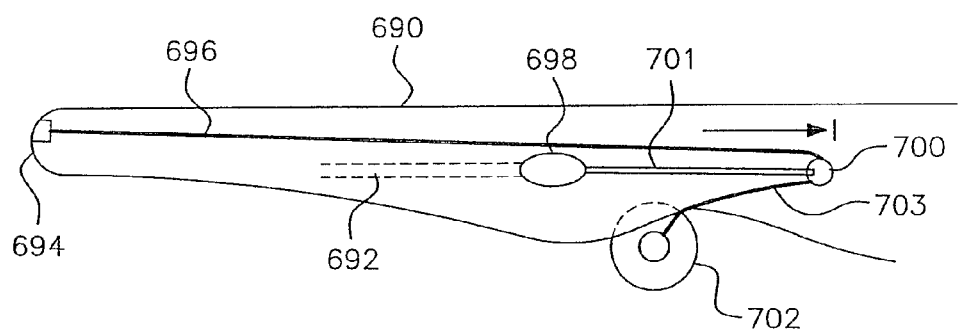
FIGS. 15A and 15B are perspective side top views of another temple assembly of the detachable electronic eyeglasses.
Figure 15B:
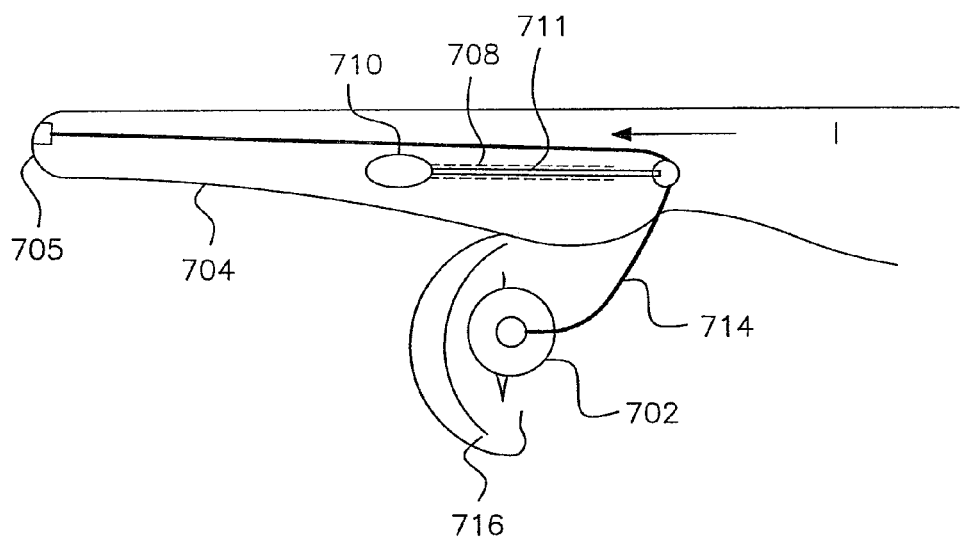

FIG. 15A shows an example of a temple assembly according to the invention. Temple assembly 690 including handle 698 and rod 701, connected to wheel 700. Rod 701 is moveable within groove 692. Temple 690 includes electrical connector 694 and wire 696, which connects to ear bud 702 through wire portion 703. Upon actuation, as seen in FIG. 15B, handle 710, rod 711 and wheel 712 are move inwardly in groove 692 toward connector 705 of temple 704, extending wire portion 714, and exposing ear bud 702 for placement on ear 716.

Figure 16A:
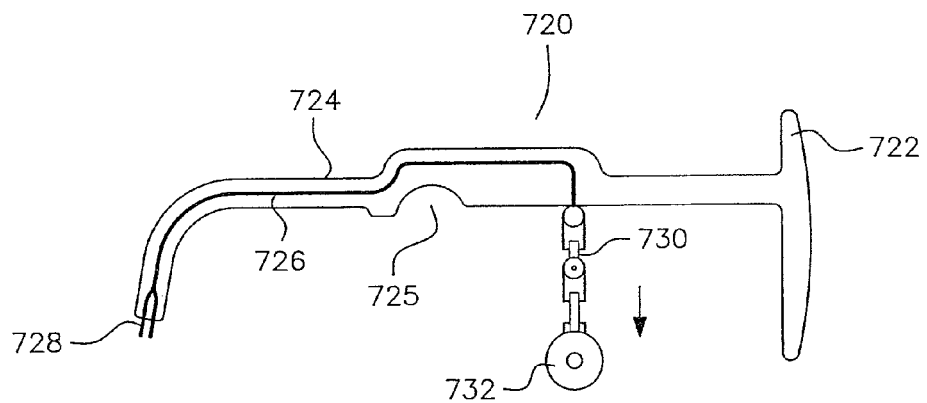
FIGS. 16A to 16C are diagrammatic side views of the detachable electronic eyeglasses of the invention.
Figure 16B:
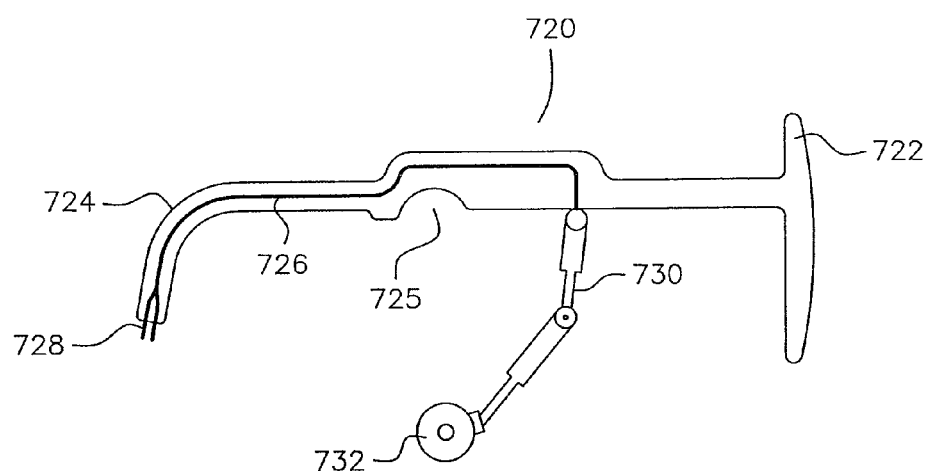
Figure 16C:
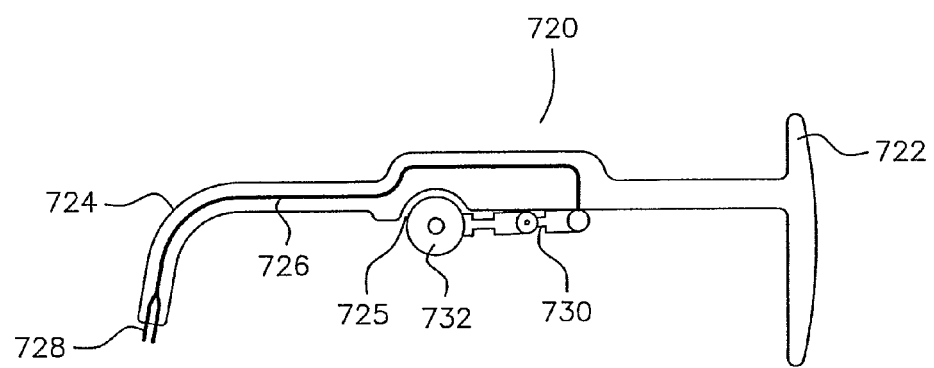

FIG. 16A to 16C show another embodiment of detachable electronic eyeglasses according to the invention. Detachable electronic eyeglasses 720 comprise temple assembly 724 and lens rim 722. As shown in FIG. 16A, temple assembly 724 has articulated arm 730, shown in an extended position. Temple assembly 724 further comprises ear bud 732, which is located on articulated arm 730, area 725 for housing ear bud 732 when not in use, and wire 726 for connecting ear bud 732 to electrical connector 728. FIG. 16B shows articulated arm 730 being folded, with ear bud 732 moving toward area 725 of temple 724. FIG. 16C shows articulated arm 730 in a completely retracted position. Upon retracting, articulated arm 730 and ear bud 732 are housed within the limits of the temple 724. Articulated arm 730 houses wires (not shown) which are connected to electrical plug 728 through wire portion 726. As outlined above, articulated arms may be referred to herein as either robotic arms or telescopic arms. It will be understood that detachable electronic eyeglasses 720 have a second temple (not shown) with a similar structure to the temple shown on the figures and described above.

FIG. 17A shows another embodiment of the invention. FIG. 17A shows eyeglasses 740 comprising temple assembly 742 and lens rim 743. Temple 742 includes rotating wheel 744, which is secured to temple 742, preferably between end portion 748 and mid portion 749. Wheel 744 is attached to rod 751. Rod 751 houses wire 745 and has electrical plug 746, which is releasably connected to wire 750 and electronics package 760 of DEP 758. Wire 745 of wheel 744 is connected to cord 752 through wire portion 747 in temple 742 for delivering sound to ear bud 754 on ear 756.

FIG. 17B shows detachable electronic eyeglasses system 740 of FIG. 17A being worn by user 762. DEP 741 is positioned over the head of user 762, with electronics package 792 held on top of the head by right and left portions 788 and 790. Right and left portions 788 and 790 are preferably made of a rigid material for stability and easy positioning, such as acrylic or hard plastic. Right and left portions 788 and 790 are electrically connected with right and left electrical connector 772 and 774 in right and left rod portions 768 and 770 of right and left wheels 766 and 764 for transmitting sound to right and left ear 784 and 786 through right and left cords 776 and 778, connected to right and left ear phones 780 and 782. Electronic package 792 can include at least one laser light or other form of light source, which deliver light to the scalp for stimulating hair growth. In this embodiment the electronic package can de replaced by an electrical device with larger surface area for delivering light to a larger area of the scalp.

FIG. 18A shows a slip-on detachable wearable electronic system according to the invention which can be attached to the temples of a pair of eyeglasses. Slip-on system 800 includes right housing 794 for housing power source 796, wireless device 805, and volume button 801. Left housing 793 houses electronics 795, port 803, and play button 799. Right clip 802 clips the right temple of the eyeglasses (not shown) and its main face 809 rests against the head of the user. Left clip 798 clips the left temple and its main face 807 rests against the head of the user. Slip-on system 800 further includes wire 812 which extends along the head of the wearer and connects right housing 794 and left housing 793. Right and left housing 794 and 793 are connected to right and left ear buds 808 and 810 by right and left arms 804 and 806. Importantly, any combination of electronics and control buttons housed in can be used to deliver stereo audio signals to the ear buds.

Figure 18B:
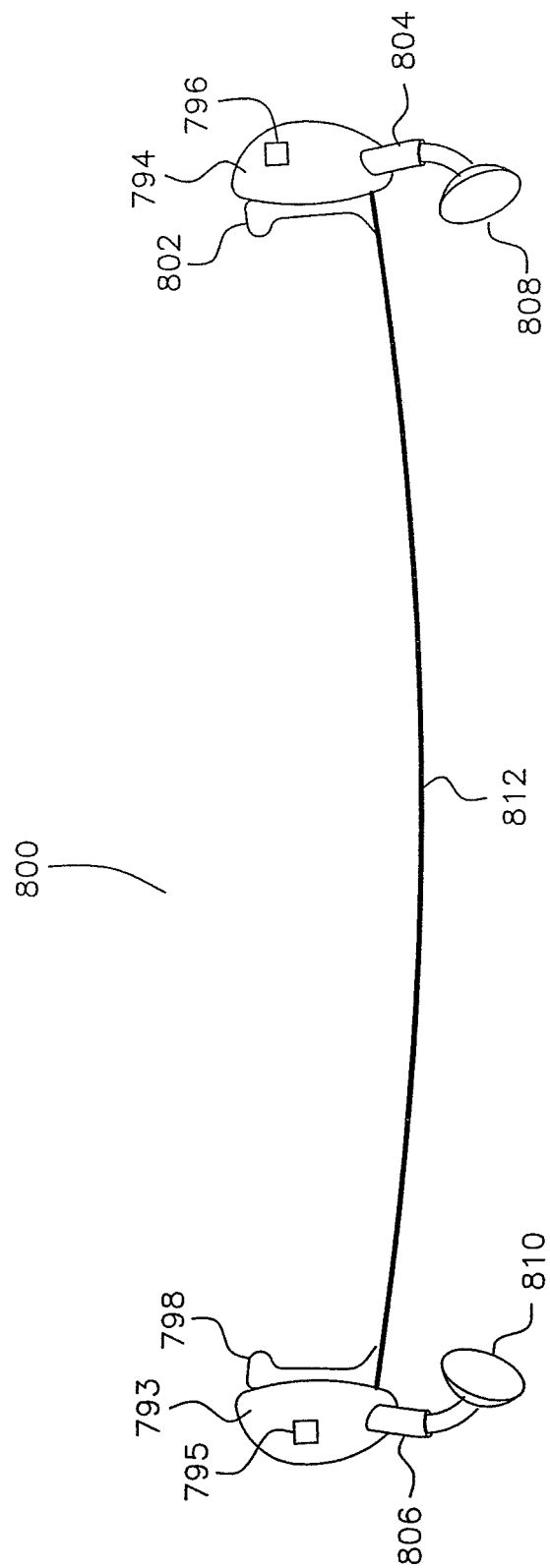
FIG. 18B is a perspective side view of a slip-on assembly of the invention.
Figure 19A:
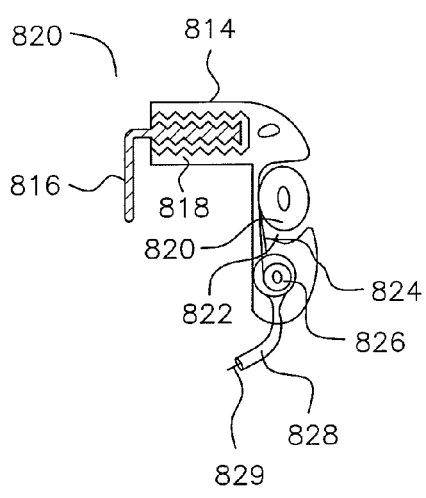
FIGS. 19A and 19B are diagrammatic side views of a slip-on assembly of the invention.
Figure 19B:
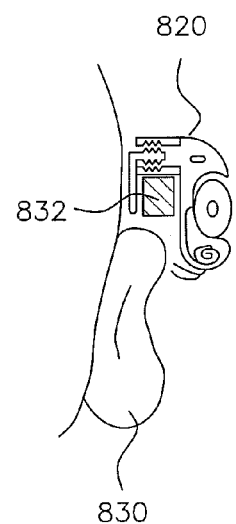

FIG. 18B shows a side view of slip-on system 800 for positioning on the temples of a pair of eyeglasses. Clip 802 slips-on the right temple of the eyeglasses (not shown) to secure housing 794 to the right temple. Right housing 794 contains power source 796, arm 804 and ear bud 808. Clip 798 slips-on the left temple of the eyeglasses to secure housing 793 to the left temple. Left housing 793 contains electronics 795, arm 806, and ear bud 810. Wire 812 connects right and left housing 793 and 794, and extends along the neck of the wearer. Clips 798 and 802 are substantially of smaller dimension than housings 793 and 794 and are preferably equal to or less than 30 mm in their greatest dimension, and more preferably equal to or less than 20 mm in their greatest dimension, and even most preferably equal to or less than 10 mm in their greatest, one dimension including length. Clips 798 and 802 are substantially thinner than housings 793 and 794 and are preferably equal to or less than 10 mm in thickness, and more preferably equal to or less than 5 mm in thickness, and even most preferably equal to or less than 2 mm in thickness FIG. 19A to 19B show another embodiment of a slip-on system according to the invention. FIG. 19A shows clip-on assembly 820 having an adjustable serrated system comprised of movable parts 814 and 816 which move relative to each other in order to adjust to the size of the temple (not shown) being held by clip assembly 820. Clip assembly 820 further includes area 822 for housing ear bud 818. Ear bud 818 is connected to retractable cord spool 826 or to a coiled wire. Retractable cord spool 826 has two wire endings: wire end 824 is connected with ear bud 818 and opposite wire end 828 is connected to electrical connector 829. FIG. 19B shows clip assembly 820 in use, secured to temple 832, with said temple 832 resting on ear 830.

Figure 20:
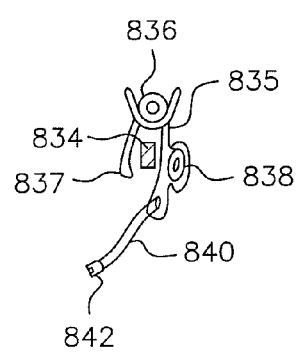
FIGS. 20 and 21 are diagrammatic side views of another slip-on assembly of the invention.

FIG. 20 shows another embodiment of a slip-on system according to the invention. The system rests on temple 834 and has a spring loaded clip 836 comprising arms 835 and 837. Arm 837 is substantially thinner than arm 835. Arm 837 rests against the head of the wearer. Preferably, arm 837 is equal to or less than 10 mm in thickness, and more preferably equal to or less than 5 mm in thickness, and even most preferably equal to or less than 2 mm in thickness.

Figure 21:
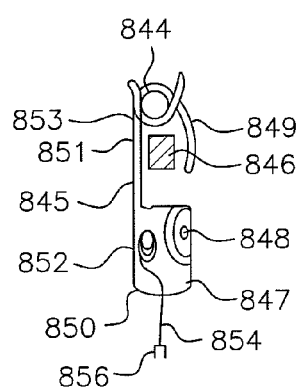

FIG. 21 shows an alternative embodiment of the spring loaded clip assembly with spring loaded clip 844 resting on temple 846 and having arms 853 and 849. Arm 853 rests against the head of the wearer and has an upper portion 851 and a lower portion 845. Upper portion 851 is substantially thinner than lower portion 845. Preferably, upper portion 851 measures equal to or less than 10 mm in thickness, and more preferably equal to or less than 5 mm in thickness, and even most preferably equal to or less than 2 mm in thickness. Lower portion 845 of arm 853 has housing 850 which houses ear bud 848, coiled wire 852, and wire 854, which has electrical connector 856 in its free end.

Figure 22A:
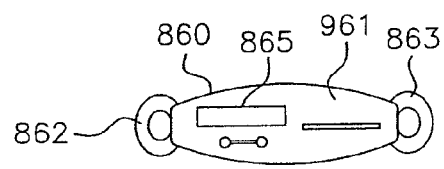
FIG. 22A is a perspective front view of a clip-on assembly of the invention.
Figure 22B:
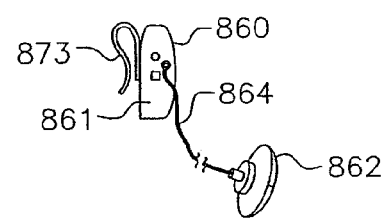
FIG. 22B is a perspective side view of the clip-on assembly of FIG. 22A.
Figure 22C:
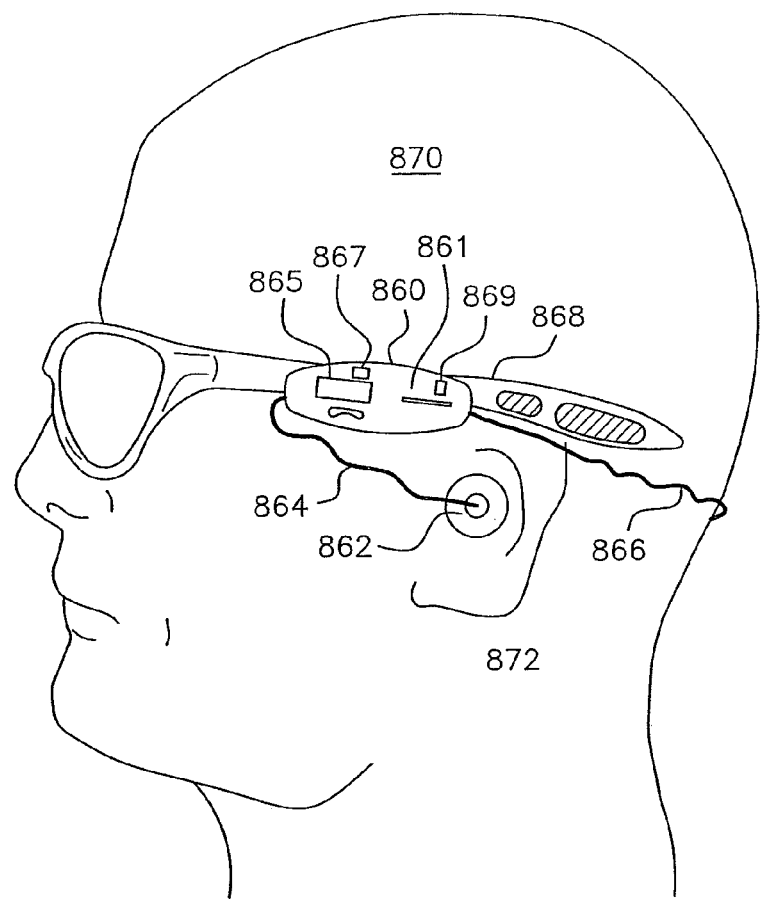
FIG. 22C is a perspective side view of the clip-on assembly of FIG. 22A when worn by a user.

FIG. 22A to 22C show another embodiment of the clip-on assembly of the present invention. FIG. 22A shows a compact clip-on assembly 860 having electronics 865 for playing digital music (or receiving a communication signal such as a cellular phone signal) in housing 861. Housing 861 also has retractable ear buds 862 and 863, preferably secured to the ends of housing 861. FIG. 22B is a side view of compact clip-on assembly 860 with clip 873 for attaching to the temple of eyeglasses. Compact clip-on assembly 860 has housing 861, cord 864 and ear bud 862. FIG. 22C shows compact clip-on assembly 860 releasably secured to left temple 868 of eyeglasses 868*a* being worn by user 870 and having retractable cords 864 and 866 extended for use. Compact clip-on assembly 860 includes housing 861 for housing electronics 865, power source 867, and port 869. Left cord 864 is connected to ear bud 862 and extended for positioning on left ear 872. Right cord 866 is extended along the back of the head of the wearer 870 and is connected to a second ear bud (not shown) for placement on the right ear of wearer 870. In accordance to the invention, one cord connected to an ear bud is substantially longer than the opposite cord connected to the opposite ear bud. Accordingly, left cord 864 has preferably a length of less than 15 cm, and right cord 866 has preferably a length of less than 60 cm. More preferably, left cord 864 has a length of less than 10 cm and right cord 866 a length of less than 45 cm. In this embodiment all of the electronics and power source are located within housing 861.

Figure 23:
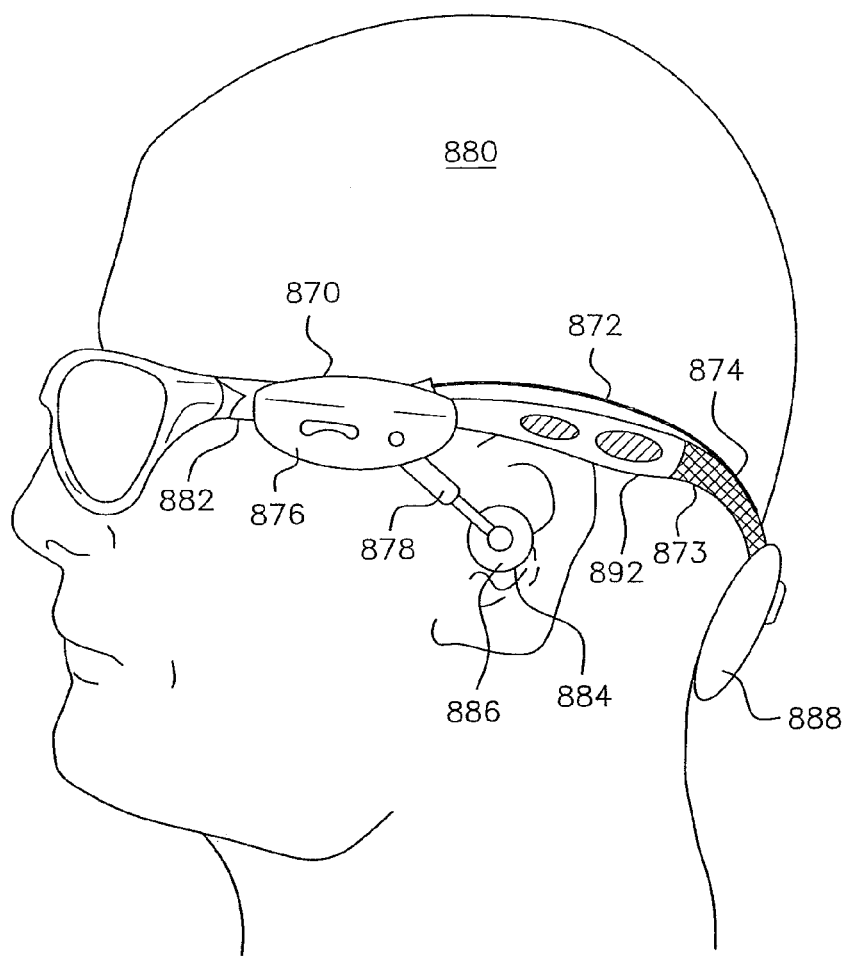
FIG. 23 is a perspective side view of another clip-on assembly when worn by a user.

FIG. 23 shows another embodiment of clip-on assembly according to the invention. Clip-on assembly 870 is releasably secured to temple 892 of eyeglasses 882 worn by user 880 ear 886. It has housing 876, arm 878, ear bud 884. Wire 872 which connects with cord 874 for receiving an audio signal from MP3 player 888. End portion 873 of cord 874 is mechanically (not electrically) secured to end portion of temple 892. In this embodiment, temple 892 has no wires or electrical connectors, and wire 872 of clip-on assembly 870 runs on top of temple 892 and is electrically connected with cord 874.

Figure 23A:
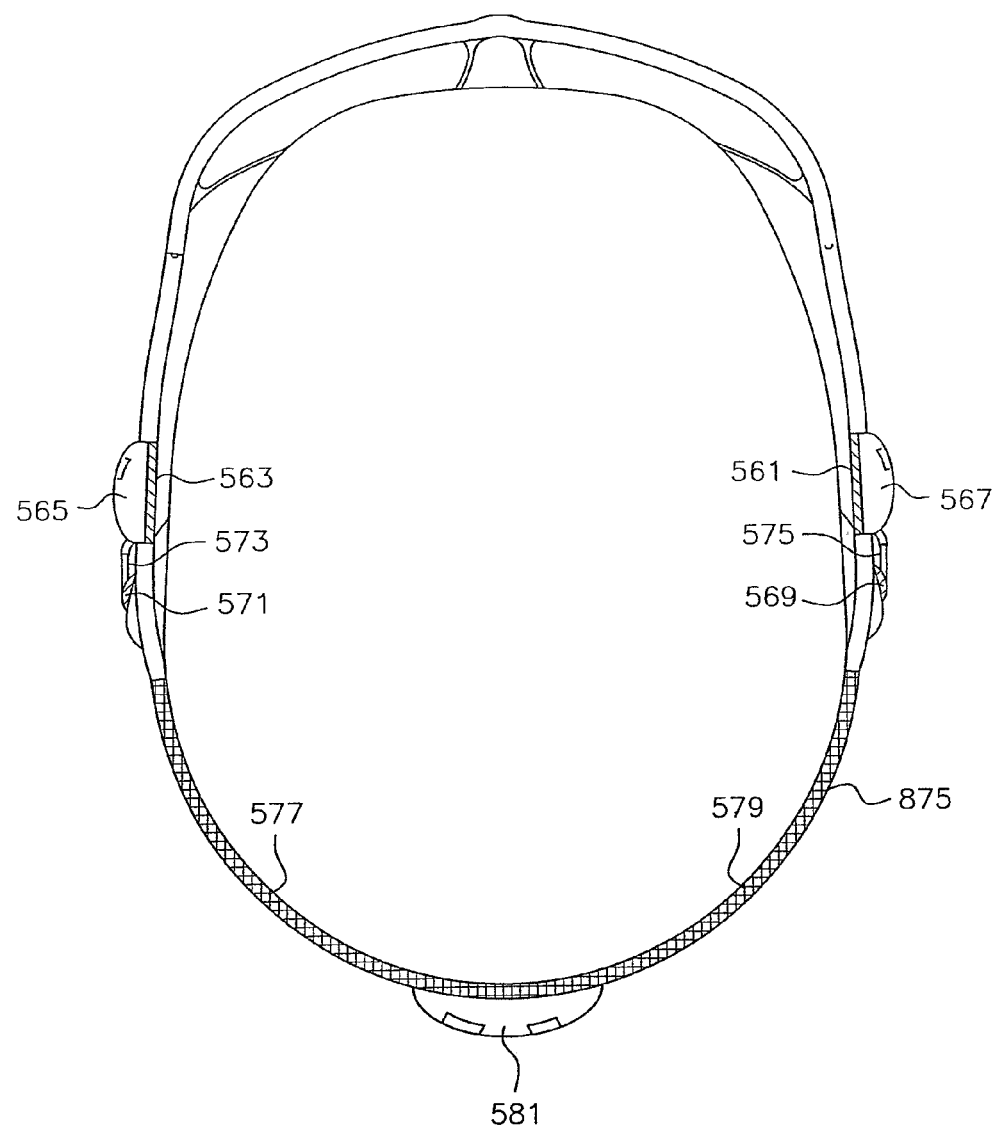
FIG. 23A is a perspective top view of a clip-on assembly when worn by a user.

FIG. 23A shows a top view of clip-on assembly 875, which has dual side clips 561 and 563. Assembly 875 has right and left housings 567 and 565, right and left robotic arms 575 and 573, right and left ear bud 569 and 571 connected to digital music player 581 via right and left cords 579 and 577.

FIG. 23B shows a clip-on assembly 871 with permanently extended arm 877 of ear bud 875. Clip-on assembly 871 is secured to eyeglass temple 879 by clip 873 and is connected to an electronic device (not shown) with wire 881.

FIG. 23C shows a three part sliding-on assembly 585 comprised of sliding-on ear buds, eyeglasses, and DEP. FIG. 23C shows sliding-on assembly 585 comprised of right sliding-on assembly 587 and left sliding-on assembly 589, each having electrical connecting plate 591, 593 for electrical connection with right and left temples 572, 570 and for adjusting the assemblies snuggly to different sizes of temples. Sliding-on assemblies 587, 589 further includes right and left arms 578, 582 connected to right and left ear bud 576, 574. It is noted that temples 572, 570 are substantially identical to each other such that description of features of one temple herein applies to the other temple as well. Temple 572 has wire 595 for connecting sliding-on assembly 587 with electrical connection 568, with the electrical connection 568 being releasably connected with electrical connection 564 of DEP 556. DEP 556 includes right and left cords 558, 560 releasably connected with right electrical connector 568 of right temple 572 and left electrical connector 566 of left temple 570. In this embodiment, the temples only have wire and electrical connections but not ear buds, with said ear buds being housed in the sliding-on assemblies.

In accordance to the preferred clip-on, slip-on, and sliding-on assemblies of the invention, very little weight is placed on the temples since the temples of eyeglasses holds a clip-on that only houses ear buds and light weight and small wires and plugs. The heavier part (electronics and power source) are housed in the DEP away from the temples and positioned behind the head. The assembly of the invention thus offers more comfort and better weight distribution. By having less weight on the temples less pressure is applied directly on the ear. Heavy temples of eyeglasses would be uncomfortable and over time could cause an injury to the thin skin around the ear. In addition since the larger and heavier part (DEP) is held away and at the end of the temple, the invention offers an additional benefit of helping stabilize the eyeglasses on the head and preventing frames from moving down on the nose.

Figure 24A:
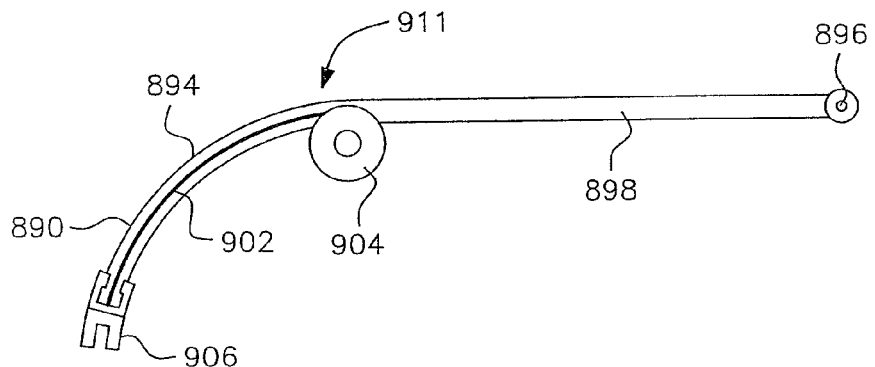
FIGS. 24A and 24B are diagrammatic side views of a temple assembly of the invention.
Figure 24B:
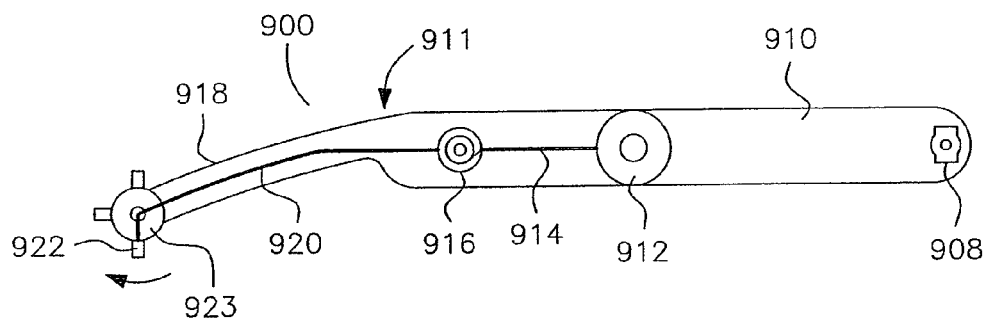

FIGS. 24A and 24B shows exemplary embodiments of the temple assembly of the invention. In FIG. 24A there is seen thin temple assembly 890 with front portion 898 and end portion 894, with end portion 894 initiating at the bending point 911 of temple 890. Front portion 898 includes screw assembly 896 for connecting with lens rim (not shown), and end portion 894 having ear bud 904 connected with electrical connector 906 through wire 902. FIG. 24B shows thick temple assembly 900 with front portion 910 and end portion 918, and bending point 911. Front portion 910 having ear bud 912, wire 914, retractable coiled cord 916, and screw assembly 908 and end portion 918 having wire 920 and rotating electrical connector 922. Electrical connector 922 is disposed preferably at the end portion 918, and most preferably at the free end of end portion 918. Electrical connector 922 is secured to a wheel assembly 923 that allows electrical connector to be movable to any position, illustratively shown in two different positions in phantom lines.

Figure 24C:
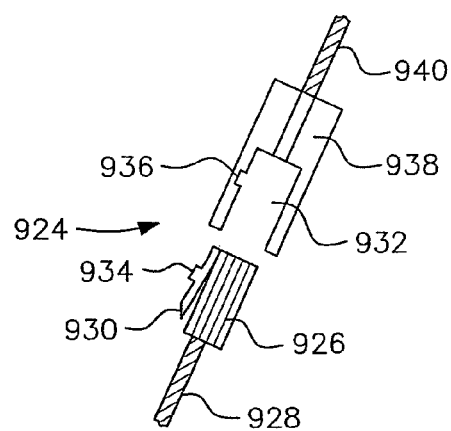
FIG. 24C is a diagrammatic side view of an exempla latch mechanism of the temple assembly of the invention.
Figure 24D:
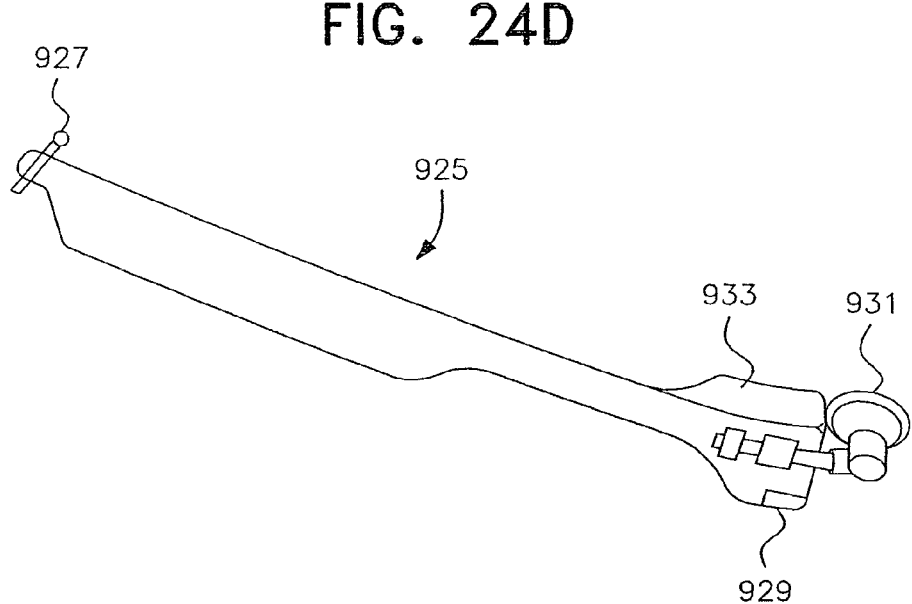
FIG. 24D is a perspective side view of another temple assembly of the invention.

FIG. 24C shows an exemplary latch mechanism assembly 924 for electrical connection of end portion 938 with plug 926. End portion 938 includes wire 940 and jack 932 with recess 936 for receiving plug 926 of DEP (not shown). Plug 926 includes wire 928 and latch piece 930 with protrusion 934 for releasably connecting plug 926 into jack 932. FIG. 24D shows temple assembly 925 with screw assembly 927 for connecting with lens rim in the front portion. End portion 933 includes ear bud 931 secured to free end 933 of temple 925 and adjacent to electrical connector 929.

As seen in FIG. 24D, electrical connector 929 is positioned not on the free end of temple 925, but on the side of the temple 925. Electrical connectors of temples may be located anywhere in the temple, but is preferably located at the end portion of the temple, and most preferably located on the side facing away from the head. As such, any wire from a DEP connected with the temple will be facing away from the skin and not touching the skin, assuring even greater comfort for the user. Other preferable characteristics of the temple of the invention include a longer end portion of temple, which preferably ends at the lower part of the ear, and not in the mid-part of the ear as with conventional eyeglasses. As such, any wire or cord from DEP will be positioned away from the back of the ear, assuring greater comfort. In this regard, the end portion after the bend of the temple (represented by area 911) is the part of the temple adjacent to the ear, and said end portion of temple has preferably a length of more than 5.5 cm, and most preferably 7 cm. This length of the end portion is defined as the length from the free end to the portion of the temple that is bent, represented by portion 911 of FIGS. 24A and 24 B.

Figure 25A:
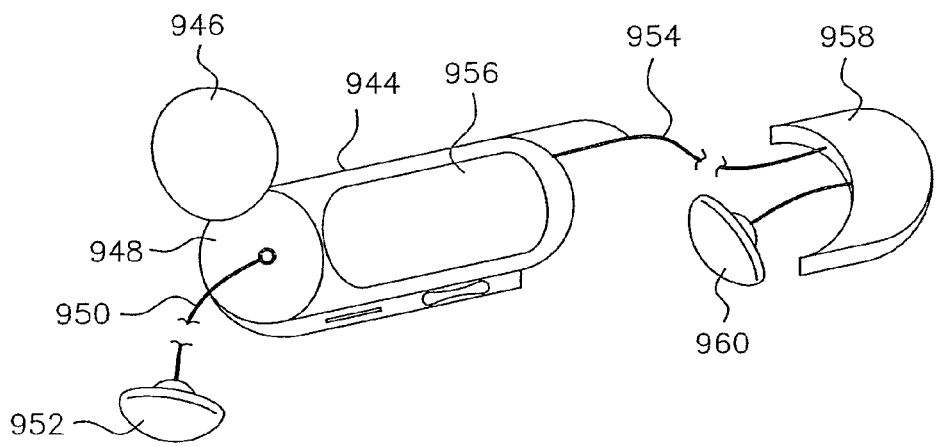
FIGS. 25A and 25B are perspective side views of another temple assembly of the invention.
Figure 25B:
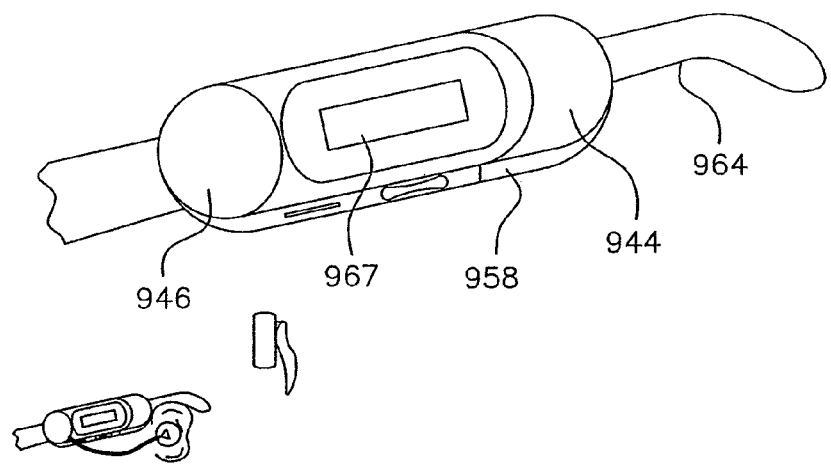

FIG. 25A shows yet another detachable assembly in accordance to the invention. The assembly can function as a temple assembly or clip-on assembly. Assembly 944 includes lid 946 of housing 948, and housing 948, 958 for housing ear buds 952, 960, and area 956 for housing retractable cords 950 and 954. FIG. 25B shows clip-on assembly 944 secured to temple 964 by clip 967 and including areas 946, 958 for housing ear buds (not shown). In accordance to the invention, one cord connected to an ear bud is substantially longer than the opposite cord connected to the opposite ear bud. Accordingly, cord 950 has preferably a length of less than 15 cm while cord 954 has preferably a length of less than 60 cm. Most preferably, cord 950 has preferably a length of less than 10 cm while cord 954 has preferably a length of less than 45 cm.

Figure 25C:
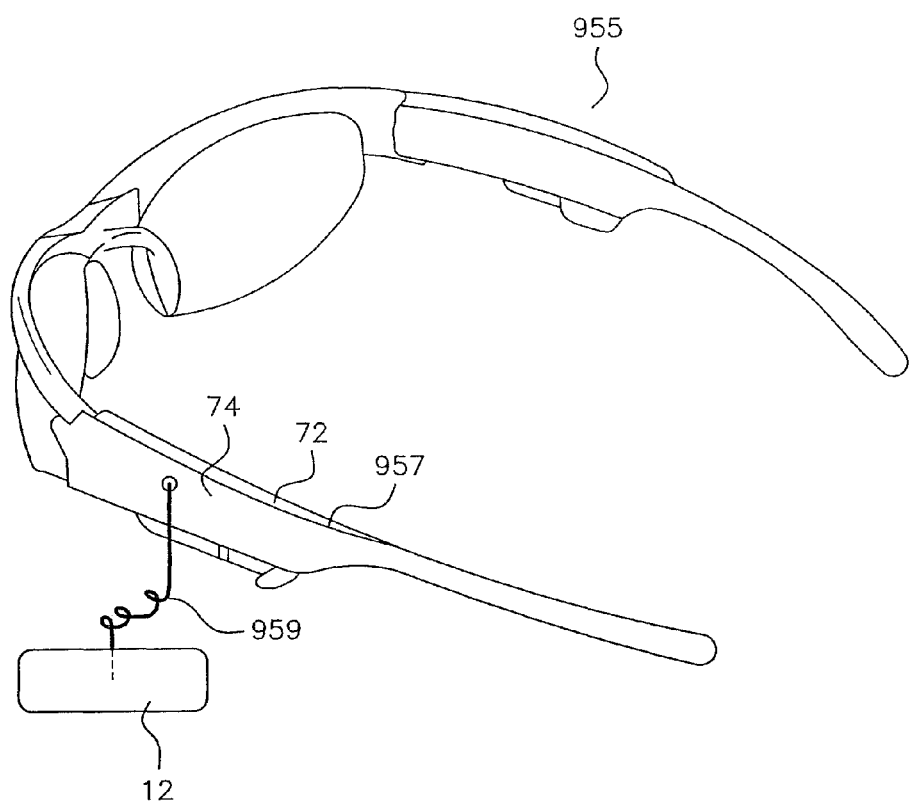
FIG. 25C is a side view of an electronics assembly housed in a temple.

FIG. 25C shows electronic eyeglasses 955 housing electronics in temple 957 as provided by the prior art, but having improved features provided by the present invention. In accordance to the teachings of the present invention, temple 957 includes a cradle-like housing 72 defining cavity 74 which is sized to accept and retain in a releasable manner an electronics package 12 such as a digital music player, radio, cellular phone, and the like. Electronics package 12 is connected to a coiled cord 959 that is secured to cavity 74 and can be extended, in accordance to description of FIG. 1D and FIG. 1E.

Figure 26A:
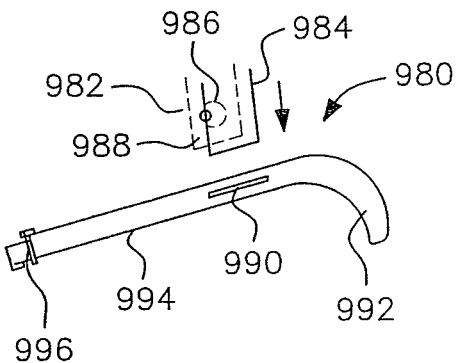
FIGS. 26A to 26C are diagrammatic side views of another temple assembly of the invention.

FIG. 26A shows specialized, non-wired eyeglass temples to which the electronic clip-on assembly of the present invention may be readily attached. Temple 980 has end portion 992 and front portion 994 with screw area 996 for connecting with lens rim (not shown). Opening 990 within temple 980 is sized to receive arm 984 of slip-on assembly 982. Slip-on assembly 982 has a second arm 988 (shown with dotted lines) which houses ear bud 986.

Figure 26B:
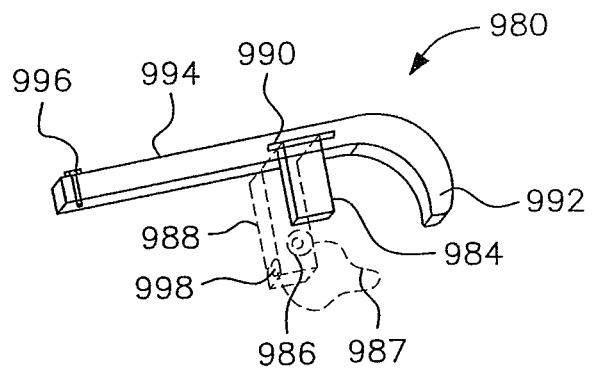
Figure 26C:
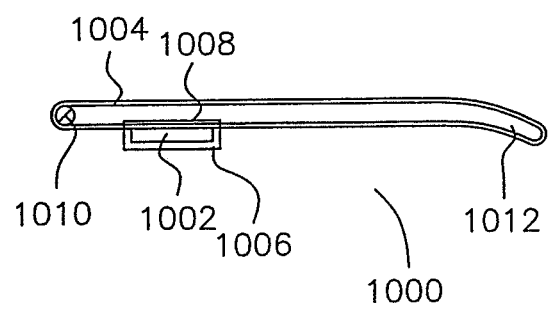

FIG. 26B shows slip-on assembly 982 secured to temple 980 through opening 990. Preferably, arm 984 is substantially thinner than arm 988, which houses ear bud 986, retractable cord 998, and wire 987. FIG. 26C shows another embodiment of eyeglass temples adapted to receive a slip-on assembly according to the invention. Temple assembly 1000 includes screw area 1010, end portion 1012, and wall 1006 protruding beyond outside the edge of temple 1004. Wall 1006 defines opening 1002, and is adapted to receive a slip-on assembly according to the invention.

Figure 27:
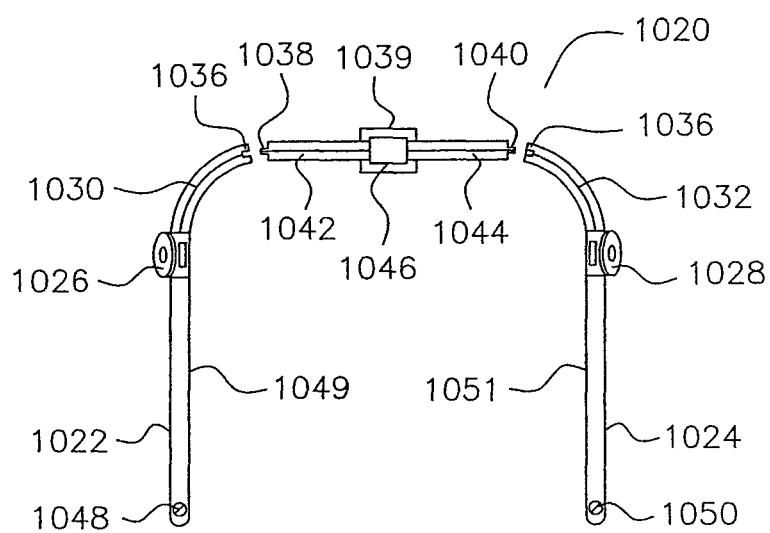
FIG. 27 is a diagrammatic top view of the temple assemblies and DEP of detachable electronic eyeglasses system of the invention.

FIG. 27 shows a system according to the invention comprised of three parts, right temple 1049, left temple 1051, and DEP 1039. Right and left temple 1049, 1051 having screw area 1048, 1050 located in right and left front portion 1022, 1024, and further including right and left ear buds 1026, 1028, right and left wire 1030, 1032, and right and left female electrical connectors 1034, 1036 which are releasably connected with right and left connector 1038, 1040 for electrically connecting right and left temple 1049, 1051 with right and left wires 1030, 1032 and electronic package 1046 of DEP 1039.

Figure 28:
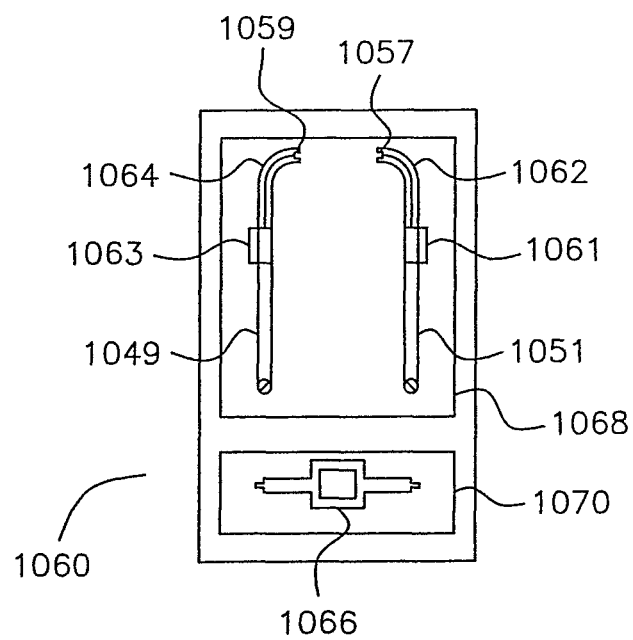
FIG. 28 is a diagrammatic top view of a kit containing temple assemblies and DEP.

FIG. 28 shows a kit of the invention comprised of DEP 1066, right temple 1049 and left temple 1051. Accordingly, there is seen in FIG. 28 kit having box 1060 which includes area 1070 housing DEP 1066 and area 1068 housing right temple 1049 and left temple 1051, with said right and left temple 1049, 1051 having right and left ear bud 1063, 1061, right and left wire 1064, 1062 and right and left electrical connection 1059, 1057.

It is understood that one of the methods of the invention includes the step of replacing conventional temples of eyeglasses by the wired temples of the invention. This allows the user to keep the original lenses and lens rim of conventional eyeglasses, and just replace the temple with similarly looking temples as the original. With the temples of the invention the original eyeglasses with the original lenses and lens rims are now enabled to perform an electronic function.

Figure 29:
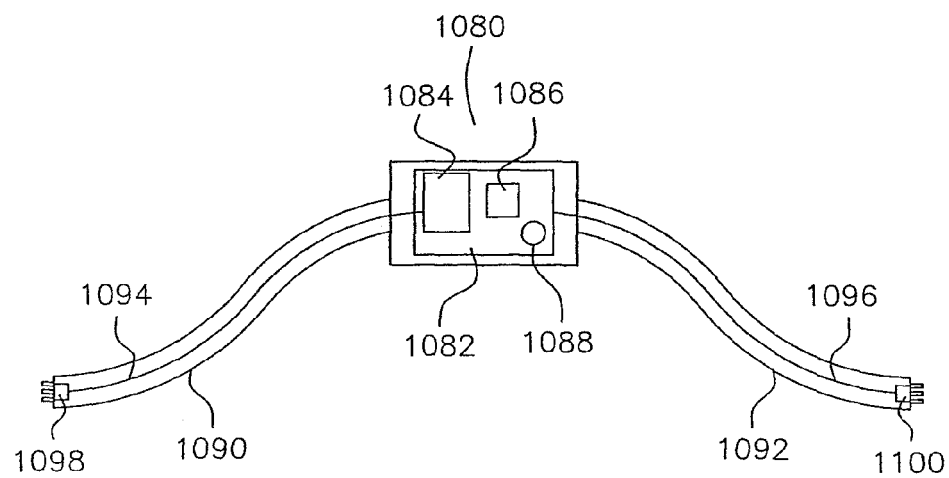
FIG. 29 is a diagrammatic top view of a DEP.

FIG. 29. shows an exemplary DEP. It is understood that any article having the capability of performing a function including powering a light source, playing music, receiving a wireless signal, playing video, voice recording, video recording, receiving and/or transmitting an internet signal, and the like is within the scope of the invention and can function as the electronic package of DEP with said article having electrical connections for releasably connecting with the frame of eyeglasses. Although powering a light source is an electrical function, for the purposes of the description, any electrical function is described as a function performed by the Detachable Electronic Package or DEP. Furthermore, electronic package of DEP can include digital player for music and video, a small CD player, and a camera with SD card port for extra storage in the DEP. Function of DEP also include system for measuring biological parameter, and by way of illustration DEP can be adapted to measure glucose levels, temperature, eye pressure, blood pressure, oxygen, blood flow, or any other physical parameter or chemical substance present in the body. Again, by way of illustration, the electronic package of DEP is connected to a sensor secured to the eyeglasses in accordance to the sensing eyeglasses invented by Abreu and described in US Patent application 20040059212 and 20040242976, in which the wireless transmitter is removed from the front part of the eyeglasses and place as a DEP in the back of the head, or alternatively the electronic package of DEP measures chemical substances such as glucose as a stand alone unit. An eyeglasses with tubes next to the nose to measure oxygen can have the electronics for processing the data and display housed away in the DEP.

The apparatus and method of the invention allows a system that performs an electric or electronic function to be divided between DEP and the frame of eyeglasses, allowing therefore better weight distribution while allowing a wearable article such as eyeglasses to be capable of performing a second function besides visual function. Accordingly, DEP can include only a power source that powers a fan, heater, or Peltier device housed in the frame of the eyeglasses for heating and cooling the user. In this embodiment, the eyeglasses do not have an ear bud, with said eyeglasses having only a small fan for cooling purposes and an electrical connection for connecting with the DEP working as a power source for the fan. DEP can further function as a remote control, a wireless receiver for receiving a television signal, and a speaker. In addition, the invention allows hearing aids to be miniaturized since the power source and/or other electronics are located in the DEP and the small single hearing element is housed at the end of the temple of the eyeglasses. A variety of hearing aids and other devices can be made extremely small, in accordance to the invention, by housing part of the device in the DEP, and part in the head mounted gear such as eyeglasses. Thus making the head mounted gear more comfortable and with multiple electronic functions. The ear buds of the eyeglasses can work as insulators from exterior noises while receiving sound from a digital music player, with part of the electronics and/or power source stored in the DEP away from the frames.

Although the preferred embodiment includes both right and left temples, having electrical connections and wires, it is understood that only one temple of the eyeglasses can have an electrical connection, with said electrical connection releasably connected to a wire from DEP. In this embodiment DEP is secure to both temples, but only one temple is electrically connected to the DEP while the other temple is only mechanically connected to the DEP.

In FIG. 29 there is seen DEP 1080 comprised of right and left cords 1090, 1092 housing right and left wires 1094, 1096 wires, with said wires 1094, 1096 connected in one end to right and left electrical connectors 1098, 1100 and at the opposite end said wires 1094, 1096 are connected to electronic package 1082, with said package having, by way of illustration a power source 1088, chip 1086, and memory 1084.

Figure 30:
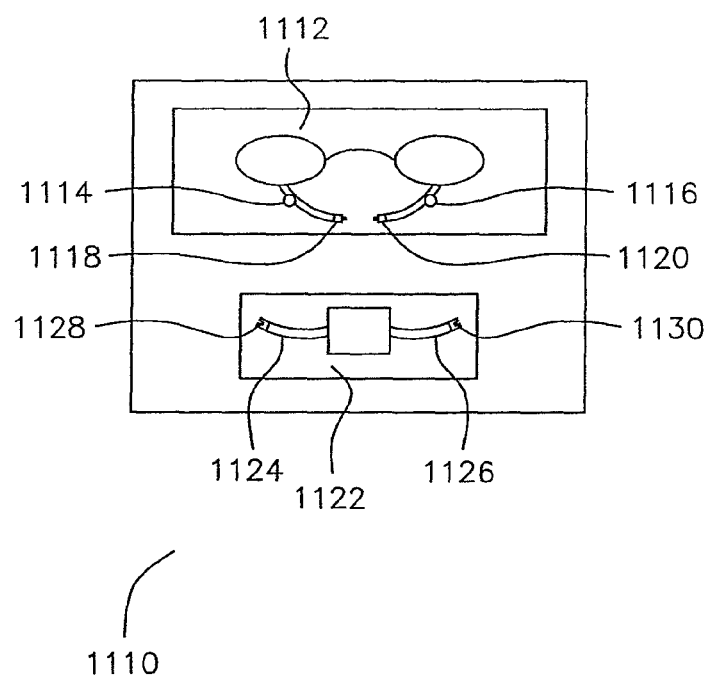
FIG. 30 is a diagrammatic top view of a kit containing detachable electronic eyeglasses and DEP.

FIG. 30 shows kit 1110 comprised of detachable electronic eyeglasses 1112 and DEP 1122. Kit 1110 includes detachable electronic eyeglasses 1112 having right and left ear buds 1114, 1116 and right and left electrical connections 1118, 1120. DEP 1122 is comprised of two wires 1124, 1126 and two electrical connections 1128, 1130 at the end of said wires 1124, 1126.

Figure 30A:
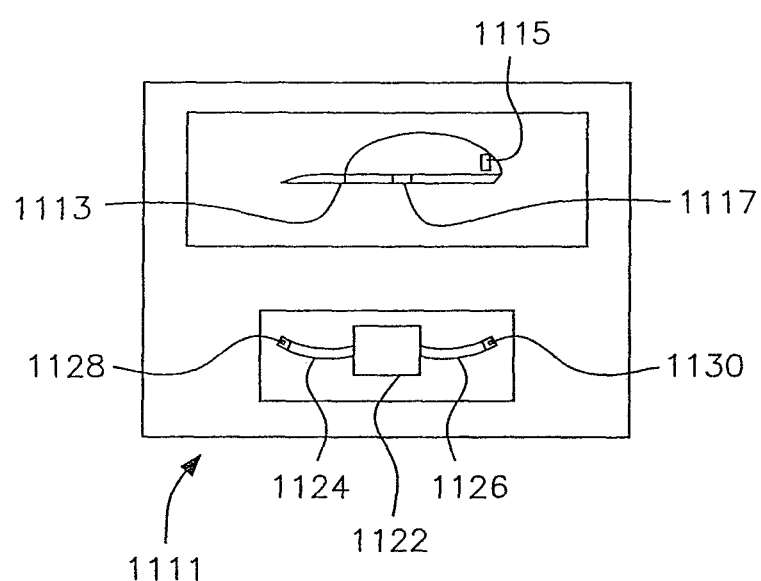
FIG. 30A is a diagrammatic top view of a kit containing detachable electronic cap and DEP.

FIG. 30A shows kit 1111 comprised of detachable electronic cap 1113 and DEP 1122. Kit 1111 includes detachable electronic cap 1113 having pouch 1117 on the side for retaining an ear bud and pouch 1115 on the back for retaining a DEP 1122 in accordance to the invention. DEP 1122 is comprised of two wires 1124, 1126 and two electrical connections 1128, 1130 at the end of said wires 1124, 1126.

Figure 31A:
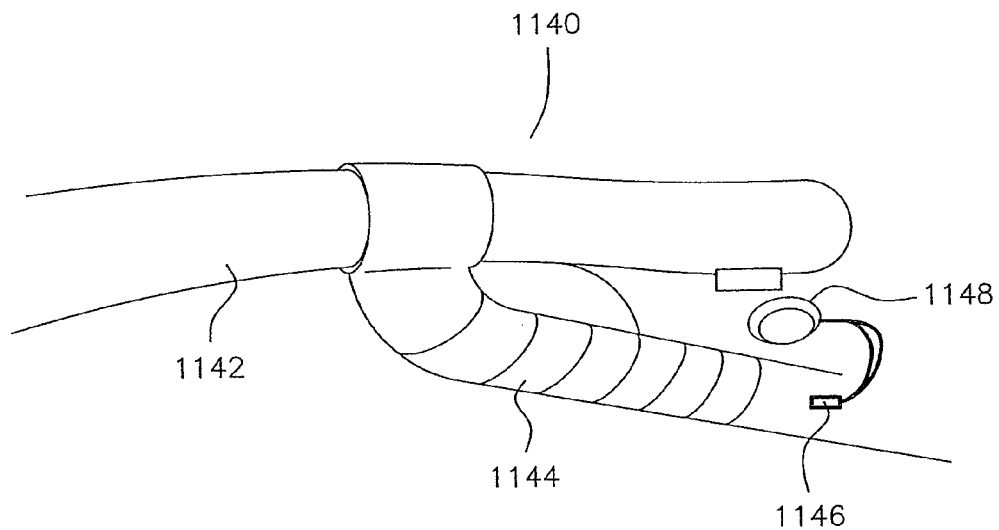
FIGS. 31A and 31B are perspective side views of another temple assembly of the invention.
Figure 31B:
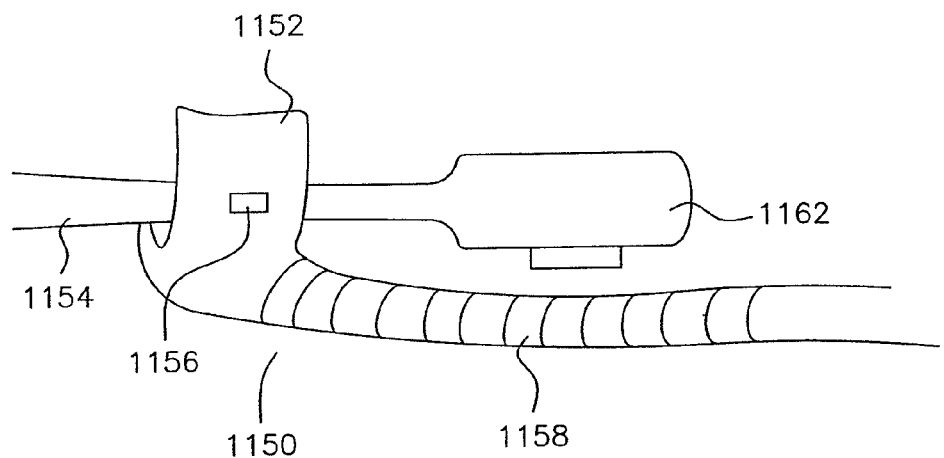

FIG. 31A shows temple assembly 1140 having end portion 1142 connected to cord 1144 of DEP, with said cord 1144 connected to ear bud 1148. In this embodiment ear bud 1148 is connected to cord 1144 through wire 1146, with said ear bud 1148 housed outside temple 1142. FIG. 31B shows temple assembly 1150 with the electrical connection between plate 1152 at the end of cord 1158 of DEP and temple 1154. Plate 1152 is electrically connected with electric connection 1156 of temple 1154, with end portion 1160 of temple 1154 being free of any electrical connectors or wires.

FIG. 32 shows a preferred embodiment of detachable electronic eyeglasses 1170 with right and left ear buds 1178 and 1176 hidden away within the structure of right and left temples 1182, 1180. Right temple 1182 includes portion 1174 for housing ear bud 1178 and end portion 1192 with electrical connection 1188 for connecting with cord 1189 of DEP. Left temple 1180 includes portion 1172 for housing ear bud 1176 and wire 1196 connected to camera 1184 adjacent to left lens rim 1186. Left temple 1180 further includes wire 1198 in the end portion 1194 connected to electrical connection 1190 and cord 1191 of DEP. FIG. 32A shows another embodiment in which ear bud 1178 is secure to the outside wall 1180 of temple 1181, with said ear bud connected with electrical connection 1190 at end portion 1194 of temple 1181.

FIG. 33 shows another preferred embodiment with ear buds secured to the end of temple and working as an extension of temples. Accordingly, in FIG. 33 there is seen detachable electronic eyeglasses 1200 with right and left lens rims 1202, 1204, right and left temples 1206, 1208 with right and left end portion 1210, 1212 having right and left wires 1213, 1215 (shown as broken lines) connected to right and left ear buds 1214, 1216. Right end portion 1210 and ear bud 1214 are shown bent to reveal electrical connector 1230 adjacent to ear bud 1214 and wire 1213. Electrical connector 1230 is adapted to connect to a wire of a DEP (not shown). To be operational the detachable electronic eyeglasses need to be electrically or wirelessly connected to an electrical circuit housed in the electronic package, as described for other embodiments of the invention.

Figure 33A:
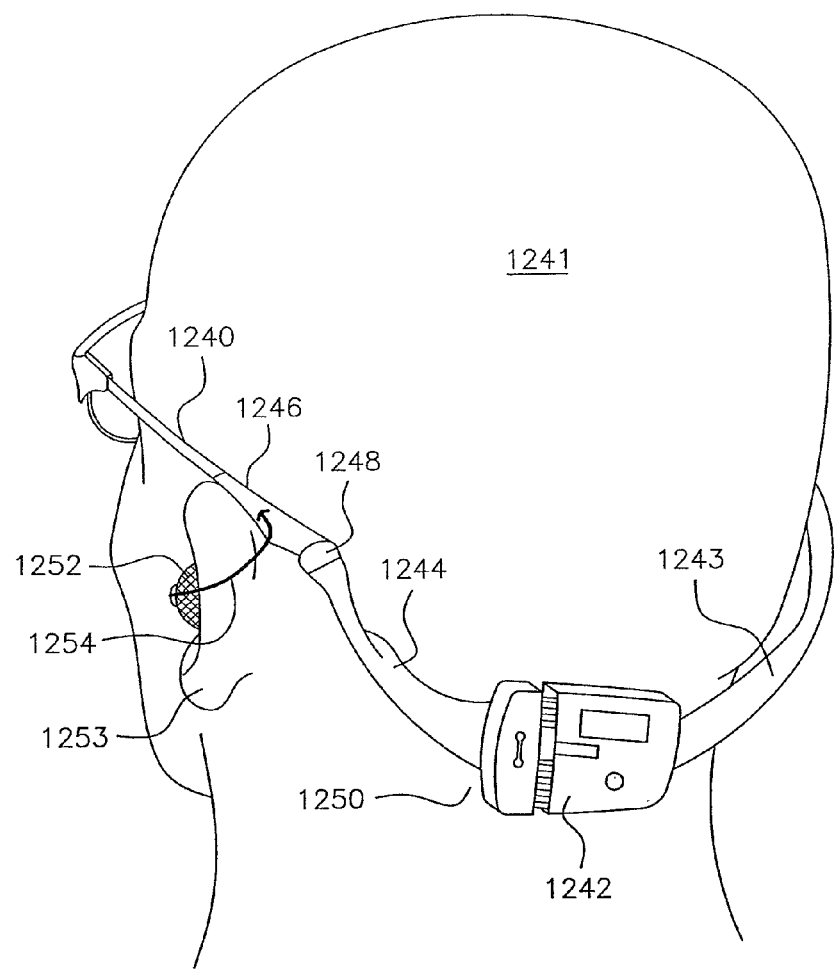
FIG. 33A is a perspective side view of a temple assembly of the detachable electronic eyeglasses of FIG. 33.

FIG. 33A shows a storage cord according to the invention attached to a pair of electronically enabled glasses according to the invention.

Figure 34:
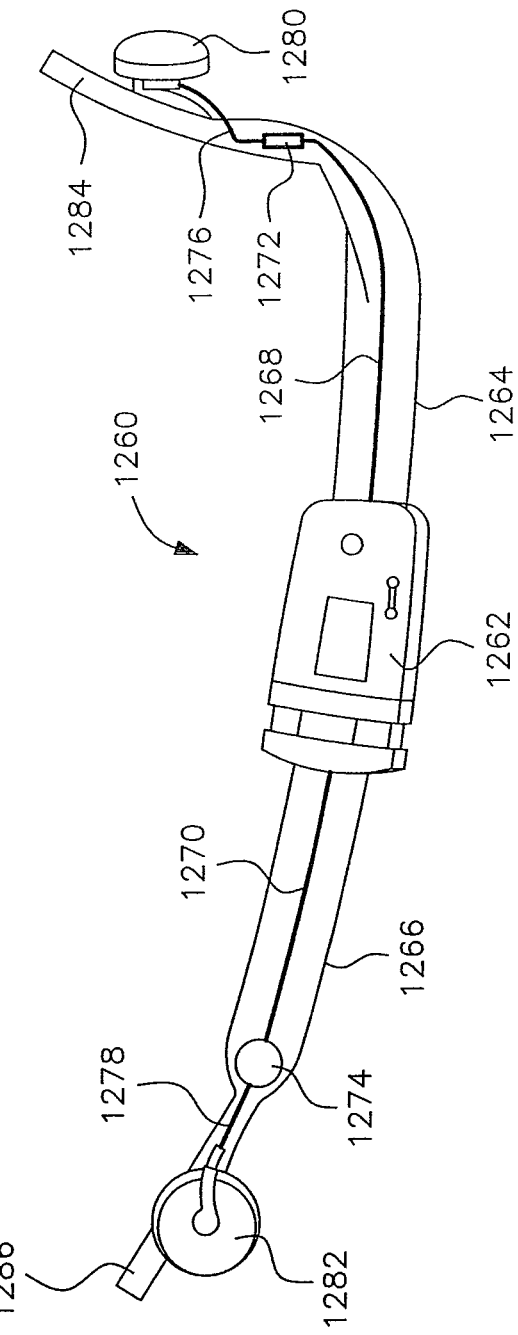
FIG. 34 is a perspective back view of the detachable electronic eyeglasses cord of the invention.

FIG. 34 shows another embodiment of a detachable electronic cord package according to the invention. In this embodiment, sleeves 1286 and 1284 at the end of cords 1266 and 1264 are preferably stretchable and have no electrical parts or connectors, and are used to mechanically secure the end of cords 1266 and 1264 to temples of eyeglasses (not shown). Detachable electronic cord package 1260 comprises electronics package 1262, and right and left cords 1264 and 1266. Electronics package 1262 can perform any of the electronic functions described in this application. Right and left cords 1264 and 1266 house right and left wires 1268 and 1270, right and left retractable cord spools 1272 and 1274, and right and left wires 1276 and 1278, which are connected to right and left ear buds 1280 and 1282. Retractable cord spools 1272 and 1274 can be replaced by an extendable coiled wire, or other means of retracting the wires. Right and left cords 1264 and 1266 further include right and left sleeves 1284 and 1286 or other means for securing cords 1264 and 1266 to the ends of eyeglass temples (not shown). Sleeves 1284 and 1286 are adapted for overlapping the free end of such temples. It should be understood that cords 1264 and 1266 can be secured to any portion of the frame of eyeglasses, such as for example the mid-portion of the temples by means, for example, of a clip-on, hook, slip-on, and the like located at the end of cords 1264 and 1266. The embodiment shown in FIG. 34 can attach to any regular pair of eyeglasses. Thus, with this embodiment, ordinary eyeglasses without wires or electrical connections can be fit with detachable electronic cord package 1260 of the invention. The sleeves are preferably made of a stretchable material such as, for example neoprene, cotton, leather, and the like, in order to more firmly secure the cord to the temple of eyeglasses. It is understood that electronics package 1262 can be removably secured to cords 1264 and 1266, or be permanently affixed thereto. If the electronic package 1262 is permanently affixed, a further third piece—preferably an essentially C-shape tube—may used to connect sleeves 1284 and 1286. This makes the entire system into a round item which can be worn as a collar around a body part such as the neck. This embodiment thus allow the electronic package to be within the visual axis of the user, and even if the electronics package is permanently attached the device still would be easily reachable. Alternatively, electronics package 1262 can be housed in a cradle-like housing and have extendable/retractable cords, such as coiled cords or retractable spool cords, in accordance to other embodiments of the present invention described herein.

FIG. 34A shows detachable electronic cord package 1260 being worn by user 1290. Cord package 1260 is connected mechanically—not electronically—to regular eyeglasses 1292. Electronic package 1262 is positioned along the neck of user 1290, with left sleeve 1286 encasing free end 1294 of temple 1296. Preferably, sleeve 1286 has elastic properties to better secure said sleeve 1286 to temple 1296. Retractable wire 1278 exits from left cord 1268, and is shown in an extended position, connected to ear bud 1282, which is positioned on ear 1298. A variety of fastening means can be used to secure detachable electronic cord package 1260 to the frame of the eyeglasses including clips, groove mechanism, hook and loop fastener, snap-on, tying a knot to end portion of temples forming a ring, sliding mechanism, and the like.

Figure 34B:
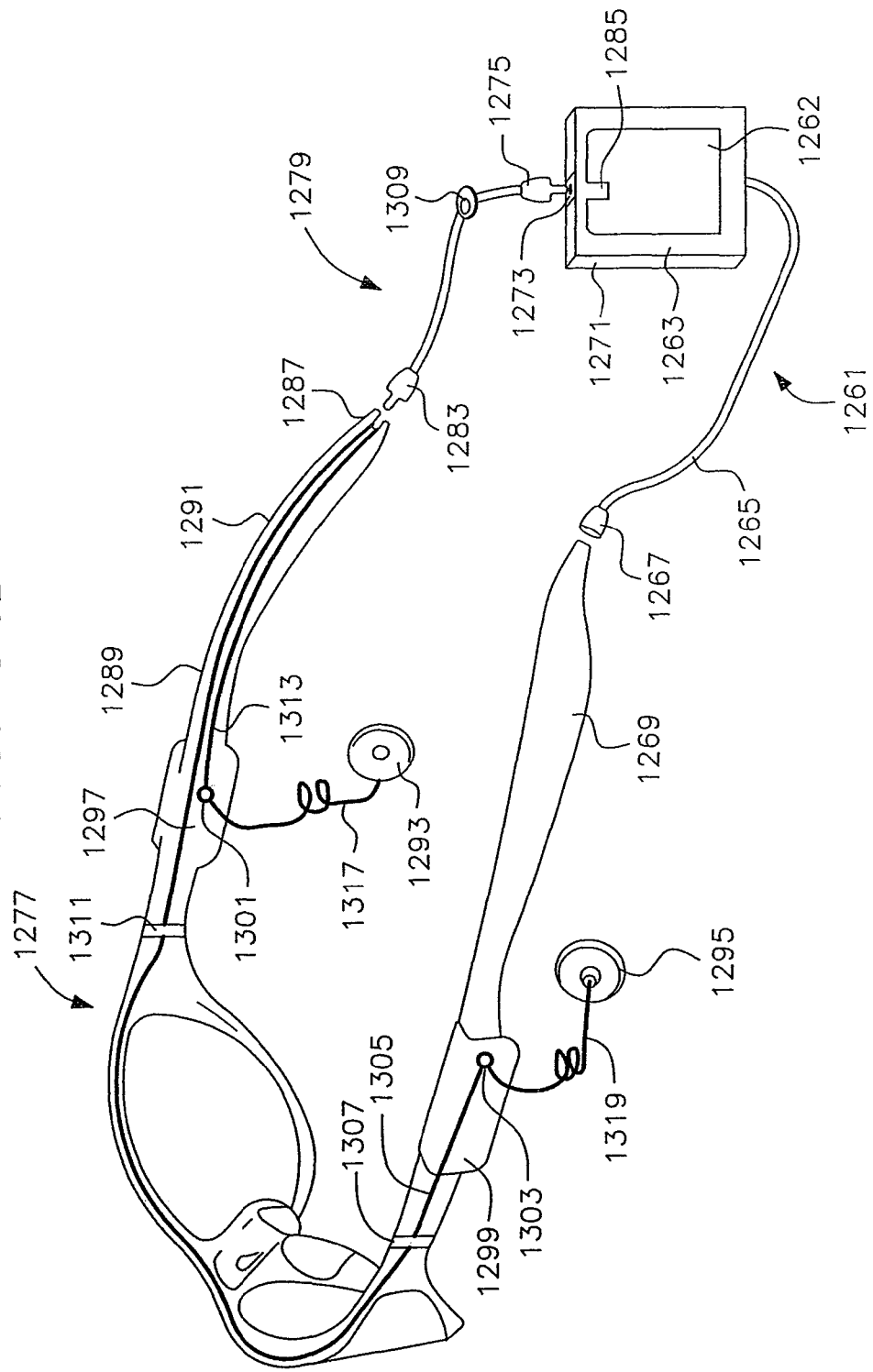
FIG. 34B is a perspective side view of another exemplary cord assembly of the detachable electronic eyeglasses.

The detachable electronic system of FIG. 34B comprises connecting pouch 1261, DEP 1262, which is mechanically secured by connecting pouch 1261, eyeglasses 1277, and cable 1279. Connecting pouch 1261 comprises pouch 1263 with slots 1271 and 1273, and arm 1265. Arm 1265 terminates as stretchable sleeve 1267 for which can be snuggly secured to temple 1269. Electronics package 1262 may be inserted into pouch 1263 through slot 1271. Electrical plug 1275 may be inserted into pouch 1263 through slot 1273. Cable 1279 preferably includes male plugs 1275 and 1283 and spool 1309. Plug 1275 is releasably connected to female connector 1285 of DEP 1262 and plug 1283 is releasably connected to female connector 1287 of eyeglasses 1277. Temple 1289 has an electrical connector 1287, while both temples 1289 and 1269 have ear buds 1293 and 1295, wires 1317 and 1319, spools 1301 and 1303, and housings 1297 and 1299 for the ear buds and spools. Wire portion 1313 is connected to spool 1301 and terminates in electrical connector 1287. Wire portion 1305 is connected to spool 1303, and goes from left temple 1289 to right temple 1291 through two metallic electrical plate assemblies 1307 and 1311 at the hinges to create an electrical contact between the lens rim and the temples. This avoids running a wire going through a hinge, and the consequent stresses of constant bending and unbending. Wire portion 1305 terminates in electrical connector 1287. It will be understood that cable 1279 can be covered by a cord that is permanently affixed to pouch 1263.

The present invention also provides an entirely new approach for Bluetooth-type headset devices. (By "Bluetooth device" or "Bluetooth-type device" I mean devices which attach to the user's ear and communicate wirelessly with other electronic devices using Bluetooth communication protocols or other communications protocols.) Prior art wrap-around ear Bluetooth devices have the wrap-around arm on the Bluetooth device which competes for the same space on the ear as the end of the eyeglass temples. Thus people who wear eyeglasses have two hard items around the ear, making this practice uncomfortable, sometimes painful, and often ineffective with respect to securing the Bluetooth device to the ear. This embodiment of the present invention offers key advantages for people who wear eyeglasses on a regular basis and want to use a Bluetooth device. With the invention, the temple of the eyeglasses are the only piece which needs to rest on the ear, while the Bluetooth device or other wireless device provides additional benefits to the user without requiring added hardware pressing against the head and ear. The Bluetooth device of the present invention shifts weight away from a very sensitive part of the body, the ears, and not even require any part of the device to press against the delicate and thin skin around the ears.

Figure 34C:
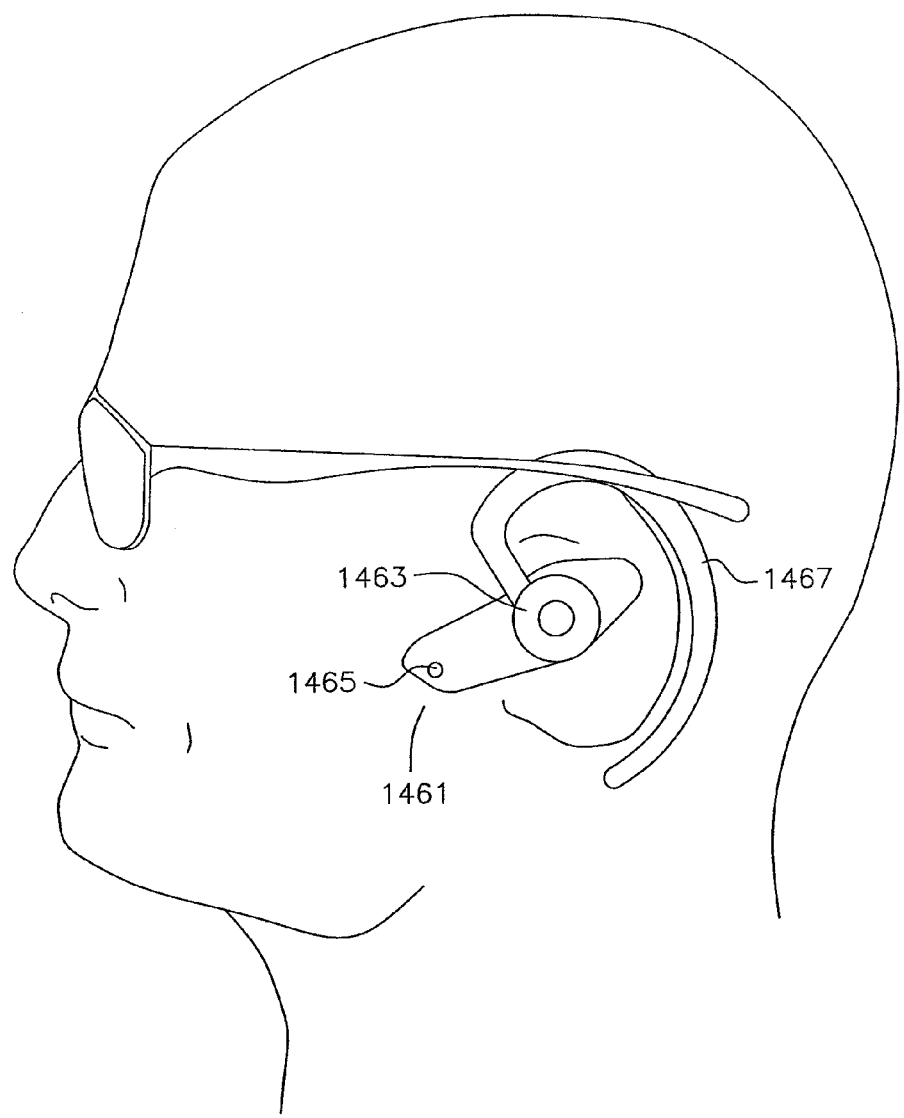
FIGS. 34C to 34H are various exemplary embodiments of Bluetooth enabled systems cooperating with eyeglasses or other wearable articles.

FIG. 34C shows prior art Bluetooth device 1461. Bluetooth device 1461 comprises ear support piece 1467, microphone 1465, and speaker 1463 (or any other device for transmitting sound. Speaker 1463 receives audio signal from a second device, such as a cell phone. Speaker 1463 is physically integrated into device 1461 and adapted to fit in the ear canal. Such devices are sold, for example by the Nokia Company of Finland and Motorola, Inc. of the United States. None of the known Bluetooth devices have a separate electrical connector for an ear bud, since they were designed to be held by the ear, and were able to generates sound without any external wires.

Figure 34D:
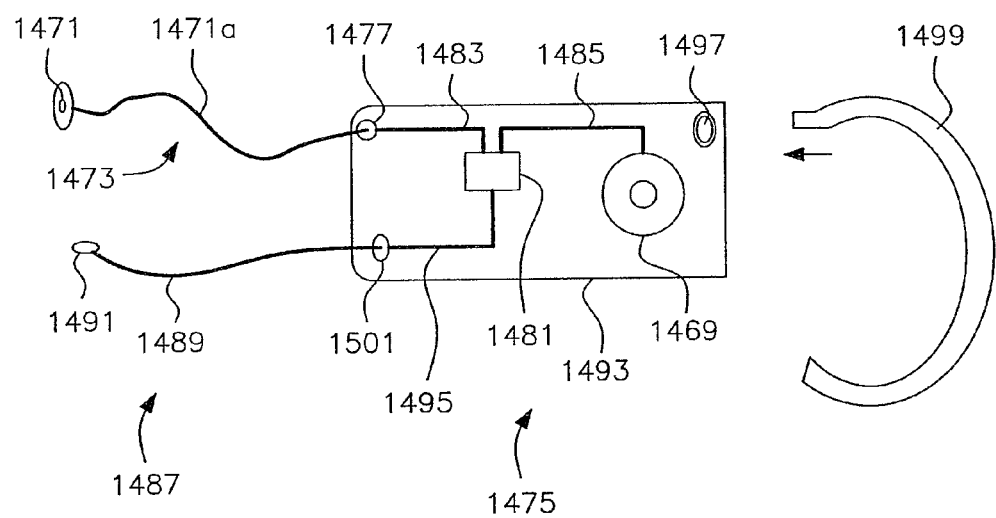

The present invention provides an improved Bluetooth device as shown in FIG. 34D. Device 1475 has external speaker (or ear bud) 1471 and external wire 1471a for transmitting audio signal (from a cell phone, for example) to the ear of the user. Specialized Bluetooth device 1475 has housing 1493 and two speaker assemblies for emitting sound: internal speaker 1469 which is physically integrated in housing 1493, and external speaker 1471 which is connected to housing 1493 through electrical connector 1477. This allows external speaker 1471 to be positioned in a location remote from housing 1493. External wire 1471a outside housing 1493 is connected to a single external speaker (ear bud) 1471, forming external speaker assembly 1473. External speaker assembly 1473 is preferably removably connected to device 1475 through female connector 1477. It is understood that assembly 1473 can also be permanently affixed to housing 1493. Both external speaker assembly 1473 and internal speaker 1469 connect to Bluetooth wireless communications system 1481. Wire 1483 connects external speaker assembly 1473 and electrical connector 1477 in housing 1493 to Bluetooth wireless communications system 1481. Wire 1485 connects internal speaker 1469 in housing 1493 to Bluetooth wireless communications system 1481. Bluetooth wireless communications system 1481 contains a power source and all parts necessary for a 2-way wireless Bluetooth transmission of data. Specialized Bluetooth device 1475 further includes removably connected microphone assembly 1487, comprising stalk 1489 for transmitting sound and a microphone 1491. It is understood that microphone stalk 1489 can also be permanently affixed to housing 1493. Stalk 1489 can work as a voice tube, with its distal end connected to housing 1493 through connector 1501, which in turn is connected to Bluetooth wireless communications system 1481 through wire 1495.

Specialized Bluetooth device 1475 can be adapted to as an ear-supported device. Accordingly, housing 1493 further includes opening 1497 for receiving ear support assembly 1499. Therefore, specialized Bluetooth device 1475 can be an ear supported device (like, in some respects, prior art devices), which can create more discomfort by activating pain fibers of the sensitive anatomic region of the ear, or as a more comfortable and biologically fit device which does do not apply pressure directly against the ear. Because microphone assembly 1487 is removable and interchangeable with other devices, an assembly of different size and format can be used when device 1475 is supported by the ear using ear support assembly 1499. In an ear supported application, ear bud 1471 is disconnected from housing 1493, and a shorter stalk 1489 for microphone assembly 1487 is preferably used. Alternatively, device 1475 can be attached to the temple of a user's eyeglasses using one of the attachment mechanisms described in connection with FIGS. 19-21, or other attachment mechanisms.

Figure 34E:
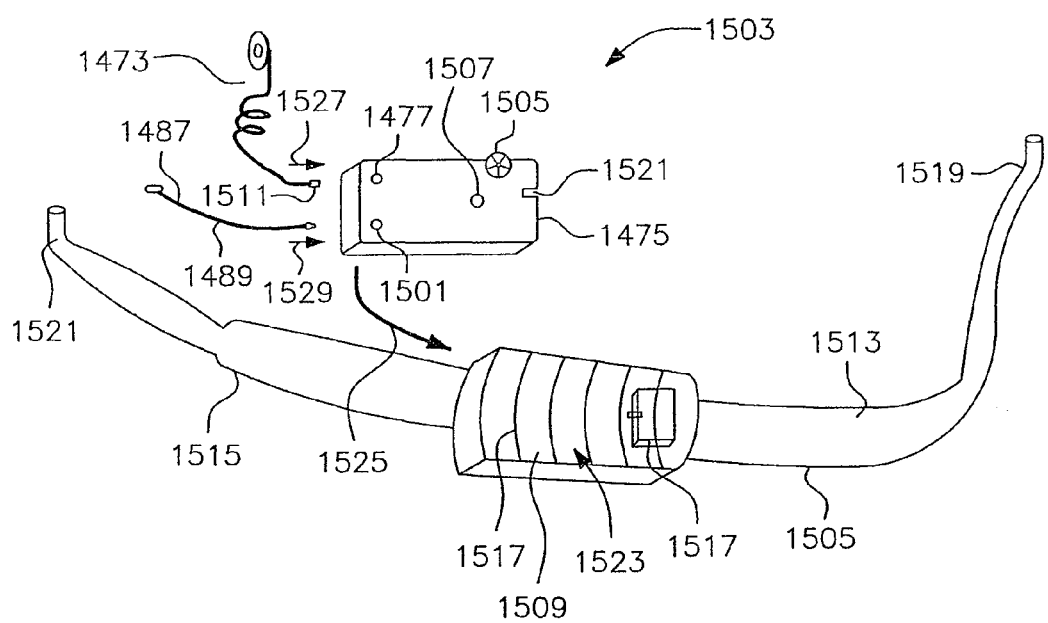

FIG. 34E shows Bluetooth system 1503, comprising specialized eyewear storage cord 1505 and specialized Bluetooth device 1475. Bluetooth device 1475 has volume control button 1505, on/off switch 1507 for activating the device and receiving a signal from another Bluetooth device, female connector 1477 for connecting plug 1511 of external speaker assembly 1473, and a second connector 1501 for connecting stalk 1489 of microphone assembly 1487. Device 1475 can have another electrical connector 1521 for connecting to battery 1517. Specialized eyewear storage cord 1505 has right cord 1513 and left cord 1515, preferably disposed on opposite ends of a storage area 1509. Right sleeve 1519 and left sleeve 1521 as well specialized eyewear storage cord 1505 can be made of the same types of materials as the embodiment shown in FIG. 34. Storage area 1509 includes an pocket—preferably rectangular—preferably comprised of a plurality of elastic straps 1517 which coverings its upper and side parts. This permits the user to access volume control 1505, on/off button 1507, and other controls and parts even when device 1475 is inside storage area 1509. Storage area 1509 can also hold extra battery. Although storage area 1509 is described as a "pocket", it can also have a tunnel-like shape, thus allowing Bluetooth device 1475 to be placed in storage area 1509 from either the right or the left side. Arrow 1525 indicates device 1475 being placed in storage area 1509 from the left side, with battery 1517 located on the right side. Arrow 1527 indicates external speaker assembly 1473 being removably connected to connector 1477. Arrow 1529 indicates microphone assembly 1487 being removably connected to connector 1501. Preferred maximum dimensions for pocket 1509 are 15 cm in length, 10 cm in width, and 6 cm in height or thickness, and preferably 10 cm in length, 6 cm in width, and 4 cm in height or thickness, and most preferably 7 cm in length, 4 cm in width, and 2.5 cm in height. Storage area 1509 may be movable laterally relative to right cord 1513 and left cord 1515.

Figure 34F:
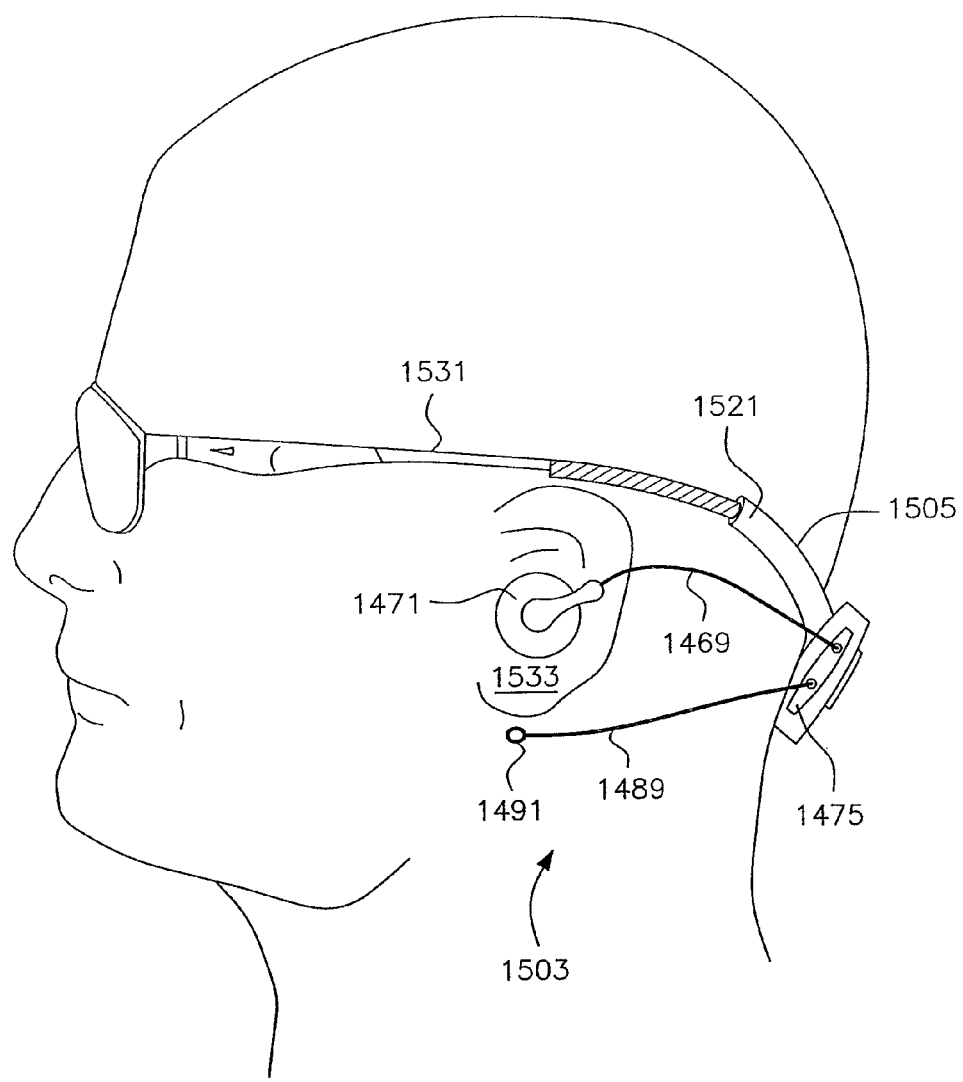

FIG. 34F shows a Bluetooth system 1503 according to the present invention when worn by a user. Bluetooth system 1503 includes left sleeve 1521 of eyeglasses storage cord 1505 connected to left temple 1531 by encircling the free end of temple 1531. Storage cord 1505 retains Bluetooth device 1475. Ear bud 1471 is positioned on ear 1533 through wire 1469. This allows the user to hear audio from the Bluetooth without having a bulky device pressing against his or her ear. Microphone 1491 is connected to Bluetooth device 1475 through stalk 1489, and located preferably under the ear, as shown in FIG. 34F. It will be understood that wire 1469 and wire 1489 can be from one wire, which runs under the ear, with the end split in two, with the upper end including speaker 1471 and positioned on the ear and the lower end including the microphone and positioned under the ear.

Figure 34G:
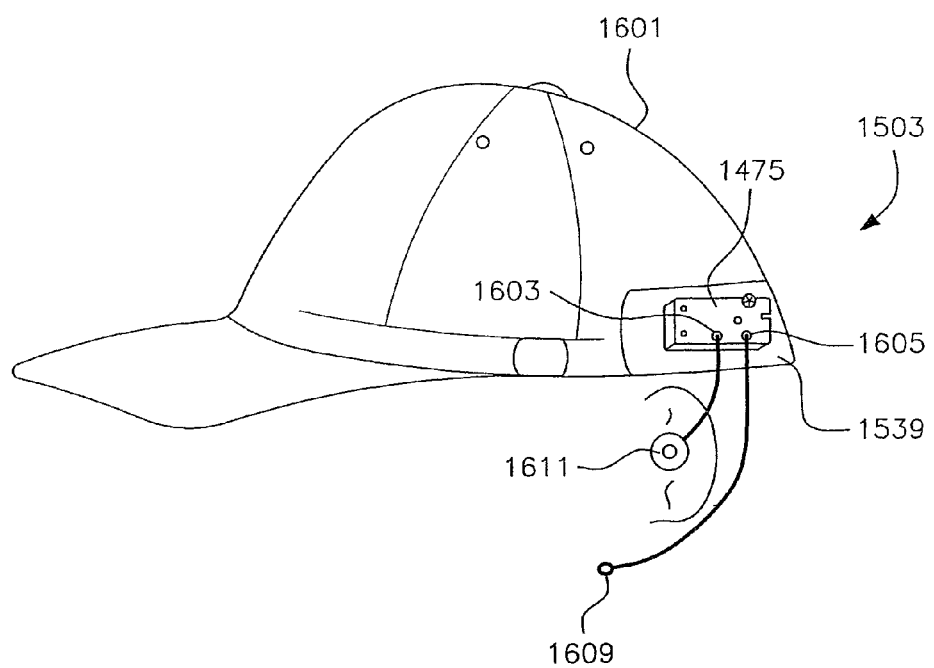

FIG. 34G shows another wearable article incorporating Bluetooth system 1503 of the invention that houses the device in a pocket of a head mounted gear such as a cap 1601. Specialized Bluetooth device 1475 is retained in pocket 1539 of cap 1601. Bluetooth device 1475 has connector 1603 for connecting to ear bud 1611, and second connector 1605 for connecting stalk 1607 and microphone 1609. Preferably, both connectors 1603 and 1605 are disposed on the bottom of device 1475 and retained by a pocket with similar construction as pocket 1509 and having straps 1517 for easily accessing buttons (as described in connection with FIG. 34E). Pockets 1539 and 1509 can have similar coiled cords and retractable cord spools in accordance with the invention for removing device 1475 from a pocket and viewing it. A mechanism for capturing voice through bone vibration can be integrated into ear bud 1611 and speaker assembly 1473.

Figure 34H:
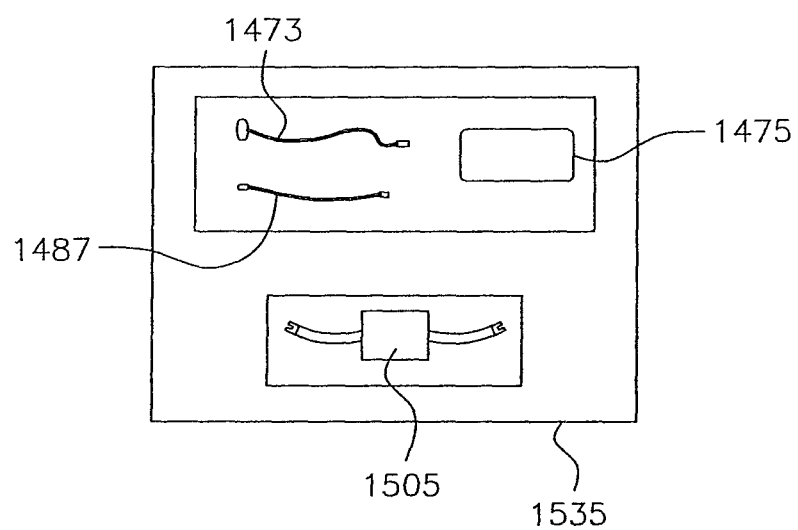

FIG. 34H shows a kit according to the invention comprising Bluetooth device 1475, eyeglasses storage cord 1505, microphone assembly 1487, and external speaker assembly 1473 retained in box 1535. It is understood that cord 1505 can be replaced—or supplemented by a cap as described in connection with FIG. 34G.

The present invention teaches a device and method that uses a cord secured to temples of eyeglasses as an article that allows a user to better balance eyeglasses on his or her face and provide better weight distribution, while allowing the cord to have storage capabilities. The cord can work as a mechanical holder, and does not need electrical wires. The cord can have a pouch or pocket for retaining an electronic package such as a digital music player or a cellular phone, with ear buds working as a separate unit and connected directly to the music player while the two ends of the cord are secured to right and left side of the frame of the eyeglasses. It will be apparent to one of ordinary skill in the art that the cord can have more than one pouch, with a second pouch available for retaining ear buds, or a second electronic device, for example.

Figure 34J:
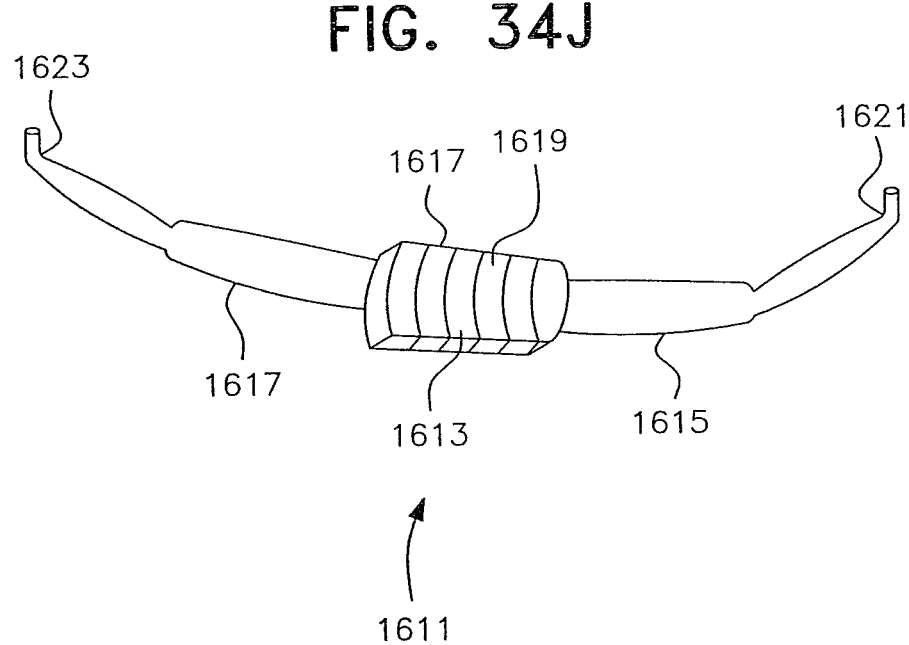

FIG. 34J shows an illustration of the specialized eyeglasses storage cord 1611 of the invention that includes a storage area 1613 such as a pocket or pouch, with two arms 1615 and 1617 disposed preferably on each side of storage area 1613. Storage area 1613 preferably includes a pocket with elastic capabilities and a combination of straps 1617 and openings 1619 similar to pocket 1509 of FIG. 34E. Right and left arms 1615 and 1617 terminates in right and left sleeves 1621 and 1623, which are shaped to embraces the free end of temples of eyeglasses (or other objects), which preferably measure preferably equal to or less than 1.8 cm in diameter or in the dimension of the free end, and most preferably equal to or less than 1.0 cm in diameter or in the dimension of the free end. Sleeves 1621 and 1623 slide on to the free end of temples for a snug fit regardless of temple size.

Figure 34K:
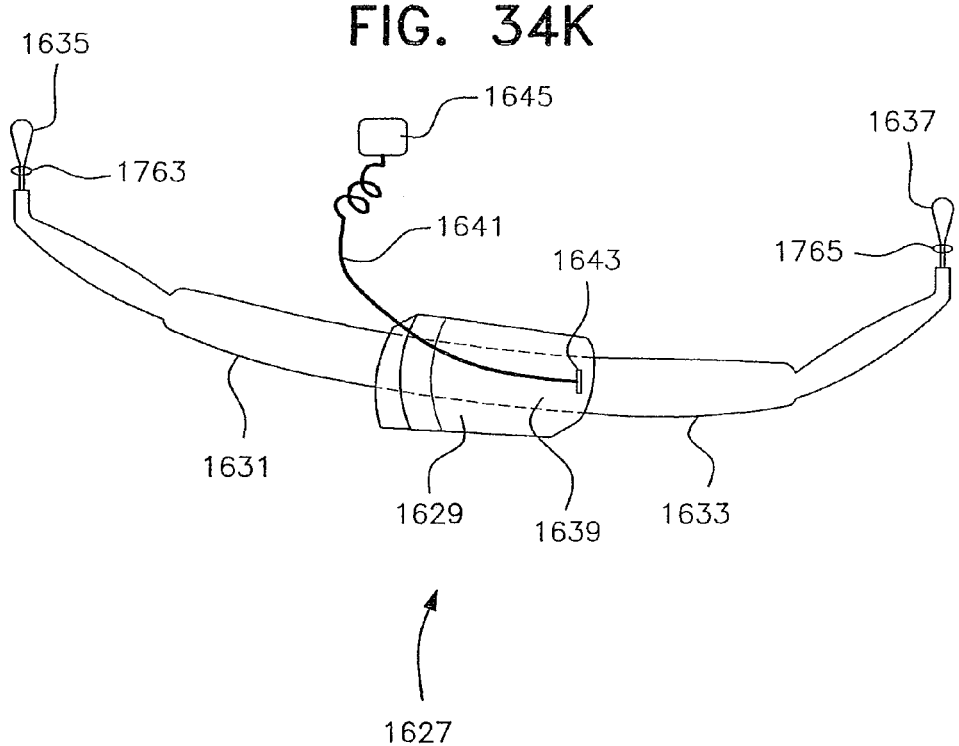

FIG. 34*k* shows another embodiment of the invention. Eyewear storage cord 1627 includes storage area 1629 for housing an electronic package. Arms 1631 and 1633 are secured to storage area 1629. In this embodiment, arms 1631 and 1633 terminate in loop portions 1635 and 1637, which preferably are made of silicone or any deformable plastic. Sliding rings 1763 and 1765, preferably made of a rigid polymer such as PVC, are secured to the loops 1635 and 1637. Rings 1763 and 1765 can be moved longitudinally towards loops 1635 and 1637, closing them up and providing a snug fit to any size of temple or other object.

Pocket 1629 has slot 1641a, and is secured to cord 1639, preferably by stitching (shown by broken lines). Retractable cord 1641 (preferably a coiled cord) is secured to pocket 1629 by support 1643 (which can be, for example, a hard plastic attached to one of the walls of pocket 1629), with said cord terminating in holding structure 1645. Holding structure 1645 is preferably a plate that has a hook and loop surface. Plate 1645 is removably attached to an electronic package (not shown), by a hook an loop system, adhesive tape, or other fastening means.

It will be understood that loops 1635 and 1637 can be replaced with hooks, clips, or the like for securing cord 1627 to temples or other objects as a C-shape structure. To become operational, cord 1627 is preferably secured to temple of eyeglasses or another object. It is understood that pocket 1629, although a preferred embodiment, is not required, since the electronics package can be secured to plate 1645 with a retractable cord 1641, preferably as a spring loaded spool assembly, with said retractable cord 1641 being directly attached to cord 1639.

Figure 34L:
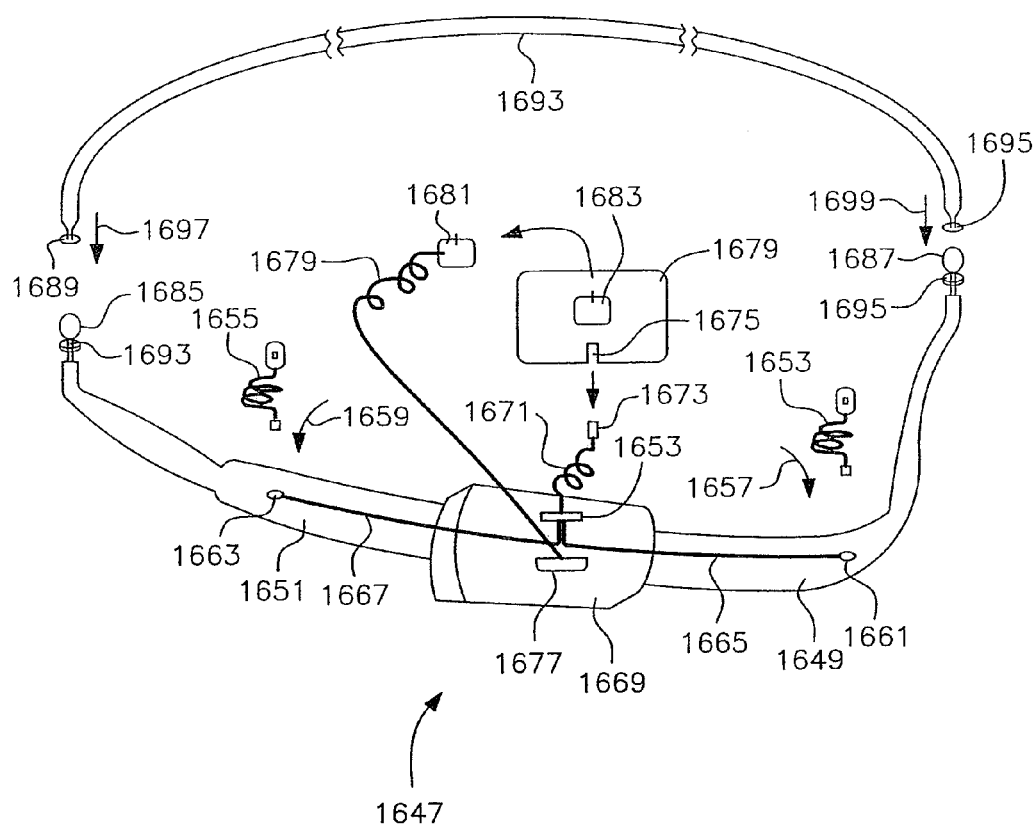

FIG. 34L shows a preferred embodiment of the invention comprising storage cord 1647 and an electronic package 1679 (such as a digital music player). Eyewear storage cord 1647 includes pocket 1669 and flexible arms 1649 and 1651, with right arm 1649 being in an extended position. The ends of arms 1649 and 1651 are essentially similar to the embodiment of FIG. 34*k*. Arms 1649 and 1651 house electrical jacks 1661 and 1663 for removably connecting with ear bud assemblies 1653 and 1655, as indicated by arrows 1657 and 1659. Right and left electrical jacks 1661 and 1663 are connected by wires 1665 and 1667 in arms 1649 and 1651 to support structure 1653 located inside pocket 1669. Support structure 1653 provides a fixation point, which allows ear bud assemblies 1653 and 1655 to remain stationary while the electronic package 1679 is pulled out of pocket 1669. Wires 1665 and 1667 are joined together at supporting plate 1653 and run together as wire portion 1671, which terminate as electrical connector 1673. Connector 1673 is removably connected to electrical connector 1675 of electronics package 1679. Pocket 1669 further includes support structure 1677, such as hard plastic glued to the pocket, for supporting coiled cord 1679 which terminates as plate 1681. Plate 1681 has means, such as a Velcro surface or adhesive tape, for being removably attached to area 1683 of electronic package 1679. Arms 1649 and 1651 can be removably secured to the temples of a pair of eyeglasses. Alternatively, the ends of arms 1649 and 1651 can be removably secured to a C-shape structure 1693, which is preferably made with a polymer, in order to create a system to be used around a portion of the body, such as the neck-shoulder area, head, arm, leg, abdomen, etc. Loops 1685 and 1687 slide on to the ends 1689 and 1691 of C-shape structure 1693, as indicated by arrows 1697 and 1699, and plastic rings 1693 and 1695 are used to create a snug fit.

FIG. 34M shows a two-piece device 1701, comprising eyewear storage cord 1703, and an essentially cylindrical C-shape structure 1705. Stretchable tubular ends 1711 and 1713 of cord 1703 are removably secured to ends 1707 and 1709 of structure 1705. Right cord 1264 is shown extended and partially folded, with stretchable sleeve 1713 shown in its stretched position and attached to end 1707 of structure 1705. Similar overlapping occurs when stretchable sleeve embrace the free end of temples of eyeglasses. Left cord 1266 is shown in its original position with stretchable sleeve 1711 in its relaxed position.

Figure 34N:
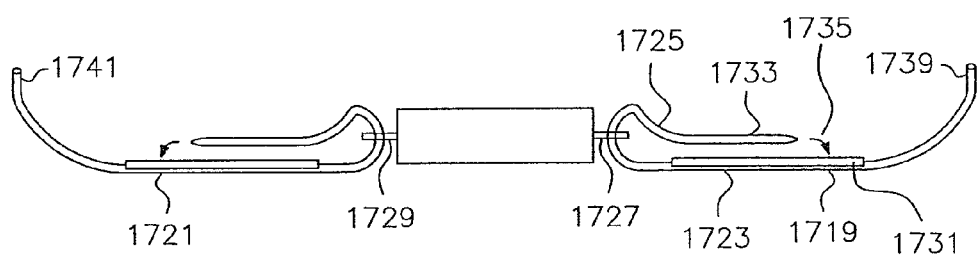

FIG. 34N shows a side view of three-piece eyewear storage cord 1715 that includes right arm 1719, left arm 1721, and support structure 1723, which is illustrated by a pouch for retaining an electronic package. Arms 1719 and 1721 are removably secured to support structure 1723 by encircling loops 1727 and 1729 of structure 1723. Right arm 1719 has two portions, lower portion 1723 and upper portion 1725. Lower portion 1723 and upper portion 1725 are removably attached to each other with hook and loop surfaces 1731 and 1733, as indicated by arrow 1735. The same system is used to attach the upper and lower portions of left arm 1721. Ends 1739 and 1741 of arms 1719 and 1721 terminate in a tubular stretchable portion, similar to the embodiment of FIG. 34.

Figure 34O:
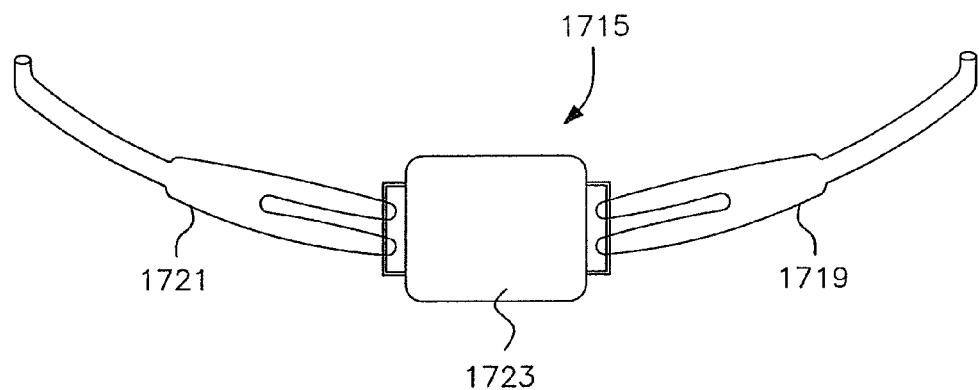

FIG. 34O is a side top view of three piece eyewear storage cord 1715 of FIG. 34N showing right arm 1719, left arm 1721, and support structure 1723.

Figure 34P:
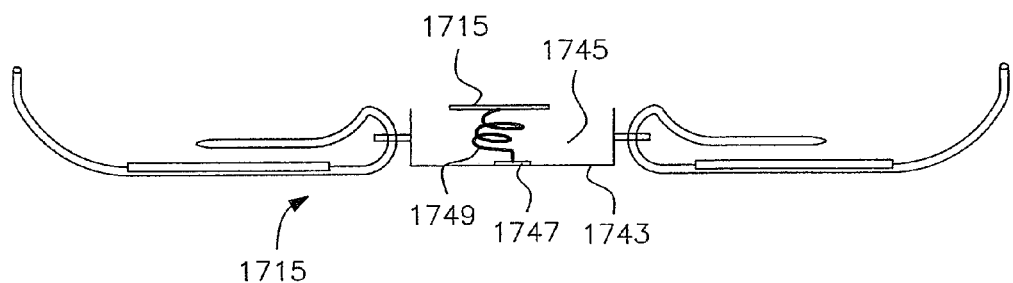
Figure 34Q:
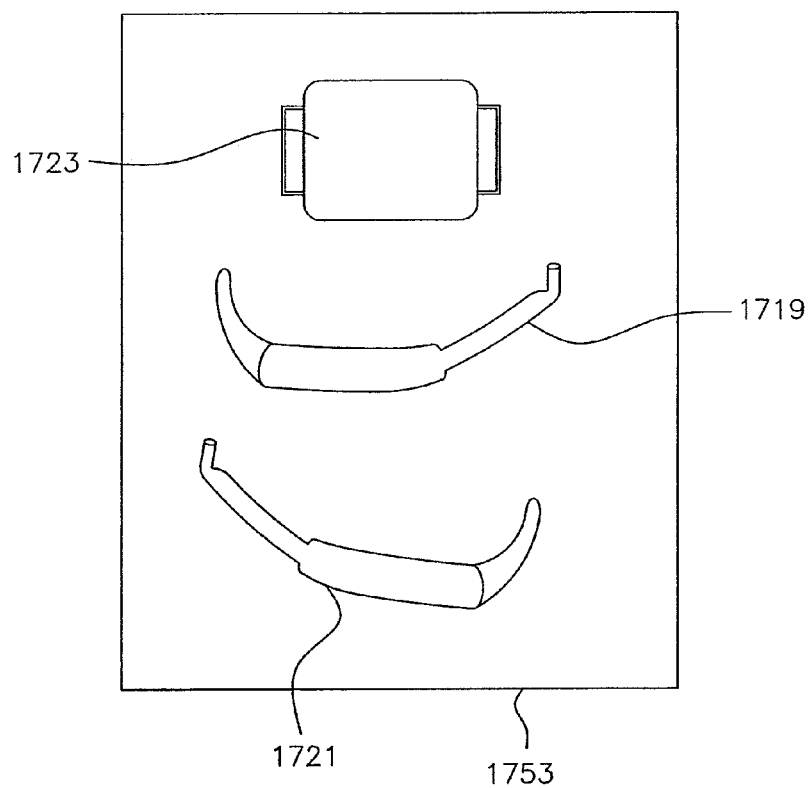

FIG. 34P shows a side view of another embodiment of the three piece eyewear storage cord of FIG. 34N. Housing 1743 has a cavity 1745, and a plate 1747 for supporting coiled cord 1749, which terminates in plate 1751. Plate 1751 includes means for being removably attached to an electronics package, such as a hook and loop fastener or adhesive tape. FIG. 34Q shows a kit including box 1753 which contains right arm 1719, left arm 1721, and support structure 1723, illustrated by a pouch for retaining an electronics package.

Figure 34R:
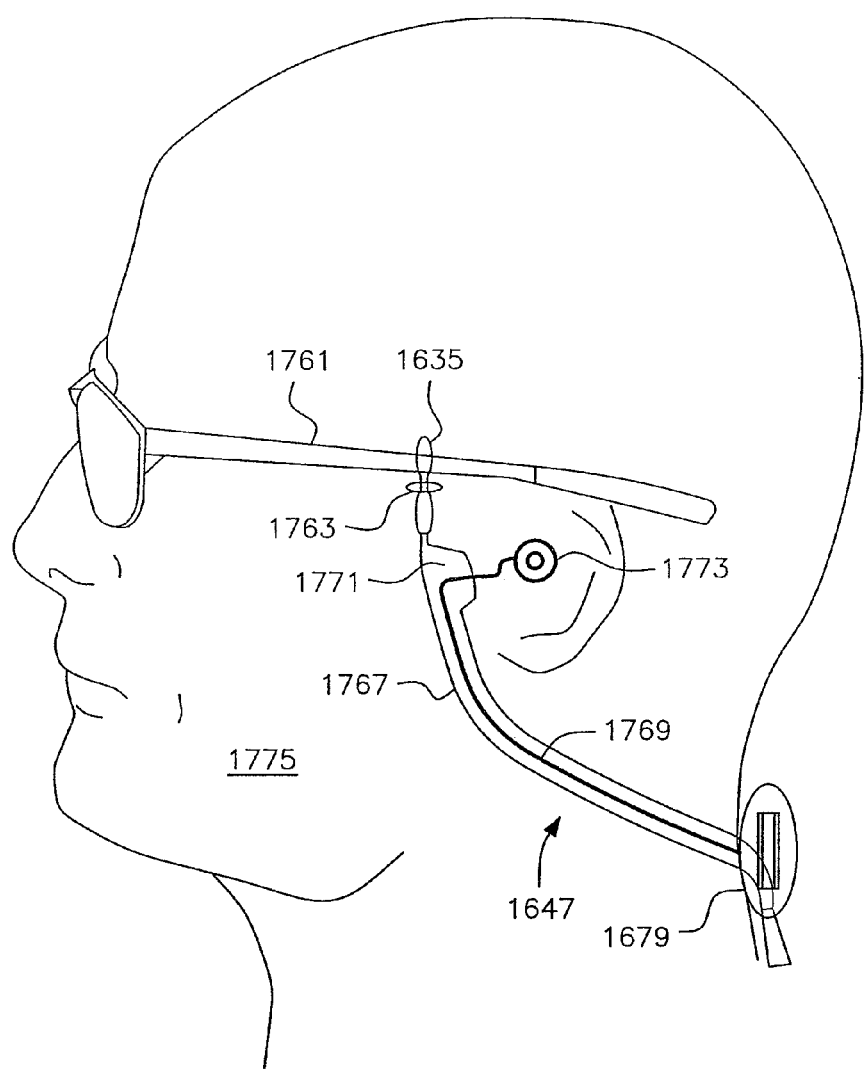

FIG. 34R shows an embodiment similar to embodiments of FIG. 34L and FIG. 34K when worn by a user 1775. eyewear storage cord 1647 has an adjustable mechanism with extra length of cord for adjusting to different size heads. Loop portion 1635 of cord 1767 slides over temple 1761 and is secured tightly to it by sliding ring 1763. Cord 1767 houses wire 1769 and has pocket 1771 (for storing ear bud 1773) disposed next to loop portion 1635. Wire 1769 connects ear bud 1773 with electronic package 1679.

FIG. 34S is shows an example of the manufacturing steps for producing an eyewear storage cord according to the invention using a single piece of material, such as neoprene. Neoprene piece 1777 has lateral parts 1779 and 1781 of equal dimensions, and one central part 1783. Lateral parts 1779 and 1781 are of smaller dimensions as compared to central part 1783 when laid flat, as represented by arrows 1783 and 1785. Central dimension 1783 is preferably equal to or less than 30 cm, and most preferably equal to or less than 20 cm, and even most preferably equal to or less than 15 cm. Lateral dimension 1785 is preferably equal to or less than 8.0 cm, and most preferably equal to or less than 3.0 cm, even most preferably equal to or less than 1.5 cm. Central part 1783 has edges 1787 and 1789. Right lateral part 1779 has edges 1791 and 1793, and left lateral part 1781 has edges 1795 and 1797.

In the first step, piece 1777 is laid flat. Second, coiled cord/plate 1799 is attached, by gluing or sewing, to central part 1783. Third, edge 1787 is connected with edge 1789, preferably by stitches 1801. Fourth, the edges of lateral parts 1779 and 1781 are attached to each other (edge 1791 to edge 1793, and edge 1795 to edge 1797), creating tubular structured at each end, and central tubular structure. It is understood that eyewear storage cord 1803 can be manufactured and work omitting the second step described above. FIG. 34T is a perspective view of finished eyewear storage cord 1803 manufactured in accordance with the method described in connection with FIG. 34S.

Figure 35:
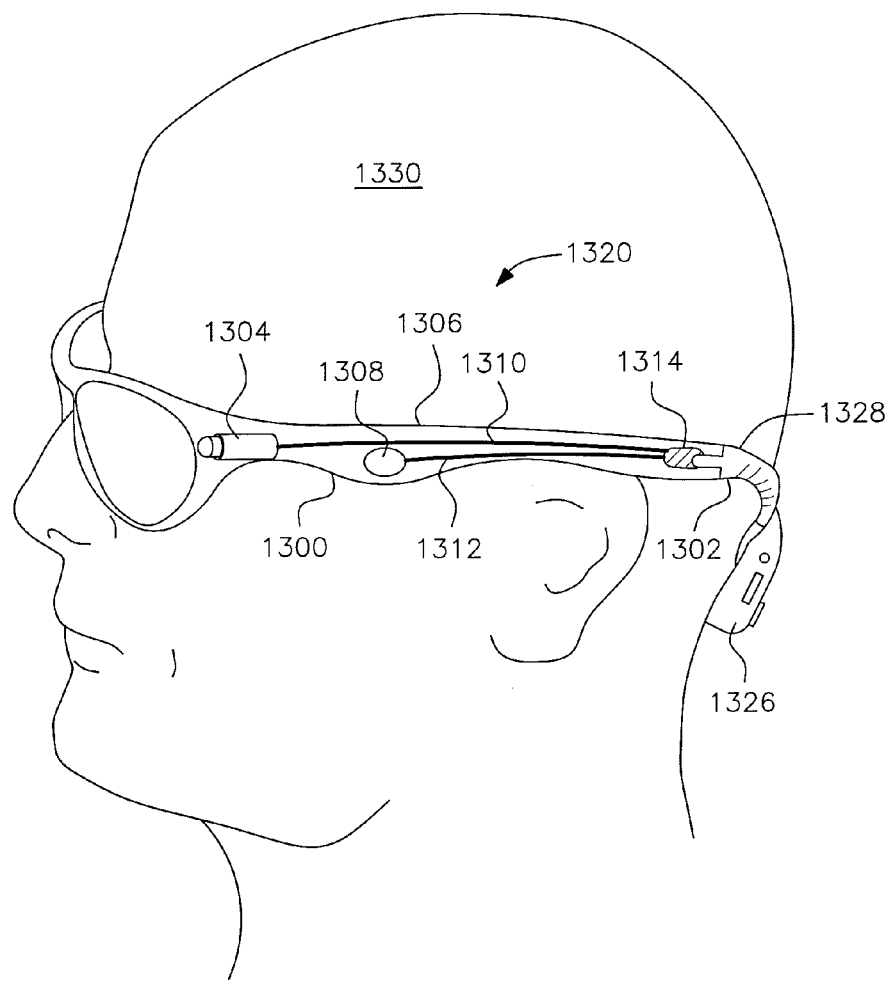
FIG. 35 is a perspective side view of a camera embodiment of the detachable electronic eyeglasses system of the invention when worn by a user.

FIG. 35 shows a preferred embodiment of the detachable electronic eyeglasses system 1320 of the invention worn by user 1330, comprising detachable electronic eyeglasses 1300 and DEP 1302. DEP 1302 comprises electronics package 1326 and cord 1328. Detachable electronic eyeglasses 1300 houses wireless camera 1304 in temple 1306. Temple 1306 also houses ear bud 1308, wire 1310 for connecting camera 1304 to electrical connector 1314, and wire 1312 for connecting ear bud 1308 to electrical connector 1314. Although the drawing shows a large camera for purpose of illustration; the wireless camera can be small and housed in the temples in a non-noticeable manner to an external user. This is because, according to the invention, only micro optical systems and CCD are housed in the frame, which can have dimensions of few millimeters or less. The rest of the electronics (e.g. memory, wireless transmitter, and power source) for the camera are located in electronics package 1326 of DEP 1302.

An alternative embodiment might comprise only camera 1304 and wire 1310, but not ear buds 1308. This embodiment could be useful in military activities, where a soldier connects the DEP to his/her eyeglasses or goggles for performing a mission which includes capturing images. After the mission is complete, the DEP may be disconnected and the stored images downloaded for review. This allows a surveillance mission to be performed with a minimum of extra equipment, such as hand held cameras, because the light weight eyeglasses of the invention carry the camera with good weight distribution resulting by the DEP housing the bulk of the electronics.

Other devices can be miniaturized to be housed in the frame of eyeglasses, in accordance to the invention, by using a DEP which store large and heavier parts of the device. The frame of the eyeglasses of the invention might house, for example, a display such as a computer screen in the lens rim of the eyeglasses, while the main computing parts and memory stored away in the DEP.

Figure 36:
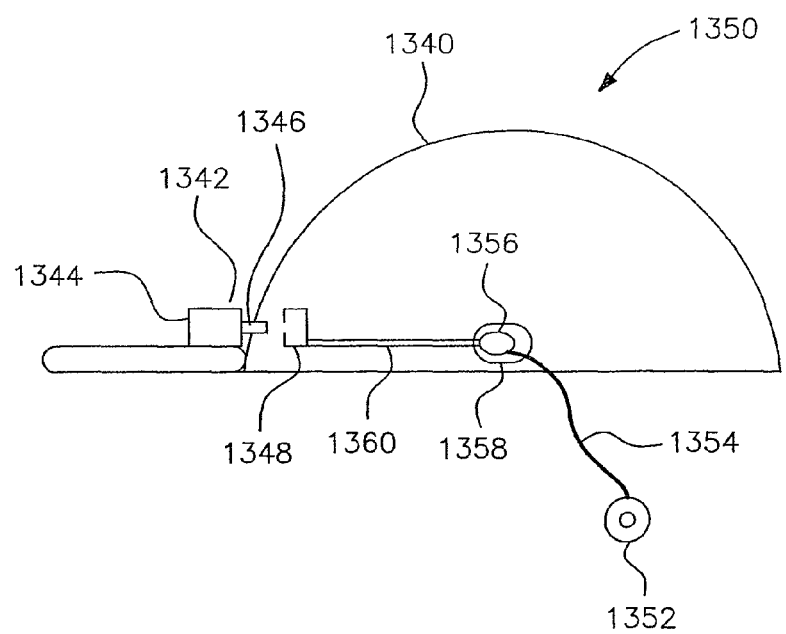
FIG. 36 is a diagrammatic side view of a detachable electronic head mounted gear system of the invention.

FIG. 36 shows another embodiment of the detachable electronic system of the invention comprised of a different head-mounted wearable article—a hat. A detachable electronics hat system 1350 comprises DEP 1342 and detachable electronic hat 1340. DEP 1342 includes electronics/power source in housing 1344, and electrical connector 1346 which is releasably connected with electrical connection 1348 of detachable electronic hat 1340. Detachable electronic hat 1340 includes ear bud 1352, connected to retractable wire 1354 and spool 1356 securing wire 1358. Wire 1358 has two ends, one end represented by wire 1354 connected to ear bud 1352, and the opposite end represented by wire 1360 connected to electrical connection 1348.

FIG. 37 shows another embodiment of the electrical pouch system of the invention, which can be used on a variety of wearable articles, including head mounted gear, clothing, and other articles, with said pouch being illustrated in a detachable electronics cap. Detachable electronics cap 1370 includes pouch 1380 formed by fabric material 1402, with button 1401 for sealing pouch 1380. Pouch 1380 has hole 1372 in one of its walls, through which wire portion 1374 enters pouch 1380. Wire portion 1374 terminates in one end as an electrical plug 1378 (preferably a male plug) while the other end of wire portion 1374 is secured to spring loaded wheel or spool 1376, which allows wire portion 1374 to be extended and retracted. Spool 1376 also receives wire portion 1375 from the opposite side of cap 1370. Wire portion 1374 is in electrical connection with wire portion 1384. Wire portion 1384 terminates in second spring loaded spool 1386, with wire portion 1384 being in electrical connection with wire portion 1388 secured to spool 1386. Wire portion 1388 terminates at ear bud 1390. Second pouch 1400, illustrated as a sealed pouch, is formed by fabric material 1402, has button 1403 for sealing pouch 1400. Wire portion 1388 enters pouch 1400 through hole 1404. A DEP (not shown) may be inserted into the pouch 1380 by means of slot 1406 within the fabric 1402. Ear bud 1390 may be inserted—when not in use—into pouch 1400 by means of slot 1408 within fabric 1402. Preferably, the wires and parts outside the pouches are disposed on the internal surface of the fabric, keeping the electrical and electronic system of the invention out of sight of an external observer, and not materially changing the appearance of the wearable article. Cap 1370 can include a microphone and/or a display means to improve its utility. A variety of materials can be used for fabric material 1402 including nylon, wear-resistant and moisture resistant cotton blend, synthetic material, plastic, canvas, leather, neoprene or other moisture-resistant or water-proof fabric or material to protect wring and electrical connectors against moisture. Pouches 1380 and 1400 include a sealing mechanism such as buttons, zipper, clip, or the like to seal the pouch and to inhibit moisture or water from entering them. By placing the electronic device into electronic wearable cap 1370, the user avoids placing pressure against the sensitive area of his or her ear.

FIG. 37A shows a schematic view of the wire, spools, and connector assemblies of the cap of FIG. 37, which are disposed preferably on the surface of the fabric material. This illustration can also apply to other embodiments for various head mounted gear, clothing, and other articles of manufacturing of the present invention. The pouch, wiring system, electrical connector, spool, and ear bud are substantially identical to each other such that description of features of left side herein applies to the right side as well. Electronic detachable gear system 1430 includes DEP 1440 and detachable electronic cap 1438, including pouches 1380, 1400, spools 1376, 1386, wires 1374, 1384, 1388, electrical plug 1378, and ear bud 1390. Preferably, pouch 1400 has sealing mechanism 1432, such as a button, zipper, or velcro strip, which retains ear bud 1390. Retractable wire portion 1388 is secured to spool 1386 and enters pouch 1400 through hole 1404, with wire portion 1388 terminating at ear bud 1390. Wire portion 1388 is electrically connected to wire portion 1384 via spool 1386. Wire portion 1384 is preferably fixed and non-extendable, and connected to wire portion 1374 via spool 1376. Retractable wire portion 1374 is secured to spool 1376 and enters pouch 1380 through hole 1372. Wire portion 1374 terminates as male electrical plug 1378, which is releasably connected with female electrical connector 1434 of electronics package 1436 of DEP 1440, as shown by arrow A (add "A" to drawing). Preferably, pouch 1380 has sealing assembly 1442 such as a button, zipper, or velcro strip, for retaining DEP 1440. A variety of devices can be retained in pouch and not be electrically connected.

In an alternative embodiment, plug 1378 is surrounded by a plate, preferably having a Velcro surface or other fastening means, or being attached to the surface of plug 1378. Electronic devices having a Velcro surface can be removably connected to the plate, thereby allowing an electronic device—such as a GPS device, a cellular phone, digital player and the like—to be connected to spool assembly 1376 and stored by pocket 1380, but able to be removed the user. When desired, user can connect the electronic device to plug 1378 and receive sound in ear bud 1390. Pocket 1380 can also retain a DEP comprising a Bluetooth device which is electrically connected with plug 1378, with said Bluetooth device receiving a wireless signal from a cellular phone or a digital music player. Thus, a small Bluetooth DEP could provide signal from another Bluetooth-enabled device stored at some distance from the wearable article. Any of the wearable articles of the invention can have a Bluetooth DEP that receives music from a cell phone, and when a call comes in the music stops for allowing receiving the phone call.

Figure 37B:
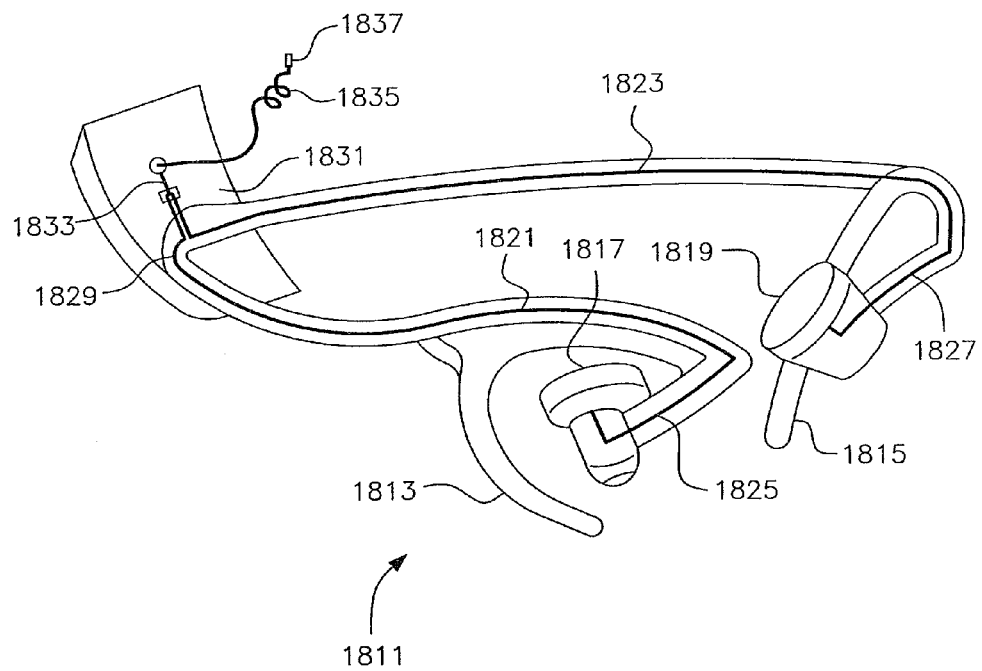
FIG. 37B illustrates head mounted gear.

FIG. 37B shows another embodiment for head mounted gear according to the invention. Detachable electronic wrap-around article 1811 includes C-shape support structures 1813 and 1815 connected to ear buds 1817 and 1819, and to cords 1821 and 1823. Wrap-around article 1811 also houses wire portions 1825 and 1827 either within or on its structure. Wire portions 1825 and 1827 run either inside or on cords 1821 and 1823 and connect ear buds 1817 and 1819 with supporting plate 1829 inside pocket 1831. At plate 1829 wires 1821 and 1823 are joined together to form wire portion 1833, which terminates in coiled cord 1835 and electrical connector 1837. Pocket 1831 is essentially similar to the pocket structures of the embodiments shown in FIGS. 37 and 37A.

Figure 37C:
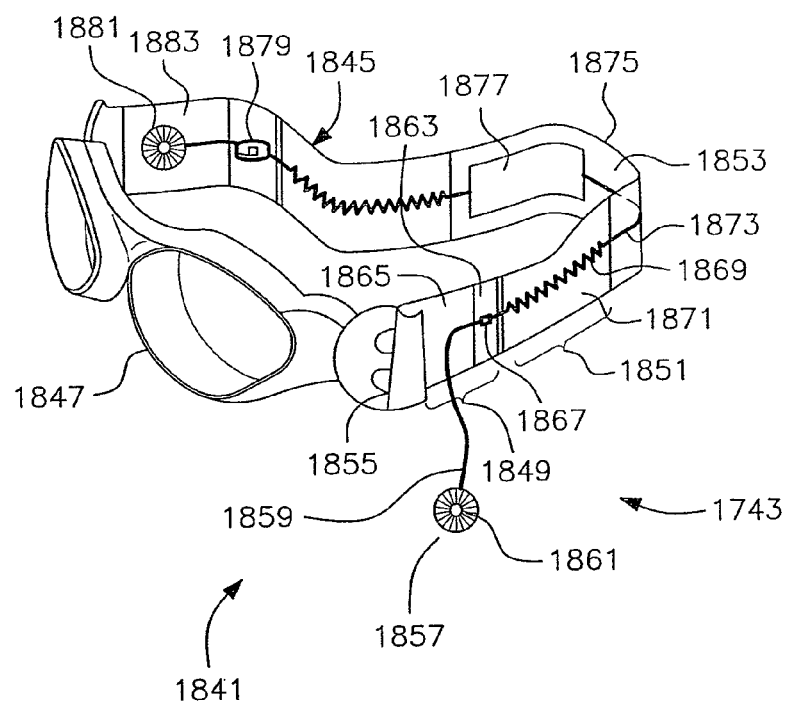
FIG. 37C illustrates detachable electronic goggles.

FIG. 37C shows another embodiment of the invention. Detachable electronic goggles 1841 include front part 1847—which hold the lenses 1847a—and straps 1843 and 1845 disposed along the front part 1847, and back portion 1875 connecting left strap 1843 to right strap 1845. Straps 1843 and 1845 are essentially similar, and description of one apply equally to the other. Strap 1843 has portions 1849 and 1851, and terminates in a third portion 1853. Portion 1849 is disposed adjacent to front part 1847, and includes pocket 1855 for retaining ear bud assembly 1857. Ear bud assembly 1857 comprises ear bud 1861 and wire portion 1859, which is shown in an extended position.

Portion 1849 has sub-portions 1863 and 1865. Sub-portion 1863 comprises a non-stretchable or minimally stretchable material such as nylon, and houses supporting structure 1867 that attaches wire portion 1859 to wall of pocket 1855. Sub-portion 1865 includes the majority of pocket 1855 and is preferably made with a stretchable material such as elastic fabric. Portion 1851 comprises extendable wire portion 1869 secured to elastic strap 1871. Extendable wire portion 1869 is disposed in an accordion configuration or any other stretchable configuration, and is adapted to match the tensile strength and length of elastic strap 1871, allowing elastic strap 1871 to be stretched without creating undue tension in wire 1869. Wire portion 1859 terminates in extendable wire portion 1869, and wire portion 1869 terminates in wire portion 1873 inside back portion 1875. Back portion 1875 includes pouch 1877 for retaining an electronics package (not shown). Pouch 1877 is essentially similar to the pockets of the embodiments shown in FIGS. 37 and 37A. Ear bud 1881 and coiled wire 1879 are shown inside pocket 1883 of right strap 1845.

The wearable electronic articles of the invention, illustratively represented by eyeglasses and hats, can include imaging systems as shown in FIG. 35. The wearable articles, such as the eyeglasses and hat, offer an added benefit of assisting in identifying an assailant. A person wearing the detachable electronic camera eyeglasses can have an image of the face of a potential assailant. Even if the assailant takes away or break the eyeglasses, since the image is immediately transmitted (either to the DEP or wirelessly) to a remote location, the face of assailant would have been captured. This may act as a deterrent against crime since potential assailants would not know if they were being filmed or were filmed during an attack. Since the invention requires only the micro optical system to be housed in the frame, children also can also use the system. Children can only wear small frames, which would be impossible to fit with a camera. Since the eyeglasses of the invention only hold the micro optical system which is small in size, they can be easily housed in the small frames worn by children. In the case of a DEP being worn as a detachable electronic cap, a DEP comprising a camera is preferably located on the side, with the pouch for the DEP preferably located on the side of the hat, and not on the back, thereby allowing easier viewing and filming.

Since the invention allows the camera to be extremely small, the frame can have multiple micro optical systems, such as one facing the back of the user and another facing the front of the user, allowing thus identifying an assailant coming from any direction. The system can therefore identify an assailant and even prevent a rape or kidnapping, or any crime. If an assailant saw the DEP, which is more visible, the assailant still would not know if the user has wireless camera capabilities. It is thus preferred to have electronics packages that do not identify the function being performed, to avoid an external observer to know if the user has a DEP with Bluetooth capabilities, MP3 capabilities, or wireless camera capabilities. A DEP with wireless camera capabilities and GPS capabilities would inform the location of the user as well as the image being recorded. Although a wireless camera can transmit images continuously, the only expense and work the user has is related to keeping a charged battery in the DEP. If the user prefers only to record in certain occasions, the DEP can have a voice activated system for initiating recording only when requested by the user. As such, a code word such as "action" or "record" can be used for activating the wireless camera. This function would help preserve power, and would be of interest for instance, by a camper recording a certain trail or scenery, or a person being followed recording a possible assailant. When there is suspicious activity, the user can give a voice command to activate the camera, or can press an activation button in the DEP.

FIG. 38 shows another embodiment of the invention. Detachable electronic shirt system 1450 is worn by user 1451 (depicted in phantom lines) and comprises DEP 1460 and detachable electronic shirt 1470. Left side of collar 1472 is shown in a lifted position to illustrate pouch 1464 on the inside face of the fabric of collar 1472 for retaining ear bud 1476 and spool 1478. Wire portion 1474 extends for positioning ear bud 1476 on ear 1475. On the right side, wire portion 1484 is connected to DEP 1460. Wire 1484 is in an extended position to enable viewing of the display of electronics package 1480. Pouch 1462 on the right side of collar 1472 is shown in a sealed position. Cavity spool 1498 and ear bud 1496 are retained inside pouch 1462.

To use this embodiment of the invention, the user lifts the free end of collar 1472 to expose pouch 1464, and then extends wire portion 1474 to position ear bud 1476 on ear 1475. Likewise, upon pulling wire portion 1484, electronics package 1480 is removed from pouch 1486 and positioned in line with the visual axis of the eyes 1481, as shown by arrow B. Wire portion 1484 has male plug 1488, which is connected to female plug 1492 of electronic package 1480. Wire portion 1500, secured to spool 1498, exits collar 1472 and enters chest portion 1502 of shirt 1470 for connecting with spool 1482. Left wire portion 1504 is secured to spool 1478 and disposed on collar 1472. Left wire portion 1504 is disposed on collar 1472 from the left side to the right side and terminates at spool 1482, after joining right wire portion 1500 to form cable 1506.

In this embodiment, in order to facilitate manufacturing, pouches 1462 and 1464 retain both spool and ear bud, while pouch 1486 retains both DEP and spool. Although pouch 1486 is disposed on the front part of shirt, pouch 1486 can alternatively be disposed on collar 1472 or on the back part of the shirt in close proximity to collar.

Although this embodiment uses retractable wires and spools, it will be understood that robotic arms, telescopic assemblies, or the like can be used instead of the retractable wire/spool system for extending ear buds and electrical plugs. It will also be understood that Velcro fasteners can be used to attach the DEP and ear buds to the wearable article, such as the cap and shirt, instead of using pouches.

Although only a few exemplary embodiments were described in detail, it will be apparent to one of ordinary skill in the art that the invention can be modified to accommodate other wearable articles. A variety of wearable articles can be used, in accordance with the invention, including clothing in general (such as ties, jackets, snow hat, arm band, etc.), head mounted gear (such as goggles, visors, head bands, wrap around ear assembly, helmets, silicon caps for swimmers, eye masks for sleeping, etc.), and personal items (such as wallet, cases of eyeglasses clipped to a shirt or pants, etc.), allowing thus the user to have access to electronic functionality using a variety of articles. By way of illustration, detachable electronically-enabled goggles according to the invention, such as ski goggles or swimming goggles, include a pouch in the back portion of the strap which retains the spool and DEP, and one pouch on each side of the strap for retaining a spool and ear bud in conjunction with the other features of the invention.

Virtual imaging eyewear, digital imaging eyewear, and infrared imaging eyewear can, in accordance with the invention, be made light weight and without wires, with only the optics and silicon microdisplay being in front of the eye, while the electronics and smart parts are housed in the DEP in a detachable manner and away from the front portion of the eyewear. Accordingly, a virtual imaging eyewear, in accordance to the invention, allows complete portability with no wires attached to the eyewear when playing a game, as found in the prior art. With the present invention, the display is disposed in the front part of the eyewear for viewing the game, with a DEP working as a retractable game control housed at the back of the head. When in use, the extendable cord is extended, allowing the game control to be brought into the user's view. After the game is finished, the extendable cord is retracted, and the game control is stored in the cradle-like housing of the DEP.

Because the present invention allows a cost-effective way to electronically enable an article, it will be also apparent to one of ordinary skill in the art to modify the present invention to use it in conjunction with non-wearable articles. For example, a back pack can be adapted with a detachable system according to the invention, preferably in its upper part because of its proximity to the eyes and ear of the user, and providing therefore sound and electronic function in a hands-free manner. Other examples of articles which can be electronically enabled are pillows, head rest of arm chairs, desks, etc. In such articles, the articles houses the DEP, ear buds and other assemblies of the present invention, allowing the user to remove the DEP from a hat and plug the same DEP into the desk while working. The DEP can be attached to the article using a pair of "arms" shaped like the temples of eyeglasses attached to the article. The arms can be permanently affixed to the article, or they can be removable, allowing the same set of arms to be used on multiple items, for example a desk, or the fold down tray on a airplane. Alternatively, the DEP can be attached to the article using Velcro strips, or a series of snaps or buttons, or a hook and groove system. The means of attachment is not critical, but can be chosen to accommodate various need (eg., ease of removal, stability of attachment, etc. A variety of furniture in close proximity to the head can also be adapted to receive the system of the invention such as head board of a bed. It is also understood and apparent to one of skill in the art that other articles such as a bicycle, a treadmill, and other articles can advantageously receive the detachable system and assemblies of the present invention.

It will also be understood that a retractable wire and spool can be attached to the electronics package such as a music player, allowing the electronics package to be moved to the user's visual axis and replaced without undue risk of dropping it. However, such a retractable wire is not required for the invention.

It is understood that a variety of head gear, clothing, and footwear can be used in accordance with the principles of the invention. For instance, clothing can house ear buds and electrical connectors, which can be releasably connected to a DEP, with said DEP being located anywhere in a piece of clothing on the body, but away from the gear housing the ear buds. In one embodiment, the ear buds and wire are preferably housed in a water-proof housing in the collar. A two DEP system can also be used, in which a DEP secured to a piece of footwear sends a wireless signal to a DEP secured to a cap or eyeglasses, allowing thus information such as foot activity, temperature or circulation to be transmitted to a second DEP adapted to inform the user or display the data being received from the DEP in the footwear.

Another embodiment includes a helmet (such as a bike helmet or a firefighter's helmet) with ear buds, wire and electrical connections permanently housed in the helmet. In one embodiment of a detachable electronic helmet system, the DEP preferably houses a wireless communication system for communicating instructions for instance between a fire chief and a firefighter or between a coach and an athlete. The invention provides an extremely cost-effective system since the low cost parts such as the ear bud, wire and electrical plug are preferably permanently housed in the head mounted gear such as the helmet while the expensive parts are housed in the DEP. Because the expensive parts are detachable, the firefighter or athlete can remove the DEP from the helmet which was used for receiving instructions during work, and now said firefighter or athlete can connect the DEP to their sunglasses and receive a wireless signal for instance from a satellite radio station for enjoying music while wearing sunglasses that only house low cost parts. Thus the invention provides another unique benefit, which is equal use of the invention for work and for entertainment. The invention also allows maximizing the use of a device, for example by avoiding an expensive wireless system to sit idle for a long time. By being versatile the invention allows continue use of the electronic package in any occasion. Otherwise, the wireless capabilities only would be available when wearing the helmet in question, significantly limiting therefore the use of the device. The invention thus provides methods such as for miniaturizing devices in wearable articles by reducing the parts disposed in the wearable article and to maximize use of the devices.

Of course, it is also possible to permanently house the entire system in the helmet, particularly when the electronics device might be specialized (e.g. for a fire helmet), or when the user might not want to wear anything other than the helmet. For example, a biker could have the device built into her bike helmet, allowing her to listen to music whilst biking. By pulling the device out from the storage compartment on the helmet—by using the retractable cord—the user could see the device to make music selections, for example, and could then let the cord pull the device back to the storage compartment, allowing for hands-free use.

The invention also teaches and provides significant improvements to prior art eyeglasses which house heavy electronics and unsightly ear buds on a permanent basis. It does s by permitting visual interaction with the electronic components. By using the retractable wire assembly and cradle-like housing described in FIGS. 1D and 1E, the electronic and a display can be brought to the visual axis of the eye of the user.

It will be that in order to avoid having wires passing through a hinge mechanism, (for example when a display is housed in the lens rim, as illustrated in FIG. 13) the invention preferably uses an electrical connection in the temples that includes an electromagnetic switch. An example of such a switch is the Reed switch, described in U.S. Patent Application Nos. 20040059212 and 20040242976. A slip-on display can be also be used, with the display being electrically connected with the frame of the eyeglasses, and the eyeglasses being connected to a DEP.

It is also understood that a variety of devices for measuring biological parameters such as contact lenses, devices inside the eye, or on the surface of the eye, and many other devices and sensors described in U.S. Pat. No. 6,544,193 and in U.S. Patent Application Nos. 20040059212 and 20040242976—the disclosures of which are hereby incorporated by reference—can be used in accordance to the present invention. Accordingly, a device described in one of the foregoing patents or patent applications can have its parts divided between the original device and the DEP. This limits the number of electronic parts housed in the eyeglasses.

It will also be understood that eyeglasses that house a coil to power another device by electromagnetic induction, such as a passive contact lens described in U.S. Pat. No. 6,544,193, can be used in accordance with the present invention. The lens rim can house the coils, with the power source being housed in the DEP. It will be further understood in certain functions characterized by a large or heavy DEP, small batteries can be housed in the temples of the eyeglasses, with the main electronics and hard drive housed in a DEP.

The invention can also include adhesive or attachment means to secure the DEP to clothing, which is preferably used in case of heavy DEP. For example, a DEP of eyeglasses having a hook-and-loop strip (Velcro) can be attached to a Velcro in the collar of a shirt reducing therefore the amount of weight applied to the eyeglasses.

Other gear can also be used in accordance to the invention, including any of the head mounted gear described in U.S. Patent Application Nos. 20040059212 and 20040242976. For example, a detachable electronic eye mask from the foregoing applications may be worn by a a user who plugs it into a DEP comprising of digital music player. The user may then enjoy music while laying on the beach and having his/her eyes covered and protected. When the user is in bed, he or she can still enjoy music wearing the eye mask of the invention, but before falling asleep can unplug the DEP, removing a heavier piece which can limit comfort during sleep.

Figure 39:
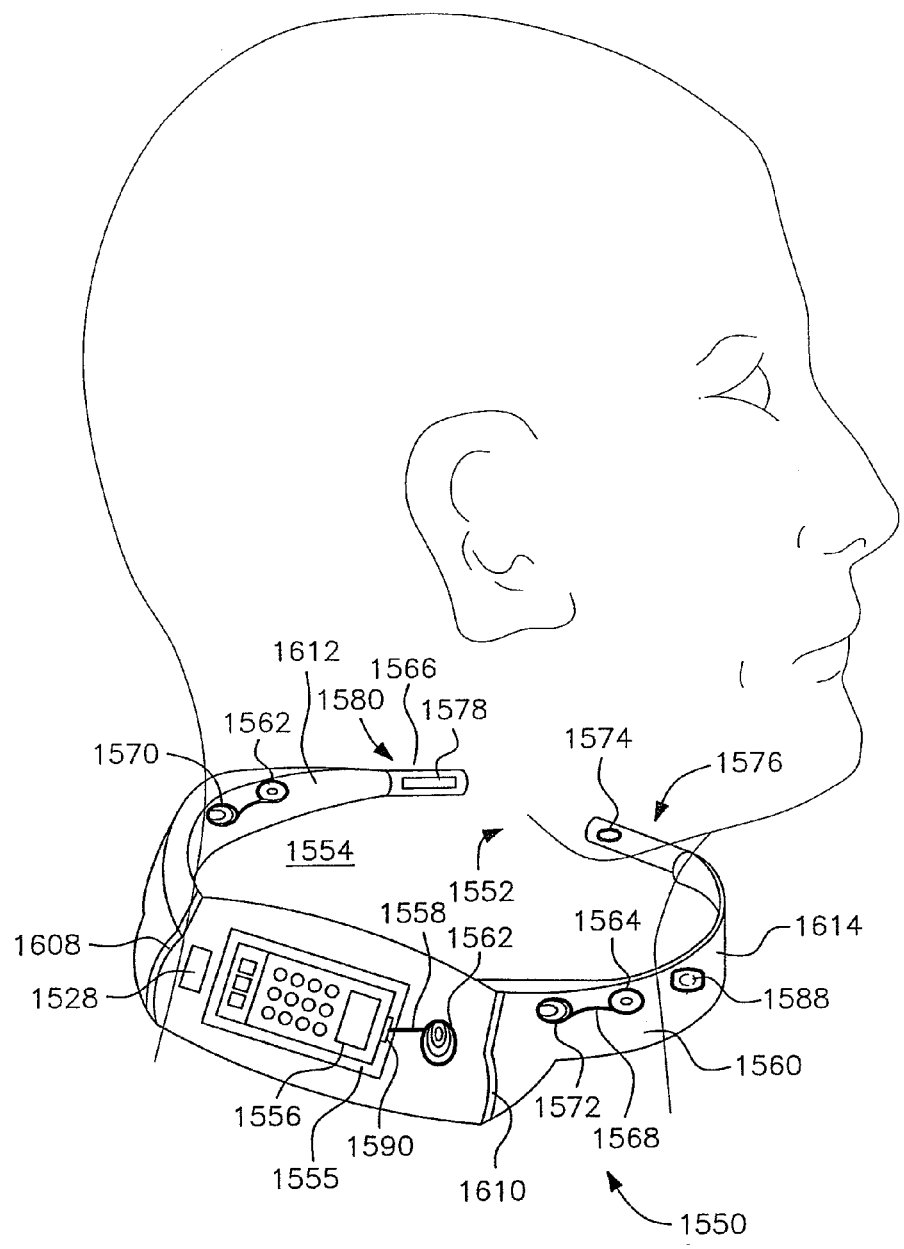
FIG. 39 is a perspective side view of a shoulder mount wearable electronic article of the invention.

The present invention also provides a system that includes another wearable article such as shoulder supported housing and a generally C-shaped structure with a cavity sized to accept an electronic package such as a cellular telephone, a digital music player (e.g., MP3 player), a video player, and the like, FIG. 39 shows a wearable electronic device 1550 worn on the shoulder of a user (shown drawn in phantom lines). Shoulder wearable electronic device 1550 preferably includes generally "C"-shaped (or Inverted U-shape) housing 1560. Preferably, the C-shaped housing covers at least 180 degrees. Opening 1552 is sized to permit housing 1560 to pass around neck 1554 (or other body portion) of a user. Opening 1552 distributes the weight of electronic device 1550 between the shoulder and the neck. Preferably, the C-shaped housing is adapted to remain at least 2.5 cm from the side of neck, reducing the likelihood of activating of pain fibers and limiting discomfort. C-shaped housing 1560 fits comfortably around a small portion of the user's neck, and is preferably held in place on the surface of the body by gravity and support of a body part, and not by straps or other fastening means.

In a preferred embodiment, housing 1560 is formed of a polymeric material and includes cavity 1555 for retaining electronics package 1556, in a similar manner as described in connection with FIGS. 2B and 2C. Retractable wire 1558 and spool 1562 are connected to electronics package 1556. Ear buds 1562 and 1564 are disposed in a diametrically opposed fashion at the right and left side of housing 1560 and are connected by wires 1566 and 1568 to spools 1570 and 1572, speaker 1588. Microphone 1574 is disposed at end 1576 of housing 1560; display 1578 is disposed at opposite end 1580 of housing 1560. A coiled wire with retracting capabilities can also be used instead of retractable wires with spools, and in this embodiment shown in FIG. 39, there are no spools.

Housing 1560 also includes power source 1582, which is preferably located adjacent to cavity 1555 and held in the back portion of housing 1560. To facilitate illustration cavity 1555 and electronics package 1556 are shown in the back portion of housing 1560; however it is understood they may be disposed on either side of the housing 1560, or they can be disposed on opposite sides. Electronics package 1556, such as a cell phone, is releasably secured in the cavity 1555 through electrical connector 1590. Electrical connector 1590 is connected to spool 1562. Electronics package 1556 is connected by a wire system that includes a spool and retractable wires or by coiled cords or a combination of coiled cords and spool-based cords, to ear buds in accordance to previous description of the invention. It will be appreciated that the various parts disposed within or on housing 1560, such as ear buds, microphone, speaker, electronic circuit, display, power source, and the electronics package are electrically connected by standard wiring systems, which are not shown.

When the device is worn, the microphone is in close proximity to the mouth, and the display is within the visual axis of the eyes to permit, for example seeing a caller ID number. Housing 1560 preferably includes hinge assemblies 1608 and 1610, to allow arms 1612 and 1614 to fold upon each other. This facilitates storage of the device by reducing its size by about two thirds.

Although a C-shaped structure has been described as the preferred embodiment, other shapes, such as square shapes, pentagonal shapes, or other polygonal shapes, can be used, without departing from the scope of the invention. Preferably, the largest width (or height) of cavity 1555 or housing 1560 is equal to or less than 15 cm, and most preferably equal to or less than 11 cm, and even most preferably equal to or less than 7 cm. The preferred longest distance of the center point of the support structure (illustrated herein as C-shaped structure) to the outer edge of the support structure is equal to or less than 28 cm, and preferably equal to or less than 20 cm, and even preferably equal to or less than 13 cm, The preferred shortest distance of the center point of the support structure (illustrated herein as C-shaped structure) to the outer edge of the support structure is equal to or more than 9 cm, and preferably equal to or more than 11 cm, and even preferably equal to or more than 13 cm, The structure comprises an opening, and disposed within the structure an ear bud, wires, and a cavity sized to accept an electronic package.

Figure 39A:
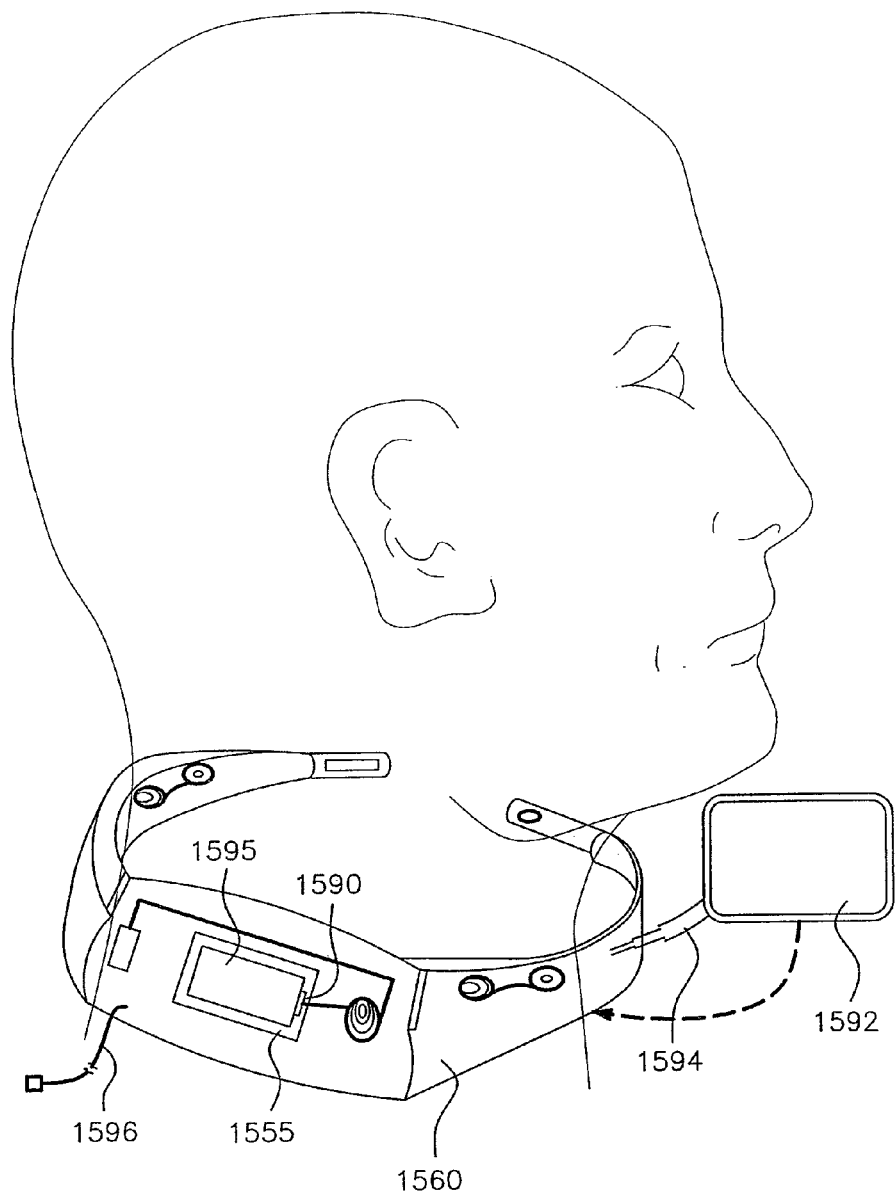
FIGS. 39A and 39B are perspective side views of another shoulder mount wearable electronic article of the invention.

FIG. 39A shows an embodiment of similar to the embodiment of FIG. 39, with two additional parts: large video display 1592 attached to housing 1560 by telescopic and retractable/extendable arm 1594, and removable cord 1596. The electronics package in this embodiment is video player 1595, which is positioned in cavity 1555 and connected by electrical connector 1590. The detachable electronic system can be operable from a motor vehicle 12 VDC cigarette plug accessory voltage or AC outlet through cord 1596, and can charge electronics package 1595 when not in use.

It is understood that housing 1560 can house a plurality of electronic devices, for example a cellular phone/MP3 player on the right side and an electronic organizer (such as a Palm device from Palm, Inc.) on the left side. Likewise, a radio or other electronic devices described in the present invention can be housed in structure 1560 and creates an anatomically fit wearable electronic article in accordance to the principles of the invention.

Figure 39B:
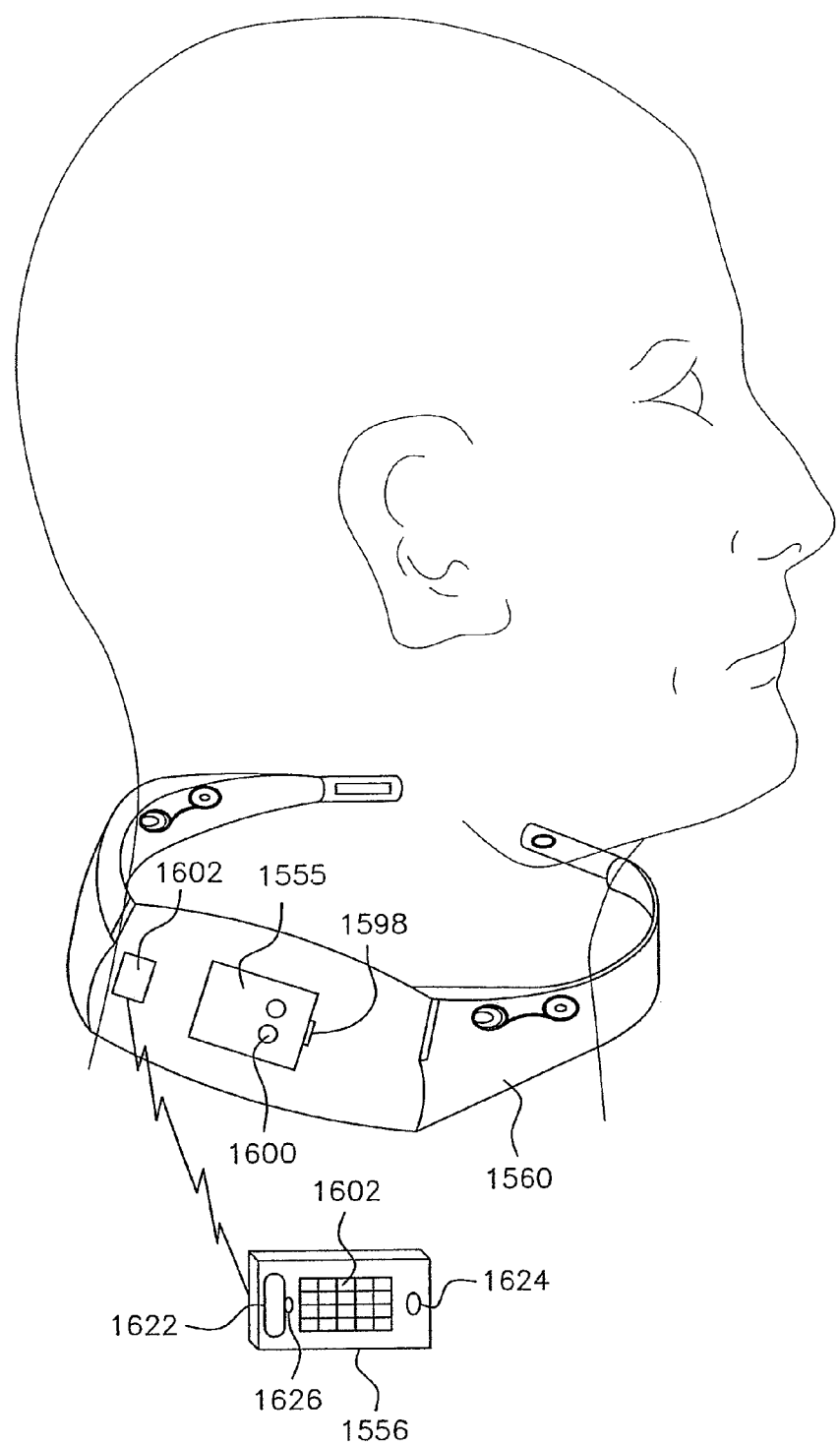

FIG. 39B shows an embodiment in which electronics package 1556, exemplified as a cellular phone or cordless phone, is not electrically attached to housing 1560. Electronics package 1556 is shown away from housing 1560. In this embodiment, electronics package 1556 can be mechanically retained in cavity 1555 by release button 1598. Electronics package 1556 communicates by wireless means with housing 1560. In a preferred embodiment, electrical pads 1600 disposed in cavity 1555 are coupled to a power supply in housing 1560 and permit recharging the internal battery within electronic package 1556. Electrical pads 1600 are sized and positioned to contact associated electrical pads (not shown) on electronics package 1556. The main electronics, power supply, long range receiver/transmitter for cellular phones, and heavier and large circuits (collectively called main parts 1602) are housed in housing 1560, allowing the hand held portion of the cellular phone (or cordless phone) to be miniaturized, with only a small thin battery and a small low power transmitter/receiver microchip circuit for short range transmissions being housed in the hand held portion. By having only few and very small parts, for example thin dial pad 1620, display 1622, built-in microphone 1624 and speaker 1626, electronics package 1556 can have small dimensions such as a credit card or small calculator, as shown in FIG. 39B, and be carried in a wallet. Because housing 1560 is preferably foldable, housing 1560 can carried in a brief case or pocket of a jacket while remaining in wireless communication with the credit card-like cell phone of the invention.

The same benefit applies to a DEP housed in eyeglasses or other head mounted gear such as a hat, etc., allowing the user to carry a credit card like cellular phone while the main parts of the cellular phone are hidden away out of sight and comfortably stored in an article already being worn by the user, enhancing the utility of that wearable article.

Figure 40:
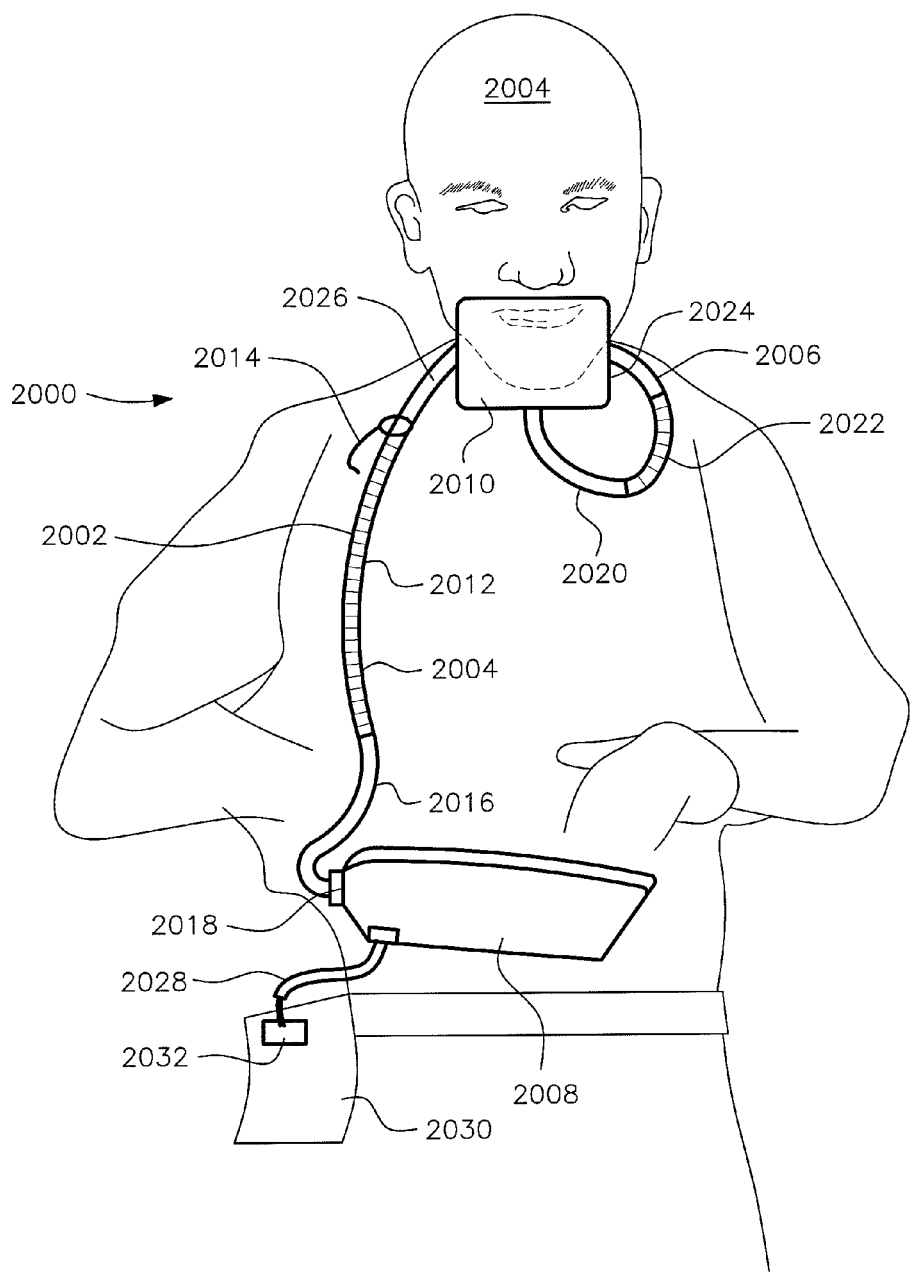
FIG. 40 illustrates a weight distributed anatomically fit wearable computer.

FIG. 40 is an illustration of an embodiment of the invention: a properly weight distributed and anatomically fit inverted U-shape wearable computer 2000 worn by a user 2001. Computer 2000 has an inverted U-shape structure 2002 with arms 2004 and 2006 spaced apart. Arm 2004 has keyboard 2008 disposed at its end. Arm 2006 has display 2010 disposed at its end. Inverted U-shape structure 2001 is, preferably, substantially cylindrical, and preferably comprises at least one adjustably extendable and bendable portion. Arm 2004 has adjustably bendable portion 2016 and adjustably extendable portion 2012. Extendable portion 2012 is shown in an extended position with clasp assembly 2014 in an open position, allowing full extension of extendable portion 2012. Bendable portion 2016 terminates proximally in extendable portion 2012 and terminates distally in housing 2018 secured to keyboard 2008. Arm 2006 has adjustably bendable portion 2020 and adjustably extendable portion 2022. Bendable portion 2020, shown in a bent position, terminates proximally in an extendable portion 2022 and terminates distally in a housing 2024, which is secured to display 2010. Inverted U-shape wearable computer 2002 further comprises back portion 2026 disposed between extendable portions 2012 and 2022, and cable 2028. Cable 2028 is connected to computer electronics housing 2030, which houses computer electronic parts and power source (not shown). For example, housing 2030 may house a power source, CPU, hard drive, disk drive, RAM, network card, video card, sound card, wireless transmitter, modem, ports, connectors for display 2010 and keyboard 2008, and other electrical connectors, card slots, and other computer hardware. Cable 2028 is preferably connected to housing 2030 through retractable spool cord assembly 2032. Housing 2030 can also include fan and other heat dissipating mechanism. Display 2010 can function as a standard display monitor for computers, a display for tablet-PC, and the like.

Preferred embodiment for the extendable and flexible portions of the Inverted U-shape wearable computer will be described in detail. FIG. 41 shows wearable computer 2000 that includes extendable portion 2012, illustrated by an accordion tube, which remains in a compressed position by tooth 2034 of clasp assembly 2014. A preferred embodiment also includes an adjustably extendable spinal portion, which functions as a human spine configuration. Extendable accordion tube 2012 may be extended from the compressed position by lifting arm 2036 connected to tooth 2034 of clasp assembly 2014. Accordion portion 2012 may be axially compressed from an extended position to a compressed position and held in place by a stop mechanism, illustrated herein by clasp assembly 2014. Accordion portion 2012 can be made of any material, but is preferably made with a polymer, rubber, or metal, most preferably with a polymer such as silicone or a combination polymer and rubber. Wearable inverted U-shape computer 2000 also includes flexible portion 2016, which can be extendable, but preferably has only bendable and flexible characteristics, and is sturdy enough to provide stable support for keyboard 2008. For example, flexible portion 2016 may include a flexible metallic gooseneck portion, such as for example, one manufactured by Littlite Company of Hamburg, Mich., 48139, USA, and a variety of memory shape alloys, with said flexible portion 2016 being made of material that has memory and can support about 500 to 600 grams of weight.

Flexible portion 2016 terminates in housing 2018 at rotating wheel 2038, with part of portion 2016 running directly adjacent to keyboard 2008. Extendable accordion portion 2012 terminates in upper portion 2040, which connects arm 2004 to arm 2006. Upper portion preferably has plate 2042, with plate 2042 resting against the neck of the user. Plate 2042 is preferably is made of a flexible material which can conform to the shape of the user's neck, like polymer or rubber, and has two functions: (1) to distribute the weight and increase the surface area resting on the neck and thus reduce localized pressure which can more easily activate pain fibers, (2) increase resistance to motion of the cord of the pulley system of the invention during use of the wearable computer 2000 and typing on keyboard 2008.

Upper portion 2040 is preferably non-extendable and houses electrical connector 2046 to connect to a conventional ear bud assembly and a microphone 2048. It is understood that upper portion can also have two connectors for ear buds (not shown) on right and left side of upper portion 2040, and pockets on each side, and a speaker. It is also understood that upper portion 2040 can be entirely comprised of an accordion tube for extending the length of wearable computer of the invention. Upper portion 2040 terminates in a second extendable accordion portion 2022, which is shown in an extended position, and has essentially the same characteristics of extendable portion 2012. Extendable accordion portion 2022 has clasp assembly 2050 and tooth 2054, which is shown in the full open position illustrated by arrow 2056, allowing accordion portion 2022 to be fully extended. Accordion portion 2022 terminates in flexible portion 2020, which has essentially the same characteristics as flexible portion 2016. Flexible portion 2020 terminates in housing 2052, which is similar to housing 2018. Housing 2052 is connected to display 2010. Wiring 2070 for electrically connecting the various parts of the wearable computer, including keyboard, display, microphone, speakers and the like, is preferably housed inside inverted U-shape structure 2001. Preferably, the maximum dimension of inverted U-shape structure 2001 is equal to or less than 4.0 cm in diameter, more preferably equal to or less than 3.5 cm, and most preferably equal to or less than 2.5 cm. Preferably, keyboard 2008 is removably connected to computer electronic housing 2030 through cable 2028.

During use, the wearer uses a stop mechanism to change wearable computer 2000 from a compact format, which is anatomically fit to an extended format for use. An exemplary stop mechanism includes clasp assembly 2014. By lifting tooth 2034, portion 2012 can be extended. The keyboard is then rotated from a vertical position to a horizontal position using rotating wheel 2038. Flexible gooseneck portion 2016 is then adjusted to position keyboard at a proper angle and height. Essentially the same steps apply to the opposite side for positioning display 2010 in line with the eyes. After proper positioning, inverted U-shape wearable computer 2000 is activated by pushing an on switch, preferably located in the computer electronic housing 2030.

Figure 42B:
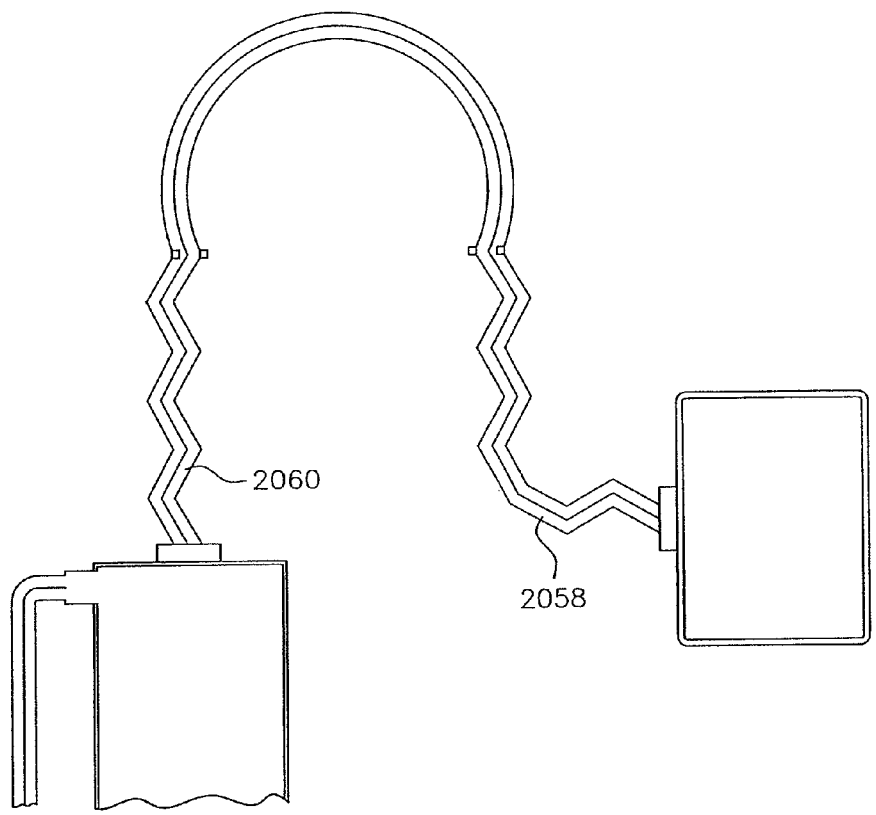

It will be understood that an accordion portion or spinal portion with memory and elongation capabilities can be used without the need for a gooseneck portion. Accordingly, FIG. 42A shows compressed adjustably extendable portions, illustrated herein as accordion portions 2058 and 2060. Accordion portion 2058 is connected to display 2064, and accordion portion 2060 is connected to keyboard 2062, which in turn is further connected to computer electronic housing 2066. FIG. 42B illustrates extendable accordion portion 2058 in an extended and bent position, and extendable accordion portion 2060 extended for use. Accordion portions 2058 and 2060 can be covered by tubular cover of vinyl, rubber, silicone, or the like for enhancing comfort.

Figure 43A:
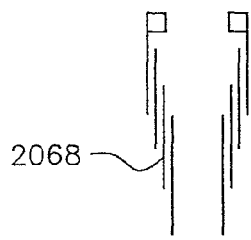
FIGS. 43A to 43H show a plurality of exemplary embodiments illustrating an extendable portion of an inverted U-shape computer.
Figure 43B:
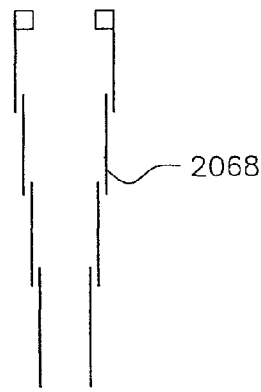
Figure 43C:
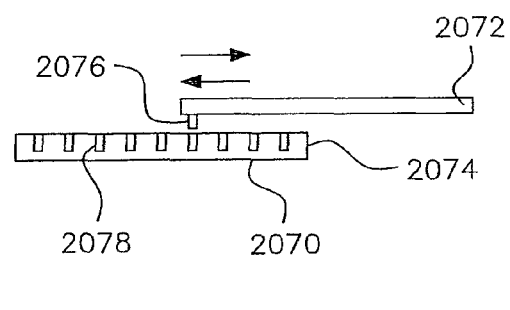
Figure 43D:
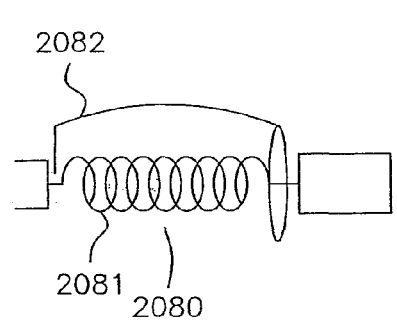
Figure 43E:
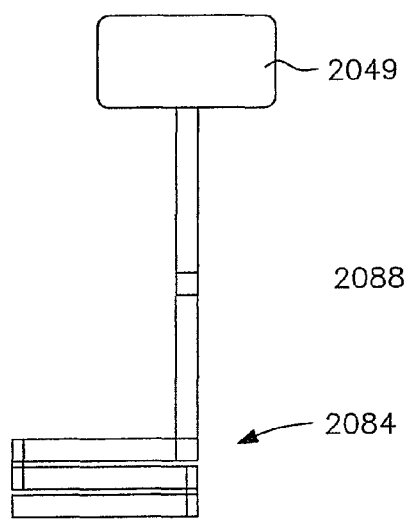
Figure 43F:
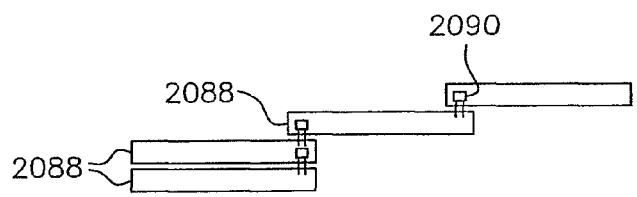
Figure 43G:
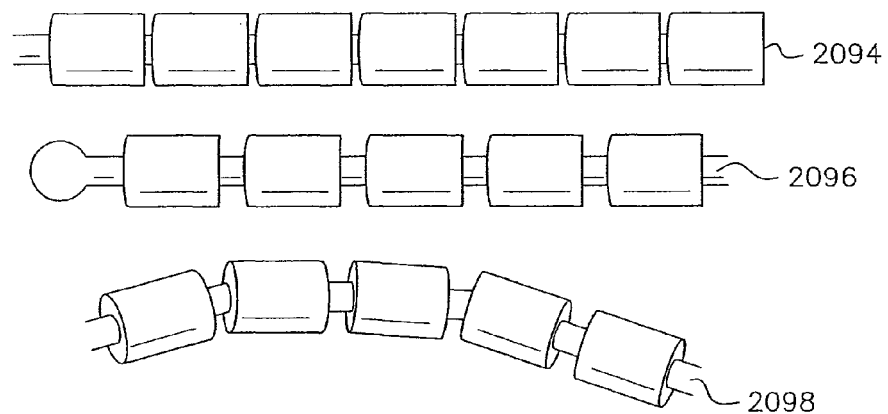
Figure 43H:
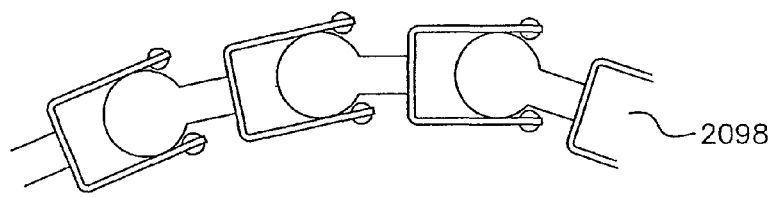

Although the extendable portion of the wearable computer according to the invention can use an accordion tube for compressing and extending, other extendable means can be used. FIGS. 43A to 43H show a plurality of exemplary embodiments illustrating the extendable portion of Inverted U-shape computer 2000. FIG. 43A shows a telescopic or antenna assembly 2068 in closed position, while FIG. 43B shows telescopic assembly 2068 in extended position. FIG. 43C shows a tooth-groove assembly 2070 comprising plates 2072 and 2074 in a partially extended position. Plate 2072 slides on top of plate 2074 with tooth 2076 being retained by groove 2078, using forward and rearward motions. FIG. 43D shows spring assembly 2080, with the spring kept in compressed position by clasp assembly 2082. When clasp assembly 2082 is released, spring 2081 is released, extending the arm. FIG. 43E shows articulated arm assembly 2084, partially extended and connected to display 2049. FIG. 43F shows sliding plate assembly 2086, comprising plates 2088 and pins 2090, in a partially extended position. Plates 2088 are stacked on top of each other, and when pulled, the top plate is released increasing the length of assembly 2086. FIG. 43G shows a spinal assembly including ball articulated assembly in three positions: compressed position 2094; extended position 2096; and extended and bent position 2098. FIG. 43H shows a cut way view of assembly 2098.

As can be observed from FIGS. 43A-H, some extendable assemblies can function as both extendable and flexible assemblies. It will be understood that wire(s) housed inside the extendable portion is (are) adapted to extend in accordance to the configuration of the housing. For example, an accordion tube houses a wire that has an accordion configuration.

Figure 44D:
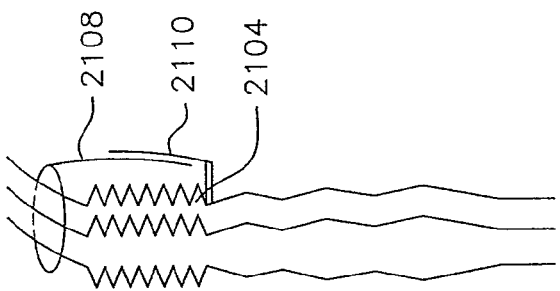
FIGS. 44A through 44D illustrate various embodiments of a clasp assembly.
Figure 44C:
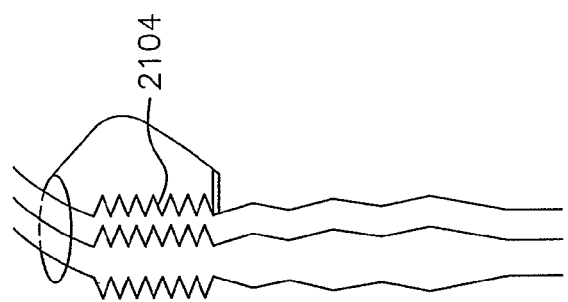
Figure 44B:
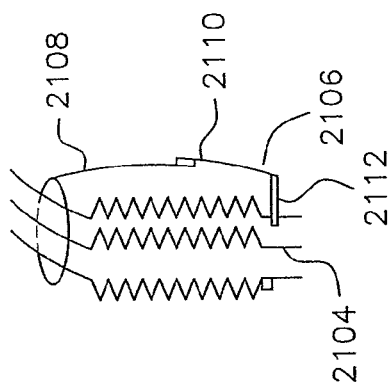
Figure 44A:
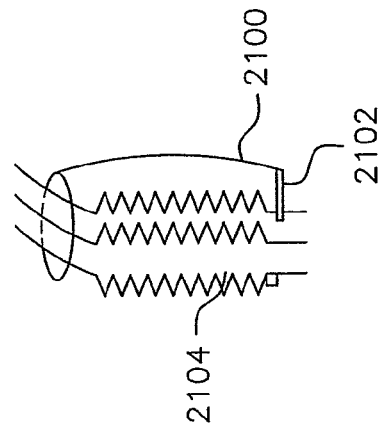

A clasp assembly allows adjusting keyboard and display to different heights in accordance to the needs of the user. FIG. 44A illustrates tooth 2102 of clasp assembly 2100 holding extendable accordion portion 2104 in compressed position. FIG. 44B shows accordion portion 2104 in a partially extended position. FIG. 44C shows self-adjusting clasp assembly 2106 with elongation capabilities and having sliding arms 2108 and 2110 in extended position, with tooth 2112 holding accordion portion 2104 in a compressed position. FIG. 44D shows accordion portion 2104 partially extended with arm 2108 partially overlapping arm 2110. The clasp assembly has an arm that preferably functions as a cantilever.

Figure 45A:
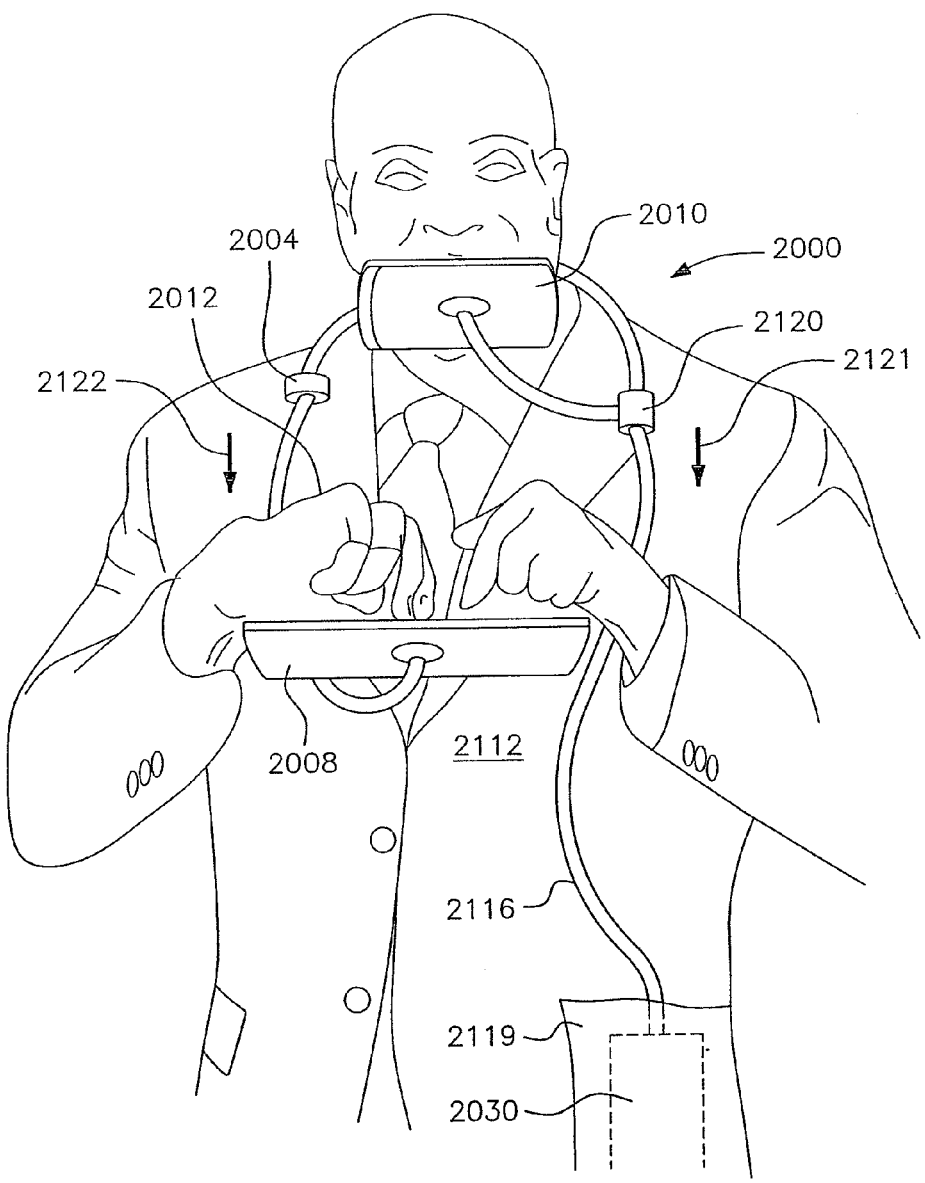
FIGS. 45A through 45C illustrate different heights of keyboard actuation.
Figure 45B:
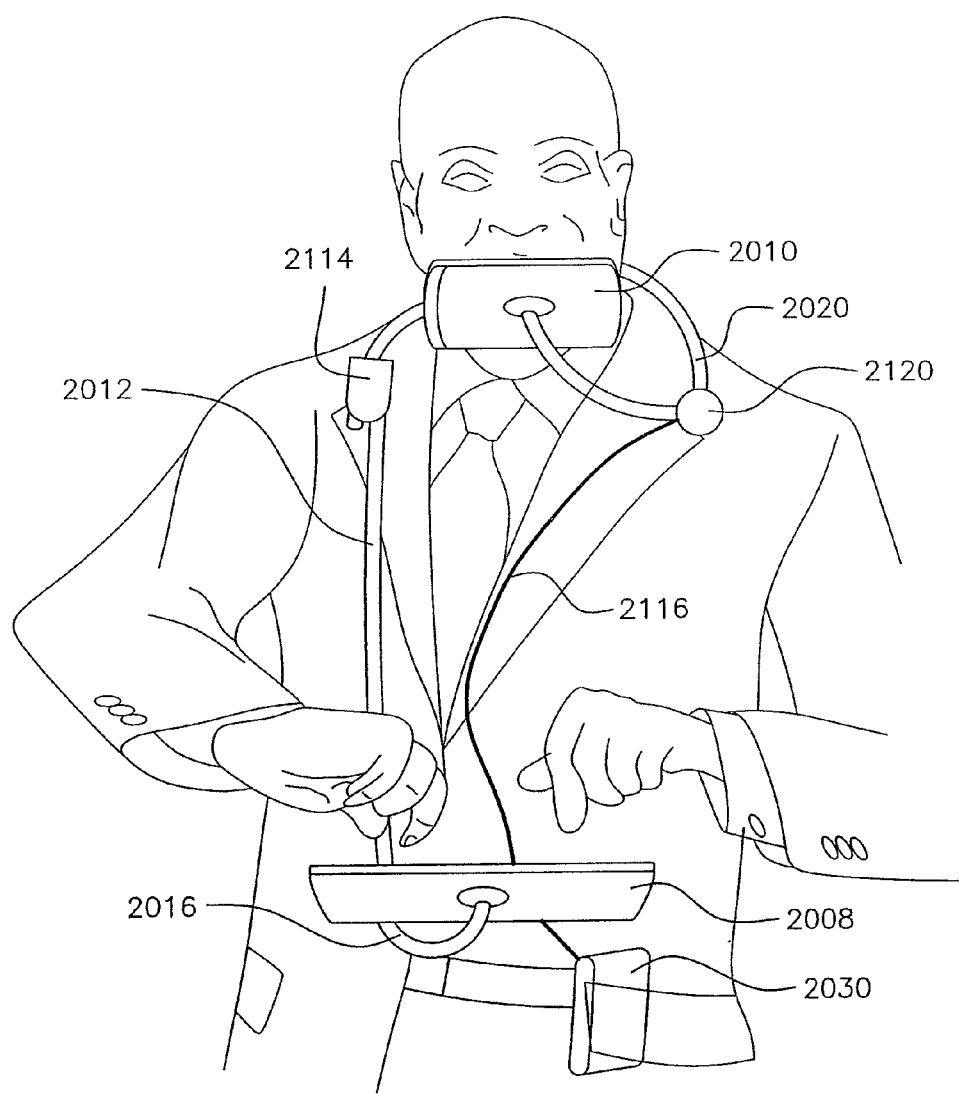

FIGS. 45A and 45B shows illustrations of different height of keyboard provided by the clasp assembly of FIGS. 44A to 44D. FIG. 45A shows a user wearing inverted U-shape computer 2000 with extendable portion 2012 in partially extended position, which positions keyboard 2008 at the level of upper abdomen 2112. Arrow 2122 illustrates the downward motion that can occur when typing, and considering the pulley system of the invention, there is an increase in tension in the cord of the arm 2004 secured to the keyboard 2008 which can lead to acceleration and motion in the opposite cord holding the display 2010. To minimize any motion of display 2010 during typing, cable 2116—connected to computer electronics housing 2030—is preferably secured to connector 2120, therefore counteracting the potential increased tension in the opposite cord during typing. Arrow 2121 illustrated the increase in tension in the display side by connecting arm 2006 to computer electronics housing 2030. In this embodiment, wire from display 2101 and wire from keyboard 2008 inside U-shape tube structure terminates at connector 2120. Computer electronics housing 2030 (shown in broken lines) can be retained by pocket 2119 of a jacket, as illustrated in the figure, or in some other convenient manner, such as in a purse, back-pack, clipped to a belt, and the like.

FIG. 45B shows a preferred embodiment of the wearable computer of the invention when worn by a user (shown in phantom lines) in full extended position. Accordion portion 2012 is fully extended and stop mechanism 2114 is fully opened. Flexible gooseneck arm 2016 holds keyboard 2008 in a stable position for typing at the waist level. Display 2010 is held within visual field of the eyes of the user. Connecting cable 2116 removably connects computer electronics housing 2030 to a connector 2120 located at the end of flexible portion 2020 connected to display 2010. It is understood that electronics housing 2030 is not needed for the invention. All the computer components can be disposed in the keyboard and display, with the weight preferably divided in a similar manner between the keyboard and the display.

The invention also teaches a method for typing on a keyboard with both hands while laying on a supine position. Since the method and device of the present invention allows positioning the keyboard and display in any angle and position, the wearable computer can be used with the body in any position, including laying down. FIG. 46 shows wearable computer 2000, worn by a user who is laying down and typing. It includes the parts already described such as keyboard 2008, display 2010, inverted U-shape structure 2002, flexible portions 2016 and 2020, and computer electronics housing 2030. Flexible portions 2016 and 2020 can be twisted to aim keyboard 2008 and display 2010 in any direction and to be placed in the desired anatomic position. Display 2010 is shown close to the face of the user for illustrative purposes to show the display in line with the eyes while the keyboard is held in a position that is harmony with the anatomy of the hands and elbow for typing. Cable 2130 removably connects computer housing 2030 to keyboard 2008 through electrical connector 2132. Computer housing 2030 is held at waist level by clipping it to the pants of the user, and DVD player/writer 2134, resting on the floor, is removably connected to computer housing through cable 2136.

While not in use, the extendable portions of the wearable computer 2000 are compressed and the display and keyboard are held in a vertical position to fit with the anatomy of the body. During use, the system is extended and the display and keyboard are moved from a vertical to a horizontal position.

Figure 47:
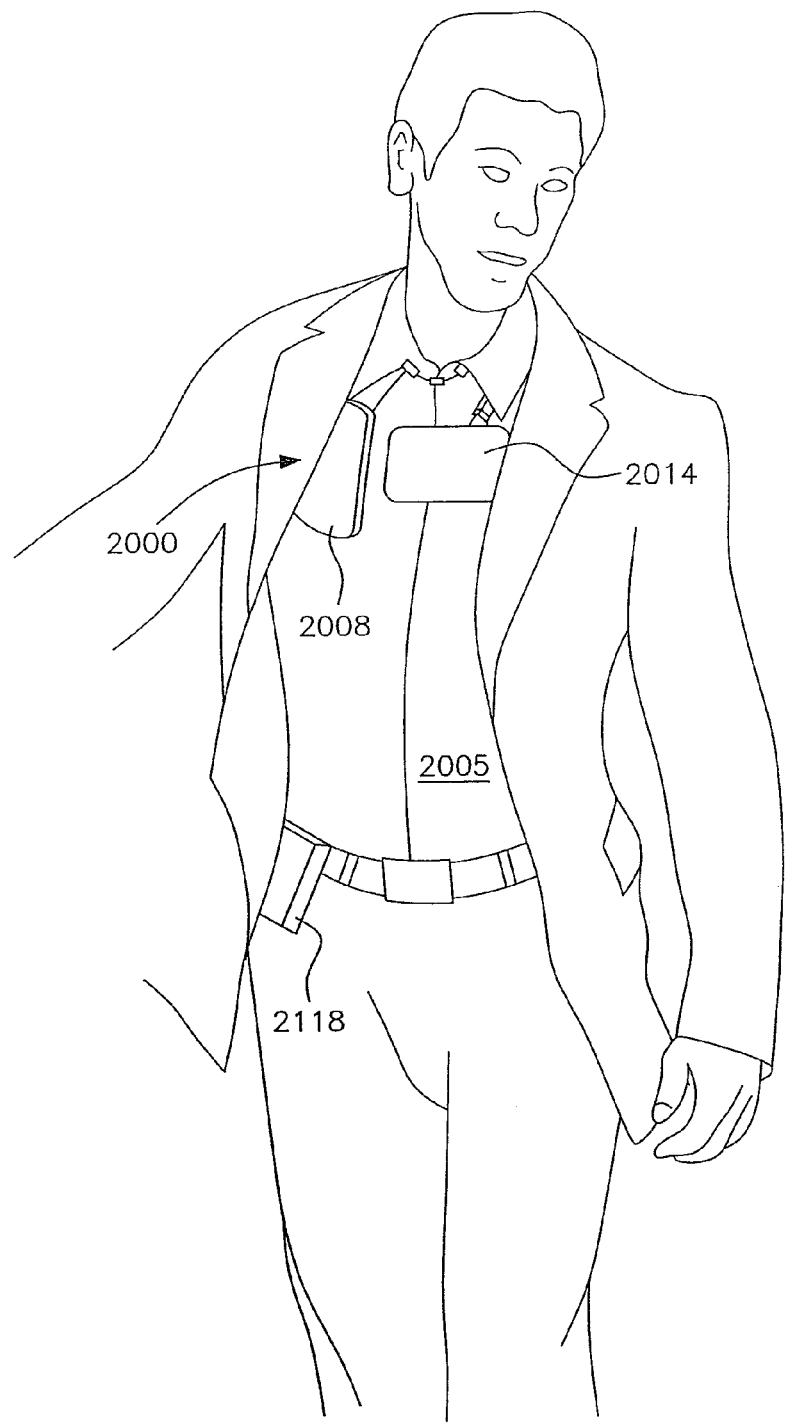

FIG. 47 shows inverted U-shape computer 2000 worn by a user with the extendable portions fully compressed for carrying the device and also disconnected from computer housing 2118. When fully compressed, in accordance to the invention, wearable computer 2000 is barely visible under a regular jacket, with only part of the display 2010 and keyboard 2008 being noticeable. Special pockets in the jacket can retain the computer 2000 and not be noticeable to an external observer.

Figure 48:
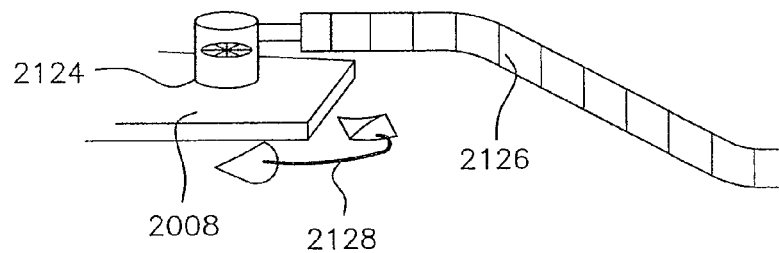
FIG. 48 shows a rotating wheel assembly.
Figure 48A:
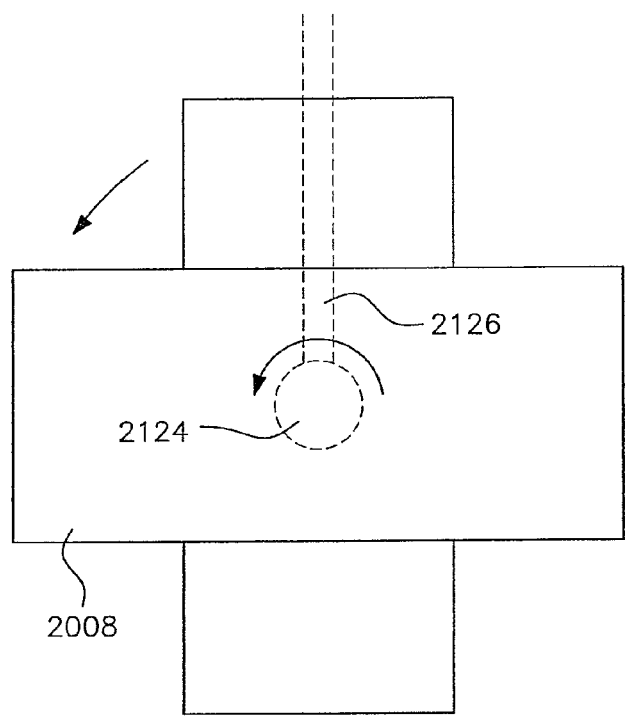
FIG. 48A shows a rotatable keyboard assembly.

FIG. 48 shows in more detail rotating wheel assembly 2124, which connects flexible gooseneck portion 2126 to keyboard 2008. Wheel assembly 2124 functions as a cogwheel, and has 360 degree angle rotation illustrated by arrow 2128. A similar rotating wheel assembly can connect an arm of the system to the display on the opposite side. The rotating wheel assembly can be replaced by a ball assembly for rotation in more than one axis. FIG. 48A shows keyboard 2008 in two positions relative to flexible portion 2126 caused by the rotation of wheel assembly 2124. Flexible portion 2126 (shown in broken down lines) runs underneath keyboard 2008. Thus, rotating wheel assembly 2124 allows moving keyboard 2008 from a vertical position (in phantom lines), which is anatomically fit, to a horizontal position for use.

Figure 49:
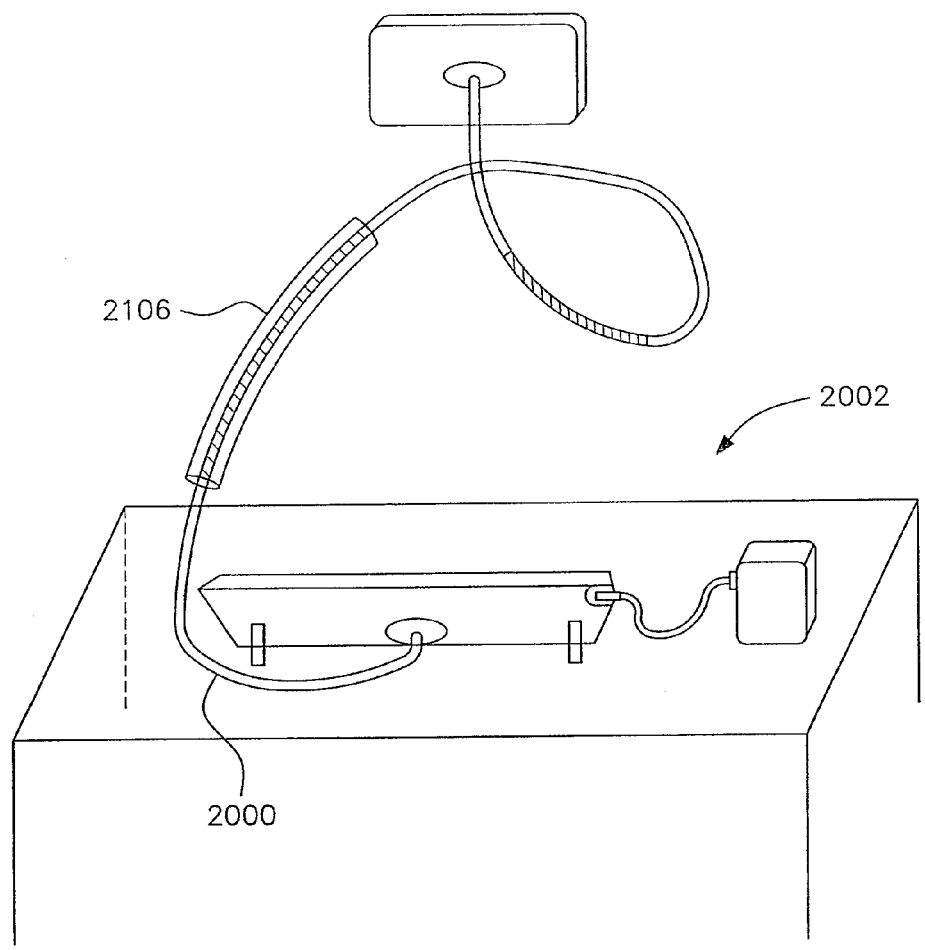
FIG. 49 illustrates an alternate embodiment of a wearable computer.

The wearable computer according to the invention can be converted into a table-top configuration. FIG. 49 shows wearable computer 2000 in a tabletop configuration, with extendable portions fully extended, and sliding clasp assembly 2106 of FIG. 44C being used as support structure to give more stability to the extendable portions. U-shaped structure 2002 is adapted to turn into a helical configuration for a table top embodiment of the wearable computer of the invention.

Figure 50A:
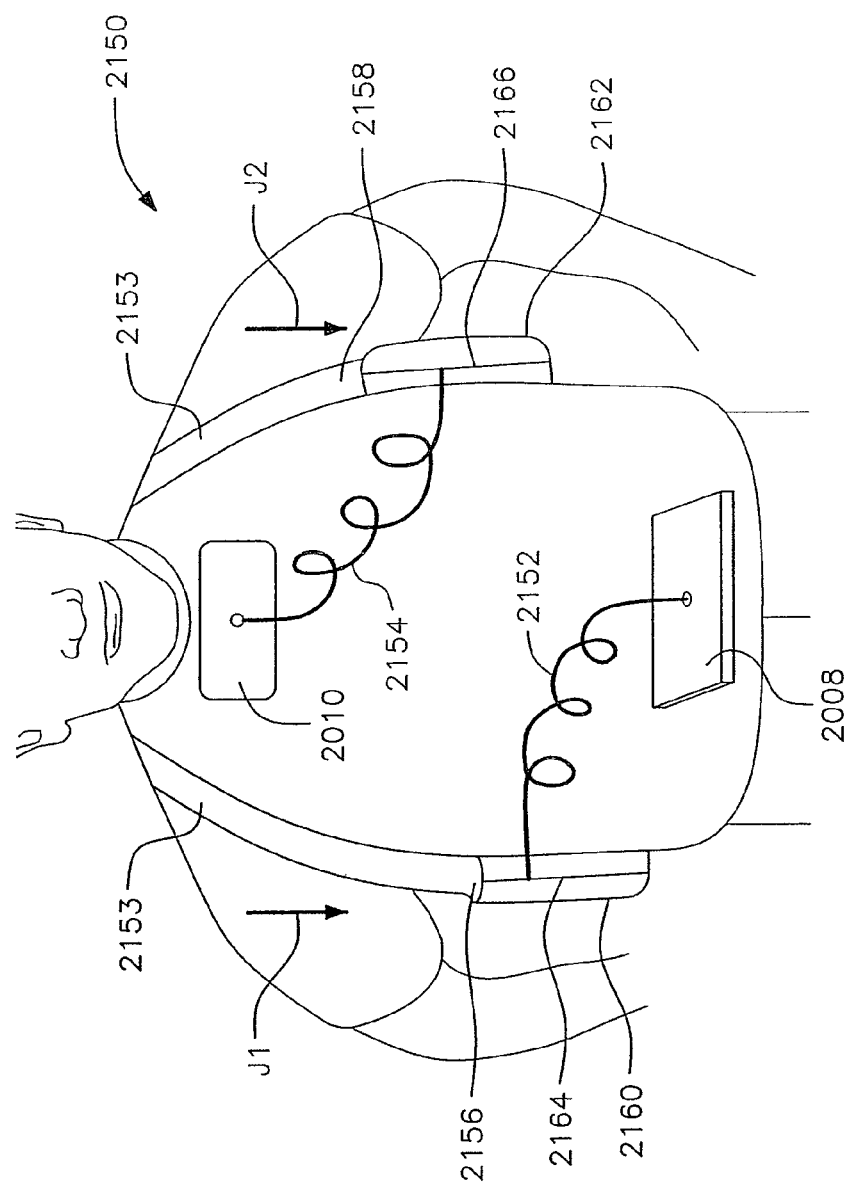

FIGS. 50A and 50B shows an embodiment of the principles of the invention, exemplified by shoulder holster wearable computer 2150, whose weight is distributed between the right and left side of the torso and shoulders as well as the back, by cord 2153, which runs continuously from right to left side. Cord 2153 has arms 2152 and 2154, with keyboard 2008 and display 2010 disposed at the end of each arm. FIG. 50A shows the front side of the shoulder holster computer 2150, including right and left straps 2156 and 2158 and right and left pockets 2160 and 2162, with respective slots 2164 and 2166. Flexible arm 2152 from pocket 2160 is shown uncoiled and holding keyboard 2008 and opposite flexible arm 2154 from pocket 2162 is shown uncoiled and holding display 2010. Arrows J1 and J2 represent the equally distributed tension in arms 2152 and 2154.

FIG. 50B shows the back side of holster wearable computer 2150. Straps 2168 and 2170 are secured to pockets 2160 and 2162 respectively. Strap 2168 is connected to strap 2170 by horizontal strap portion 2172, which has adjustable buckle area 2174. Wire portion 2176 runs continuously thought straps 2168, 2172, and 2170 and terminates in wire portion 2178 inside pocket 2160 and terminates in wire portion 2180 inside pocket 2162 at the keyboard end. Wires 2176, 2178, and 2180, and any other wire in clothing, hats, and the like, are preferably of the ribbon type, which are flexible and can be more easily stored in a rolled position.

Accordingly, wire portions 2178 and 2180 have preferably rolled-up portions 2182 and 2184, which can be extended or rolled back for fitting user of different sizes. Wire 2176 also has a rolled-up portion 2186 in adjustable buckle area 2174, for adjusting size. It is understood that to better distribute weight, a power source for example can be housed in the back in the adjustable buckle area 2174. This allows distribution of the weight to a different anatomic area, which is the back, although it is understood that the weight can also be distributed to the waist area, with the power source being clipped to a belt. Remaining parts and structure of wearable computer 2150 will be described in FIG. 50C.

Figure 45C:
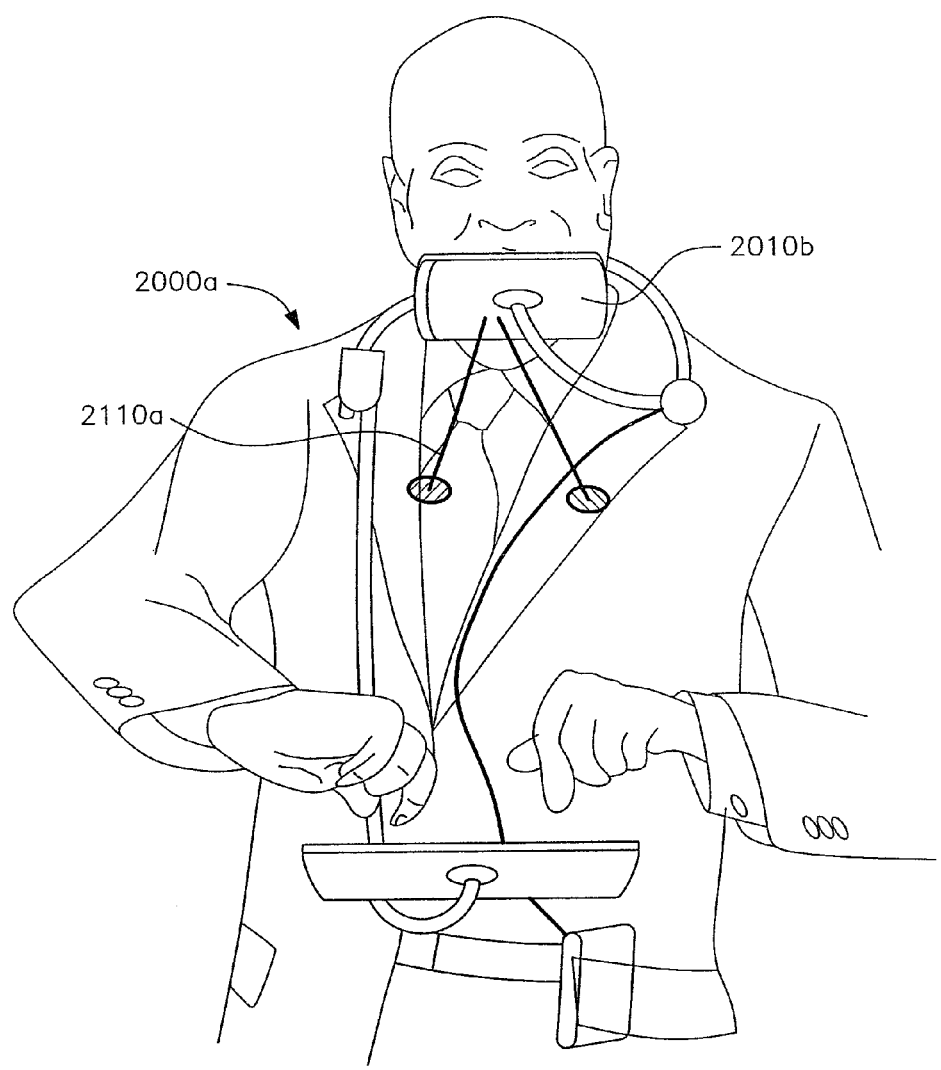

FIG. 50C shows a schematic illustration of shoulder holster computer 2150. Wire portion 2180 terminates inside pocket 2162 in flexible coiled gooseneck portion 2188 with keyboard 2008 in its end. Wire portion 2178 terminates inside pocket 2160 at electrical connector 2190, which is removably connected with connector 2192 of computer housing 2030. Flexible gooseneck portion 2194 terminates distally at display 2010, and terminates proximally in wire portion 2198 in supporting plate 2196 inside pocket 2160. Wire portion 2198 terminates in the upper end in flexible gooseneck portion 2194 secured to plate 2196. The opposite end of wire portion 2198 terminates in electrical connection 2200, which is removably connected to connector 2202 of computer housing 2030. Supporting plate 2160 is attached to one of the walls of pocket 2160, and is preferably made of metal or hard plastic, and adapted to support about 650 grams of weight in a stable position. Pockets 2160 and 2162 and flexible gooseneck portions 2188 and 2194 in FIG. 45C are substantially identical to each other such that description of features of the display side herein applies to the keyboard side as well.

Figure 50D:
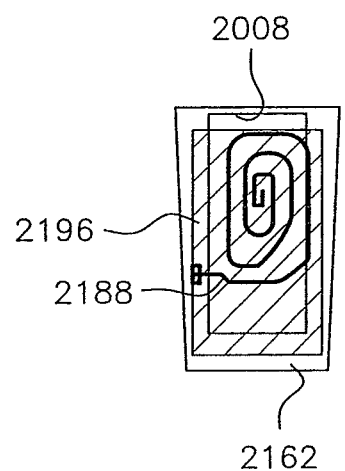
FIGS. 50D and 50E illustrate various views of a flexible and extendable gooseneck extension.
Figure 50E:
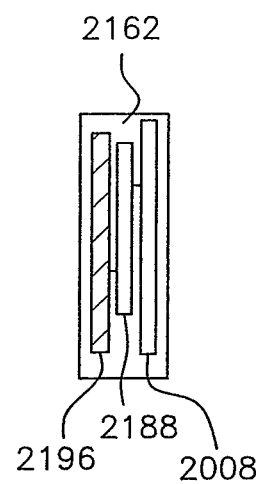

FIG. 50D is a cut way side view of pocket 2162. Flexible and extendable portion 2188, such as a metallic gooseneck, is in its original coiled position, preferably as a spiral for easy uncoiling and stability during use while remaining compact when stored in pocket 2162. Keyboard 2008 is shown in phantom lines on top of spiral extendable portion 2188, allowing compact storage, with extendable portion 2188 being secured to plate 2160. The description of features of the pocket 2162 herein applies to pocket 2160 as well. FIG. 50E is a cut way front view of pocket 2162, showing keyboard 2008 resting on top of flexible extendable portion 2188, with portion 2188 resting against plate 2160.

Keyboard 2008 is preferably a thin membrane-type keyboard, and of dimensions that allows fit with the anatomy of the upper body. The preferred weight for the keyboard and display are such that they do not activate pain fibers, as in accordance to previous descriptions. Preferred maximum dimensions for a non-foldable keyboard are 18 cm×11 cm×1.5 cm, more preferably 16 cm×10 cm×1.0 cm, and most preferably 15 cm×9 cm×0.7 cm. Keyboard 2008 can have any number of keys, but preferably has from about 50 keys to about 84 keys. Adaptations can be made for keys with characters of other languages. The invention preferably uses a keyboard designed to be used with two hands, however, smaller keyboards, QWERTY-type keyboards, and non-QWERTY type keyboards can be used. Use of a foldable keyboard is also contemplated. Keyboard 2008 may have numerical keys adapted to dial a number for phone communication. Keyboard 2008 may also include a speaker, as well as electronics and wireless transmitters/receivesr for wireless communications (including cellular telephone, radio, satellite, and internet communication). The components for wireless transmission can be also housed in housing 2030.

Display 2010 is preferably an active-matrix LCD display, and is adapted to have dimensions and weight similar to keyboard 2008. Keyboard 2008 and display 2010 can be permanently secured or removably secured to inverted U-shape structure 2001. Preferred maximum dimensions for display 2010 are 16 cm×10 cm×0.9 cm, more preferably 15 cm×9.0 cm×0.6 cm, and most preferably 14 cm×8.0 cm×0.5 cm. Preferably, display 2010 has the same dimensions as keyboard 2008. Keyboard 2008 can be replaced by a video game control system—for example—with the images of the video game being displayed in display 2010. Keyboard 2008 and display 2010 can also be wireless and Communicate with other components of the wearable computer via Bluetooth communications protocols, for example. Keyboard 2008 and display 2010 can also be foldable. It is understood that connection between the various components of the wearable computer of the invention can be wired or wireless. Display 2010 can also have a camera for video- and photo-taking or a web-cam for transmission of images over the internet and by video telephone.

Figure 51:
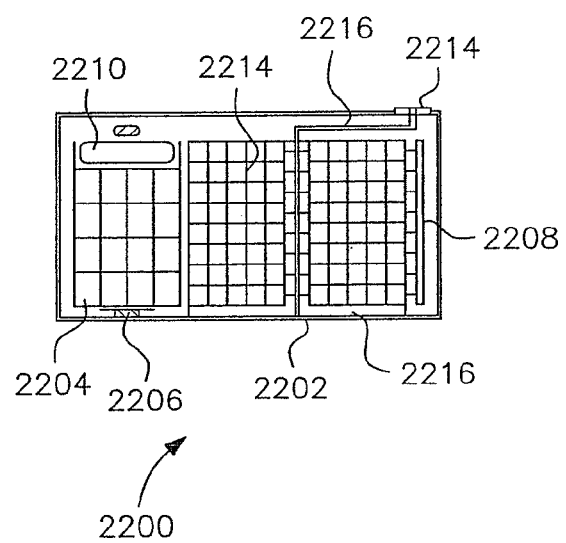
FIGS. 51 and 51A illustrate a foldable keyboard.
Figure 51A:
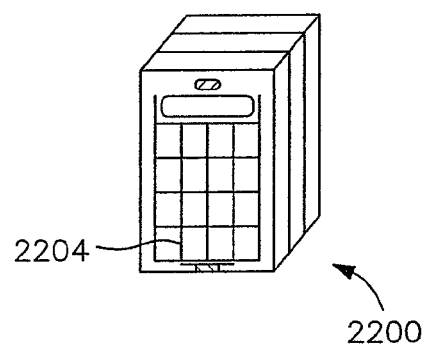

A foldable keyboard integrated with a cellular phone (or any mobile phone, cordless phone, and satellite phone) can be used as part of the wearable computer of the invention. In this embodiment, keyboard 2008 can be foldable and has a transceiver for transmitting voice and/or data. FIG. 51 shows foldable keyboard-telephone assembly 2200, comprising keyboard body 2202, numerical keypad 2204 coupled to a transceiver 2206, and a plurality of flexible printed circuits 2208. Keyboard body 2202 has a plurality of keys 2214, segmented into a plurality of blocks 2216, so that the blocks can be folded into stacks. Flexible printed circuit 2208 connects with display 2210 in the keyboard body 2202. Numerical keypad 2204, coupled to transceiver 2206 has display 2210 positioned adjacent to and above keypad 2204, with keypad 2204 being disposed at the end of keyboard body 2202, and being used for telephone communications. When the blocks are in the folded position, numerical keypad 2204 is the outer surface of foldable keyboard 2200. Flexible circuit 2208 is connected to electrical connector 2214 through wire 2216. Numerical phone keypad 2204 communicates wirelessly through transceiver 2206. FIG. 51A shows the foldable keyboard assembly in the folded position, with the keypad 2204 disposed at the front of the assembly 2200.

A variety of input devices can be incorporated into the wearable computer of the invention. For example, during professional use, a bar code reader, RF tag reader, and the like can be used, allowing increased productivity with immediate computing and analysis of data captured during use.

Although, an illustrative example of the inverted U-shape and shoulder holster wearable computer has been described herein, it is understood that other configurations and other parts of the body can be used to support the computer by using a chest strap, a back strap, arm strap, and a belt around the waist, etc. without departing from the scope of the invention.

It is understood that the wearable computer of the invention can be implemented using two parts, by integrating the components from housing 2030 into keyboard 2008 and display 2010. For example, hard drive, CMOS, CPU, and RAM can be integrated in the keyboard module, while sound card, video card, network card, and power source may be integrated into the display module in the opposite side. A removable module housing, for example, a DVD player/writer can also be used and removably connected to keyboard module to expand the number of available electronic components.

FIG. 52 shows wearable CD player 2230, comprising inverted U-shape structure 2260 that includes extendable portion 2232, disposed adjacent to CD player 2234, and a second, portion 2236. Preferably, portion 2236 is substantially cylindrical in cross-section. Portion 2236 is preferably non-extendable and terminates at arm 2244, which in turn terminates at housing 2238, which contains a power source, such as battery 2240. Extendable portion 2232 has an accordion configuration, which remains in a compressed position by stop assembly 2242. Extendable accordion tube 2232 is preferably flexible and may be extended from the compressed position for handling CD player 2234 by lifting arm 2044 of stop assembly 2242.

Portion 2236 includes pouches 2246 and 2248 for housing electrical jacks 2250 and 2252, and ear buds 2254 and 2256. CD player 2234 includes CD area 2234a and flash card area 2258a, for receiving flash card 2258 or any other memory storage medium. Wire 2262 is disposed on or within structure 2260 and connects CD player 2234 with power source 2240.

Figure 53:
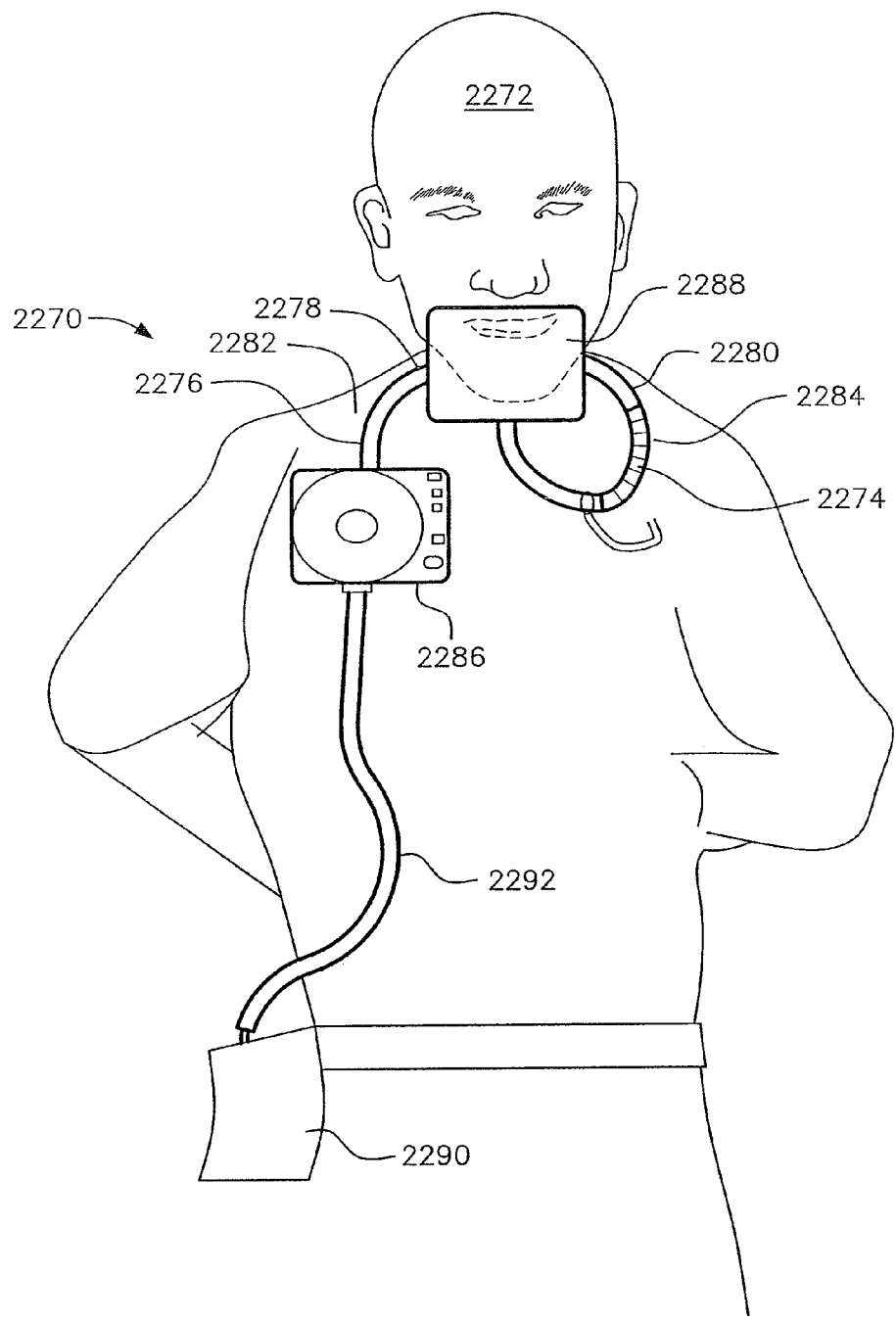
FIG. 53 illustrates a wearable DVD player.

FIG. 53 shows a wearable DVD player according to the invention. Wearable DVD player 2270 is worn by user 2272 and comprises inverted U-shape structure 2280. Inverted U-shape structure (which, as in other wearable device according to the invention and described herein, can be of various shapes, provided that it has at least two arms disposed on either side of the user's neck) includes arms 2282 and 2284 having extendable portions 2274 and 2276. Portions 2274 and 2276 are connected by central part 2278, which is preferably non-extendable. The remaining portions of structure 2280 are essentially similar to the embodiment of FIG. 41. Arm 2284 is connected to display 2288 (or any suitable screen) and arm 2282 is connected to DVD player 2286 (or any other disc player or memory card player), with player 2286 being further connected by cable 2292 to power source 2290 held preferably at the waist level.

Figure 54:
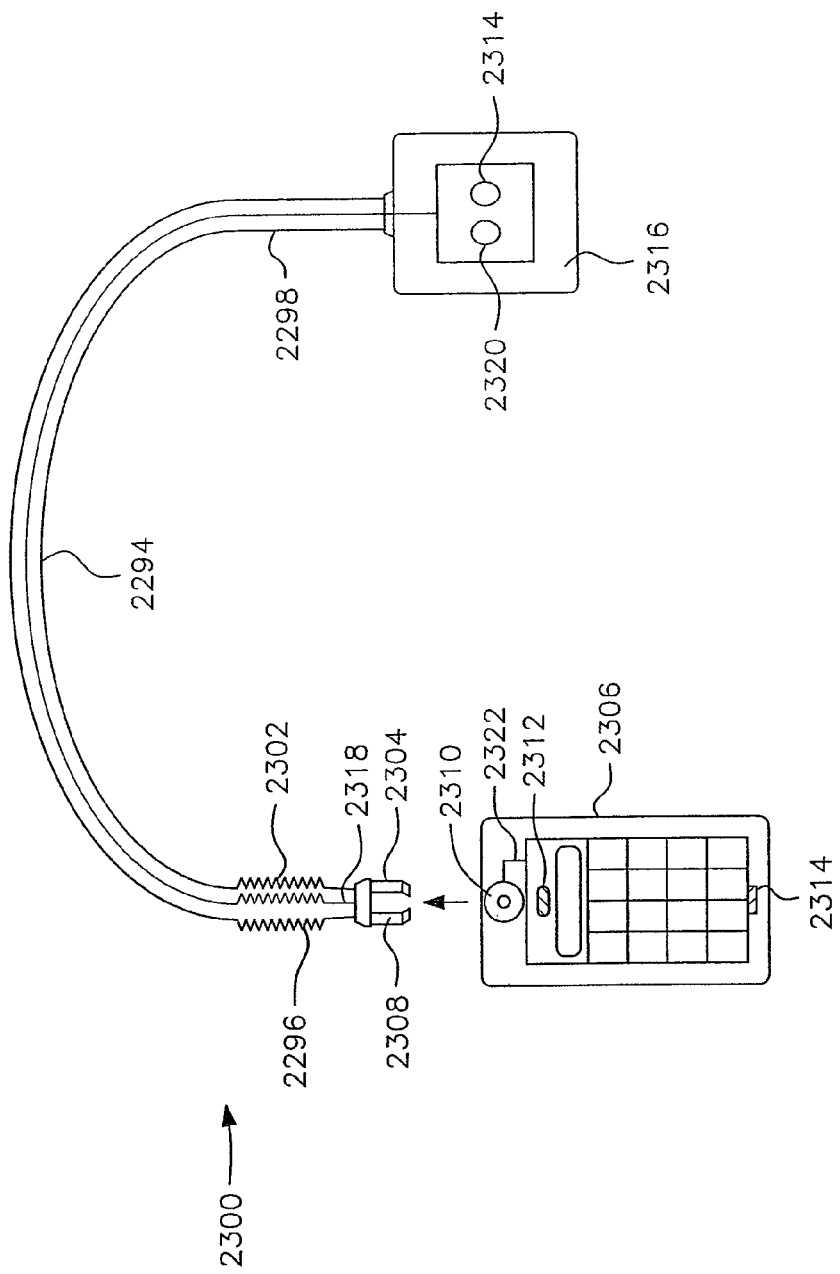

FIG. 54 shows detachable wearable telephone 2300, illustrated as a slim type phone 2306. Wearable telephone 2300 comprises an inverted U-shape structure 2294 that includes arms 2296 and 2298, with arm 2296 having extendable portion 2302 disposed adjacent to a mechanical holder 2304. Mechanical holder 2304 preferably has a claw configuration for removably retaining phone 2306, such as a cellular telephone or cordless telephone. Tooth 2308 of claw 2304 slides on top of wheel assembly 2310 of cellular phone 2306 for securing phone 2306 to structure 2294. Speaker phone 2312 is disposed adjacent to holder 2304. Microphone 2314 is disposed diametrically opposed to speaker phone 2312, providing an ideal fit with the anatomy of the body for hearing and voice when using wearable telephone 2300 as seen in FIGS. 57A and 57B.

Wheel assembly 2310 is in electrical contact with a circuit of phone 2306 through wire 2322. Holder 2304 is electrically connected to housing 2316 through wire 2318. Housing, 2316 houses power source 2314 and electrical pads 2320, allowing battery 2314 to provide power to phone 2306. Although the illustration shows a detachable telephone, it is understood that a telephone permanently fixed into the system is also contemplated. In such an embodiment, phone 2306 is affixed permanently to holder 2304, and Inverted U-shape telephone 2294 works as a hand set. It is stored in a cradle for recharging (not shown), with electrical pads 2320 being adapted to contact pads in the cradle for recharging telephone 2306. Telephone 2306 can be a conventional cordless telephone or a cellular telephone. It will be understood that holder 2304 can have a standard electrical connector for connecting, preferably by cable, with standard connector of phone 2306, thereby closing a circuit and providing power from battery 2314 to phone 2306. Therefore, any standard phone can benefit from the extra battery provided by structure 2294.

FIG. 54A shows the detachable phone of FIG. 54, with inverted U-shape structure 2326 having no wiring and functioning as a support structure only, without a power source and holder 2324 having no electrical wiring and working as a mechanical holder. Other features, including extendable portion of structure 2326, are essentially similar to embodiment of FIG. 54.

FIG. 54B shows a detachable phone 2338, which includes inverted U-shape structure 2340 comprised entirely of an accordion configuration, and shown in its compressed state, thereby being compact and allowing for easy storage. The dimensions of fully compressed structure 2340 are similar to or slightly larger than dimensions of phone 2306.

FIG. 55 shows inverted U-shape support structure 2350, comprising extendable portion 2342 with stop assembly 2360. Portion 2342 terminates at holder 2344, with holder 2344 preferably having cavity 2346 and moveable claws 2348 for retaining an electronic package such as a cellular phone, digital music player, digital video player and the like. Structure 2350 has pocket 2352 disposed adjacent to extendable portion 2342, preferably for storing ear bud 2358. Structure 2350 terminates at its opposite end in housing 2354 for storing an extra battery 2356. In this embodiment, structure 2350 does not have electrical wiring or electrical connectors. Holder 2344 preferably has a spring loaded assembly to allowing easier release of the electronic package removably retained by claws 2348. Referring to FIG. 55B, holder 2344 is preferably positioned at a 45 degree angle in relation to the shoulder plane, providing an anatomic fit between microphone 2366 and the user's mouth (not shown), with microphone 2366 optimally receiving sound from the mouth. It will be understood that holder 2344 can have hinge 2362 for changing the relative angle of supporting plate 2370, as shown in FIG. 55B. When the user wants to dial, stop assembly 2360 from FIG. 55 is released and portion 2342 extended, placing holder 2344 in line with the user's eyes. It is understood that adjustably extendable portion can function as a retractable, including spring loaded, which retracts to resting (compact) position after use. For example, after using the dial pad to dial a phone number, the extendable portion returns to its compact position.

FIG. 55C shows an embodiment of the inverted U-shape structure of FIG. 55, but without an extendable portion. In this embodiment, holder 2344 has extendable cord 2345 that terminates in plate 2347. Plate 2347 has a means for being removably connected to an electronics package. Such means could include Velcro, a clip, adhesive tape, etc. Extendable cord 2345 can include a spring loaded spool assembly 2351. Alternatively, cord 2345 can be comprised of a non-spring loaded retractable coiled cord. When using a retractable coiled cord with no spring mechanism for retaining cord 2345 in place, as shown in FIG. 55D, holder 2344 preferably has arms 2353 for retaining the electronics package, a spring not shown), and release button (not shown). Any electronics package, including the ones described in FIG. 58, can be secured to plate 2347. Alternatively, arm 2372, terminating in holder 2344, may have an increased length to allow viewing of holder 2344 and for example dialing a phone or viewing a video in a digital video player. Opposite arm 2374 may also be of increased length to match dimensions and provide balance and similar tension in both arms. In this embodiment, holder 2344 does not require an extendable cord or plate 2347.

Figure 56:
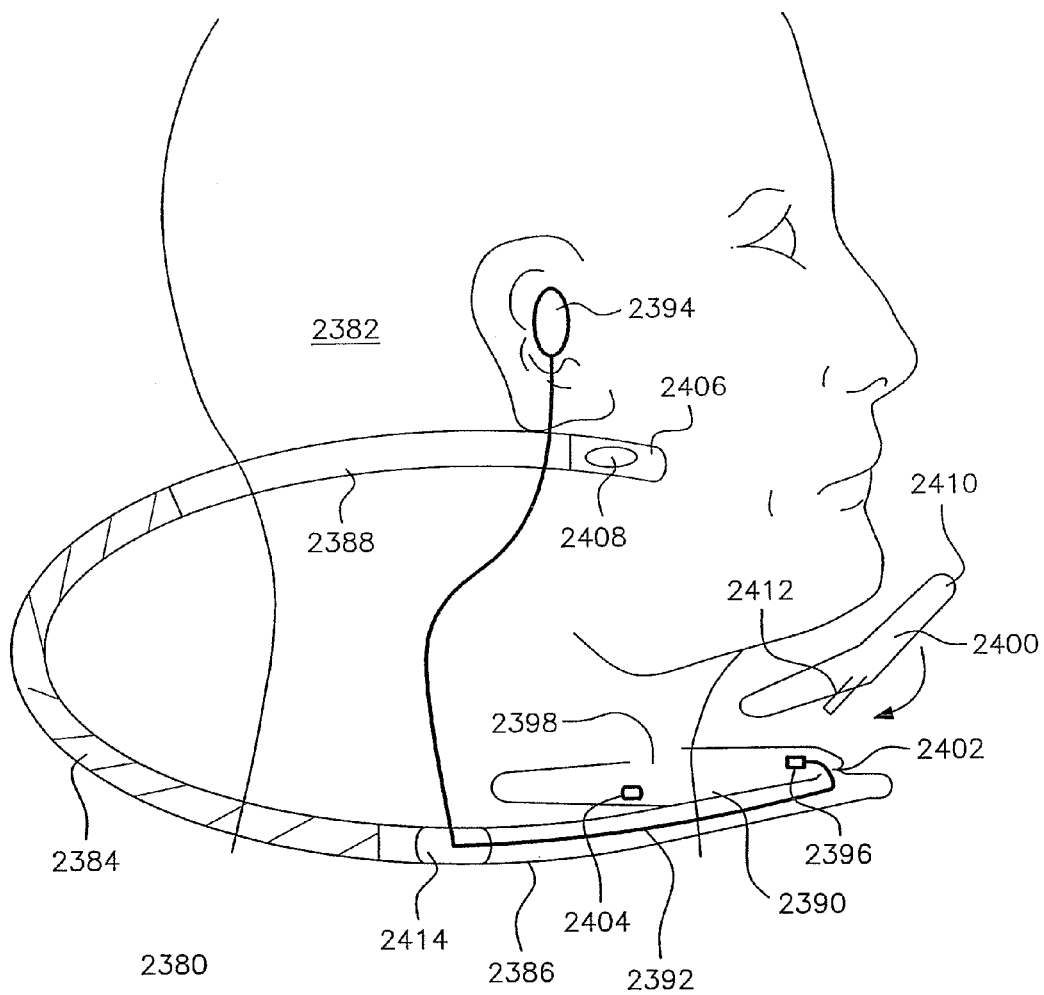

FIG. 56 shows a C-shape tubular support structure 2380 worn by user 2382 (shown in phantom lines). It includes extendable portion 2384, which terminates on the right side in a non-extendable portion 2386, and on the left side terminating in non-extendable portion 2388. Case 2390 is adapted to receive electronic package 2400, such as a cellular telephone, and is disposed on portion 2386. Case 2390 is preferably foldable, and positioned preferably at a 45 degree angle in relation to the shoulder plane. Case 2390 has opening 2398 for receiving phone 2400. Case 2390 further includes opening 2402 for receiving plug 2396, which releasably connects with ear bud connector 2410 in phone 2400. Case 2390 further includes opening 2404 for receiving antenna 2412. Wire 2392 is disposed on or inside portion 2386, terminating in ear bud 2394, shown on the ear of the user, while the opposite end of wire 2392 terminates in electrical plug 2396, which is preferably disposed inside case 2390. Right portion 2386 preferably has pocket 2414 for storing ear bud 2394, and left portion 2388 preferably has storage area 2406 for storing an extra battery 2408.

Figure 56A:
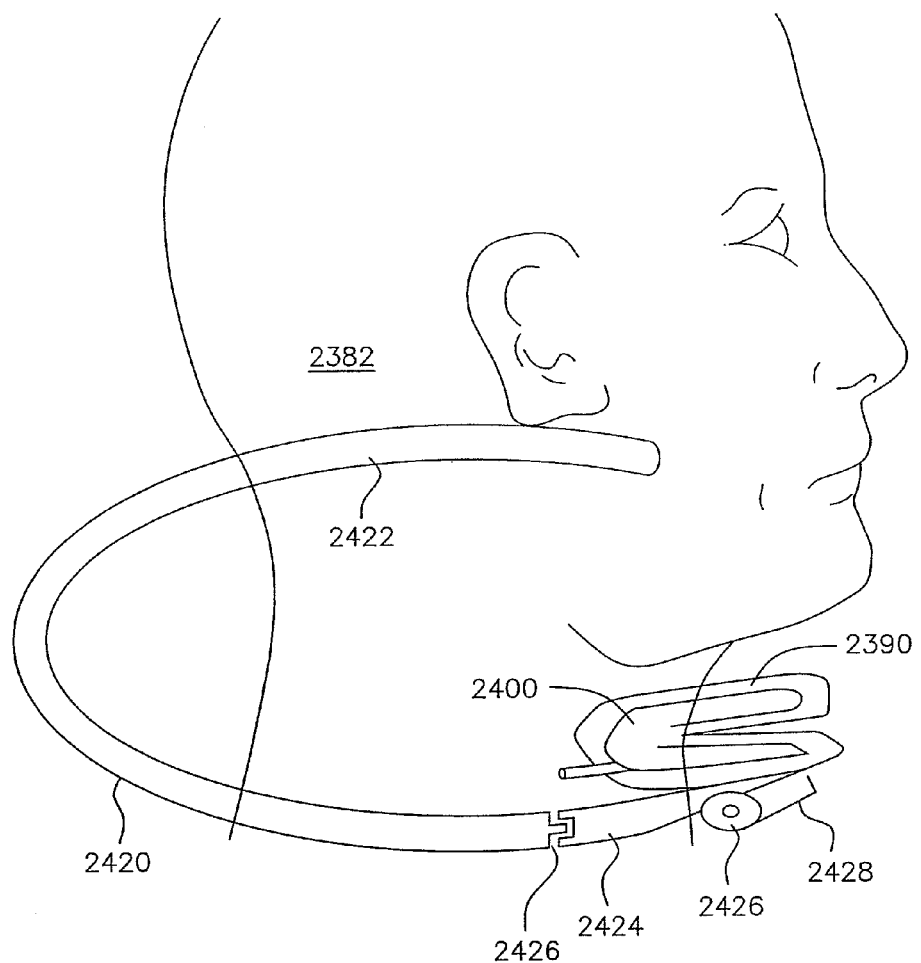

FIG. 56A shows a modified embodiment of the structure of FIG. 56, worn by user 2382 (shown in phantom lines). Structure 2420 has portions 2422 and 2424 removably connected by a mechanical connector 2426 preferably using female-male assembly. Portion 2422, illustrated as the left portion preferably extends around an arc at least 180 degrees, while portion 2424 is preferably straight and measures no more than 15 cm in length, when fully unfolded. Portion 2424 includes case 2390, shown in a folded position and retaining phone 2400. On the opposite side of case 2390 portion 2424 has wheel assembly 2426 and clasp 2428 for securing portion 2424 to a belt for example, allowing case 2390 to function as a shoulder supported structure or a waist supported structure. It is understood that a non-foldable case, preferably rectangular in shape, for retaining essentially rectangular phones, can also be used as a substitute for foldable case 2390.

Figure 57C:
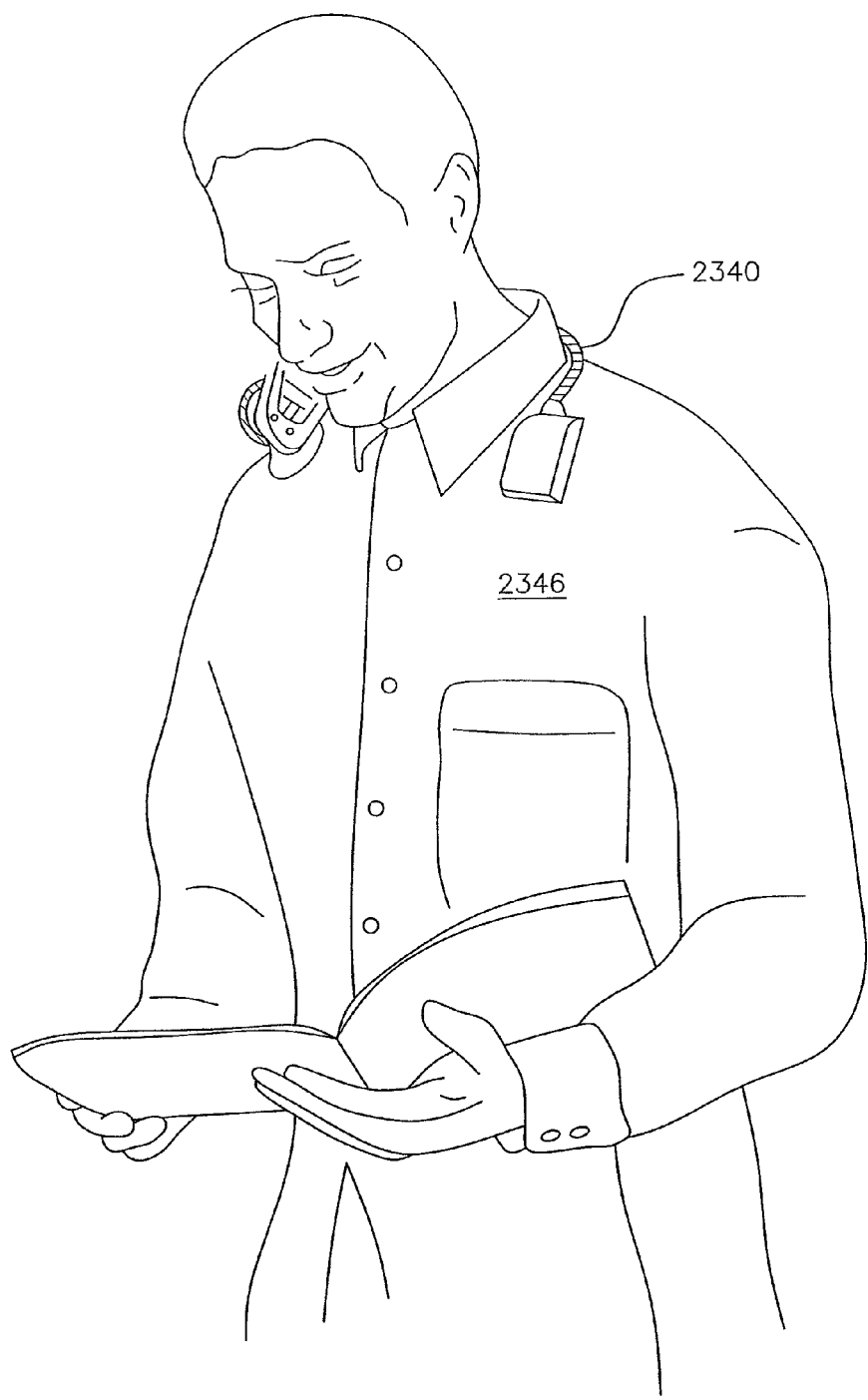

FIG. 57A and FIG. 57B shows the embodiments of FIGS. 54 to 56A, and more specifically embodiments of FIGS. 56 and 56A, when worn by a user. FIG. 57A shows user 2432 wearing wearable telephone 2340, comprising a C-shape structure that includes extendable portion 2344, which is shown in a compressed position and a case retaining an electronics package 2346, illustrated as a foldable phone. Case and phone 2346 are anatomically positioned on shoulder 2348, adjacent to mouth 2352 and ear 2354. Opposite arm 2356 terminates in housing 2358, storing extra battery and/or ear buds, thereby equilibrating tension in the right and left portions. FIG. 57B shows case and phone 2346 of FIG. 57A in the unfolded position at 45 degree angle, when worn by a user. Microphone 2360 of phone 2346 is positioned in anatomical proximity for receiving sound from the mouth 2352 while speaker 2362 is in an optimal anatomical position relative to ear 2354. An ear bud (not shown) requires only a short cable due to the anatomical fit. FIG. 57C shows a life-like view of wearable telephone 2340 when worn by a user, with the phone 2346 (NEED correct number in figure to point to phone) at an angle for optimal anatomic fit with hearing and voice while the hands are free.

It is understood that a variety of electronic devices may be removably or permanently mounted as a anatomically fit wearable electronic article in accordance with the teachings of this invention. FIG. 58 shows a plurality of electronic devices that can permanently affixed to wearable support structure 2380 as one physical unit, or can be removably connected with support structure 2380, with the aim to achieve the anatomic criteria described herein. Structure 2380 includes pockets 2409 and 2411 for housing electrical connectors, right arm 2401 and left arm 2400. Right arm 2401 has extendable portion 2403 and flexible portion 2405. Left arm 2400 terminates at housing 2395. Flexible portion 2405 terminates at holder 2402, which preferably is removably connected with electronic devices. Alternatively, holder 2402 may be permanently connected with electronic devices. Illustrated electronic devices include portable video game 2382, music player 2384, GPS 2386, video player 2388, digital book 2390, personal digital assistant (PDA) 2392, monitoring device 2394 (including devices for monitoring any biological parameter of the body), communication device 2396, imaging device 2397, and sound device 2399. Preferably, electronic devices are connected to structure 2380, and further electrically connected to housing 2395, located in opposite arm 2400, which houses power source 2398. Alternatively, electronic devices are only mechanically secured to structure 2400 by mechanical holder 2402. Electronic devices have means to connect to holder 2402, preferably using a male-female assembly with electronic devices or by using any of the other embodiments of the present invention with structures for holding electronic devices.

As used in connection with this figure, and elsewhere in this application, the term "video player" includes, but is not limited to, conventional televisions, digital video players, digital broadcast televisions, and the like. The term "music player" includes cassette players, CD players, and, preferably, digital music players. The term "PDA" includes any hand-held computer. "Monitoring device" includes any medical device such as a glucose monitoring device. "Communication device" includes any radio, telephone, wireless receiver for internet content, wireless receiver for satellite signal, and any wireless transceiver, wireless receiver, wireless transmitter, two-away radio, and other communications device with or without imaging. "Imaging device" includes any video camera, photo camera, digital, binoculars, and the like. "Sound device" includes conventional microphone, wireless microphone, sound recorder, and the like.

Housing 2395 can retain a single power source or a combination of electronics and power source. By way of illustration, housing 2395 can retain in a permanent or releasable manner a wireless transmitter. It will be understood that holder 2402 can be replaced by plate 2406 (shown in phantom lines) for retaining the electronic devices, using Velcro, clips, or other retention means. Structure 2380 can further include pockets 2411 and 2409 for storing ear bud assemblies and a housing for housing a power source (not shown). It will be understood that a combination of electronic and electrical articles can be used. Many other uses and applications will become apparent to one of ordinary skill in the art. For example, the electronic device can be PDA 2392, and housing 2395 can house a pedometer which is electrically connected with PDA 2392. The user can exercise with structure 2380 around the shoulder and neck, and then information from pedometer or exercise monitoring device in housing 2395 is captured and fed into PDA 2392, adapted with software to provide feed back information to the user in real time. For instance, if PDA 2392 detects a problem with the exercise routine, the PDA can alert the user, and can provided an image of the steps needed to correct the problem. The user then can extend the extendable portion and view the display of the PDA and see step by step how to perform the exercise routine. The user can keep the arm extended during the whole exercise and view the steps while exercising. A voice system can also be used and tell the user to change the step or exercise routine. If exercising outside, the PDA or housing 2395 can have a wireless receiver for receiving information such as the weather conditions or even a message. Housing 2395 can include controls and buttons beside power source, while the opposite arm terminates in a television. Housing 2395 can include a wireless receiver for images and video conferencing, with the opposite arm holding a display and camera.

Figure 59:
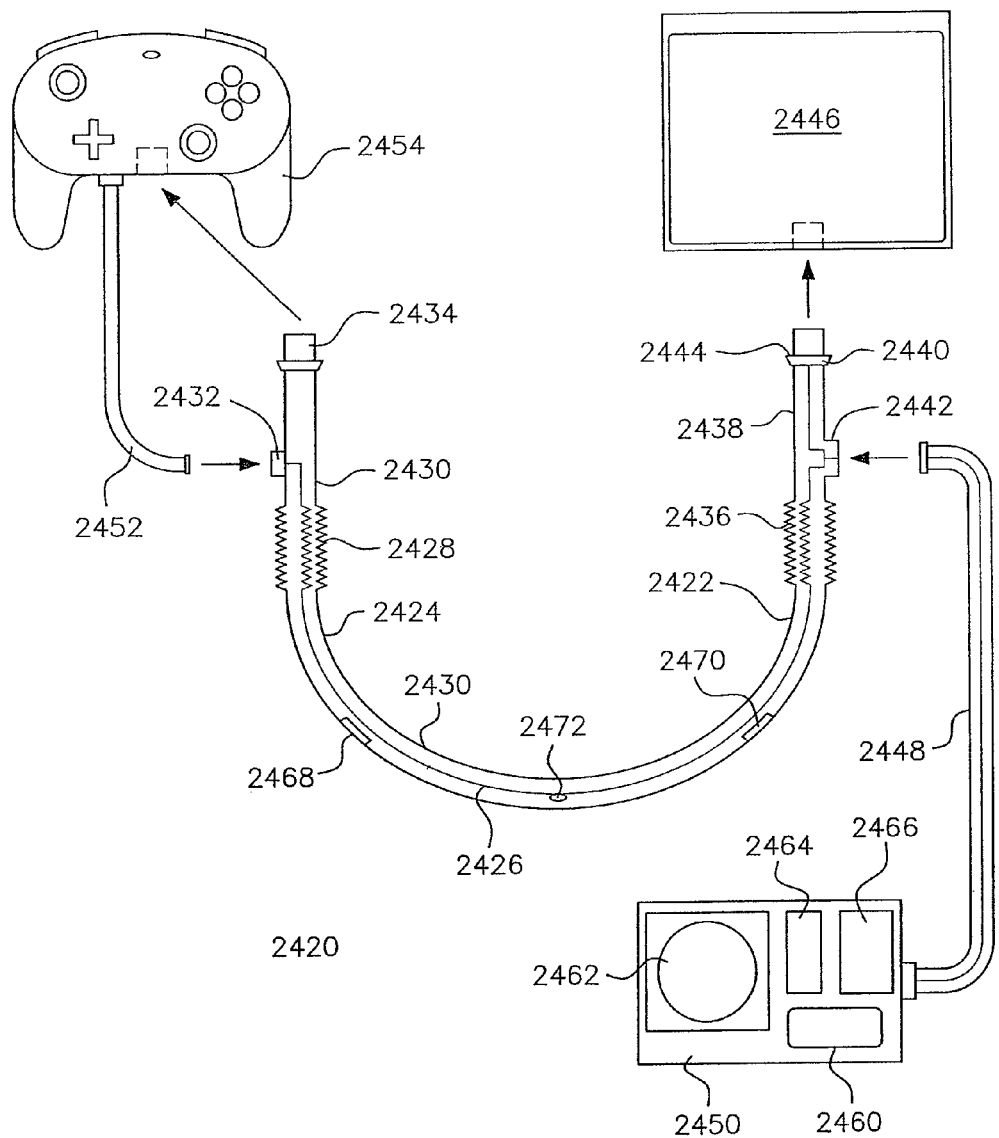

FIG. 59 shows wearable video game 2420 comprising inverted U-shape structure 2430, which in turn comprises right arms 2422 and left arm 2424, connected by central portion 2426. Left arm 2424 has extendable portion 2428 and flexible portion 2430. Flexible portion 2430 has electrical connector 2432 and terminates in mechanical male holder 2434. Electrical connector 2432 is removably connected to cable 2452 of game control 2454. Right arm 2422 has extendable portion 2436, and flexible portion 2438. Flexible portion 2438 has electrical connectors 2440 and 2442. Connector 2440 is disposed at the end of portion 2438 jointly with mechanical holder 2444, and is removably connected to display 2446. Electrical connector 2442 is preferably disposed at the right side of portion 2438 and is removably connected to cable 2448 of electronic box 2450. Wire 2426 is disposed on or within structure 2430, and connects game control 2454 via cable 2452 and connector 2432 to electrical connector 2442, with said connector 2442 being connected to electronic box 2450. A wire is disposed on or within portion 2438, and connects display 2446 to electrical connector 2442. Electrical connector 2442 connects both display 2446 and game control 2454 to electronic box 2450 via cable 2448 for operation of the system and power supply. Box 2450 preferably includes central processing unit/co-processor 2460, disc drive 2462 (or any drive or system to read a memory medium), and memory area 2464, in addition to a power source 2466. Structure 2430 includes pockets 2468 and 2470 for separate ear buds, or alternatively one jack 2472 for removably connecting an ear bud assembly. Single jack 2472 is included to allow the use of prior art ear bud assemblies which have a single plug for two ear buds.

It is understood that any wearable article of the present invention can have one single jack, as provided by devices of prior art, in order to allow use of ear bud assemblies of the prior art in the electronic wearable articles of the present invention.

Figure 60:
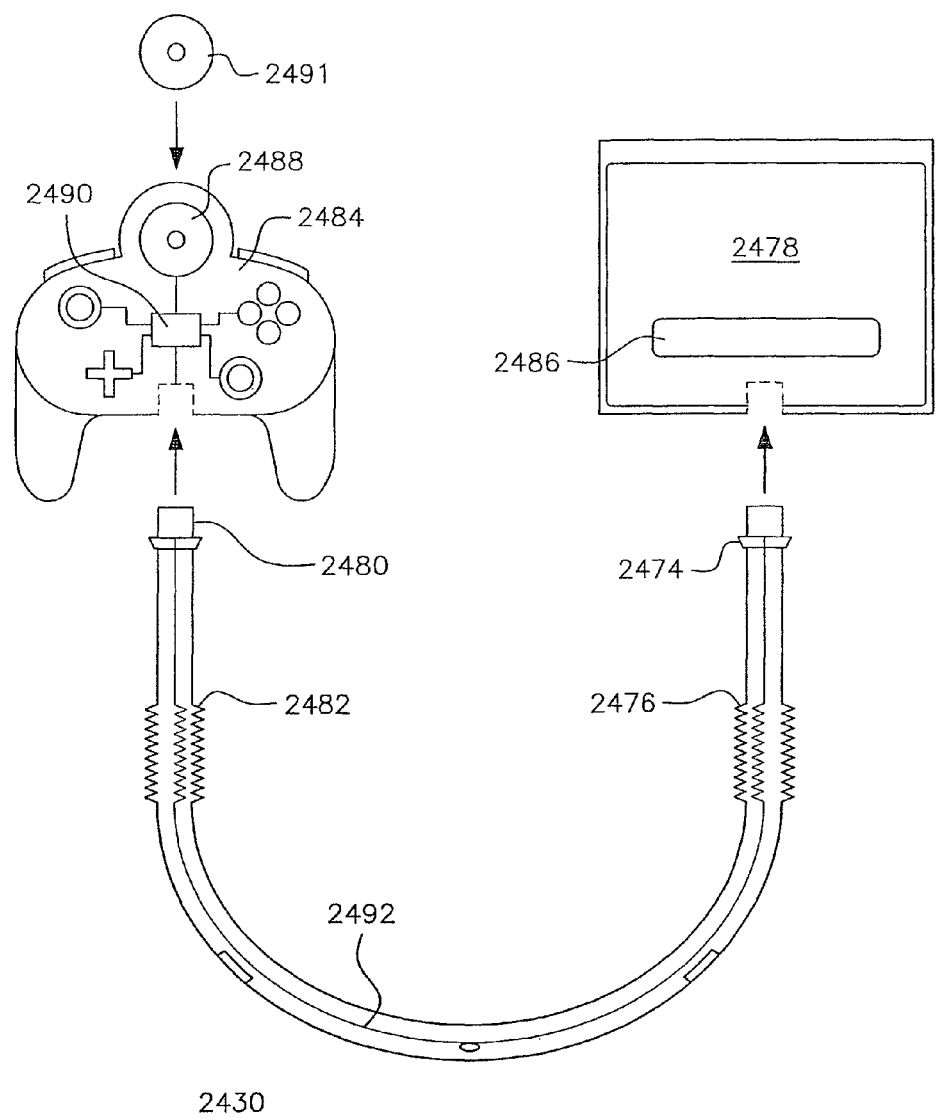

FIG. 60 is a modified embodiment of the video game of FIG. 59 and includes structure 2430, having only one electrical connector 2474 in right arm 2476, which is removably connected to display 2478. Structure 2430 also has electrical connector 2480 in left arm 2482. Connector 2480 is removably connected to game controller 2484. In this embodiment the electronic box is eliminated, and the electronics and power source are distributed evenly between controller 2484 and display 2478 so that each has a similar weight. Display 2478 preferably houses power source 2486, and controller 2484, preferably houses disc reader 2488, as well CPU/co-processor 2490, memory and other circuits (not shown); Controller 2484 receives and reads disc 2490, being operationally connected with display 2478 and power source 2486 through connectors 2474 and 2480 and wire 2492.

The present invention teaches methods and devices that allow a plurality of hand held devices to be hands free. It is understood that the wearable electronic articles of the present invention can be operable from a motor vehicle 12 VDC cigarette plug accessory voltage or AC outlet through cords, and the electronic wearable articles can be charged when not in use. It is also understood that the communications between parts are preferably wired, but can also be wireless. It will also be understood that advances in the biological and electronic fields can be advantageously used in accordance to the invention. The invention teaches wearable electronic devices, which means the device is worn on the body and by being electronic requires electrical energy. Since the invention teaches such wearable electronic devices, and further considering that the human body is an electric circuit and that in order to take advantage of the electrical current in the body it is necessary to touch the body, the wearable electronics in the resting position by touching a large area of the body can be adapted to be recharge based during touching the body. Likewise the connecting arm between right and left arm by touching the body can work as an electrical circuit, and thus no wires connecting right and left arm are necessary.

Figure 61:
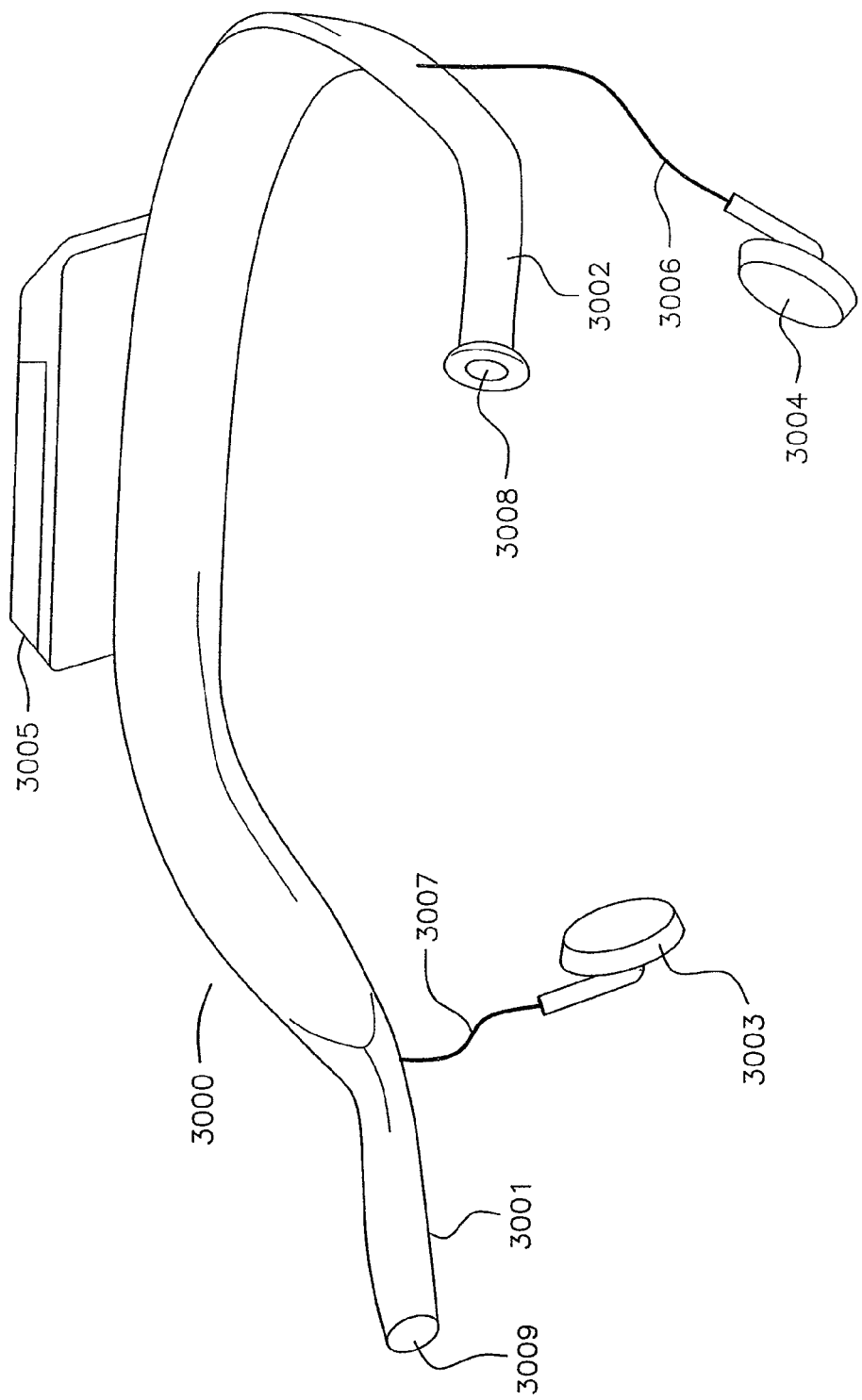
FIG. 61 illustrates a storage cord according to the present invention.

FIG. 61 shows a perspective view of an embodiment of a storage cord according to the invention. Storage cord 3000 comprises sleeves 3001 and 3002, ear buds 3003 and 3004, and electronics package 3005. As described previously in connection with other embodiments, electronics package 3005 is electrically connected to ear buds 3003 and 3004. Electronics package 3005 is also optionally connected to storage cord 3000 using a retractable cord (not shown). When electronics package 3005 is moved from its position on storage cord 3000 so that it can be brought into the user's visual axis, it remains loosely attached to storage cord 3000 with the retractable cord. This facilitates replacement of electronics package 3005 onto storage cord 3000. Preferably, movement of electronics package 3005 relative to storage cord 3000 does not result in movement of wires 3006 and 3007—connecting ear buds 3003 and 3002—relative to storage cord 3000. That is, wires 3006 and 3007 are anchored onto storage cord 3000. Therefore, when electronics package 3005 is moved (whether or not it is attached with a retractable cord), the ear buds will not be pulled from the user's ears.

Sleeves 3001 and 3002 are preferably made of an elastomeric material—such as rubber or neoprene—so that they can be removably, but securely attached, to the temples of a pair of eyeglasses. Openings 3008 and 3009 are sized so that they will fit snugly onto eyeglass temples, and preferably will be from 2 mm to 15 mm in diameter, more preferably between 5 and 12 mm. In one preferred embodiment, storage cord 3000 will be attached to a pair of eyeglasses. Alternatively, as will be described in more detail below, openings 3008 and 3009 can be attached to temple-like appendages located on other wearable articles, such as hats, or other objects, such as walls, or airline food trays.

Figure 62:
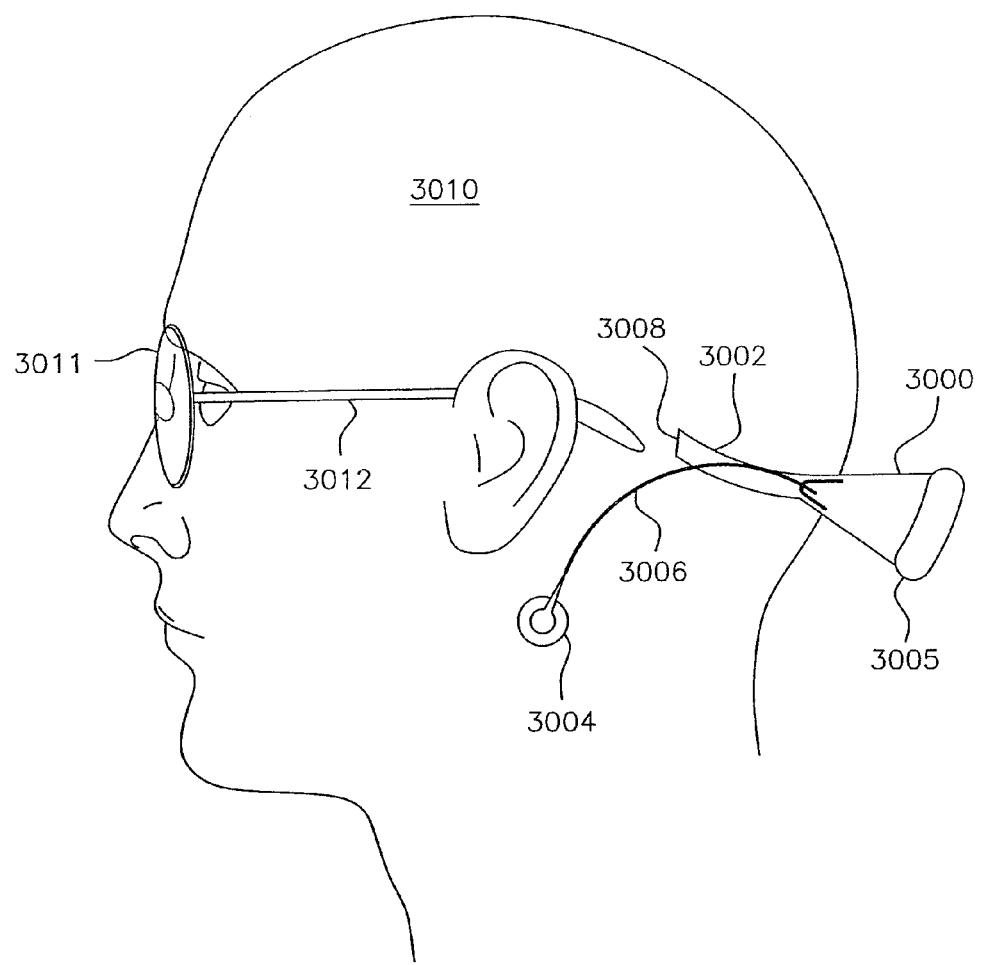

FIG. 62 shows storage cord 3000 of FIG. 61 as it is about to be worn by user 3010. User 3010 is wearing eyeglasses 3011, which have temple 3012. Storage cord 3000 is positioned so that opening 3008 of sleeve 3002 is poised to slip over the end of temple 3012.

Figure 63:
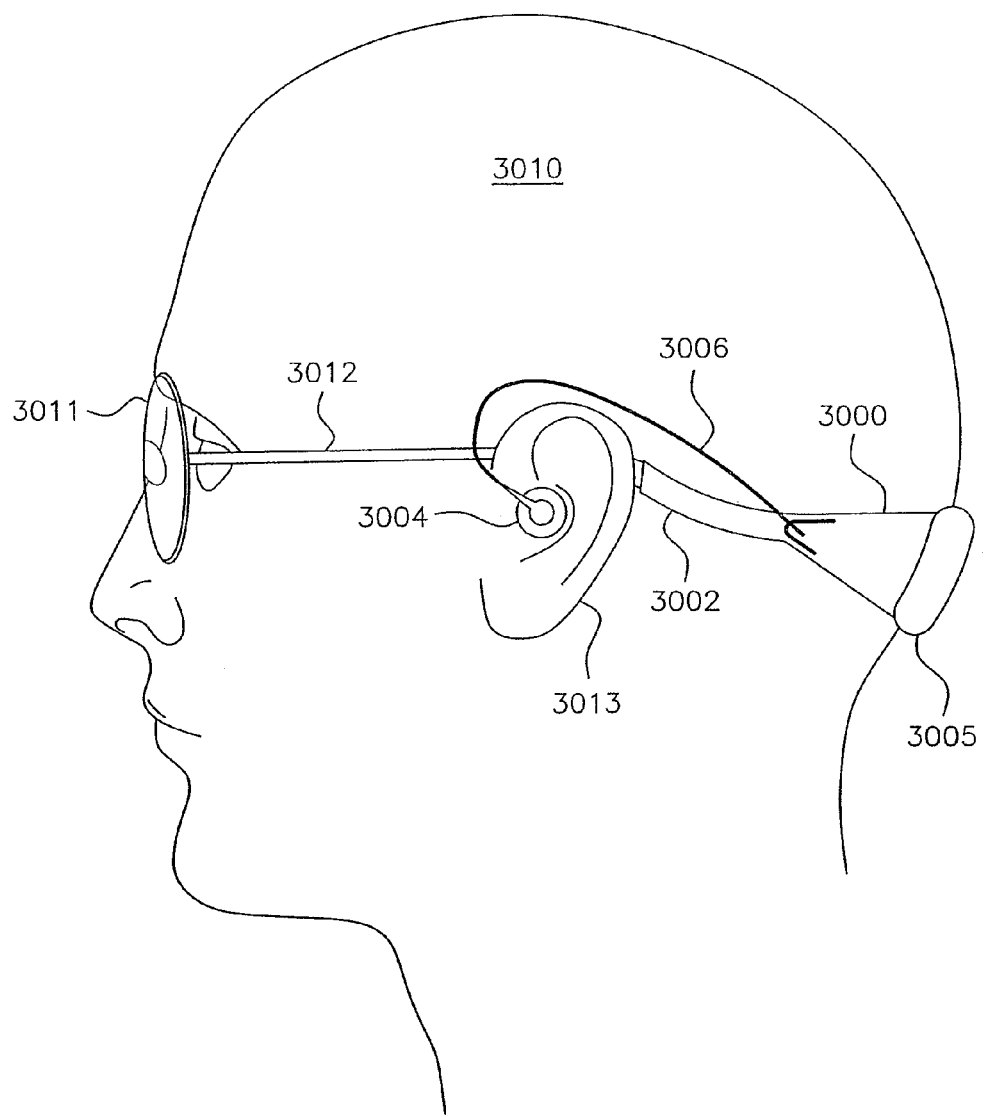

FIG. 63 shows storage cord 3000 of FIG. 61 being worn and used by user 3010. Sleeve 3002 has been attached to temple 3012, holding storage cord 3000 in place behind the head of user 3010. Ear bud 3004 has been positioned over ear 3013, allowing user 3010 to hear sound transmitted from electronics package 3005.

Figure 64:
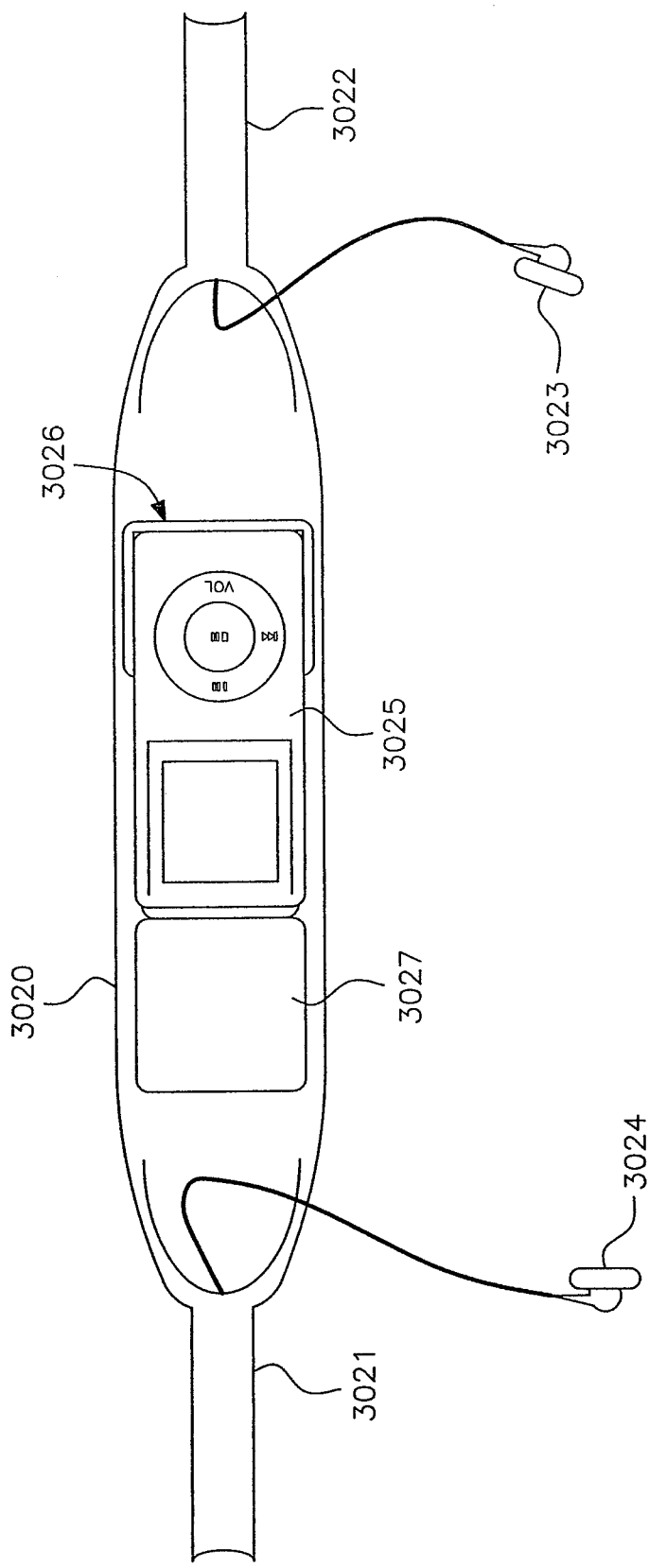

FIG. 64 shows a planar view of a storage cord according to the invention. Storage cord 3020 has sleeves 3021 and 3022, and ear buds 3023 and 3024. Electronics package 3025 (shown in this embodiment as an iPod) is releasably attached to storage cord 3020. The attachment is both mechanical and electrical. The mechanical attachment means in this embodiment is velcro (not shown), which is positioned on storage cord 3020 underneath electronics package 3025. Electronics package 3025 is further mechanically and releasably attached to storage cord 3020 with attachment frame 3026. Attachment frame 3026 is made of hard material, preferably a hard plastic, and is sized so that electronics package 3025 can slip inside of it, with the top edges of attachment frame 3026 slightly overlapping the edges of electronics package 3025 and holding it in place. Electronics package 3025 is electrically attached to storage cord 3020 by means of a retractable cord (not shown). The retractable cord is held in pocket 3027, preferably on a spool (not shown). Ear buds 3023 and 3024 are electrically connected to electronics package 3025 using wires (not shown) which converge inside pocket 3027.

Figure 65:
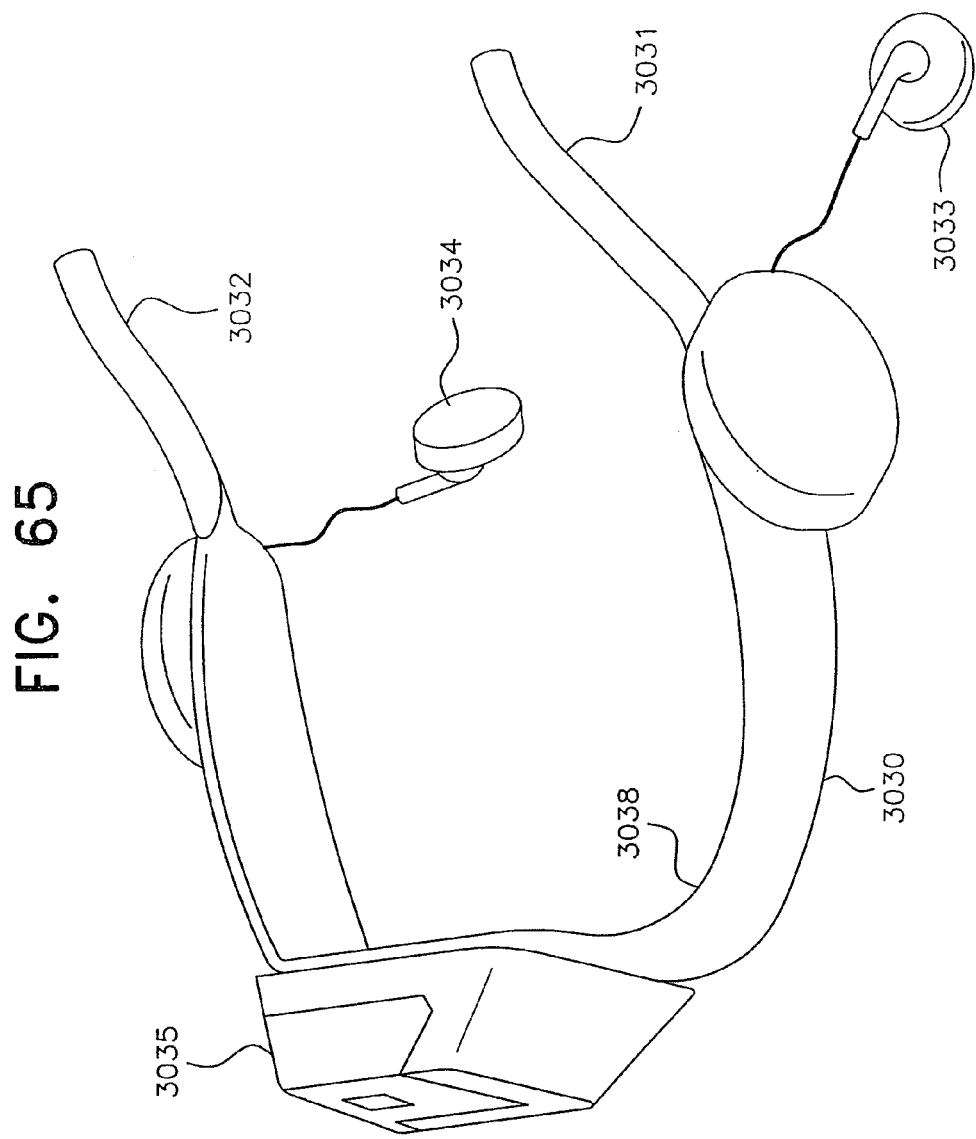

FIG. 65 shows a perspective view of another embodiment of a storage cord according to the invention. Storage cord 3030 comprises sleeves 3031 and 3032, ear buds 3033 and 3034, and electronics package 3035. Storage cord 3030 further comprises storage pockets 3036 and 3037, which are used for storing ear buds 3033 and 3034. It will be understood that sleeves 3031 and 3032 need not be made of the same material as main body 3038 of storage cord 3030, though they can be. For example, main body 3038 might be made of leather, while sleeves 3031 and 3032 could be made of neoprene.

Figure 66:
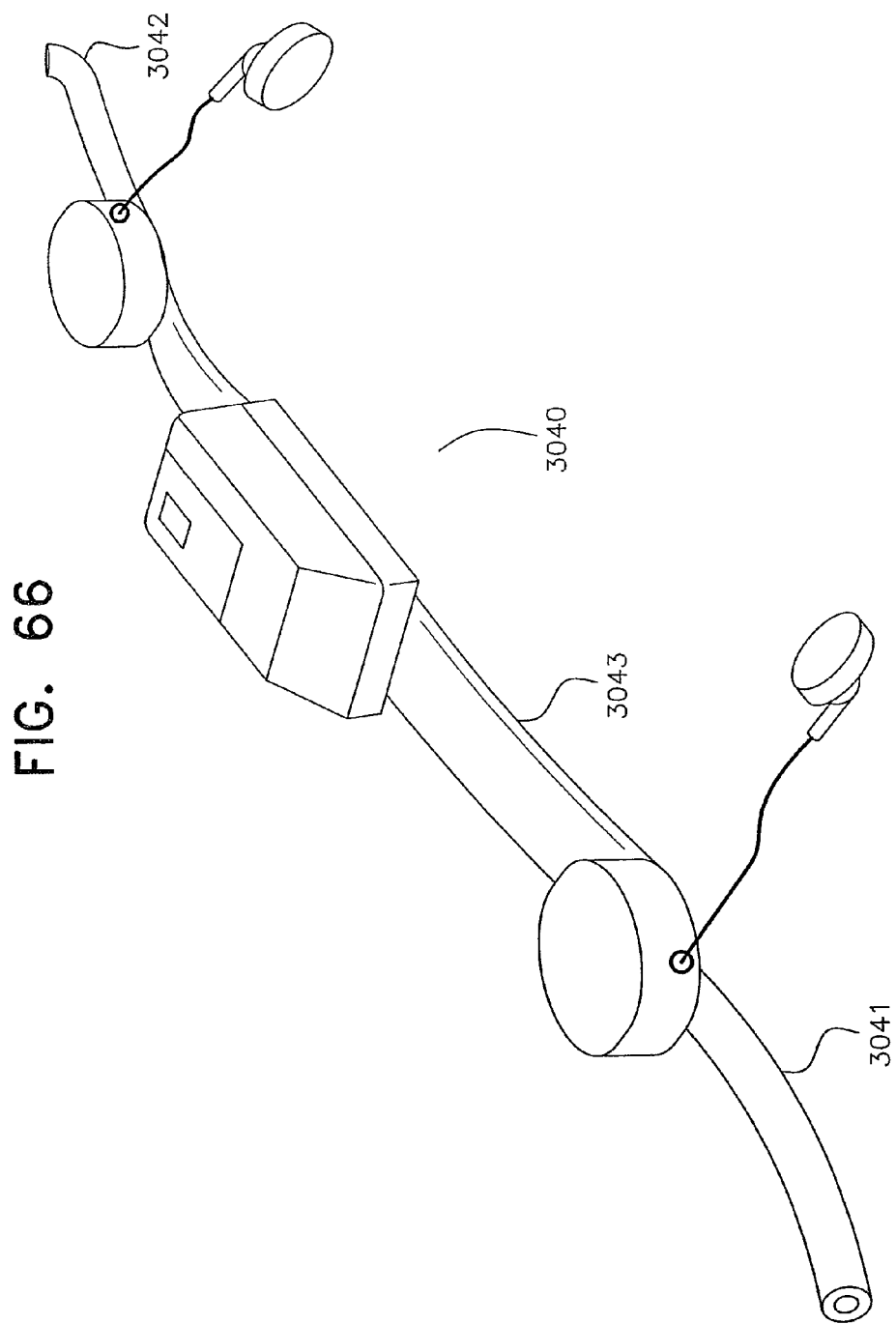

FIG. 66 shows a perspective view of another embodiment of a storage cord according to the invention. In this embodiment, storage cord 3040 is made of two materials. Sleeves 3041 and 3042 are made of a elastomeric material, such as neoprene or rubber. Main body 3043 is made of metal, which gives storage cord 3040 a more formal appearance, making it suitable for use while wearing formal attire. Ear buds 3044 and 3045—which are electrically connected with electronics package 3048—are retained in spools 3046 and 3047, which are permanently attached to storage cord 3040, preferably partially on sleeves 3041 and 3042 and partially on main body 3043. It will be understood that in this embodiment, as in other embodiments, the ear buds may be connected to the storage cord with articulated arms, rather than wires.

Figure 67:
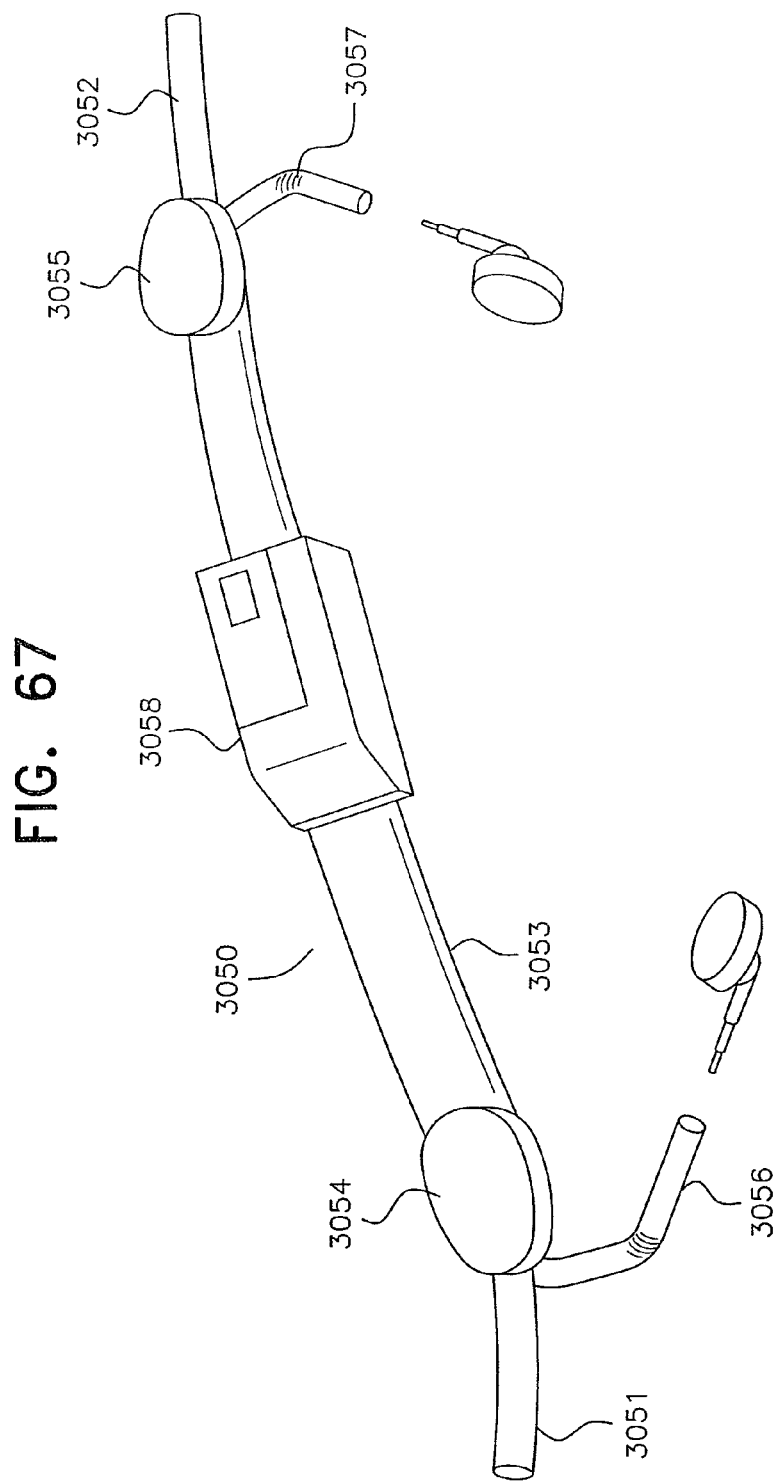

FIG. 67 shows a perspective view of another embodiment of a storage cord according to the invention. Like the embodiment of FIG. 66, storage cord 3050 is made of two materials. Sleeves 3051 and 3052—made of an elastomeric material—and main body 3053—made of metal—are joined by joining pieces 3054 and 3055. Articulated arms 3056 and 3057 are electrically connected to electronics package 3058. Ear buds 3059 and 3060 are removably, electrically connected to articulated arms 3056 and 3057. Thus, when not in use, the ear buds can be removed from the storage cord, and therefore be kept out of sight.

FIG. 68 shows the construction of a portion of a storage cord according to the invention. Storage cord 3061 is made of a single piece of neoprene 3062. Sleeves 3063 and 3064 are made by sewing together the edges of neoprene 3062 with stitches 3065. Electronics package 3066 is secured on the portion of neoprene 3062 which is not sewn together. Thus, stitches 3065 and electronics package 3066 are on the same side of neoprene 3062. Therefore, when storage cord 3061 is worn by a user, both electronics package 3066 and stitches 3065 face away from the user's skin, minimizing any discomfort felt by the user. Storage cord 3061 does not show any ear buds.

FIG. 69 shows a portion of the storage cord of FIG. 68. Ear bud 3067 is electrically connected to electronics package 3066 by wire 3069. Ear bud 3067 is stored by pushing it partially inside hollow sleeve 3063. Microphone 3068 is connected to wire 3069, so that when ear bud 3067 is placed in the user's ear, microphone 3068 can pick up the user's voice and transmit it to electronics package 3066 (in this case, a cell phone).

Figure 70:
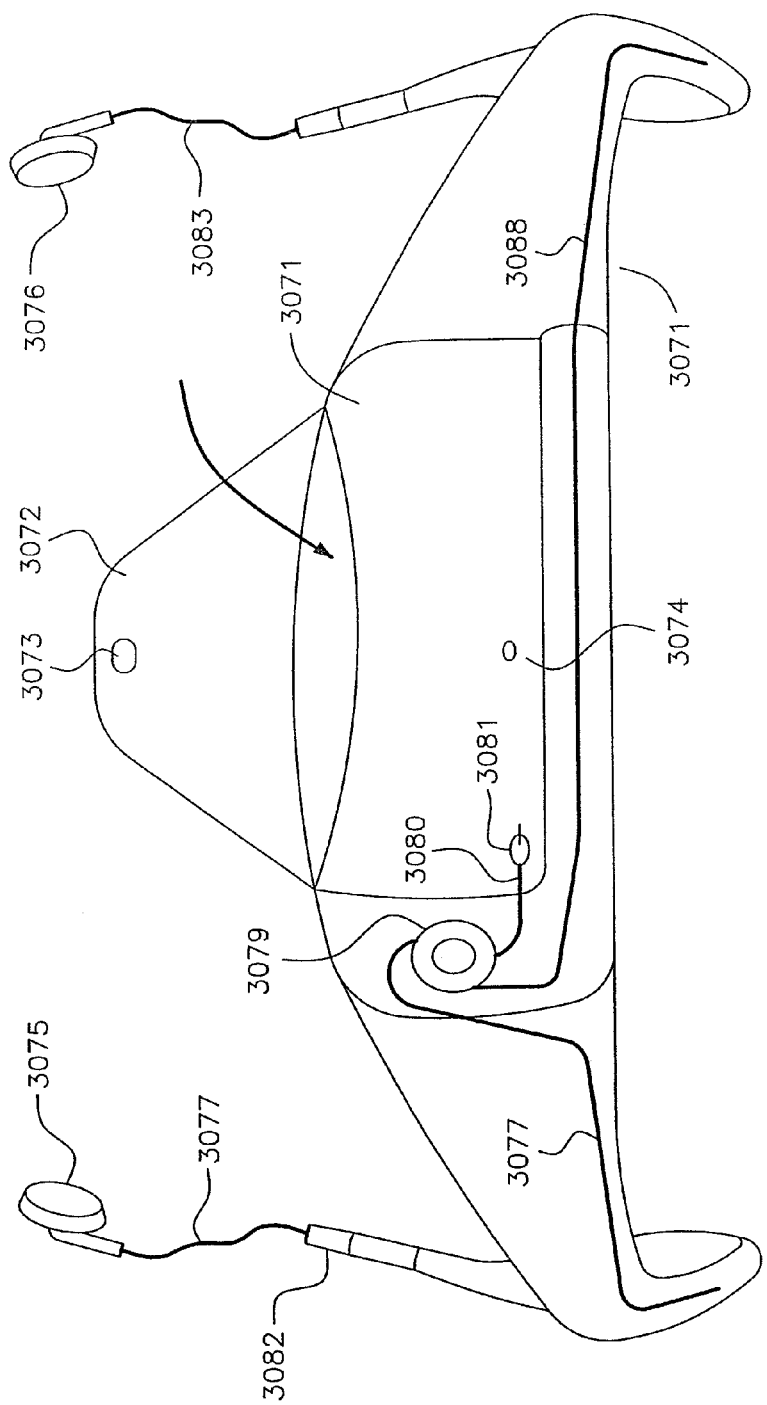

FIG. 70 shows a perspective view of another embodiment of a storage cord according to the invention. In this embodiment, the electronics package (not shown) is secured in pocket 3070 of storage cord 3071. Pocket 3070 is closed by flap 3072, which is secured by buttons 3073 and 3074. Once the electronics package is placed into pocket 3070, it is electrically connected to ear buds 3075 and 3076 by wires 3077 and 3078. Wires 3077 and 3078 run from ear buds 3075 and 3076 through spool 3079, where they are electrically connected to wire 3080. Wire 3080 runs from spool 3079 through electrical connector 3081, which is connected to the electronics package. Storage cord 3071 may be connected to a pair of eyeglasses (or temple-like connectors) using sleeves 3082 and 3083.

Figure 71:
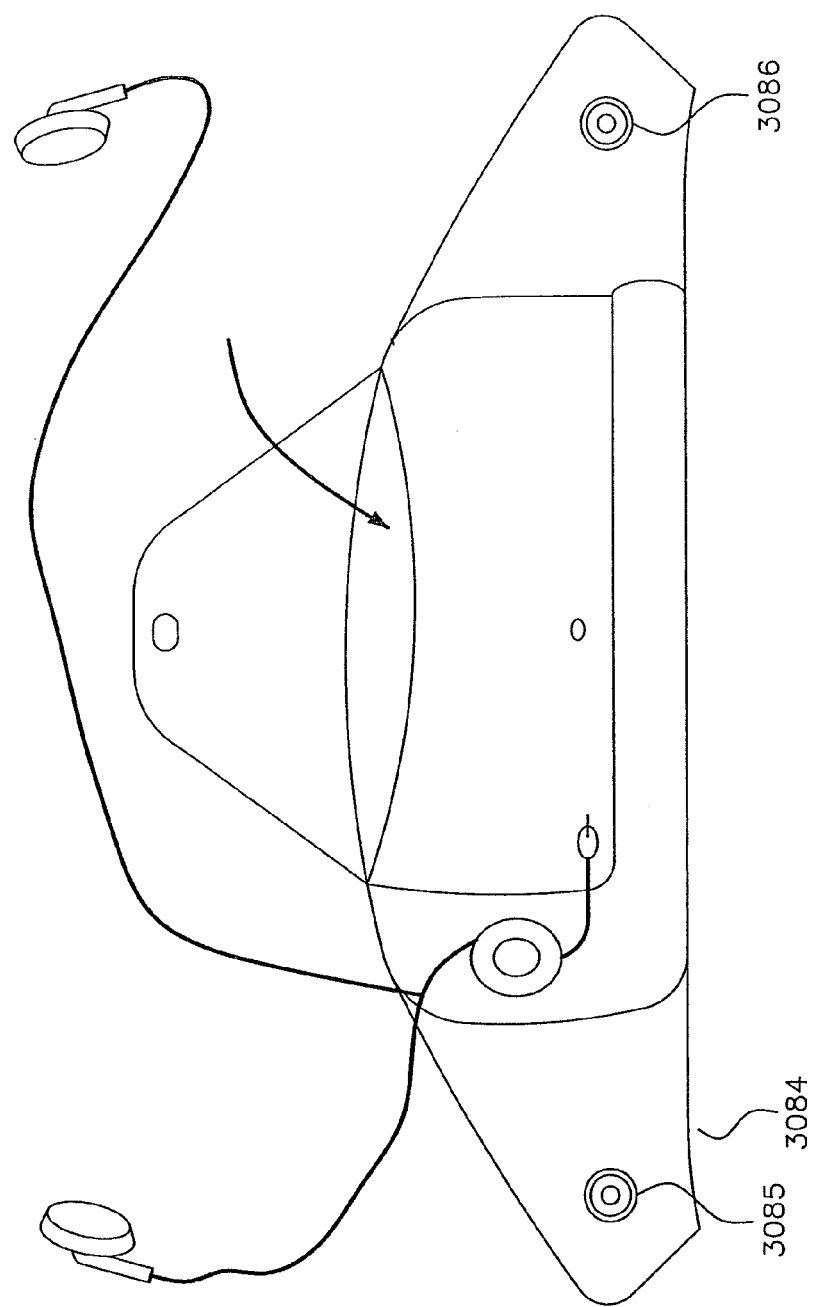

FIG. 71 shows an embodiment of a storage cord according to the invention which is similar to the embodiment shown in FIG. 70. The difference is that storage cord 3084 is attached to a wearable article by attaching snaps 3085 and 3086 to complementary snaps on the wearable article. The wearable article might be, for instance, a hat, or a jacket. Alternatively, snaps 3085 and 3086 can be attached to complementary snaps on another article, such as airline tray, or a wall. In this embodiment, storage cord 3084 does not have sleeves for attaching to a pair of eyeglasses.

Figure 72:
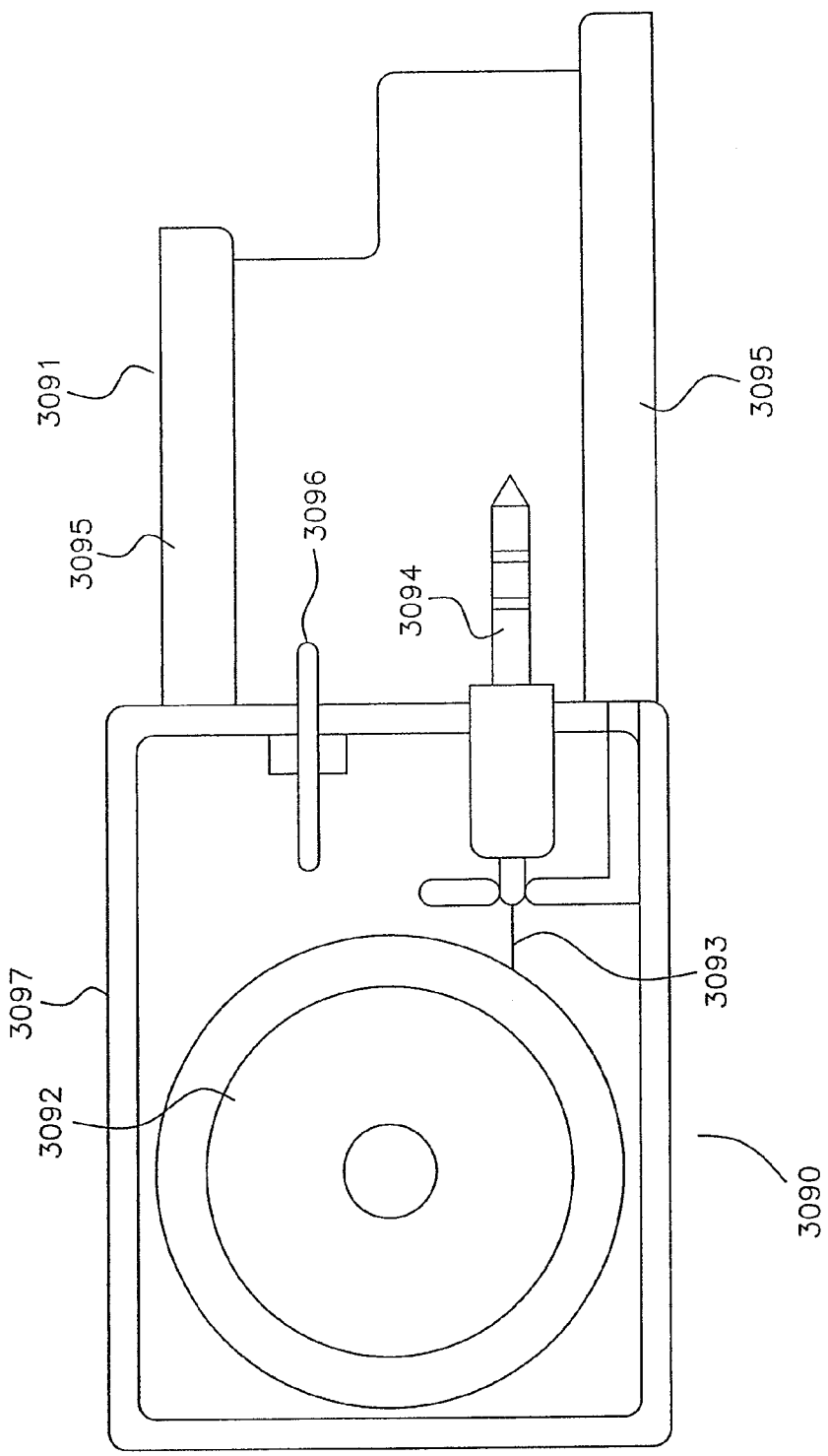

FIG. 72 shows a schematic diagram for a storage frame according to the invention. Storage frame 3090 comprises structure 3091 and spool holder 3097. Spool 3092 is located inside spool holder 3097, and holds wire 3093. Wire 3093 terminates in connector 3094, which is adapted to connect to an electronics package (not shown). Connector 3094 can be either an electrical connector or simply a mechanical connector. Spool 3092 can also hold wires connected to ear buds. Structure 3090 is shaped to receive an electronics package, with the top edges of the electronics package sliding under rims 3095. Electrical connector 3094 plugs into an electronics package. Stabilization pin 3096 is adapted to fit into a hole in the electronics package, and helps stabilize the electronics package in structure 3090. In one embodiment, shown in FIG. 73a, the electronics package is electrically connected to ear buds (not shown) through spool 3092. In another embodiment, the connection is only mechanical, with sound or data being transmitted wirelessly from the electronics package.

Storage frame 3090 is attached to a storage cord according to the invention. When the user wishes to look at the electronics package, he or she can slide it out of structure 3091 and bring it within his or her sight, with wire 3093 being extended from spool 3092 to maintain contact with the electronics package. When spool 3092 retracts, it pulls the electronics package back into structure 3091.

This is illustrated in FIG. 73a, in which electronics package 3098 is electrically connected to storage frame 3090 through connector 3094. Ear buds 3099 and 3100 are connected by wires 3101 and 3102 to printed circuit board 3103. A wire from printed circuit board to spool 3092 allows ear buds 3099 and 3100 to be electrically connected to electronics package 3098, via wires 3101 and 3102, printed circuit board 3103, wire 3104, spool 3092, wire 3093 and connector 3094. Stabilization pin 3096 is inserted into cavity 3105 of electronics package 3098.

FIG. 73b shows the embodiment of FIG. 73a, except that electronics package 3098 has been pulled out of storage frame 3090. As electronics package 3098 is pulled away from storage frame 3090, wire 3193 is pulled out from spool 3092. However, because wires 3101 and 3102 are anchored by printed circuit board 3103, ear buds 3099 and 3100 are not pulled from the user's ears.

FIG. 74a shows an alternative embodiment of a storage frame according to the invention. In this embodiment, electronics package 3106 is electrically and mechanically connected to storage frame 3107 by connector 3108. Connector 3108 is connected to ear buds 3109 and 3110 via coiled wire 3113, printed circuit board 3114, and wires 3111 and 3112.

When electronics package 3106 is pulled away from storage frame 3107, as shown in FIG. 74b, coiled wire 3113 uncoils (extends). However, printed circuit board 3114 anchors wires 3111 and 3112, so that they do not pull away ear buds 3109 and 3110 from the user's ears.

When an electronics package is pulled away from a storage cord according to the invention, tension can be placed on the retractable wire connecting it to the storage cord. This means there is a risk that the retractable wire might pull the connector plug out of the electronics package. Therefore, it will be helpful to have a means for securing the connector in the electronics package. FIG. 75a shows connector stabilizer 3115, which is cross-shaped, and has clip 3116 for securing connector pin 3117 from a storage cord according to the invention. Arms 3118, 3119, 3120, and 3121 of stabilizer 3115 are secured to the sides of electronics package. This is illustrated in FIG. 75b, where the edge of electronics package 3122 is secured by arm 3123. In one embodiment, the dimensions of connector stabilizer 3115 can be varied so that it can be secured to electronics packages of varying dimensions. It will be appreciated by those of skill in the art that the cross-shape of connector stabilizer 3115 is only a preferred embodiment; other shapes are also possible, with the only requirement being that the device be securable to an electronics package and be capable of securing a connection pin. FIG. 75d shows more details of a clip which is part of connector stabilizer 3125. Holder arms 3116a embrace connector 3126.

FIG. 75c shows electronics package 3124 attached to connector stabilizer 3125, which secures connector 3126 to electronics package 3124. Connector 3126 is attached to spool 3127 by wire 3128. Connector stabilizer 3125 prevents the tension in wire 3128 from pulling connector 3126 out of electronics package 3124.

Figure 76:
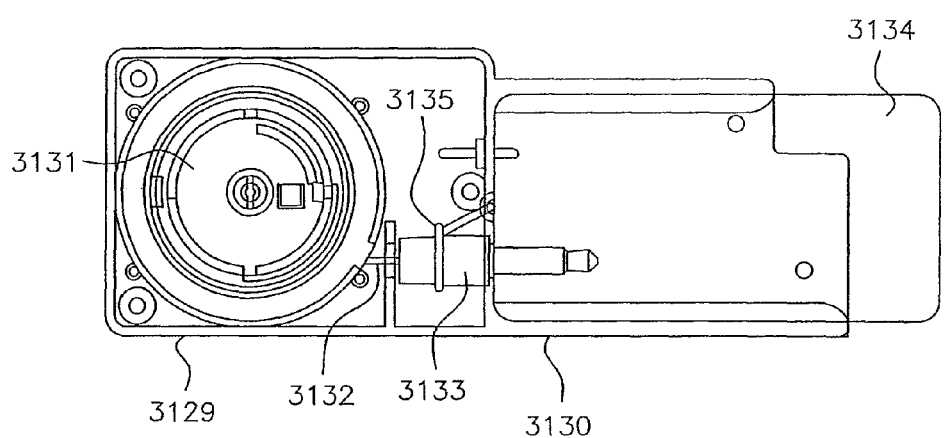
Figure 76A:
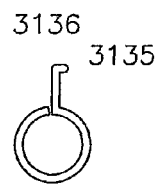

An alternative embodiment of a connector stabilizer is shown in FIG. 76. FIG. 76 shows spool housing 3129 and structure 3130. Spool 3131 contains wire 3132, which is connected to connector 3133, which is shown plugged into electronics package 3134. Stabilizing loop 3135 is placed around connector 3133. Stabilizing loop 3135, shown in more detail in FIG. 76a, has a small hook 3136, which is used to hook into loop 3137 on electronics package 3134. When properly attached, stabilizing loop 3135 and loop 3137 will absorb the tension in wire 3132, preventing connector 3133 from pulling out of electronics package 3134. It will be understood that other means for stabilizing the connection between the connector and electronics package can be devised, and are within the scope of this invention.

Figure 77:
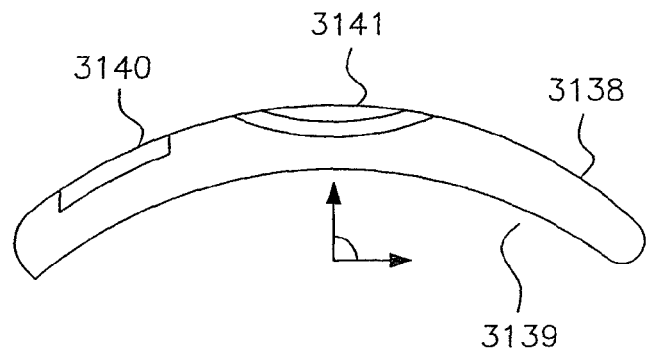
FIGS. 77 and 78 illustrate an anatomically correctly shaped telephone.

FIG. 77 shows an anatomically correctly shaped telephone according to another aspect of the invention. Telephone 3138 can be either a cellular phone or an ordinary cordless phone. Body 3139 is curved, so that it can conform to the shape of a user's head or body. Display 3140 and keypad 3141 are located on the outer curved surface of telephone 3138.

Typically, an anatomically fit device will have the following radii of curvature: 30 cm to 70 cm for head, preferably 50 to 70 cm, and 30 to 50 cm for neck.

Figure 78:
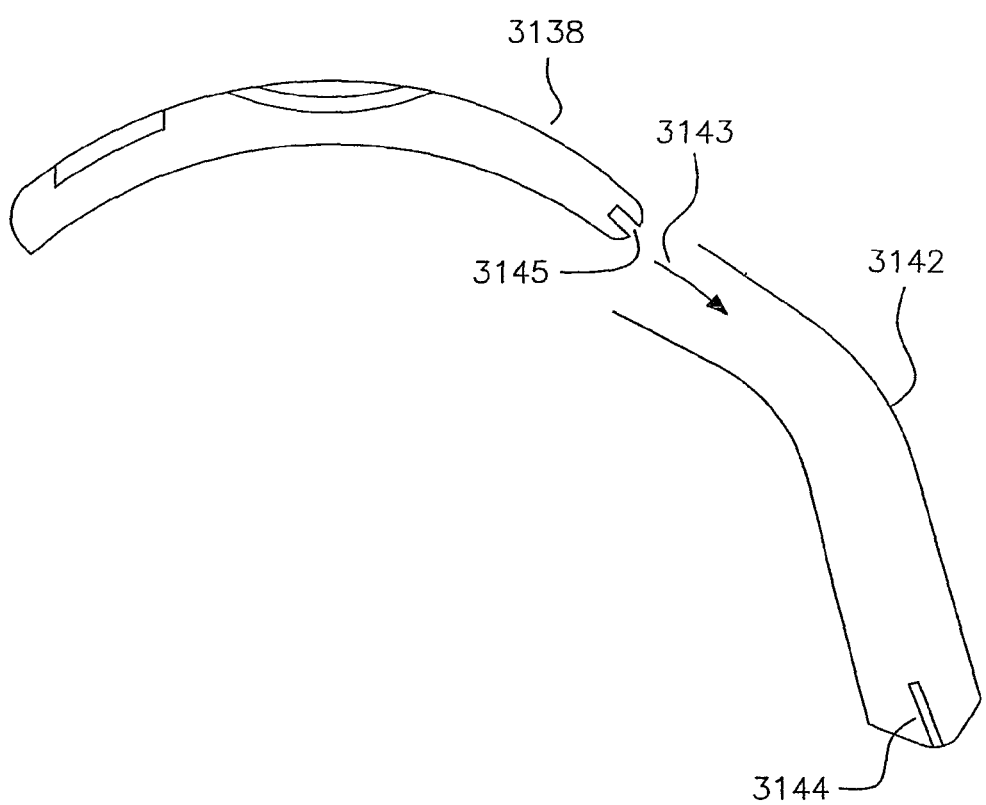

As shown in FIG. 78, telephone 3138 can be slipped into case 3142, as shown by arrow 3143. Case 3142 has electrical connector 3144 located at one end. As telephone 3138 is inserted into case 3142, electrical connector 3144 is inserted into female electrical connector 3145. Case 3142 may be attached to a storage cord according to the invention. In that case, electrical connector 3144 can be electrically connected to other accessories, such as ear buds.

It will be understood that any electronic device, including but not limited to telephones, cameras, and music players, can be manufactured in an anatomically correct shape (i.e. shaped to fit the body).

Figure 79A:
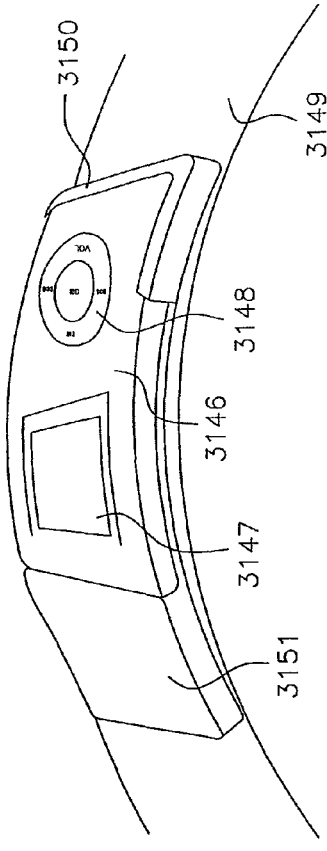

FIG. 79a shows a perspective view of a portion of storage cord according to the invention. Curved digital music player 3146, with display 3147 and controls 3148, is removably attached to storage cord 3149 using structure 3150 and spool holder 3151. Spool holder 3151 can have the same internal structure as described in connection with FIG. 72.

Figure 79B:
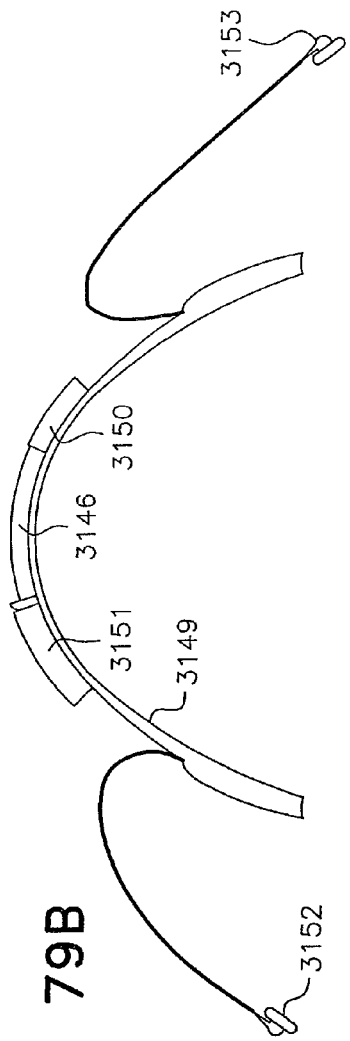
Figure 79C:
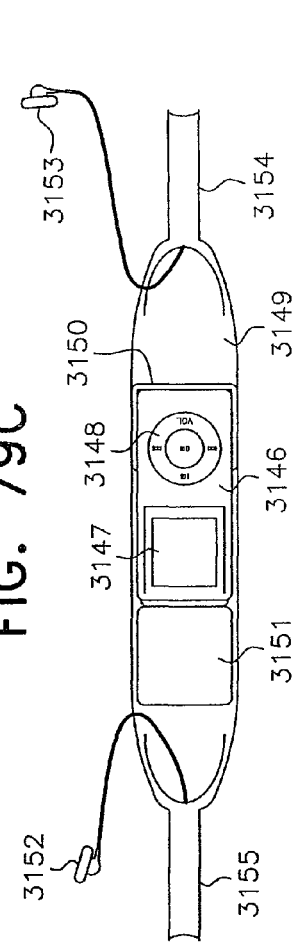

FIGS. 79b and 79c are a side view and a top view respectively of the storage cord of FIG. 79a, showing storage cord 3149, curved digital music player 3146, structure 3150, and spool holder 3151. Digital music player 3146 can be electrically connected to ear buds 3152 and, 3153 through the electrical connections (not shown) in spool holder 3151. Storage cord 3149 can be removably attached to a pair eyeglasses, for example, using sleeves 3154 and 3155.

FIGS. 80a, 80b, and 80c show a perspective view, a side view, and a top view respectively, of another storage cord according to the invention. In this embodiment, curved telephone 3156 is secured on storage cord 3157, using structure 3158 and spool holder 3159. Sleeves 3160 and 3161 may be used to secure storage cord 3157 to a pair of eyeglasses (not shown) or other wearable article or object. Curved telephone 3156 may be electrically connected to ear buds 3162 and 3163 via wires 3164 and 3165, using spools, printed circuit boards, etc. (not shown). Microphone 3166 is mechanically and electrically connected to wire 3165.

FIGS. 81a, 81b, and 81c shows another embodiment of a connection stabilizer according to invention. While similar to the embodiment shown in FIGS. 75a-c, connection stabilizer 3167 comprises a series of arms 3168, 3169, 3170, 3171, and 3172 which are used to wrap around electronics package 3173, as shown in FIG. 81b. Electrical connector 3174 is secured to arm 3172, and therefore held in place when electronics package 3173 is extended using wire 3175, as shown in FIG. 81c.

Figure 82:
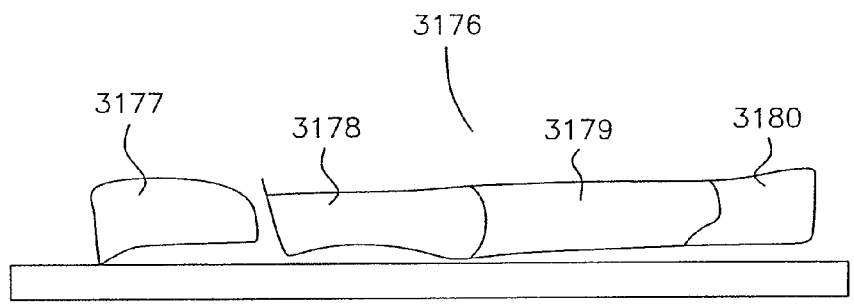
FIGS. 82 and 83 illustrate an anatomically fit electronics package.
Figure 83:
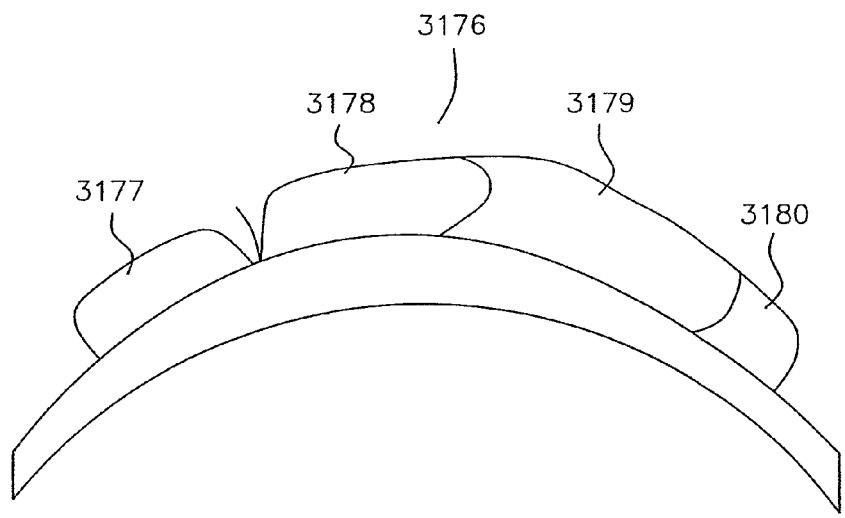
Figure 84A:
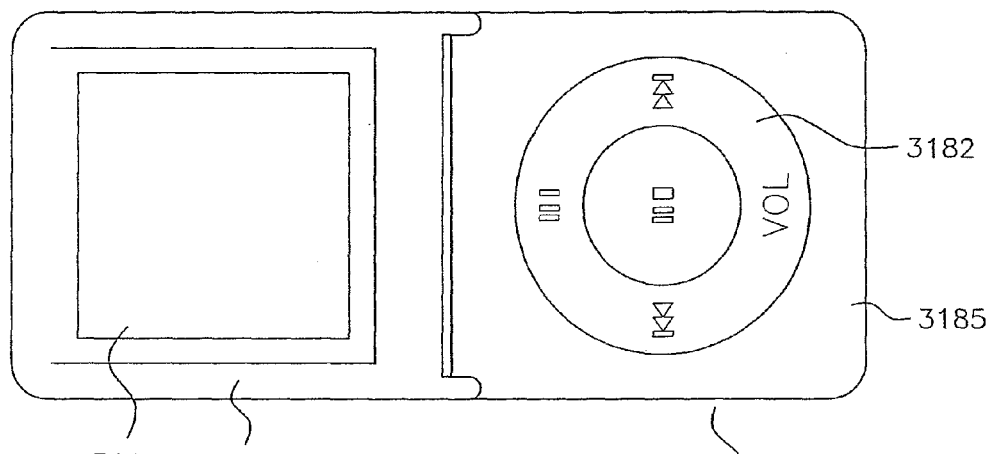
FIGS. 84A through 84D illustrate a flip style digital music player.
Figure 84B:
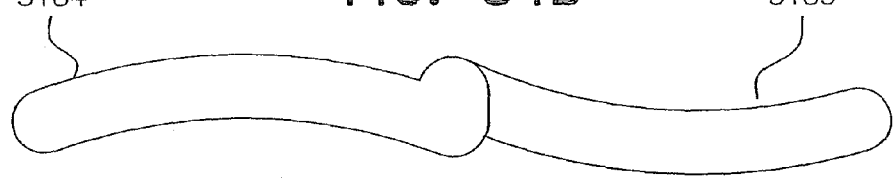
Figure 84C:
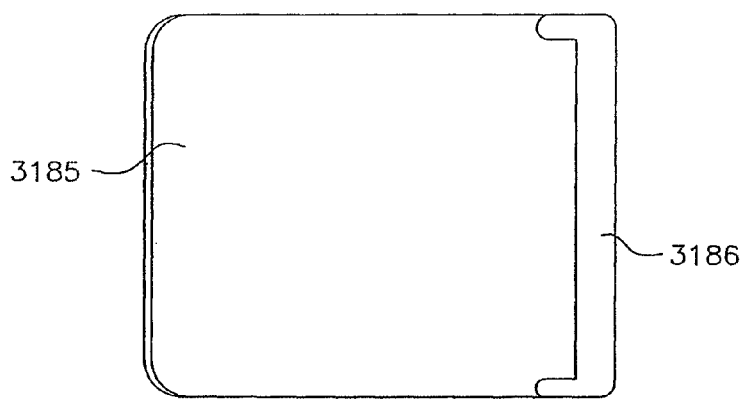
Figure 84D:

FIG. 82 shows a side view of another embodiment of an anatomically fit electronics package according to the invention. In this embodiment, electronics package 3176 comprises separate sections 3177, 3178, 3179, and 3180, which are hinged together. In FIG. 83, electronics package 3176 is "bent," with sections 3177, 3178, 3179, and 3180 hinging apart to create a curved-like, anatomically fit profile.

FIG. 84 shows an anatomically fit, flip-style iPod-type digital music player. Digital music player 3183 comprises sections 3184 and 3185, which are connected by hinge 3186. Display screen 3181 is found on section 3184, and control mechanism 3182 is found on section 3185. Sections 3184 and 3185 may be pivoted around hinge 3186 to provide a compact electronics package.

Figures 86A, 86B, 86C, 86D, 86E:
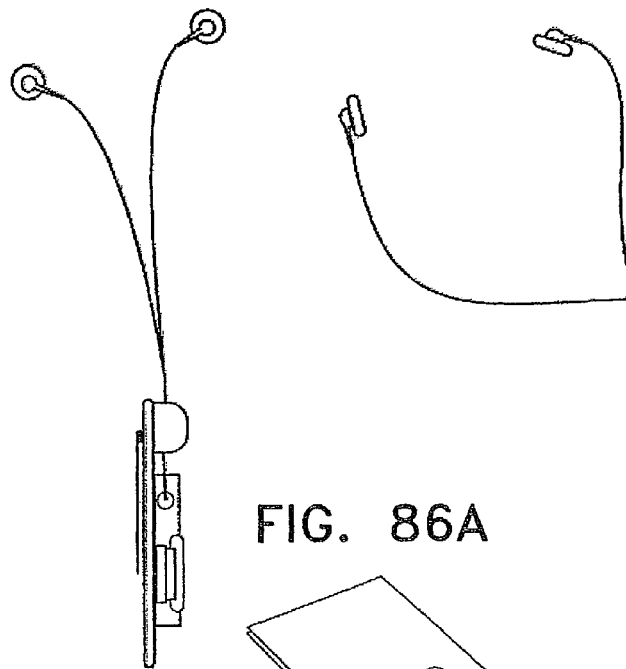
Figures 88A, 88B, 88C:
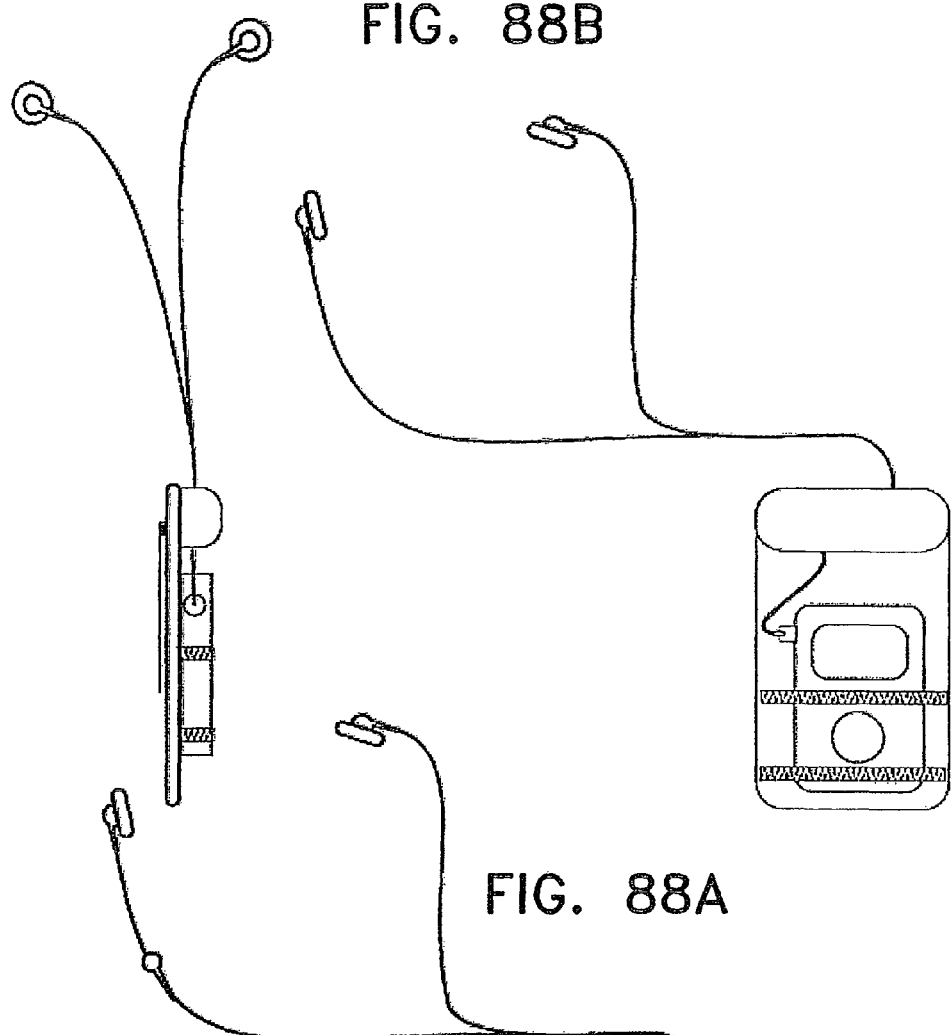

FIG. 85 shows another embodiment of a storage cord according to the invention. In this embodiment, the storage cord is secured to the user by means of clip 3187. FIG. 86 shows a variation on the storage cord of FIG. 85, where the electronics package is secured to the storage cord with clamps. The clamps can be adjusted to fit different sized electronics packages. It will be understood that other means for securing the electronics package to the cord may also be used, as shown in FIGS. 87, 88, and 89.

Figure 90:
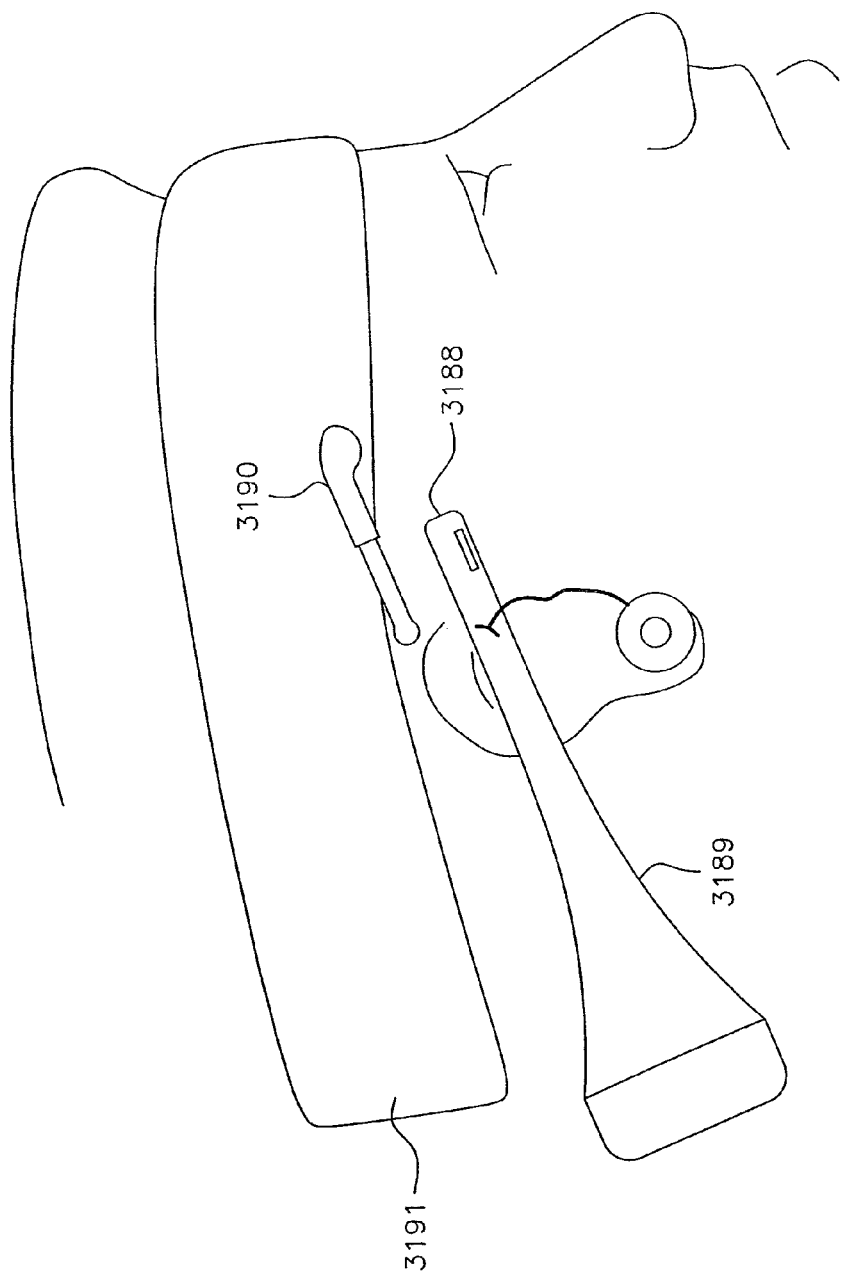
FIGS. 90 and 91 illustrate a storage cord mounted on a headband.
Figure 91:
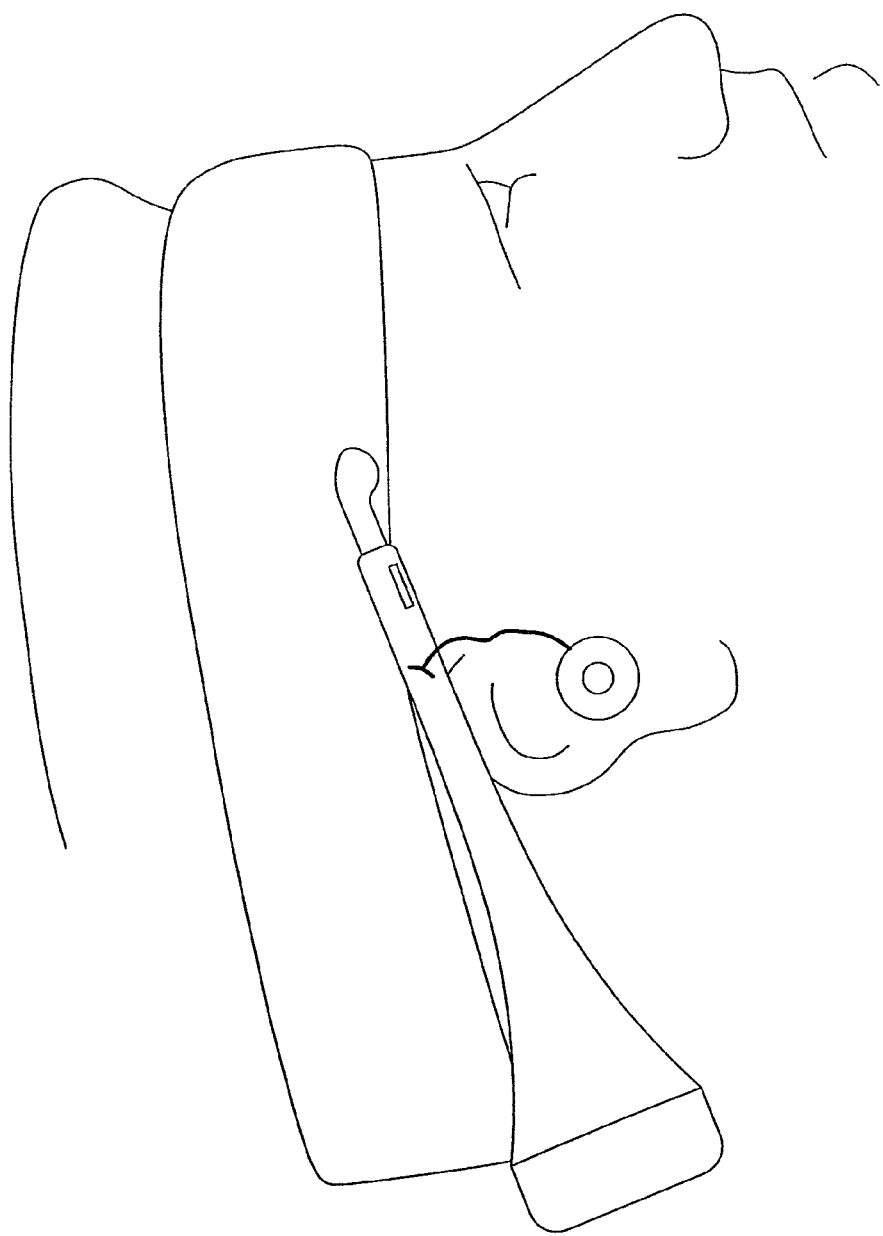

FIG. 90 shows a perspective view of another embodiment of a storage cord according to the invention. In this embodiment, sleeve 3188 of storage cord 3189 is attached to securing means 3190, which is this case is attached to headband 3191. Securing means 3190, preferably shaped like the end of an eyeglass temple, may be either permanently or removably attached to headband 3191. This embodiment is shown in connected form in FIG. 91.

Figure 91A:
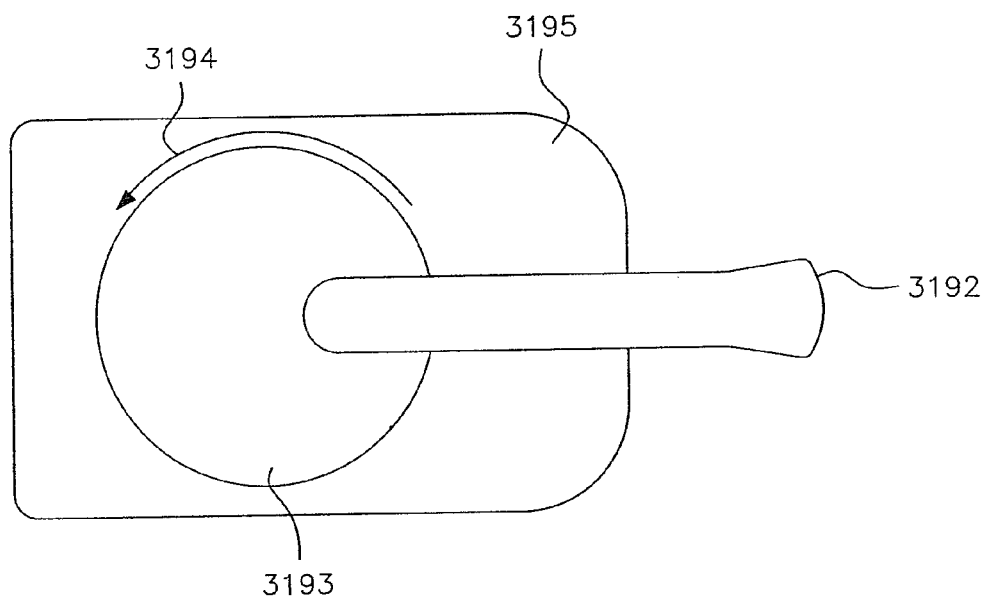
Figure 91B:
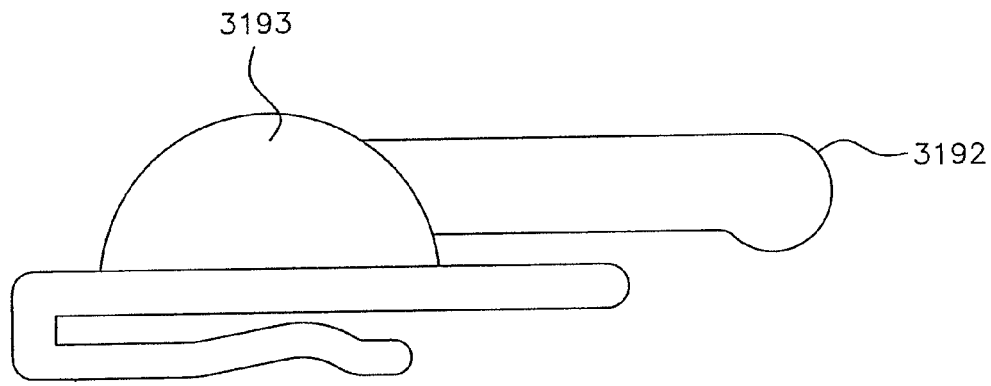
Figure 93:
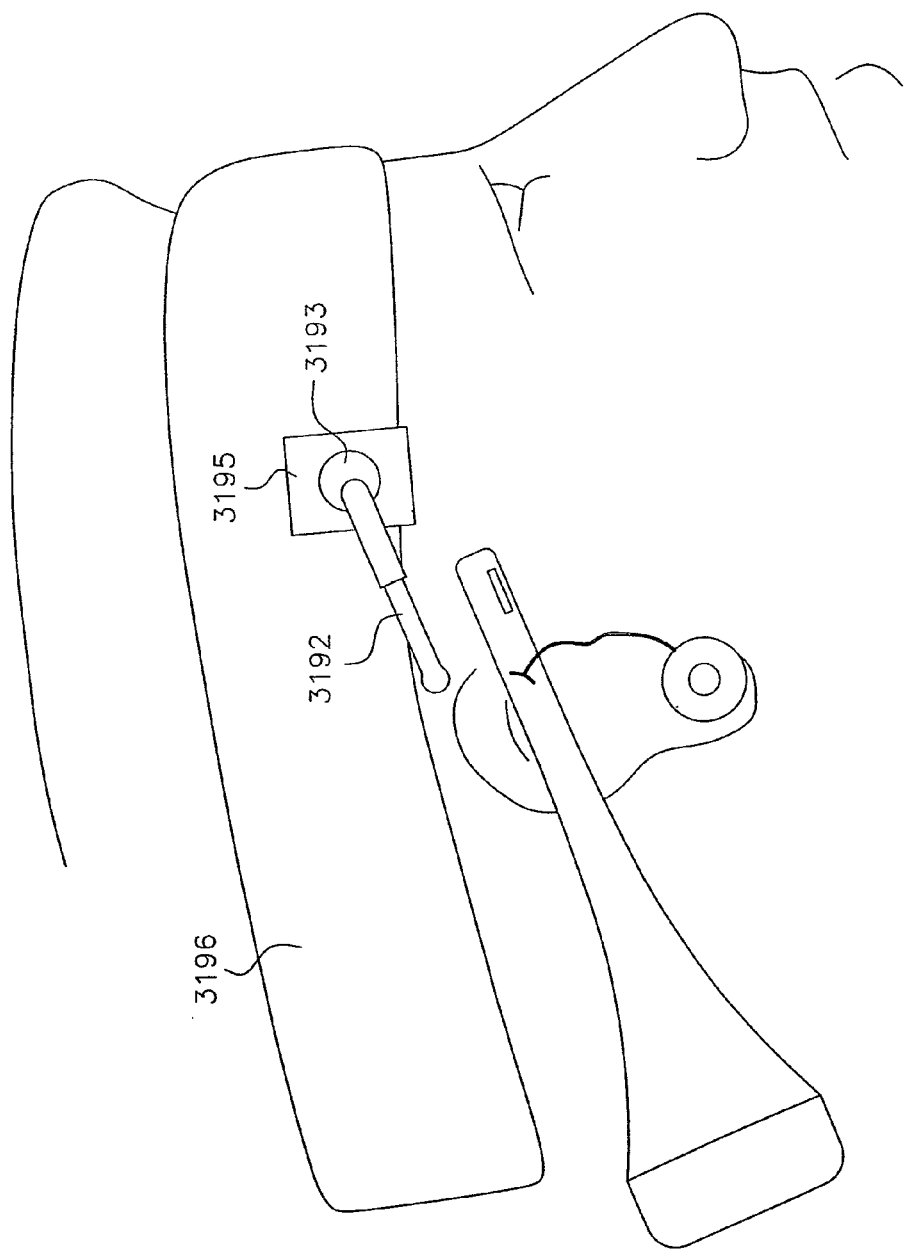

FIGS. 91a and 91b shows top view and a side view of an attachable clip for use with a storage cord of the invention. Attachment appendage 3192 is connected to dome 3193, which can optionally rotate around clip 3195, as shown by arrow 3194. Once clip 3195 has been attached to a wearable article, the sleeves of a storage cord according to the invention, may be attached to attachment appendage 3192, securing the storage cord to the user. Attachment appendage 3192 can also be extendable, as shown in FIG. 92. The clip may then be attached to a wearable article, such as headband 3196, as shown in FIG. 93.

Figure 94:
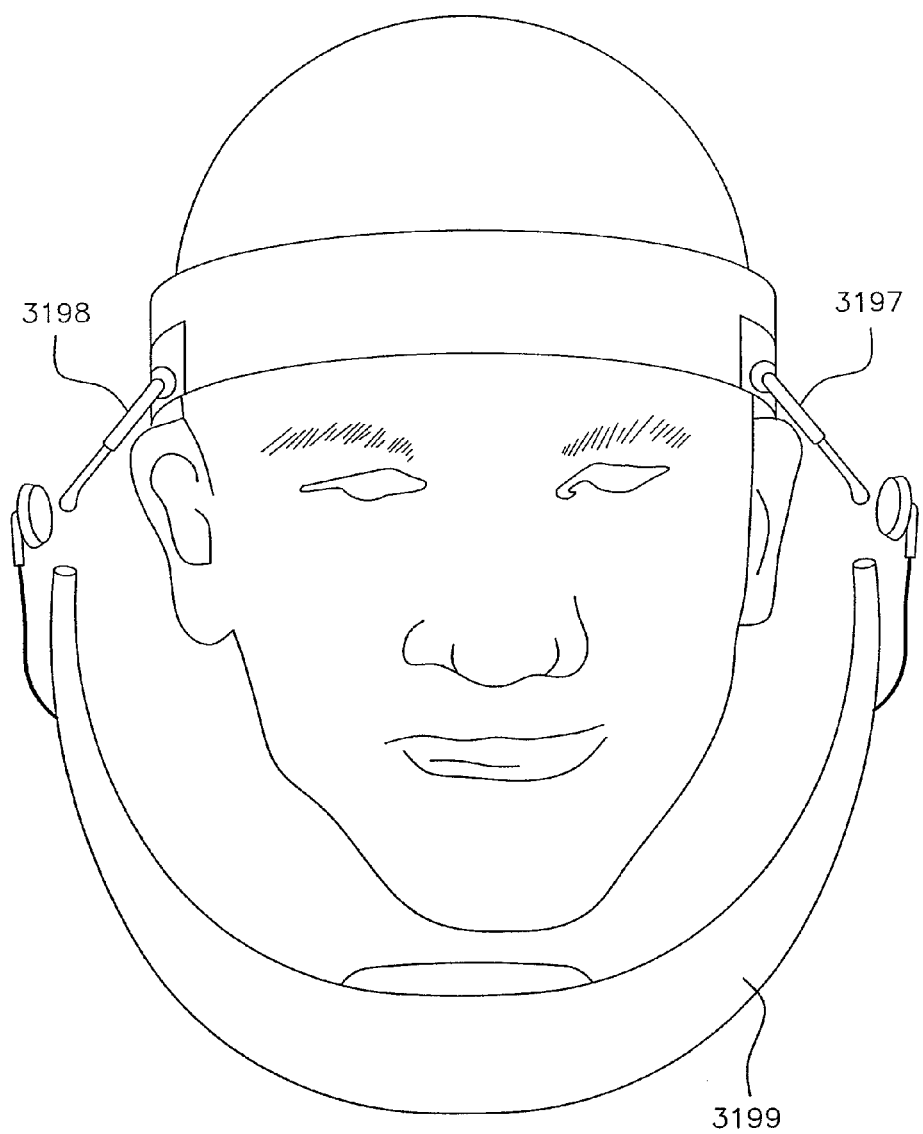
Figure 95:
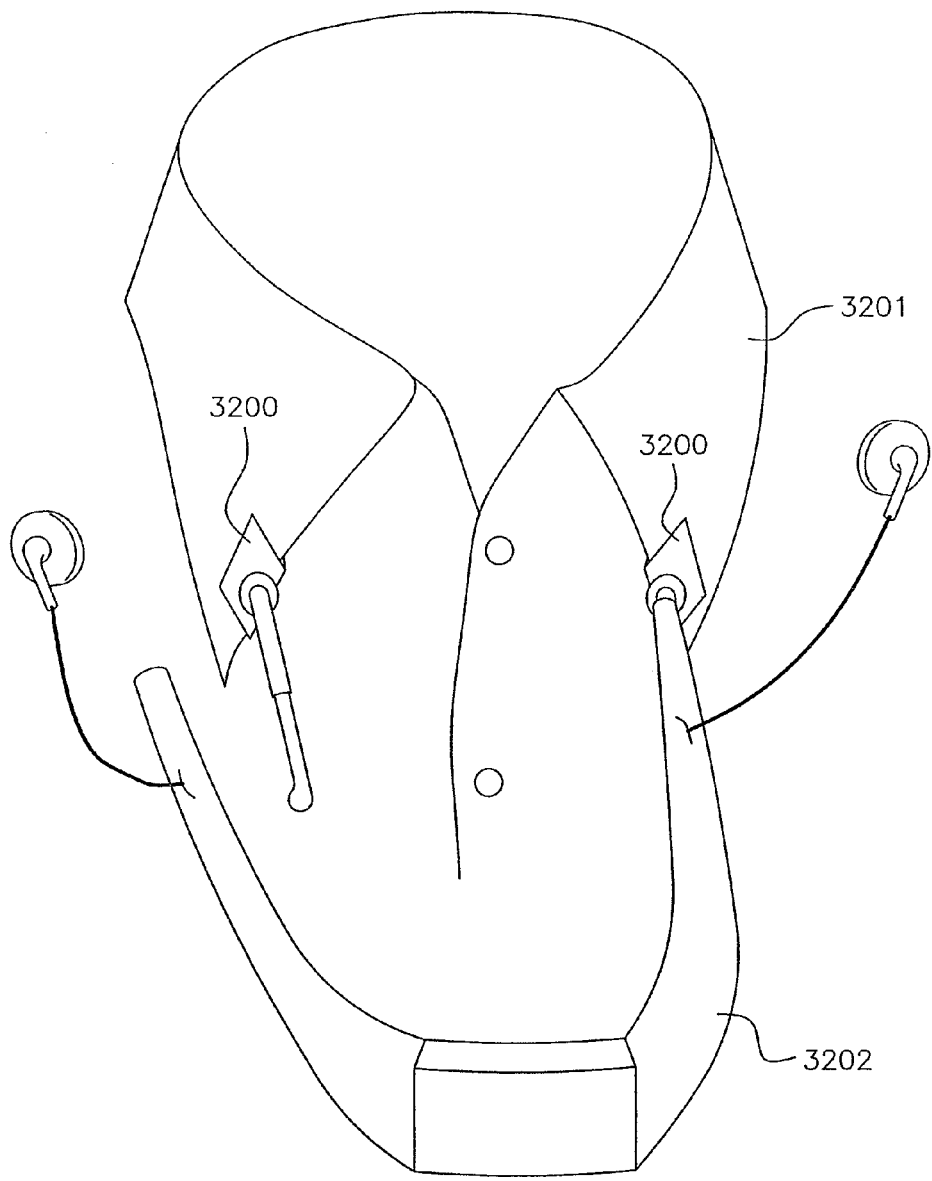

By rotating the attachment appendages 3197 and 3198 to face downwards, it would also be possible to attach storage cord 3199 so that it passed under the user's chin, rather than behind his or her neck. This is illustrated in FIG. 94. FIG. 95 shows how clips 3200 may be attached to shirt 3201, or other wearable article, to permit attachment of a storage cord 3202 according to the invention.

Figure 97:
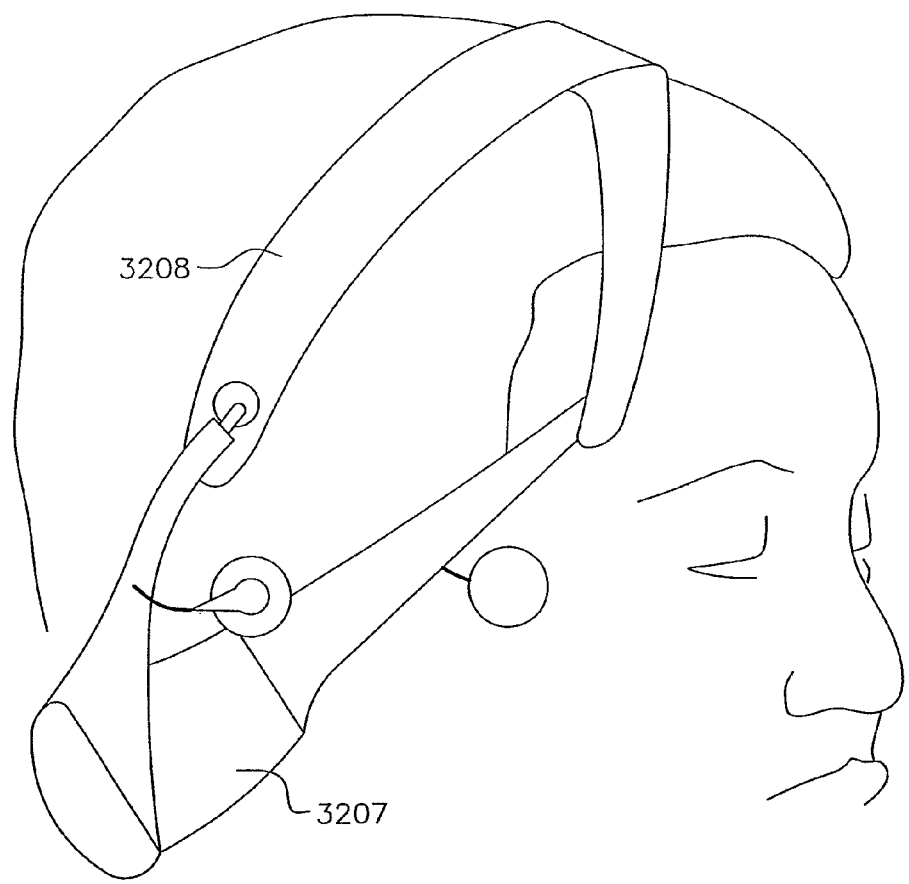

FIG. 96 shows a hair band for use with a storage cord according to the invention. Hair band 3203 has attachment appendages 3204 and 3205 at its ends. Attachment appendages 3204 and 3205 may be rotatable as illustrated by arrow 3206. FIG. 97 shows storage cord 3207 attached to head band 3208.

Figure 98:
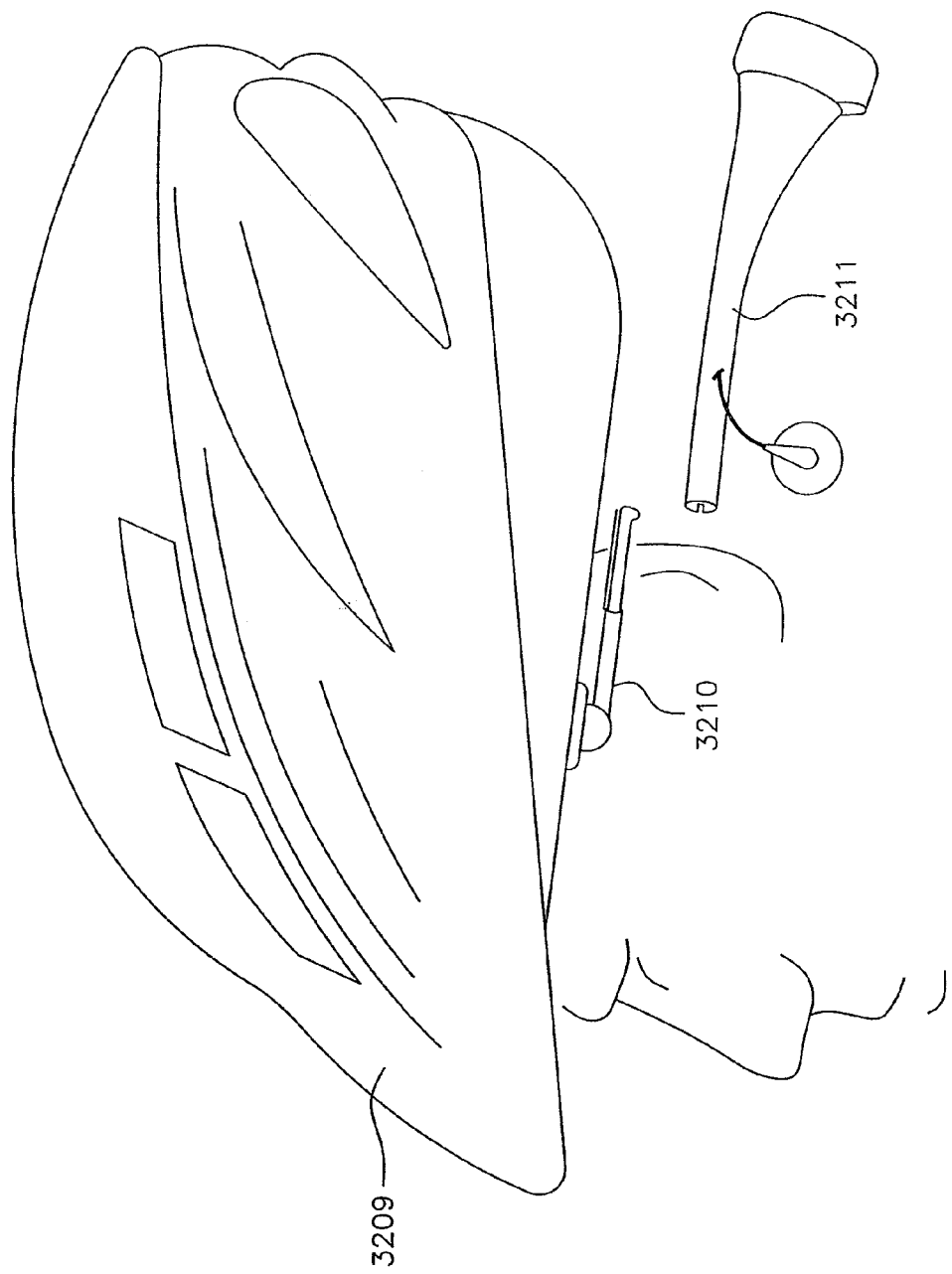

It is also possible to permanently attach attachment appendages to wearable articles, so as to make them compatible with storage cords having sleeves according to the invention. This is illustrated in FIG. 98, which shows bike helmet 3209 having attachment appendage 3210 (and a similar one, not shown, on the other side). Storage cord 3211 can then be attached for use.

Figure 99:
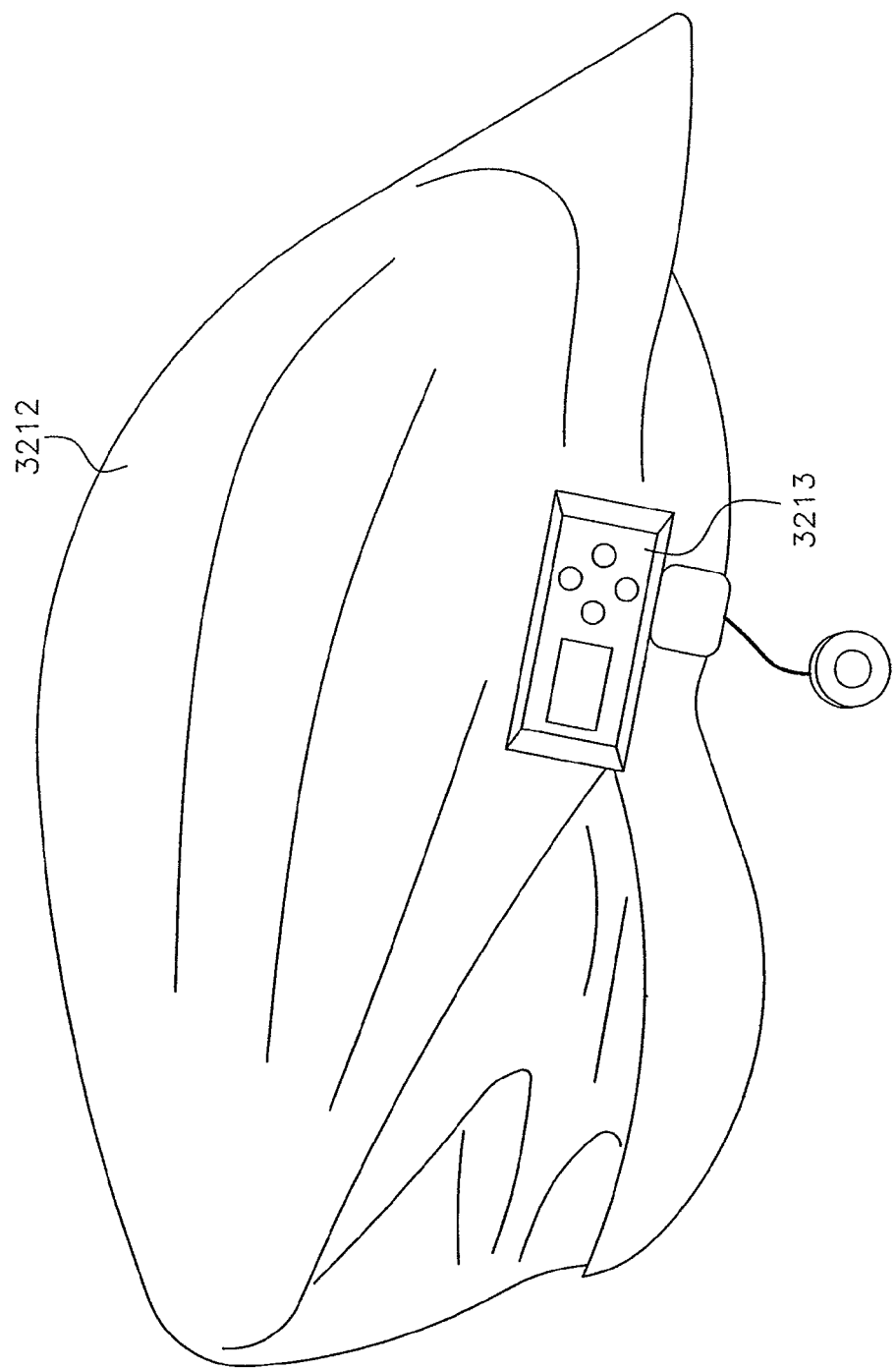
FIG. 99 illustrates the permanent attachment of a storage cord to a wearable article.

Alternatively, as shown in FIG. 99, the storage cord of the invention can be permanently affixed to a wearable article, such as helmet 3212. The user can then pull out electronics package 3213 to look at it, and then replace it, with the assistance of the retractable cord (not shown).

FIG. 100 illustrates several views of another embodiment of a storage cord according to the invention. In this embodiment, storage cord 3214 is made of a more rigid material and is shaped to fit around the users neck or shoulders (or other body part). The ear buds may either be attached using wires or arms, as shown. In this embodiment, the storage cord may be used without attachment to another wearable article. FIG. 101 shows an system for securing attachment appendages around the user's ears, which might be useful if the user is not wearing a hat or shirt. Similarly, the ends of the storage cord may be shaped to fit around a user's ears, securing the storage cord to the user.

FIG. 102 shows another embodiment of a storage cord according to the invention. In this embodiment, all elements of storage cord 3215 are soft, maximizing the user's comfort. Electronics package 3216 is stored in pocket 3217, which can be either open (as shown in the figure) or sealable (with a zipper, or button, or other sealing mechanism). Retractable spool 3218 is stored in sealed pocket 3219, and is electronically connected with ear buds 3220 and 3221 via wires 3222 and 3223.

Figure 103:
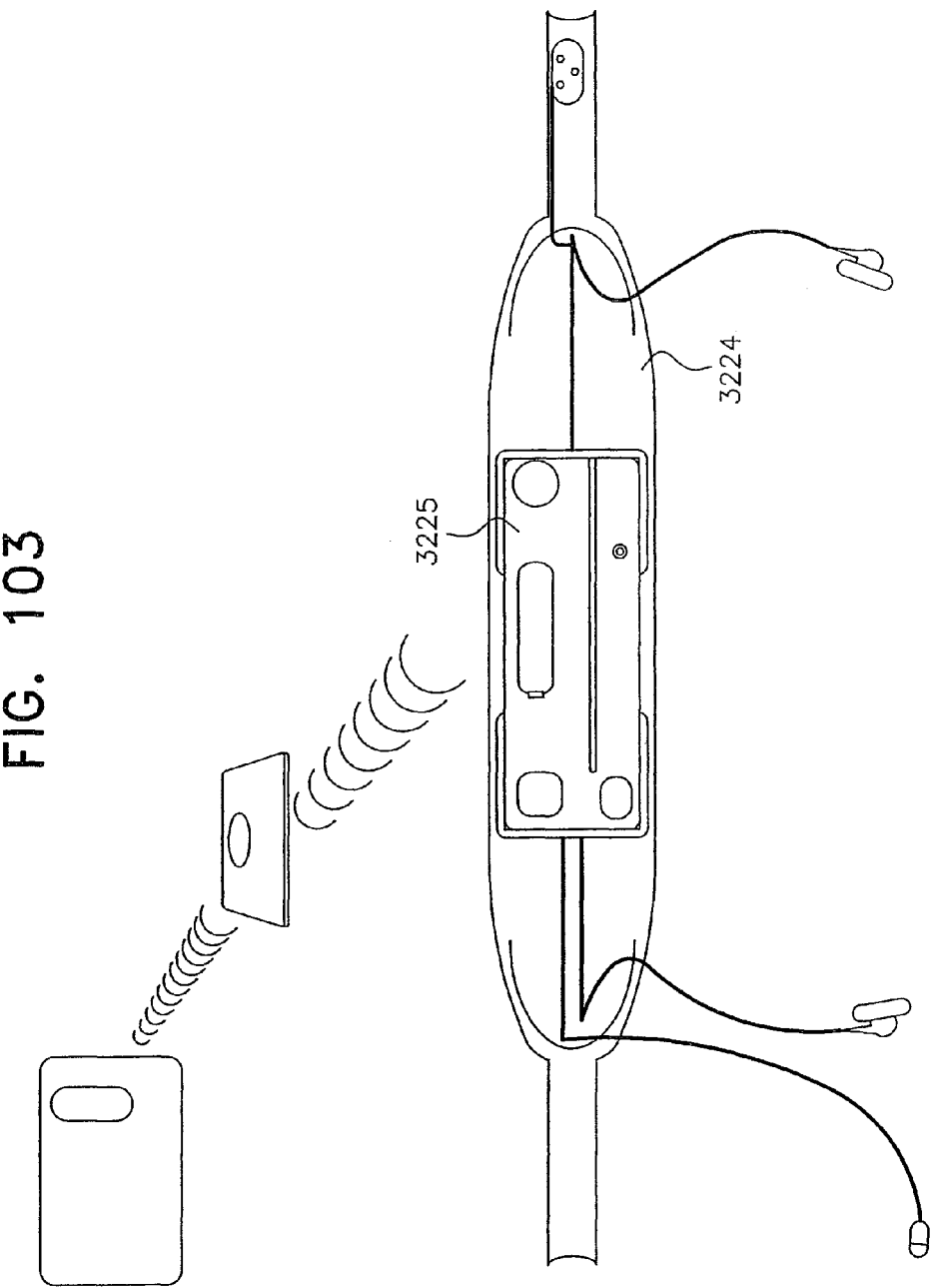
FIG. 103 illustrates the mounting of a Bluetooth receiving device on a storage cord.
Figure 105:
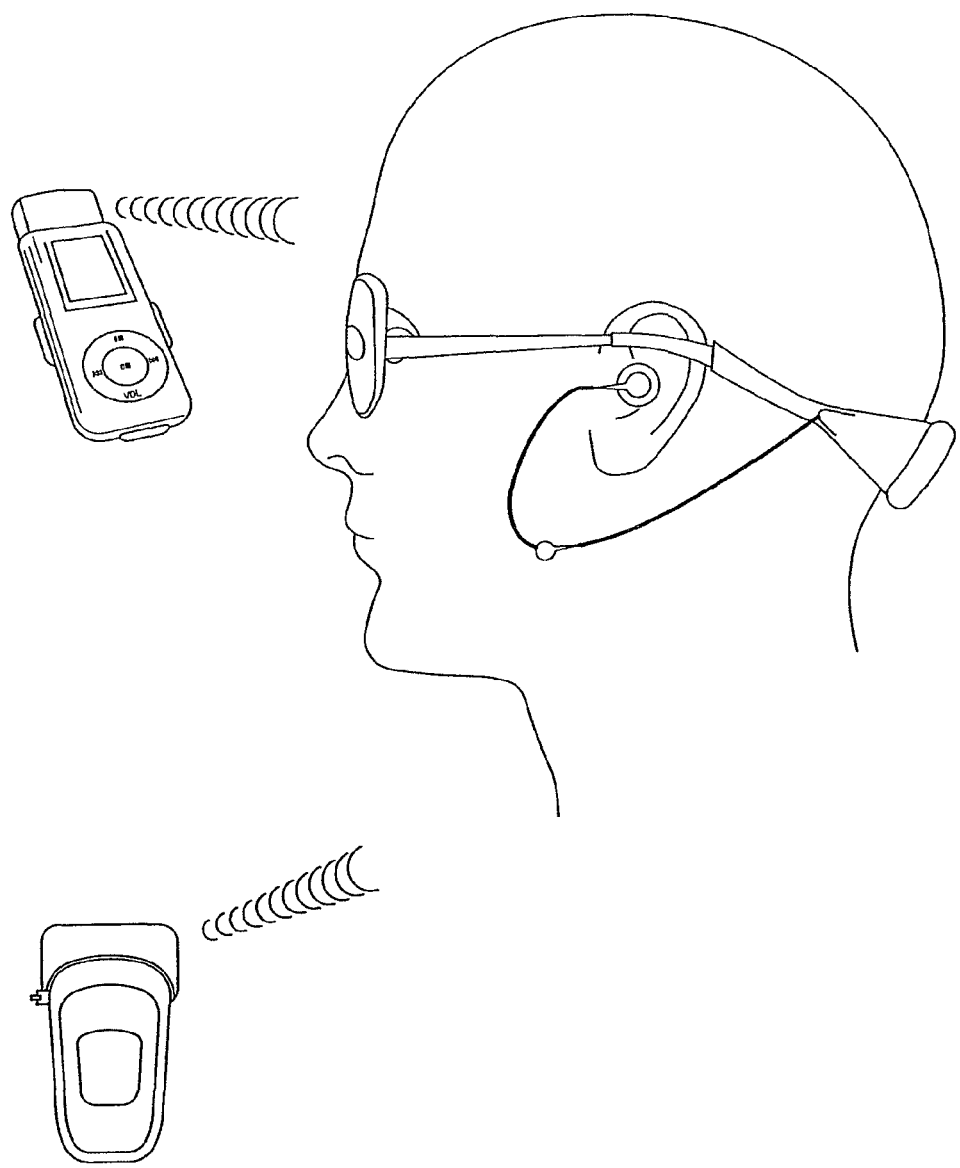

FIG. 103 illustrates anther useful embodiment of the invention. In this embodiment, storage cord 3224 contains Bluetooth receiver 3225, which can receive signals from nearby, Bluetooth enabled devices, such as MP3 players or telephones. Bluetooth receiver 3225 takes these signals and transmits them as sound to the user through the ear buds. This allows the user to keep multiple electronic devices close by (for example in jacket pocket or briefcase) and use them simultaneously. The user can determine which device will be transmitting sound to his or her ears by manipulating a simple button located on the receiver. In another embodiment, shown in FIG. 104, the Bluetooth receiver—or other receiver, like an AM or FM radio receiver—can be placed on the storage cord, in addition to another electronics package. FIG. 105 illustrates how the Bluetooth receiver on the storage cord can receive signals from multiple sources and transmit sounds from those sources to the user.

Figure 106:
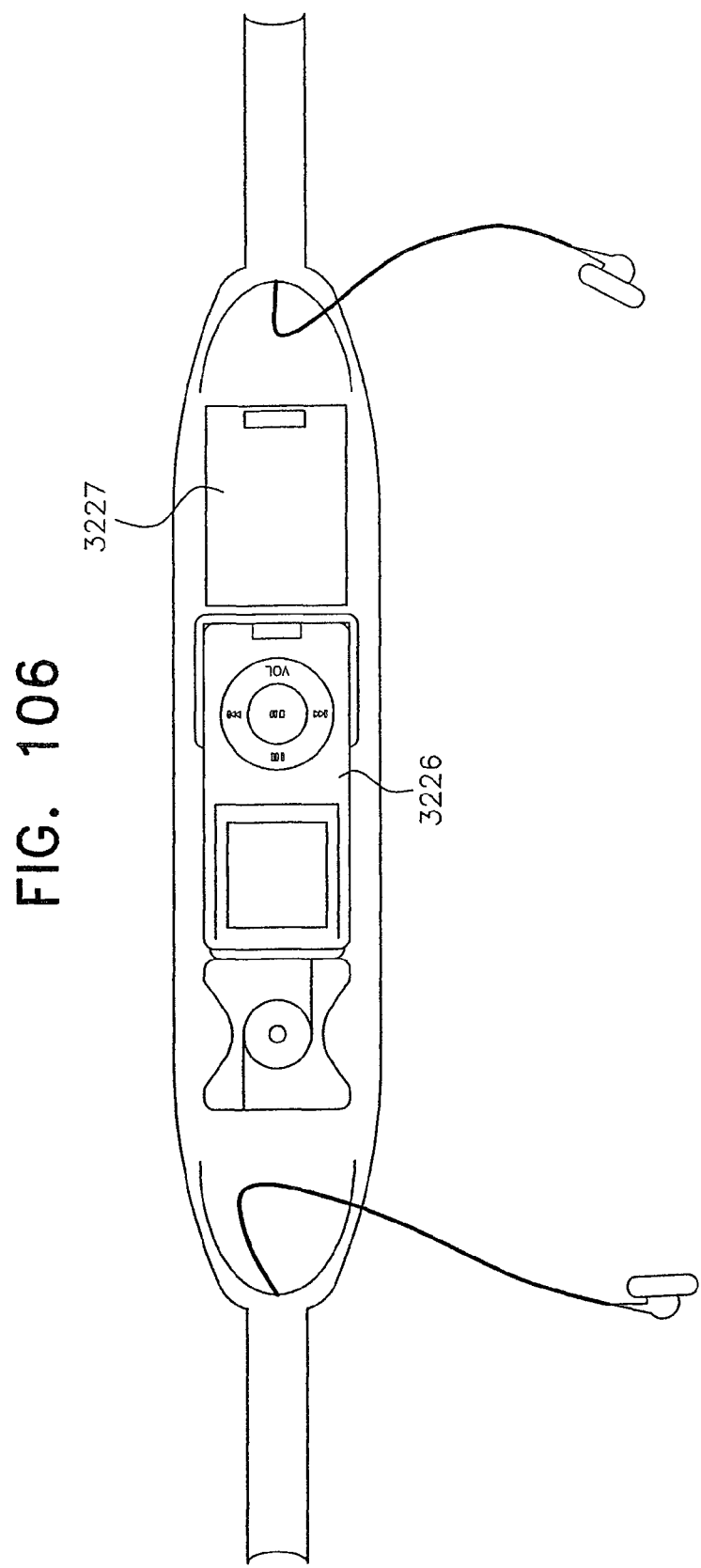

FIG. 106 illustrates another embodiment of the storage cord according to the invention. In this embodiment, electronics package 3226 may be controlled using infrared emitting remote control 3227 (like a television remote control) which, when not in use, may be stored on the storage cord. The infrared receiver may be located on the electronics package (as shown) or, preferably, on a device attached to one of the ear bud wires. In this position, it will be easier to activate using the remote control.

Figure 107:
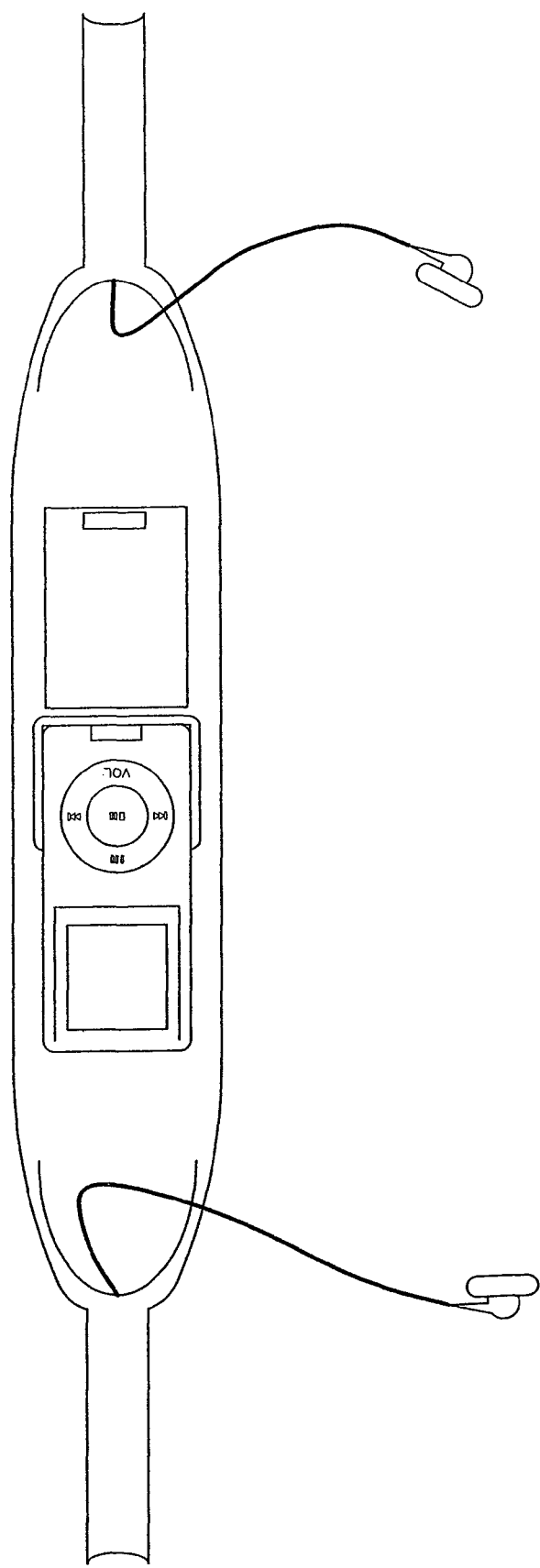
FIG. 107 illustrates an alternate embodiment of the storage cord.

FIG. 107 shows a similar embodiment, except that there is no retractable cord, so that the electronics package must stay on the storage cord in order to remain connected to the ear buds; this means the only practical way to control it is with the remote control. This configuration minimizes the number of parts for the storage cord.

Figures 108A, 108B, 108C:
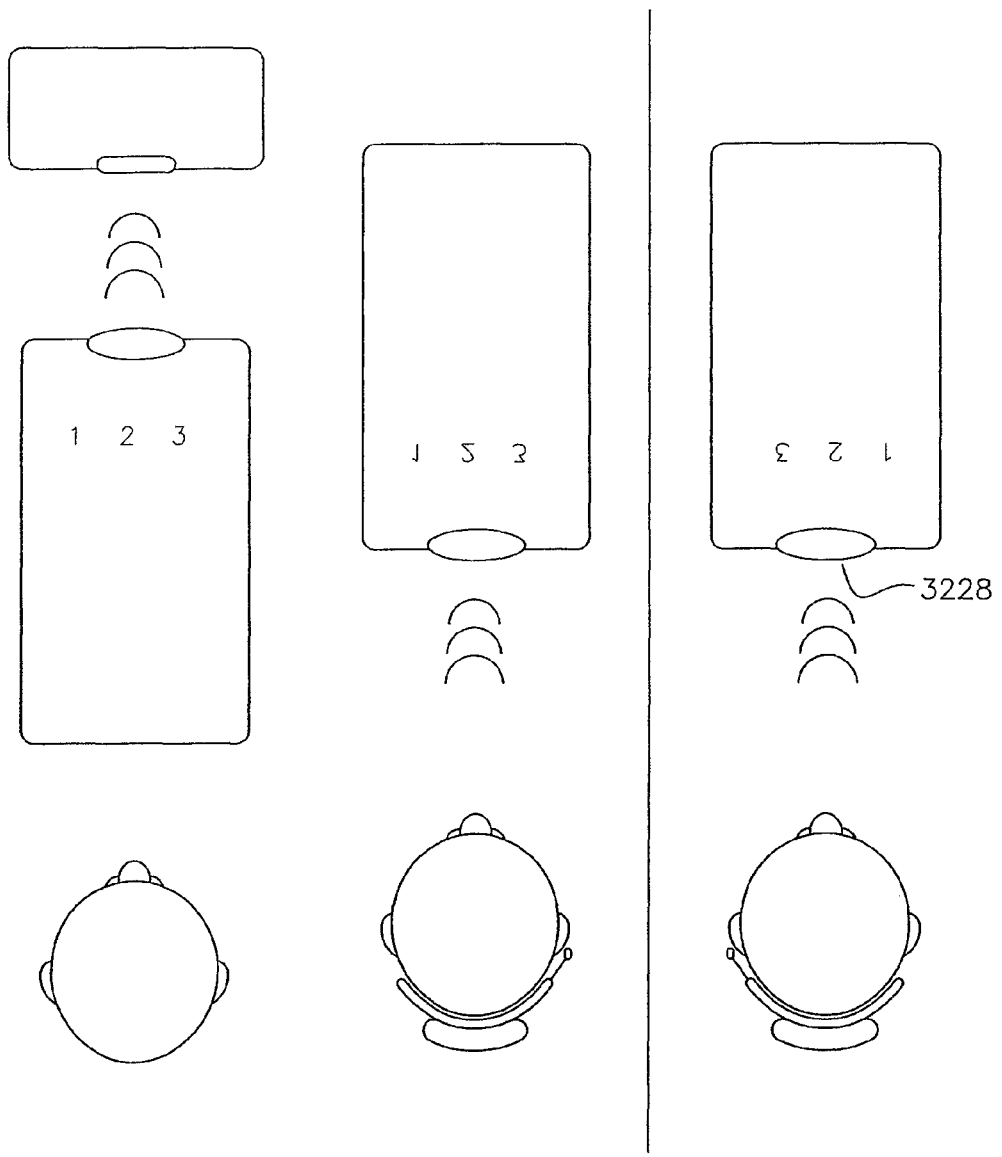
FIGS. 108A through 108C illustrate a remote control for use with the embodiments of FIGS. 106 and 107.

FIG. 108 shows a remote control for use with the embodiments of FIGS. 106 and 107. Because the remote control will be pointed towards the user when being used, the numbers are reversed from the usual pattern on the device, being "right side up" when the device is—pointed at the user. Alternatively, IR emitter 3228 can point along an axis perpendicular to the main axis of the device, so that when it is pointed up, the IR signal will be directed back towards the user.

Figure 109:
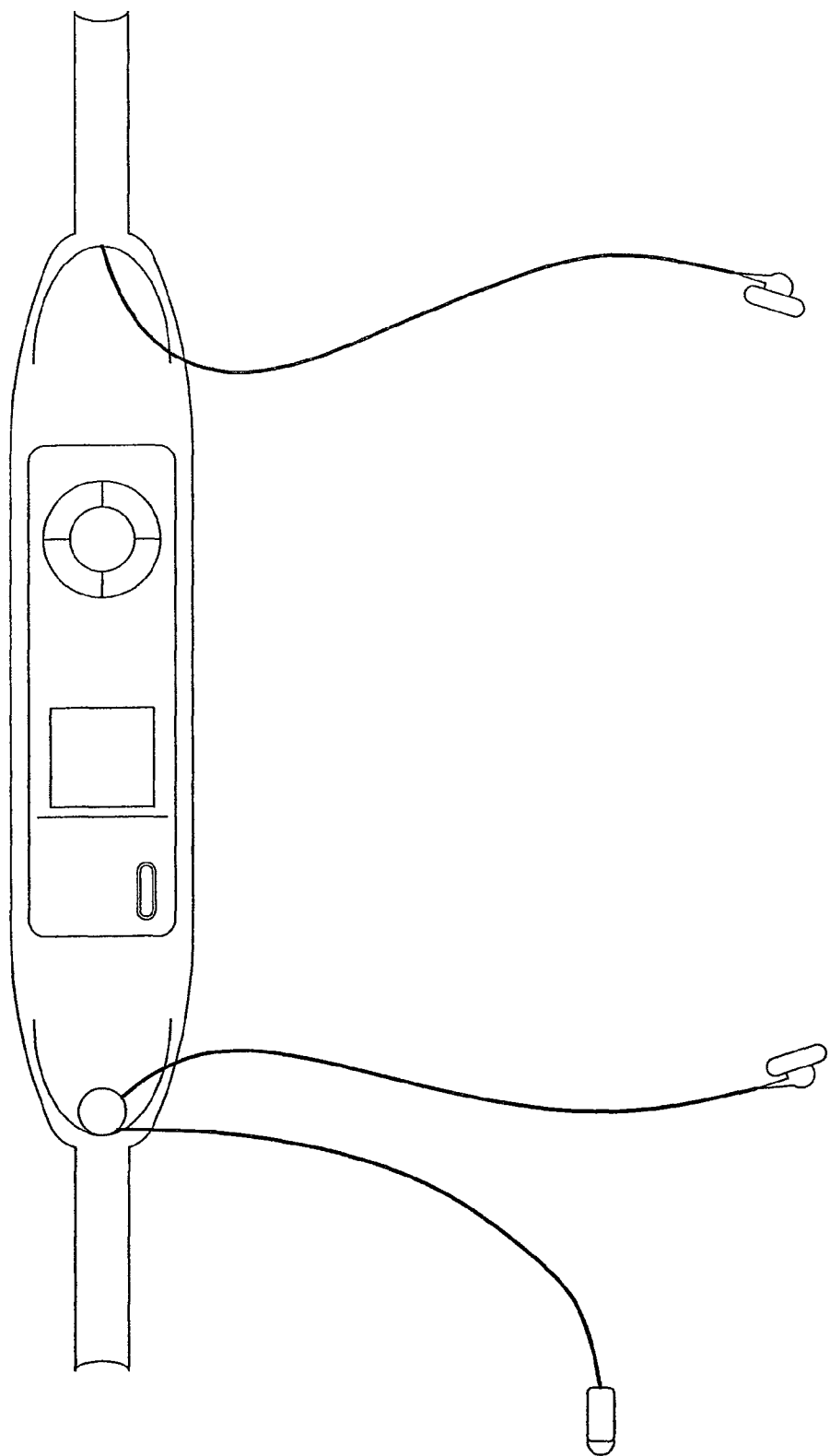
FIGS. 109 through 112 illustrate alternate embodiments of storage cords.

FIG. 109 shows a storage cord where the electronics package is permanently affixed. A charge port is provided to charge the electronics package.

Figure 110:
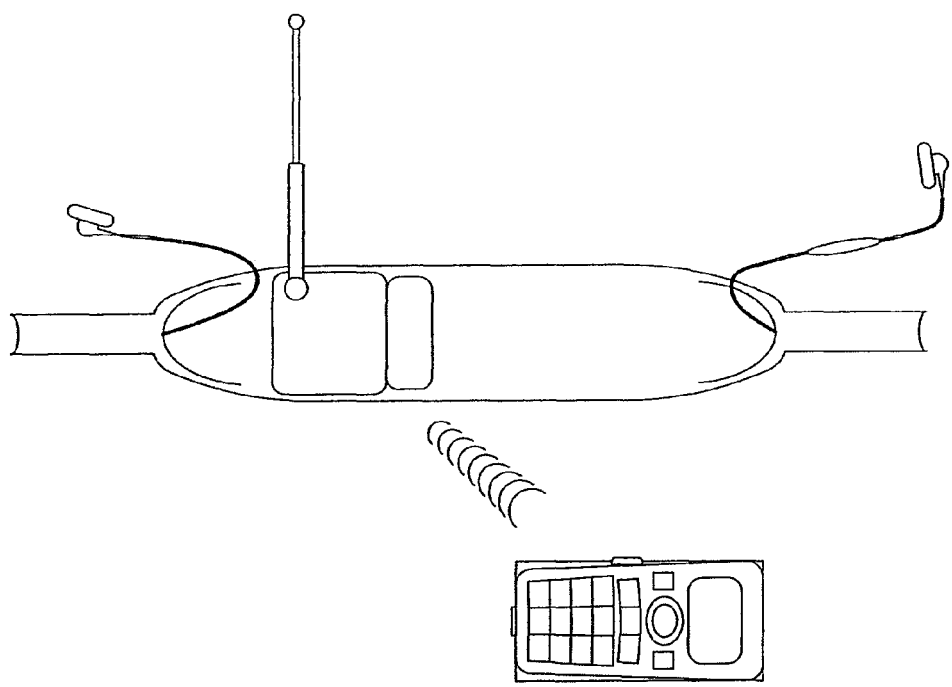

FIG. 110 shows another embodiment. In this embodiment, the electronics package is a telephone. However, the heaviest and bulkiest parts of the phone (eg. the battery and antenna) are permanently affixed to the storage cord. The parts of the phone which must be user accessible (e.g. dial pad and display) are kept on a small, removably attached device, which communicates with the rest of the system using Bluetooth protocols. This is similar to the system described in connection with FIG. 39.

Figure 111:
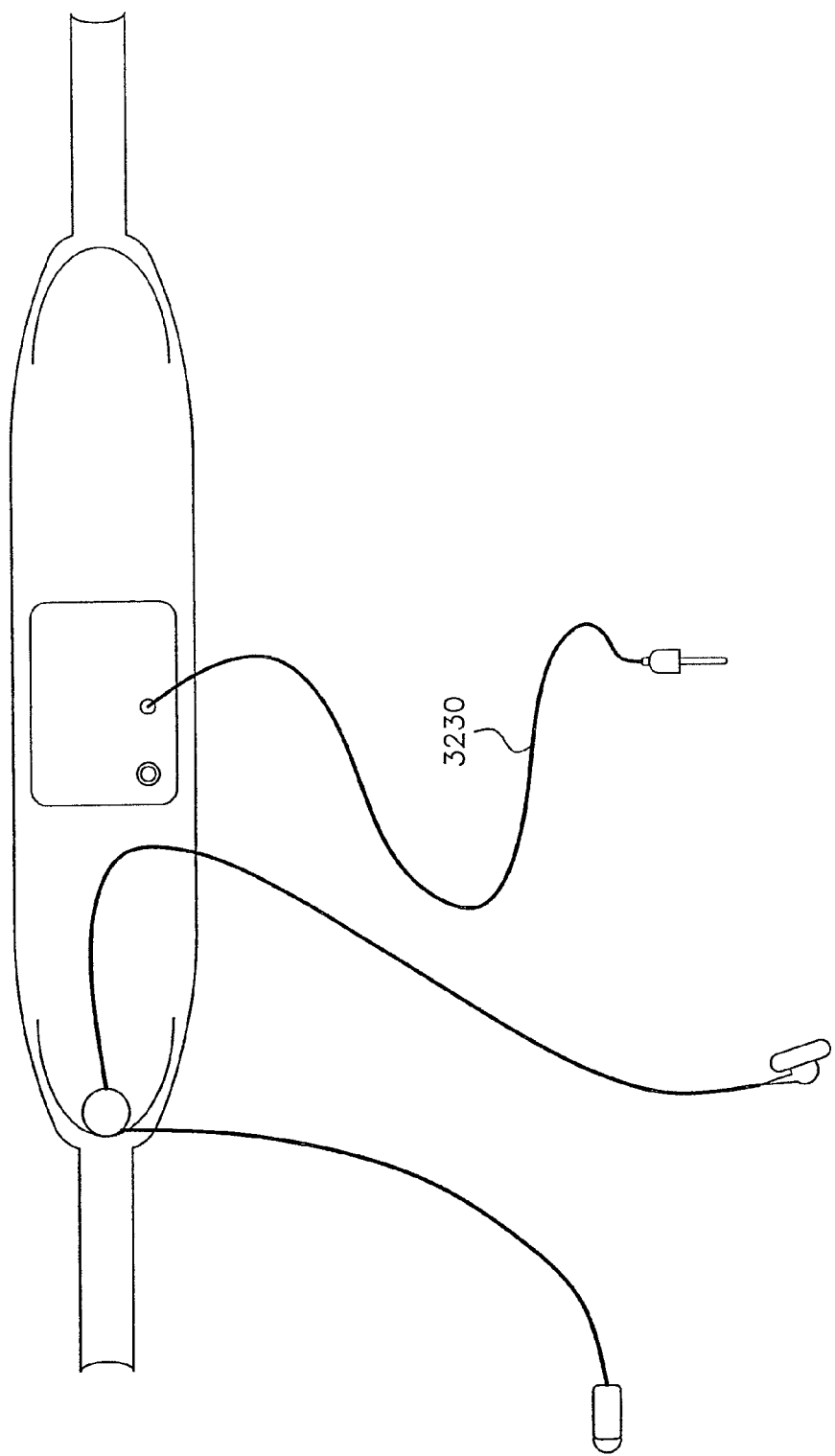

FIG. 111 shows and embodiment in which the storage cord contains no electronics package, but instead communicates through wire 3230 with another system, for example a phone system. In this embodiment, the storage cord functions simply as a headset.

Figure 112:
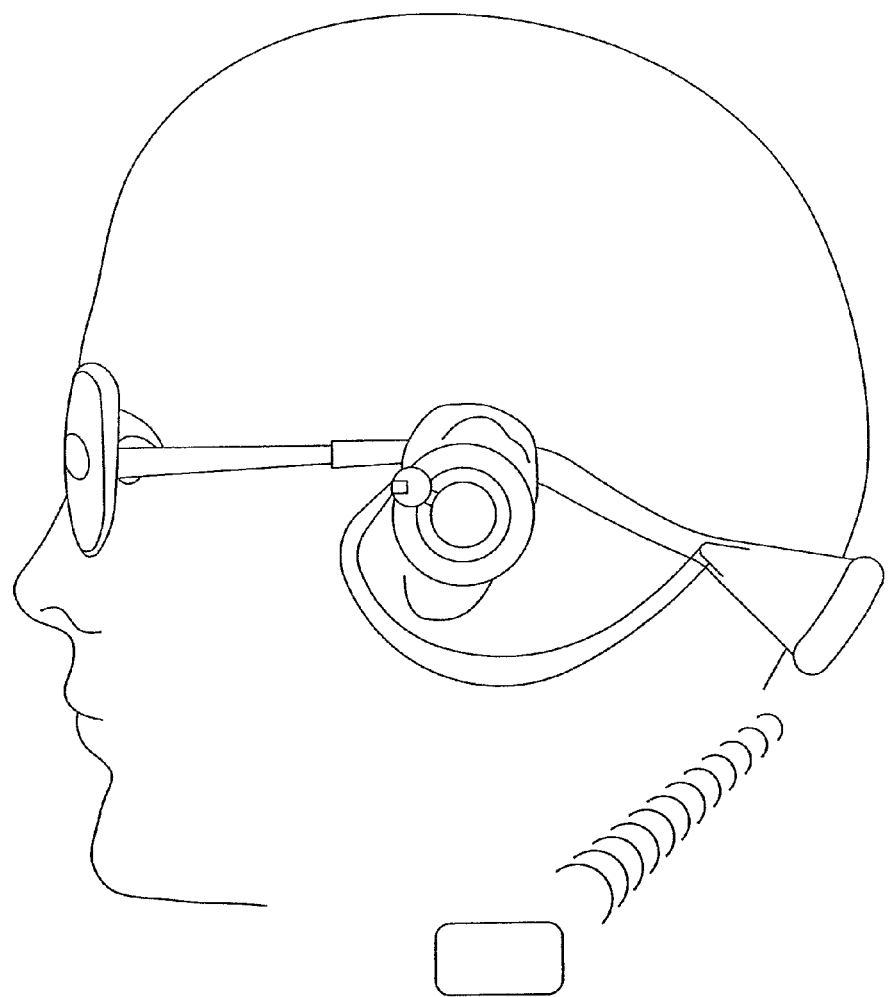

FIG. 112 shows an embodiment in which the electronics package generates a noise cancellation signal, to assist in providing the user with quiet in an otherwise noisy environment (for example on an airplane.) The signal may be transmitted to the ear buds either by wires or wirelessly.

Figure 113:
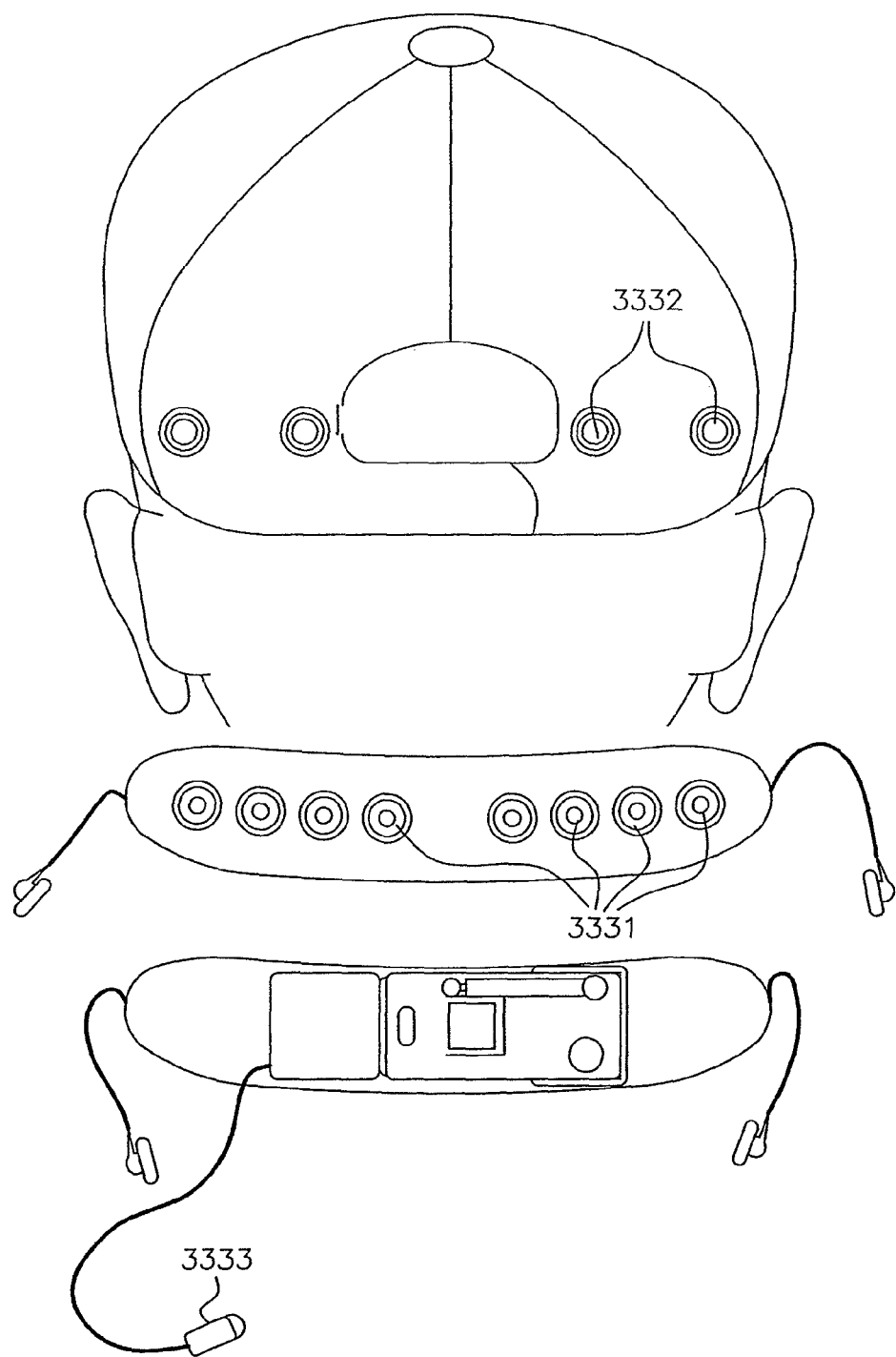
FIGS. 113 through 120 illustrate alternate mechanisms for attaching a storage cord to an article of clothing.
Figure 114:
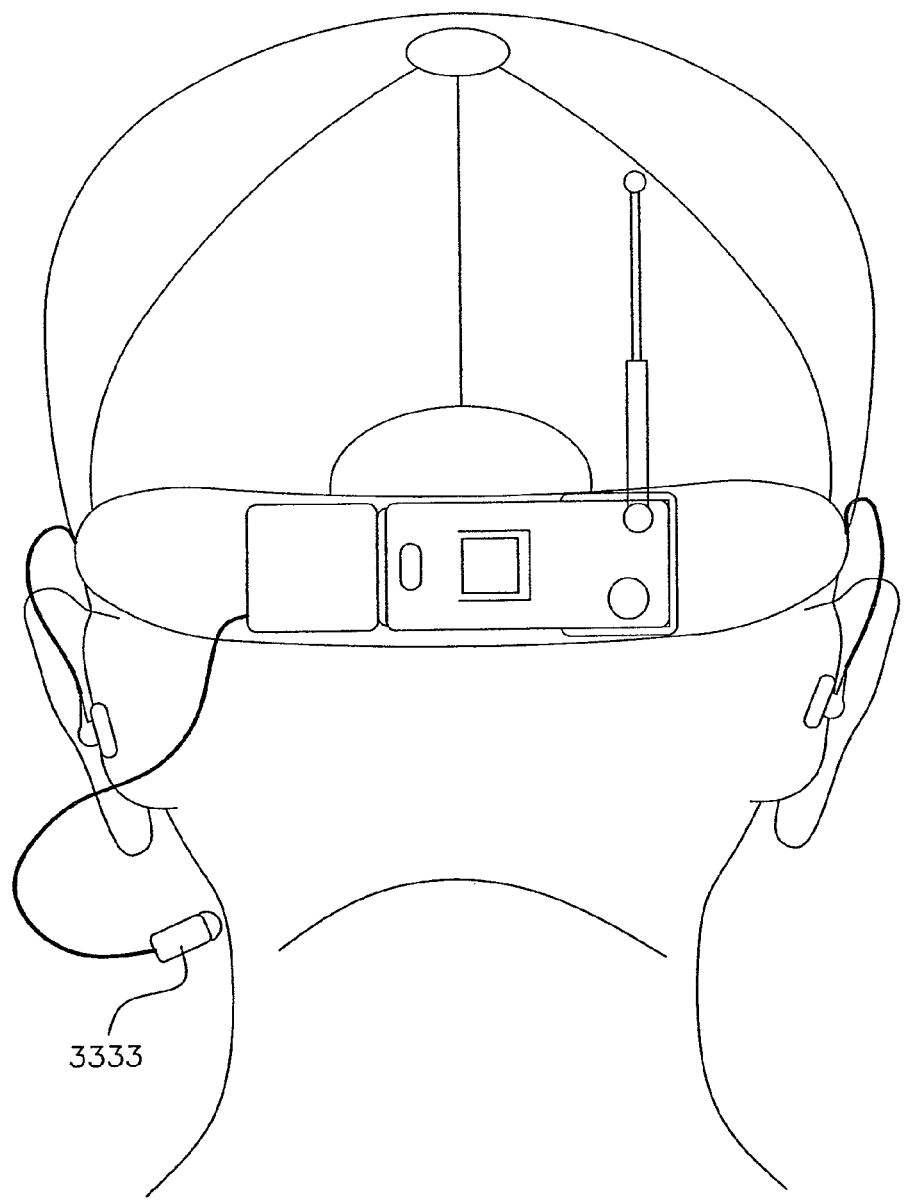

FIGS. 113 and 114 show storage cords according to the invention which are connected to a hat using a series of buttons 3331 and 3332. The large number of buttons ensures a secure hold, and allows the hat to be adjustable in size, while maintaining a snug fit for the storage cord. This is a particularly useful configuration when the electronics package is a two-way radio, as is commonly used in hiking. Microphone 3333 allows the user to speak and have that sound transmitted via the two way radio.

Figure 115:
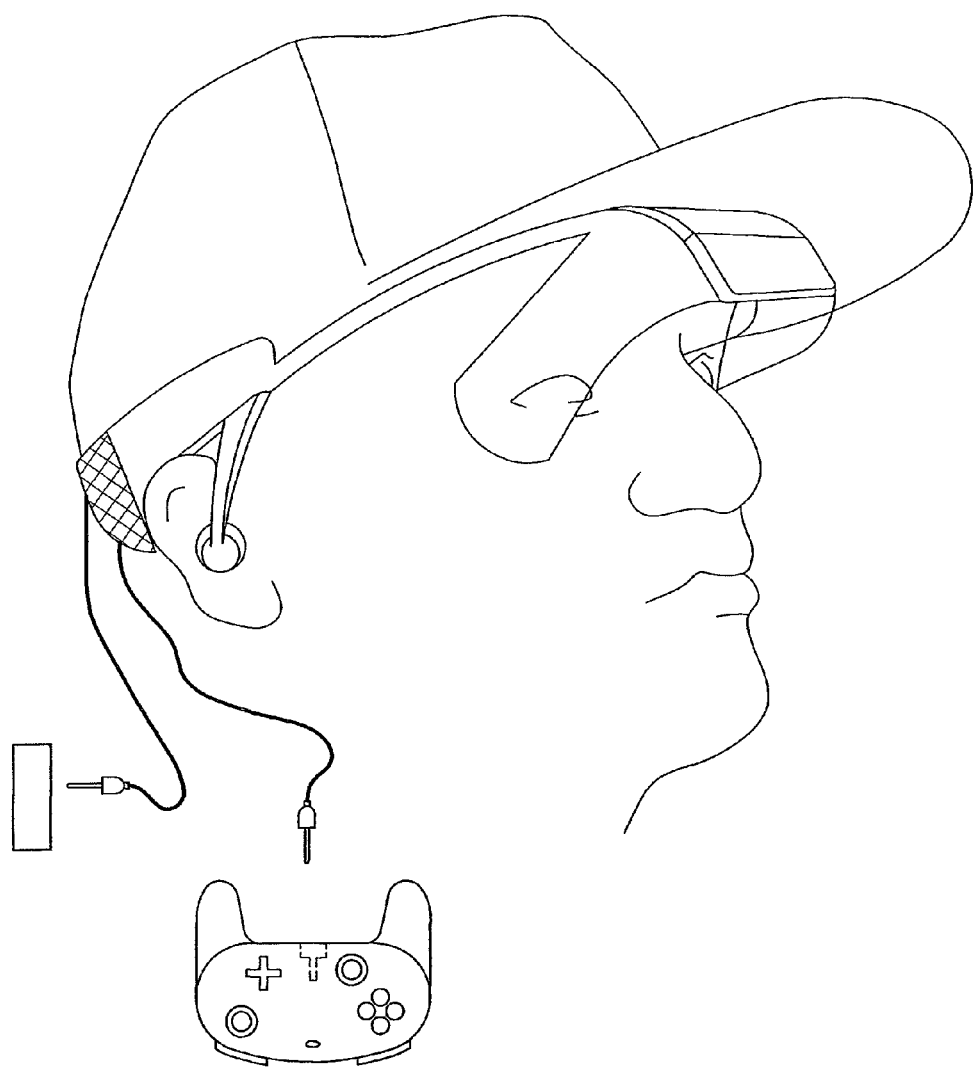
Figure 116:
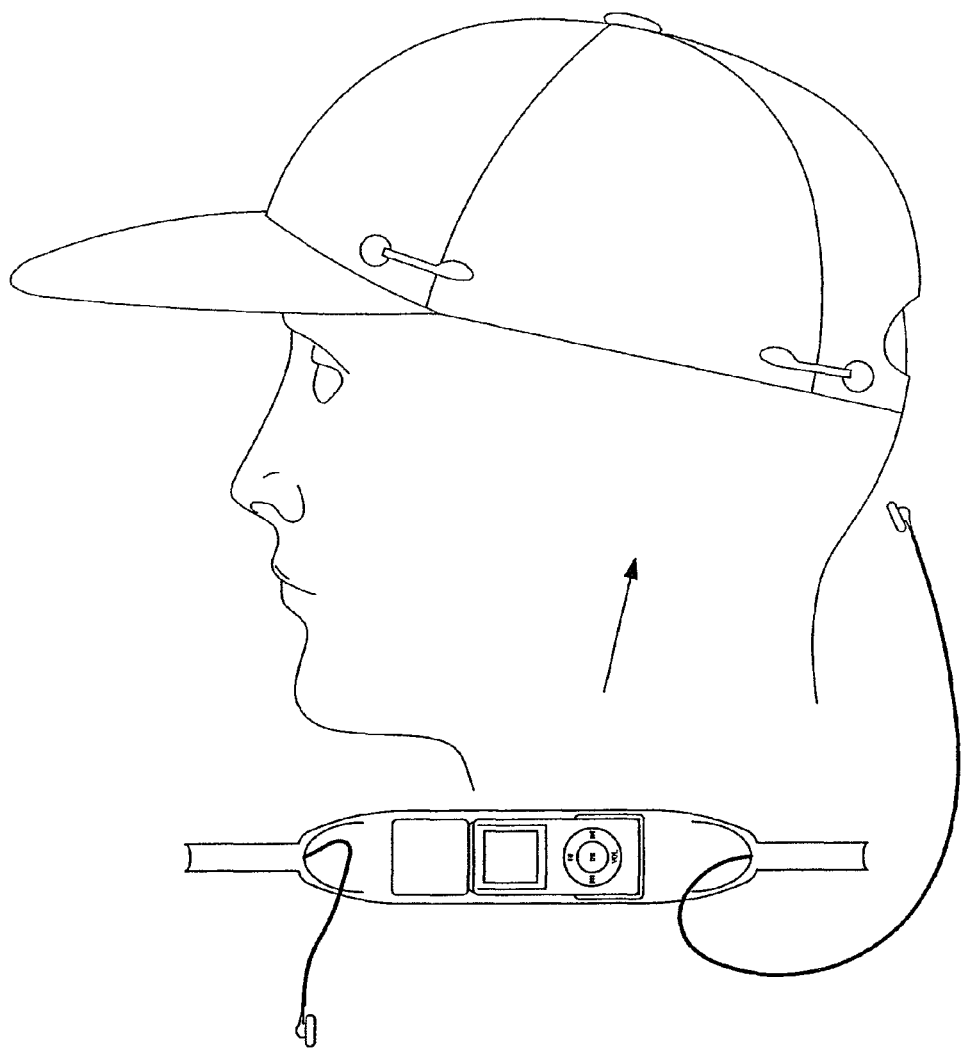
Figure 117:
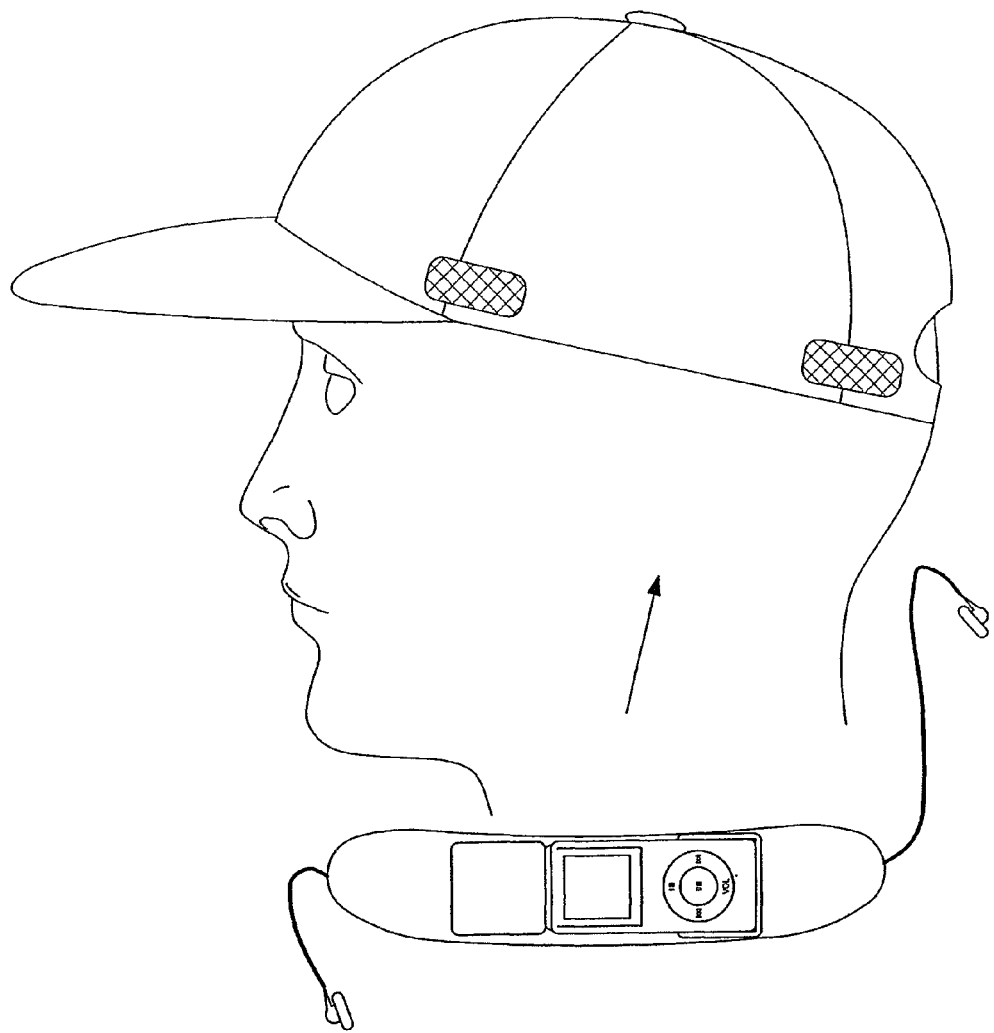
Figure 118A:
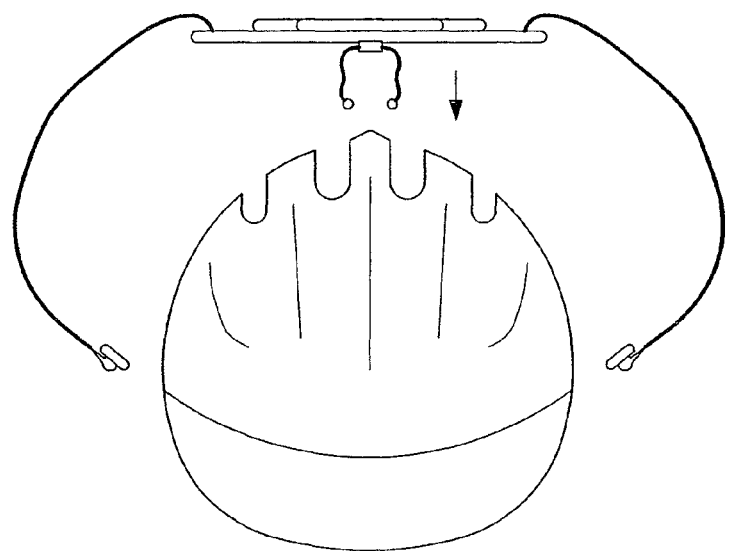
Figure 118B:
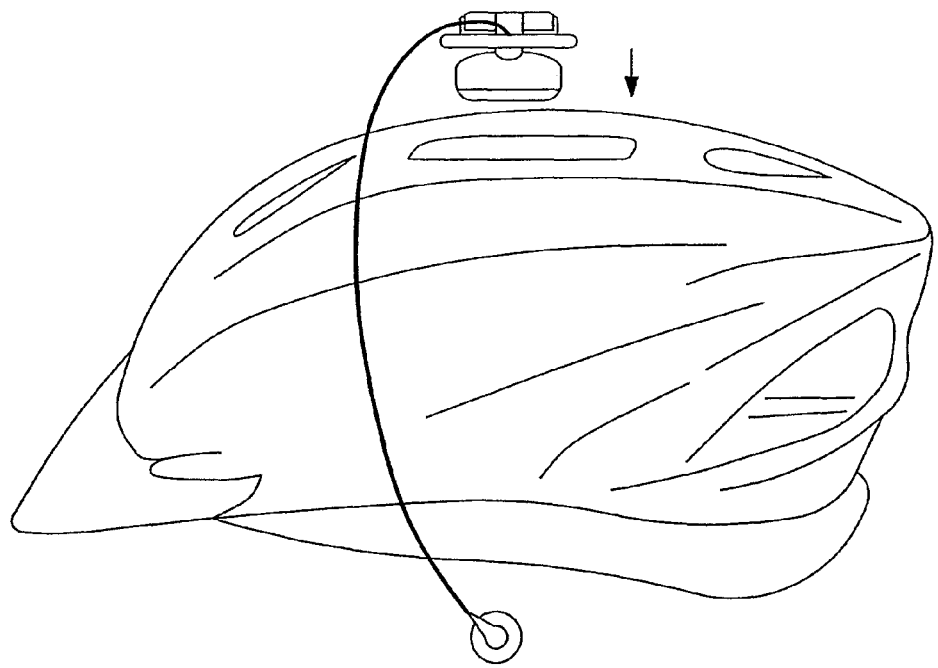
Figure 119:
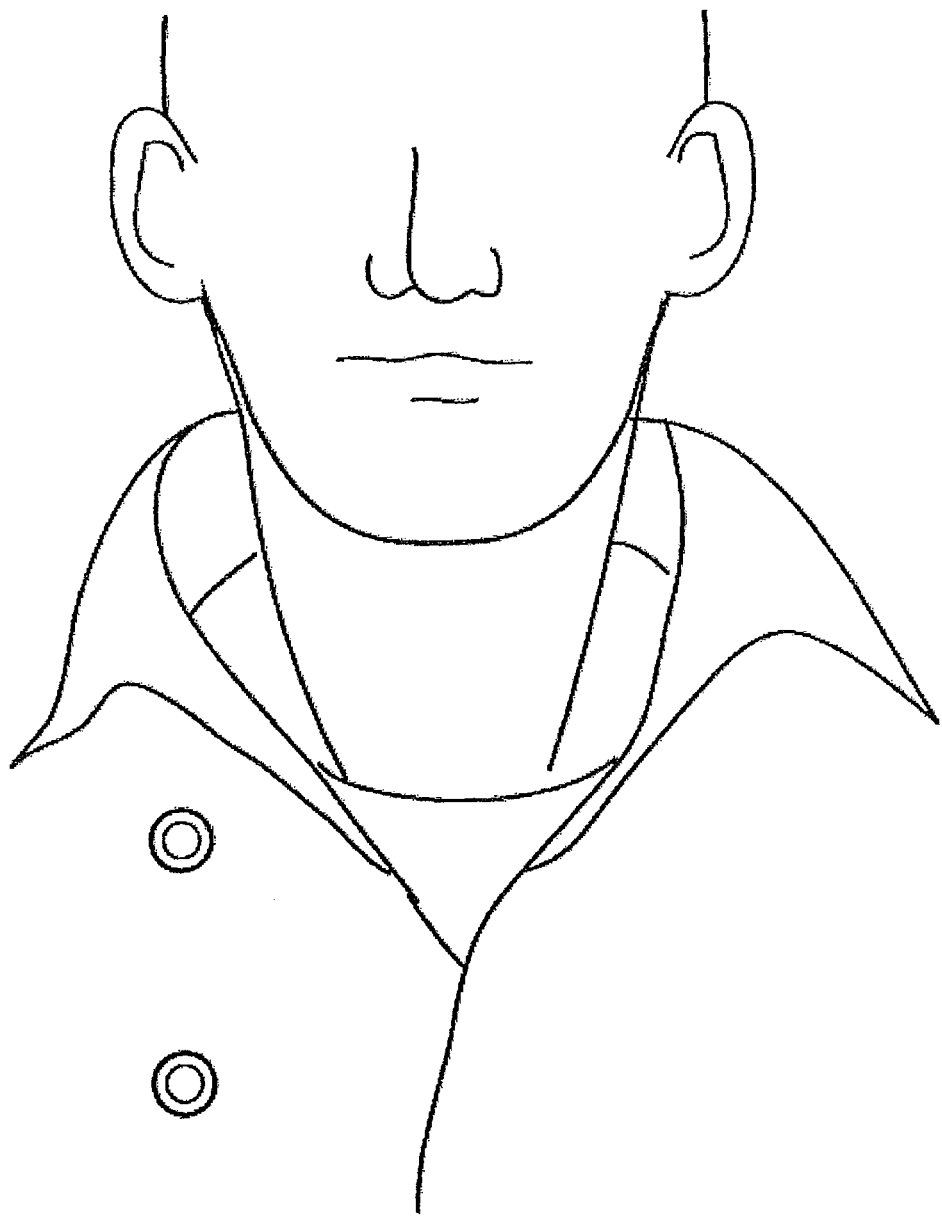
Figure 120:
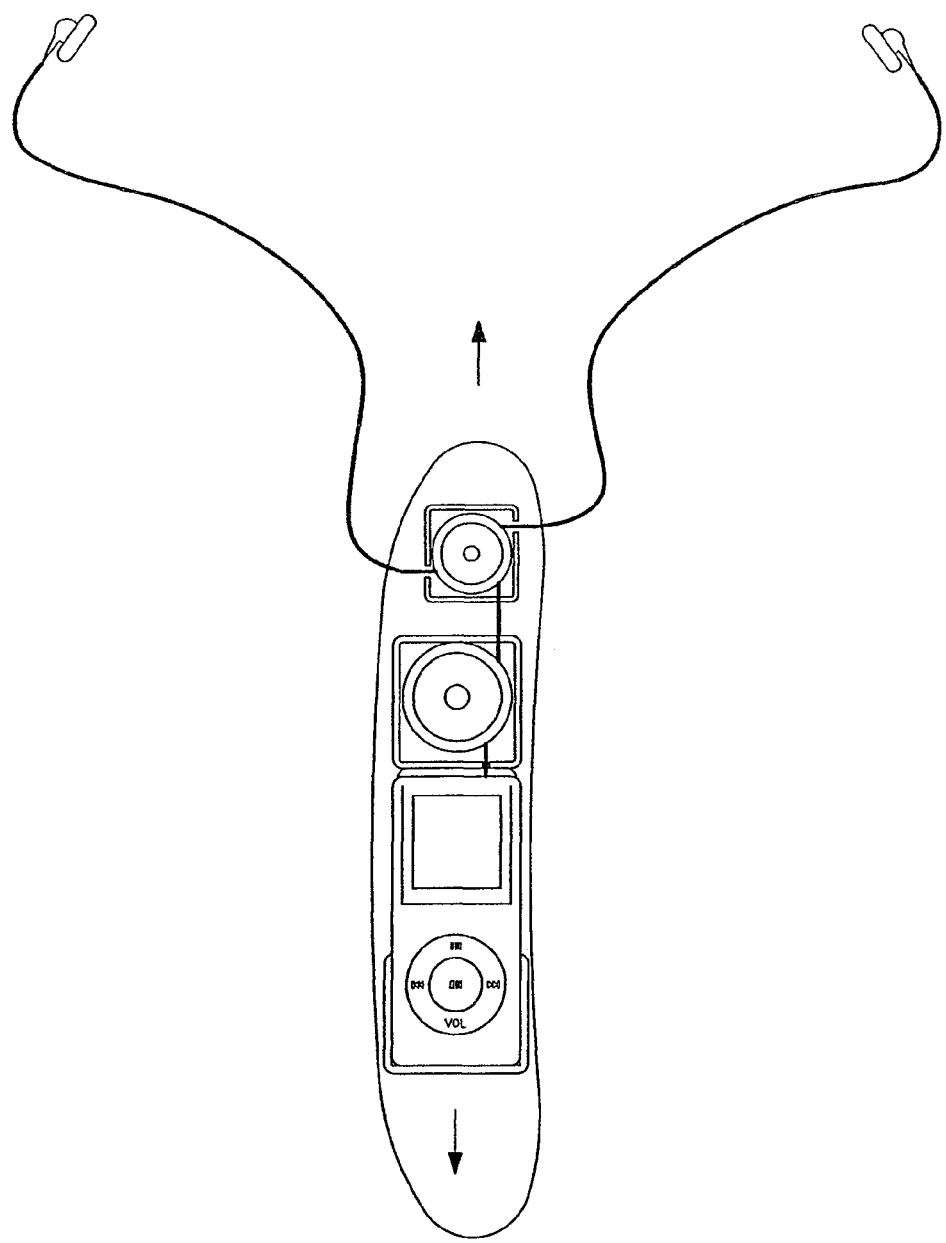
Figure 121:
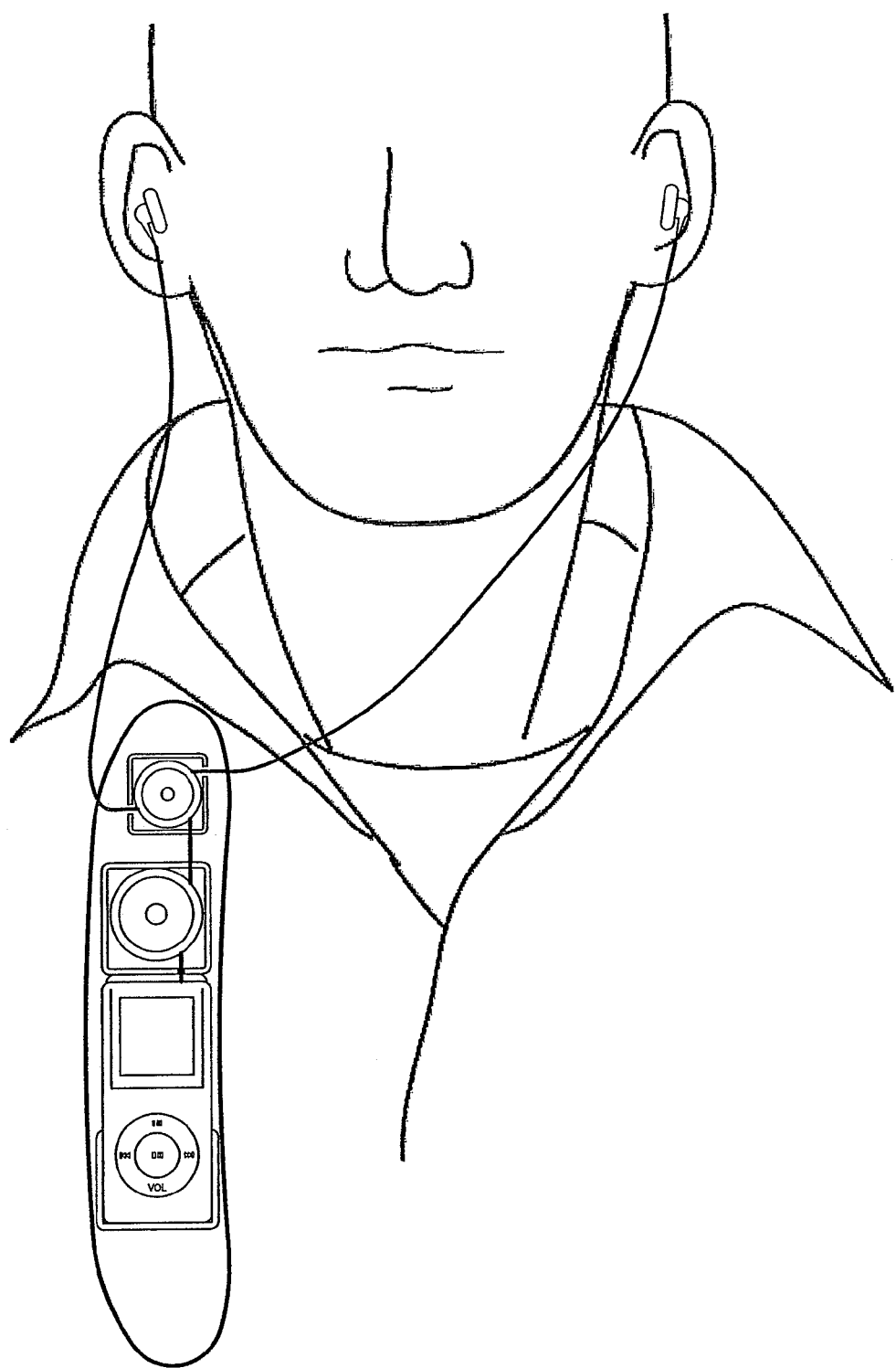
FIGS. 121 illustrates a storage cord assembly pocket.
Figure 122A:
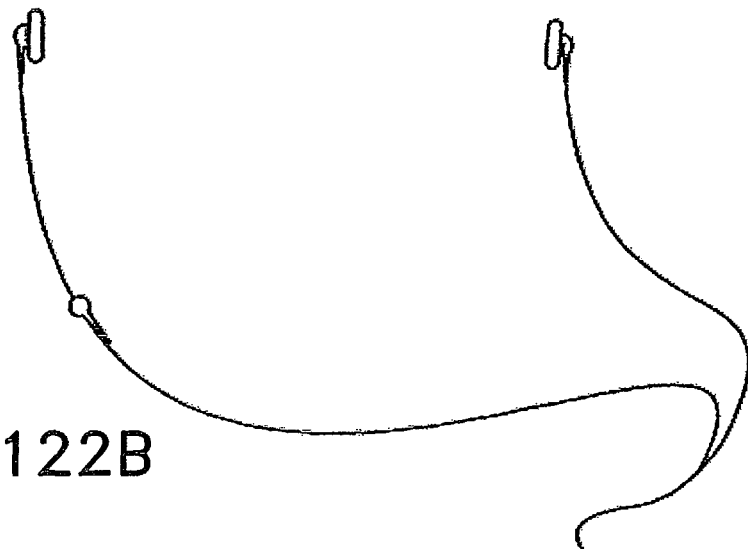
Figure 122B:
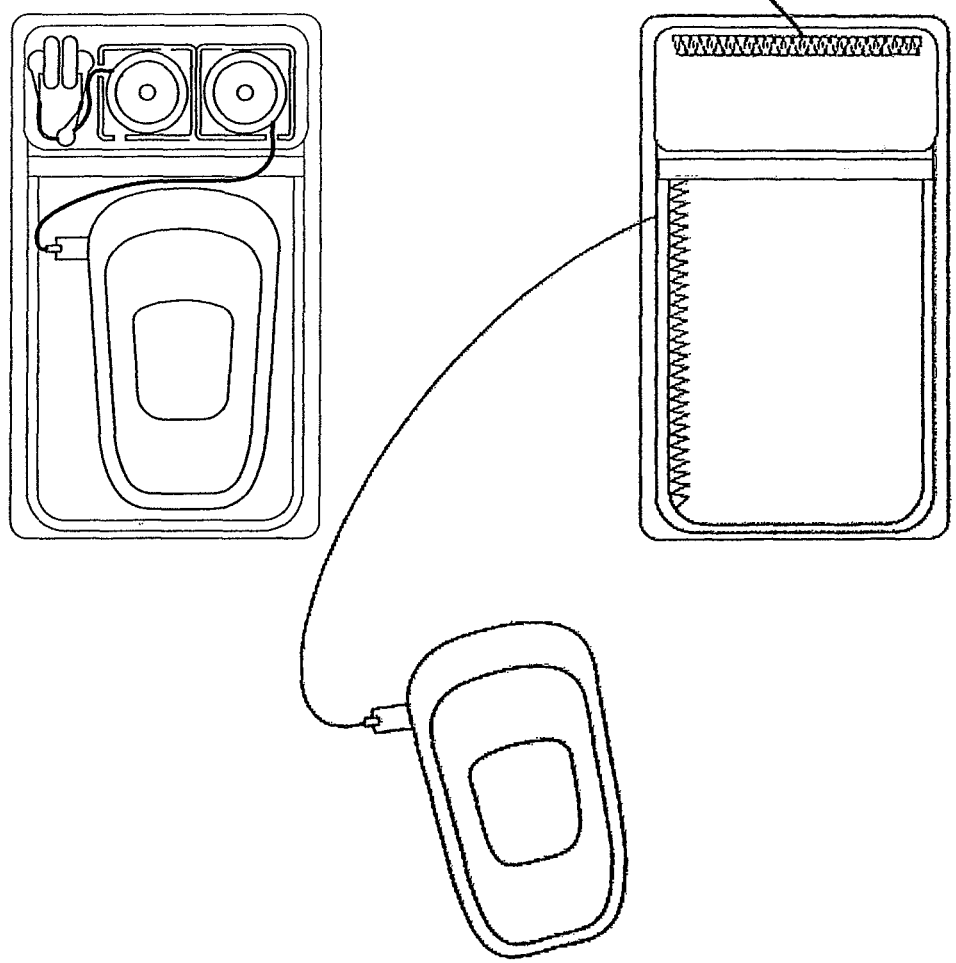
Figure 125:
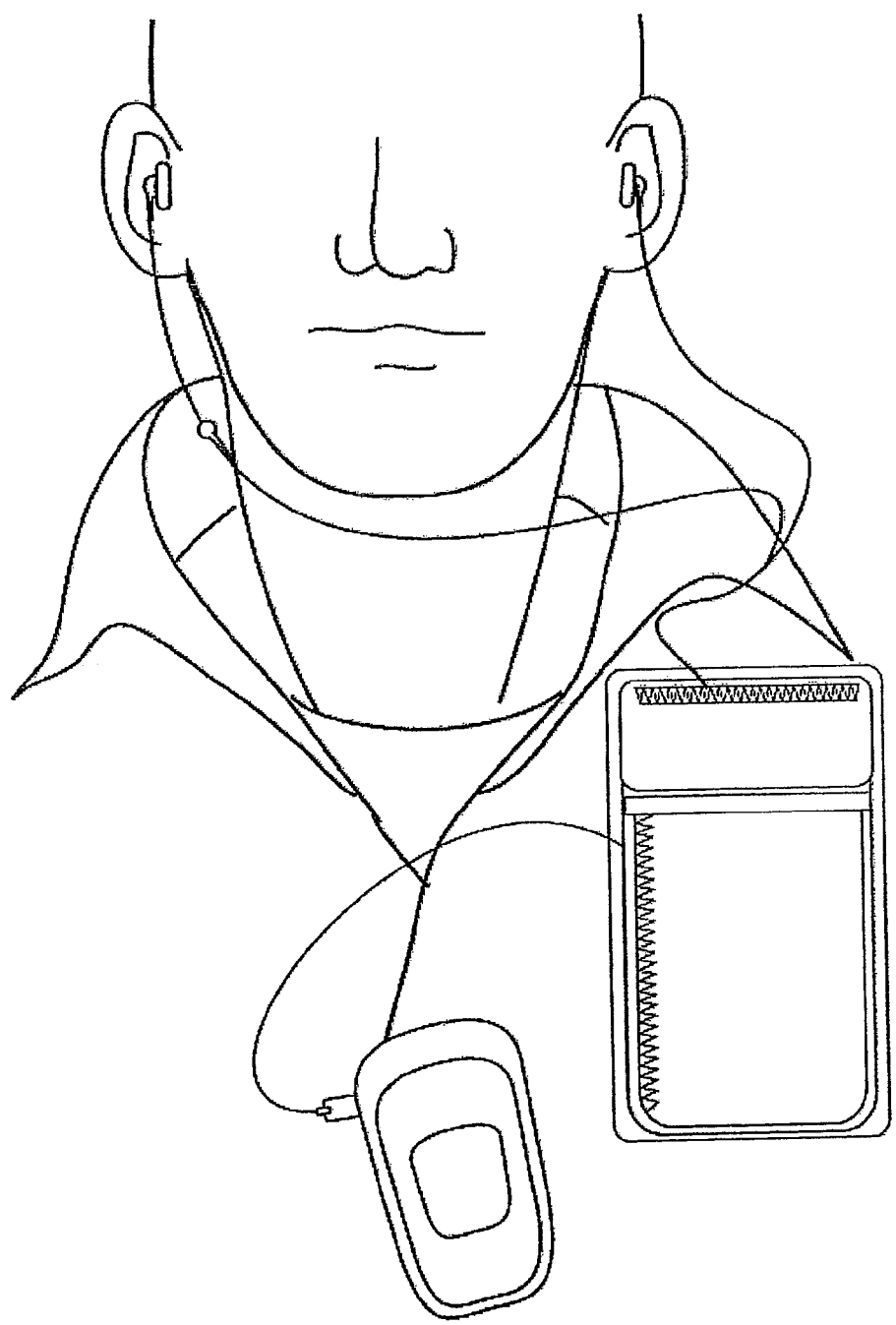
Figures 126A, 126B:
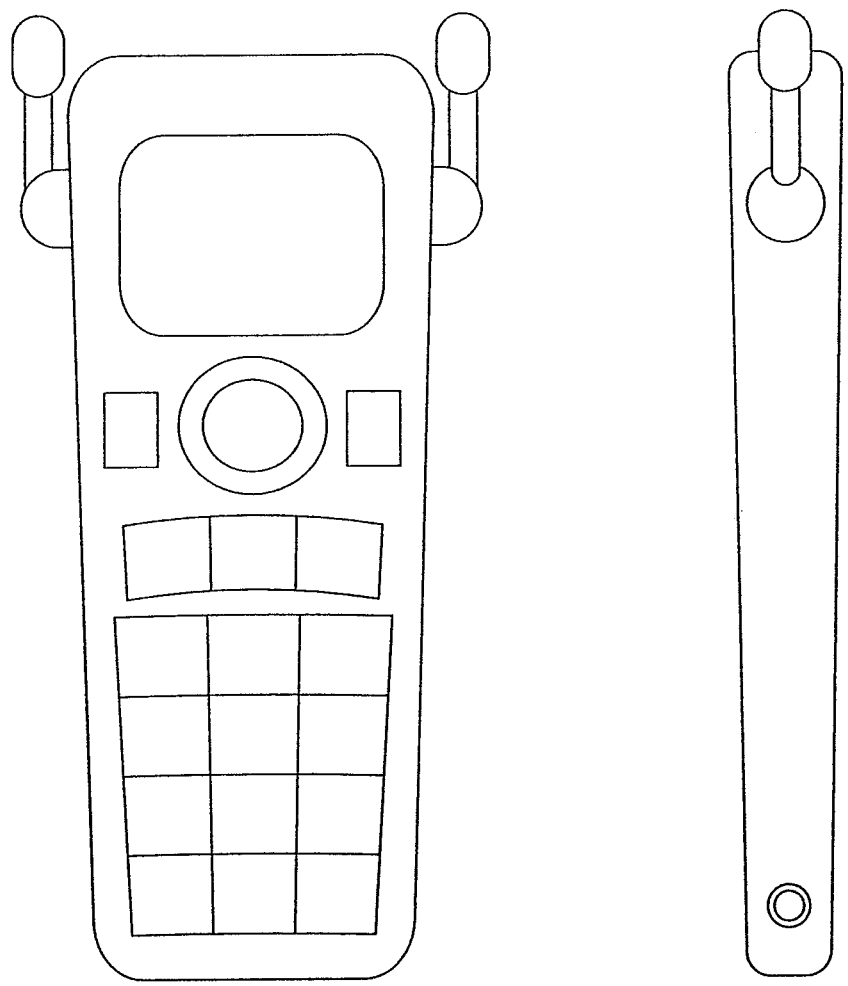
Figure 128A:
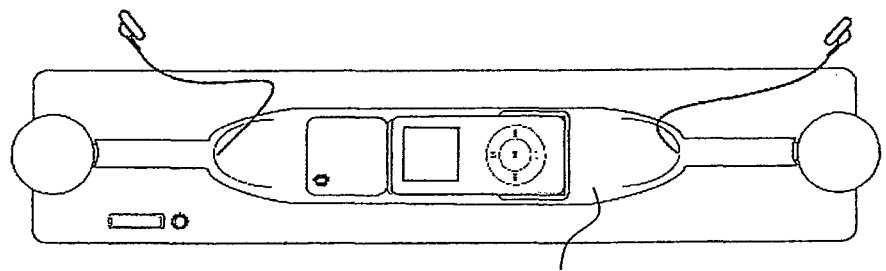
Figure 128B:
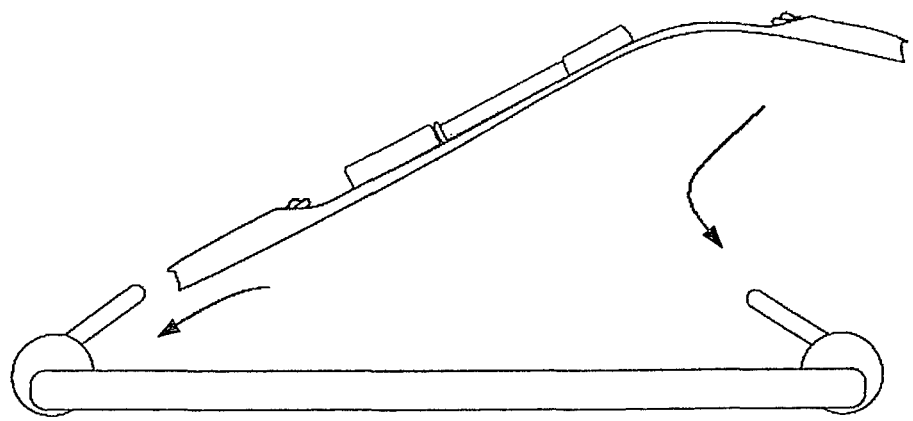
Figure 128C:
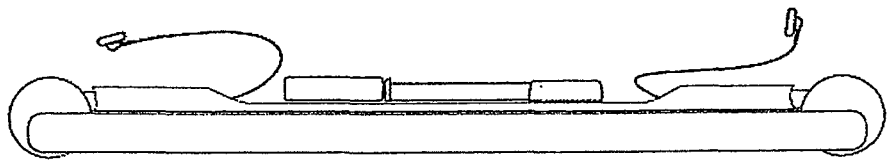
Figures 132A, 132B:
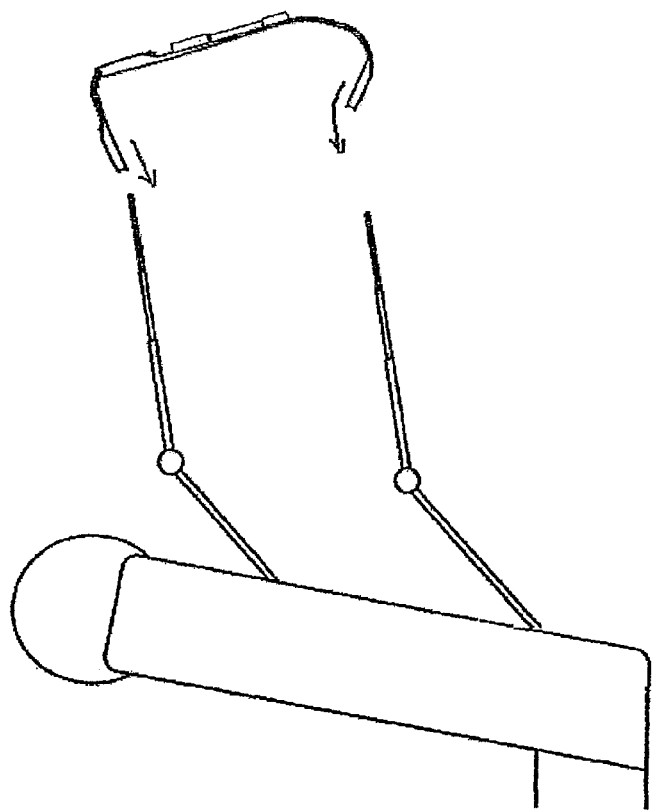
Figure 134:
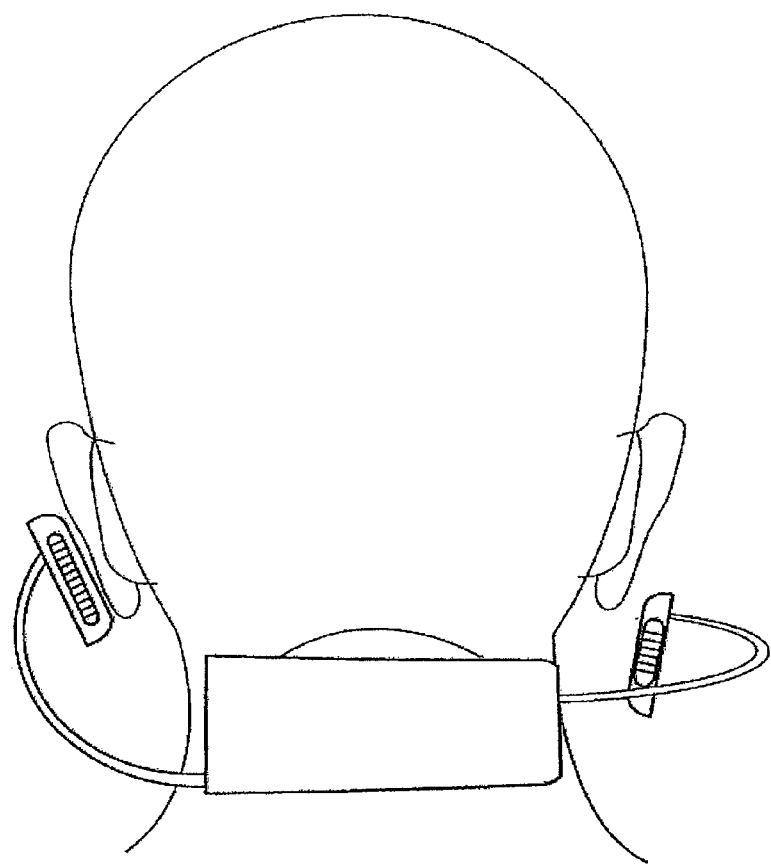
Figure 135:
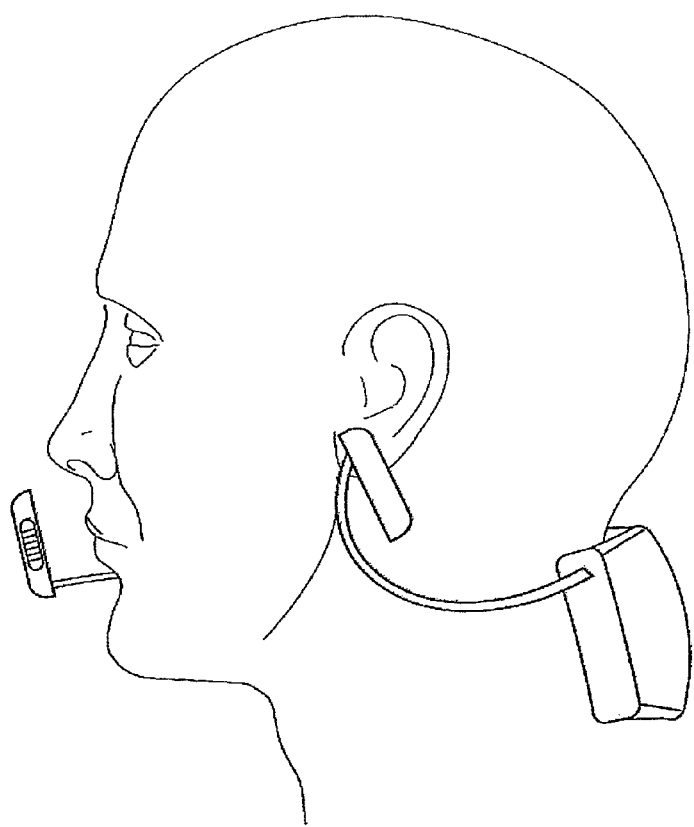
Figure 137:
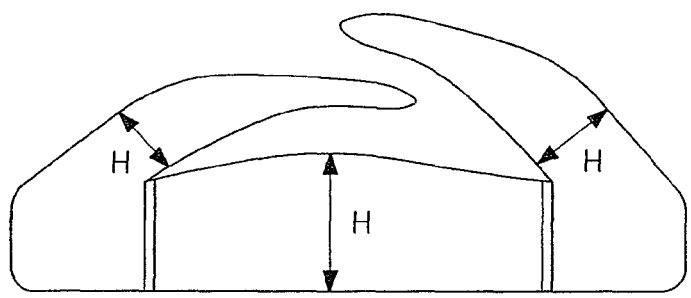
Figure 138A:
Figure 138B:
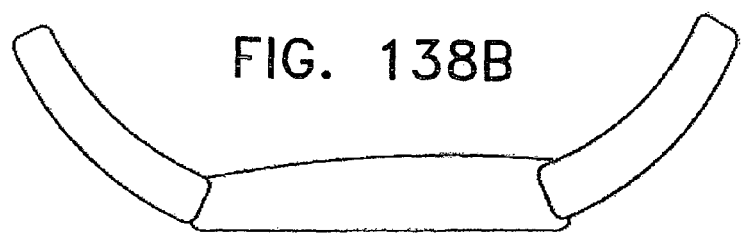
Figure 138C:
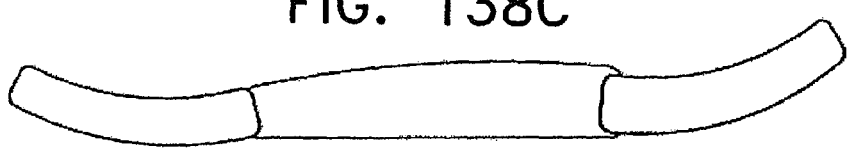
Figure 139A:
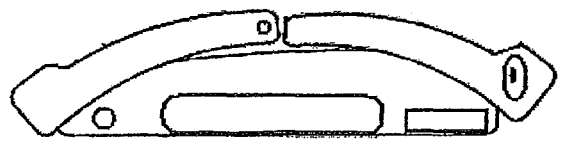
Figure 139B:
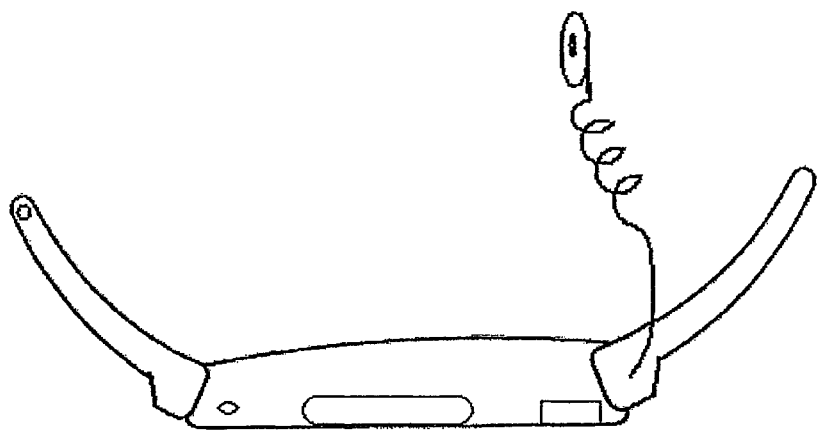
Figure 140:
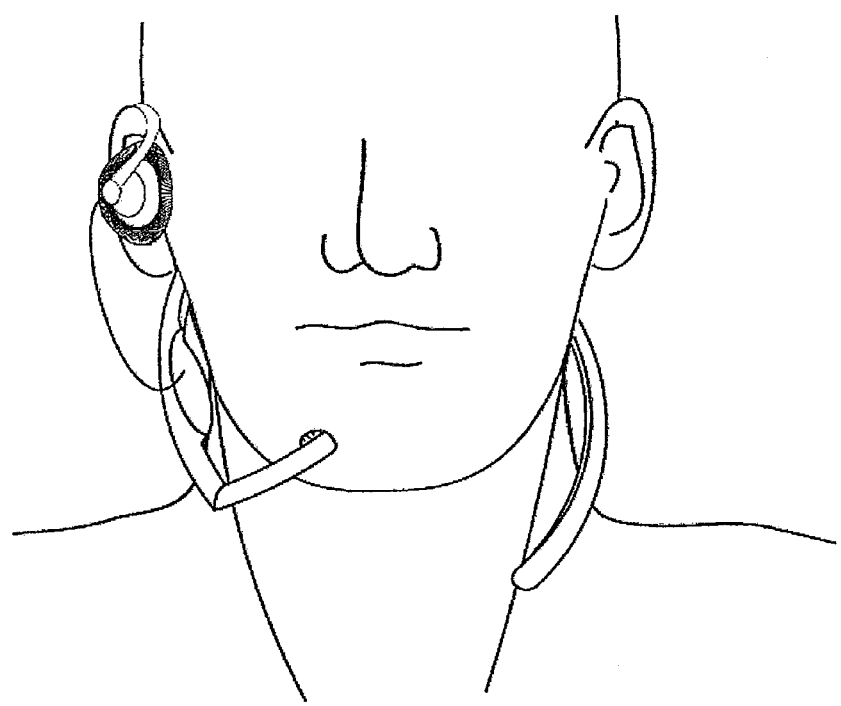
Figure 141:
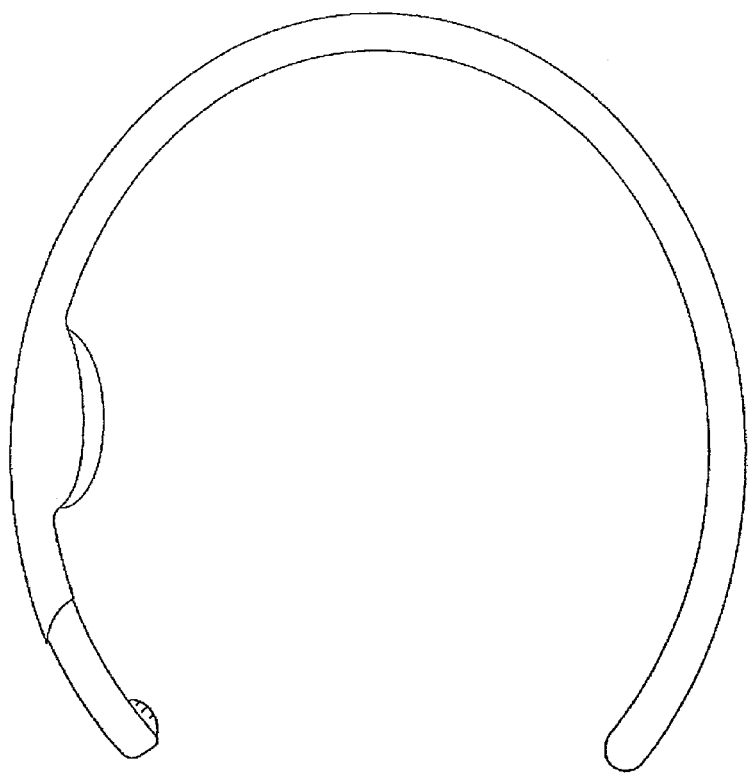
Figure 142:
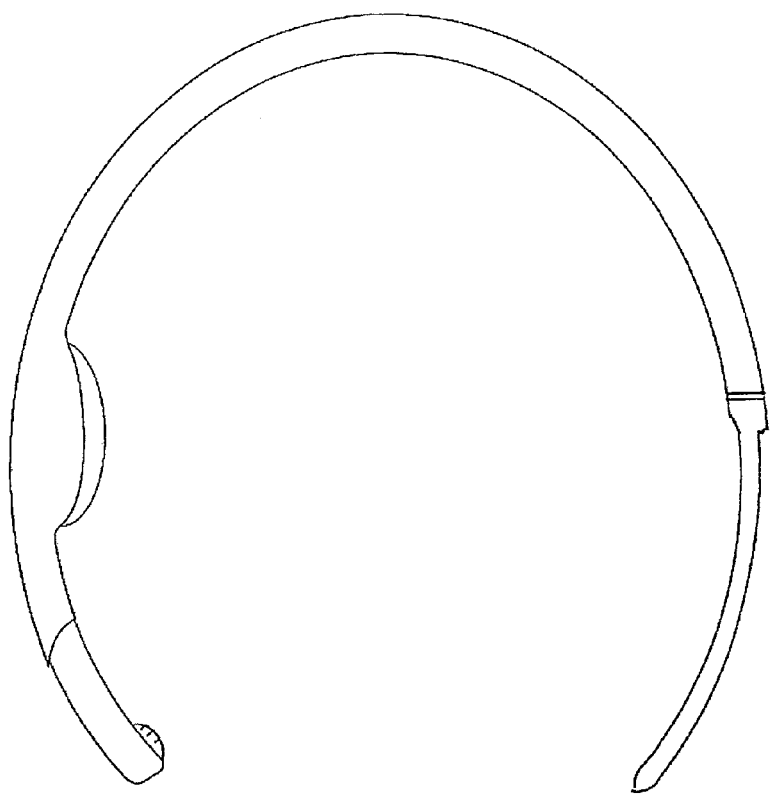
Figure 144:
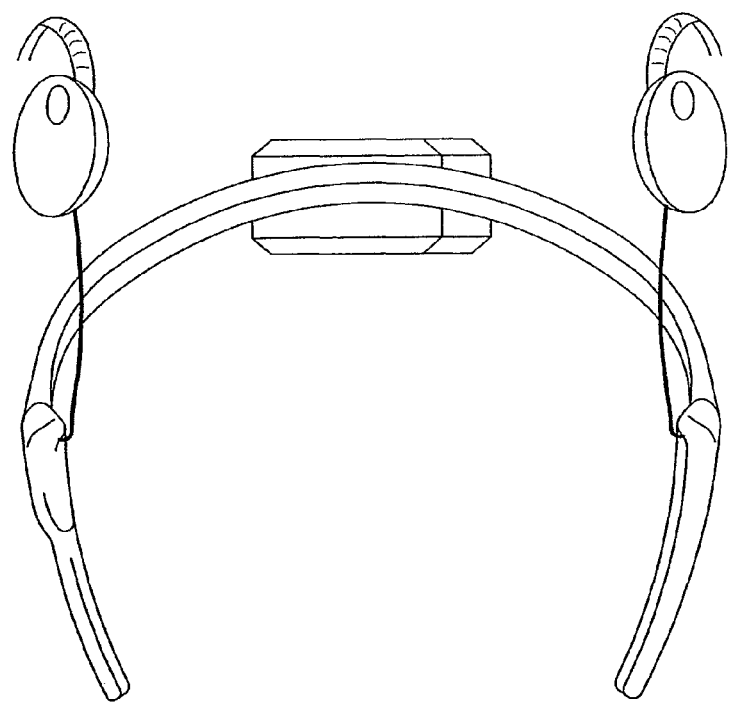
Figure 145:
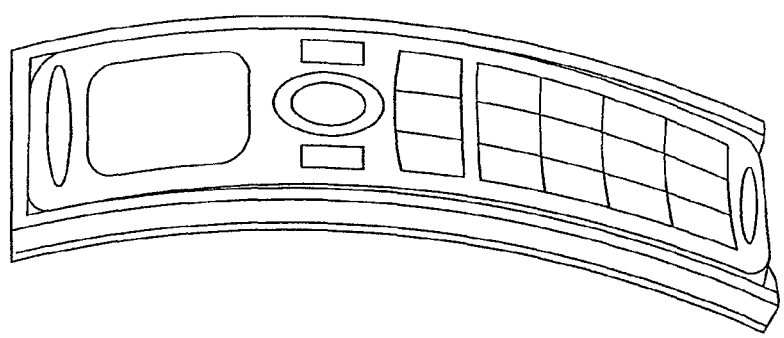
Figure 146:
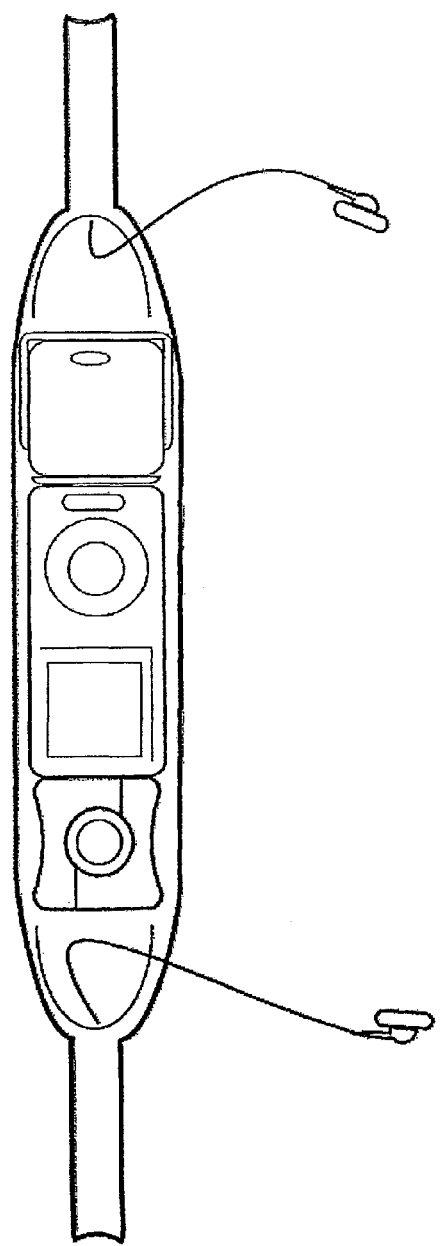
Figure 147:
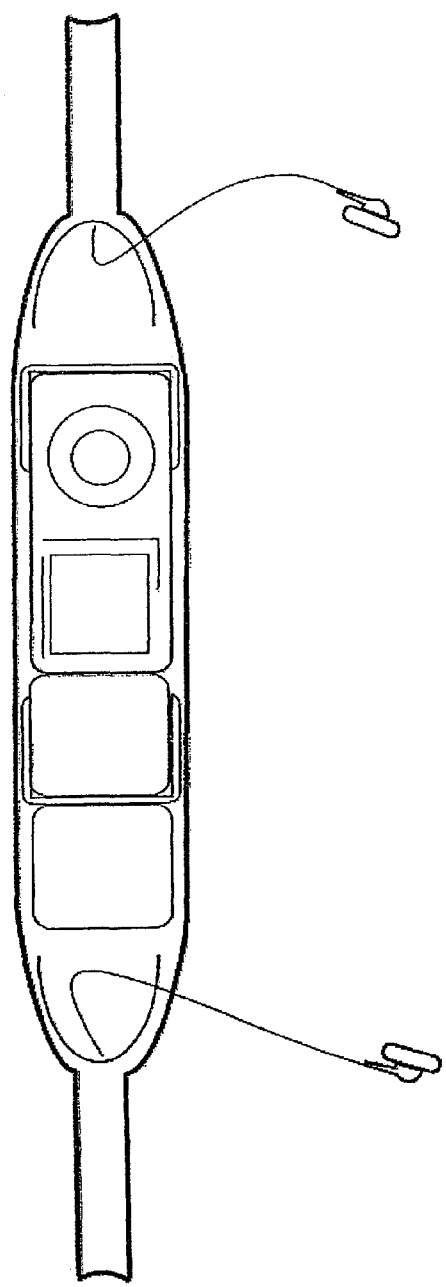
Figure 148:
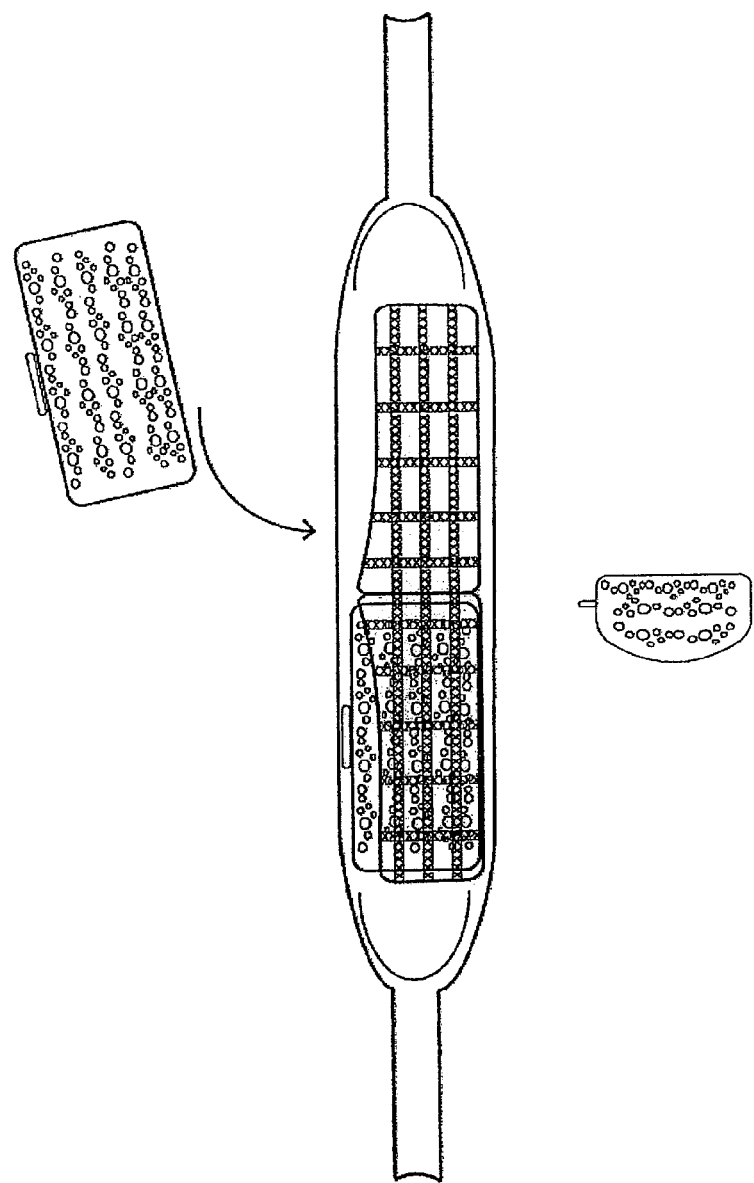
Figure 149:
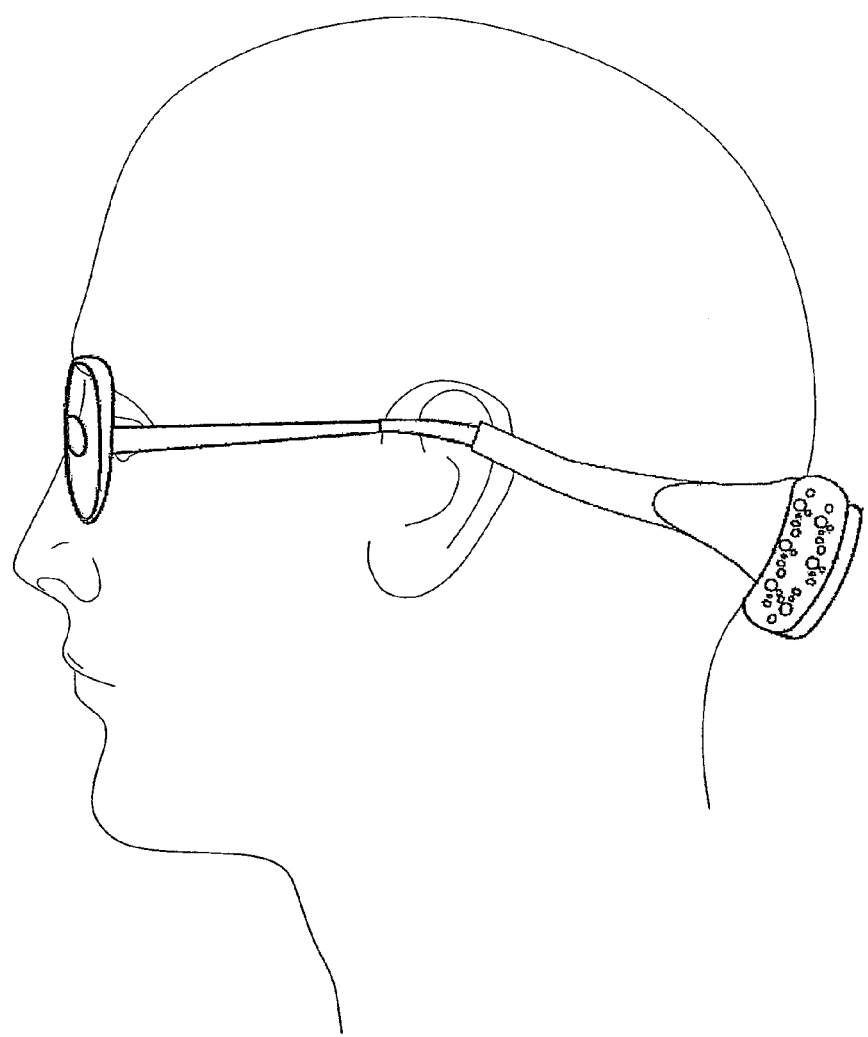
Figure 150:
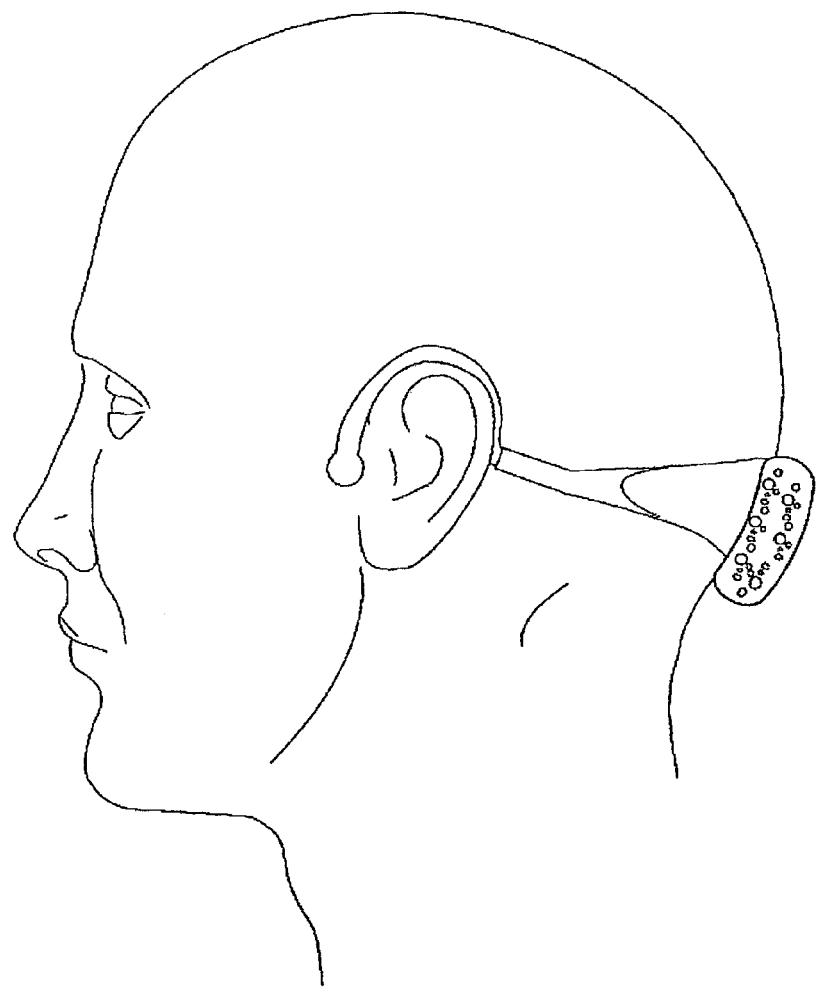
Figure 151:
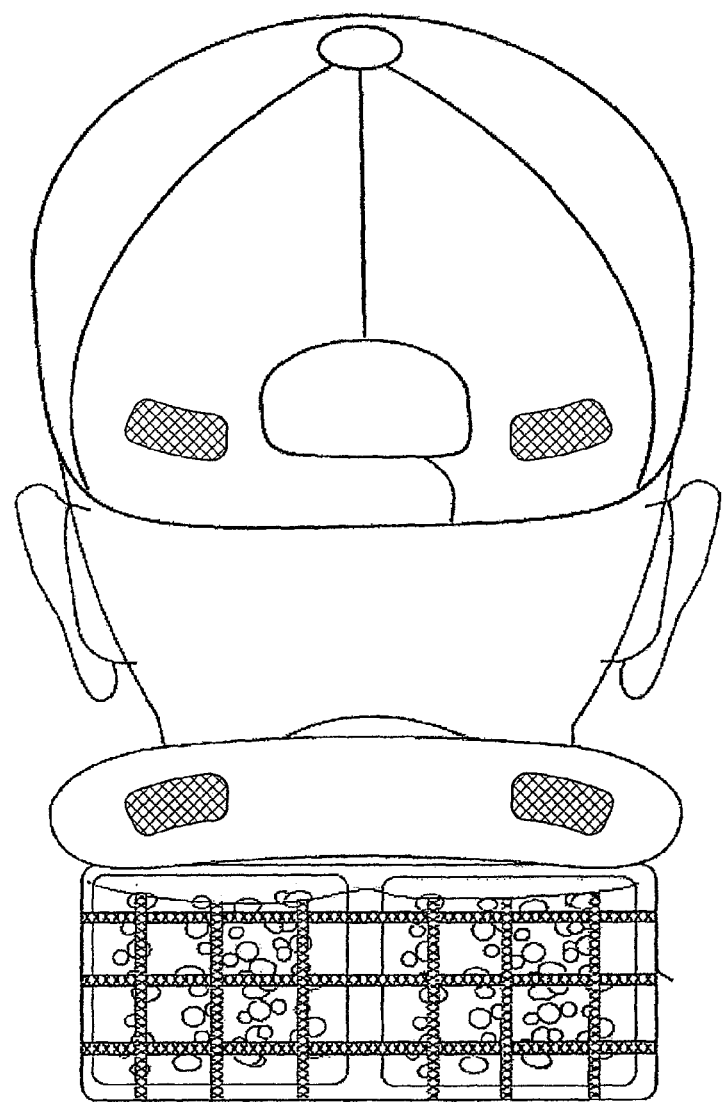
Figure 152:
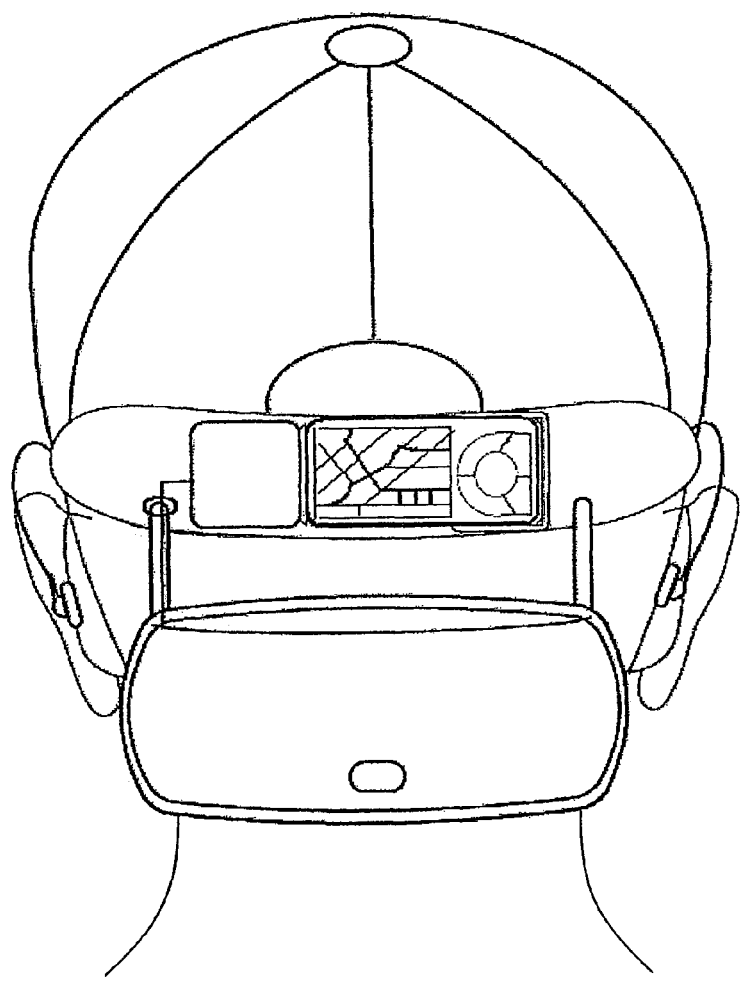
Figure 153:
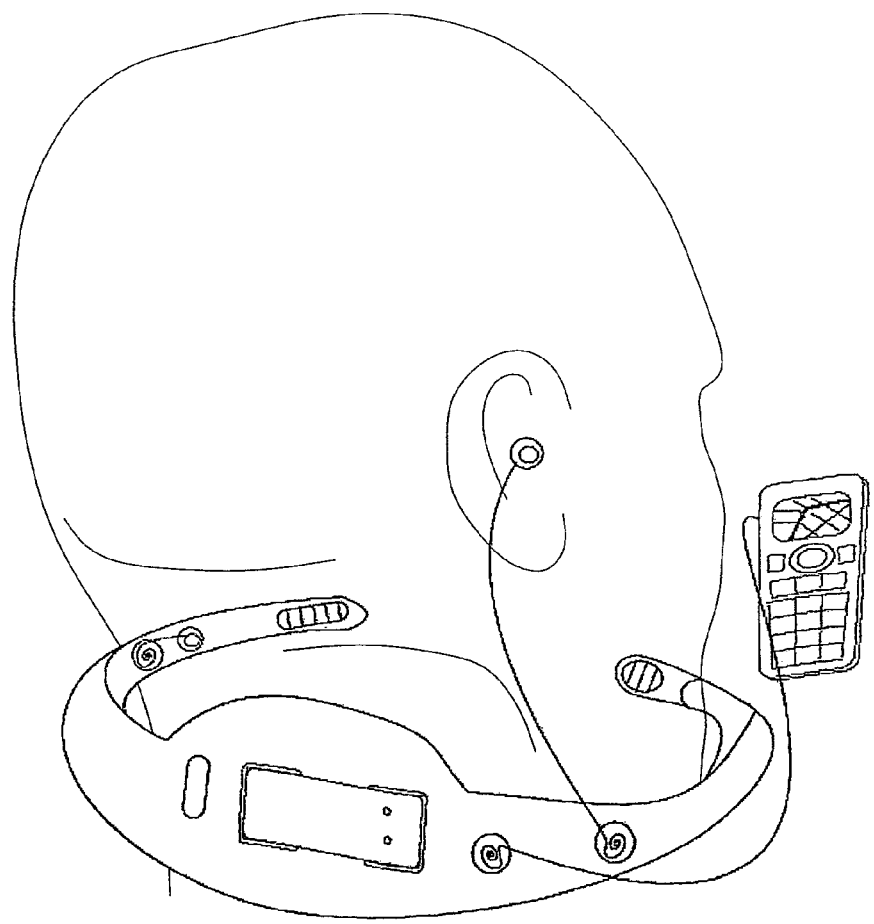
Figure 154:
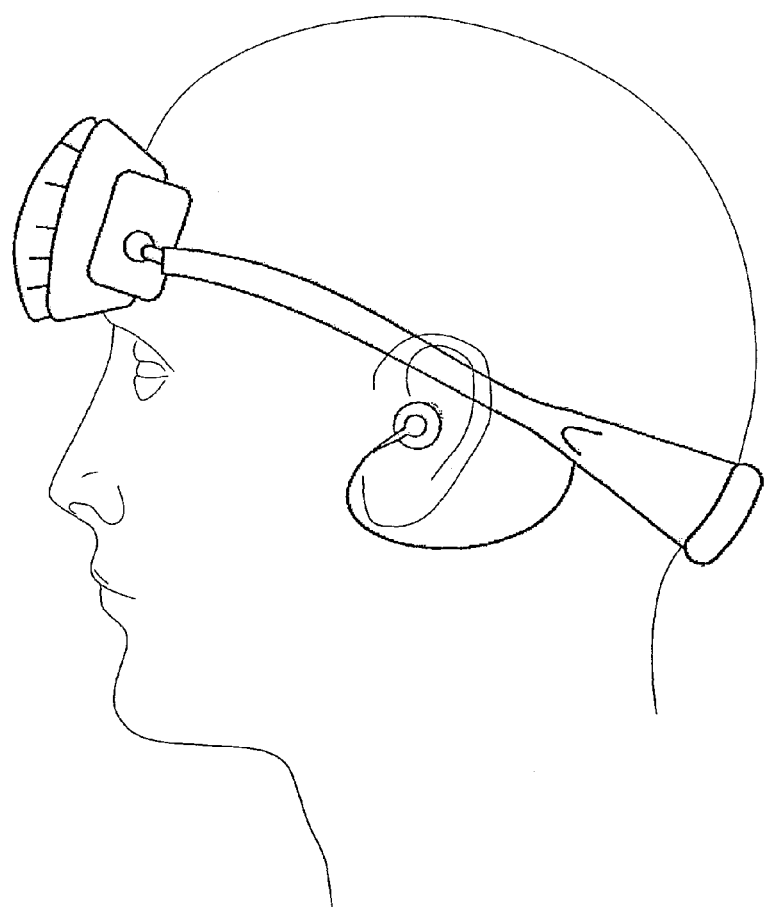
Figure 155:
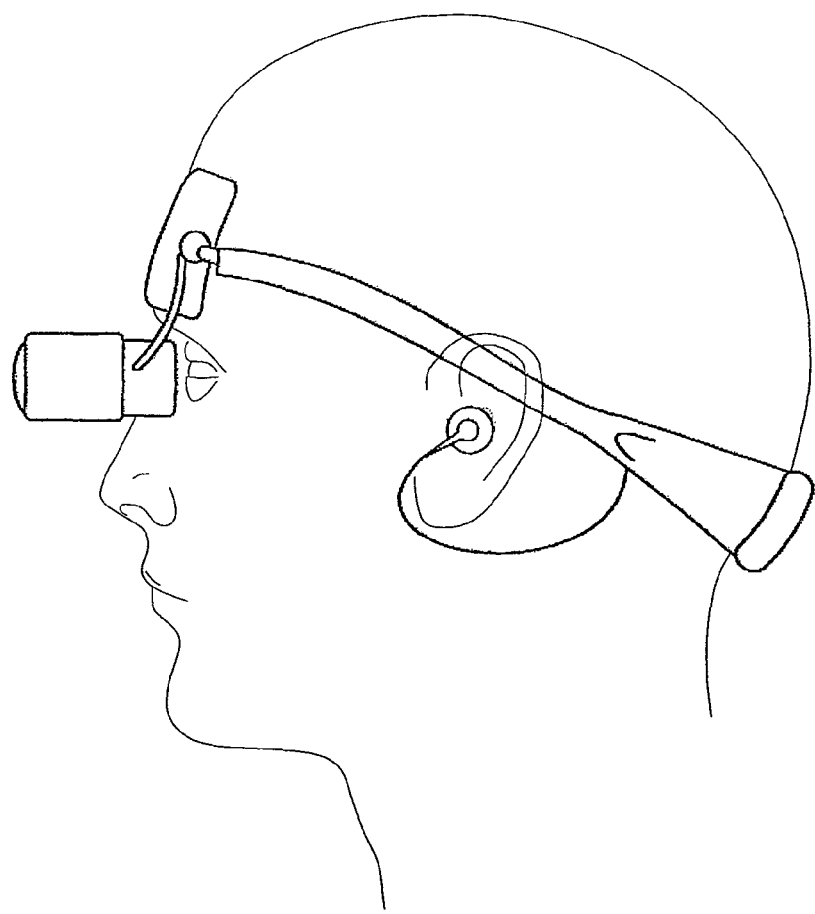
Figure 156:
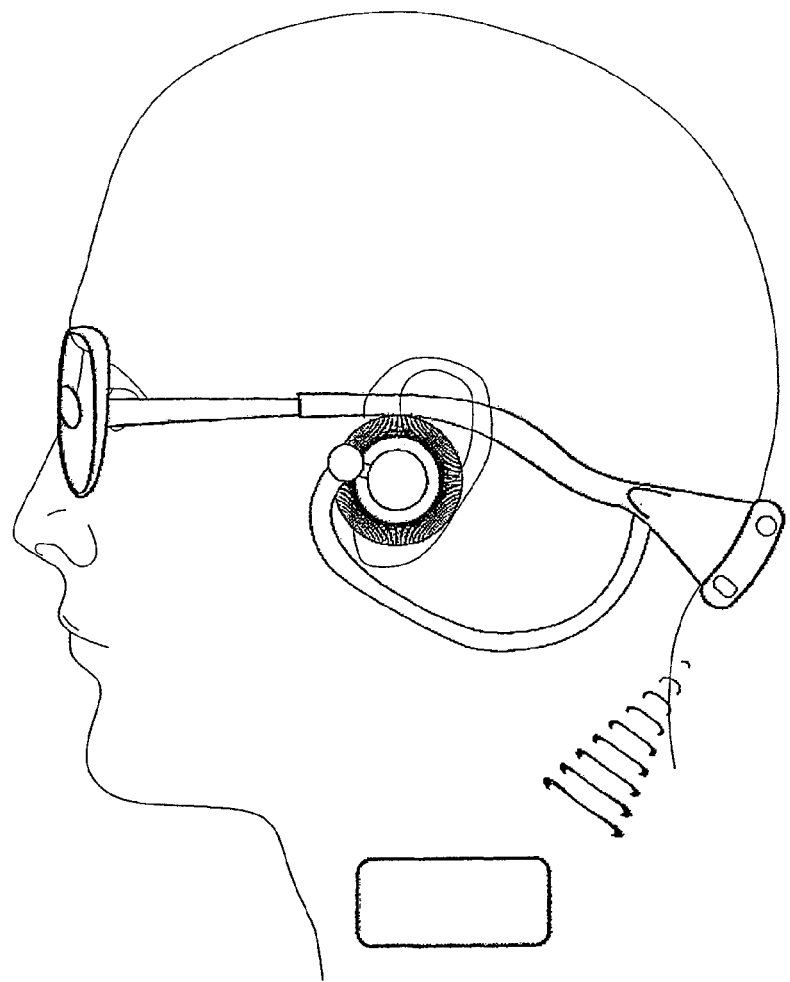
Figure 157:
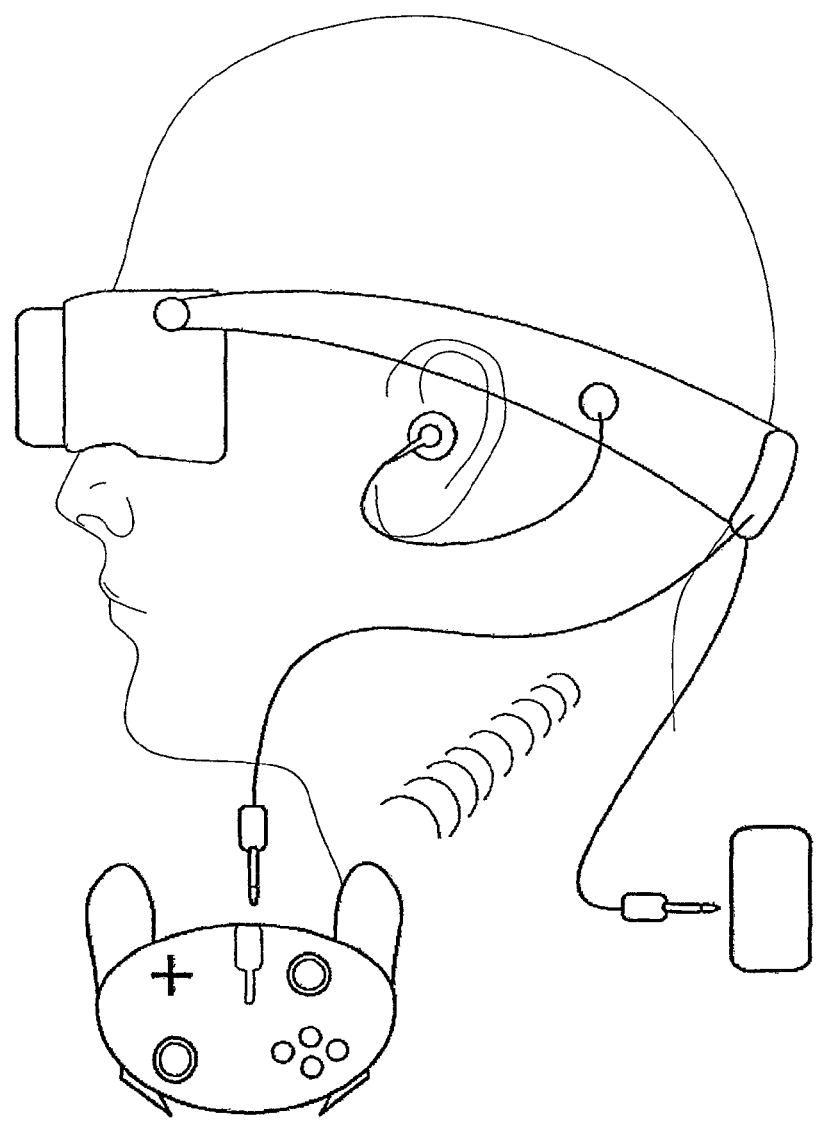
Figure 158A:
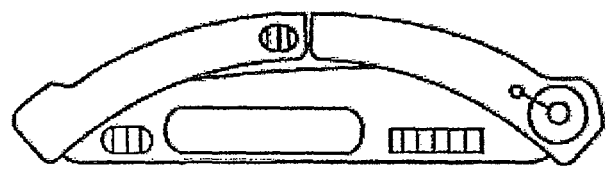
Figure 158B:
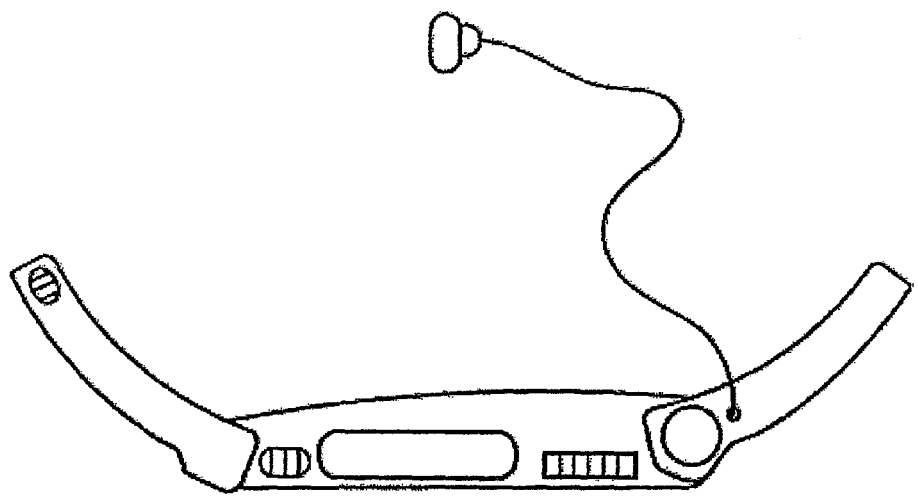
Figure 159:
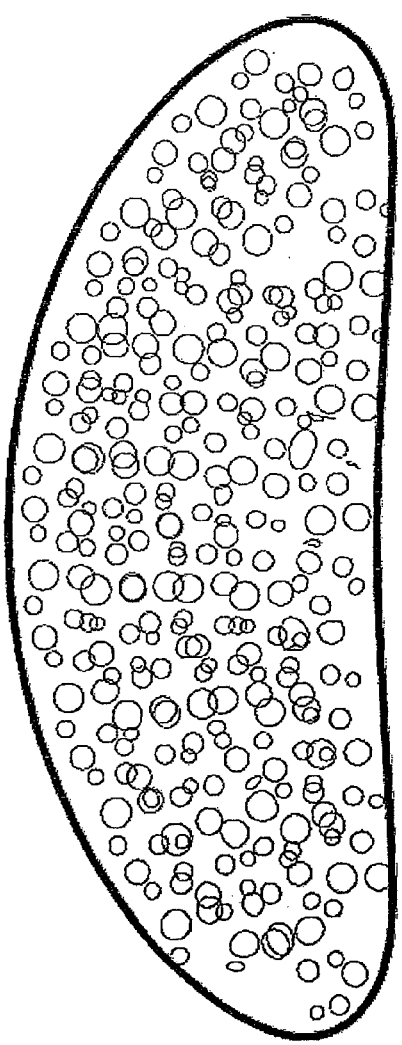
Figure 160:
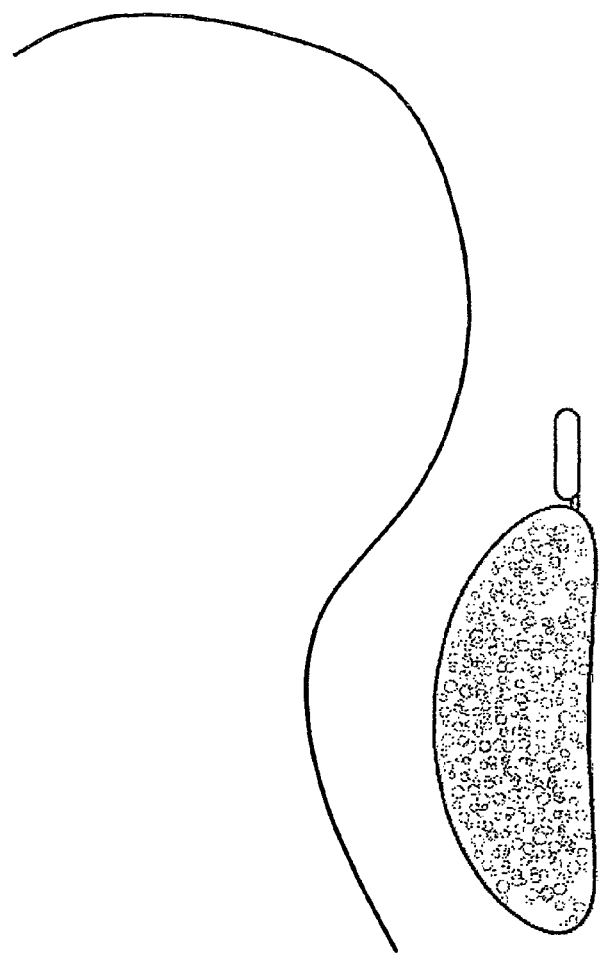
Figure 161:
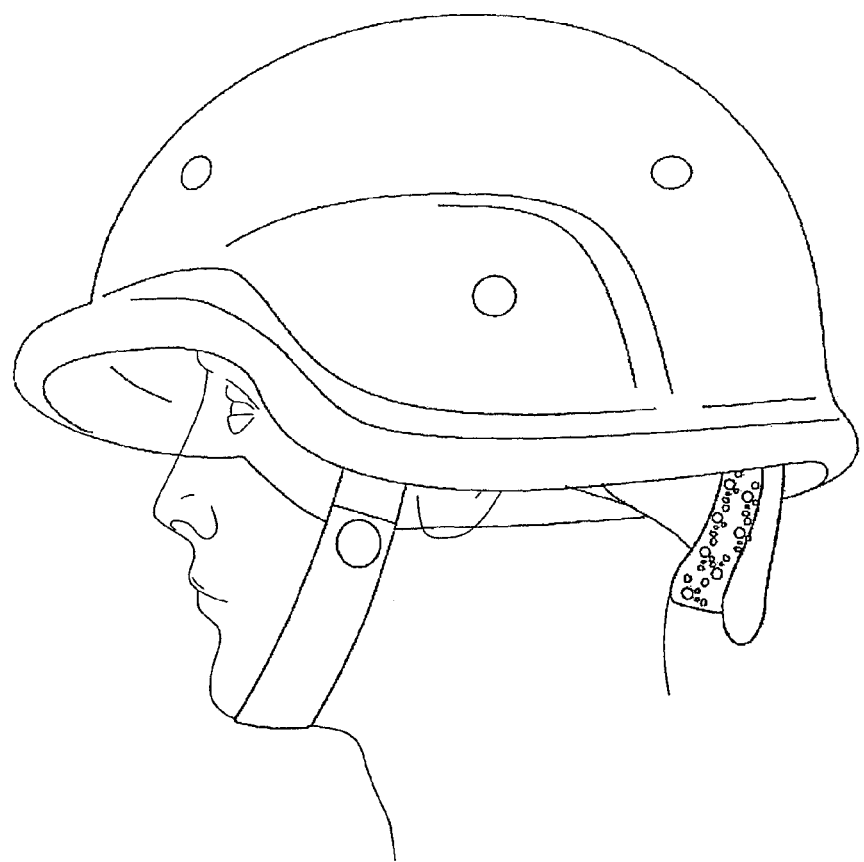
Figure 162:
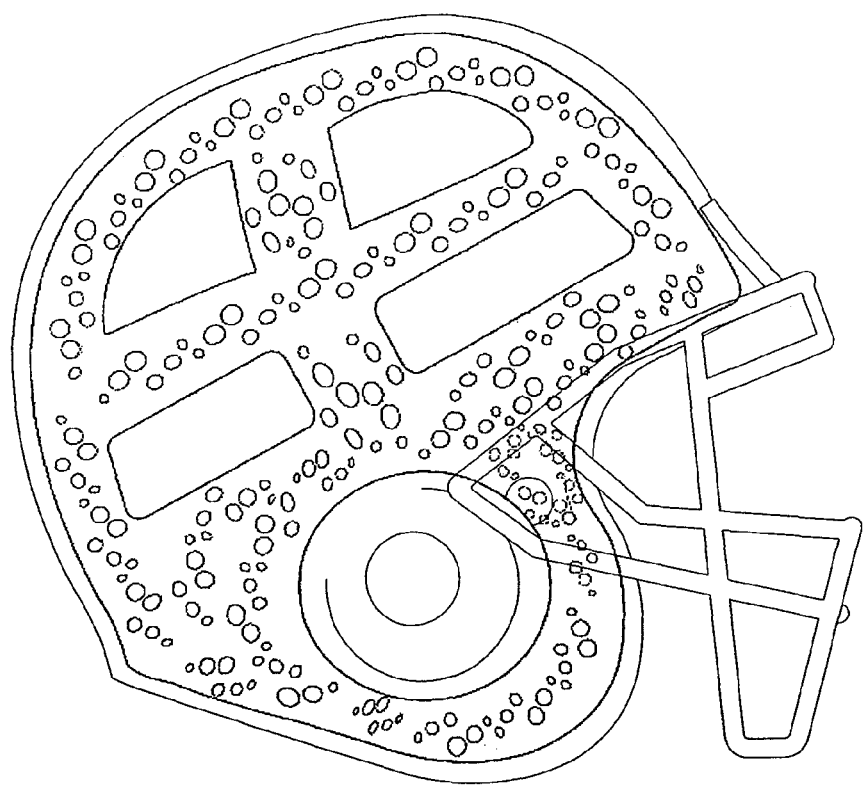
Figure 163A:
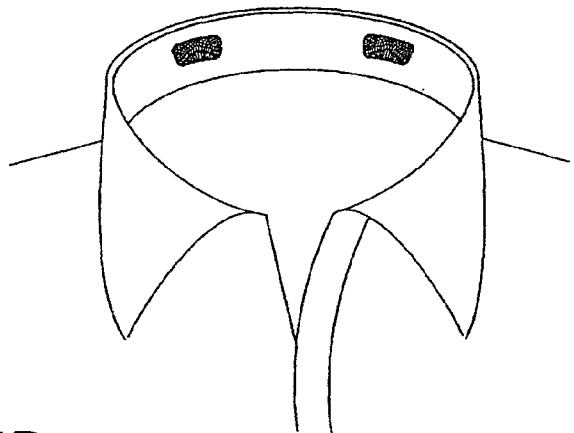
Figure 163B:
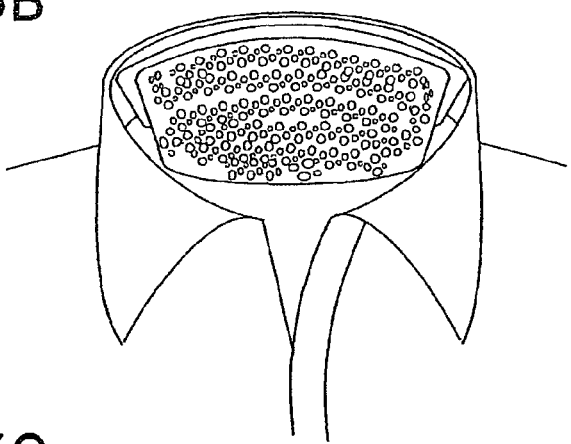
Figure 163C:
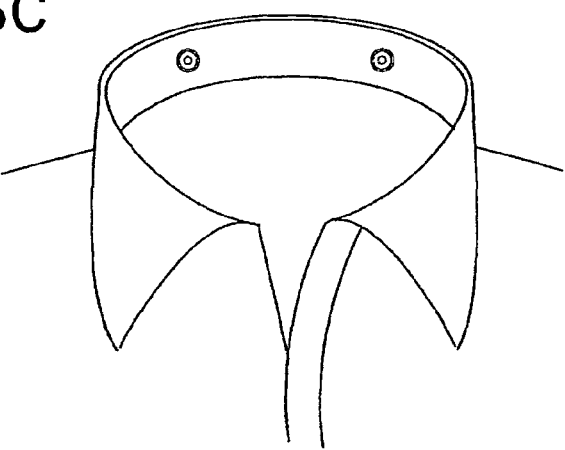
Figure 164:
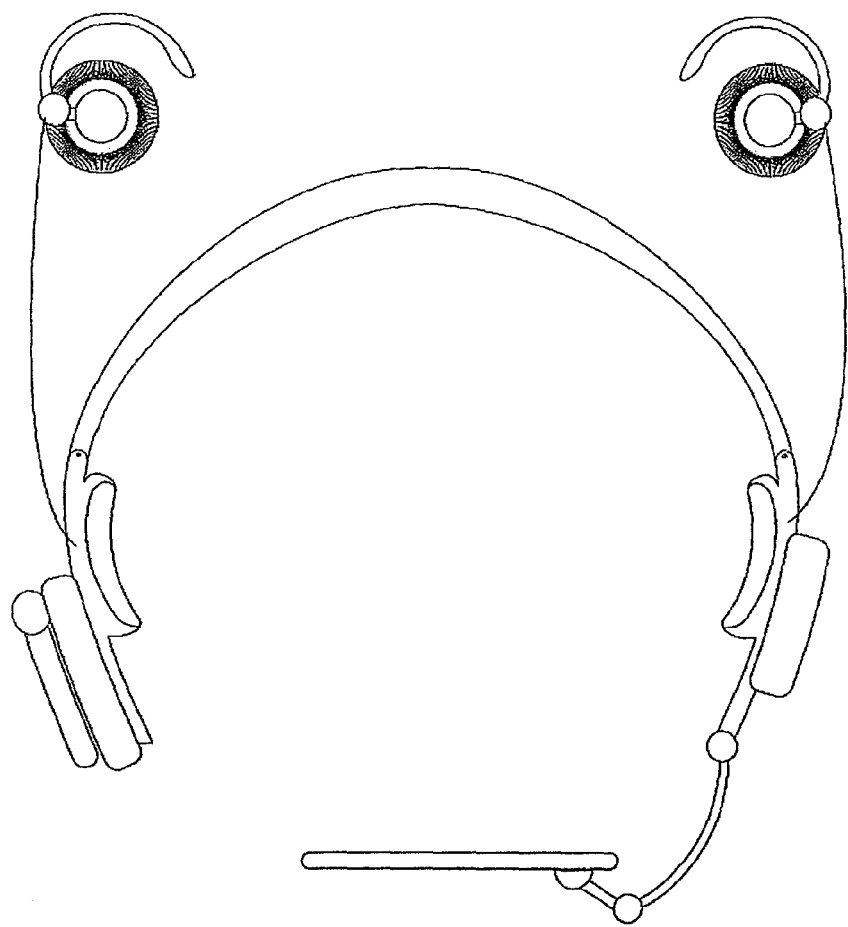
Figure 165:
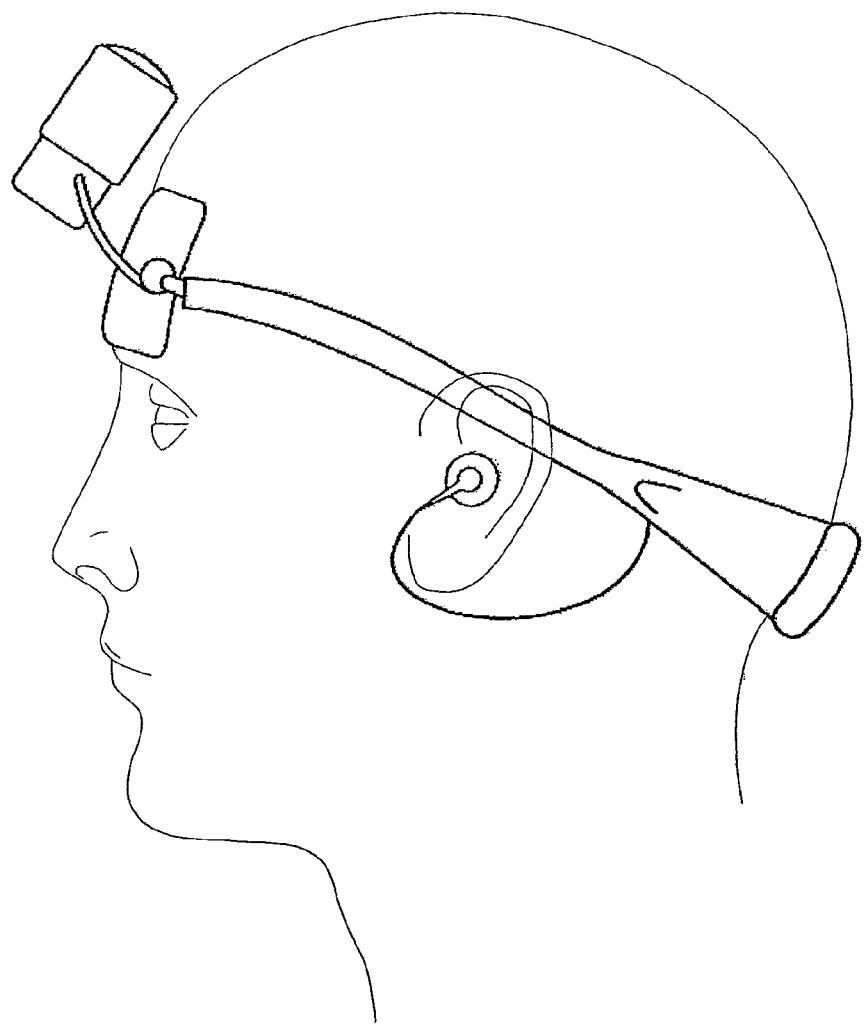

Other variations and embodiments will be apparent to one skilled in the art upon reviewing remaining FIGS. 115-

Another object of this invention is to provide a new and novel thermal pad for the application of cold or heat to the neck and/or head area for cooling or heating the brain.

A further object of this invention is to provide a storage cord adapted to secure and/or anchor a thermal pad which covers the neck area, and may extend to other areas of the head, neck, and shoulders. The best place in the head to provide the largest amount of thermal energy transferred to the brain is the back of the neck—the back of the neck has a large less insulated areas than other parts of the head since there is no thick bone, such as the skull, and a thick layer of tissue called galea aponeurotica. In addition, the carotid arteries are in closer proximity with the surface of the skin in this neck area than other parts of the head. A preferred embodiment includes a storage cord having an extended thermal pad covering the neck in which only the skin of the neck is exposed to the thermal energy and the remainder of the thermal pad facing the exterior is well insulated, preventing the warming up of the gel or ice placed inside the bag. For the purpose of illustration some figures show a mesh facing the environment in order to show the thermal pack inside the pouch. However, it is understood that any portion facing the environment includes preferably insulating material. The thermal pad container of the storage cord can also include a radiant heat-reflecting film over various portions thereof, and an insulator over the same or other portions and which together facilitate directional cooling or heating the skin area.

The thermal neck device of present invention can work as a stand alone unit or can be anchored with a storage cord holding an electronic device. The thermal neck device or thermal neck pad of the present invention applied to the neck area promotes selective brain cooling or selective brain heating for treating hyperthermia and hypothermia respectively. The brain, which is the most sensitive organ to thermally induced damage, can be protected by applying heat to the neck via the storage cord during hypothermia or removing heat during hyperthermia. The cooling or heating is selective since the temperature of the remaining body may not need to be changed, this is particularly important when cooling the brain for treating patients with stroke or any brain damage. The majority of the brain tissue is water and the removal or application of heat necessary to cool or heat the brain can be precisely calculated using well known formulas based on BTU (British thermal unit). A BTU is the amount of energy needed to raise the temperature of a pound of water 1 degree F., when a pound of water cools 1 F., it releases 1 BTU.

The thermal pad of the storage cord for therapeutic treatment of excessive heat or excessive cold in the brain preferably includes a pouch for receiving a thermal bag (or thermal packet or thermal pack) having a substantially convex surface including a comma, banana, or circular shape, with said thermal pack being preferably in complete overlying relationship with the entire neck, said bag including an outer wall and an inner wall defining a sealed cavity to be filled with ice, gel-like material, water, solid material, and the like, for cooling or heating the skin area overlying the neck and adjacent areas to the neck and shoulder.

An exemplary brain cooling or brain heating device includes hot and cold pad or pack adapted to fit and match the neck anatomy and comprising a preferably flexible and sealed pad and a gel within said pad, said gel being comprised of a mixture of water, a freezing point depressant selected from the group consisting of propylene glycol, glycerine, and mixtures thereof associated with other compounds such as sodium polyacrylate, benzoate of soda, hydroxibenzoate, and mixtures thereof and a thickening agent. Any other cooling or heating device or chemical compounds and gels including a combination of ammonium nitrate and water can be used as cooling agent as well as heating agents such as a combination of iron powder, water, activated carbon, vermiculite, salt and Purge natural mineral powder. In addition, electric, such as Peltier device, a serpentine circulating water or fluid, and the like anchored or as integral part of the storage cord can be used. In this embodiment, the electrical portions, small motor for moving water in a serpentine, heating and cooling electrical parts and electronics including microprocessor can be housed in the storage in a permanent or releasable manner, exemplifying thus other embodiments for the DEP of this invention.

Figure 166:
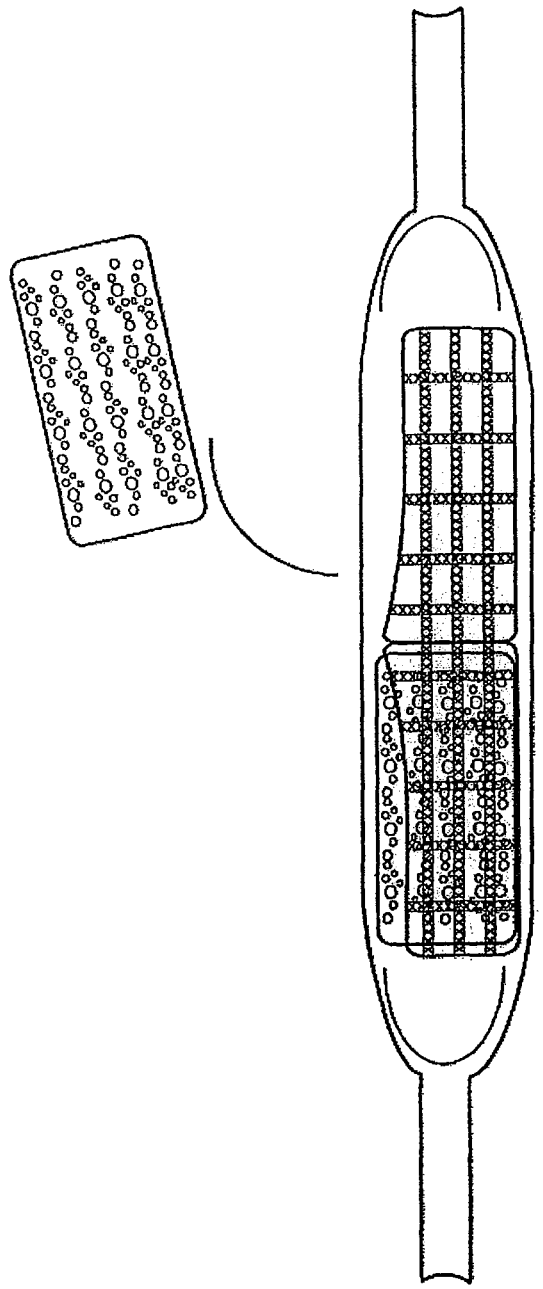

FIG. 166 shows a diagrammatic view of a preferred eyeglasses thermal pack cord also referred to herein as eyeglasses cold/hot pack adapted for use with an eyeglasses, and having two sleeves for anchoring to the temples of eyeglasses and central portion that has means for holding thermal bags. Any means to hold thermal bags in the central portion of the storage cord can be used. The eyeglasses storage cord illustratively has two pouches or pockets for receiving thermal bags, with a mesh like structure forming the pouch. The mesh like structure is preferably the face of the pouch in contact with the skin while the opposite face of the pouch comprises insulating material, such as Thinsulate, polyurethane layer, polypropylene layer, Mylar, and the like. The left pouch is shown having a thermal pack and the right pouch is shown empty, and about to receive a thermal pack. The portion of the pouch facing the skin is made in a way to allow unobstructed transfer of thermal energy from thermal bag to the skin including minimal amount of material disposed between the bag and the skin. The pouch may further comprise no material between bag and skin, and in this embodiment the bag is hold in the pocket by flanges in the periphery preferably with some elasticity for more stability.

Figure 167:
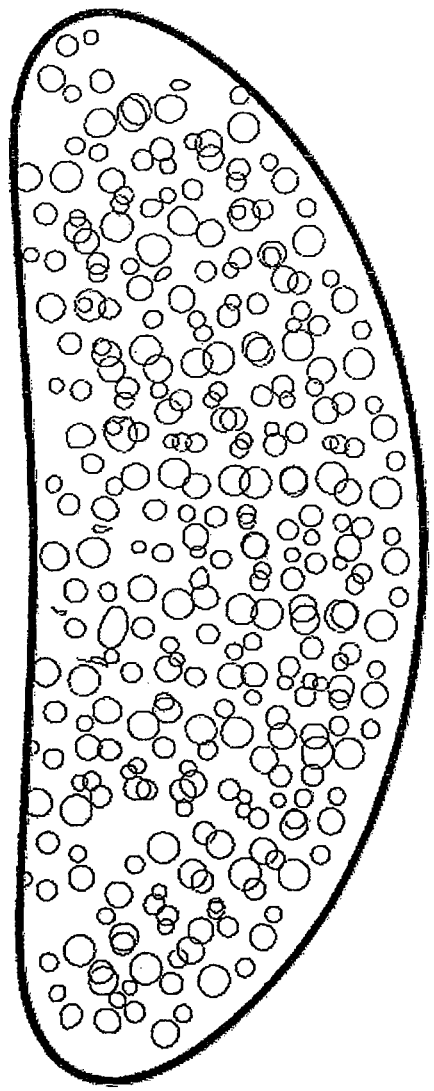

FIG. 167 shows in more detail a perspective view of the single cold/hot pack device, represented by a device to be applied to the back of the neck, including preferably a pad having one generally convex surface and an essentially flat or slightly convex surface, with said surfaces being sealed in a conventional fashion at its ends to enclose a quantity of a gel-like material which fills the pad sufficiently to enable said pad to be closely conformed to the anatomy of the back of the head and neck area.

FIG. 168 shows the specialized convex surface of the cold/hot pack of the invention and the matching surface of the back of the head and neck area. The cold/heat pack preferably includes a lip, handle or any means to facilitating grasping the pack for placement in or removal from the pocket. The cold/heat pack device can include a pillow-like configuration which permits better molding of The surface opposite to the skin or facing the environment may include a hard part made preferably of hard rubber or plastic attached to a bag made of soft plastic with said bag containing gel and being deformable upon external pressure. The surface of the bag facing the skin may also contain an adhesive portion in its periphery for better conforming and apposing to the skin of the neck. Any suitable adhesive for skin including double sided tape can be used.

For one of the preferred embodiments, prior to use the thermal pack would be put into a freezer or other chilling device for use as a cold pad or would be put into hot water to be used as a hot pad. The thermal pad preferably comprises a tough flexible envelope of plastic material. The material within the thermal pad is preferably a gel which will maintain its gel-like consistency over a wide range of temperatures. There exist many gels which can be cooled to freezing and which absorb heat during warmup. There are a number of different types of such gels. Some of them freeze solid, and some are flexible even at 0 degrees F. Cold packs such as a frozen water-alcohol mixture can also be used. Alternatively, a thermal pad includes a bag having inner and outer walls lined interiorly with plastic which define a cavity to be filled with ice, or fluid such as water, through an opening in the bag. In this instance the bag is preferably sealed with a rubber material or a water-proof material.

Although flexible plastic is described as a preferred material for containing the gel, it is understood that any material or fabric can be used including vinyl, cotton, rayon, rubber, thermoplastic, synthetic polymers, mixtures of materials, and the like. The size and shape of the pad structure is adapted to fit the special anatomy of the back of the head and neck and for matching the special geometry of the anatomic area. By using detachable thermal bags secured inside pockets, the bags can be easily replaced when said bags return to the original temperature. Therefore, in the summer time, when the bags, which were initially cold, invariably become hot as a result of the second law of thermodynamics, said bags can be easily replaced by a cold one. Accordingly, the invention includes a kit comprised of an insulating container having at least one thermal pack. The kit may also include a storage cord, and yet further include an electronic device, and furthermore can include a wearable article. The kit can include an insulating container and a box holding the other articles.

Any cooling or heating device known in the art can be used in the pad treatment device including hot or cold water flowing through tubes that are adapted to carry or deliver heat to the area. The tubes can be mounted in any head gear or the frame of eyeglasses, pumping mechanisms can be mounted in the head gear or eyeglasses for providing a continuous flow of water through the tubes. The pad can be connected to tubes which have connectors for joining to a water temperature control and circulating unit in the storage cord anchored to head gear or eyeglasses. Hot or cold liquid is circulated through tubes which are in communication with each other and which deliver or remove heat from the neck area.

Clip, elastic band, hook and loop fastener, and the like can be used for securing the storage cord thermal pad in position. Any of the support structures mentioned herein can be used to secure the storage cord thermal pad in position including a piece of glue. For example, the thermal pack can include a clip like mechanism to be anchored to a storage cord or the thermal pack can be secured to the temples of the frame of eyeglasses.

Head mounted gear including helmets and caps can include an extension covering the neck, said extension having a pocket for receiving a thermal bag of the invention. The extension having thermal pouches can be permanently attached to the head mounted gear or being releasably connected to said head mounted gear. The extension can include cooling or heating devices for delivering or removing heat from the neck area. The head mounted gear can also be adapted to receive a thermal pack without an extension. In this embodiment the head mounted gear has a recess or cavity which can receive the thermal bags. A helmet with such extension or cavity can be useful during sports. The thermal bag is secured in the cavity or extension with pockets at the beginning of the physical activity. During a break the thermal bag is removed and then replaced with a new one having the desired temperature for example to reduce the temperature in the brain of a football player in the summer, or for warming up the brain of a skier during a winter competition.

An alternative embodiment includes a thermal pad anchored to the storage cord for supplying water to evaporatively cool the neck area. In this instance the cold feeling is generated by evaporative cooling in the neck area directly on the skin or by a piece of material which retains water.

Any cooling or heating device can be used to cool or heat the neck area for selective brain cooling or brain heating, preferably using a moldable device that conforms to the anatomy of the region, with directional temperature control properties for cooling or heating the skin. Any of the devices for heating or overheating or for cooling, including electrical, chips, semiconductor, polymers, and the like known in the art as well as described by Abreu in U.S. Pat. No. 6,544,193, herein incorporated in their entirety by reference, can be adapted in support structures connected to or being part of a storage cord for positioning at the neck area, and used for cooling or heating the brain.

The present invention provides a moldable thermal pad or thermal pack in a packaging arrangement that can provide surfaces of differing thermal conductivities and heat reflecting properties so as to prolong the useful cooling/heating time thereof. The construction and materials of the thermal pad or thermal pack permits the molding of its shape and the retention thereof to the neck and back of the head site on the skin between the eye and nose. The materials disclosed herein can remain flexible plastic for temperatures in the range of $-10°$ C. to $140°$ C.

FIG. 169 shows a side view of an eyeglasses thermal pack storage cord of this invention being worn and used by user. Sleeve—has been attached to temple—, holding storage cord—with thermal pack—located in apposition to the skin of the back of the head and neck—, and preferably positioned in the neck area. The embodiment includes an insulating material facing the environment and covering the thermal bag, said insulating material can include an armored material, which can protect the neck of military and law enforcement personnel against being shot while keeping adequate brain temperature for mental and physical performance.

FIG. 170 shows an alternative embodiment of FIG. 169 including an additional pouch or pocket adjacent to the thermal pack pouch. The thermal pack—is shown including a bag with gel—with said bag having two surfaces, one facing the skin and positioned at the back of the head area, and a second surface facing the additional pocket. This additional pocket can include any of the embodiments of the invention, such as for retaining and electronic device and may include other parts such as spools, wires, and the like.

Figure 171:
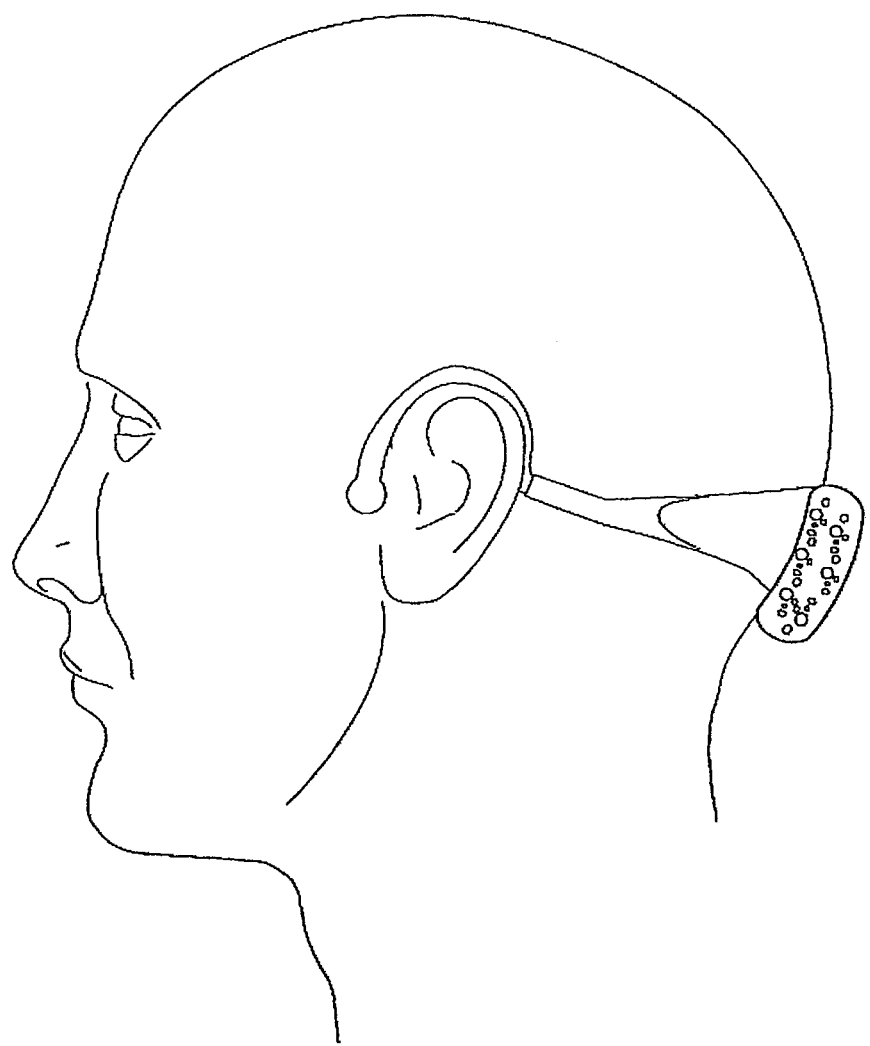

FIG. 171 shows a side view of an alternative embodiment of the thermal pack storage cord of this invention being worn and used by user and including a wrap around the ear configuration having a hook and arm, said hook secured to the ear and said arm being disposed along the side of the head. Sleeve—has been attached to the arm, holding storage cord—with thermal pack—located in apposition to the skin of the back of the head and neck—, and preferably positioned in the neck area. It is understood that the storage cord can be permanently affixed to the arm forming one piece structure. In this embodiment the arm may include adjusting mechanism for adjusting to different sizes of heads.

It is understood that a ring shape surrounding the head can also be used or a shape that includes other parts of the face/forehead as long as there is conformation and apposition of the thermal pack to the anatomy of the area, and in particular to the neck area. In order to adjust to different head sizes this invention includes an embodiment with a slit, and the edges of said slit having a Velcro surface for sealing in different positions and thus reducing/increasing the size of the device. This slit configuration can be applied to any of the embodiments including neck thermal pack, head/neck thermal pack, and ring thermal pack.

The thermal pack can be moldable and the container or bag constructed with materials that are deformable and otherwise pliable over the temperature range of use so as to conform to the anatomy of the neck area. A central essentially slightly convex area in the thermal bag allows for intimate interaction and thermal energy transfer at the neck area, but it is to be recognized that the specific shape of the convex area of the thermal cold/heat pack itself can be slightly varied according to anatomic differences between people.

Figure 172:
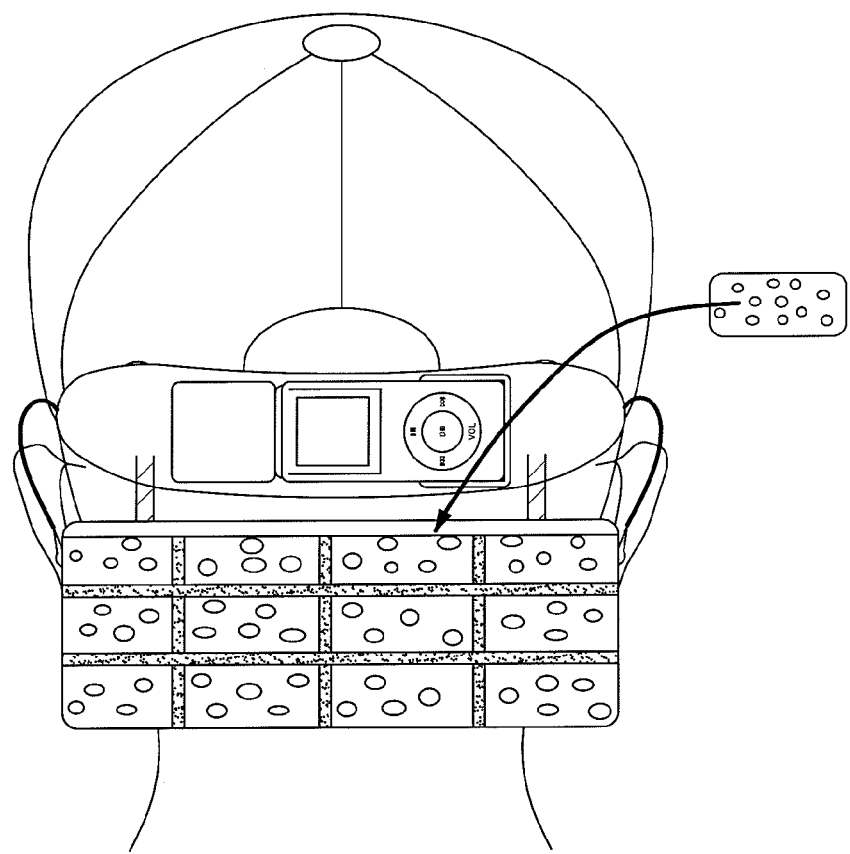

FIG. 172 shows a back view of a thermal pack storage cord working as an integral one piece, and including storage cord having an electronic device and a thermal pack permanently affixed to said storage cord, said thermal pack storage cord being anchored to a cap and worn by a user. The storage cord is attached to the cap by attaching snaps to complementary snaps on the cap. The thermal pack has one pouch about to receive a thermal bag through slot in the pouch. The thermal pack is connected to storage cord by arms, said arms being preferably adjustably extendable for moving thermal pack up and down, and thus better positioning the thermal pack in the neck area.

Figure 173:
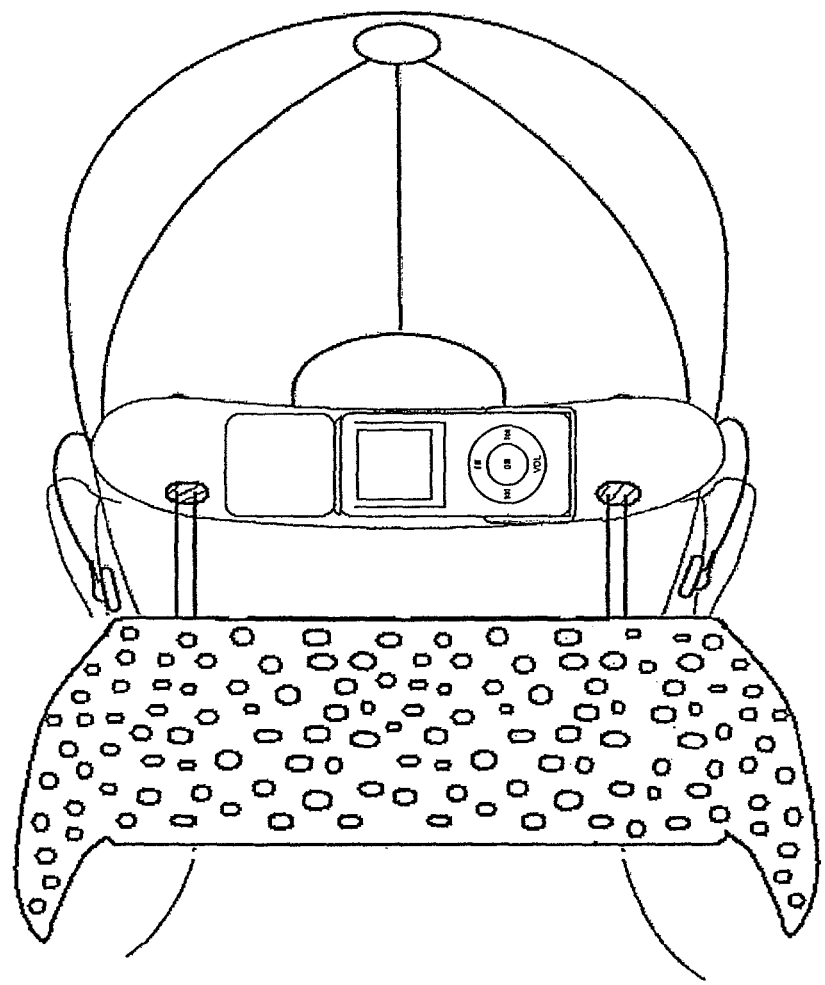

FIG. 173 shows a back view of a thermal pack storage cord, comprised of two parts, a storage cord having an electronic device and a thermal pack releasably anchored to said storage cord, said storage cord being anchored to a cap and worn by a user. The thermal pack includes means to attach to the storage cord, and preferably has two arms. The arms having have on their free ends attaching means for attaching to the storage cord including hook and loop fastener, snap-on buttons and the like. By being releasably attached this thermal pack may not include a pouch, and be comprised of a sealed bag containing heat/cooling material. It is also shown that the bag can have extensions that can encircle a large portion of the neck and part of the shoulder adjacent to the neck. Any thermal pack may have this encircling extension, but it is preferably used as a releasably attached thermal pack. The storage cord is shown with ear buds disposed on the user's ears allowing the user to enjoy music while protecting the brain against hypothermia and hyperthermia. The method also includes removing the storage cord from the hat by detaching the storage cord button from the complimentary snap-on buttons, and then using the same snap-on buttons on the cap attach the complimentary snap-on buttons at the free end of the arms of the thermal pack. This allows the user to use the same wearable article to provide thermal comfort and safety as well as to provide entertainment. The arms are preferably adjustably extendable for moving thermal pack up and down, and thus better positioning the thermal pack in the neck, shoulder, and back of the head area.

Figure 174:
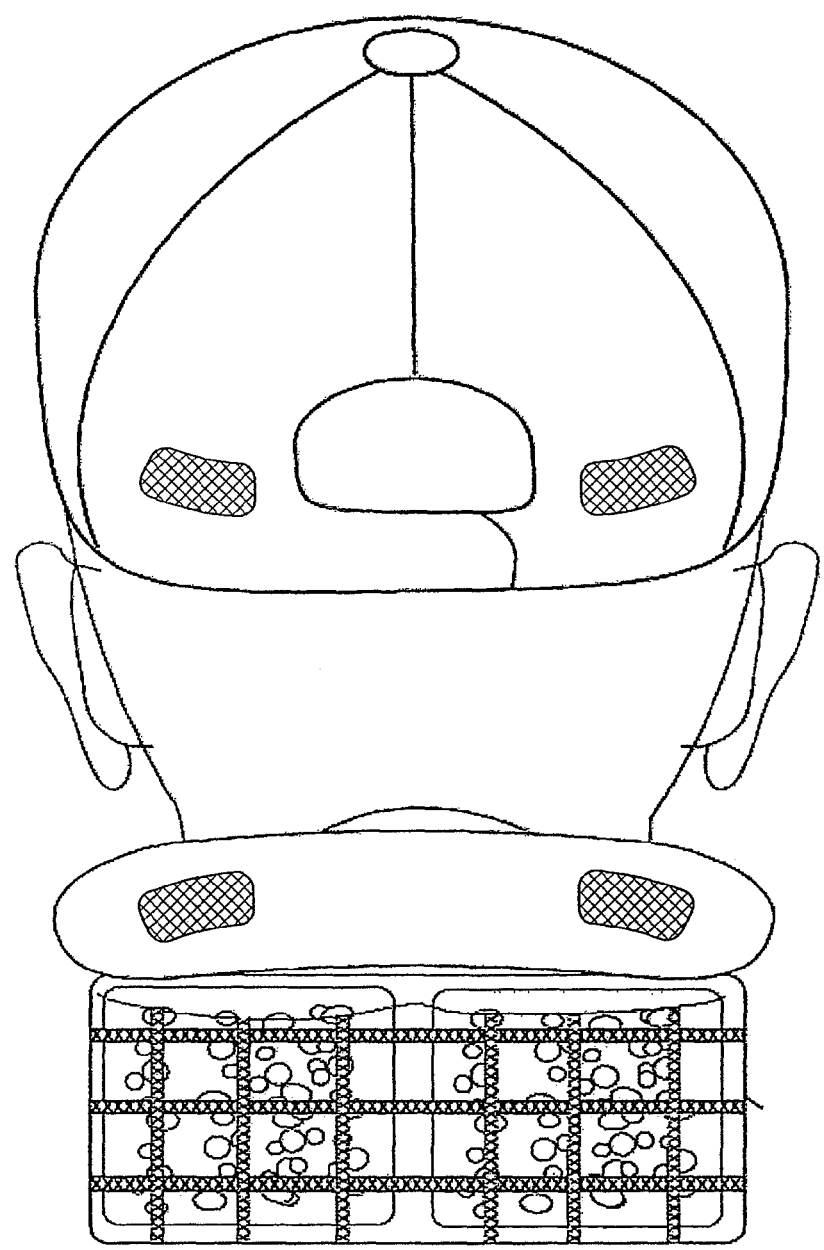

FIG. 174 shows a back view of a cap, worn by a user, and a thermal pack cord comprised of attachment means for attaching said thermal pack to a wearable article and at least one pouch for receiving a thermal bag. The embodiment is illustrated herein as two pouches, one in the left side and one in the right side, and the attachment means are illustrated as a hook and loop fastener. The cap has Velcro portions adapted for anchoring the thermal pack cord, as illustrated by arrows—. The thermal pack cord includes an upper portion for anchoring to another article and a lower portion having a thermal pack. Preferably, the thermal pack portion includes a pouch, but alternatively the thermal pack can comprise of an integral bag filled with gel, and no pouches. In this embodiment the thermal pack cord has thermal transferring capabilities and works primarily as a thermal pack. The thermal pouch portion may be connected to the upper cord portion by adjustable means to adjusting position of the thermal pouch. In this embodiment the upper portion includes and functions as anchoring means to a wearable article, which is attached to complimentary attaching or fastening means in the wearable article.

Figure 175:
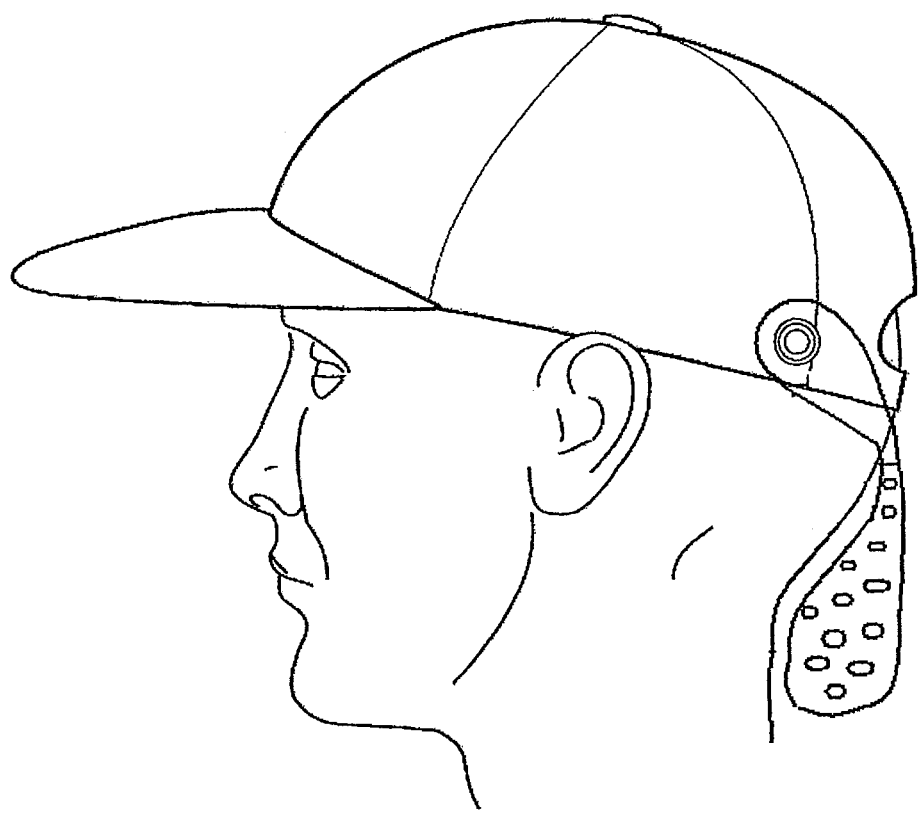

FIG. 175 shows a side view of a cap of FIG. 174, worn by a user, and a thermal pack attached to said cap by a button and having a lower portion comprised of a thermal pack in apposition to the skin of the neck.

Figure 176:
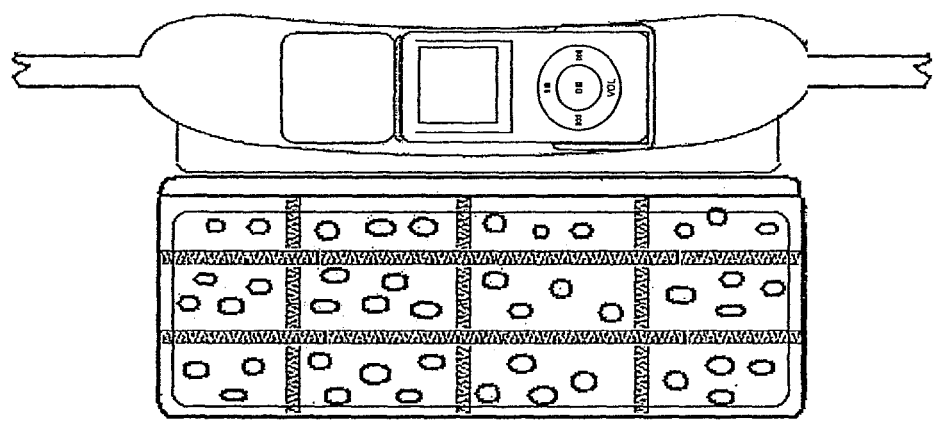

FIG. 176 shows a back view of an eyeglasses storage cord thermal pack, comprised of two parts, a storage cord having an electronic device and a thermal pack anchored to said storage cord, and disposed under the storage cord. The eyeglasses storage cord thermal pack has two sleeves for anchoring to the temples of eyeglasses and central portion that has means for holding an electronic device. Any means to hold an electronic device in the central portion of the storage cord can be used. The eyeglasses storage cord thermal pack illustratively has one pouches or pocket for receiving a thermal bag, with a mesh like structure forming the pouch.

Figure 177:
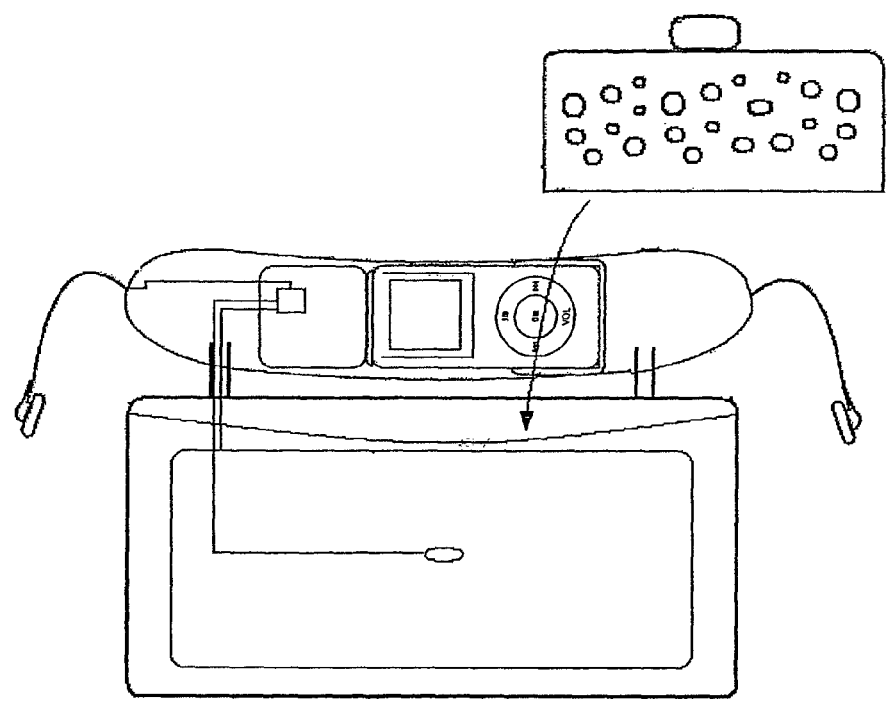

Considering that the storage cord has means to hold a variety of hardware as per the principles of the invention, and further considering that means to electrically generate thermal energy such as by wires may be compact, this invention further provides a combination of electrical and chemical generation of thermal energy. Chemical such as propylene glycol and similar compounds efficiently retain thermal energy that can be transferred to another body. Electrical means such as heat generating wire, conductive polymers, gas-based system, and thermo-voltaic system can be used to increase or reduce temperature, ad may be referred herein as electric thermal energy systems. The electrical larger electrical and/or electronic parts of those electric thermal energy systems can be housed in the storage cord. Accordingly, FIG. 177 shows a combined electrical and chemical thermal energy generating system. Illustrated herein as a pouch having wires, said wires connected to a circuit in the storage cord. A temperature sensor is included in the pouch to measure the temperature of the pouch. A processor in the storage cord is adapted to increase/reduce temperature of the electrical thermal energy system and to inform, preferably audibly, the user about the temperature level. Wire from the sensor and the electrical system connect to the circuit and processor in the storage cord through arm. Wire connects the circuit to ear bud for reporting the temperature level. The processor can also automatically control the level of temperature and delivery of thermal energy creating thus a closed-loop system. It is understood that a sensor can be used in any thermal pouch, such as non-electrical and chemically based only. In this embodiment the sensor measures the temperature of the thermal bag, and when the temperature of the thermal bag changes, the sensor informs the user that is time to replace the thermal for a new one with the desired temperature. A thermal bag is about to be placed in the pouch, and the storage cord includes an electronic device (music player).

Figure 178:
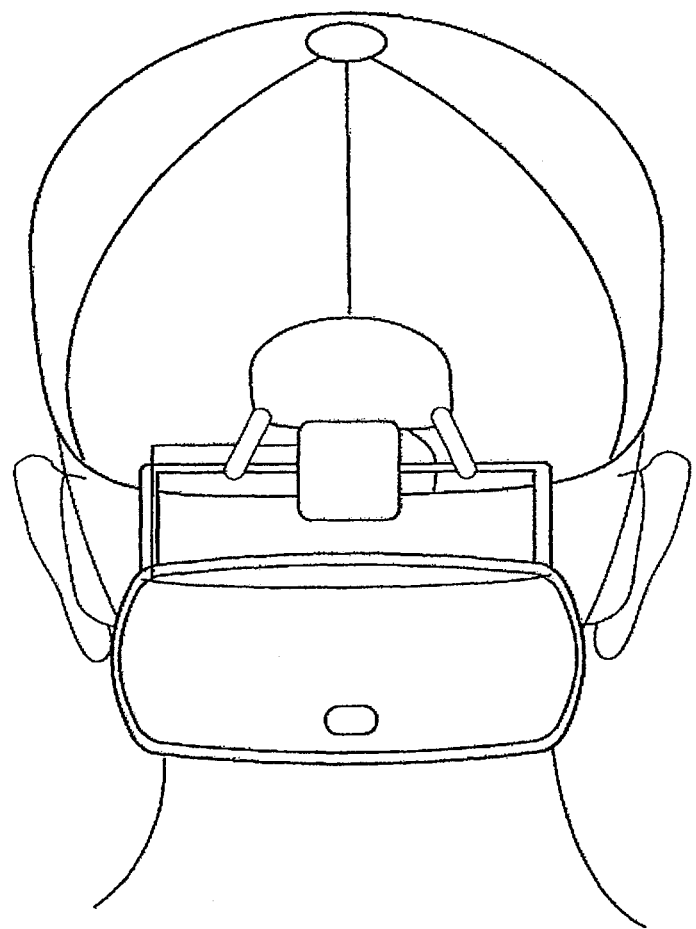

FIG. 178 is an alternative embodiment of an electronic thermal pack worn by a user, and including an electronic portion and a thermal pack portion, in which the cord is replaced by a rigid arm and a clip system to secure the thermal pack to a wearable article. The embodiment further includes a central portion between the two clips, said central portion working as the holder for an electronic package, in accordance to the principles of the invention. In this embodiment the cord is replaced by an essentially rigid arm, which has a central portion housing the electronic device, and has two clip assemblies in its side portion. Wire reach central portion through arm. The central portion may include retractable cord, ear bud connections, thermal energy generating systems, and other parts as per this invention. Clips or other clamp assemblies can be used to secure the device to the band of the hat or to any wearable article.

Figure 179:
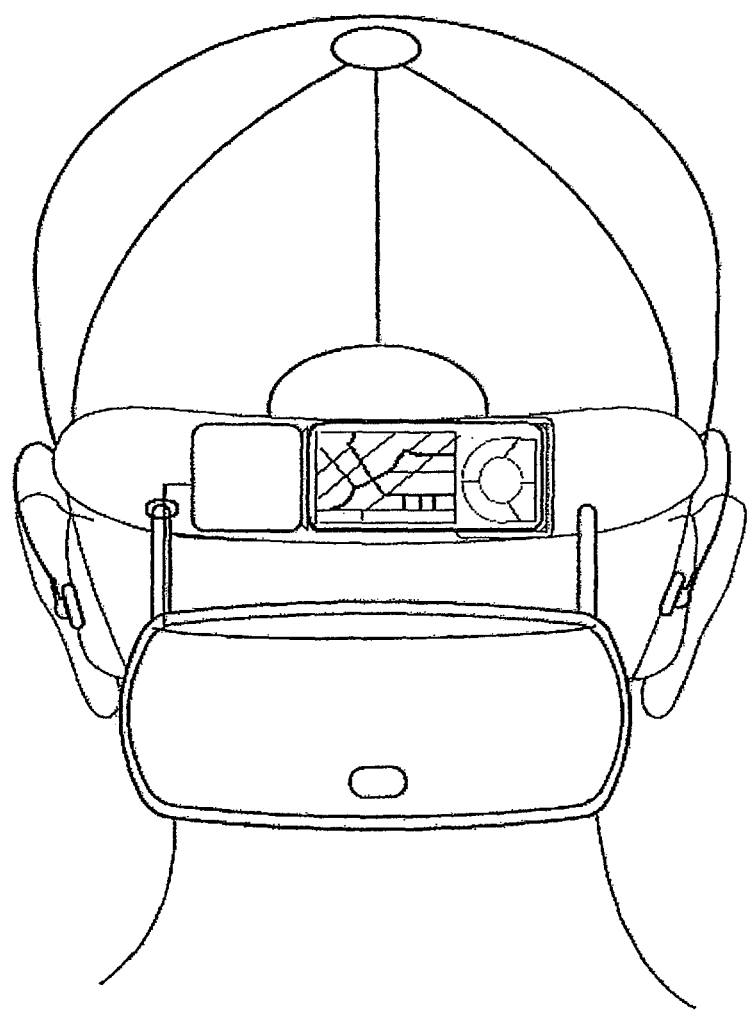

FIG. 179 is an alternative embodiment of thermal pack storage cord worn by a user, and including a storage cord housing a GPS system and a thermal pack portion, in which the thermal pack includes an electric system. The thermal pack includes two arms, which releasably connected to the storage cord, one arm being mechanically connected and a second arm being mechanically and electrically connected. The electric system is releasably electrically connected to storage cord by means of an electrical connector located at the end of an arm.

Figure 180:
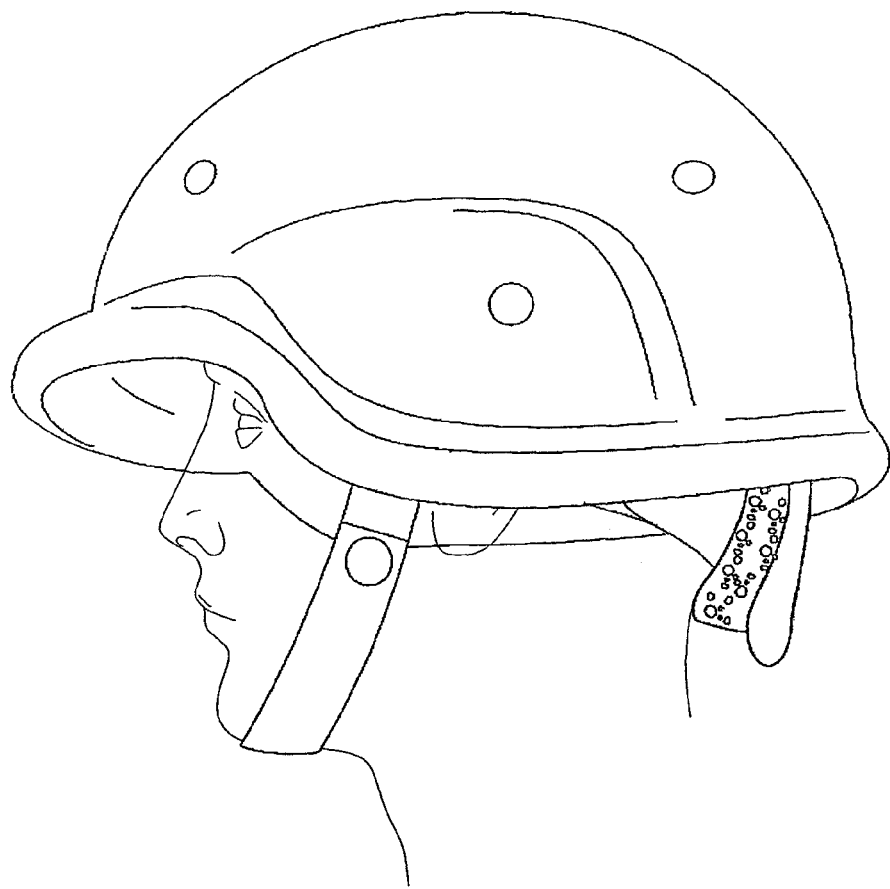
Figure 181:
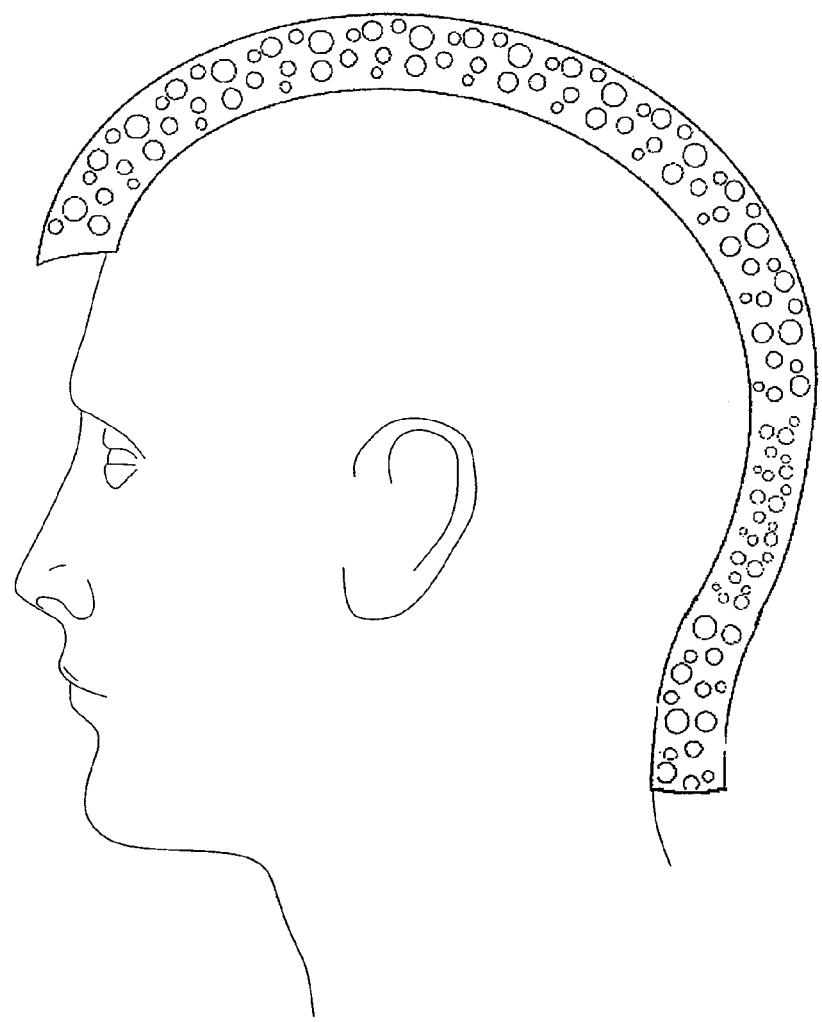

The brain cooling or brain heating device in accordance with the principles of the invention includes a thermal pack having hot and cold pad or pack adapted to fit and match the special anatomy of the neck. The thermal pack includes preferably a pouch for holding a thermal bag, which is preferably flexible and sealed as a pad and has a gel within said pad, with the surface touching the skin having a substantially convex shape. The thermal pack can be part of a storage cord or be an extension of a head mounted gear. Accordingly, FIG. 180 shows a head mounted gear, illustrated as a helmet, being worn by a user (in ghost image), said head mounted gear having an extension on the back portion, the extension including a pouch for receiving and holding a thermal bag. A special thermal bag for a helmet is contemplated and may include a bag with larger dimension and different geometry to better fit with said helmet. The portion facing the environment and/or the back portion of the pouch, herein called back portion, preferably comprises insulating material, and most preferably armored material. Although the extension with pouch is shown as permanently affixed to the helmet, it is understood that the extension With the pouch can be releasably secured to the helmet, for example using Velcro strips on the face of back portion which match complimentary Velcro strips on the back of the helmet. It is understood that the thermal pack of the invention can include the head in addition to he neck, and will be referred herein as head thermal pack or head thermal cap. Accordingly, FIG. 181 shows a cross sectional of the head/neck thermal lining or head thermal cap, positioned on the head and neck of a user (in ghost image), containing gel with said cap thermal pad having the shape and dimensions to match the anatomy of the head and neck as in accordance to this invention. Preferred thickness of the head thermal pack is equal to or more than 2 mm and less than 40 mm, and more preferably equal to or more than 4 mm and less than 20 mm, and most preferably equal to or more than 5 mm and equal to or less than 10 mm. Construction of head thermal pack is performed so as to maintain an intimate apposition to the head and neck. Exemplary manufacturing steps includes a thin flexible plastic being molded using a sphere having head dimensions or slightly larger dimensions than a normal head for fitting on top of the head. Second step includes making a second surface using a mold which has smaller diameter than the first mold. Alternatively the two surfaces can have same diameter but one has larger dimension than the other for creating a bag configuration. Following step includes connecting the edges of said two surfaces, and preferably leaving an opening for filling with gel. Next step includes sealing the opening. Another step may include checking the bag for assuring complete sealing and no lacking fluid or material inside said bag.

Figure 182:
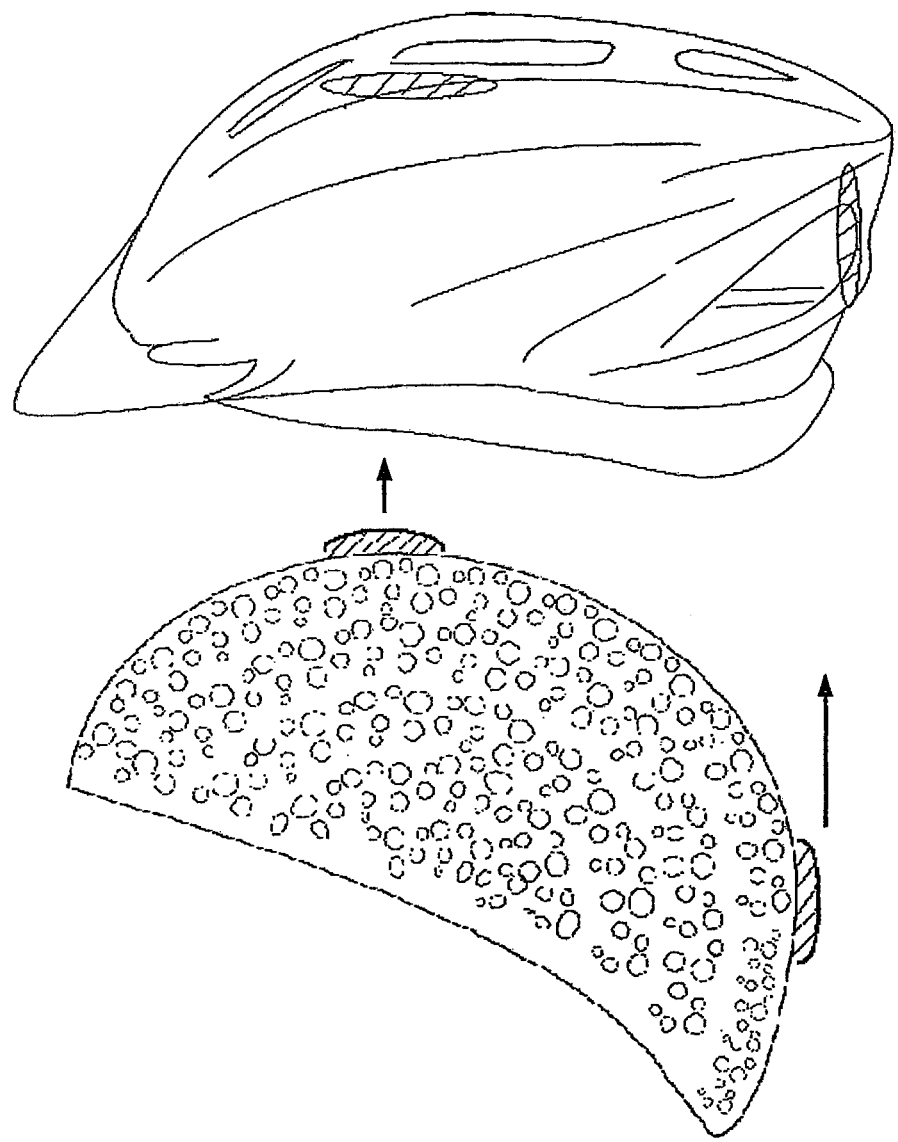

FIG. 182 shows side perspective view of a head thermal pack adapted to fit inside a helmet, and about to be positioned on the inside of a bike helmet. The surface of the head thermal cap may include fastening means, such as hook and loop, illustrated herein as a top and side hook and loop areas, which match the top and side hook and loop areas of the inside of the helmet.

Figure 183:
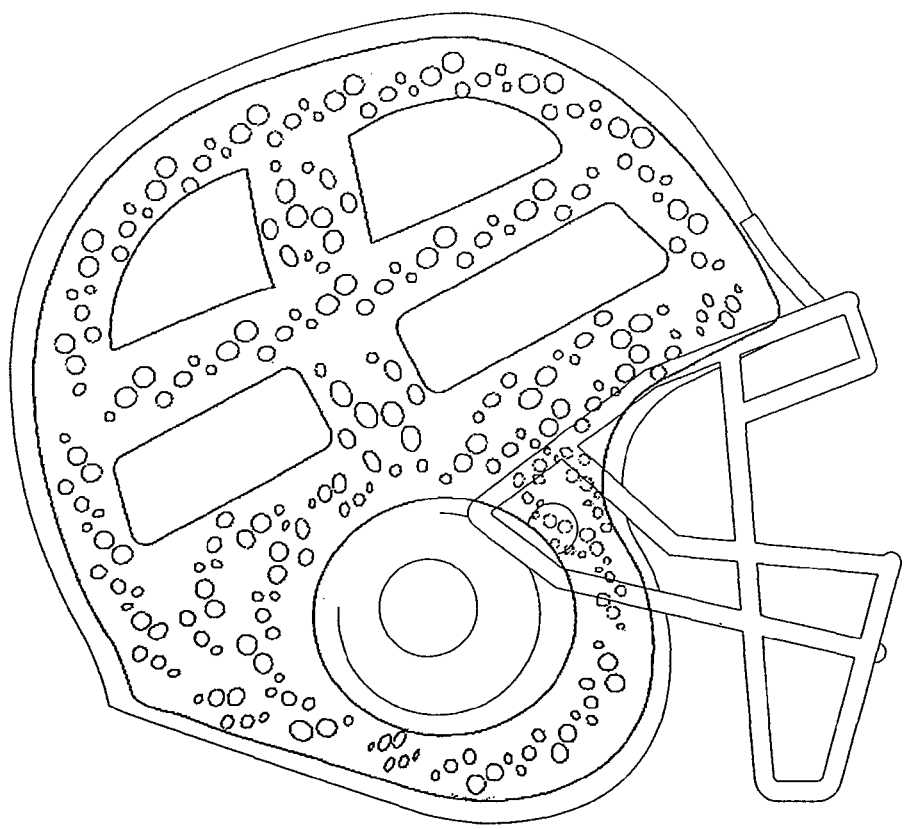

The head thermal cap preferably lines and matches the entire inner surface of the helmet providing thus comfort and cushioning as well as thermal comfort. Accordingly, FIG. 183 illustrates a helmet, made with transparent material, which received the head thermal cap of this invention, with said thermal cap gel being visible. The head thermal cap can be adapted to fit the design of the helmet, and as shown the perforated areas of the helmet do not contain portions of the head thermal cap.

Figure 184:
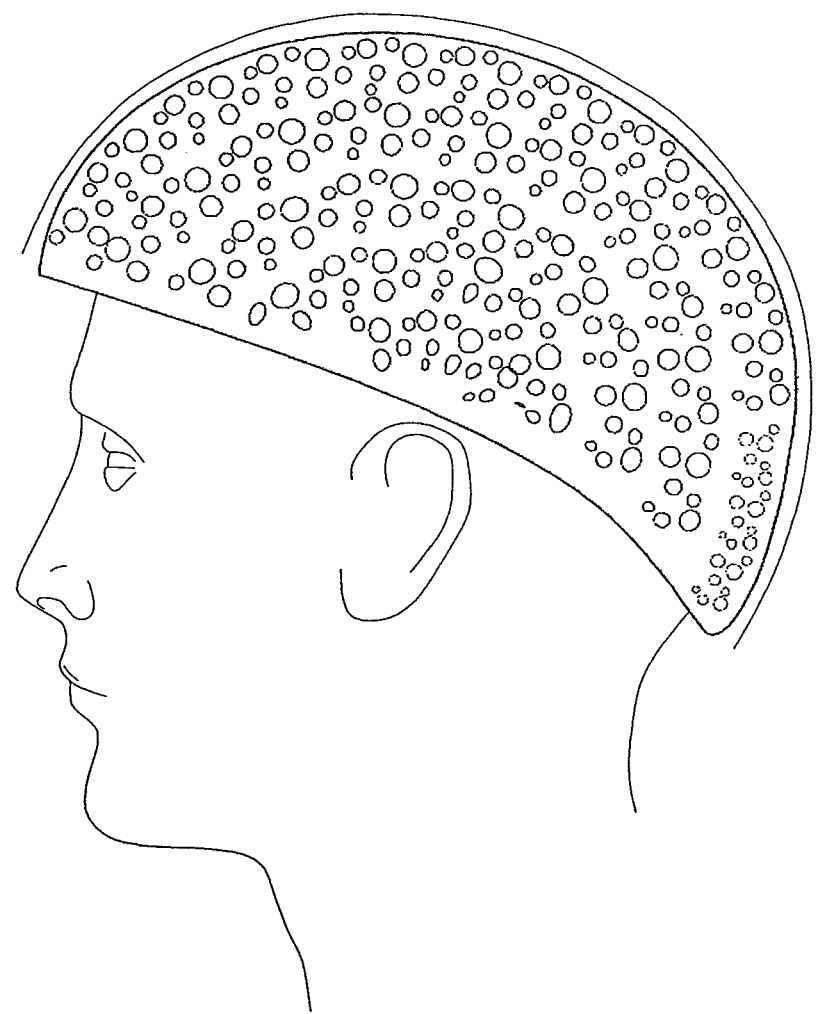
Figure 185:
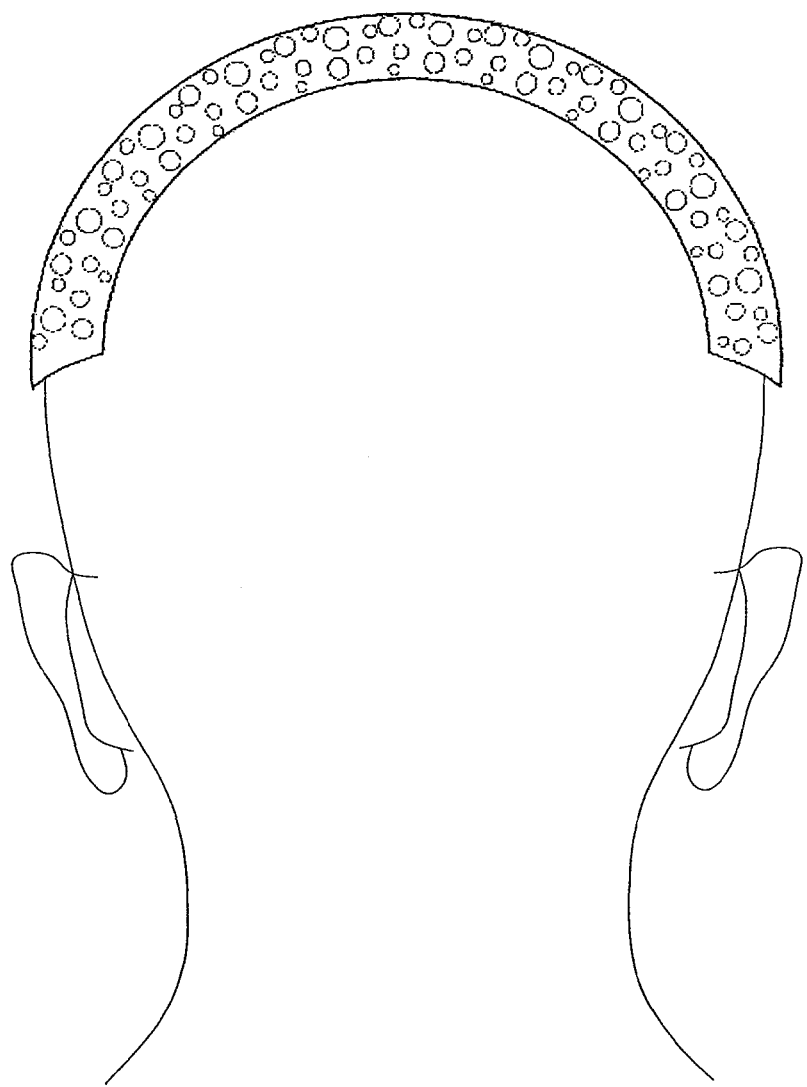
Figure 186:
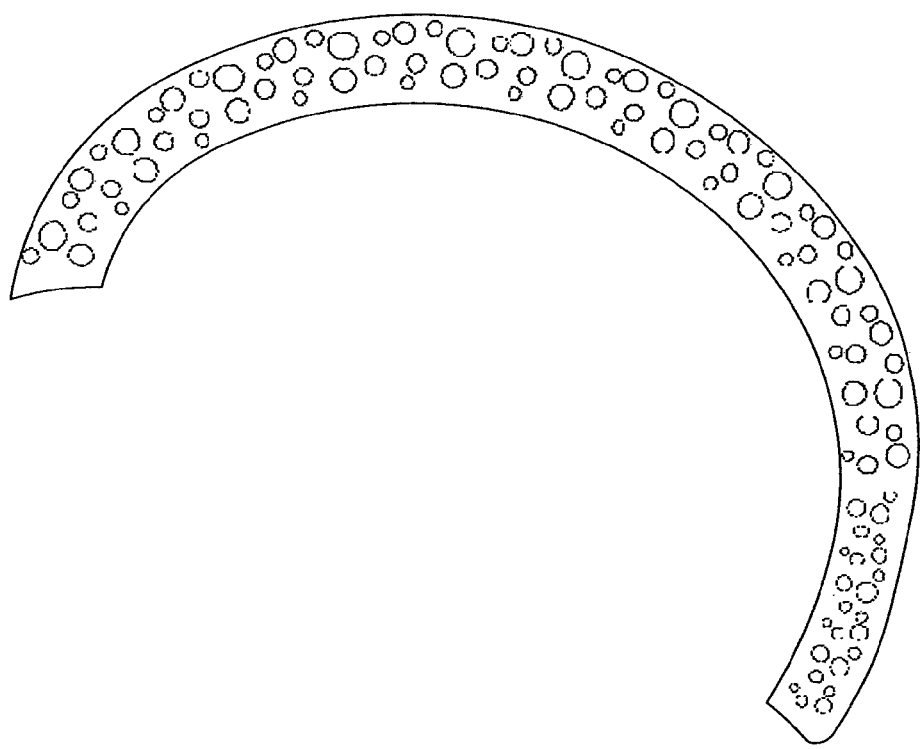

FIG. 184 shows side perspective view of another head thermal pack being worn by a user and positioned on the head of said user (in ghost image). FIG. 185 is a diagrammatic back cross sectional view of the head thermal pack at the geometric center of the head showing the head thermal pack positioned on the head of a user. In order to fit with the anatomy, the thermal pack has different dimensions depending on the part of said thermal pack, which can be observed by the high cut of the head thermal pack a center of the head next to the ear, and the long portion covering the back of the head. Thickness of the head thermal pack has been augmented for illustration purposes. FIG. 186 is a diagrammatic side cross sectional view of the head thermal pack at the geometric center of the head showing long portion covering the back of the head and neck.

Figure 187A:
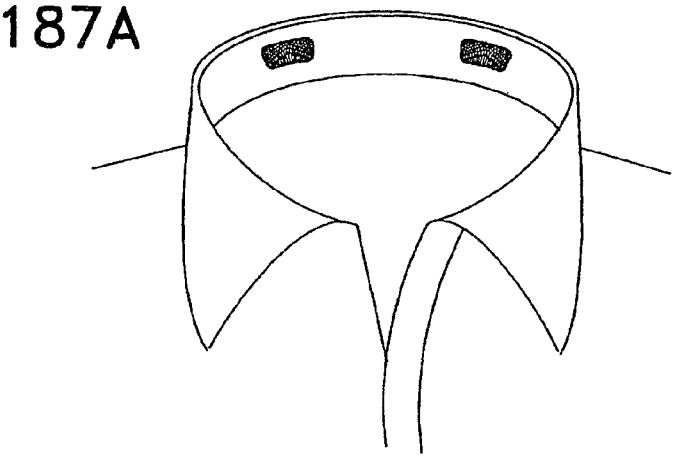
Figure 187B:
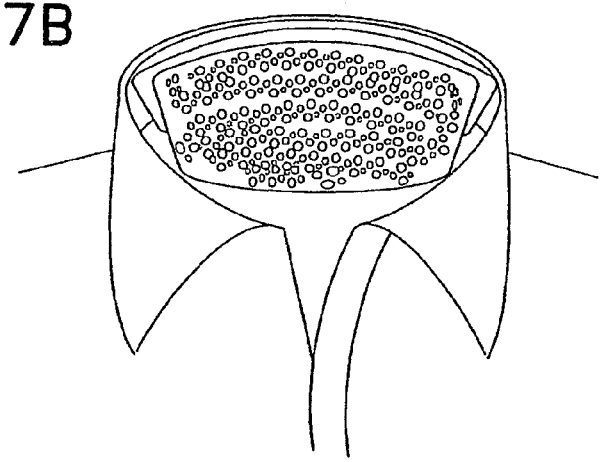
Figure 187C:
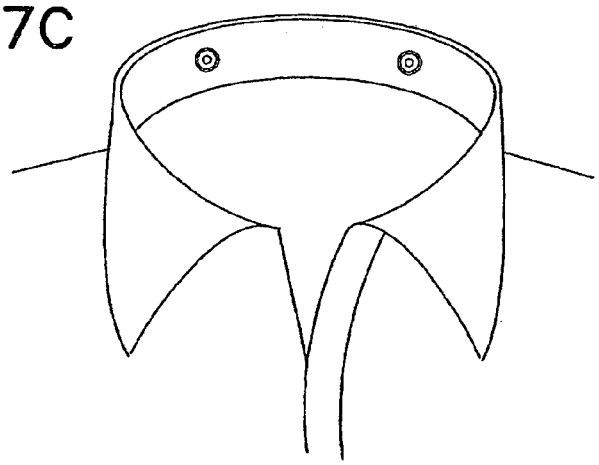

It is understood that the wearable article thermal pack of the invention can include various configurations. Accordingly, FIGS. 187*a*, 187*b*, and 187*c* shows another embodiment of the thermal pack adapted for another wearable article, illustratively represented as the collar of a shirt. FIG. 1 (288*a*) shows a collar of a shirt with fastening means comprised of hook and loop fasteners. FIG. 1 (288*b*) shows a thermal pack placed on the collar and held in place by complimentary hook and loop fasteners (not shown) located on the surface of the thermal pack opposite to the surface facing the skin. FIG. 1 (288*c*) shows a collar of a shirt with fastening means comprised of snap-on buttons. The thermal pack may include adhesive means on the surface facing the skin, with adhesive means preferably located on the edge of the pack, in order to achieve stability and intimate skin apposition when using this embodiment.

A head thermal pack can be combined with a thermal pack connected to a storage cord, or to a thermal pack collar. It is understood that any combination of the various embodiments disclosed in this invention are within the scope of the invention.

It is understood that DEP can work as a memory device with control buttons, preferably using MP format for compression, and thus storing music, with said files being decompressed and music played when attached to the electronics housed in the storage cord. The memory device with control buttons allows music to be selected and volume to be changed, with the information stored in said memory device. When the memory device is connected to the electronic in the storage cord, a program stored in the memory will execute the function, and change the volume according to what was programmed, and change the music according to what was programmed using the memory device with control buttons. The memory device with control button of the invention may include a processor and a power source. Alternatively, the memory device of the invention works from energy drawn from a separate device, such as host device. The storage cord may include a USB connector and other connectors for storing and/or receiving information from the controlling memory device. Software in the electronic portion of the storage cord may decompress and amplify the sound files for listening. The memory device of the invention could also be adapted to be plugged in conventional computers and/or audio/imaging systems.

The invention can include a variety of kits combining the different parts of the invention. One exemplary kit comprises an insulating container holding at least one thermal pack. Another kit includes a wearable article and a storage cord, housed in a box, which may further include the insulating container housing thermal packs, or any combination of any of the parts of the invention.

Although the ear bud cords may have the same length, preferably the ear bud cords have dissimilar length from the origin at the spool to the ear bud at the end of the cord, with one cord being smaller than the opposite cord. However, the external parts of the cords preferably have the same length.

Electronic package can be adapted to receive any wireless signal including satellite and wireless internet signal. It is understood that the storage cord may provide several other functions including changing color of the lens of a regular eyewear since the larger electrical parts and battery can be stored away while keeping the frames of eyeglasses light and elegant. A digital binocular with photo capabilities is also contemplated, in which the electronics re stored in the storage and the frame only supports the binocular lens. A digital binocular attached to an eyewear storage cord can also be used, in the same manner as the forehead light embodiment. A tracking device with internet wireless capabilities can also be integrated into any embodiments of this invention. A camera, or microphone disclosed in some embodiments can be replaced or have add a laser or light source for alignment or measuring distance such as in professional activities or sports such as playing golf or pool, allowing the visual axis to be aligned with line of the laser light. Only a light laser is located next to the eye while other parts are housed in the storage cord.

Any combination of electronic devices can be used, as well as any combination of wearable articles and of support structures. For example, a C-collar may include a GPS in one side and music player on the opposite side of the C-shaped structure.

Electronic device in the storage cord may include a recorder, in which a small and discrete microphone is placed next to the face and other large parts and memory are stored in the storage cord. An ultrasound device can be housed in the storage cord and prevent attack from dogs by emitting a certain sound, allowing a runner not to have to hold the device. The storage cord may further include a motion sensor to detect someone behind as well as infrared sensor and/or odor detector to analyze odors and the presence of certain chemical elements, such as biochemical weapons. and/or odor detector to analyze odors and the presence of certain chemical elements, such as biochemical weapons.

Due to the apposition to the skin the storage cord can also a variety of biological monitoring devices that can capture biological data. In addition delivery of drugs through the skin can be accomplished by adapting iontophoretic devices to the storage cord as well as by placing patches delivering medications on the surface of the cord touching the skin including housing an insulin pump for delivery of insulin and glucose. An improved hearing aid can be achieved by using a microphone to amplify the sound, and then deliver to the ear with the ear bud assembly. Likewise, a camera with zoom and/or magnifying capabilities can be used with the parts divided between the front and back of the head, heavier parts disposed in the storage cord.

Other devices that can be housed and take advantage of the location is a motion device for massaging the neck area. Electronics of an air purifier can be disposed in the C-shape device around the neck and adjacent to the nose. A pedometer can be housed in the storage cord allowing distance to be calculated, as well as a GPS adapted to calculate distance and speed.

Figure 45D:
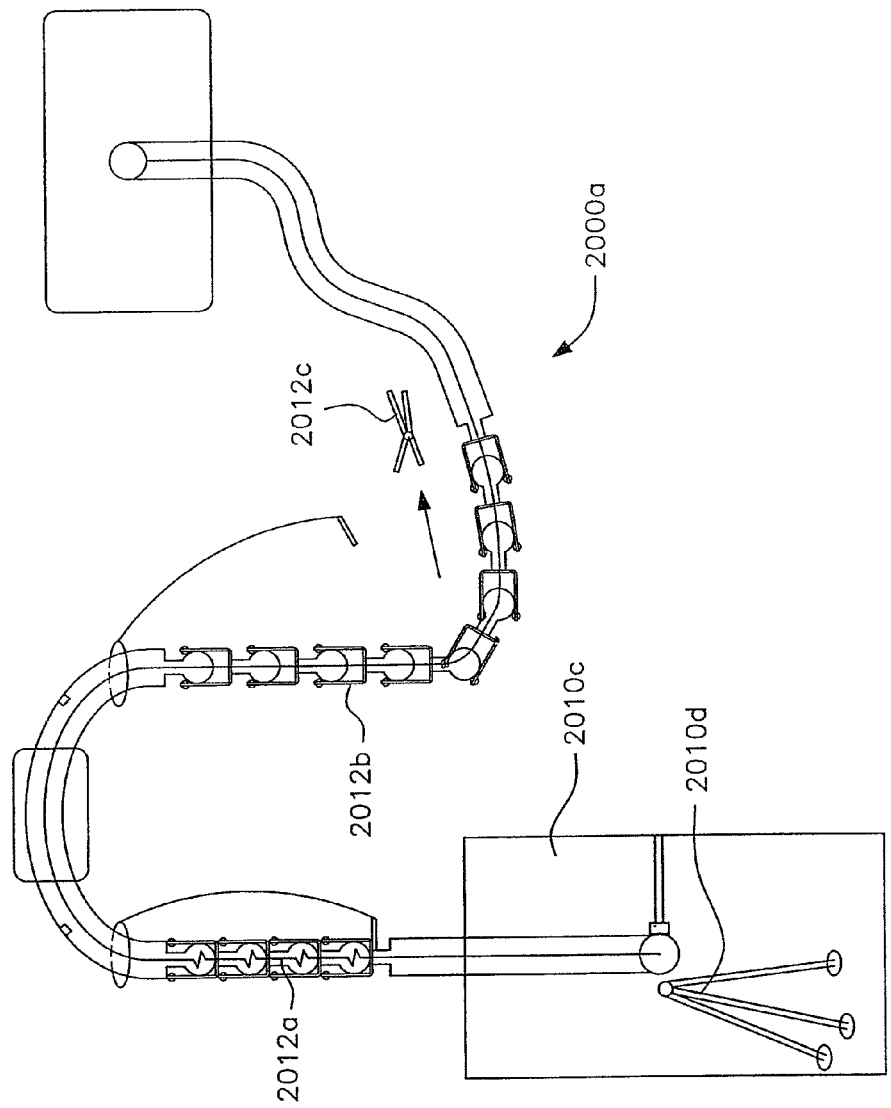
FIGS. 45D through 45G illustrate a spinal configuration for a wearable computer.

The wearable computer includes a combination of adjustably positionable arms and adjustably extendable arms, being disposed in the two side of the U-shape structure. It is also understood that a variety of supporting means can be used for the wearable computer. Accordingly, FIG. 45C shows a user wearing inverted U-shape computer 2000 with display 2010a including a bi-pod system 2010b for resting against the body. A tripod also can be used for the keyboard, which is further held in place by clips secured to a piece of clothing. FIG. 45D shows a preferred spinal configuration for the wearable computer 2000a, including a display 2010c having a tripod attachment 2010d and one adjustably extendable portion 2012a being compressed while the opposite adjustably extendable portion 2012b being in an extended position. Any type of stop assembly or mechanism can be used including portable hand held devices separated from the wearable computer 2000a, exemplified herein as clip 2012c.

Figure 45E:
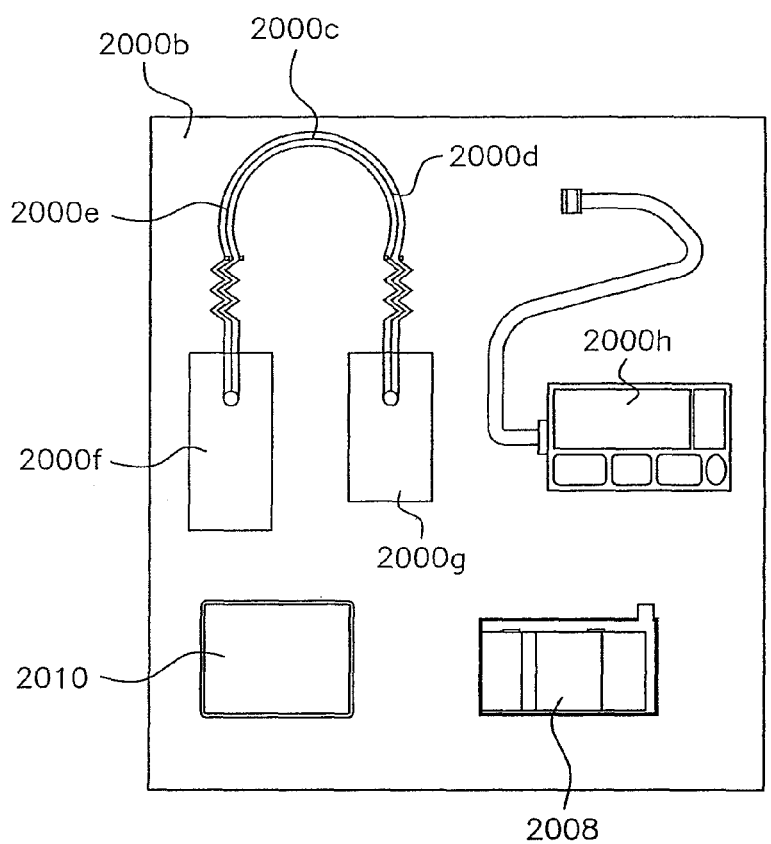

FIG. 45E shows a kit including a box 2000b, an inverted U-shaped structure 2000c having two arms 2000d and 2000e, each arm having a holding structure 2000f and 2000g for holding a display and a keyboard, and further including a display 2010, keyboard 2008, and computer hardware portion with cable 2000h.

Figure 45F:
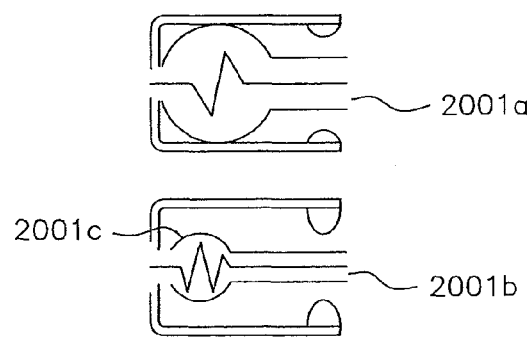
Figure 45G:
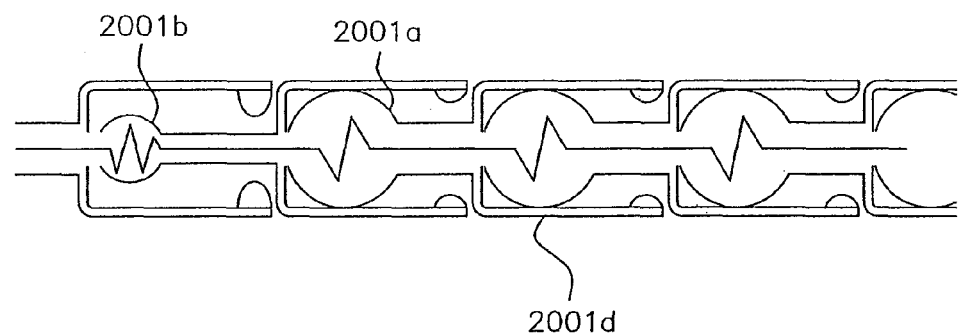

FIG. 45F shows the preferred spinal configuration for the wearable computer. The spinal configuration allows increasing the length of the arm without increasing the diameter of the arm as can be seen in spinal portion 2001a (reduced length) and 2001b (increased length), in which the length of each section is increased by reducing the size of the sphere 2001c connecting the parts. The tubular shape also provides more comfortable wear. FIG. 45G is a cut away view of the spinal configuration showing first part 2001b with ability to extend longer than second part 2001a.

It is also understood that the wearable computer of this invention can be worn as a strap, a sling or made in a vest version with extra pockets. The screen is attached to a gooseneck arm that allows it to be positioned draping it across the neck which allows for extra stability. The screen is detachable to allow it to set on a table or hung from the back of a seat etc. A main pocket secured to the side of the body of the user holds the hard drive, motherboard, modem, USB card, and the like. The keyboard has two legs with clips at the end that attach to the belt to hold it up. The keyboard may also have on the front underside three legs that are attached to a pad (or three pads) that rest on the stomach to give it support. The keyboard may also be used setting on a tabletop or resting in the lap it, and also has it own pocket for storage when not in use.

It will be understood that it is within the scope of this invention to combine any or all of the various aspects and elements described herein, in any particular combination, and that all such combinations are considered to be part of the invention.

I claim:

1. An electronic detachable gear system comprising
an article of clothing, the article of clothing being a cap,
a first pouch mounted on a rear of the cap for containing electrical equipment,
a communication device having a short range wireless signal, said communication device being contained in said first pouch of the cap, the communication device being configured to be in wireless communication with a digital electronics unit,
a second pouch mounted on a side of the cap,
two spring loaded spools, the two spring loaded spools being located on the side of the cap,
electrical wiring interconnecting the communication device in the first pouch and the two spring loaded spools, the electrical wiring connecting an electrical plug extending into the first pouch and one of the two spring loaded spools, the other of the two spring loaded spools being electrically connected by additional electrical wiring to the one of the two spring loaded spools and an ear bud, the ear bud being located on a side of the cap opposite to a position of the two spring loaded spools, the one spring loaded spool being electrically coupled to another earbud by electrical wiring, the electrical wiring passing through a wall of the second pouch on the side of the cap for connection to another earbud, the another earbud being stored in the second pouch, and each of the two pouches including a sealing mechanism for sealing the pouch, and a port of the communication device being connected to at least one of an ear bud and a microphone.

2. The electronic detachable gear according to claim 1, wherein the cap is made of moisture resistant fabric material.

3. The electronic detachable gear according to claim 1, wherein said communication device is a digital electronics player.

4. The electronic detachable gear according to claim 1, wherein the communication device includes two ports for the ear bud and for the microphone, respectively.

5. The electronic detachable gear according to claim 1, wherein one pouch includes a coiled cord with one end of the coiled cord anchored in the one pouch and an opposite end of the coiled cord is removable from the one pouch.

6. The electronic detachable gear according to claim 1, wherein the communication device includes an external port for connection to a battery.

7. The electronic detachable gear according to claim 1, wherein the electrical wiring extends along a bottom edge of the cap.

8. The electronic detachable gear according to claim 1, wherein one pouch is formed by a movable fabric piece.

9. The electronic detachable gear according to claim 1, wherein the communication device includes an on/off switch and a volume control button.

10. The electronic detachable gear according to claim 1, wherein the one pouch measures less than 15 cm in length, 10 cm in width and 6 cm in thickness.

11. The electronic detachable gear according to claim 10, wherein the one pouch measures less than 10 cm in length, 6 cm in width and 4 cm in thickness.

12. The electronic detachable gear according to claim 11, wherein the one pouch measures 7 cm in length, 4 cm in width and 2.5 cm in thickness.

* * * * *